US010727913B2

(12) United States Patent
Murakami et al.

(10) Patent No.: US 10,727,913 B2
(45) Date of Patent: Jul. 28, 2020

(54) BROADCAST SIGNAL TRANSMISSION METHOD, BROADCAST SIGNAL TRANSMISSION APPARATUS, BROADCAST SIGNAL RECEPTION METHOD, AND BROADCAST SIGNAL RECEPTION APPARATUS

(71) Applicant: Sun Patent Trust, New York, NY (US)

(72) Inventors: Yutaka Murakami, Kanagawa (JP); Tomohiro Kimura, Osaka (JP); Mikihiro Ouchi, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/536,628

(22) Filed: Aug. 9, 2019

(65) Prior Publication Data

US 2019/0363766 A1 Nov. 28, 2019

Related U.S. Application Data

(63) Continuation of application No. 15/947,206, filed on Apr. 6, 2018, now Pat. No. 10,419,088, which is a (Continued)

(30) Foreign Application Priority Data

Dec. 10, 2010 (JP) ................................ 2010-276457
Dec. 28, 2010 (JP) ................................ 2010-293114
(Continued)

(51) Int. Cl.
*H04W 72/04* (2009.01)
*H04B 7/0456* (2017.01)
(Continued)

(52) U.S. Cl.
CPC ............. *H04B 7/0456* (2013.01); *H04B 7/06* (2013.01); *H04L 25/03898* (2013.01);
(Continued)

(58) Field of Classification Search
USPC .................. 375/295, 211; 370/330, 252, 338
See application file for complete search history.

(56) References Cited

U.S. PATENT DOCUMENTS 8,320,431 B2 * 11/2012 Maheshwari ......... H04L 1/0029 370/252
8,391,392 B2 3/2013 Melzer
(Continued)

FOREIGN PATENT DOCUMENTS

CN 1883145 A 12/2006
CN 101374032 2/2009
(Continued)

OTHER PUBLICATIONS

International Search Report dated Dec. 27, 2011 in corresponding International Application No. PCT/JP2011/006741.
(Continued)

*Primary Examiner* — Eva Y Puente
(74) *Attorney, Agent, or Firm* — Wenderoth, Lind & Ponack, L.L.P.

(57) ABSTRACT

Disclosed is a transmission scheme for transmitting a first modulated signal and a second modulated signal in the same frequency at the same time. According to the transmission scheme, a precoding weight multiplying unit multiplies a precoding weight by a baseband signal after a first mapping and a baseband signal after a second mapping and outputs the first modulated signal and the second modulated signal. In the precoding weight multiplying unit, precoding weights are regularly hopped.

8 Claims, 126 Drawing Sheets

Related U.S. Application Data continuation of application No. 15/008,055, filed on Jan. 27, 2016, now Pat. No. 9,985,702, which is a continuation of application No. 13/810,783, filed as application No. PCT/JP2011/006741 on Dec. 1, 2011, now Pat. No. 9,287,946.

(30) Foreign Application Priority Data

| | | |
|---|---|---|
| Feb. 21, 2011 | (JP) | 2011-035085 |
| Apr. 19, 2011 | (JP) | 2011-093543 |
| Apr. 28, 2011 | (JP) | 2011-102098 |
| Jun. 24, 2011 | (JP) | 2011-140746 |

(51) Int. Cl.
*H04L 25/03* (2006.01)
*H04B 7/06* (2006.01)
*H04L 5/00* (2006.01)

(52) U.S. Cl.
CPC .......... *H04B 7/0469* (2013.01); *H04B 7/0606* (2013.01); *H04B 7/0689* (2013.01); *H04L 5/0007* (2013.01); *H04W 72/042* (2013.01)

(56) References Cited

U.S. PATENT DOCUMENTS

| | | | | |
|---|---|---|---|---|
| 8,787,261 | B2 | 7/2014 | Taoka | |
| 8,842,772 | B2 | 9/2014 | Murakami et al. | |
| 8,867,482 | B2 * | 10/2014 | Murakami | H04L 27/2627 370/330 |
| 9,179,405 | B2 * | 11/2015 | Ouchi | H04B 7/10 |
| 9,209,874 | B2 * | 12/2015 | Onodera | H04B 7/0417 |
| 9,979,448 | B2 * | 5/2018 | Okuyama | H04B 7/0452 |
| 2007/0140377 | A1 | 6/2007 | Murakami et al. | |
| 2007/0211816 | A1 | 9/2007 | Hwang | |
| 2008/0080634 | A1 | 4/2008 | Kotecha et al. | |
| 2008/0232449 | A1 | 9/2008 | Khan et al. | |
| 2008/0303701 | A1 | 12/2008 | Zhang et al. | |
| 2009/0052578 | A1 | 2/2009 | Sawai | |
| 2010/0046658 | A1 | 2/2010 | Yosoku et al. | |
| 2010/0056216 | A1 | 3/2010 | Li et al. | |
| 2012/0269286 | A1 | 10/2012 | Huang | |
| 2013/0064217 | A1 | 3/2013 | Khan et al. | |
| 2013/0330082 | A1 | 12/2013 | Perez De Aranda Alonso et al. | |
| 2014/0044209 | A1 | 2/2014 | Moulsley et al. | |
| 2014/0064109 | A1 | 3/2014 | Krishnamurthy | |
| 2014/0105317 | A1 | 4/2014 | Erell et al. | |
| 2014/0369397 | A1 | 12/2014 | Nakamura | |
| 2015/0349868 | A1 | 12/2015 | Sawai | |
| 2017/0019155 | A1 | 1/2017 | Sawai | |

FOREIGN PATENT DOCUMENTS

| | | | |
|---|---|---|---|
| CN | 101578779 | A | 11/2009 |
| CN | 101636995 | | 1/2010 |
| CN | 101816147 | | 8/2010 |
| EP | 2 156 588 | | 2/2010 |
| JP | 2003-179657 | | 6/2003 |
| JP | 2003-258927 | | 9/2003 |
| JP | 2009-171155 | | 7/2009 |
| JP | 2009-528761 | | 8/2009 |
| KR | 10-2010-0125773 | | 12/2010 |
| TW | 201021455 | A | 6/2010 |
| WO | 2005/050885 | | 6/2005 |
| WO | 2007/100215 | | 9/2007 |
| WO | 2008/150148 | | 12/2008 |
| WO | 2009/031966 | | 3/2009 |

OTHER PUBLICATIONS

Tareq Y. Al-Naffouri et al., "Opportunistic Beamforming with Precoding for Spatially Correlated Channels", Information Theory, 2009, CWIT 2009, 11$^{th}$ Canadian Workshop on May 15, 2009.

Magnus Sandell et al., "Pseudo-Random Scrambling for Quasi-Static MIMO Channels", Personal, Indoor and Mobile Radio Communications, 2007, PIMRC 2007, IEEE 18$^{th}$ International Symposium, Sep. 7, 2007.

Bertrand M. Hochwald et al., "Achieving Near-Capacity on a Multiple-Antenna Channel", IEEE Transactions on Communications, vol. 51, No. 3, pp. 389-399, Mar. 2003.

Ben Lu et al., "Performance Analysis and Design Optimization of LDPC-Coded MIMO OFDM Systems", IEEE Transactions on Signal Processing, vol. 52, No. 2, pp. 348-361, Feb. 2004.

Yutaka Murakami et al., "BER Performance Evaluation in 2 ×2 MIMO Spatial Multiplexing Systems under Rician Fading Channels", IEICE Trans. Fundamentals, vol. E91-A, No. 10, pp. 2798-2807, Oct. 2008.

Hangjun Chen et al., "Turbo Space-Time Codes with Time Varying Linear Transformations", IEEE Transactions on Wireless Communications, vol. 6, No. 2, pp. 486-493, Feb. 2007.

Hiroyuki Kawai et al., "Likelihood Function for QRM-MLD Suitable for Soft-Decision Turbo Decoding and Its Performance for OFCDM MIMO Multiplexing in Multipath Fading Channel", IEICE Trans. Commun., vol. E88-B, No. 1, pp. 47-57, Jan. 2005.

Motohiko Isaka et al., "A tutorial on 'parallel concatenated (Turbo) coding', 'Turbo (iterative) decoding' and related topics", The Institute of Electronics, Information, and Communication Engineers, Technical Report IT 98-51 pp. 1-18, Dec. 1998 (with English abstract).

S. Galli et al., "Advanced Signal Processing for PLCs: Wavelet-OFDM", Proc. of IEEE International symposium on ISPLC 2008, pp. 187-192, 2008.

David J. Love et al., "Limited Feedback Unitary Precoding for Spatial Multiplexing Systems", IEEE Transactions on Information Theory, vol. 51, No. 8, pp. 2967-2976, Aug. 2005.

"Frame structure channel coding and modulation for a second generation digital terrestrial television broadcasting system (DVB-T2)", DVB Document A122, pp. 1-158, Jun. 2008.

Lorenzo Vangelista et al., "Key Technologies for Next-Generation Terrestrial Digital Television Standard DVB-T2", IEEE Communications Magazine, vol. 47, No. 10, pp. 146-153, Oct. 2009.

Takeo Ohgane et al., "Applications of Space Division Multiplexing and Those Performance in a MIMO Channel", IEICE Trans. Commun., vol. E88-B, No. 5, pp. 1843-1851, May 2005.

R. G. Gallager, "Low-Density Parity-Check Codes", IRE Transactions on Information Theory, IT-8, pp. 21-28, 1962.

David J. C. Mackay, "Good Error-Correcting Codes Based on Very Sparse Matrices", IEEE Transactions on Information Theory, vol. 45, No. 2, pp. 399-431, Mar. 1999.

ETSI EN 302 307, "Digital Video Broadcasting (DVB); Second generation framing structure, channel coding and modulation systems for Broadcasting, Interactive Services, News Gathering and other broadband satellite applications", v.1.1.2, Jun. 2006.

Yeong-Luh Ueng et al., "A Fast-Convergence Decoding Method and Memory-Efficient VLSI Decoder Architecture for Irregular LDPC Codes in the IEEE 802.16e Standards", IEEE VTC—2007, pp. 1255-1259, Aug. 2007.

Extended European Search Report dated May 22, 2015 in corresponding European Application No. 11847490.7.

Office Action dated Jun. 30, 2015 in corresponding Chinese Application No. 201180034677.1 (with English translation of Search Report).

Kobayashi, K. et al., "MIMO System with Relative Phase Difference Time-Shift Modulation for Rician Fading Environment", IEICE Transactions on Communications, Communications Society, Tokyo, JP, vol. E91-B, No. 2, Feb. 1, 2008 (Feb. 1, 2008), pp. 459-465, XP001511247, ISSN: 0916-8516, DOI: 10.1093/IETCOM/E91-B.2.459.

Kobayashi, K. et al., "MIMO System with Relative Phase Difference time-Shift Modulation in Rician Fading Environments", IEEE International Conference on Communications, 2008 : ICC '08; May

(56) References Cited

OTHER PUBLICATIONS 19-23, 2008, Beijing, China, IEEE, Piscataway, NJ, USA, May 19, 2008 (May 19, 2008), pp. 732-736, XP031265464, ISBN: 978-1-4244-2075-9.

Office Action dated Sep. 18, 2015 in corresponding Taiwanese Patent Application No. 100145569 (with partial English translation).

Office Action dated Jul. 21, 2017 in corresponding Mexican Application No. MX/a/2014/015106 (with English translation).

Office Action dated Mar. 22, 2018 in Chinese Application No. 201610182008.3, with partial English Translation.

Office Action dated May 15, 2018 in Chinese Application No. 201610183088.4, with Partial English Translation.

Examination Report dated Nov. 8, 2019 in corresponding Indian Patent Application No. 999/DELNP/2013.

* cited by examiner

FIG. 6
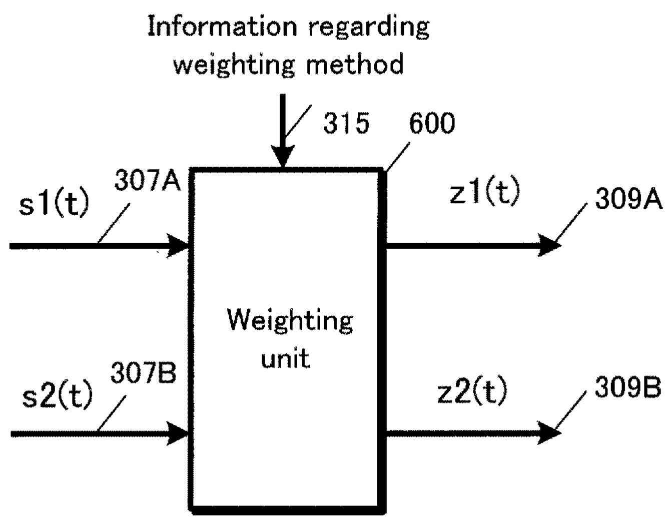
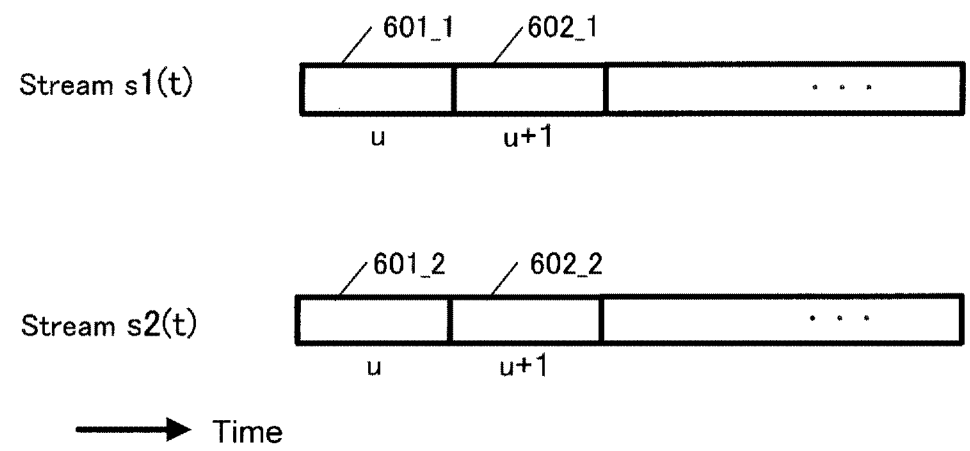
time 4i
$$W(4i)=\frac{1}{\sqrt{2}}\begin{pmatrix} e^{j0} & e^{j0} \\ e^{j0} & e^{j\frac{3}{4}\pi} \end{pmatrix}$$
time 4i+1
$$W(4i+1)=\frac{1}{\sqrt{2}}\begin{pmatrix} e^{j0} & e^{j0} \\ e^{j\frac{3}{4}\pi} & e^{j0} \end{pmatrix}$$
time 4i+2
$$W(4i+2)=\frac{1}{\sqrt{2}}\begin{pmatrix} e^{j0} & e^{j\frac{3}{4}\pi} \\ e^{j0} & e^{j0} \end{pmatrix}$$
time 4i+3
$$W(4i+3)=\frac{1}{\sqrt{2}}\begin{pmatrix} e^{j\frac{3}{4}\pi} & e^{j0} \\ e^{j0} & e^{j0} \end{pmatrix}$$

○ : Poor reception point for s1

□ : Poor reception point for s2

FIG. 49

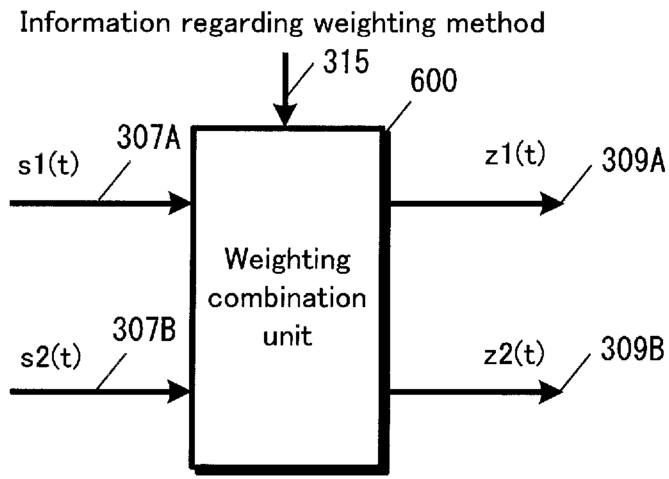

Method #1:

$$\begin{pmatrix} z1(t) \\ z2(t) \end{pmatrix} = \begin{pmatrix} e^{j0} & 0 \\ 0 & e^{j0} \end{pmatrix} \begin{pmatrix} s1(t) \\ s2(t) \end{pmatrix} = \begin{pmatrix} 1 & 0 \\ 0 & 1 \end{pmatrix} \begin{pmatrix} s1(t) \\ s2(t) \end{pmatrix}$$

Different expression $$\begin{pmatrix} z1(t) \\ z2(t) \end{pmatrix} = \frac{1}{\sqrt{2}} \begin{pmatrix} e^{j0} & 0 \\ 0 & e^{j0} \end{pmatrix} \begin{pmatrix} s1(t) \\ s2(t) \end{pmatrix} = \frac{1}{\sqrt{2}} \begin{pmatrix} 1 & 0 \\ 0 & 1 \end{pmatrix} \begin{pmatrix} s1(t) \\ s2(t) \end{pmatrix}$$

Method #2:

$$\begin{pmatrix} z1(t) \\ z2(t) \end{pmatrix} = \frac{1}{\sqrt{\alpha^2 + 1}} \begin{pmatrix} e^{j\theta_{11}(i)} & \alpha \times e^{j(\theta_{11}(i) + \lambda)} \\ \alpha \times e^{j\theta_{21}(i)} & e^{j(\theta_{21}(i) + \lambda + \delta)} \end{pmatrix} \begin{pmatrix} s1(t) \\ s2(t) \end{pmatrix}$$

Stream s1
Time
time $K
time $2
time $1
carrier 1
carrier H
Frequency

Stream s2
5500 Control information signal
5501 Individual control information symbol
5502 Data symbol
5503 Pilot symbol Modulated signal z1

Modulated signal z2

Modulated signal z1

Modulated signal z2

Modulated signal z1

Modulated signal z2

Modulated signal z1

Modulated signal z2

FIG. 86

| |
|---|
| |
| Video stream (PID=0x1011 primary video) |
| |
| Audio stream (PID=0x1100) |
| |
| Audio stream (PID=0x1101) |
| |
| Presentation graphics stream (PID=0x1200) |
| |
| Presentation graphics stream (PID=0x1201) |
| |
| Interactive graphics stream (PID=0x1400) |
| |
| Video stream (PID=0x1B00 secondary video) |
| |
| Video stream (PID=0x1B01 secondary video) |
| |

FIG. 110

Cycle of precoding matrices: 3

| s1(t) | QPSK | QPSK | QPSK | 16QAM | 16QAM | 16QAM | QPSK | QPSK | QPSK | 16QAM | 16QAM | 16QAM | ... |
|---|---|---|---|---|---|---|---|---|---|---|---|---|---|
| s2(t) | 16QAM | 16QAM | 16QAM | QPSK | QPSK | QPSK | 16QAM | 16QAM | 16QAM | QPSK | QPSK | QPSK | ... |
| Power change unit (10701A) | v=a | v=a | v=a | v=b | v=b | v=b | v=a | v=a | v=a | v=b | v=b | v=b | ... |
| Power change unit (10701B) | u=b | u=b | u=b | u=a | u=a | u=a | u=b | u=b | u=b | u=a | u=a | u=a | ... |
| Precoding matrix | F[0] | F[1] | F[2] | F[0] | F[1] | F[2] | F[0] | F[1] | F[2] | F[0] | F[1] | F[2] | ... |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | ... |

Cycle of precoding matrices: 6=3 × 2
(when taking precoding matrices and switching between modulation schemes into consideration)

FIG. 111

Cycle of precoding matrices: 3

| s1(t) | QPSK | 16QAM | QPSK | 16QAM | QPSK | 16QAM | QPSK | 16QAM | QPSK | 16QAM | QPSK | 16QAM | ... |
|---|---|---|---|---|---|---|---|---|---|---|---|---|---|
| s2(t) | 16QAM | QPSK | 16QAM | QPSK | 16QAM | QPSK | 16QAM | QPSK | 16QAM | QPSK | 16QAM | QPSK | ... |
| Power change unit (10701A) | v=a | v=b | v=a | v=b | v=a | v=b | v=a | v=b | v=a | v=b | v=a | v=b | ... |
| Power change unit (10701B) | u=b | u=a | u=b | u=a | u=b | u=a | u=b | u=a | u=b | u=a | u=b | u=a | ... |
| Precoding matrix | F[0] | F[1] | F[2] | F[0] | F[1] | F[2] | F[0] | F[1] | F[2] | F[0] | F[1] | F[2] | ... |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | .. |

Cycle of precoding matrices: 6=3 × 2
(when taking precoding matrices and switching
between modulation schemes into consideration)

FIG. 114

Cycle of precoding matrices: 3

| | | | | | | | | | | | | | |
|---|---|---|---|---|---|---|---|---|---|---|---|---|---|
| s1(t) | QPSK | | | | | | | | | | | | … |
| s2(t) | 16QAM | | | | | | | | | | | | … |
| Ω1(t) | QPSK | QPSK | QPSK | 16QAM | 16QAM | 16QAM | QPSK | QPSK | QPSK | 16QAM | 16QAM | 16QAM | … |
| Ω2(t) | 16QAM | 16QAM | 16QAM | QPSK | QPSK | QPSK | 16QAM | 16QAM | 16QAM | QPSK | QPSK | QPSK | … |
| Power change unit (10701A) | v=a | v=a | v=a | v=b | v=b | v=b | v=a | v=a | v=a | v=b | v=b | v=b | … |
| Power change unit (10701B) | u=b | u=b | u=b | u=a | u=a | u=a | u=b | u=b | u=b | u=a | u=a | u=a | … |
| Precoding matrix | F[0] | F[1] | F[2] | F[0] | F[1] | F[2] | F[0] | F[1] | F[2] | F[0] | F[1] | F[2] | … |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | … |

Cycle of precoding matrices: 6=3×2
(when taking precoding matrices and switching
between modulation schemes into consideration)

FIG. 115

Cycle of precoding matrices: 3

| | | | | | | | | | | | | | |
|---|---|---|---|---|---|---|---|---|---|---|---|---|---|
| s1(t) | QPSK | | | | | | | | | | | | ... |
| s2(t) | 16QAM | | | | | | | | | | | | ... |
| Ω1(t) | QPSK | 16QAM | QPSK | 16QAM | QPSK | 16QAM | QPSK | 16QAM | QPSK | 16QAM | QPSK | 16QAM | ... |
| Ω2(t) | 16QAM | QPSK | 16QAM | QPSK | 16QAM | QPSK | 16QAM | QPSK | 16QAM | QPSK | 16QAM | QPSK | ... |
| Power change unit (10701A) | v=a | v=b | v=a | v=b | v=a | v=b | v=a | v=b | v=a | v=b | v=a | v=b | ... |
| Power change unit (10701B) | u=b | u=a | u=b | u=a | u=b | u=a | u=b | u=a | u=b | u=a | u=b | u=a | ... |
| Precoding matrix | F[0] | F[1] | F[2] | F[0] | F[1] | F[2] | F[0] | F[1] | F[2] | F[0] | F[1] | F[2] | ... |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | ... |

Cycle of precoding matrices: 6=3×2
(when taking precoding matrices and switching between modulation schemes into consideration)

BROADCAST SIGNAL TRANSMISSION METHOD, BROADCAST SIGNAL TRANSMISSION APPARATUS, BROADCAST SIGNAL RECEPTION METHOD, AND BROADCAST SIGNAL RECEPTION APPARATUS

TECHNICAL FIELD

This application is based on applications No. 2010-276457, No. 2010-293114, No. 2011-035085, No. 2011-093543, No. 2011-102098, and No. 2011-140746 filed in Japan, the contents of which are hereby incorporated by reference.

The present invention relates to a precoding scheme, a precoding device, a transmission scheme, a transmission device, a reception scheme, and a reception device that in particular perform communication using a multi-antenna.

BACKGROUND ART

Multiple-Input Multiple-Output (MIMO) is a conventional example of a communication scheme using a multi-antenna. In multi-antenna communication, of which MIMO is representative, multiple transmission signals are each modulated, and each modulated signal is transmitted from a different antenna simultaneously in order to increase the transmission speed of data.

FIG. 28 shows an example of the structure of a transmission and reception device when the number of transmit antennas is two, the number of receive antennas is two, and the number of modulated signals for transmission (transmission streams) is two. In the transmission device, encoded data is interleaved, the interleaved data is modulated, and frequency conversion and the like is performed to generate transmission signals, and the transmission signals are transmitted from antennas. In this case, the scheme for simultaneously transmitting different modulated signals from different transmit antennas at the same time and at the same frequency is a spatial multiplexing MIMO system.

In this context, it has been suggested in Patent Literature 1 to use a transmission device provided with a different interleave pattern for each transmit antenna. In other words, the transmission device in FIG. 28 would have two different interleave patterns with respective interleaves ($\pi a$, $\pi b$). As shown in Non-Patent Literature 1 and Non-Patent Literature 2, reception quality is improved in the reception device by iterative performance of a detection scheme that uses soft values (the MIMO detector in FIG. 28).

Models of actual propagation environments in wireless communications include non-line of sight (NLOS), of which a Rayleigh fading environment is representative, and line of sight (LOS), of which a Rician fading environment is representative. When the transmission device transmits a single modulated signal, and the reception device performs maximal ratio combining on the signals received by a plurality of antennas and then demodulates and decodes the signal resulting from maximal ratio combining, excellent reception quality can be achieved in an LOS environment, in particular in an environment where the Rician factor is large, which indicates the ratio of the received power of direct waves versus the received power of scattered waves. However, depending on the transmission system (for example, spatial multiplexing MIMO system), a problem occurs in that the reception quality deteriorates as the Rician factor increases (see Non-Patent Literature 3).

FIGS. 29A and 29B show an example of simulation results of the Bit Error Rate (BER) characteristics (vertical axis: BER, horizontal axis: signal-to-noise power ratio (SNR)) for data encoded with low-density parity-check (LDPC) code and transmitted over a 2×2 (two transmit antennas, two receive antennas) spatial multiplexing MIMO system in a Rayleigh fading environment and in a Rician fading environment with Rician factors of K=3, 10, and 16 dB. FIG. 29A shows the BER characteristics of Max-log A Posteriori Probability (APP) without iterative detection (see Non-Patent Literature 1 and Non-Patent Literature 2), and FIG. 29B shows the BER characteristics of Max-log-APP with iterative detection (see Non-Patent Literature 1 and Non-Patent Literature 2) (number of iterations: five). As is clear from FIGS. 29A and 29B, regardless of whether iterative detection is performed, reception quality degrades in the spatial multiplexing MIMO system as the Rician factor increases. It is thus clear that the unique problem of "degradation of reception quality upon stabilization of the propagation environment in the spatial multiplexing MIMO system", which does not exist in a conventional single modulation signal transmission system, occurs in the spatial multiplexing MIMO system.

Broadcast or multicast communication is a service directed towards line-of-sight users. The radio wave propagation environment between the broadcasting station and the reception devices belonging to the users is often an LOS environment. When using a spatial multiplexing MIMO system having the above problem for broadcast or multicast communication, a situation may occur in which the received electric field strength is high at the reception device, but degradation in reception quality makes it impossible to receive the service. In other words, in order to use a spatial multiplexing MIMO system in broadcast or multicast communication in both an NLOS environment and an LOS environment, there is a desire for development of a MIMO system that offers a certain degree of reception quality.

Non-Patent Literature 8 describes a scheme to select a codebook used in precoding (i.e. a precoding matrix, also referred to as a precoding weight matrix) based on feedback information from a communication partner. Non-Patent Literature 8 does not at all disclose, however, a scheme for precoding in an environment in which feedback information cannot be acquired from the communication partner, such as in the above broadcast or multicast communication.

On the other hand, Non-Patent Literature 4 discloses a scheme for hopping the precoding matrix over time. This scheme can be applied even when no feedback information is available. Non-Patent Literature 4 discloses using a unitary matrix as the matrix for precoding and hopping the unitary matrix at random but does not at all disclose a scheme applicable to degradation of reception quality in the above-described LOS environment. Non-Patent Literature 4 simply recites hopping between precoding matrices at random. Obviously, Non-Patent Literature 4 makes no mention whatsoever of a precoding scheme, or a structure of a precoding matrix, for remedying degradation of reception quality in an LOS environment.

CITATION LIST

Patent Literature

Patent Literature 1: WO 2005/050885

Non-Patent Literature

Non-Patent Literature 1: "Achieving near-capacity on a multiple-antenna channel", IEEE Transaction on Communications, vol. 51, no. 3, pp. 389-399, March 2003.

Non-Patent Literature 2: "Performance analysis and design optimization of LDPC-coded MIMO OFDM systems", IEEE Trans. Signal Processing, vol. 52, no. 2, pp. 348-361, February 2004.

Non-Patent Literature 3: "BER performance evaluation in 2×2 MIMO spatial multiplexing systems under Rician fading channels", IEICE Trans. Fundamentals, vol. E91-A, no. 10, pp. 2798-2807, October 2008.

Non-Patent Literature 4: "Turbo space-time codes with time varying linear transformations", IEEE Trans. Wireless communications, vol. 6, no. 2, pp. 486-493, February 2007.

Non-Patent Literature 5: "Likelihood function for QR-MLD suitable for soft-decision turbo decoding and its performance", IEICE Trans. Commun., vol. E88-B, no. 1, pp. 47-57, January 2004.

Non-Patent Literature 6: "A tutorial on 'parallel concatenated (Turbo) coding', 'Turbo (iterative) decoding' and related topics", The Institute of Electronics, Information, and Communication Engineers, Technical Report IT 98-51.

Non-Patent Literature 7: "Advanced signal processing for PLCs: Wavelet-OFDM", Proc. of IEEE International symposium on ISPLC 2008, pp. 187-192, 2008.

Non-Patent Literature 8: D. J. Love, and R. W. Heath, Jr., "Limited feedback unitary precoding for spatial multiplexing systems", IEEE Trans. Inf. Theory, vol. 51, no. 8, pp. 2967-2976, August 2005.

Non-Patent Literature 9: DVB Document A122, Framing structure, channel coding and modulation for a second generation digital terrestrial television broadcasting system, (DVB-T2), June 2008.

Non-Patent Literature 10: L. Vangelista, N. Benvenuto, and S. Tomasin, "Key technologies for next-generation terrestrial digital television standard DVB-T2", IEEE Commun. Magazine, vol. 47, no. 10, pp. 146-153, October 2009.

Non-Patent Literature 11: T. Ohgane, T. Nishimura, and Y. Ogawa, "Application of space division multiplexing and those performance in a MIMO channel", IEICE Trans. Commun., vol. 88-B, no. 5, pp. 1843-1851, May 2005.

Non-Patent Literature 12: R. G. Gallager, "Low-density parity-check codes", IRE Trans. Inform. Theory, IT-8, pp. 21-28, 1962.

Non-Patent Literature 13: D. J. C. Mackay, "Good error-correcting codes based on very sparse matrices", IEEE Trans. Inform. Theory, vol. 45, no. 2, pp. 399-431, March 1999.

Non-Patent Literature 14: ETSI EN 302 307, "Second generation framing structure, channel coding and modulation systems for broadcasting, interactive services, news gathering and other broadband satellite applications", v. 1.1.2, June 2006.

Non-Patent Literature 15: Y.-L. Ueng, and C.-C. Cheng, "A fast-convergence decoding method and memory-efficient VLSI decoder architecture for irregular LDPC codes in the IEEE 802.16e standards", IEEE VTC-2007 Fall, pp. 1255-1259.

SUMMARY OF INVENTION

Technical Problem

It is an object of the present invention to provide a MIMO system that improves reception quality in an LOS environment.

Solution to Problem

To solve the above problem, the present invention provides a precoding method for generating, from a plurality of signals which are based on a selected modulation scheme and represented by in-phase components and quadrature components, a plurality of precoded signals that are transmitted in the same frequency bandwidth at the same time and transmitting the generated precoded signals, the precoding method comprising: selecting one precoding weight matrix from among a plurality of precoding weight matrices by regularly hopping between the matrices; and generating the plurality of precoded signals by multiplying the selected precoding weight matrix by the plurality of signals which are based on the selected modulation scheme, the plurality of precoding weight matrices being nine matrices expressed, using a positive real number $\alpha$, as Equations 339 through 347 (details are described below).

According to each aspect of the above invention, precoded signals, which are generated by precoding signals by using one precoding weight matrix selected from among a plurality of precoding weight matrices by regularly hopping between the matrices, are transmitted and received. Thus the precoding weight matrix used in the precoding is any of a plurality of precoding weight matrices that have been predetermined. This makes it possible to improve the reception quality in an LOS environment based on the design of the plurality of precoding weight matrices.

Advantageous Effects of Invention

With the above structure, the present invention provides a precoding method, a precoding device, a transmission method, a reception method, a transmission device, and a reception device that remedy degradation of reception quality in an LOS environment, thereby providing high-quality service to LOS users during broadcast or multicast communication.

BRIEF DESCRIPTION OF DRAWINGS

FIG. 6 is an example of a scheme of hopping between precoding weights.

FIG. 49 shows a signal processing scheme.

FIG. 86 shows the structure of multiplexed data.

FIG. 110 shows a chart pertaining to the precoding matrices.

FIG. 111 shows a chart pertaining to the precoding matrices.

FIG. 114 shows a chart pertaining to the precoding matrices.

FIG. 115 shows a chart pertaining to the precoding matrices.

FIG. 120 is an example of a structure of a signal generating unit.

FIG. 121 shows in-phase components and quadrature components of baseband signals.

FIG. 122 is an example of a structure of the signal generating unit.

FIG. 123 is an example of a structure of the signal generating unit.

FIG. 124 shows in-phase components and quadrature components of baseband signals.

FIG. 125 is an example of a structure of the signal generating unit.

FIG. 126 is an example of a structure of the signal generating unit.

DESCRIPTION OF EMBODIMENTS

The following describes embodiments of the present invention with reference to the drawings.

Embodiment 1

The following describes the transmission scheme, transmission device, reception scheme, and reception device of the present embodiment.

Prior to describing the present embodiment, an overview is provided of a transmission scheme and decoding scheme in a conventional spatial multiplexing MIMO system.

Figure 1:
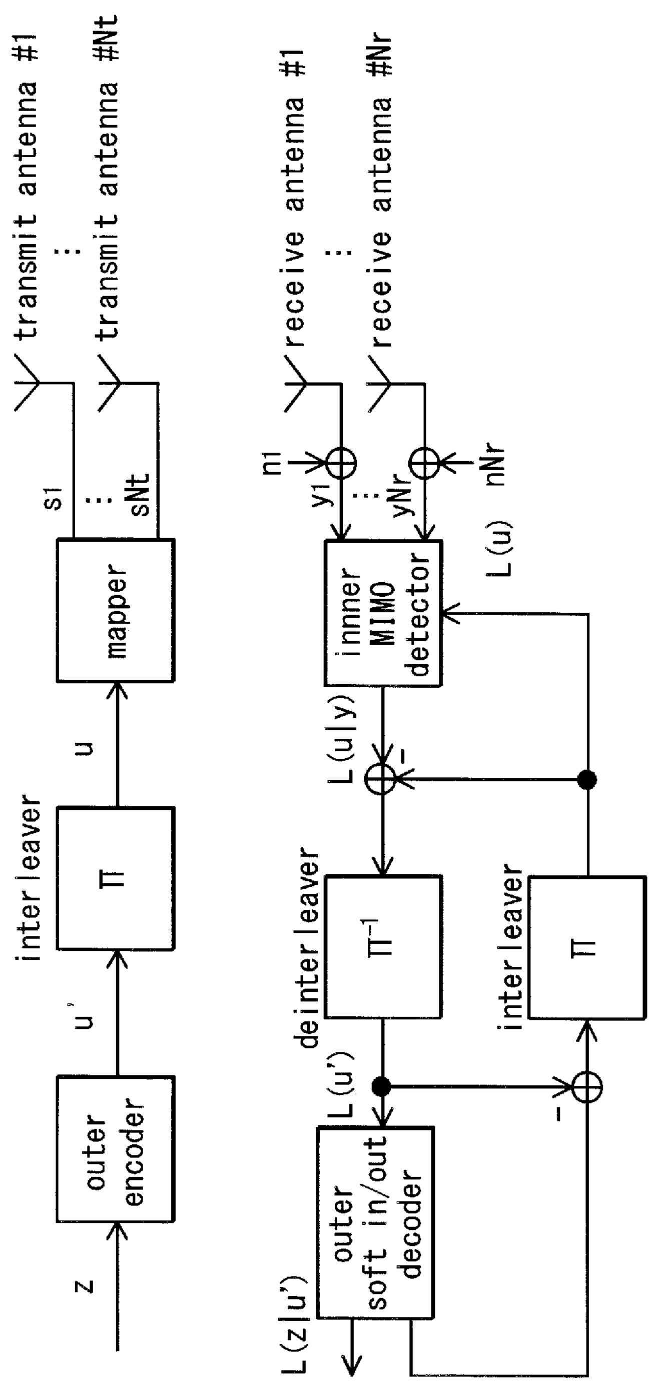
FIG. 1 is an example of the structure of a transmission device and a reception device in a spatial multiplexing MIMO system.

FIG. 1 shows the structure of an $N_t \times N_r$ spatial multiplexing MIMO system. An information vector z is encoded and interleaved. As output of the interleaving, an encoded bit vector $u=(u_1, \ldots, u_{Nt})$ is acquired. Note that $u_i=(u_{i1}, \ldots, u_{iM})$ (where M is the number of transmission bits per symbol). Letting the transmission vector $s=(s_1, \ldots, s_{Nt})^T$ and the transmission signal from transmit antenna #1 be represented as $s_i=\text{map}(u_i)$, the normalized transmission energy is represented as $E\{|s_i|^2\}=Es/Nt$ ($E_s$ being the total energy per channel). Furthermore, letting the received vector be $y=y_1, \ldots, y_{Nr})^T$, the received vector is represented as in Equation 1.

Math 1

$$\begin{aligned} y &= (y_1, \cdots, y_{Nr})^T \\ &= H_{NtNr}s + n \end{aligned} \quad \text{Equation 1}$$

In this Equation, $H_{NtNr}$ is the channel matrix, $n=(n_1, \ldots, n_{Nr})^T$ is the noise vector, and $n_i$ is the i.i.d. complex Gaussian random noise with an average value 0 and variance $\sigma^2$. From the relationship between transmission symbols and reception symbols that is induced at the reception device, the probability for the received vector may be provided as a multi-dimensional Gaussian distribution, as in Equation 2.

Math 2

$$p(y \mid u) = \frac{1}{(2\pi\sigma^2)^{N_r}} \exp\left(-\frac{1}{2\sigma^2}\|y - Hs(u)\|^2\right) \quad \text{Equation 2}$$

Here, a reception device that performs iterative decoding composed of an outer soft-in/soft-out decoder and a MIMO detector, as in FIG. 1, is considered. The vector of a log-likelihood ratio (L-value) in FIG. 1 is represented as in Equations 3-5.

Math 3

$$L(u)=(L(u_1), \ldots, L(u_{N_t}))^T \quad \text{Equation 3}$$

Math 4

$$L(u_i)=(L(u_{i1}), \ldots, L(u_{iM})) \quad \text{Equation 4}$$

Math 5

$$L(u_{ij}) = \ln\frac{P(u_{ij} = +1)}{P(u_{ij} = -1)} \quad \text{Equation 5}$$

<Iterative Detection Scheme>

The following describes iterative detection of MIMO signals in the $N_t \times N_r$ spatial multiplexing MIMO system.

The log-likelihood ratio of $u_{mn}$ is defined as in Equation 6.

Math 6

$$L(u_{mn}\mid y)=\ln\frac{P(u_{mn}=+1\mid y)}{P(u_{mn}=-1\mid y)}\qquad\text{Equation 6}$$

From Bayes' theorem, Equation 6 can be expressed as Equation 7.

Math 7

$$\begin{aligned}L(u_{mn}\mid y)&=\ln\frac{P(y\mid u_{mn}=+1)P(u_{mn}=+1)/p(y)}{p(y\mid u_{mn}=-1)P(u_{mn}=-1)/p(y)}\\&=\ln\frac{P(u_{mn}=+1)}{P(u_{mn}=-1)}+\ln\frac{p(y\mid u_{mn}=+1)}{p(y\mid u_{mn}=-1)}\\&=\ln\frac{P(u_{mn}=+1)}{P(u_{mn}=-1)}+\ln\frac{\sum_{U_{mn,+1}}p(y\mid u)p(u\mid u_{mn})}{\sum_{U_{mn,-1}}p(y\mid u)p(u\mid u_{mn})}\end{aligned}\qquad\text{Equation 7}$$

Let $U_{mn,\pm1}=\{u|u_{mn}=\pm1\}$. When approximating $\ln\Sigma a_j\sim\max\ln a_j$, an approximation of Equation 7 can be sought as Equation 8. Note that the above symbol "~" indicates approximation.

Math 8

$$\begin{aligned}L(u_{mn}\mid y)\approx\ln\frac{P(u_{mn}=+1)}{P(u_{mn}=-1)}&+\max_{Umn,+1}\{\ln p(y\mid u)+P(u\mid u_{mn})\}-\\&\max_{Umn,-1}\{\ln p(y\mid u)+P(u\mid u_{mn})\}\end{aligned}\qquad\text{Equation 8}$$

$P(u|u_{mn})$ and $\ln P(u|u_{mn})$ in Equation 8 are represented as follows.

Math 9

$$P(u\mid u_{mn})=\prod_{(ij)\neq(mn)}P(u_{ij})=\prod_{(ij)\neq(mn)}\frac{\exp\left(\frac{u_{ij}L(u_{ij})}{2}\right)}{\exp\left(\frac{L(u_{ij})}{2}\right)+\exp\left(-\frac{L(u_{ij})}{2}\right)}\qquad\text{Equation 9}$$

Math 10

$$\ln P(u\mid u_{mn})=\left(\sum_{ij}\ln P(u_{ij})\right)-\ln P(u_{mn})\qquad\text{Equation 10}$$

Math 11

$$\begin{aligned}\ln P(u_{ij})&=\frac{1}{2}u_{ij}P(u_{ij})-\ln\left(\exp\left(\frac{L(u_{ij})}{2}\right)+\exp\left(-\frac{L(u_{ij})}{2}\right)\right)\\&\approx\frac{1}{2}u_{ij}L(u_{ij})-\frac{1}{2}|L(u_{ij})|\quad\text{for }|L(u_{ij})|>2\\&=\left|\frac{L(u_{ij})}{2}\right|(u_{ij}\mathrm{sign}(L(u_{ij}))-1)\end{aligned}\qquad\text{Equation 11}$$

Incidentally, the logarithmic probability of the equation defined in Equation 2 is represented in Equation 12.

Math 12

$$\ln P(y\mid u)=-\frac{N_r}{2}\ln(2\pi\sigma^2)-\frac{1}{2\sigma^2}\|y-Hs(u)\|^2\qquad\text{Equation 12}$$

Accordingly, from Equations 7 and 13, in MAP or A Posteriori Probability (APP), the a posteriori L-value is represented as follows.

Math 13

$$L(u_{mn}\mid y)=\ln\frac{\sum_{U_{mn,+1}}\exp\left\{-\frac{1}{2\sigma^2}\|y-Hs(u)\|^2+\sum_{ij}\ln P(u_{ij})\right\}}{\sum_{U_{mn,-1}}\exp\left\{-\frac{1}{2\sigma^2}\|y-Hs(u)\|^2+\sum_{ij}\ln P(u_{ij})\right\}}\qquad\text{Equation 13}$$

Hereinafter, this is referred to as iterative APP decoding. From Equations 8 and 12, in the log-likelihood ratio utilizing Max-Log approximation (Max-Log APP), the a posteriori L-value is represented as follows.

Math 14

$$L(u_{mn}\mid y)\approx\max_{Umn,+1}\{\Psi(u,y,L(u))\}-\max_{Umn,-1}\{\Psi(u,y,L(u))\}\qquad\text{Equation 14}$$

Math 15

$$\Psi(u,y,L(u))=-\frac{1}{2\sigma^2}\|y-Hs(u)\|^2+\sum_{ij}\ln P(u_{ij})\qquad\text{Equation 15}$$

Hereinafter, this is referred to as iterative Max-log APP decoding. The extrinsic information required in an iterative decoding system can be sought by subtracting prior inputs from Equations 13 and 14.

<System Model>

Figure 28:
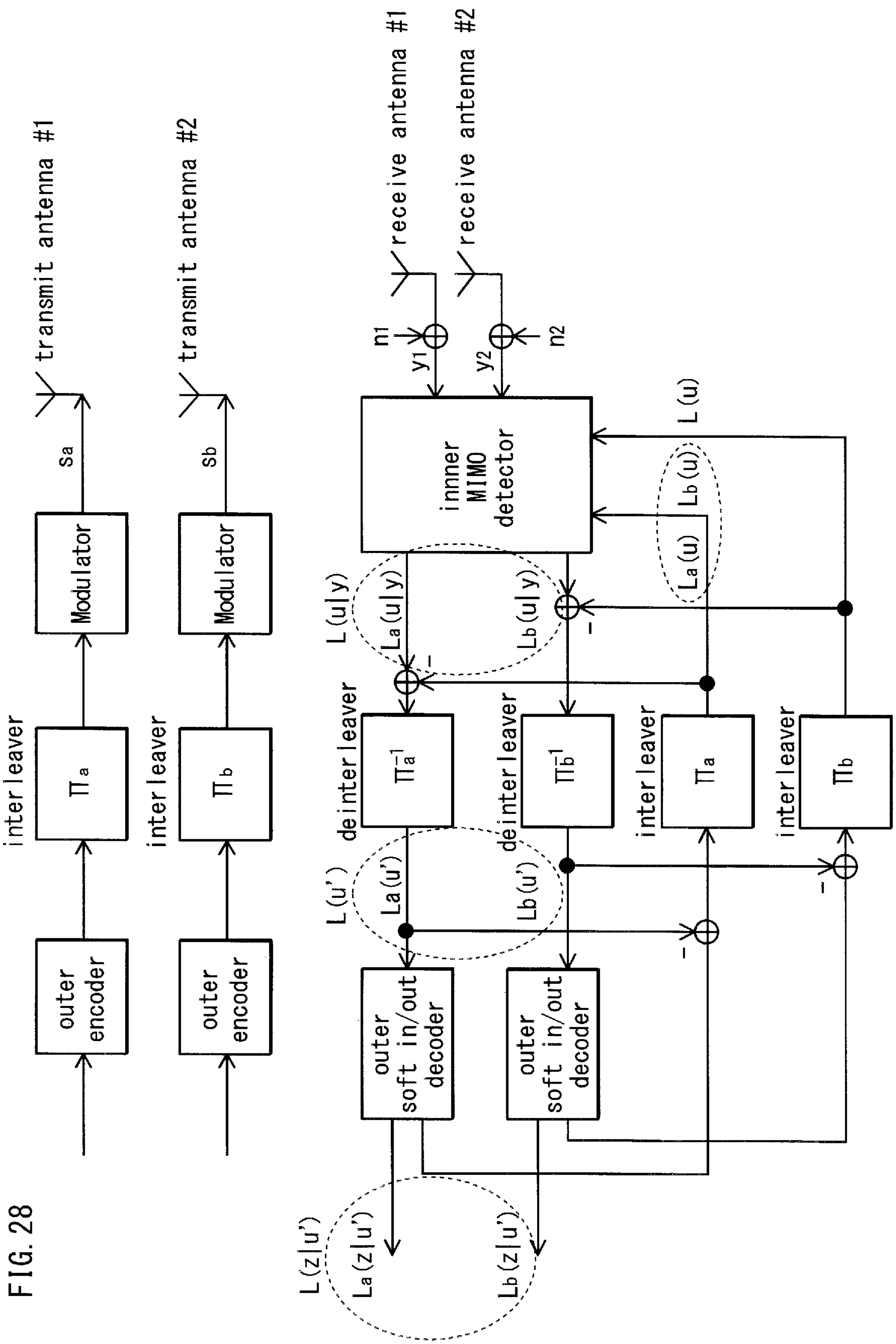
FIG. 28 is an example of the structure of a transmission device and a reception device in a spatial multiplexing MIMO system.

FIG. 28 shows the basic structure of the system that is related to the subsequent description. This system is a 2×2 spatial multiplexing MIMO system. There is an outer encoder for each of streams A and B. The two outer encoders are identical LDPC encoders. (Here, a structure using LDPC encoders as the outer encoders is described as an example, but the error correction coding used by the outer encoder is not limited to LDPC coding. The present invention may similarly be embodied using other error correction coding such as turbo coding, convolutional coding, LDPC convolutional coding, and the like. Furthermore, each outer encoder is described as having a transmit antenna, but the outer encoders are not limited to this structure. A plurality of transmit antennas may be used, and the number of outer encoders may be one. Also, a greater number of outer encoders may be used than the number of transmit antennas.) The streams A and B respectively have interleavers ($\pi_a$, $\pi_b$). Here, the modulation scheme is $2^h$-QAM (with h bits transmitted in one symbol).

The reception device performs iterative detection on the above MIMO signals (iterative APP (or iterative Max-log APP) decoding). Decoding of LDPC codes is performed by, for example, sum-product decoding.

Figure 2:
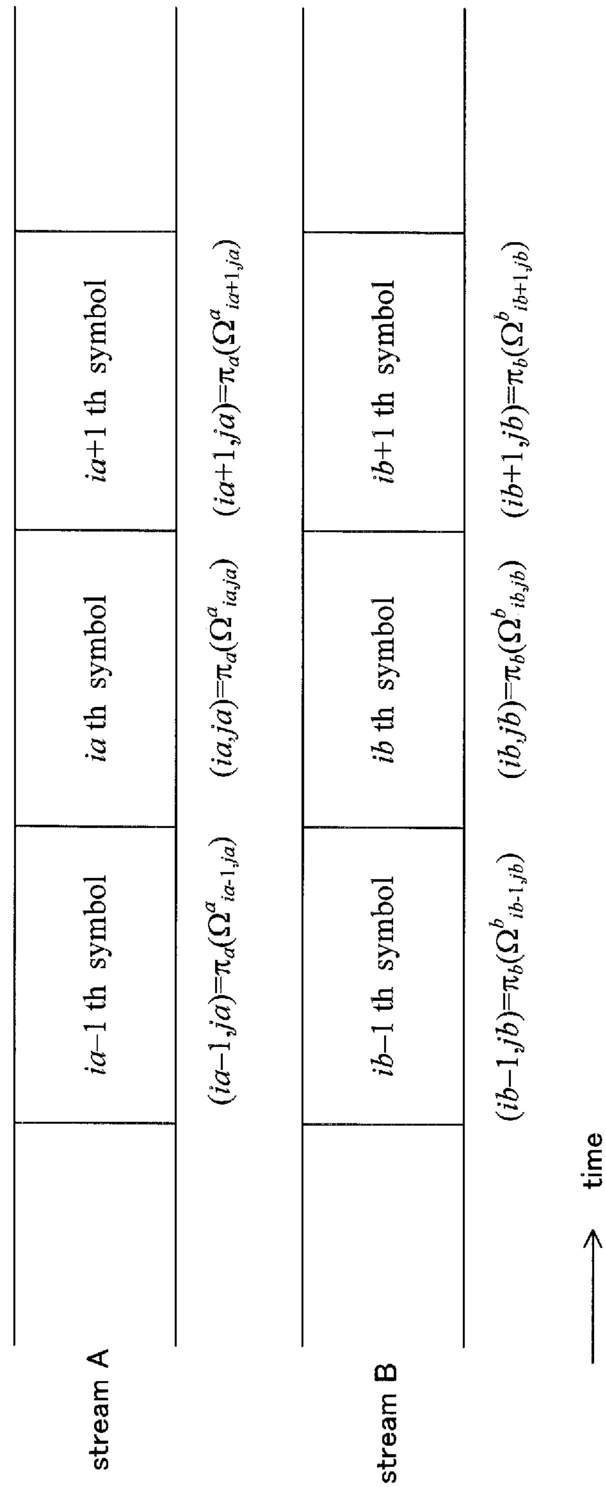
FIG. 2 is an example of a frame structure.

FIG. 2 shows a frame structure and lists the order of symbols after interleaving. In this case, $(i_a, j_a)$, $(i_b, j_b)$ are represented by the following Equations.

Math 16

$$(i_a, j_a) = \pi_a(\Omega_{ia,ja}^{a}) \quad \text{Equation 16}$$

Math 17

$$(i_b, j_b) = \pi_b(\Omega_{ib,jb}^{a}) \quad \text{Equation 17}$$

In this case, $i^a$, $i^b$ indicate the order of symbols after interleaving, $j^a$, $j^b$ indicate the bit positions ($j^a$, $j^b$=1, . . . , h) in the modulation scheme, $\pi^a$, $\pi^b$ indicate the interleavers for the streams A and B, and $\Omega_{ia,ja}^{a}$, $\Omega_{ib,jb}^{b}$ indicate the order of data in streams A and B before interleaving. Note that FIG. 2 shows the frame structure for $i_a = i_b$.

<Iterative Decoding>

The following is a detailed description of the algorithms for sum-product decoding used in decoding of LDPC codes and for iterative detection of MIMO signals in the reception device.

Sum-Product Decoding

Let a two-dimensional M×N matrix H={$H_{mn}$} be the check matrix for LDPC codes that are targeted for decoding. Subsets A(m), B(n) of the set [1, N]={1, 2, . . . , N} are defined by the following Equations.

Math 18

$$A(m) \equiv \{n : H_{mn} = 1\} \quad \text{Equation 18}$$

Math 19

$$B(n) \equiv \{m : H_{mn} = 1\} \quad \text{Equation 19}$$

In these Equations, A(m) represents the set of column indices of 1's in the $m^{th}$ column of the check matrix H, and B(n) represents the set of row indices of 1's in the $n^{th}$ row of the check matrix H. The algorithm for sum-product decoding is as follows.

Step A•1 (initialization): let a priori value log-likelihood ratio $\beta_{mn}$=0 for all combinations (m, n) satisfying $H_{mn}$=1. Assume that the loop variable (the number of iterations) $l_{sum}$=1 and the maximum number of loops is set to $l_{sum\ max}$.

Step A•2 (row processing): the extrinsic value log-likelihood ratio $\alpha_{mn}$ is updated for all combinations (m, n) satisfying $H_{mn}$=1 in the order of m=1, 2, . . . , M, using the following updating Equations.

Math 20

$$\alpha_{mn} = \left(\prod_{n' \in A(m)\backslash n} \text{sign}(\lambda_{n'} + \beta_{mn'})\right) \times f\left(\sum_{n' \in A(m)\backslash n} f(\lambda_{n'} + \beta_{mn'})\right) \quad \text{Equation 20}$$

Math 21

$$\text{sign}(x) \equiv \begin{cases} 1 & x \geq 0 \\ -1 & x < 0 \end{cases} \quad \text{Equation 21}$$

Math 22

$$f(x) \equiv \ln\frac{\exp(x)+1}{\exp(x)-1} \quad \text{Equation 22}$$

In these Equations, f represents a Gallager function. Furthermore, the scheme of seeking $\lambda_n$ is described in detail later.

Step A•3 (column processing): the extrinsic value log-likelihood ratio $\beta_{mn}$ is updated for all combinations (m, n) satisfying $H_{mn}$=1 in the order of n=1, 2, . . . , N, using the following updating Equation.

Math 23

$$\beta_{mn} = \sum_{m' \in B(n)\backslash m} \alpha_{m'n} \quad \text{Equation 23}$$

Step A•4 (calculating a log-likelihood ratio): the log-likelihood ratio $L_n$ is sought for n∈[1, N] by the following Equation.

Math 24

$$L_n = \sum_{m' \in B(n)\backslash m} \alpha_{m'n} + \lambda_n \quad \text{Equation 24}$$

Step A•5 (count of the number of iterations): if $l_{sum} < l_{sum,\ max}$, then $l_{sum}$ is incremented, and processing returns to step A•2. If $l_{sum} = l_{sum,\ max}$, the sum-product decoding in this round is finished.

The operations in one sum-product decoding have been described. Subsequently, iterative MIMO signal detection is performed. In the variables m, n, $\alpha_{mn}$, $\beta_{mn}$, $\lambda_n$, and $L_n$, used in the above description of the operations of sum-product decoding, the variables in stream A are $m_a$, $n_a$, $\alpha^a_{mana}$, $\beta^a_{mana}$, $\lambda_{na}$, and $L_{na}$, and the variables in stream B are $m_b$, $n_b$, $a^b_{mbnb}$, $\beta^b_{mbnb}$, $\lambda_{nb}$, and $L_{nb}$.

<Iterative MIMO Signal Detection>

The following describes the scheme of seeking $\lambda_n$ in iterative MIMO signal detection in detail.

The following Equation holds from Equation 1.

Math 25

$$\begin{aligned} y(t) &= (y_1(t), y_2(t))^T \\ &= H_{22}(t)s(t) + n(t) \end{aligned} \quad \text{Equation 25}$$

The following Equations are defined from the frame structures of FIG. 2 and from Equations 16 and 17.

Math 26

$$n_a = \Omega_{ia,ja}^{a} \quad \text{Equation 26}$$

Math 27

$$n_b = \Omega_{ib,jb}^{b} \quad \text{Equation 27}$$

In this case, $n_a$, $n_b$∈[1, N]. Hereinafter, $\lambda_{na}$, $L_{na}$, $\lambda_{nb}$, and $L_{nb}$, where the number of iterations of iterative MIMO signal detection is k, are represented as $\lambda_{k,\ na}$, $L_{k,\ na}$, $\lambda_{k,\ nb}$, and $L_{k,\ nb}$.

Step B•1 (initial detection; k=0): $\lambda_{0,\ na}$ and $\lambda_{0,\ nb}$ are sought as follows in the case of initial detection.

In iterative APP decoding:

Math 28

$$\lambda_{0,n_X} = \ln\frac{\sum_{U_{0,n_X,+1}} \exp\left\{-\frac{1}{2\sigma^2}\|y(i_X) - H_{22}(i_X)s(u(i_X))\|^2\right\}}{\sum_{U_{0,n_X,-1}} \exp\left\{-\frac{1}{2\sigma^2}\|y(i_X) - H_{22}(i_X)s(u(i_X))\|^2\right\}} \quad \text{Equation 28}$$

In iterative Max-log APP decoding:

Math 29

$$\lambda_{0,n_X} = \max_{U_{0,n_X,+1}} \{\Psi(u(i_X), y(i_X))\} - \max_{U_{0,n_X,-1}} \{\Psi(u(i_X), y(i_X))\} \quad \text{Equation 29}$$

Math 30

$$\Psi(u(i_X), y(i_X)) = -\frac{1}{2\sigma^2}\|y(i_X) - H_{22}(i_X)s(u(i_X))\|^2 \quad \text{Equation 30}$$

Here, let X=a, b. Then, assume that the number of iterations of iterative MIMO signal detection is $l_{mimo}=0$ and the maximum number of iterations is set to $l_{mimo,\ max}$.

Step B•2 (iterative detection; the number of iterations k): $\lambda_{k,\ na}$ and $\lambda_{k,\ nb}$, where the number of iterations is k, are represented as in Equations 31-34, from Equations 11, 13-15, 16, and 17. Let (X, Y)=(a, b)(b, a).

In iterative APP decoding:

Math 31

$$\lambda_{k,n_X} = L_{k-1,\Omega^X_{iX,jX}}\left(u_{\Omega^X_{iX,jX}}\right) + \ln\frac{\sum_{U_{k,n_X,+1}} \exp\left\{-\frac{1}{2\sigma^2}\|y(i_X) - H_{22}(i_X)s(u(i_X))\|^2 + \rho\left(u_{\Omega^X_{iX,jX}}\right)\right\}}{\sum_{U_{k,n_X,-1}} \exp\left\{-\frac{1}{2\sigma^2}\|y(i_X) - H_{22}(i_X)s(u(i_X))\|^2 + \rho\left(u_{\Omega^X_{iX,jX}}\right)\right\}} \quad \text{Equation 31}$$

Math 32

$$\rho\left(u_{\Omega^X_{iX,jX}}\right) = \sum_{\substack{\gamma=1\\ \gamma\neq jX}}^{h} \left|\frac{L_{k-1,\Omega^X_{iX,\gamma}}\left(u_{\Omega^X_{iX,\gamma}}\right)}{2}\right|\left(u_{\Omega^X_{iX,\gamma}}\,\mathrm{sign}\left(L_{k-1,\Omega^X_{iX,\gamma}}\left(u_{\Omega^X_{iX,\gamma}}\right)\right) - 1\right) + \sum_{\gamma=1}^{h} \left|\frac{L_{k-1,\Omega^Y_{iX,\gamma}}\left(u_{\Omega^Y_{iX,\gamma}}\right)}{2}\right|\left(u_{\Omega^Y_{iX,\gamma}}\,\mathrm{sign}\left(L_{k-1,\Omega^Y_{iX,\gamma}}\left(u_{\Omega^Y_{iX,\gamma}}\right)\right) - 1\right) \quad \text{Equation 32}$$

In iterative Max-log APP decoding:

Math 33

$$\lambda_{k,n_X} = L_{k-1,\Omega^X_{iX,jX}}(u_{\Omega^X_{iX,jX}}) + \max_{U_{k,n_X,+1}} \left\{\Psi\left(u(i_X), y(i_X), \rho(u_{\Omega^X_{iX,jX}})\right)\right\} - \max_{U_{k,n_X,-1}} \left\{\Psi\left(u(i_X), y(i_X), \rho(u_{\Omega^X_{iX,jX}})\right)\right\} \quad \text{Equation 33}$$

Math 34

$$\Psi\left(u(i_X), y(i_X), \rho(u_{\Omega^X_{iX,jX}})\right) = -\frac{1}{2\sigma^2}\|y(i_X) - H_{22}(i_X)s(u(i_X))\|^2 + \rho(u_{\Omega^X_{iX,jX}}) \quad \text{Equation 34}$$

Step B•3 (counting the number of iterations and estimating a codeword): increment $l_{mimo}$ if $l_{mimo}<l_{mimo,\ max}$, and return to step B•2. Assuming that $l_{mimo}=l_{mino,\ max}$, the estimated codeword is sought as in the following Equation.

Math 35

$$\hat{u}_{n_X} = \begin{cases} 1 & L_{mimo,n_X} \geq 0 \\ -1 & L_{mimo,n_X} < 0 \end{cases} \quad \text{Equation 35}$$

Here, let X=a, b.

Figure 3:
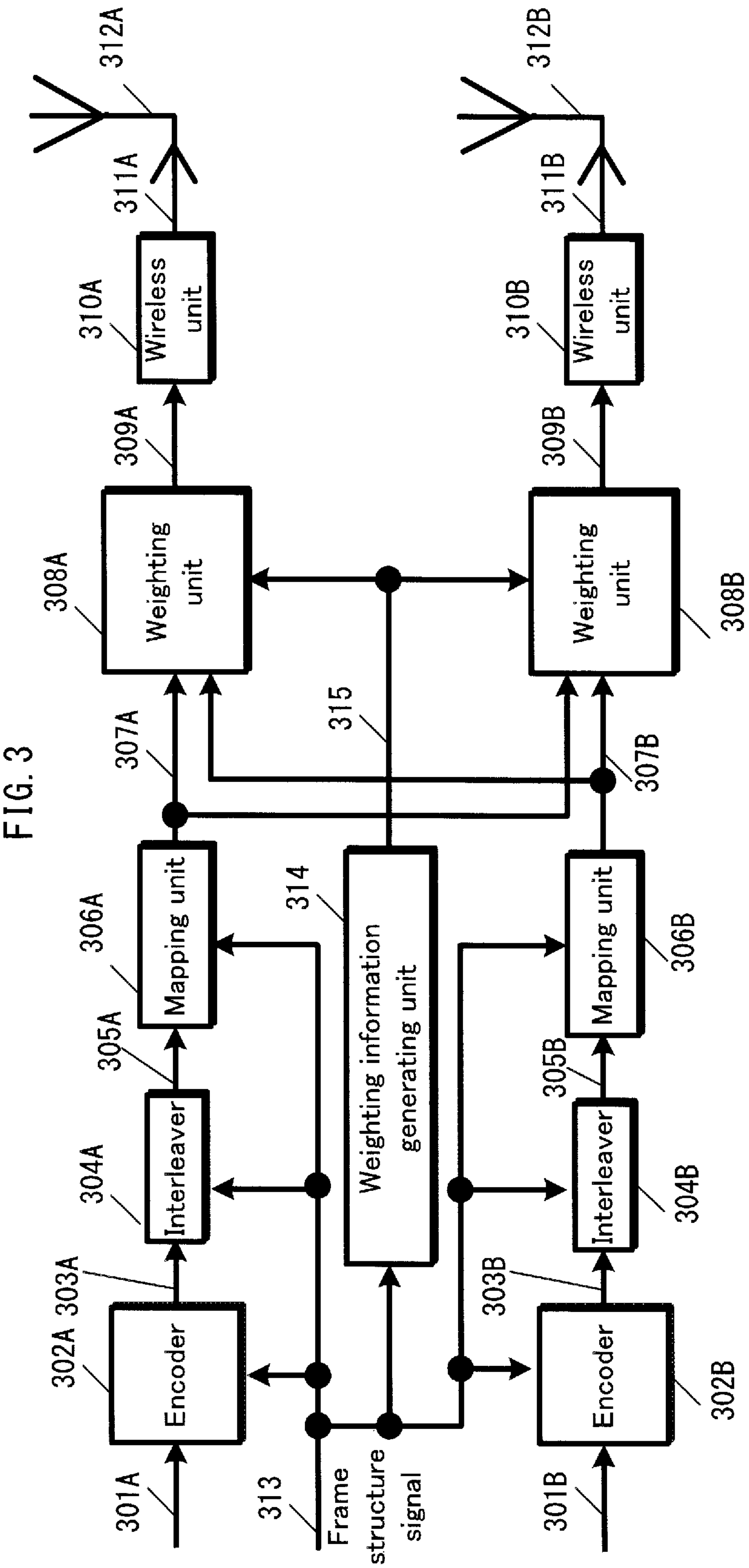
FIG. 3 is an example of the structure of a transmission device when adopting a scheme of hopping between precoding weights.

FIG. 3 is an example of the structure of a transmission device 300 in the present embodiment. An encoder 302A receives information (data) 301A and a frame structure signal 313 as inputs and, in accordance with the frame structure signal 313, performs error correction coding such as convolutional coding, LDPC coding, turbo coding, or the like, outputting encoded data 303A. (The frame structure signal 313 includes information such as the error correction scheme used for error correction coding of data, the coding rate, the block length, and the like. The encoder 302A uses the error correction scheme indicated by the frame structure signal 313. Furthermore, the error correction scheme may be hopped.)

An interleaver 304A receives the encoded data 303A and the frame structure signal 313 as inputs and performs interleaving, i.e. changing the order of the data, to output interleaved data 305A. (The scheme of interleaving may be hopped based on the frame structure signal 313.)

A mapping unit 306A receives the interleaved data 305A and the frame structure signal 313 as inputs, performs modulation such as Quadrature Phase Shift Keying (QPSK), 16 Quadrature Amplitude Modulation (16QAM), 64 Quadrature Amplitude Modulation (64QAM), or the like, and outputs a resulting baseband signal 307A. (The modulation scheme may be hopped based on the frame structure signal 313.)

Figure 24B:
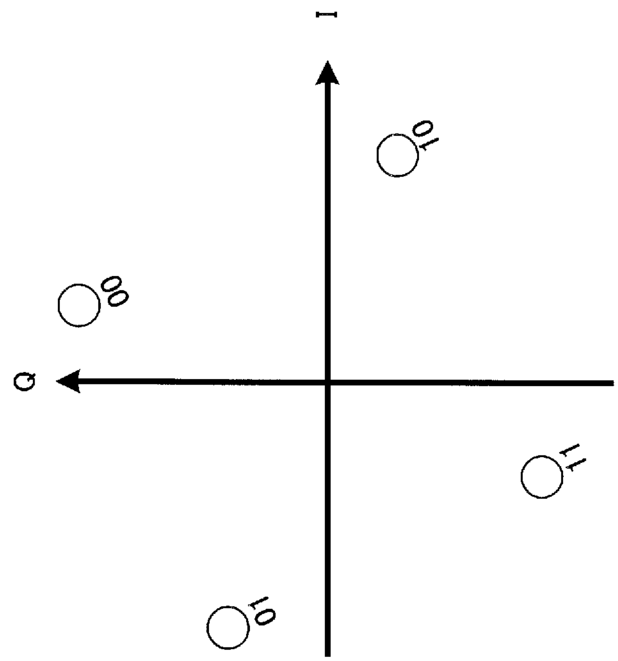
FIGS. 24A and 24B are examples of mapping schemes.
Figure 24A:
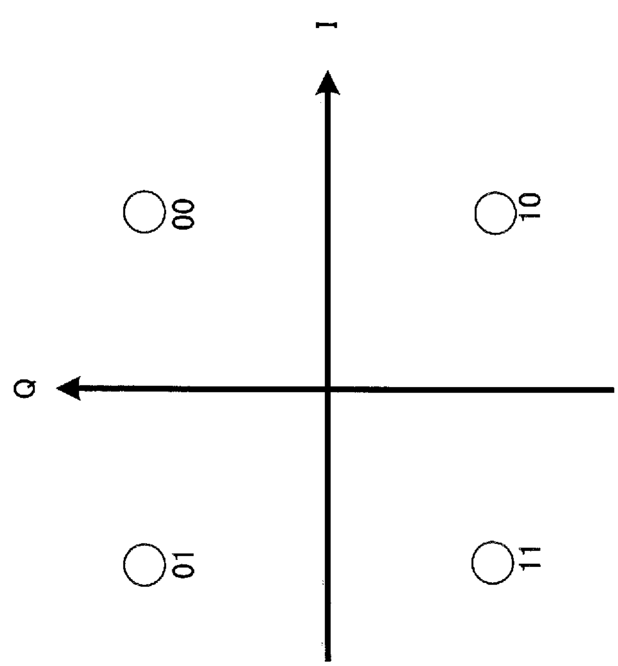
Figure 25B:
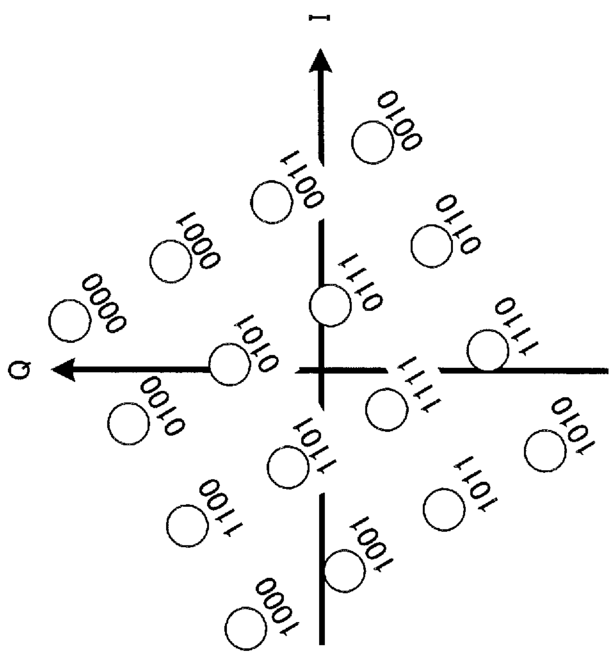
FIGS. 25A and 25B are examples of mapping schemes.
Figure 25A:
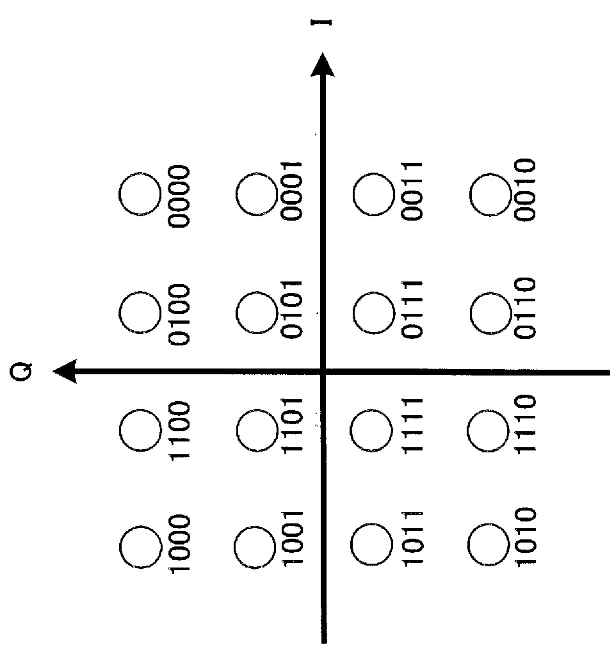

FIGS. 24A and 24B are an example of a mapping scheme over an I-Q plane, having an in-phase component I and a quadrature component Q, to form a baseband signal in QPSK modulation. For example, as shown in FIG. 24A, if the input data is "00", the output is I=1.0, Q=1.0. Similarly, for input data of "01", the output is I=−1.0, Q=1.0, and so forth. FIG. 24B is an example of a different scheme of mapping in an I-Q plane for QPSK modulation than FIG. 24A. The difference between FIG. 24B and FIG. 24A is that the signal points in FIG. 24A have been rotated around the origin to yield the signal points of FIG. 24B. Non-Patent Literature 9 and Non-Patent Literature 10 describe such a constellation rotation scheme, and the Cyclic Q Delay described in Non-Patent Literature 9 and Non-Patent Literature 10 may also be adopted. As another example apart from FIGS. 24A and 24B, FIGS. 25A and 25B show signal point layout in the I-Q plane for 16QAM. The example corresponding to FIG. 24A is shown in FIG. 25A, and the example corresponding to FIG. 24B is shown in FIG. 25B.

An encoder 302B receives information (data) 301B and the frame structure signal 313 as inputs and, in accordance with the frame structure signal 313, performs error correction coding such as convolutional coding, LDPC coding, turbo coding, or the like, outputting encoded data 303B. (The frame structure signal 313 includes information such as the error correction scheme used, the coding rate, the block length, and the like. The error correction scheme indicated by the frame structure signal 313 is used. Furthermore, the error correction scheme may be hopped.)

An interleaver 304B receives the encoded data 303B and the frame structure signal 313 as inputs and performs interleaving, i.e. changing the order of the data, to output interleaved data 305B. (The scheme of interleaving may be hopped based on the frame structure signal 313.)

A mapping unit 306B receives the interleaved data 305B and the frame structure signal 313 as inputs, performs modulation such as Quadrature Phase Shift Keying (QPSK), 16 Quadrature Amplitude Modulation (16QAM), 64 Quadrature Amplitude Modulation (64QAM), or the like, and outputs a resulting baseband signal 307B. (The modulation scheme may be hopped based on the frame structure signal 313.)

A weighting information generating unit 314 receives the frame structure signal 313 as an input and outputs information 315 regarding a weighting scheme based on the frame structure signal 313. The weighting scheme is characterized by regular hopping between weights.

A weighting unit 308A receives the baseband signal 307A, the baseband signal 307B, and the information 315 regarding the weighting scheme, and based on the information 315 regarding the weighting scheme, performs weighting on the baseband signal 307A and the baseband signal 307B and outputs a signal 309A resulting from the weighting. Details on the weighting scheme are provided later.

A wireless unit 310A receives the signal 309A resulting from the weighting as an input and performs processing such as orthogonal modulation, band limiting, frequency conversion, amplification, and the like, outputting a transmission signal 311A. A transmission signal 511A is output as a radio wave from an antenna 312A.

A weighting unit 308B receives the baseband signal 307A, the baseband signal 307B, and the information 315 regarding the weighting scheme, and based on the information 315 regarding the weighting scheme, performs weighting on the baseband signal 307A and the baseband signal 307B and outputs a signal 309B resulting from the weighting.

Figure 26:
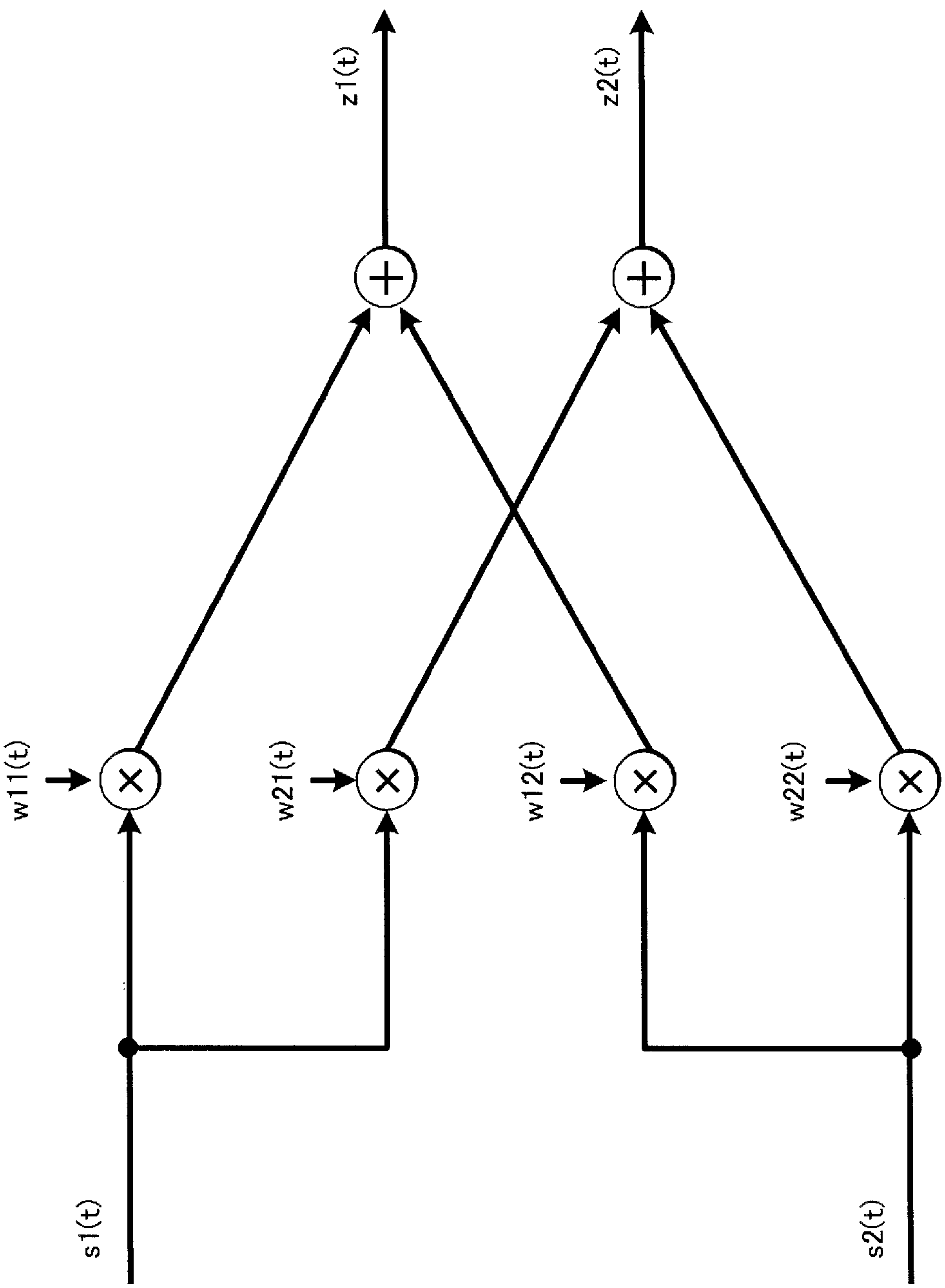
FIG. 26 is an example of the structure of a weighting unit.

FIG. 26 shows the structure of a weighting unit. The baseband signal 307A is multiplied by w11($t$), yielding w11($t$)s1($t$), and is multiplied by w21($t$), yielding w21($t$)s1($t$). Similarly, the baseband signal 307B is multiplied by w12($t$) to generate w12($t$)s2($t$) and is multiplied by w22($t$) to generate w22($t$)s2($t$). Next, z1($t$)=w11($t$)s1($t$)+w12($t$)s2($t$) and z2($t$)=w21($t$)s1($t$)+w22($t$)s2($t$) are obtained.

Details on the weighting scheme are provided later.

A wireless unit 310B receives the signal 309B resulting from the weighting as an input and performs processing such as orthogonal modulation, band limiting, frequency conversion, amplification, and the like, outputting a transmission signal 311B. A transmission signal 511B is output as a radio wave from an antenna 312B.

Figure 4:
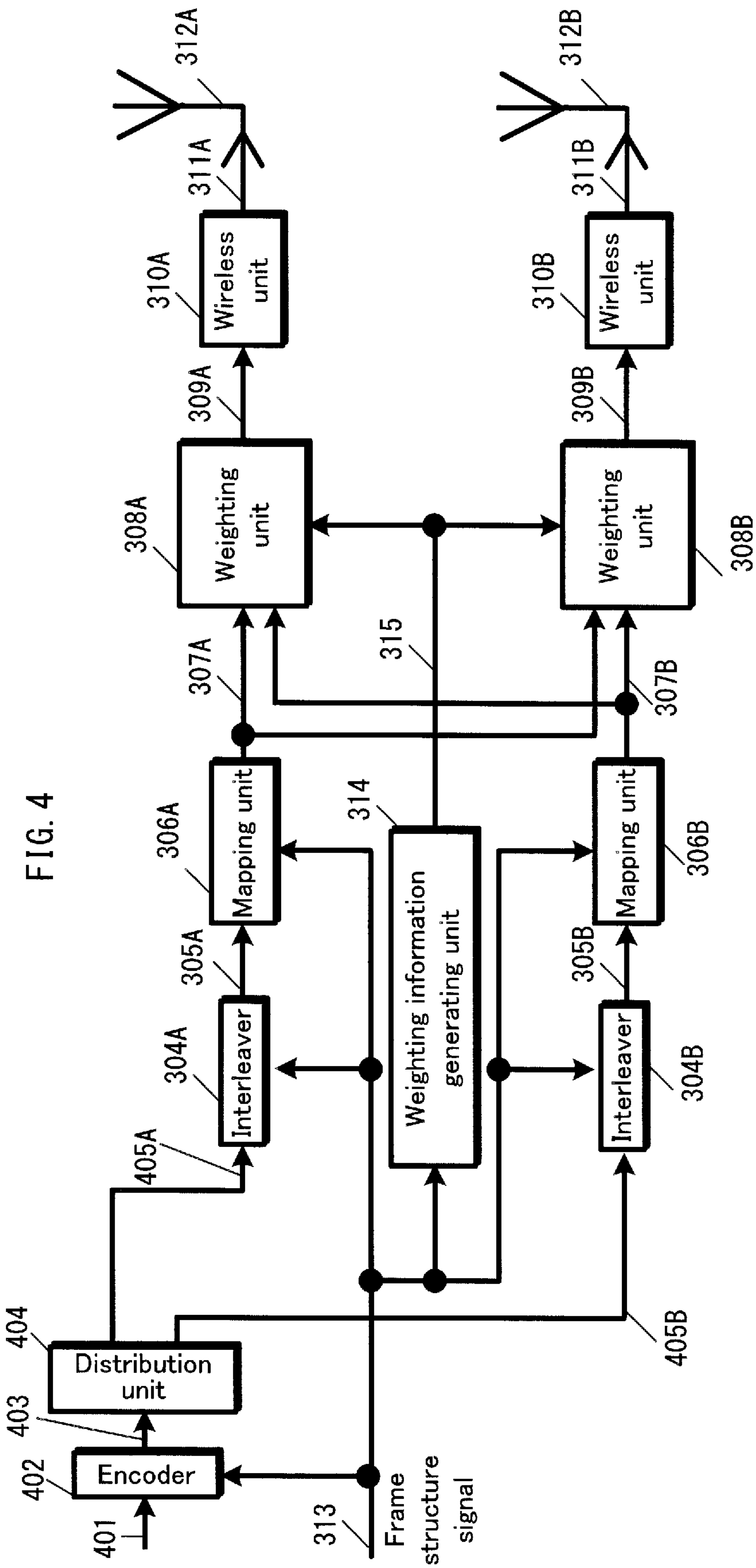
FIG. 4 is an example of the structure of a transmission device when adopting a scheme of hopping between precoding weights.

FIG. 4 shows an example of the structure of a transmission device 400 that differs from FIG. 3. The differences in FIG. 4 from FIG. 3 are described.

An encoder 402 receives information (data) 401 and the frame structure signal 313 as inputs and, in accordance with the frame structure signal 313, performs error correction coding and outputs encoded data 402.

A distribution unit 404 receives the encoded data 403 as an input, distributes the data 403, and outputs data 405A and data 405B. Note that in FIG. 4, one encoder is shown, but the number of encoders is not limited in this way. The present invention may similarly be embodied when the number of encoders is m (where m is an integer greater than or equal to one) and the distribution unit divides encoded data generated by each encoder into two parts and outputs the divided data.

Figure 5:
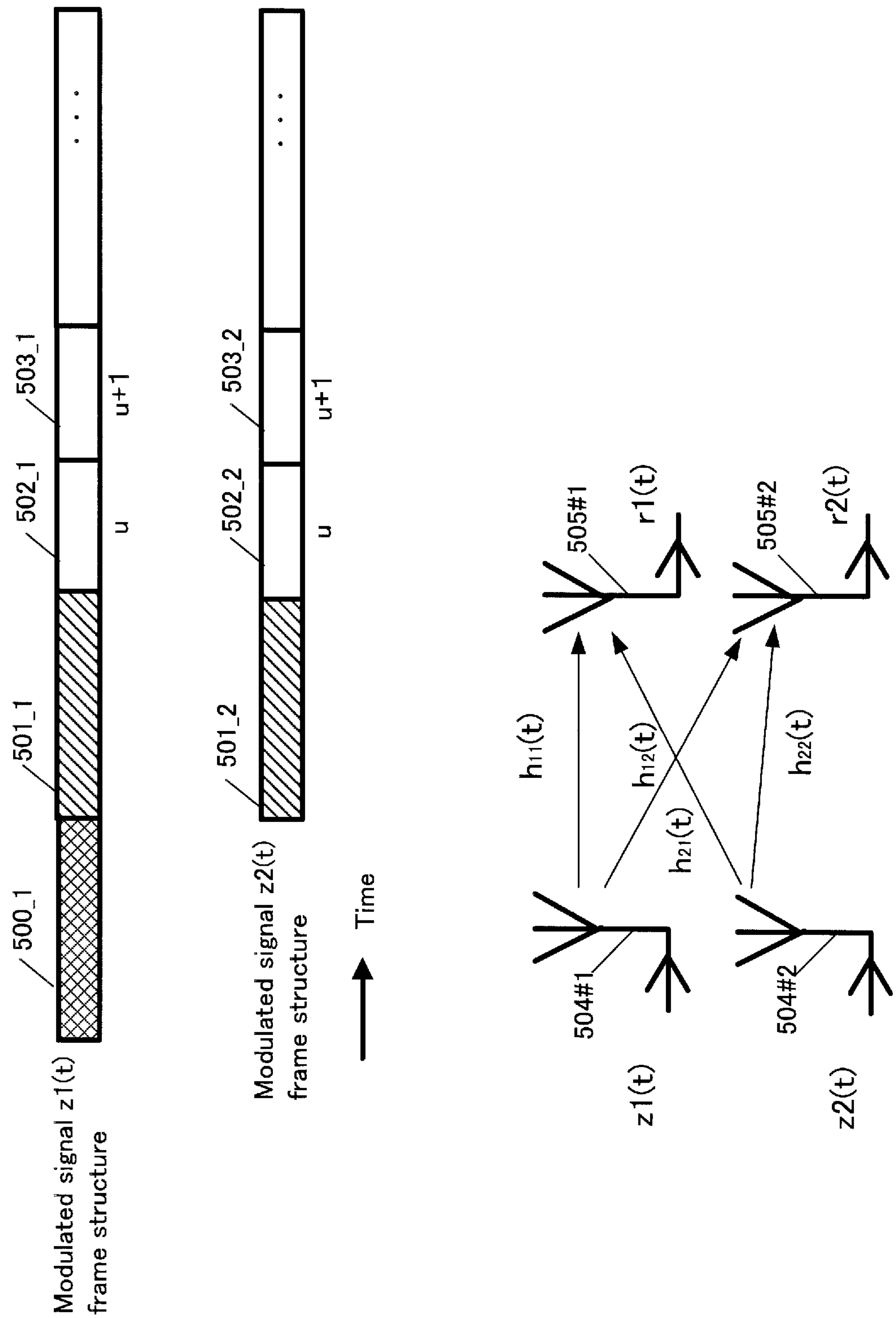
FIG. 5 is an example of a frame structure.

FIG. 5 shows an example of a frame structure in the time domain for a transmission device according to the present embodiment. A symbol 500_1 is a symbol for notifying the reception device of the transmission scheme. For example, the symbol 500_1 conveys information such as the error correction scheme used for transmitting data symbols, the coding rate, and the modulation scheme used for transmitting data symbols.

The symbol 501_1 is for estimating channel fluctuation for the modulated signal z1($t$) (where t is time) transmitted by the transmission device. The symbol 502_1 is the data symbol transmitted as symbol number u (in the time domain) by the modulated signal z1($t$), and the symbol 503_1 is the data symbol transmitted as symbol number u+1 by the modulated signal z1($t$).

The symbol 501_2 is for estimating channel fluctuation for the modulated signal z2($t$) (where t is time) transmitted by the transmission device. The symbol 502_2 is the data symbol transmitted as symbol number u by the modulated signal z2($t$), and the symbol 503_2 is the data symbol transmitted as symbol number u+1 by the modulated signal z2($t$).

The following describes the relationships between the modulated signals z1($t$) and z2($t$) transmitted by the transmission device and the received signals r1($t$) and r2($t$) received by the reception device.

In FIGS. 5, 504#1 and 504#2 indicate transmit antennas in the transmission device, and 505#1 and 505#2 indicate receive antennas in the reception device. The transmission device transmits the modulated signal z1($t$) from transmit antenna 504#1 and transmits the modulated signal z2($t$) from transmit antenna 504#2. In this case, the modulated signal z1($t$) and the modulated signal z2($t$) are assumed to occupy the same (a shared/common) frequency (bandwidth). Letting the channel fluctuation for the transmit antennas of the transmission device and the antennas of the reception device be $h_{11}(t)$, $h_{12}(t)$, $h_{21}(t)$, and $h_{22}(t)$, the signal received by the receive antenna 505#1 of the reception device be r1($t$), and the signal received by the receive antenna 505#2 of the reception device be r2($t$), the following relationship holds.

Math 36

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} \qquad \text{Equation 36}$$

FIG. 6 relates to the weighting scheme (precoding scheme) in the present embodiment. A weighting unit 600 integrates the weighting units 308A and 308B in FIG. 3. As shown in FIG. 6, a stream s1(*t*) and a stream s2(*t*) correspond to the baseband signals 307A and 307B in FIG. 3. In other words, the streams s1(*t*) and s2(*t*) are the baseband signal in-phase components I and quadrature components Q when mapped according to a modulation scheme such as QPSK, 16QAM, 64QAM, or the like. As indicated by the frame structure of FIG. 6, the stream s1(*t*) is represented as s1(*u*) at symbol number u, as s1(*u*+1) at symbol number u+1, and so forth. Similarly, the stream s2(*t*) is represented as s2(*u*) at symbol number u, as s2(*u*+1) at symbol number u+1, and so forth. The weighting unit 600 receives the baseband signals 307A (s1(*t*)) and 307B (s2(*t*)) and the information 315 regarding weighting information in FIG. 3 as inputs, performs weighting in accordance with the information 315 regarding weighting, and outputs the signals 309A (z1(*t*)) and 309B (z2(*t*)) after weighting in FIG. 3. In this case, z1(*t*) and z2(*t*) are represented as follows.

For symbol number 4i (where i is an integer greater than or equal to zero):

Math 37

$$\begin{pmatrix} z1(4i) \\ z2(4i) \end{pmatrix} = \frac{1}{\sqrt{2}} \begin{pmatrix} e^{j0} & e^{j0} \\ e^{j0} & e^{j\frac{3}{4}\pi} \end{pmatrix} \begin{pmatrix} s1(4i) \\ s2(4i) \end{pmatrix} \quad \text{Equation 37}$$

Here, j is an imaginary unit.

For symbol number 4i+1:

Math 38

$$\begin{pmatrix} z1(4i+1) \\ z2(4i+1) \end{pmatrix} = \frac{1}{\sqrt{2}} \begin{pmatrix} e^{j0} & e^{j0} \\ e^{j\frac{3}{4}\pi} & e^{j0} \end{pmatrix} \begin{pmatrix} s1(4i+1) \\ s2(4i+1) \end{pmatrix} \quad \text{Equation 38}$$

For symbol number 4i+2:

Math 39

$$\begin{pmatrix} z1(4i+2) \\ z2(4i+2) \end{pmatrix} = \frac{1}{\sqrt{2}} \begin{pmatrix} e^{j0} & e^{j\frac{3}{4}\pi} \\ e^{j0} & e^{j0} \end{pmatrix} \begin{pmatrix} s1(4i+2) \\ s2(4i+2) \end{pmatrix} \quad \text{Equation 39}$$

For symbol number 4i+3:

Math 40

$$\begin{pmatrix} z1(4i+3) \\ z2(4i+3) \end{pmatrix} = \frac{1}{\sqrt{2}} \begin{pmatrix} e^{j\frac{3}{4}\pi} & e^{j0} \\ e^{j0} & e^{j0} \end{pmatrix} \begin{pmatrix} s1(4i+3) \\ s2(4i+3) \end{pmatrix} \quad \text{Equation 40}$$

In this way, the weighting unit in FIG. 6 regularly hops between precoding weights over a four-slot period (cycle). (While precoding weights have been described as being hopped between regularly over four slots, the number of slots for regular hopping is not limited to four.)

Incidentally, Non-Patent Literature 4 describes hopping the precoding weights for each slot. This hopping of precoding weights is characterized by being random. On the other hand, in the present embodiment, a certain period (cycle) is provided, and the precoding weights are hopped between regularly. Furthermore, in each 2×2 precoding weight matrix composed of four precoding weights, the absolute value of each of the four precoding weights is equivalent to (1/sqrt(2)), and hopping is regularly performed between precoding weight matrices having this characteristic.

In an LOS environment, if a special precoding matrix is used, reception quality may greatly improve, yet the special precoding matrix differs depending on the conditions of direct waves. In an LOS environment, however, a certain tendency exists, and if precoding matrices are hopped between regularly in accordance with this tendency, the reception quality of data greatly improves. On the other hand, when precoding matrices are hopped between at random, a precoding matrix other than the above-described special precoding matrix may exist, and the possibility of performing precoding only with biased precoding matrices that are not suitable for the LOS environment also exists. Therefore, in an LOS environment, excellent reception quality may not always be obtained. Accordingly, there is a need for a precoding hopping scheme suitable for an LOS environment. The present invention proposes such a precoding scheme.

Figure 7:
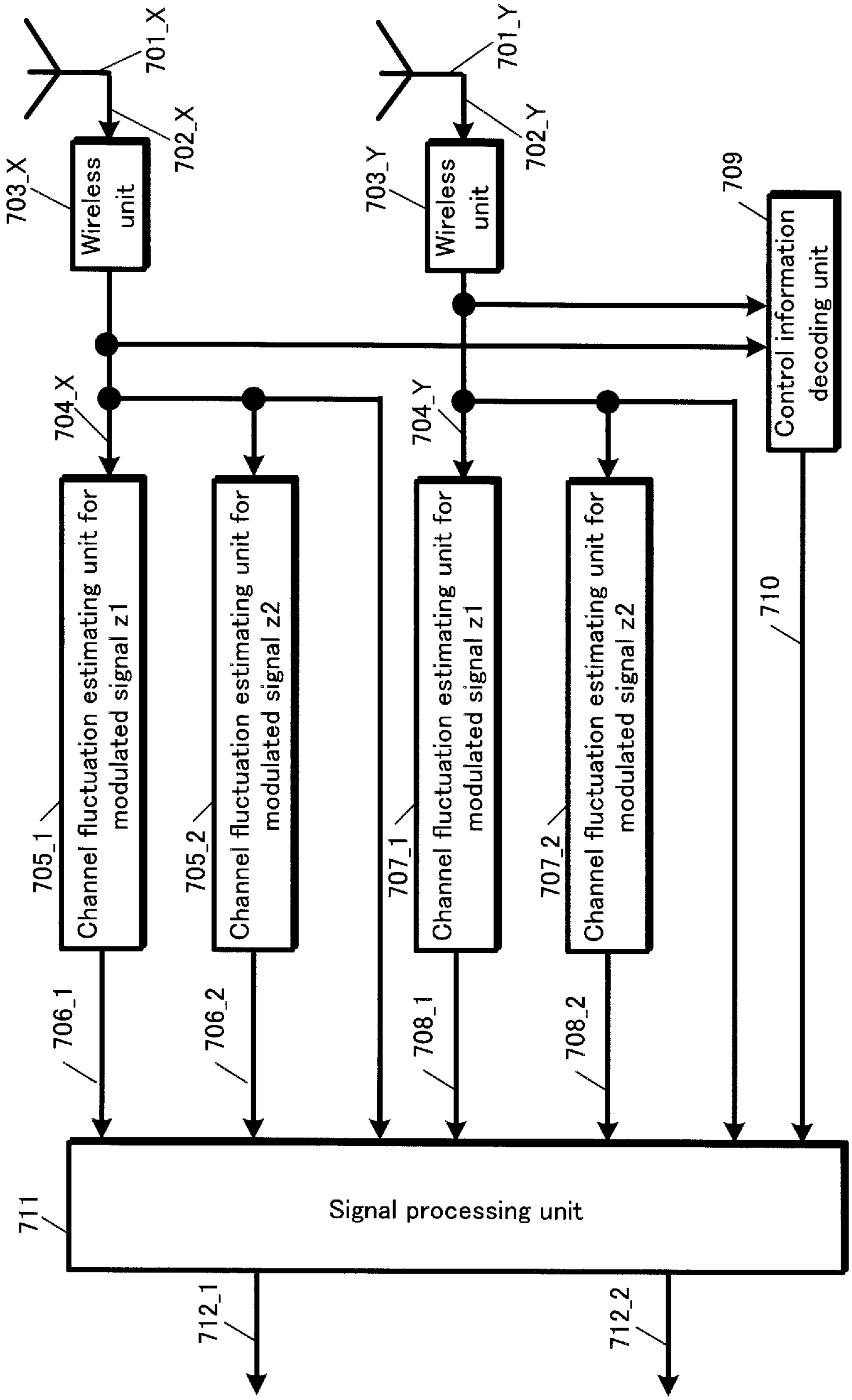
FIG. 7 is an example of the structure of a reception device.

FIG. 7 is an example of the structure of a reception device 700 in the present embodiment. A wireless unit 703_X receives, as an input, a received signal 702_X received by an antenna 701_X, performs processing such as frequency conversion, quadrature demodulation, and the like, and outputs a baseband signal 704_X. A channel fluctuation estimating unit 705_1 for the modulated signal z1 transmitted by the transmission device receives the baseband signal 704_X as an input, extracts a reference symbol 501_1 for channel estimation as in FIG. 5, estimates a value corresponding to $h_{11}$ in Equation 36, and outputs a channel estimation signal 706_1.

A channel fluctuation estimating unit 705_2 for the modulated signal z2 transmitted by the transmission device receives the baseband signal 704_X as an input, extracts a reference symbol 501_2 for channel estimation as in FIG. 5, estimates a value corresponding to $h_{12}$ in Equation 36, and outputs a channel estimation signal 706_2.

A wireless unit 703_Y receives, as input, a received signal 702_Y received by an antenna 701_Y, performs processing such as frequency conversion, quadrature demodulation, and the like, and outputs a baseband signal 704_Y.

A channel fluctuation estimating unit 707_1 for the modulated signal z1 transmitted by the transmission device receives the baseband signal 704_Y as an input, extracts a reference symbol 501_1 for channel estimation as in FIG. 5, estimates a value corresponding to $h_{21}$ in Equation 36, and outputs a channel estimation signal 708_1.

A channel fluctuation estimating unit 707_2 for the modulated signal z2 transmitted by the transmission device receives the baseband signal 704_Y as an input, extracts a reference symbol 501_2 for channel estimation as in FIG. 5, estimates a value corresponding to $h_{22}$ in Equation 36, and outputs a channel estimation signal 708_2.

A control information decoding unit 709 receives the baseband signal 704_X and the baseband signal 704_Y as inputs, detects the symbol 500_1 that indicates the transmission scheme as in FIG. 5, and outputs a signal 710 regarding information on the transmission scheme indicated by the transmission device.

A signal processing unit 711 receives, as inputs, the baseband signals 704_X and 704_Y, the channel estimation signals 706_1, 706_2, 708_1, and 708_2, and the signal 710 regarding information on the transmission scheme indicated by the transmission device, performs detection and decoding, and outputs received data 712_1 and 712_2.

Figure 8:
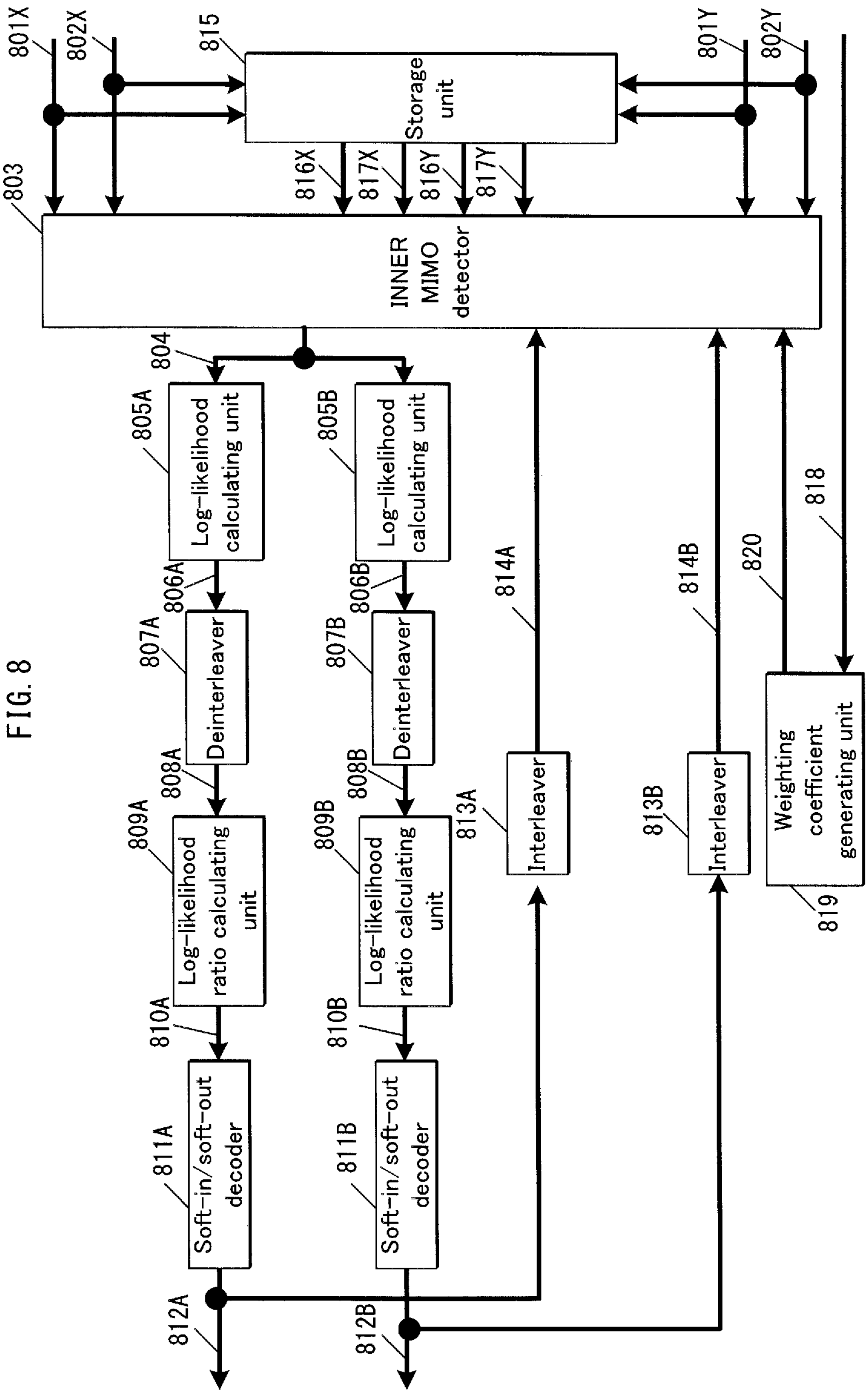
FIG. 8 is an example of the structure of a signal processing unit in a reception device.

Next, operations by the signal processing unit 711 in FIG. 7 are described in detail. FIG. 8 is an example of the structure of the signal processing unit 711 in the present embodiment. FIG. 8 shows an INNER MIMO detector, a soft-in/soft-out decoder, and a weighting coefficient generating unit as the main elements. Non-Patent Literature 2 and Non-Patent Literature 3 describe the scheme of iterative decoding with this structure. The MIMO system described in Non-Patent Literature 2 and Non-Patent Literature 3 is a spatial multiplexing MIMO system, whereas the present embodiment differs from Non-Patent Literature 2 and Non-Patent Literature 3 by describing a MIMO system that changes precoding weights with time. Letting the (channel) matrix in Equation 36 be H(t), the precoding weight matrix in FIG. 6 be W(t) (where the precoding weight matrix changes over t), the received vector be $R(t)=(r1(t),r2(t))^T$, and the stream vector be $S(t)=(s1(t),s2(t))^T$, the following Equation holds.

Math 41

$$R(t)=H(t)W(t)S(t) \qquad \text{Equation 41}$$

In this case, the reception device can apply the decoding scheme in Non-Patent Literature 2 and Non-Patent Literature 3 to the received vector R(t) by considering H(t)W(t) as the channel matrix.

Therefore, a weighting coefficient generating unit 819 in FIG. 8 receives, as input, a signal 818 regarding information on the transmission scheme indicated by the transmission device (corresponding to 710 in FIG. 7) and outputs a signal 820 regarding information on weighting coefficients.

An INNER MIMO detector 803 receives the signal 820 regarding information on weighting coefficients as input and, using the signal 820, performs the calculation in Equation 41. Iterative detection and decoding is thus performed. The following describes operations thereof.

Figure 10:
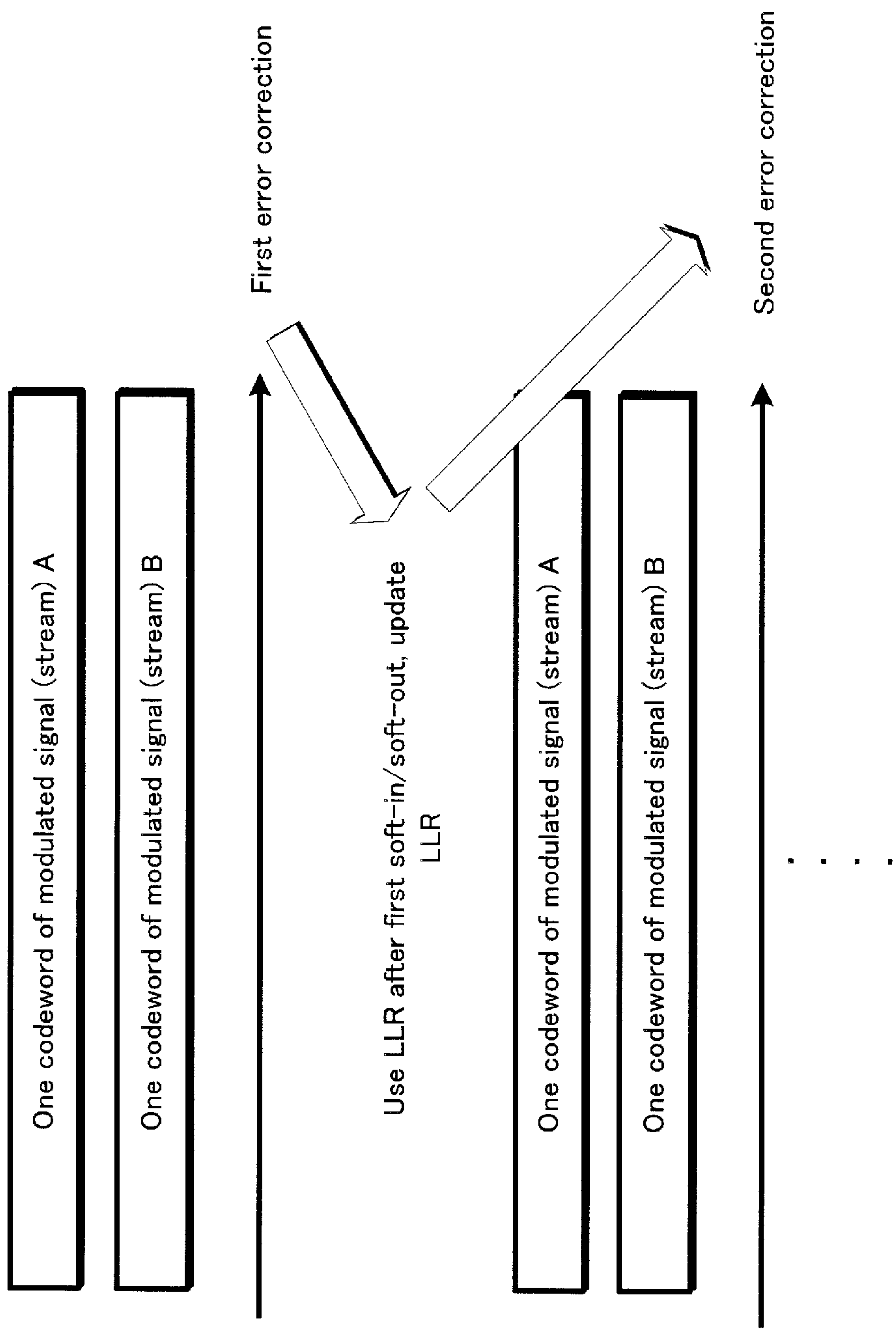
FIG. 10 shows a decoding processing scheme.

In the signal processing unit in FIG. 8, a processing scheme such as that shown in FIG. 10 is necessary for iterative decoding (iterative detection). First, one codeword (or one frame) of the modulated signal (stream) s1 and one codeword (or one frame) of the modulated signal (stream) s2 are decoded. As a result, the Log-Likelihood Ratio (LLR) of each bit of the one codeword (or one frame) of the modulated signal (stream) s1 and of the one codeword (or one frame) of the modulated signal (stream) s2 is obtained from the soft-in/soft-out decoder. Detection and decoding is performed again using the LLR. These operations are performed multiple times (these operations being referred to as iterative decoding (iterative detection)). Hereinafter, description focuses on the scheme of generating the log-likelihood ratio (LLR) of a symbol at a particular time in one frame.

In FIG. 8, a storage unit 815 receives, as inputs, a baseband signal 801X (corresponding to the baseband signal 704_X in FIG. 7), a channel estimation signal group 802X (corresponding to the channel estimation signals 706_1 and 706_2 in FIG. 7), a baseband signal 801Y (corresponding to the baseband signal 704_Y in FIG. 7), and a channel estimation signal group 802Y (corresponding to the channel estimation signals 708_1 and 708_2 in FIG. 7). In order to achieve iterative decoding (iterative detection), the storage unit 815 calculates H(t)W(t) in Equation 41 and stores the calculated matrix as a transformed channel signal group. The storage unit 815 outputs the above signals when necessary as a baseband signal 816X, a transformed channel estimation signal group 817X, a baseband signal 816Y, and a transformed channel estimation signal group 817Y.

Subsequent operations are described separately for initial detection and for iterative decoding (iterative detection).

<Initial Detection>

The INNER MIMO detector 803 receives, as inputs, the baseband signal 801X, the channel estimation signal group 802X, the baseband signal 801Y, and the channel estimation signal group 802Y. Here, the modulation scheme for the modulated signal (stream) s1 and the modulated signal (stream) s2 is described as 16QAM.

Figure 11:
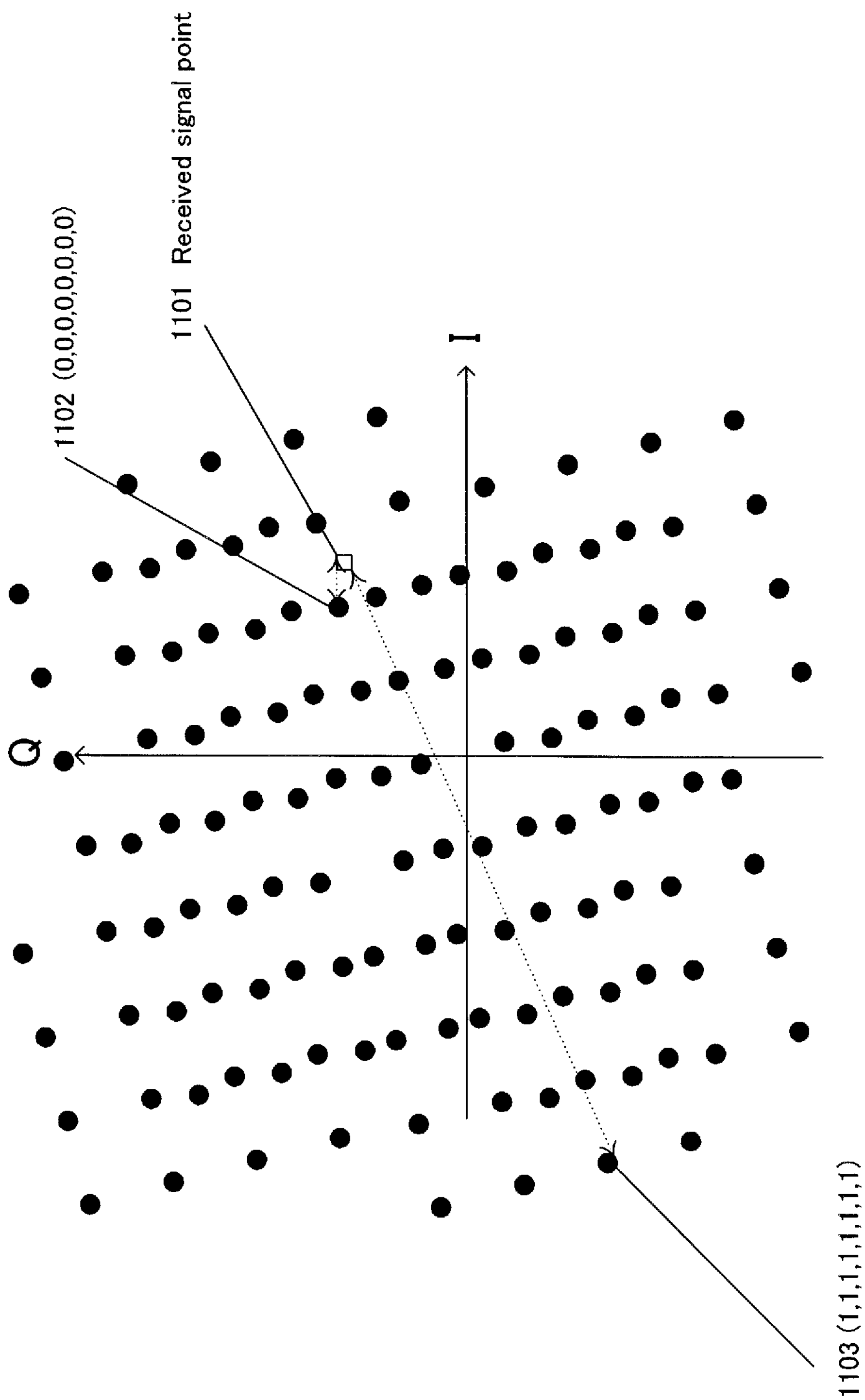
FIG. 11 is an example of reception conditions.

The INNER MIMO detector 803 first calculates H(t)W(t) from the channel estimation signal group 802X and the channel estimation signal group 802Y to seek candidate signal points corresponding to the baseband signal 801X. FIG. 11 shows such calculation. In FIG. 11, each black dot (•) is a candidate signal point in the I-Q plane. Since the modulation scheme is 16QAM, there are 256 candidate signal points. (Since FIG. 11 is only for illustration, not all 256 candidate signal points are shown.) Here, letting the four bits transferred by modulated signal s1 be b0, b1, b2, and b3, and the four bits transferred by modulated signal s2 be b4, b5, b6, and b7, candidate signal points corresponding to (b0, b1, b2, b3, b4, b5, b6, b7) in FIG. 11 exist. The squared Euclidian distance is sought between a received signal point 1101 (corresponding to the baseband signal 801X) and each candidate signal point. Each squared Euclidian distance is divided by the noise variance $\sigma^2$. Accordingly, $E_X$(b0, b1, b2, b3, b4, b5, b6, b7), i.e. the value of the squared Euclidian distance between a candidate signal point corresponding to (b0, b1, b2, b3, b4, b5, b6, b7) and a received signal point, divided by the noise variance, is sought. Note that the baseband signals and the modulated signals s1 and s2 are each complex signals.

Similarly, H(t)W(t) is calculated from the channel estimation signal group 802X and the channel estimation signal group 802Y, candidate signal points corresponding to the baseband signal 801Y are sought, the squared Euclidian distance for the received signal point (corresponding to the baseband signal 801Y) is sought, and the squared Euclidian distance is divided by the noise variance $\sigma^2$. Accordingly, $E_Y$(b0, b1, b2, b3, b4, b5, b6, b7), i.e. the value of the squared Euclidian distance between a candidate signal point corresponding to (b0, b1, b2, b3, b4, b5, b6, b7) and a received signal point, divided by the noise variance, is sought.

Then $E_X$(b0, b1, b2, b3, b4, b5, b6, b7)+$E_Y$(b0, b1, b2, b3, b4, b5, b6, b7)=E(b0, b1, b2, b3, b4, b5, b6, b7) is sought.

The INNER MIMO detector 803 outputs E(b0, b1, b2, b3, b4, b5, b6, b7) as a signal 804.

A log-likelihood calculating unit 805A receives the signal 804 as input, calculates the log likelihood for bits b0, b1, b2, and b3, and outputs a log-likelihood signal 806A. Note that during calculation of the log likelihood, the log likelihood for "1" and the log likelihood for "0" are calculated. The calculation scheme is as shown in Equations 28, 29, and 30. Details can be found in Non-Patent Literature 2 and Non-Patent Literature 3.

Similarly, a log-likelihood calculating unit 805B receives the signal 804 as input, calculates the log likelihood for bits b4, b5, b6, and b7, and outputs a log-likelihood signal 806B.

A deinterleaver (807A) receives the log-likelihood signal 806A as an input, performs deinterleaving corresponding to the interleaver (the interleaver (304A) in FIG. 3), and outputs a deinterleaved log-likelihood signal 808A.

Similarly, a deinterleaver (807B) receives the log-likelihood signal 806B as an input, performs deinterleaving corresponding to the interleaver (the interleaver (304B) in FIG. 3), and outputs a deinterleaved log-likelihood signal 808B.

A log-likelihood ratio calculating unit 809A receives the interleaved log-likelihood signal 808A as an input, calculates the log-likelihood ratio (LLR) of the bits encoded by the encoder 302A in FIG. 3, and outputs a log-likelihood ratio signal 810A.

Similarly, a log-likelihood ratio calculating unit 809B receives the interleaved log-likelihood signal 808B as an input, calculates the log-likelihood ratio (LLR) of the bits encoded by the encoder 302B in FIG. 3, and outputs a log-likelihood ratio signal 810B.

A soft-in/soft-out decoder 811A receives the log-likelihood ratio signal 810A as an input, performs decoding, and outputs a decoded log-likelihood ratio 812A.

Similarly, a soft-in/soft-out decoder 811B receives the log-likelihood ratio signal 810B as an input, performs decoding, and outputs a decoded log-likelihood ratio 812B.

<Iterative Decoding (Iterative Detection), Number of Iterations k>

An interleaver (813A) receives the log-likelihood ratio 812A decoded by the soft-in/soft-out decoder in the $(k-1)^{th}$ iteration as an input, performs interleaving, and outputs an interleaved log-likelihood ratio 814A. The interleaving pattern in the interleaver (813A) is similar to the interleaving pattern in the interleaver (304A) in FIG. 3.

An interleaver (813B) receives the log-likelihood ratio 812B decoded by the soft-in/soft-out decoder in the $(k-1)^{th}$ iteration as an input, performs interleaving, and outputs an interleaved log-likelihood ratio 814B. The interleaving pattern in the interleaver (813B) is similar to the interleaving pattern in the interleaver (304B) in FIG. 3.

The INNER MIMO detector 803 receives, as inputs, the baseband signal 816X, the transformed channel estimation signal group 817X, the baseband signal 816Y, the transformed channel estimation signal group 817Y, the interleaved log-likelihood ratio 814A, and the interleaved log-likelihood ratio 814B. The reason for using the baseband signal 816X, the transformed channel estimation signal group 817X, the baseband signal 816Y, and the transformed channel estimation signal group 817Y instead of the baseband signal 801X, the channel estimation signal group 802X, the baseband signal 801Y, and the channel estimation signal group 802Y is because a delay occurs due to iterative decoding.

The difference between operations by the INNER MIMO detector 803 for iterative decoding and for initial detection is the use of the interleaved log-likelihood ratio 814A and the interleaved log-likelihood ratio 814B during signal processing. The INNER MIMO detector 803 first seeks E(b0, b1, b2, b3, b4, b5, b6, b7), as during initial detection. Additionally, coefficients corresponding to Equations 11 and 32 are sought from the interleaved log-likelihood ratio 814A and the interleaved log-likelihood ratio 914B. The value E(b0, b1, b2, b3, b4, b5, b6, b7) is adjusted using the sought coefficients, and the resulting value E'(b0, b1, b2, b3, b4, b5, b6, b7) is output as the signal 804.

The log-likelihood calculating unit 805A receives the signal 804 as input, calculates the log likelihood for bits b0, b1, b2, and b3, and outputs the log-likelihood signal 806A. Note that during calculation of the log likelihood, the log likelihood for "1" and the log likelihood for "0" are calculated. The calculation scheme is as shown in Equations 31, 32, 33, 34, and 35. Details can be found in Non-Patent Literature 2 and Non-Patent Literature 3.

Similarly, the log-likelihood calculating unit 805B receives the signal 804 as input, calculates the log likelihood for bits b4, b5, b6, and b7, and outputs the log-likelihood signal 806B. Operations by the deinterleaver onwards are similar to initial detection.

Note that while FIG. 8 shows the structure of the signal processing unit when performing iterative detection, iterative detection is not always essential for obtaining excellent reception quality, and a structure not including the interleavers 813A and 813B, which are necessary only for iterative detection, is possible. In such a case, the INNER MIMO detector 803 does not perform iterative detection.

The main part of the present embodiment is calculation of H(t)W(t). Note that as shown in Non-Patent Literature 5 and the like, QR decomposition may be used to perform initial detection and iterative detection.

Furthermore, as shown in Non-Patent Literature 11, based on H(t)W(t), linear operation of the Minimum Mean Squared Error (MMSE) and Zero Forcing (ZF) may be performed in order to perform initial detection.

Figure 9:
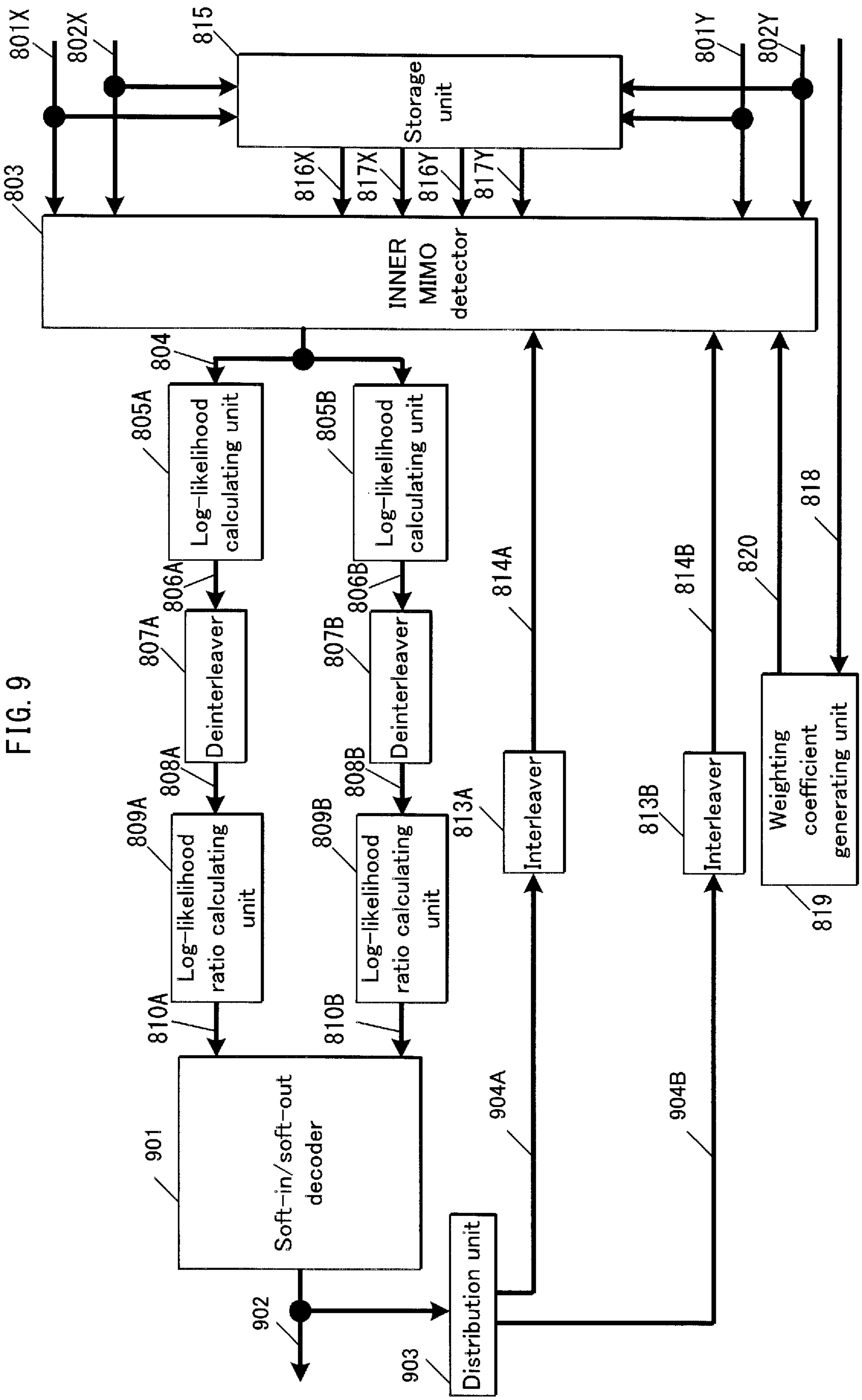
FIG. 9 is an example of the structure of a signal processing unit in a reception device.

FIG. 9 is the structure of a different signal processing unit than FIG. 8 and is for the modulated signal transmitted by the transmission device in FIG. 4. The difference with FIG. 8 is the number of soft-in/soft-out decoders. A soft-in/soft-out decoder 901 receives, as inputs, the log-likelihood ratio signals 810A and 810B, performs decoding, and outputs a decoded log-likelihood ratio 902. A distribution unit 903 receives the decoded log-likelihood ratio 902 as an input and distributes the log-likelihood ratio 902. Other operations are similar to FIG. 8.

Figure 12B:
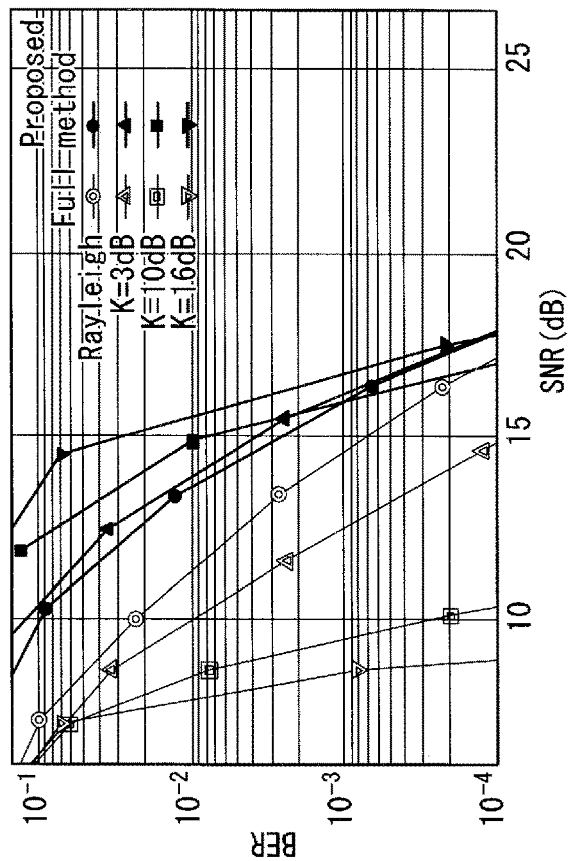
FIGS. 12A and 12B are examples of BER characteristics.
Figure 12A:
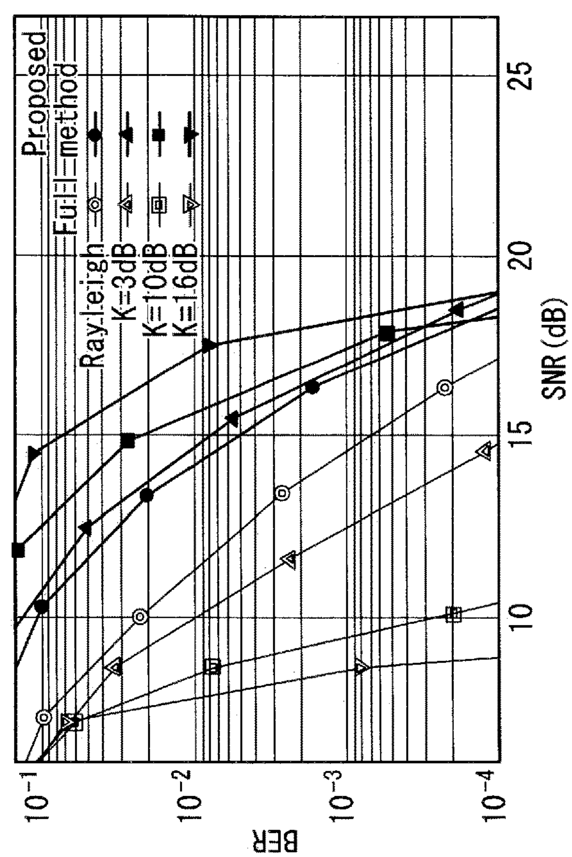
Figure 29B:
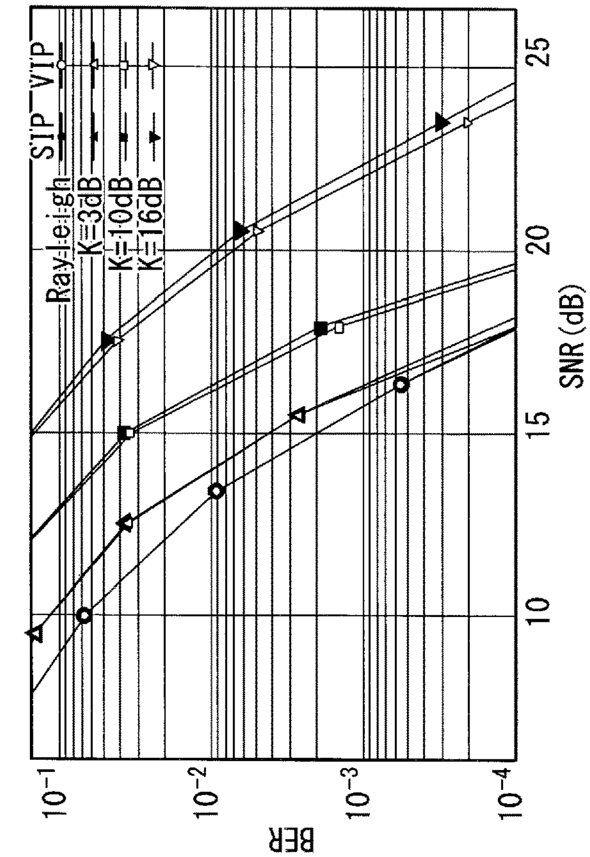
FIGS. 29A and 29B are examples of BER characteristics.
Figure 29A:
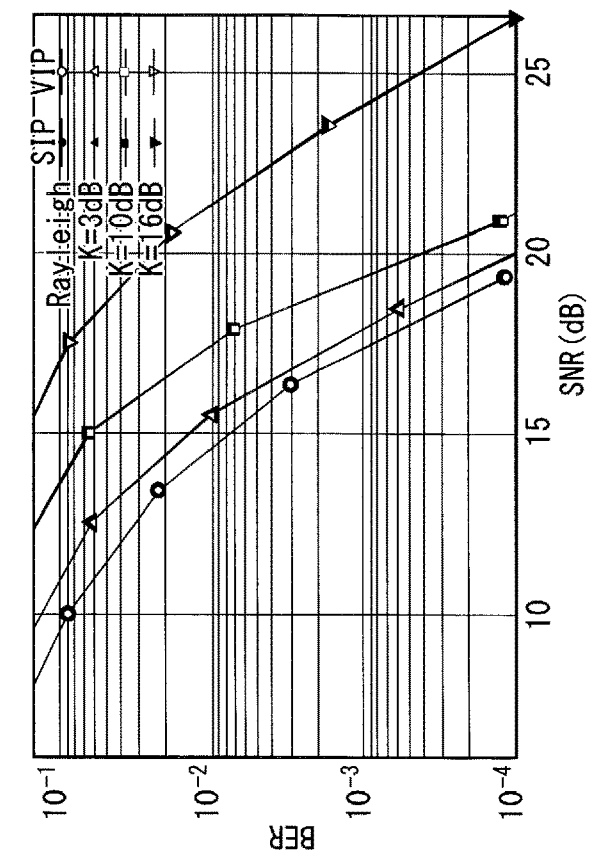

FIGS. 12A and 12B show BER characteristics for a transmission scheme using the precoding weights of the present embodiment under similar conditions to FIGS. 29A and 29B. FIG. 12A shows the BER characteristics of Max-log A Posteriori Probability (APP) without iterative detection (see Non-Patent Literature 1 and Non-Patent Literature 2), and FIG. 12B shows the BER characteristics of Max-log-APP with iterative detection (see Non-Patent Literature 1 and Non-Patent Literature 2) (number of iterations: five). Comparing FIGS. 12A, 12B, 29A, and 29B shows how if the transmission scheme of the present embodiment is used, the BER characteristics when the Rician factor is large greatly improve over the BER characteristics when using spatial multiplexing MIMO system, thereby confirming the usefulness of the scheme in the present embodiment.

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time, as in the present embodiment.

In the present embodiment, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, the example of LDPC coding has particularly been explained, but the present invention is not limited to LDPC coding. Furthermore, with regards to the decoding scheme, the soft-in/soft-out decoders are not limited to the example of sum-product decoding. Another soft-in/soft-out decoding scheme may be used, such as a BCJR algorithm, a SOVA algorithm, a Max-log-MAP algorithm, and the like. Details are provided in Non-Patent Literature 6.

Additionally, in the present embodiment, the example of a single carrier scheme has been described, but the present invention is not limited in this way and may be similarly embodied for multi-carrier transmission. Accordingly, when using a scheme such as spread spectrum communication, Orthogonal Frequency-Division Multiplexing (OFDM), Single Carrier Frequency Division Multiple Access (SC-FDMA), Single Carrier Orthogonal Frequency-Division Multiplexing (SC-OFDM), or wavelet OFDM as described in Non-Patent Literature 7 and the like, for example, the present invention may be similarly embodied. Furthermore, in the present embodiment, symbols other than data symbols, such as pilot symbols (preamble, unique word, and the like), symbols for transmission of control information, and the like, may be arranged in the frame in any way.

The following describes an example of using OFDM as an example of a multi-carrier scheme.

Figure 13:
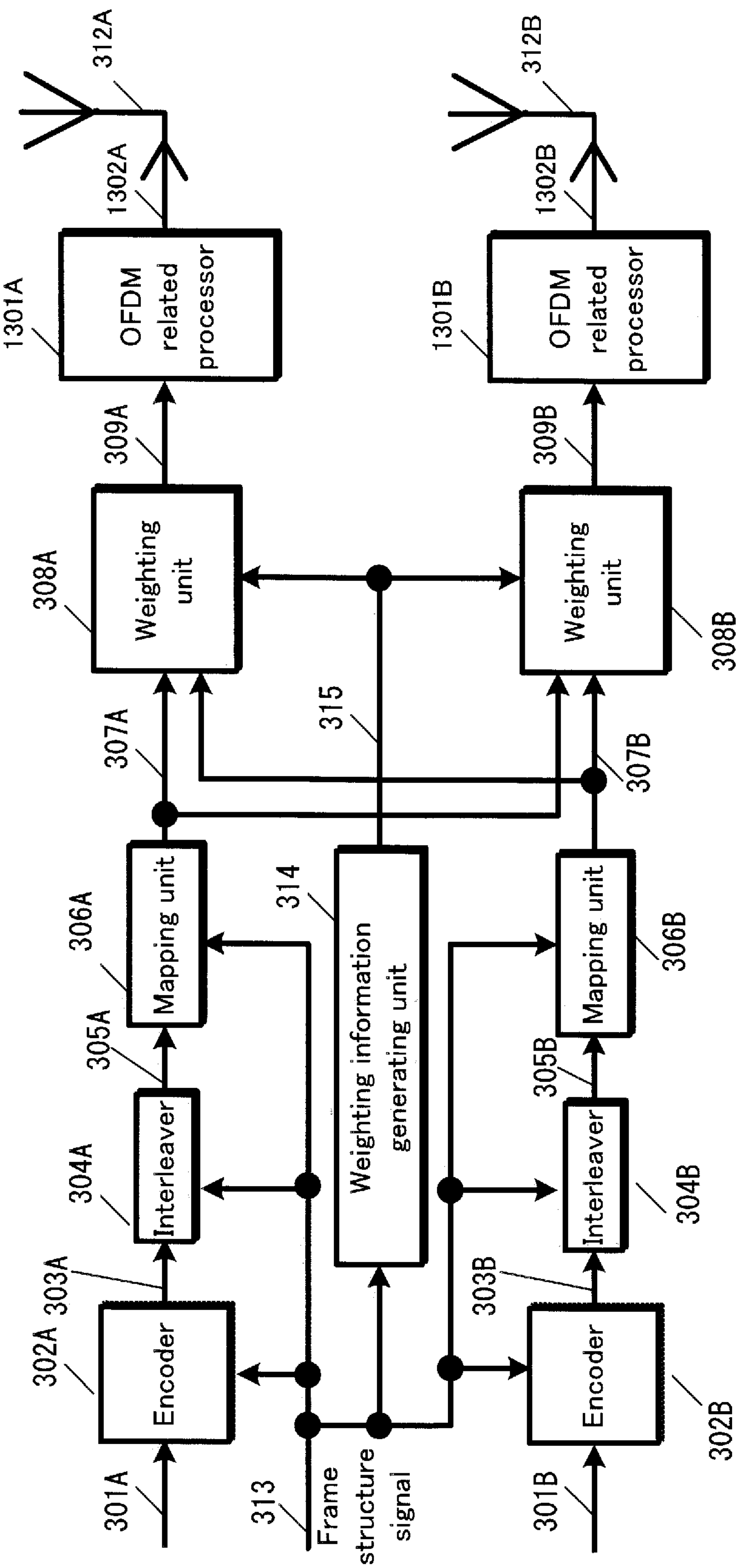
FIG. 13 is an example of the structure of a transmission device when adopting a scheme of hopping between precoding weights.

FIG. 13 shows the structure of a transmission device when using OFDM. In FIG. 13, elements that operate in a similar way to FIG. 3 bear the same reference signs.

An OFDM related processor 1301A receives, as input, the weighted signal 309A, performs processing related to OFDM, and outputs a transmission signal 1302A. Similarly, an OFDM related processor 1301B receives, as input, the weighted signal 309B, performs processing related to OFDM, and outputs a transmission signal 1302B.

Figure 14:
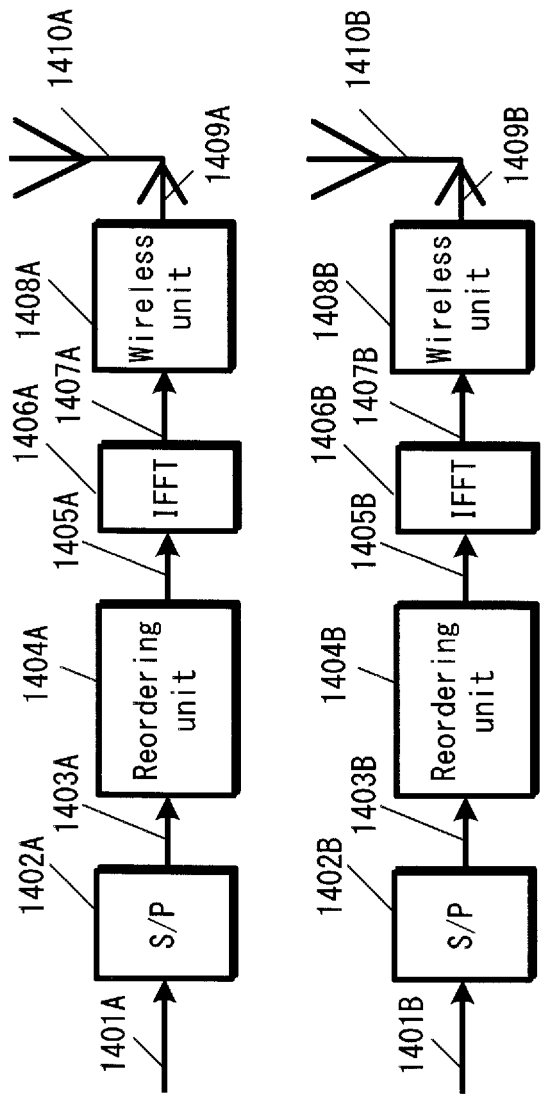
FIG. 14 is an example of the structure of a transmission device when adopting a scheme of hopping between precoding weights.

FIG. 14 shows an example of a structure from the OFDM related processors 1301A and 1301B in FIG. 13 onwards. The part from 1401A to 1410A is related to the part from 1301A to 312A in FIG. 13, and the part from 1401B to 1410B is related to the part from 1301B to 312B in FIG. 13.

A serial/parallel converter 1402A performs serial/parallel conversion on a weighted signal 1401A (corresponding to the weighted signal 309A in FIG. 13) and outputs a parallel signal 1403A.

A reordering unit 1404A receives a parallel signal 1403A as input, performs reordering, and outputs a reordered signal 1405A. Reordering is described in detail later.

An inverse fast Fourier transformer 1406A receives the reordered signal 1405A as an input, performs a fast Fourier transform, and outputs a fast Fourier transformed signal 1407A.

A wireless unit 1408A receives the fast Fourier transformed signal 1407A as an input, performs processing such as frequency conversion, amplification, and the like, and outputs a modulated signal 1409A. The modulated signal 1409A is output as a radio wave from an antenna 1410A.

A serial/parallel converter 1402B performs serial/parallel conversion on a weighted signal 1401B (corresponding to the weighted signal 309B in FIG. 13) and outputs a parallel signal 1403B.

A reordering unit 1404B receives a parallel signal 1403B as input, performs reordering, and outputs a reordered signal 1405B. Reordering is described in detail later.

An inverse fast Fourier transformer 1406B receives the reordered signal 1405B as an input, performs a fast Fourier transform, and outputs a fast Fourier transformed signal 1407B.

A wireless unit 1408B receives the fast Fourier transformed signal 1407B as an input, performs processing such as frequency conversion, amplification, and the like, and outputs a modulated signal 1409B. The modulated signal 1409B is output as a radio wave from an antenna 1410B.

In the transmission device of FIG. 3, since the transmission scheme does not use multi-carrier, precoding hops to form a four-slot period (cycle), as shown in FIG. 6, and the precoded symbols are arranged in the time domain. When using a multi-carrier transmission scheme as in the OFDM scheme shown in FIG. 13, it is of course possible to arrange the precoded symbols in the time domain as in FIG. 3 for each (sub)carrier. In the case of a multi-carrier transmission scheme, however, it is possible to arrange symbols in the frequency domain, or in both the frequency and time domains. The following describes these arrangements.

Figure 15A:
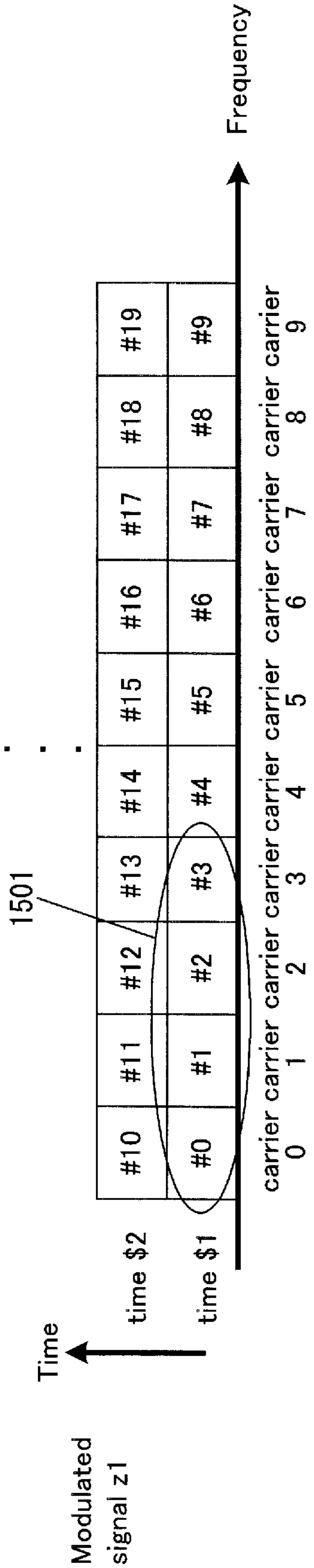
FIGS. 15A and 15B are examples of a frame structure.
Figure 15B:
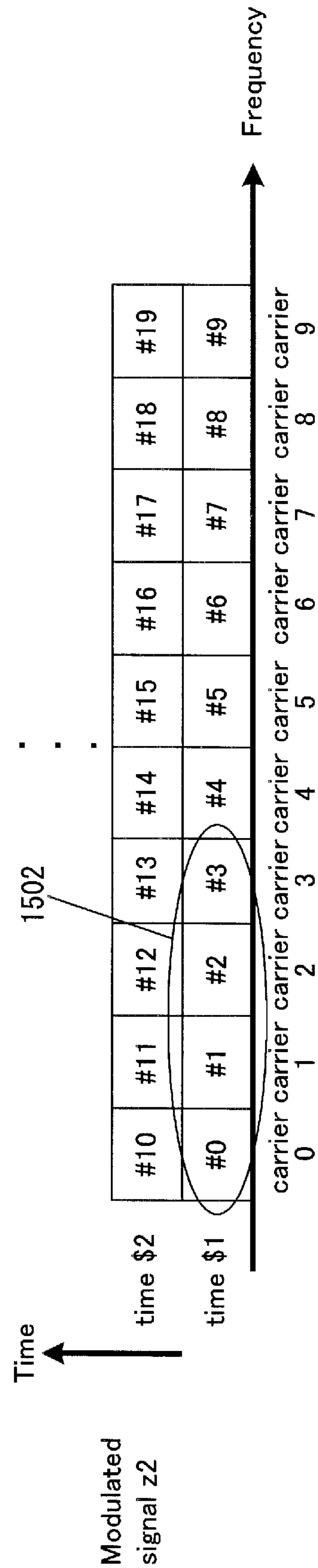

FIGS. 15A and 15B show an example of a scheme of reordering symbols by reordering units 1401A and 1401B in FIG. 14, the horizontal axis representing frequency, and the vertical axis representing time. The frequency domain runs from (sub)carrier 0 through (sub)carrier 9. The modulated signals z1 and z2 use the same frequency bandwidth at the same time. FIG. 15A shows the reordering scheme for symbols of the modulated signal z1, and FIG. 15B shows the reordering scheme for symbols of the modulated signal z2. Numbers #1, #2, #3, #4, . . . are assigned to in order to the symbols of the weighted signal 1401A which is input into the serial/parallel converter 1402A. At this point, symbols are assigned regularly, as shown in FIG. 15A. The symbols #1, #2, #3, #4, . . . are arranged in order starting from carrier 0. The symbols #1 through #9 are assigned to time $1, and subsequently, the symbols #10 through #19 are assigned to time $2.

Similarly, numbers #1, #2, #3, #4, . . . are assigned in order to the symbols of the weighted signal 1401B which is input into the serial/parallel converter 1402B. At this point, symbols are assigned regularly, as shown in FIG. 15B. The symbols #1, #2, #3, #4, . . . are arranged in order starting from carrier 0. The symbols #1 through #9 are assigned to time $1, and subsequently, the symbols #10 through #19 are assigned to time $2. Note that the modulated signals z1 and z2 are complex signals.

The symbol group 1501 and the symbol group 1502 shown in FIGS. 15A and 15B are the symbols for one period (cycle) when using the precoding weight hopping scheme shown in FIG. 6. Symbol #0 is the symbol when using the precoding weight of slot 4i in FIG. 6. Symbol #1 is the symbol when using the precoding weight of slot 4i+1 in FIG. 6. Symbol #2 is the symbol when using the precoding weight of slot 4i+2 in FIG. 6. Symbol #3 is the symbol when using the precoding weight of slot 4i+3 in FIG. 6. Accordingly, symbol #x is as follows. When x mod 4 is 0, the symbol #x is the symbol when using the precoding weight of slot 4i in FIG. 6. When x mod 4 is 1, the symbol #x is the symbol when using the precoding weight of slot 4i+1 in FIG. 6. When x mod 4 is 2, the symbol #x is the symbol when using the precoding weight of slot 4i+2 in FIG. 6. When x mod 4 is 3, the symbol #x is the symbol when using the precoding weight of slot 4i+3 in FIG. 6.

In this way, when using a multi-carrier transmission scheme such as OFDM, unlike during single carrier transmission, symbols can be arranged in the frequency domain. Furthermore, the ordering of symbols is not limited to the ordering shown in FIGS. 15A and 15B. Other examples are described with reference to FIGS. 16A, 16B, 17A, and 17B.

Figure 16A:
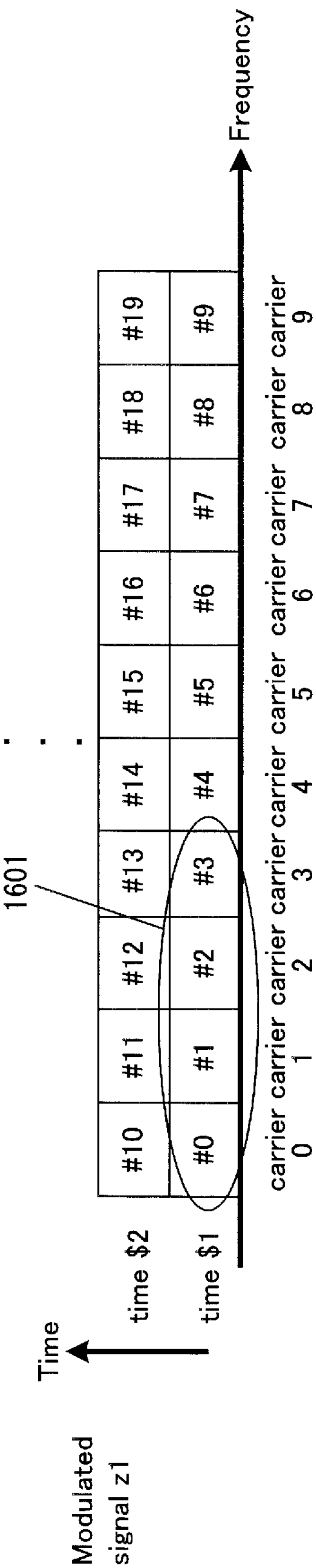
FIGS. 16A and 16B are examples of a frame structure.
Figure 16B:
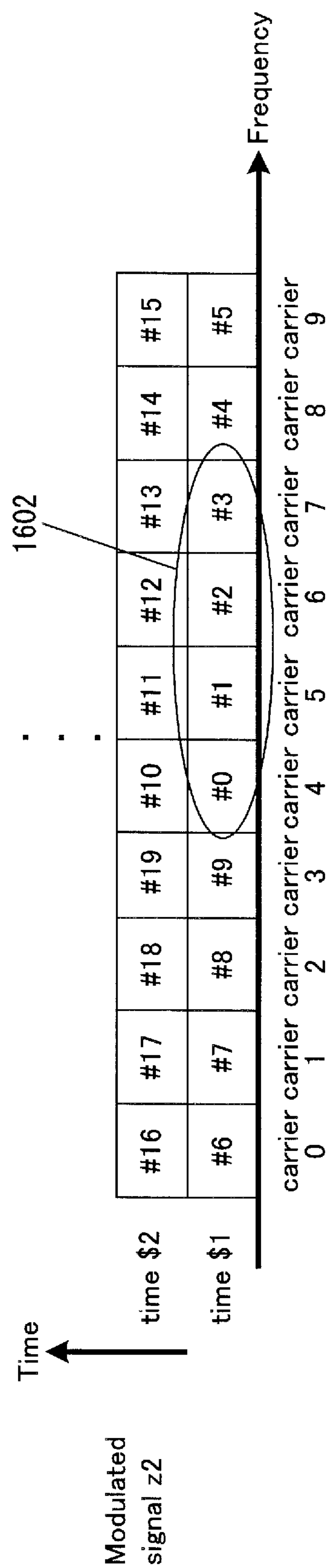

FIGS. 16A and 16B show an example of a scheme of reordering symbols by the reordering units 1404A and 1404B in FIG. 14, the horizontal axis representing frequency, and the vertical axis representing time, that differs from FIGS. 15A and 15B. FIG. 16A shows the reordering scheme for symbols of the modulated signal z1, and FIG. 16B shows the reordering scheme for symbols of the modulated signal z2. The difference in FIGS. 16A and 16B as compared to FIGS. 15A and 15B is that the reordering scheme of the symbols of the modulated signal z1 differs from the reordering scheme of the symbols of the modulated signal z2. In FIG. 16B, symbols #0 through #5 are assigned to carriers 4 through 9, and symbols #6 through #9 are assigned to carriers 0 through 3. Subsequently, symbols #10 through #19 are assigned regularly in the same way. At this point, as in FIGS. 15A and 15B, the symbol group 1601 and the symbol group 1602 shown in FIGS. 16A and 16B are the symbols for one period (cycle) when using the precoding weight hopping scheme shown in FIG. 6.

Figure 17A:
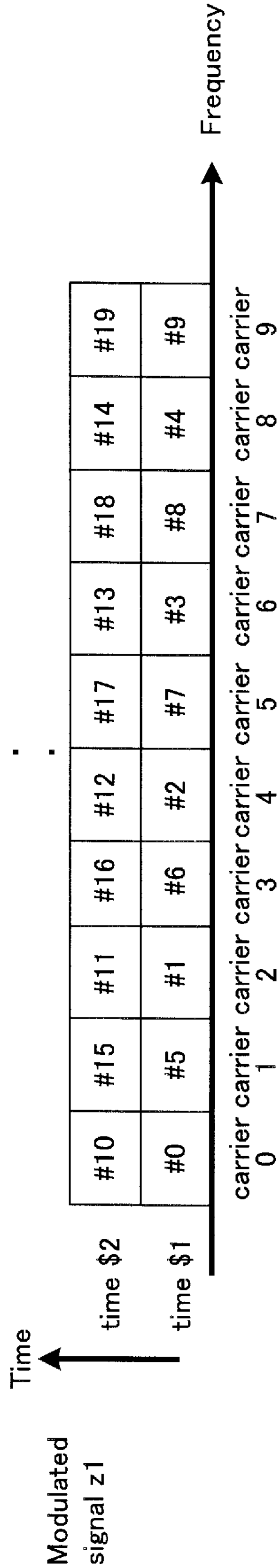
FIGS. 17A and 17B are examples of a frame structure.
Figure 17B:
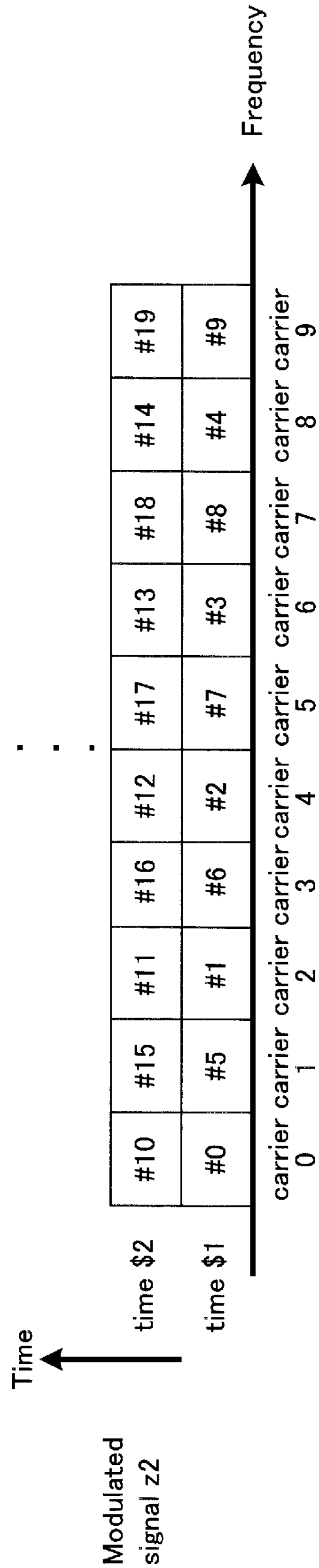

FIGS. 17A and 17B show an example of a scheme of reordering symbols by the reordering units 1404A and 1404B in FIG. 14, the horizontal axis representing frequency, and the vertical axis representing time, that differs from FIGS. 15A and 15B. FIG. 17A shows the reordering scheme for symbols of the modulated signal z1, and FIG. 17B shows the reordering scheme for symbols of the modulated signal z2. The difference in FIGS. 17A and 17B as compared to FIGS. 15A and 15B is that whereas the symbols are arranged in order by carrier in FIGS. 15A and 15B, the symbols are not arranged in order by carrier in FIGS. 17A and 17B. It is obvious that, in FIGS. 17A and 17B, the reordering scheme of the symbols of the modulated signal z1 may differ from the reordering scheme of the symbols of the modulated signal z2, as in FIGS. 16A and 16B.

Figure 18A:
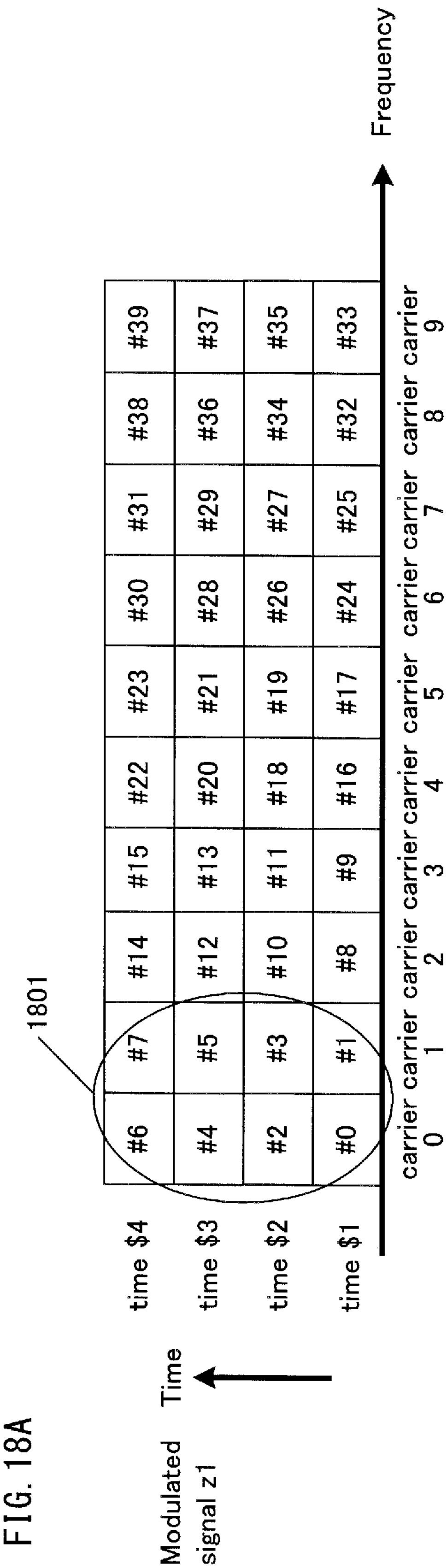
FIGS. 18A and 18B are examples of a frame structure.
Figure 18B:
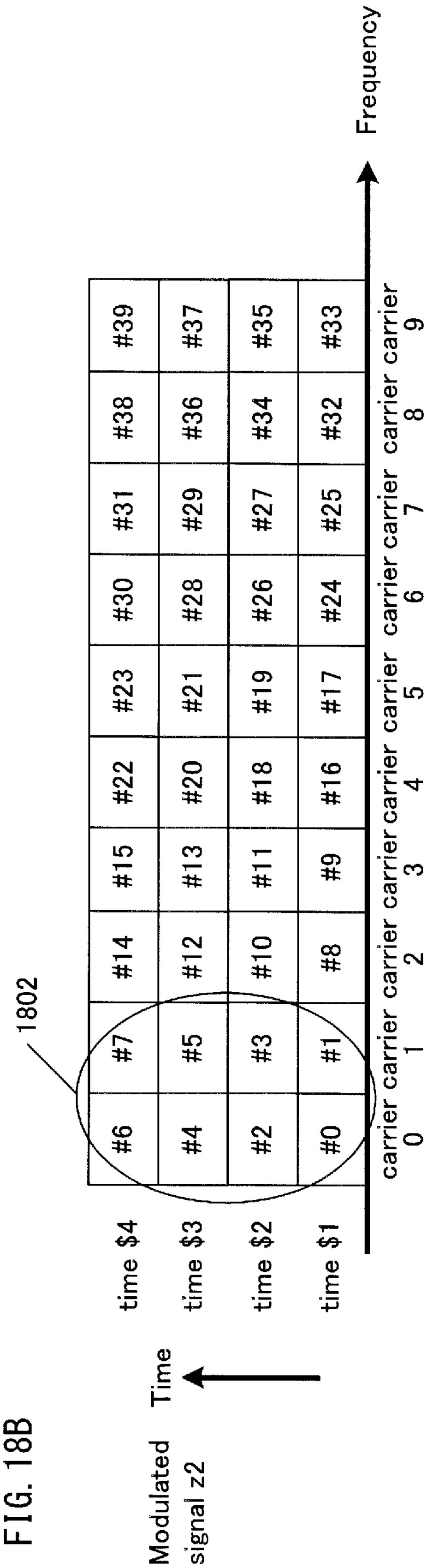

FIGS. 18A and 18B show an example of a scheme of reordering symbols by the reordering units 1404A and 1404B in FIG. 14, the horizontal axis representing frequency, and the vertical axis representing time, that differs from FIGS. 15A through 17B. FIG. 18A shows the reordering scheme for symbols of the modulated signal z1, and FIG. 18B shows the reordering scheme for symbols of the modulated signal z2. In FIGS. 15A through 17B, symbols are arranged in the frequency domain, whereas in FIGS. 18A and 18B, symbols are arranged in both the frequency and time domains.

In FIG. 6, an example has been described of hopping between precoding weights over four slots. Here, however, an example of hopping over eight slots is described. The symbol groups 1801 and 1802 shown in FIGS. 18A and 18B are the symbols for one period (cycle) when using the precoding weight hopping scheme (and are therefore eight-symbol groups). Symbol #0 is the symbol when using the precoding weight of slot 8i. Symbol #1 is the symbol when using the precoding weight of slot 8i+1. Symbol #2 is the symbol when using the precoding weight of slot 8i+2. Symbol #3 is the symbol when using the precoding weight of slot 8i+3. Symbol #4 is the symbol when using the precoding weight of slot 8i+4. Symbol #5 is the symbol when using the precoding weight of slot 8i+5. Symbol #6 is the symbol when using the precoding weight of slot 8i+6. Symbol #7 is the symbol when using the precoding weight of slot 8i+7. Accordingly, symbol #x is as follows. When x mod 8 is 0, the symbol #x is the symbol when using the precoding weight of slot 8i. When x mod 8 is 1, the symbol #x is the symbol when using the precoding weight of slot 8i+1. When x mod 8 is 2, the symbol #x is the symbol when using the precoding weight of slot 8i+2. When x mod 8 is 3, the symbol #x is the symbol when using the precoding weight of slot 8i+3. When x mod 8 is 4, the symbol #x is the symbol when using the precoding weight of slot 8i+4. When x mod 8 is 5, the symbol #x is the symbol when using the precoding weight of slot 8i+5. When x mod 8 is 6, the symbol #x is the symbol when using the precoding weight of slot 8i+6. When x mod 8 is 7, the symbol #x is the symbol when using the precoding weight of slot 8i+7. In the symbol ordering in FIGS. 18A and 18B, four slots in the time domain and two slots in the frequency domain for a total of 4×2=8 slots are used to arrange symbols for one period (cycle). In this case, letting the number of symbols in one period (cycle) be m×n symbols (in other words, m×n precoding weights exist), the number of slots (the number of carriers) in the frequency domain used to arrange symbols in one period (cycle) be n, and the number of slots used in the time domain be m, then m>n should be satisfied. This is because the phase of direct waves fluctuates more slowly in the time domain than in the frequency domain. Therefore, since the precoding weights are changed in the present embodiment to minimize the influence of steady direct waves, it is preferable to reduce the fluctuation in direct waves in the period (cycle) for changing the precoding weights. Accordingly, m>n should be satisfied. Furthermore, considering the above points, rather than reordering symbols only in the frequency domain or only in the time domain, direct waves are more likely to become stable when symbols are reordered in both the frequency and the time domains as in FIGS. 18A and 18B, thereby making it easier to achieve the advantageous effects of the present invention. When symbols are ordered in the frequency domain, however, fluctuations in the frequency domain are abrupt, leading to the possibility of yielding diversity gain. Therefore, reordering in both the frequency and the time domains is not necessarily always the best scheme.

Figure 19A:
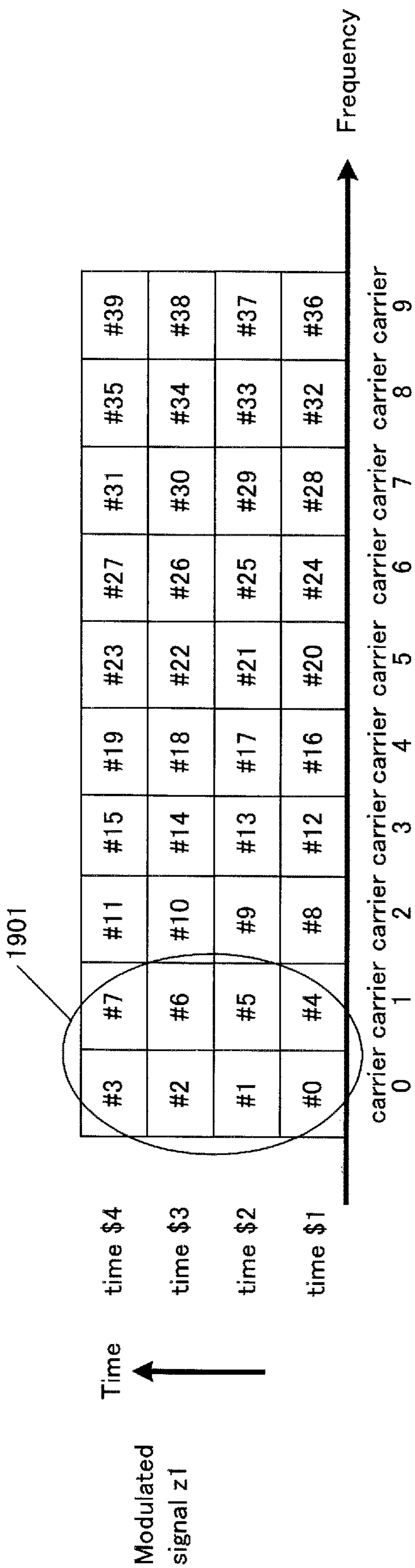
FIGS. 19A and 19B are examples of a frame structure.
Figure 19B:
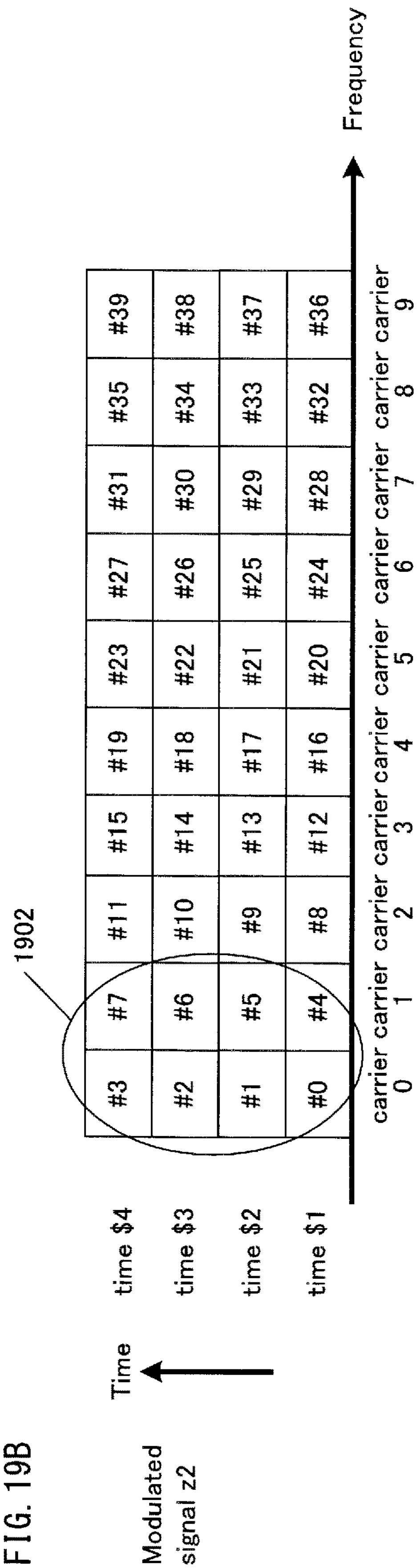

FIGS. 19A and 19B show an example of a scheme of reordering symbols by the reordering units 1404A and 1404B in FIG. 14, the horizontal axis representing frequency, and the vertical axis representing time, that differs from FIGS. 18A and 18B. FIG. 19A shows the reordering scheme for symbols of the modulated signal z1, and FIG. 19B shows the reordering scheme for symbols of the modulated signal z2. As in FIGS. 18A and 18B, FIGS. 19A and 19B show arrangement of symbols using both the frequency and the time axes. The difference as compared to FIGS. 18A and 18B is that, whereas symbols are arranged first in the frequency domain and then in the time domain in FIGS. 18A and 18B, symbols are arranged first in the time domain and then in the frequency domain in FIGS. 19A and 19B. In FIGS. 19A and 19B, the symbol group 1901 and the symbol group 1902 are the symbols for one period (cycle) when using the precoding hopping scheme.

Note that in FIGS. 18A, 18B, 19A, and 19B, as in FIGS. 16A and 16B, the present invention may be similarly embodied, and the advantageous effect of high reception quality achieved, with the symbol arranging scheme of the modulated signal z1 differing from the symbol arranging scheme of the modulated signal z2. Furthermore, in FIGS. 18A, 18B, 19A, and 19B, as in FIGS. 17A and 17B, the present invention may be similarly embodied, and the advantageous effect of high reception quality achieved, without arranging the symbols in order.

Figure 27:
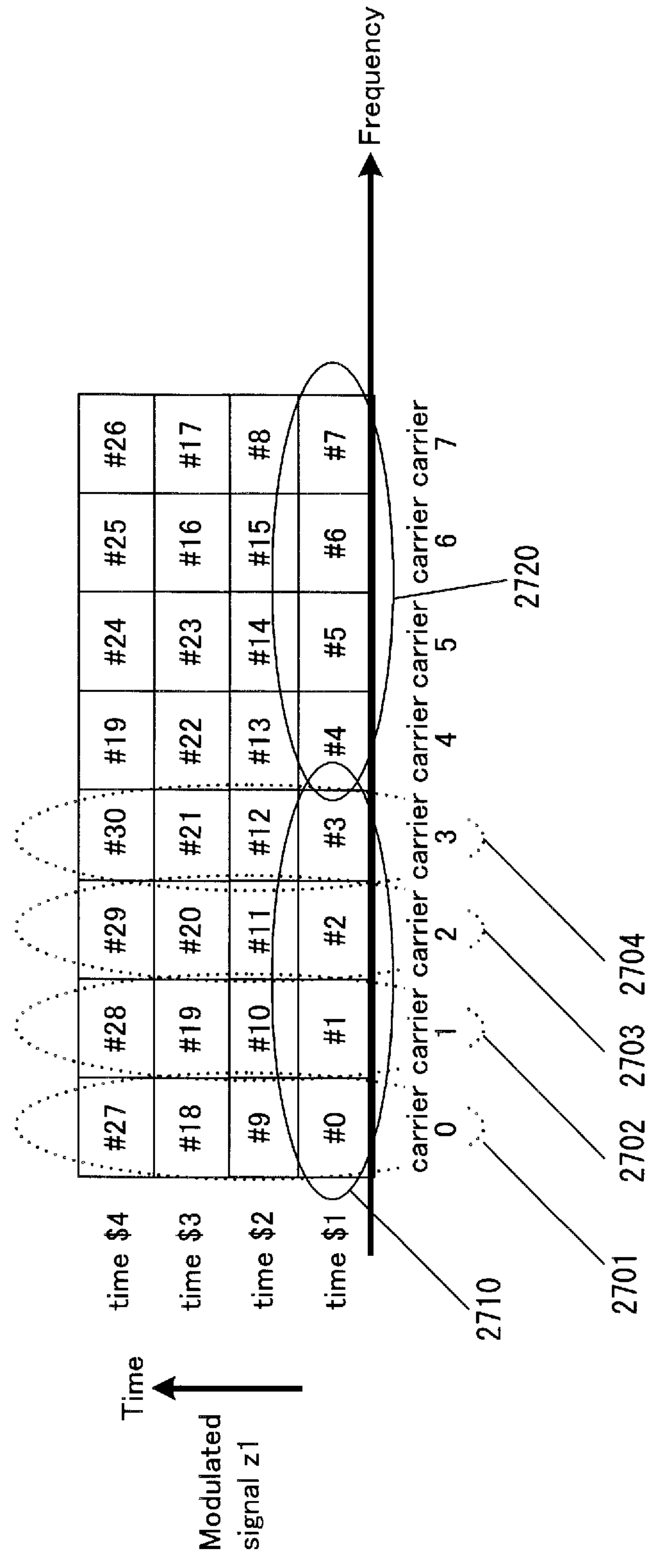
FIG. 27 is an example of a scheme for reordering symbols.

FIG. 27 shows an example of a scheme of reordering symbols by the reordering units 1404A and 1404B in FIG. 14, the horizontal axis representing frequency, and the vertical axis representing time, that differs from the above examples. The case of hopping between precoding matrices regularly over four slots, as in Equations 37-40, is considered. The characteristic feature of FIG. 27 is that symbols are arranged in order in the frequency domain, but when progressing in the time domain, symbols are cyclically shifted by n symbols (in the example in FIG. 27, n=1). In the four symbols shown in the symbol group 2710 in the frequency domain in FIG. 27, precoding hops between the precoding matrices of Equations 37-40.

In this case, symbol #0 is precoded using the precoding matrix in Equation 37, symbol #1 is precoded using the precoding matrix in Equation 38, symbol #2 is precoded using the precoding matrix in Equation 39, and symbol #3 is precoded using the precoding matrix in Equation 40.

Similarly, for the symbol group 2720 in the frequency domain, symbol #4 is precoded using the precoding matrix in Equation 37, symbol #5 is precoded using the precoding matrix in Equation 38, symbol #6 is precoded using the precoding matrix in Equation 39, and symbol #7 is precoded using the precoding matrix in Equation 40.

For the symbols at time $1, precoding hops between the above precoding matrices, but in the time domain, symbols are cyclically shifted. Therefore, precoding hops between precoding matrices for the symbol groups 2701, 2702, 2703, and 2704 as follows.

In the symbol group 2701 in the time domain, symbol #0 is precoded using the precoding matrix in Equation 37, symbol #9 is precoded using the precoding matrix in Equation 38, symbol #18 is precoded using the precoding matrix in Equation 39, and symbol #27 is precoded using the precoding matrix in Equation 40.

In the symbol group 2702 in the time domain, symbol #28 is precoded using the precoding matrix in Equation 37, symbol #1 is precoded using the precoding matrix in Equation 38, symbol #10 is precoded using the precoding matrix in Equation 39, and symbol #19 is precoded using the precoding matrix in Equation 40.

In the symbol group 2703 in the time domain, symbol #20 is precoded using the precoding matrix in Equation 37, symbol #29 is precoded using the precoding matrix in Equation 38, symbol #2 is precoded using the precoding matrix in Equation 39, and symbol #11 is precoded using the precoding matrix in Equation 40.

In the symbol group 2704 in the time domain, symbol #12 is precoded using the precoding matrix in Equation 37, symbol #21 is precoded using the precoding matrix in Equation 38, symbol #30 is precoded using the precoding matrix in Equation 39, and symbol #3 is precoded using the precoding matrix in Equation 40.

The characteristic of FIG. 27 is that, for example focusing on symbol #11, the symbols on either side in the frequency domain at the same time (symbols #10 and #12) are both precoded with a different precoding matrix than symbol #11, and the symbols on either side in the time domain in the same carrier (symbols #2 and #20) are both precoded with a different precoding matrix than symbol #11. This is true not only for symbol #11. Any symbol having symbols on either side in the frequency domain and the time domain is characterized in the same way as symbol #11. As a result, precoding matrices are effectively hopped between, and since the influence on stable conditions of direct waves is reduced, the possibility of improved reception quality of data increases.

In FIG. 27, the case of n=1 has been described, but n is not limited in this way. The present invention may be similarly embodied with n=3. Furthermore, in FIG. 27, when symbols are arranged in the frequency domain and time progresses in the time domain, the above characteristic is achieved by cyclically shifting the number of the arranged symbol, but the above characteristic may also be achieved by randomly (or regularly) arranging the symbols.

Embodiment 2

In Embodiment 1, regular hopping of the precoding weights as shown in FIG. 6 has been described. In the present embodiment, a scheme for designing specific precoding weights that differ from the precoding weights in FIG. 6 is described.

In FIG. 6, the scheme for hopping between the precoding weights in Equations 37-40 has been described. By generalizing this scheme, the precoding weights may be changed as follows. (The hopping period (cycle) for the precoding weights has four slots, and Equations are listed similarly to Equations 37-40.) For symbol number 4i (where i is an integer greater than or equal to zero):

Math 42

Equation 42

$$\begin{pmatrix} z1(4i) \\ z2(4i) \end{pmatrix} = \frac{1}{\sqrt{2}} \begin{pmatrix} e^{j\theta_{11}(4i)} & e^{j(\theta_{11}(4i)+\lambda)} \\ e^{j\theta_{21}(4i)} & e^{j(\theta_{21}(4i)+\lambda+\delta)} \end{pmatrix} \begin{pmatrix} s1(4i) \\ s2(4i) \end{pmatrix}$$

Here, j is an imaginary unit.

For symbol number 4i+1:

Math 43

Equation 43

$$\begin{pmatrix} z1(4i+1) \\ z2(4i+1) \end{pmatrix} = \frac{1}{\sqrt{2}} \begin{pmatrix} e^{j\theta_{11}(4i+1)} & e^{j(\theta_{11}(4i+1)+\lambda)} \\ e^{j\theta_{21}(4i+1)} & e^{j(\theta_{21}(4i+1)+\lambda+\delta)} \end{pmatrix} \begin{pmatrix} s1(4i+1) \\ s2(4i+1) \end{pmatrix}$$

For symbol number 4i+2:

Math 44

Equation 44

$$\begin{pmatrix} z1(4i+2) \\ z2(4i+2) \end{pmatrix} = \frac{1}{\sqrt{2}} \begin{pmatrix} e^{j\theta_{11}(4i+2)} & e^{j(\theta_{11}(4i+2)+\lambda)} \\ e^{j\theta_{21}(4i+2)} & e^{j(\theta_{21}(4i+2)+\lambda+\delta)} \end{pmatrix} \begin{pmatrix} s1(4i+2) \\ s2(4i+2) \end{pmatrix}$$

For symbol number 4i+3:

Math 45

Equation 45

$$\begin{pmatrix} z1(4i+3) \\ z2(4i+3) \end{pmatrix} = \frac{1}{\sqrt{2}} \begin{pmatrix} e^{j\theta_{11}(4i+3)} & e^{j(\theta_{11}(4i+3)+\lambda)} \\ e^{j\theta_{21}(4i+3)} & e^{j(\theta_{21}(4i+3)+\lambda+\delta)} \end{pmatrix} \begin{pmatrix} s1(4i+3) \\ s2(4i+3) \end{pmatrix}$$

From Equations 36 and 41, the received vector R(t)=(r1($t$), r2($t$))$^T$ can be represented as follows.

For symbol number 4i:

Math 46

Equation 46

$$\begin{pmatrix} r1(4i) \\ r2(4i) \end{pmatrix} = \frac{1}{\sqrt{2}} \begin{pmatrix} h_{11}(4i) & h_{12}(4i) \\ h_{21}(4i) & h_{22}(4i) \end{pmatrix} \begin{pmatrix} e^{j\theta_{11}(4i)} & e^{j(\theta_{11}(4i)+\lambda)} \\ e^{j\theta_{21}(4i)} & e^{j(\theta_{21}(4i)+\lambda+\delta)} \end{pmatrix} \begin{pmatrix} s1(4i) \\ s2(4i) \end{pmatrix}$$

For symbol number 4i+1:

Math 47

$$\begin{pmatrix} r1(4i+1) \\ r2(4i+1) \end{pmatrix} = \frac{1}{\sqrt{2}} \begin{pmatrix} h_{11}(4i+1) & h_{12}(4i+1) \\ h_{21}(4i+1) & h_{22}(4i+1) \end{pmatrix} \begin{pmatrix} e^{j\theta_{11}(4i+1)} & e^{j(\theta_{11}(4i+1)+\lambda)} \\ e^{j\theta_{21}(4i+1)} & e^{j(\theta_{21}(4i+1)+\lambda+\delta)} \end{pmatrix} \begin{pmatrix} s1(4i+1) \\ s2(4i+1) \end{pmatrix} \quad \text{Equation 47}$$

For symbol number 4i+2:

Math 48

$$\begin{pmatrix} r1(4i+2) \\ r2(4i+2) \end{pmatrix} = \frac{1}{\sqrt{2}} \begin{pmatrix} h_{11}(4i+2) & h_{12}(4i+2) \\ h_{21}(4i+2) & h_{22}(4i+2) \end{pmatrix} \begin{pmatrix} e^{j\theta_{11}(4i+2)} & e^{j(\theta_{11}(4i+2)+\lambda)} \\ e^{j\theta_{21}(4i+2)} & e^{j(\theta_{21}(4i+2)+\lambda+\delta)} \end{pmatrix} \begin{pmatrix} s1(4i+2) \\ s2(4i+2) \end{pmatrix} \quad \text{Equation 48}$$

For symbol number 4i+3:

Math 49

$$\begin{pmatrix} r1(4i+3) \\ r2(4i+3) \end{pmatrix} = \frac{1}{\sqrt{2}} \begin{pmatrix} h_{11}(4i+3) & h_{12}(4i+3) \\ h_{21}(4i+3) & h_{22}(4i+3) \end{pmatrix} \begin{pmatrix} e^{j\theta_{11}(4i+3)} & e^{j(\theta_{11}(4i+3)+\lambda)} \\ e^{j\theta_{21}(4i+3)} & e^{j(\theta_{21}(4i+3)+\lambda+\delta)} \end{pmatrix} \begin{pmatrix} s1(4i+3) \\ s2(4i+3) \end{pmatrix} \quad \text{Equation 49}$$

In this case, it is assumed that only components of direct waves exist in the channel elements $h_{11}(t)$, $h_{12}(t)$, $h_{21}(t)$, and $h_{22}(t)$, that the amplitude components of the direct waves are all equal, and that fluctuations do not occur over time. With these assumptions, Equations 46-49 can be represented as follows.

For symbol number 4i:

Math 50

$$\begin{pmatrix} r1(4i) \\ r2(4i) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(4i)} & e^{j(\theta_{11}(4i)+\lambda)} \\ e^{j\theta_{21}(4i)} & e^{j(\theta_{21}(4i)+\lambda+\delta)} \end{pmatrix} \begin{pmatrix} s1(4i) \\ s2(4i) \end{pmatrix} \quad \text{Equation 50}$$

For symbol number 4i+1:

Math 51

$$\begin{pmatrix} r1(4i+1) \\ r2(4i+1) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(4i+1)} & e^{j(\theta_{11}(4i+1)+\lambda)} \\ e^{j\theta_{21}(4i+1)} & e^{j(\theta_{21}(4i+1)+\lambda+\delta)} \end{pmatrix} \begin{pmatrix} s1(4i+1) \\ s2(4i+1) \end{pmatrix} \quad \text{Equation 51}$$

For symbol number 4i+2:

Math 52

$$\begin{pmatrix} r1(4i+2) \\ r2(4i+2) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(4i+2)} & e^{j(\theta_{11}(4i+2)+\lambda)} \\ e^{j\theta_{21}(4i+2)} & e^{j(\theta_{21}(4i+2)+\lambda+\delta)} \end{pmatrix} \begin{pmatrix} s1(4i+2) \\ s2(4i+2) \end{pmatrix} \quad \text{Equation 52}$$

For symbol number 4i+3:

Math 53

$$\begin{pmatrix} r1(4i+3) \\ r2(4i+3) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(4i+3)} & e^{j(\theta_{11}(4i+3)+\lambda)} \\ e^{j\theta_{21}(4i+3)} & e^{j(\theta_{21}(4i+3)+\lambda+\delta)} \end{pmatrix} \begin{pmatrix} s1(4i+3) \\ s2(4i+3) \end{pmatrix} \quad \text{Equation 53}$$

In Equations 50-53, let A be a positive real number and q be a complex number. The values of A and q are determined in accordance with the positional relationship between the transmission device and the reception device. Equations 50-53 can be represented as follows.

For symbol number 4i:

Math 54

$$\begin{pmatrix} r1(4i) \\ r2(4i) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(4i)} & e^{j(\theta_{11}(4i)+\lambda)} \\ e^{j\theta_{21}(4i)} & e^{j(\theta_{21}(4i)+\lambda+\delta)} \end{pmatrix} \begin{pmatrix} s1(4i) \\ s2(4i) \end{pmatrix} \quad \text{Equation 54}$$

For symbol number 4i+1:

Math 55

$$\begin{pmatrix} r1(4i+1) \\ r2(4i+1) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(4i+1)} & e^{j(\theta_{11}(4i+1)+\lambda)} \\ e^{j\theta_{21}(4i+1)} & e^{j(\theta_{21}(4i+1)+\lambda+\delta)} \end{pmatrix} \begin{pmatrix} s1(4i+1) \\ s2(4i+1) \end{pmatrix} \quad \text{Equation 55}$$

For symbol number 4i+2:

Math 56

$$\begin{pmatrix} r1(4i+2) \\ r2(4i+2) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(4i+2)} & e^{j(\theta_{11}(4i+2)+\lambda)} \\ e^{j\theta_{21}(4i+2)} & e^{j(\theta_{21}(4i+2)+\lambda+\delta)} \end{pmatrix} \begin{pmatrix} s1(4i+2) \\ s2(4i+2) \end{pmatrix} \quad \text{Equation 56}$$

For symbol number 4i+3:

Math 57

$$\begin{pmatrix} r1(4i+3) \\ r2(4i+3) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(4i+3)} & e^{j(\theta_{11}(4i+3)+\lambda)} \\ e^{j\theta_{21}(4i+3)} & e^{j(\theta_{21}(4i+3)+\lambda+\delta)} \end{pmatrix} \begin{pmatrix} s1(4i+3) \\ s2(4i+3) \end{pmatrix} \quad \text{Equation 57}$$

As a result, when q is represented as follows, a signal component based on one of s1 and s2 is no longer included in r1 and r2, and therefore one of the signals s1 and s2 can no longer be obtained.

For symbol number 4i:

Math 58

$$q=-A_e^{j(\theta_{11}(4i)-\theta_{21}(4i))},-A_e^{j(\theta_{11}(4i)-\theta_{21}(4i)-\delta)} \quad \text{Equation 58}$$

For symbol number 4i+1:

Math 59

$$q=-A_e^{j(\theta_{11}(4i+1)-\theta_{21}(4i+1))},-A_e^{j(\theta_{11}(4i+1)-\theta_{21}(4i+1)-\delta)} \quad \text{Equation 59}$$

For symbol number 4i+2:

Math 60

$$q=-A_e^{j(\theta_{11}(4i+2)-\theta_{21}(4i+2))},-A_e^{j(\theta_{11}(4i+2)-\theta_{21}(4i+2)-\delta)} \quad \text{Equation 60}$$

For symbol number 4i+3:

Math 61

$$q=-A_e^{j(\theta_{11}(4i+3)-\theta_{21}(4i+3))},\ -A_e^{j(\theta_{11}(4i+3)-\theta_{21}(4i+3)-\delta)} \quad \text{Equation 61}$$

In this case, if q has the same solution in symbol numbers 4i, 4i+1, 4i+2, and 4i+3, then the channel elements of the direct waves do not greatly fluctuate. Therefore, a reception device having channel elements in which the value of q is equivalent to the same solution can no longer obtain excellent reception quality for any of the symbol numbers. Therefore, it is difficult to achieve the ability to correct errors, even if error correction codes are introduced. Accordingly, for q not to have the same solution, the following condition is necessary from Equations 58-61 when focusing on one of two solutions of q which does not include S.

Math 62

$$e^{j(\theta_{11}(4i+x)-\theta_{21}(4i+x))} \neq e^{j(\theta_{11}(4i+y)-\theta_{21}(4i+y))} \quad \text{Condition \#1}$$

for ∀x, ∀y (x≠y; x,y=0, 1, 2, 3)

(x is 0, 1, 2, 3; y is 0, 1, 2, 3; and x≠y.)

In an example fulfilling Condition #1, values are set as follows:

(Example #1)

(1) $\theta_{11}(4i)=\theta_{11}(4i+1)=\theta_{11}(4i+2)=\theta_{11}(4i+3)=0$ radians, (2) $\theta_{21}(4i)=0$ radians, (3) $\theta_{21}(4i+1)=\pi/2$ radians, (4) $\theta_{21}(4i+2)=\pi$ radians, and (5) $\theta_{21}(4i+3)=3\pi/2$ radians.

(The above is an example. It suffices for one each of zero radians, π/2 radians, π radians, and 3π/2 radians to exist for the set ($\theta_{21}(4i)$, $\theta_{21}(4i+1)$, $\theta_{21}(4i+2)$, $\theta_{21}(4i+3)$).) In this case, in particular under condition (1), there is no need to perform signal processing (rotation processing) on the baseband signal S1(*t*), which therefore offers the advantage of a reduction in circuit size. Another example is to set values as follows.

(Example #2)

(6) $\theta_{11}(4i)=0$ radians, (7) $\theta_{11}(4i+1)=\pi/2$ radians, (8) $\theta_{11}(4i+2)=\pi$ radians, (9) $\theta_{11}(4i+3)=3\pi/2$ radians, and

(10) $\theta_{21}(4i)=\theta_{21}(4i+1)=\theta_{21}(4i+2)=\theta_{21}(4i+3)=0$ radians.

(The above is an example. It suffices for one each of zero radians, π/2 radians, π radians, and 3π/2 radians to exist for the set ($\theta_{11}(4i)$, $\theta_{11}(4i+1)$, $\theta_{11}(4i+2)$, $\theta_{11}(4i+3)$).) In this case, in particular under condition (6), there is no need to perform signal processing (rotation processing) on the baseband signal S2(*t*), which therefore offers the advantage of a reduction in circuit size. Yet another example is as follows.

(Example #3)

(11) $\theta_{11}(4i)=\theta_{11}(4i+1)=\theta_{11}(4i+2)=\theta_{11}(4i+3)=0$ radians,

(12) $\theta_{21}(4i)=0$ radians,

(13) $\theta_{21}(4i+1)=\pi/4$ radians,

(14) $\theta_{21}(4i+2)=\pi/2$ radians, and

(15) $\theta_{21}(4i+3)=3\pi/4$ radians.

(The above is an example. It suffices for one each of zero radians, π/4 radians, π/2 radians, and 3π/4 radians to exist for the set ($\theta_{21}(4i)$, $\theta_{21}(4i+1)$, $\theta_{21}(4i+2)$, $\theta_{21}(4i+3)$).)

(Example #4)

(16) $\theta_{11}(4i)=0$ radians,

(17) $\theta_{11}(4i+1)=\pi/4$ radians,

(18) $\theta_{11}(4i+2)=\pi/2$ radians,

(19) $\theta_{11}(4i+3)=3\pi/4$ radians, and

(20) $\theta_{21}(4i)=\theta_{21}(4i+1)=\theta_{21}(4i+2)=\theta_{21}(4i+3)=0$ radians.

(The above is an example. It suffices for one each of zero radians, π/4 radians, π/2 radians, and 3π/4 radians to exist for the set ($\theta_{11}(4i)$, $\theta_{11}(4i+1)$, $\theta_{11}(4i+2)$, $\theta_{11}(4i+3)$).)

While four examples have been shown, the scheme of satisfying Condition #1 is not limited to these examples.

Next, design requirements for not only $\theta_{11}$ and $\theta_{12}$, but also for λ and δ are described. It suffices to set λ to a certain value; it is then necessary to establish requirements for δ. The following describes the design scheme for δ when λ is set to zero radians.

In this case, by defining δ so that π/2 radians ≤|δ|≤π radians, excellent reception quality is achieved, particularly in an LOS environment.

Incidentally, for each of the symbol numbers 4i, 4i+1, 4i+2, and 4i+3, two points q exist where reception quality becomes poor. Therefore, a total of 2×4=8 such points exist. In an LOS environment, in order to prevent reception quality from degrading in a specific reception terminal, these eight points should each have a different solution. In this case, in addition to Condition #1, Condition #2 is necessary.

Math 63

$$e^{j(\theta_{11}(4i+x)-\theta_{21}(4i+x))} \neq e^{j(\theta_{11}(4i+y)-\theta_{21}(4i+y)-\delta)}$$

for ∀x, ∀y (x,y=0, 1, 2, 3)

and $$e^{j(\theta_{11}(4i+x)-\theta_{21}(4i+x)-\delta)} \neq e^{j(\theta_{11}(4i+y)-\theta_{21}(4i+y)-\delta)} \quad \text{Condition \#2}$$

for ∀x, ∀y (x≠y; x,y=0, 1, 2, 3)

Additionally, the phase of these eight points should be evenly distributed (since the phase of a direct wave is considered to have a high probability of even distribution). The following describes the design scheme for δ to satisfy this requirement.

Figure 20:
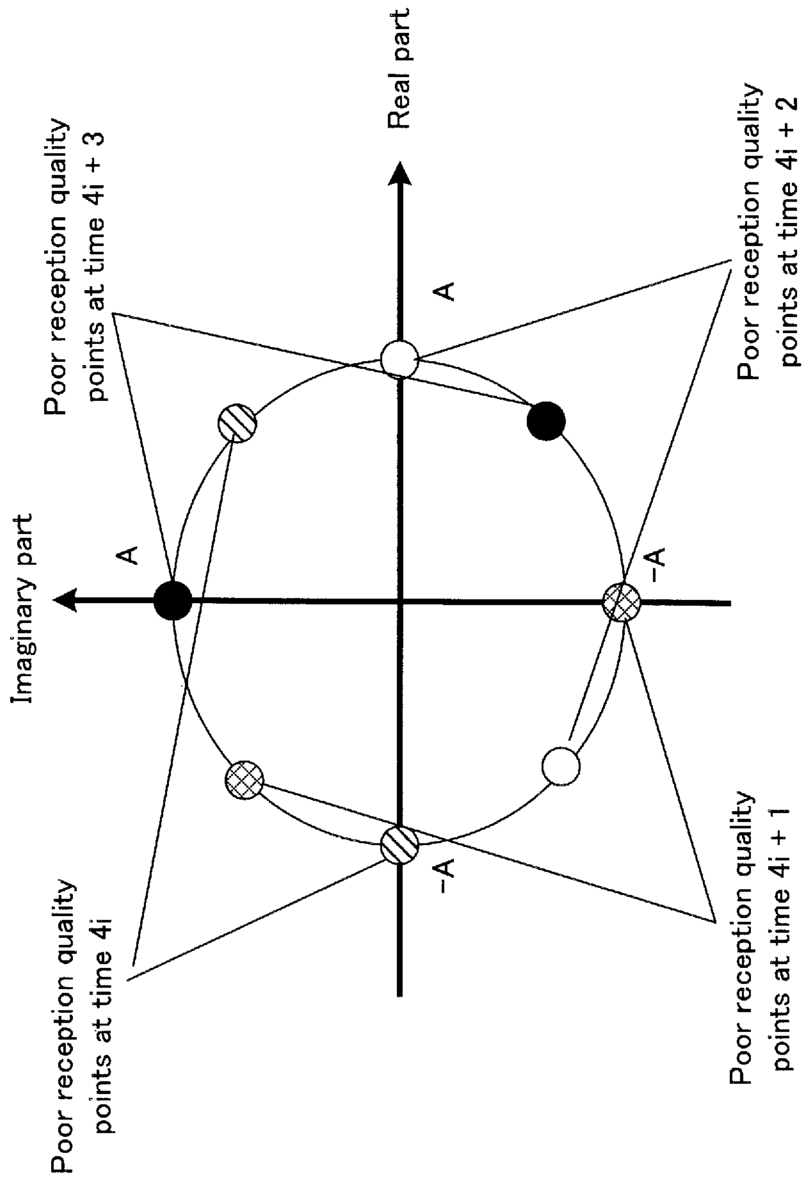
FIG. 20 shows positions of poor reception quality points.
Figure 21:
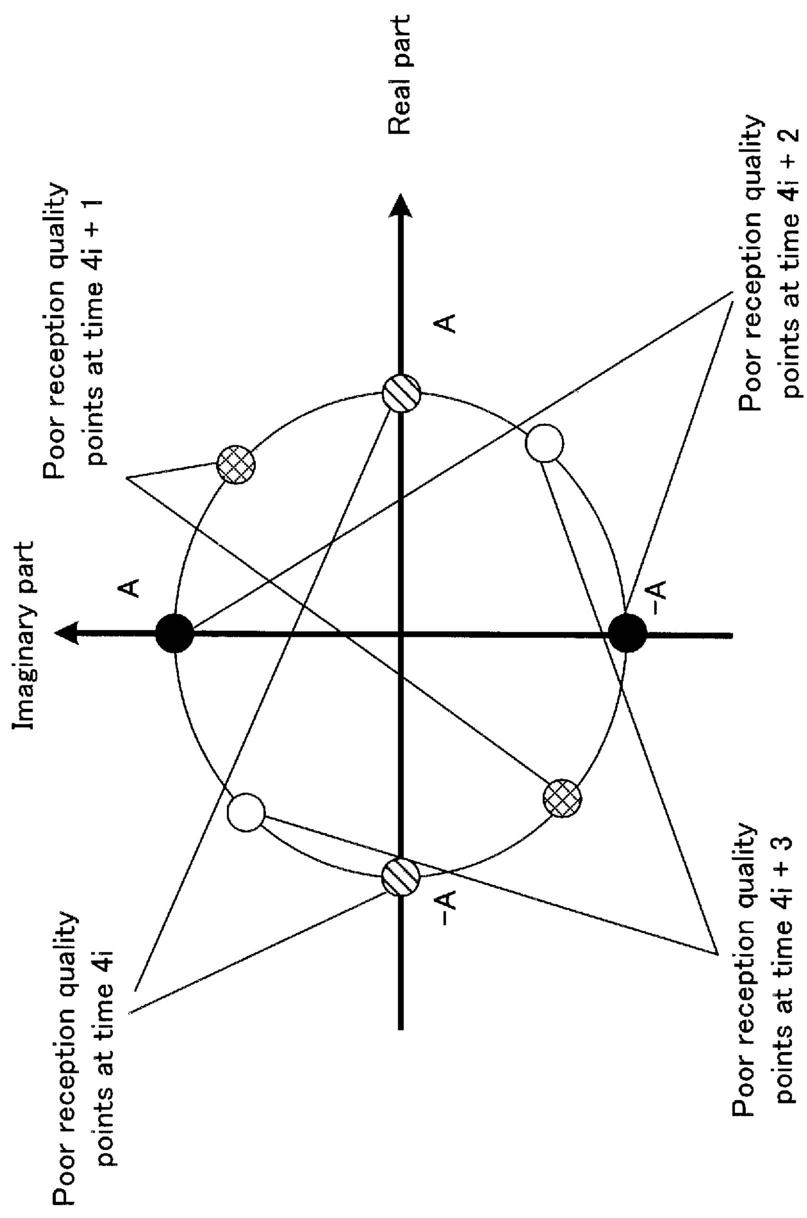
FIG. 21 shows positions of poor reception quality points.

In the case of example #1 and example #2, the phase becomes even at the points at which reception quality is poor by setting δ to ±3π/4 radians. For example, letting δ be 3π/4 radians in example #1 (and letting A be a positive real number), then each of the four slots, points at which reception quality becomes poor exist once, as shown in FIG. 20. In the case of example #3 and example #4, the phase becomes even at the points at which reception quality is poor by setting δ to ±π radians. For example, letting δ be π radians in example #3, then in each of the four slots, points at which reception quality becomes poor exist once, as shown in FIG. 21. (If the element q in the channel matrix H exists at the points shown in FIGS. 20 and 21, reception quality degrades.)

With the above structure, excellent reception quality is achieved in an LOS environment. Above, an example of changing precoding weights in a four-slot period (cycle) is described, but below, changing precoding weights in an N-slot period (cycle) is described. Making the same considerations as in Embodiment 1 and in the above description, processing represented as below is performed on each symbol number.

For symbol number Ni (where i is an integer greater than or equal to zero):

Math 64

$$\begin{pmatrix} z1(Ni) \\ z2(Ni) \end{pmatrix} = \frac{1}{\sqrt{2}}\begin{pmatrix} e^{j\theta_{11}(Ni)} & e^{j(\theta_{11}(Ni)+\lambda)} \\ e^{j\theta_{21}(Ni)} & e^{j(\theta_{21}(Ni)+\lambda+\delta)} \end{pmatrix}\begin{pmatrix} s1(Ni) \\ s2(Ni) \end{pmatrix} \quad \text{Equation 62}$$

Here, j is an imaginary unit.

For symbol number Ni+1:

Math 65

$$\begin{pmatrix} z1(Ni+1) \\ z2(Ni+1) \end{pmatrix} = \frac{1}{\sqrt{2}}\begin{pmatrix} e^{j\theta_{11}(Ni+1)} & e^{j(\theta_{11}(Ni+1)+\lambda)} \\ e^{j\theta_{21}(Ni+1)} & e^{j(\theta_{21}(Ni+1)+\lambda+\delta)} \end{pmatrix}\begin{pmatrix} s1(Ni+1) \\ s2(Ni+1) \end{pmatrix} \quad \text{Equation 63}$$

When generalized, this equation is as follows.

For symbol number Ni+k (k=0, 1, . . . , N−1):

Math 66

$$\begin{pmatrix} z1(Ni+k) \\ z2(Ni+k) \end{pmatrix} = \frac{1}{\sqrt{2}}\begin{pmatrix} e^{j\theta_{11}(Ni+k)} & e^{j(\theta_{11}(Ni+k)+\lambda)} \\ e^{j\theta_{21}(Ni+k)} & e^{j(\theta_{21}(Ni+k)+\lambda+\delta)} \end{pmatrix}\begin{pmatrix} s1(Ni+k) \\ s2(Ni+k) \end{pmatrix} \quad \text{Equation 64}$$

Furthermore, for symbol number Ni+N−1:

Math 67

$$\begin{pmatrix} z1(Ni+N-1) \\ z2(Ni+N-1) \end{pmatrix} = \frac{1}{\sqrt{2}}\begin{pmatrix} e^{j\theta_{11}(Ni+N-1)} & e^{j(\theta_{11}(Ni+N-1)+\lambda)} \\ e^{j\theta_{21}(Ni+N-1)} & e^{j(\theta_{21}(Ni+N-1)+\lambda+\delta)} \end{pmatrix}\begin{pmatrix} s1(Ni+N-1) \\ s2(Ni+N-1) \end{pmatrix} \quad \text{Equation 65}$$

Accordingly, r1 and r2 are represented as follows.

For symbol number Ni (where i is an integer greater than or equal to zero):

Math 68

$$\begin{pmatrix} r1(Ni) \\ r2(Ni) \end{pmatrix} = \frac{1}{\sqrt{2}}\begin{pmatrix} h_{11}(Ni) & h_{12}(Ni) \\ h_{21}(Ni) & h_{22}(Ni) \end{pmatrix}\begin{pmatrix} e^{j\theta_{11}(Ni)} & e^{j(\theta_{11}(Ni)+\lambda)} \\ e^{j\theta_{21}(Ni)} & e^{j(\theta_{21}(Ni)+\lambda+\delta)} \end{pmatrix}\begin{pmatrix} s1(Ni) \\ s2(Ni) \end{pmatrix} \quad \text{Equation 66}$$

Here, j is an imaginary unit.

For symbol number Ni+1:

Math 69

$$\begin{pmatrix} r1(Ni+1) \\ r2(Ni+1) \end{pmatrix} = \frac{1}{\sqrt{2}}\begin{pmatrix} h_{11}(Ni+1) & h_{12}(Ni+1) \\ h_{21}(Ni+1) & h_{22}(Ni+1) \end{pmatrix}\begin{pmatrix} e^{j\theta_{11}(Ni+1)} & e^{j(\theta_{11}(Ni+1)+\lambda)} \\ e^{j\theta_{21}(Ni+1)} & e^{j(\theta_{21}(Ni+1)+\lambda+\delta)} \end{pmatrix}\begin{pmatrix} s1(Ni+1) \\ s2(Ni+1) \end{pmatrix} \quad \text{Equation 67}$$

When generalized, this equation is as follows.

For symbol number Ni+k (k=0, 1, . . . , N−1):

Math 70

$$\begin{pmatrix} r1(Ni+k) \\ r2(Ni+k) \end{pmatrix} = \frac{1}{\sqrt{2}}\begin{pmatrix} h_{11}(Ni+k) & h_{12}(Ni+k) \\ h_{21}(Ni+k) & h_{22}(Ni+k) \end{pmatrix}\begin{pmatrix} e^{j\theta_{11}(Ni+k)} & e^{j(\theta_{11}(Ni+k)+\lambda)} \\ e^{j\theta_{21}(Ni+k)} & e^{j(\theta_{21}(Ni+k)+\lambda+\delta)} \end{pmatrix}\begin{pmatrix} s1(Ni+k) \\ s2(Ni+k) \end{pmatrix} \quad \text{Equation 68}$$

Furthermore, for symbol number Ni+N−1:

Math 71

$$\begin{pmatrix} r1(Ni+N-1) \\ r2(Ni+N-1) \end{pmatrix} = \frac{1}{\sqrt{2}}\begin{pmatrix} h_{11}(Ni+N-1) & h_{12}(Ni+N-1) \\ h_{21}(Ni+N-1) & h_{22}(Ni+N-1) \end{pmatrix}\begin{pmatrix} e^{j\theta_{11}(Ni+N-1)} & e^{j(\theta_{11}(Ni+N-1)+\lambda)} \\ e^{j\theta_{21}(Ni+N-1)} & e^{j(\theta_{21}(Ni+N-1)+\lambda+\delta)} \end{pmatrix}\begin{pmatrix} s1(Ni+N-1) \\ s2(Ni+N-1) \end{pmatrix} \quad \text{Equation 69}$$

In this case, it is assumed that only components of direct waves exist in the channel elements $h_{11}(t)$, $h_{12}(t)$, $h_{21}(t)$, and $h_{22}(t)$, that the amplitude components of the direct waves are all equal, and that fluctuations do not occur over time. With these assumptions, Equations 66-69 can be represented as follows.

For symbol number Ni (where i is an integer greater than or equal to zero):

Math 72

$$\begin{pmatrix} r1(Ni) \\ r2(Ni) \end{pmatrix} = \frac{1}{\sqrt{2}}\begin{pmatrix} Ae^{j0} & q \\ Ae^{j0} & q \end{pmatrix}\begin{pmatrix} e^{j\theta_{11}(Ni)} & e^{j(\theta_{11}(Ni)+\lambda)} \\ e^{j\theta_{21}(Ni)} & e^{j(\theta_{21}(Ni)+\lambda+\delta)} \end{pmatrix}\begin{pmatrix} s1(Ni) \\ s2(Ni) \end{pmatrix} \quad \text{Equation 70}$$

Here, j is an imaginary unit.

For symbol number Ni+1:

Math 73

$$\begin{pmatrix} r1(Ni+1) \\ r2(Ni+1) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(Ni+1)} & e^{j(\theta_{11}(Ni+1)+\lambda)} \\ e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix} \quad \text{Equation 71}$$

When generalized, this equation is as follows.

For symbol number Ni+k (k=0, 1, . . . , N−1):

Math 74

$$\begin{pmatrix} r1(Ni+k) \\ r2(Ni+k) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(Ni+k)} & e^{j(\theta_{11}(Ni+k)+\lambda)} \\ e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix} \quad \text{Equation 72}$$

Furthermore, for symbol number Ni+N−1:

Math 75

$$\begin{pmatrix} r1(Ni+N-1) \\ r2(Ni+N-1) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(Ni+N-1)} & e^{j(\theta_{11}(Ni+N-1)+\lambda)} \\ e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix} \quad \text{Equation 73}$$

In Equations 70-73, let A be a real number and q be a complex number. The values of A and q are determined in accordance with the positional relationship between the transmission device and the reception device. Equations 70-73 can be represented as follows.

For symbol number Ni (where i is an integer greater than or equal to zero):

Math 76

$$\begin{pmatrix} r1(Ni) \\ r2(Ni) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni)} & e^{j(\theta_{11}(Ni)+\lambda)} \\ e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix} \quad \text{Equation 74}$$

Here, j is an imaginary unit.

For symbol number Ni+1:

Math 77

$$\begin{pmatrix} r1(Ni+1) \\ r2(Ni+1) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni+1)} & e^{j(\theta_{11}(Ni+1)+\lambda)} \\ e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix} \quad \text{Equation 75}$$

When generalized, this equation is as follows.

For symbol number Ni+k (k=0, 1, . . . , N−1):

Math 78

$$\begin{pmatrix} r1(Ni+k) \\ r2(Ni+k) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni+k)} & e^{j(\theta_{11}(Ni+k)+\lambda)} \\ e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix} \quad \text{Equation 76}$$

Furthermore, for symbol number Ni+N−1:

Math 79

$$\begin{pmatrix} r1(Ni+N-1) \\ r2(Ni+N-1) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni+N-1)} & e^{j(\theta_{11}(Ni+N-1)+\lambda)} \\ e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix} \quad \text{Equation 77}$$

As a result, when q is represented as follows, a signal component based on one of s1 and s2 is no longer included in r1 and r2, and therefore one of the signals s1 and s2 can no longer be obtained.

For symbol number Ni (where i is an integer greater than or equal to zero):

Math 80

$$q=-A_e^{j(\theta_{11}(Ni)-\theta_{21}(Ni))},-A_e^{j(\theta_{11}(Ni)-\theta_{21}(Ni)-\delta)} \quad \text{Equation 78}$$

For symbol number Ni+1:

Math 81

$$q=-A_e^{j(\theta_{11}(Ni+1)-\theta_{21}(Ni+1))},-A_e^{j(\theta_{11}(Ni+1)-\theta_{21}(Ni+1)-\delta)} \quad \text{Equation 79}$$

When generalized, this equation is as follows.

For symbol number Ni+k (k=0, 1, . . . , N−1):

Math 82

$$q=-A_e^{j(\theta_{11}(Ni+k)-\theta_{21}(Ni+k))},-A_e^{j(\theta_{11}(Ni+k)-\theta_{21}(Ni+k)-\delta)} \quad \text{Equation 80}$$

Furthermore, for symbol number Ni+N−1:

Math 83

$$q=-A_e^{j(\theta_{11}(Ni+N-1)-\theta_{21}(Ni+N-1))},-A_e^{j(\theta_{11}(Ni+N-1)-\theta_{21}(Ni+N-1)-\delta)} \quad \text{Equation 81}$$

In this case, if q has the same solution in symbol numbers Ni through Ni+N−1, then since the channel elements of the direct waves do not greatly fluctuate, a reception device having channel elements in which the value of q is equivalent to this same solution can no longer obtain excellent reception quality for any of the symbol numbers. Therefore, it is difficult to achieve the ability to correct errors, even if error correction codes are introduced. Accordingly, for q not to have the same solution, the following condition is necessary from Equations 78-81 when focusing on one of two solutions of q which does not include δ.

Math 84

$$e^{j(\theta_{11}(Ni+x)-\theta_{21}(Ni+x))} \neq e^{j(\theta_{11}(Ni+y)-\theta_{21}(Ni+y))} \quad \text{Condition \#3}$$

for ∀x, ∀y (x≠y; x,y=0, 1, 2, . . . , N−2, N−1)

(x is 0, 1, 2, . . . , N−2, . . . , N−1; y is 0, 1, 2, . . . , N−2, N−1; and x≠y.)

Next, design requirements for not only $\theta_{11}$ and $\theta_{12}$, but also for λ and δ are described. It suffices to set λ to a certain value; it is then necessary to establish requirements for δ. The following describes the design scheme for δ when λ is set to zero radians.

In this case, similar to the scheme of changing the precoding weights in a four-slot period (cycle), by defining δ so that π/2 radians ≤|δ|≤π radians, excellent reception quality is achieved, particularly in an LOS environment.

In each symbol number Ni through Ni+N−1, two points labeled q exist where reception quality becomes poor, and therefore 2N such points exist. In an LOS environment, in order to achieve excellent characteristics, these 2N points should each have a different solution. In this case, in addition to Condition #3, Condition #4 is necessary.

Math 85

$$e^{j(\theta_{11}(Ni+x)-\theta_{21}(Ni+x))} \neq e^{j(\theta_{11}(Ni+y)-\theta_{21}(Ni+y)-\delta)}$$

for ∀x, ∀y (x,y=0, 1, 2, . . . , N−2, N−1)
and $$e^{j(\theta_{11}(Ni+x)-\theta_{21}(Ni+x)-\delta)} \neq e^{j(\theta_{11}(Ni+y)-\theta_{21}(Ni+y)-\delta)} \quad \text{Condition \#4}$$

for ∀x, ∀y (x≠y; x,y=0, 1, 2, . . . , N−2, N−1)

Additionally, the phase of these 2N points should be evenly distributed (since the phase of a direct wave at each reception device is considered to have a high probability of even distribution).

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time.

In the present embodiment, the structure of the reception device is as described in Embodiment 1, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, similar to Embodiment 1, the error correction codes are not limited.

In the present embodiment, in contrast with Embodiment 1, the scheme of changing the precoding weights in the time domain has been described. As described in Embodiment 1, however, the present invention may be similarly embodied by changing the precoding weights by using a multi-carrier transmission scheme and arranging symbols in the frequency domain and the frequency-time domain. Furthermore, in the present embodiment, symbols other than data symbols, such as pilot symbols (preamble, unique word, and the like), symbols for control information, and the like, may be arranged in the frame in any way.

Embodiment 3

In Embodiment 1 and Embodiment 2, the scheme of regularly hopping between precoding weights has been described for the case where the amplitude of each element in the precoding weight matrix is equivalent. In the present embodiment, however, an example that does not satisfy this condition is described.

For the sake of contrast with Embodiment 2, the case of changing precoding weights over an N-slot period (cycle) is described. Making the same considerations as in Embodiment 1 and Embodiment 2, processing represented as below is performed on each symbol number. Let β be a positive real number, and β≠1. For symbol number Ni (where i is an integer greater than or equal to zero):

Math 86

$$\begin{pmatrix} z1(Ni) \\ z2(Ni) \end{pmatrix} = \frac{1}{\sqrt{\beta^2+1}} \begin{pmatrix} e^{j\theta_{11}(Ni)} & \beta \times e^{j(\theta_{11}(Ni)+\lambda)} \\ \beta \times e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix} \quad \text{Equation 82}$$

Here, j is an imaginary unit.

For symbol number Ni+1:

Math 87

$$\begin{pmatrix} z1(Ni+1) \\ z2(Ni+1) \end{pmatrix} = \frac{1}{\sqrt{\beta^2+1}} \begin{pmatrix} e^{j\theta_{11}(Ni+1)} & \beta \times e^{j(\theta_{11}(Ni+1)+\lambda)} \\ \beta \times e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix} \quad \text{Equation 83}$$

When generalized, this equation is as follows.

For symbol number Ni+k (k=0, 1, . . . , N−1):

Math 88

$$\begin{pmatrix} z1(Ni+k) \\ z2(Ni+k) \end{pmatrix} = \frac{1}{\sqrt{\beta^2+1}} \begin{pmatrix} e^{j\theta_{11}(Ni+k)} & \beta \times e^{j(\theta_{11}(Ni+k)+\lambda)} \\ \beta \times e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix} \quad \text{Equation 84}$$

Furthermore, for symbol number Ni+N−1:

Math 89

$$\begin{pmatrix} z1(Ni+N-1) \\ z2(Ni+N-1) \end{pmatrix} = \frac{1}{\sqrt{\beta^2+1}} \begin{pmatrix} e^{j\theta_{11}(Ni+N-1)} & \beta \times e^{j(\theta_{11}(Ni+N-1)+\lambda)} \\ \beta \times e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix} \quad \text{Equation 85}$$

Accordingly, r1 and r2 are represented as follows.

For symbol number Ni (where i is an integer greater than or equal to zero):

Math 90

$$\begin{pmatrix} r1(Ni) \\ r2(Ni) \end{pmatrix} = \frac{1}{\sqrt{\beta^2+1}} \begin{pmatrix} h_{11}(Ni) & h_{12}(Ni) \\ h_{21}(Ni) & h_{22}(Ni) \end{pmatrix} \begin{pmatrix} e^{j\theta_{11}(Ni)} & \beta \times e^{j(\theta_{11}(Ni)+\lambda)} \\ \beta \times e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix} \quad \text{Equation 86}$$

Here, j is an imaginary unit.

For symbol number Ni+1:

Math 91

$$\begin{pmatrix} r1(Ni+1) \\ r2(Ni+1) \end{pmatrix} = \frac{1}{\sqrt{\beta^2+1}} \begin{pmatrix} h_{11}(Ni+1) & h_{12}(Ni+1) \\ h_{21}(Ni+1) & h_{22}(Ni+1) \end{pmatrix} \begin{pmatrix} e^{j\theta_{11}(Ni+1)} & \beta \times e^{j(\theta_{11}(Ni+1)+\lambda)} \\ \beta \times e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix} \quad \text{Equation 87}$$

When generalized, this equation is as follows.

For symbol number Ni+k (k=0, 1, . . . , N−1):

Math 92

$$\begin{pmatrix} r1(Ni+k) \\ r2(Ni+k) \end{pmatrix} = \frac{1}{\sqrt{\beta^2+1}} \begin{pmatrix} h_{11}(Ni+k) & h_{12}(Ni+k) \\ h_{21}(Ni+k) & h_{22}(Ni+k) \end{pmatrix} \begin{pmatrix} e^{j\theta_{11}(Ni+k)} & \beta \times e^{j(\theta_{11}(Ni+k)+\lambda)} \\ \beta \times e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix} \quad \text{Equation 88}$$

When generalized, this equation is as follows.

For symbol number Ni+N−1:

Math 93

$$\begin{pmatrix} r1(Ni+N-1) \\ r2(Ni+N-1) \end{pmatrix} = \frac{1}{\sqrt{\beta^2+1}} \begin{pmatrix} h_{11}(Ni+N-1) & h_{12}(Ni+N-1) \\ h_{21}(Ni+N-1) & h_{22}(Ni+N-1) \end{pmatrix} \begin{pmatrix} e^{j\theta_{11}(Ni+N-1)} & \beta \times e^{j(\theta_{11}(Ni+N-1)+\lambda)} \\ \beta \times e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix} \quad \text{Equation 89}$$

In this case, it is assumed that only components of direct waves exist in the channel elements $h_{11}(t)$, $h_{12}(t)$, $h_{21}(t)$, and $h_{22}(t)$, that the amplitude components of the direct waves are all equal, and that fluctuations do not occur over time. With these assumptions, Equations 86-89 can be represented as follows.

For symbol number Ni (where i is an integer greater than or equal to zero):

Math 94

$$\begin{pmatrix} r1(Ni) \\ r2(Ni) \end{pmatrix} = \frac{1}{\sqrt{\beta^2+1}} \begin{pmatrix} Ae^{j0} & q \\ Ae^{j0} & q \end{pmatrix} \begin{pmatrix} e^{j\theta_{11}(Ni)} & \beta \times e^{j(\theta_{11}(Ni)+\lambda)} \\ \beta \times e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix} \quad \text{Equation 90}$$

Here, j is an imaginary unit.

For symbol number Ni+1:

Math 95

$$\begin{pmatrix} r1(Ni+1) \\ r2(Ni+1) \end{pmatrix} = \frac{1}{\sqrt{\beta^2+1}} \begin{pmatrix} Ae^{j0} & q \\ Ae^{j0} & q \end{pmatrix} \begin{pmatrix} e^{j\theta_{11}(Ni+1)} & \beta \times e^{j(\theta_{11}(Ni+1)+\lambda)} \\ \beta \times e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix} \quad \text{Equation 91}$$

When generalized, this equation is as follows.

For symbol number Ni+k (k=0, 1, . . . , N−1):

Math 96

$$\begin{pmatrix} r1(Ni+k) \\ r2(Ni+k) \end{pmatrix} = \frac{1}{\sqrt{\beta^2+1}} \begin{pmatrix} Ae^{j0} & q \\ Ae^{j0} & q \end{pmatrix} \begin{pmatrix} e^{j\theta_{11}(Ni+k)} & \beta \times e^{j(\theta_{11}(Ni+k)+\lambda)} \\ \beta \times e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix} \quad \text{Equation 92}$$

Furthermore, for symbol number Ni+N−1:

Math 97

$$\begin{pmatrix} r1(Ni+N-1) \\ r2(Ni+N-1) \end{pmatrix} = \frac{1}{\sqrt{\beta^2+1}} \begin{pmatrix} Ae^{j0} & q \\ Ae^{j0} & q \end{pmatrix} \begin{pmatrix} e^{j\theta_{11}(Ni+N-1)} & \beta \times e^{j(\theta_{11}(Ni+N-1)+\lambda)} \\ \beta \times e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix} \quad \text{Equation 93}$$

In Equations 90-93, let A be a real number and q be a complex number. Equations 90-93 can be represented as follows.

For symbol number Ni (where i is an integer greater than or equal to zero):

Math 98

$$\begin{pmatrix} r1(Ni) \\ r2(Ni) \end{pmatrix} = \frac{1}{\sqrt{\beta^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni)} & \beta \times e^{j(\theta_{11}(Ni)+\lambda)} \\ \beta \times e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix} \quad \text{Equation 94}$$

Here, j is an imaginary unit.

For symbol number Ni+1:

Math 99

$$\begin{pmatrix} r1(Ni+1) \\ r2(Ni+1) \end{pmatrix} = \frac{1}{\sqrt{\beta^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni+1)} & \beta \times e^{j(\theta_{11}(Ni+1)+\lambda)} \\ \beta \times e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix} \quad \text{Equation 95}$$

When generalized, this equation is as follows.

For symbol number Ni+k (k=0, 1, . . . , N−1):

Math 100

$$\begin{pmatrix} r1(Ni+k) \\ r2(Ni+k) \end{pmatrix} = \frac{1}{\sqrt{\beta^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni+k)} & \beta \times e^{j(\theta_{11}(Ni+k)+\lambda)} \\ \beta \times e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix} \quad \text{Equation 96}$$

Furthermore, for symbol number Ni+N−1:

Math 101

$$\begin{pmatrix} r1(Ni+N-1) \\ r2(Ni+N-1) \end{pmatrix} = \frac{1}{\sqrt{\beta^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni+N-1)} & \beta \times e^{j(\theta_{11}(Ni+N-1)+\lambda)} \\ \beta \times e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix} \quad \text{Equation 97}$$

As a result, when q is represented as follows, one of the signals s1 and s2 can no longer be obtained.

For symbol number Ni (where i is an integer greater than or equal to zero):

Math 102

$$q = -\frac{A}{\beta} e^{j(\theta_{11}(Ni)-\theta_{21}(Ni))}, \ -A\beta e^{j(\theta_{11}(Ni)-\theta_{21}(Ni)-\delta)} \quad \text{Equation 98}$$

For symbol number Ni+1:

Math 103

$$q = -\frac{A}{\beta} e^{j(\theta_{11}(Ni+1)-\theta_{21}(Ni+1))}, \ -A\beta e^{j(\theta_{11}(Ni+1)-\theta_{21}(Ni+1)-\delta)} \quad \text{Equation 99}$$

When generalized, this equation is as follows.

For symbol number Ni+k (k=0, 1, . . . , N−1):

Math 104

$$q = -\frac{A}{\beta} e^{j(\theta_{11}(Ni+k)-\theta_{21}(Ni+k))}, \ -A\beta e^{j(\theta_{11}(Ni+k)-\theta_{21}(Ni+k)-\delta)} \quad \text{Equation 100}$$

Furthermore, for symbol number Ni+N−1:

Math 105

$$q = -\frac{A}{\beta} e^{j(\theta_{11}(Ni+N-1)-\theta_{21}(Ni+N-1))}, \ -A\beta e^{j(\theta_{11}(Ni+N-1)-\theta_{21}(Ni+N-1)-\delta)} \quad \text{Equation 101}$$

In this case, if q has the same solution in symbol numbers Ni through Ni+N−1, then since the channel elements of the direct waves do not greatly fluctuate, excellent reception quality can no longer be obtained for any of the symbol numbers. Therefore, it is difficult to achieve the ability to correct errors, even if error correction codes are introduced. Accordingly, for q not to have the same solution, the following condition is necessary from Equations 98-101 when focusing on one of two solutions of q which does not include S.

Math 106

$$e^{j(\theta_{11}(Ni+x)-\theta_{21}(Ni+x))} \neq e^{j(\theta_{11}(Ni+y)-\theta_{21}(Ni+y))} \quad \text{Condition \#5}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Next, design requirements for not only $\theta_{11}$ and $\theta_{12}$, but also for λ and δ are described. It suffices to set λ to a certain value; it is then necessary to establish requirements for δ. The following describes the design scheme for δ when λ is set to zero radians.

In this case, similar to the scheme of changing the precoding weights in a four-slot period (cycle), by defining δ so that π/2 radians ≤|δ|≤π radians, excellent reception quality is achieved, particularly in an LOS environment.

In each of symbol numbers Ni through Ni+N−1, two points q exist where reception quality becomes poor, and therefore 2N such points exist. In an LOS environment, in order to achieve excellent characteristics, these 2N points should each have a different solution. In this case, in addition to Condition #5, considering that β is a positive real number, and β≠1, Condition #6 is necessary.

Math 107

$$e^{j(\theta_{11}(Ni+x)-\theta_{21}(Ni+x))} \neq e^{j(\theta_{11}(Ni+y)-\theta_{21}(Ni+y)-\delta)} \quad \text{Condition \#6}$$

for ∀x, ∀y (x≠y; x,y=0, 1, 2, . . . , N−2, N−1)

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time.

In the present embodiment, the structure of the reception device is as described in Embodiment 1, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, similar to Embodiment 1, the error correction codes are not limited.

In the present embodiment, in contrast with Embodiment 1, the scheme of changing the precoding weights in the time domain has been described. As described in Embodiment 1, however, the present invention may be similarly embodied by changing the precoding weights by using a multi-carrier transmission scheme and arranging symbols in the frequency domain and the frequency-time domain. Furthermore, in the present embodiment, symbols other than data symbols, such as pilot symbols (preamble, unique word, and the like), symbols for control information, and the like, may be arranged in the frame in any way.

Embodiment 4

In Embodiment 3, the scheme of regularly hopping between precoding weights has been described for the example of two types of amplitudes for each element in the precoding weight matrix, 1 and β.

In this case,

Math 108

$$\frac{1}{\sqrt{\beta^2+1}}$$

is ignored.

Next, the example of changing the value of β by slot is described. For the sake of contrast with Embodiment 3, the case of changing precoding weights over a 2×N-slot period (cycle) is described.

Making the same considerations as in Embodiment 1, Embodiment 2, and Embodiment 3, processing represented as below is performed on symbol numbers. Let β be a positive real number, and β≠1. Furthermore, let α be a positive real number, and α≠β.

For symbol number 2Ni (where i is an integer greater than or equal to zero):

Math 109

$$\begin{pmatrix} z1(2Ni) \\ z2(2Ni) \end{pmatrix} = \frac{1}{\sqrt{\beta^2+1}} \begin{pmatrix} e^{j\theta_{11}(2Ni)} & \beta\times e^{j(\theta_{11}(2Ni)+\lambda)} \\ \beta\times e^{j\theta_{21}(2Ni)} & e^{j(\theta_{21}(2Ni)+\lambda+\delta)} \end{pmatrix} \begin{pmatrix} s1(2Ni) \\ s2(2Ni) \end{pmatrix} \quad \text{Equation 102}$$

Here, j is an imaginary unit.

For symbol number 2Ni+1:

Math 110

$$\begin{pmatrix} z1(2Ni+1) \\ z2(2Ni+1) \end{pmatrix} = \frac{1}{\sqrt{\beta^2+1}} \begin{pmatrix} e^{j\theta_{11}(2Ni+1)} & \beta\times e^{j(\theta_{11}(2Ni+1)+\lambda)} \\ \beta\times e^{j\theta_{21}(2Ni+1)} & e^{j(\theta_{21}(2Ni+1)+\lambda+\delta)} \end{pmatrix} \begin{pmatrix} s1(2Ni+1) \\ s2(2Ni+1) \end{pmatrix} \quad \text{Equation 103}$$

When generalized, this equation is as follows.

For symbol number 2Ni+k (k=0, 1, . . . , N−1):

Math 111

$$\begin{pmatrix} z1(2Ni+k) \\ z2(2Ni+k) \end{pmatrix} = \frac{1}{\sqrt{\beta^2+1}} \begin{pmatrix} e^{j\theta_{11}(2Ni+k)} & \beta\times e^{j(\theta_{11}(2Ni+k)+\lambda)} \\ \beta\times e^{j\theta_{21}(2Ni+k)} & e^{j(\theta_{21}(2Ni+k)+\lambda+\delta)} \end{pmatrix} \begin{pmatrix} s1(2Ni+k) \\ s2(2Ni+k) \end{pmatrix} \quad \text{Equation 104}$$

Furthermore, for symbol number 2Ni+N−1:

Math 112

$$\begin{pmatrix} z1(2Ni+N-1) \\ z2(2Ni+N-1) \end{pmatrix} = \frac{1}{\sqrt{\beta^2+1}} \begin{pmatrix} e^{j\theta_{11}(2Ni+N-1)} & \beta\times e^{j(\theta_{11}(2Ni+N-1)+\lambda)} \\ \beta\times e^{j\theta_{21}(2Ni+N-1)} & e^{j(\theta_{21}(2Ni+N-1)+\lambda+\delta)} \end{pmatrix} \begin{pmatrix} s1(2Ni+N-1) \\ s2(2Ni+N-1) \end{pmatrix} \quad \text{Equation 105}$$

For symbol number 2Ni+N (where i is an integer greater than or equal to zero):

Math 113

$$\begin{pmatrix} z1(2Ni+N) \\ z2(2Ni+N) \end{pmatrix} = \frac{1}{\sqrt{\alpha^2+1}} \begin{pmatrix} e^{j\theta_{11}(2Ni+N)} & \alpha\times e^{j(\theta_{11}(2Ni+N)+\lambda)} \\ \alpha\times e^{j\theta_{21}(2Ni+N)} & e^{j(\theta_{21}(2Ni+N)+\lambda+\delta)} \end{pmatrix} \begin{pmatrix} s1(2Ni+N) \\ s2(2Ni+N) \end{pmatrix} \quad \text{Equation 106}$$

Here, j is an imaginary unit.

For symbol number 2Ni+N+1:

Math 114

$$\begin{pmatrix} z1(2Ni+N+1) \\ z2(2Ni+N+1) \end{pmatrix} = \frac{1}{\sqrt{\alpha^2+1}} \begin{pmatrix} e^{j\theta_{11}(2Ni+N+1)} & \alpha\times e^{j(\theta_{11}(2Ni+N+1)+\lambda)} \\ \alpha\times e^{j\theta_{21}(2Ni+N+1)} & e^{j(\theta_{21}(2Ni+N+1)+\lambda+\delta)} \end{pmatrix} \begin{pmatrix} s1(2Ni+N+1) \\ s2(2Ni+N+1) \end{pmatrix} \quad \text{Equation 107}$$

When generalized, this equation is as follows.

For symbol number 2Ni+N+k (k=0, 1, . . . , N−1):

Math 115

$$\begin{pmatrix} z1(2Ni+N+k) \\ z2(2Ni+N+k) \end{pmatrix} = \frac{1}{\sqrt{\alpha^2+1}} \begin{pmatrix} e^{j\theta_{11}(2Ni+N+k)} & \alpha\times e^{j(\theta_{11}(2Ni+N+k)+\lambda)} \\ \alpha\times e^{j\theta_{21}(2Ni+N+k)} & e^{j(\theta_{21}(2Ni+N+k)+\lambda+\delta)} \end{pmatrix} \begin{pmatrix} s1(2Ni+N+k) \\ s2(2Ni+N+k) \end{pmatrix} \quad \text{Equation 108}$$

Furthermore, for symbol number 2Ni+2N−1:

Math 116

$$\begin{pmatrix} z1(2Ni+2N-1) \\ z2(2Ni+2N-1) \end{pmatrix} = \frac{1}{\sqrt{\alpha^2+1}} \begin{pmatrix} e^{j\theta_{11}(2Ni+2N-1)} & \alpha \times e^{j(\theta_{11}(2Ni+2N-1)+\lambda)} \\ \alpha \times e^{j\theta_{21}(2Ni+2N-1)} & e^{j(\theta_{21}(2Ni+2N-1)+\lambda+\delta)} \end{pmatrix} \begin{pmatrix} s1(2Ni+2N-1) \\ s2(2Ni+2N-1) \end{pmatrix} \quad \text{Equation 109}$$

Accordingly, r1 and r2 are represented as follows.

For symbol number 2Ni (where i is an integer greater than or equal to zero):

Math 117

$$\begin{pmatrix} r1(2Ni) \\ r2(2Ni) \end{pmatrix} = \frac{1}{\sqrt{\beta^2+1}} \begin{pmatrix} h_{11}(2Ni) & h_{12}(2Ni) \\ h_{21}(2Ni) & h_{22}(2Ni) \end{pmatrix} \begin{pmatrix} e^{j\theta_{11}(2Ni)} & \beta \times e^{j(\theta_{11}(2Ni)+\lambda)} \\ \beta \times e^{j\theta_{21}(2Ni)} & e^{j(\theta_{21}(2Ni)+\lambda+\delta)} \end{pmatrix} \begin{pmatrix} s1(2Ni) \\ s2(2Ni) \end{pmatrix} \quad \text{Equation 110}$$

Here, j is an imaginary unit.

For symbol number 2Ni+1:

Math 118

$$\begin{pmatrix} r1(2Ni+1) \\ r2(2Ni+1) \end{pmatrix} = \frac{1}{\sqrt{\beta^2+1}} \begin{pmatrix} h_{11}(2Ni+1) & h_{12}(2Ni+1) \\ h_{21}(2Ni+1) & h_{22}(2Ni+1) \end{pmatrix} \begin{pmatrix} e^{j\theta_{11}(2Ni+1)} & \beta \times e^{j(\theta_{11}(2Ni+1)+\lambda)} \\ \beta \times e^{j\theta_{21}(2Ni+1)} & e^{j(\theta_{21}(2Ni+1)+\lambda+\delta)} \end{pmatrix} \begin{pmatrix} s1(2Ni+1) \\ s2(2Ni+1) \end{pmatrix} \quad \text{Equation 111}$$

When generalized, this equation is as follows.

For symbol number 2Ni+k (k=0, 1, . . . , N−1):

Math 119

$$\begin{pmatrix} r1(2Ni+k) \\ r2(2Ni+k) \end{pmatrix} = \frac{1}{\sqrt{\beta^2+1}} \begin{pmatrix} h_{11}(2Ni+k) & h_{12}(2Ni+k) \\ h_{21}(2Ni+k) & h_{22}(2Ni+k) \end{pmatrix} \begin{pmatrix} e^{j\theta_{11}(2Ni+k)} & \beta \times e^{j(\theta_{11}(2Ni+k)+\lambda)} \\ \beta \times e^{j\theta_{21}(2Ni+k)} & e^{j(\theta_{21}(2Ni+k)+\lambda+\delta)} \end{pmatrix} \begin{pmatrix} s1(2Ni+k) \\ s2(2Ni+k) \end{pmatrix} \quad \text{Equation 112}$$

Furthermore, for symbol number 2Ni+N−1:

Math 120

$$\begin{pmatrix} r1(2Ni+N-1) \\ r2(2Ni+N-1) \end{pmatrix} = \frac{1}{\sqrt{\beta^2+1}} \begin{pmatrix} h_{11}(2Ni+N-1) & h_{12}(2Ni+N-1) \\ h_{21}(2Ni+N-1) & h_{22}(2Ni+N-1) \end{pmatrix} \begin{pmatrix} e^{j\theta_{11}(2Ni+N-1)} & \beta \times e^{j(\theta_{11}(2Ni+N-1)+\lambda)} \\ \beta \times e^{j\theta_{21}(2Ni+N-1)} & e^{j(\theta_{21}(2Ni+N-1)+\lambda+\delta)} \end{pmatrix} \begin{pmatrix} s1(2Ni+N-1) \\ s2(2Ni+N-1) \end{pmatrix} \quad \text{Equation 113}$$

For symbol number 2Ni+N (where i is an integer greater than or equal to zero):

Math 121

$$\begin{pmatrix} r1(2Ni+N) \\ r2(2Ni+N) \end{pmatrix} = \frac{1}{\sqrt{\alpha^2+1}} \begin{pmatrix} h_{11}(2Ni+N) & h_{12}(2Ni+N) \\ h_{21}(2Ni+N) & h_{22}(2Ni+N) \end{pmatrix} \begin{pmatrix} e^{j\theta_{11}(2Ni+N)} & \alpha \times e^{j(\theta_{11}(2Ni+N)+\lambda)} \\ \alpha \times e^{j\theta_{21}(2Ni+N)} & e^{j(\theta_{21}(2Ni+N)+\lambda+\delta)} \end{pmatrix} \begin{pmatrix} s1(2Ni+N) \\ s2(2Ni+N) \end{pmatrix} \quad \text{Equation 114}$$

Here, j is an imaginary unit.

For symbol number 2Ni+N+1:

Math 122

$$\begin{pmatrix} r1(2Ni+N+1) \\ r2(2Ni+N+1) \end{pmatrix} = \frac{1}{\sqrt{\alpha^2+1}} \begin{pmatrix} h_{11}(2Ni+N+1) & h_{12}(2Ni+N+1) \\ h_{21}(2Ni+N+1) & h_{22}(2Ni+N+1) \end{pmatrix} \begin{pmatrix} e^{j\theta_{11}(2Ni+N+1)} & \alpha \times e^{j(\theta_{11}(2Ni+N+1)+\lambda)} \\ \alpha \times e^{j\theta_{21}(2Ni+N+1)} & e^{j(\theta_{21}(2Ni+N+1)+\lambda+\delta)} \end{pmatrix} \begin{pmatrix} s1(2Ni+N+1) \\ s2(2Ni+N+1) \end{pmatrix} \quad \text{Equation 115}$$

When generalized, this equation is as follows.

For symbol number 2Ni+N+k (k=0, 1, . . . , N−1):

Math 123

$$\begin{pmatrix} r1(2Ni+N+k) \\ r2(2Ni+N+k) \end{pmatrix} = \frac{1}{\sqrt{\alpha^2+1}} \begin{pmatrix} h_{11}(2Ni+N+k) & h_{12}(2Ni+N+k) \\ h_{21}(2Ni+N+k) & h_{22}(2Ni+N+k) \end{pmatrix} \begin{pmatrix} e^{j\theta_{11}(2Ni+N+k)} & \alpha \times e^{j(\theta_{11}(2Ni+N+k)+\lambda)} \\ \alpha \times e^{j\theta_{21}(2Ni+N+k)} & e^{j(\theta_{21}(2Ni+N+k)+\lambda+\delta)} \end{pmatrix} \begin{pmatrix} s1(2Ni+N+k) \\ s2(2Ni+N+k) \end{pmatrix} \quad \text{Equation 116}$$

When generalized, this equation is as follows.

For symbol number 2Ni+2N−1:

Math 124

$$\begin{pmatrix} r1(2Ni+2N-1) \\ r2(2Ni+2N-1) \end{pmatrix} = \frac{1}{\sqrt{\alpha^2+1}} \begin{pmatrix} h_{11}(2Ni+2N-1) & h_{12}(2Ni+2N-1) \\ h_{21}(2Ni+2N-1) & h_{22}(2Ni+2N-1) \end{pmatrix} \begin{pmatrix} e^{j\theta_{11}(2Ni+2N-1)} & \alpha \times e^{j(\theta_{11}(2Ni+2N-1)+\lambda)} \\ \alpha \times e^{j\theta_{21}(2Ni+2N-1)} & e^{j(\theta_{21}(2Ni+2N-1)+\lambda+\delta)} \end{pmatrix} \begin{pmatrix} s1(2Ni+2N-1) \\ s2(2Ni+2N-1) \end{pmatrix} \quad \text{Equation 117}$$

In this case, it is assumed that only components of direct waves exist in the channel elements $h_{11}(t)$, $h_{12}(t)$, $h_{21}(t)$, and $h_{22}(t)$, that the amplitude components of the direct waves are all equal, and that fluctuations do not occur over time. With these assumptions, Equations 110-117 can be represented as follows.

For symbol number 2Ni (where i is an integer greater than or equal to zero):

Math 125

$$\begin{pmatrix} r1(2Ni) \\ r2(2Ni) \end{pmatrix} = \frac{1}{\sqrt{\beta^2+1}} \begin{pmatrix} Ae^{j0} & q \\ Ae^{j0} & q \end{pmatrix} \begin{pmatrix} e^{j\theta_{11}(2Ni)} & \beta \times e^{j(\theta_{11}(2Ni)+\lambda)} \\ \beta \times e^{j\theta_{21}(2Ni)} & e^{j(\theta_{21}(2Ni)+\lambda+\delta)} \end{pmatrix} \begin{pmatrix} s1(2Ni) \\ s2(2Ni) \end{pmatrix} \quad \text{Equation 118}$$

Here, j is an imaginary unit.

For symbol number 2Ni+1:

Math 126

$$\begin{pmatrix} r1(2Ni+1) \\ r2(2Ni+1) \end{pmatrix} = \frac{1}{\sqrt{\beta^2+1}} \begin{pmatrix} Ae^{j0} & q \\ Ae^{j0} & q \end{pmatrix} \begin{pmatrix} e^{j\theta_{11}(2Ni+1)} & \beta \times e^{j(\theta_{11}(2Ni+1)+\lambda)} \\ \beta \times e^{j\theta_{21}(2Ni+1)} & e^{j(\theta_{21}(2Ni+1)+\lambda+\delta)} \end{pmatrix} \begin{pmatrix} s1(2Ni+1) \\ s2(2Ni+1) \end{pmatrix} \quad \text{Equation 119}$$

When generalized, this equation is as follows.

For symbol number 2Ni+k (k=0, 1, . . . , N−1):

Math 127

$$\begin{pmatrix} r1(2Ni+k) \\ r2(2Ni+k) \end{pmatrix} = \frac{1}{\sqrt{\beta^2+1}} \begin{pmatrix} Ae^{j0} & q \\ Ae^{j0} & q \end{pmatrix} \begin{pmatrix} e^{j\theta_{11}(2Ni+k)} & \beta \times e^{j(\theta_{11}(2Ni+k)+\lambda)} \\ \beta \times e^{j\theta_{21}(2Ni+k)} & e^{j(\theta_{21}(2Ni+k)+\lambda+\delta)} \end{pmatrix} \begin{pmatrix} s1(2Ni+k) \\ s2(2Ni+k) \end{pmatrix} \quad \text{Equation 120}$$

Furthermore, for symbol number 2Ni+N−1:

Math 128

$$\begin{pmatrix} r1(2Ni+N-1) \\ r2(2Ni+N-1) \end{pmatrix} = \frac{1}{\sqrt{\beta^2+1}} \begin{pmatrix} Ae^{j0} & q \\ Ae^{j0} & q \end{pmatrix} \begin{pmatrix} e^{j\theta_{11}(2Ni+N-1)} & \beta \times e^{j(\theta_{11}(2Ni+N-1)+\lambda)} \\ \beta \times e^{j\theta_{21}(2Ni+N-1)} & e^{j(\theta_{21}(2Ni+N-1)+\lambda+\delta)} \end{pmatrix} \begin{pmatrix} s1(2Ni+N-1) \\ s2(2Ni+N-1) \end{pmatrix} \quad \text{Equation 121}$$

For symbol number 2Ni+N (where i is an integer greater than or equal to zero):

Math 129

$$\begin{pmatrix} r1(2Ni+N) \\ r2(2Ni+N) \end{pmatrix} = \frac{1}{\sqrt{\alpha^2+1}} \begin{pmatrix} Ae^{j0} & q \\ Ae^{j0} & q \end{pmatrix} \begin{pmatrix} e^{j\theta_{11}(2Ni+N)} & \alpha \times e^{j(\theta_{11}(2Ni+N)+\lambda)} \\ \alpha \times e^{j\theta_{21}(2Ni+N)} & e^{j(\theta_{21}(2Ni+N)+\lambda+\delta)} \end{pmatrix} \begin{pmatrix} s1(2Ni+N) \\ s2(2Ni+N) \end{pmatrix} \quad \text{Equation 122}$$

Here, j is an imaginary unit.

For symbol number 2Ni+N+1:

Math 130

$$\begin{pmatrix} r1(2Ni+N+1) \\ r2(2Ni+N+1) \end{pmatrix} = \frac{1}{\sqrt{\alpha^2+1}} \begin{pmatrix} Ae^{j0} & q \\ Ae^{j0} & q \end{pmatrix} \begin{pmatrix} e^{j\theta_{11}(2Ni+N+1)} & \alpha \times e^{j(\theta_{11}(2Ni+N+1)+\lambda)} \\ \alpha \times e^{j\theta_{21}(2Ni+N+1)} & e^{j(\theta_{21}(2Ni+N+1)+\lambda+\delta)} \end{pmatrix} \begin{pmatrix} s1(2Ni+N+1) \\ s2(2Ni+N+1) \end{pmatrix} \quad \text{Equation 123}$$

When generalized, this equation is as follows.

For symbol number 2Ni+N+k (k=0, 1, . . . , N−1):

Math 131

$$\begin{pmatrix} r1(2Ni+N+k) \\ r2(2Ni+N+k) \end{pmatrix} = \frac{1}{\sqrt{\alpha^2+1}} \begin{pmatrix} Ae^{j0} & q \\ Ae^{j0} & q \end{pmatrix} \begin{pmatrix} e^{j\theta_{11}(2Ni+N+k)} & \alpha \times e^{j(\theta_{11}(2Ni+N+k)+\lambda)} \\ \alpha \times e^{j\theta_{21}(2Ni+N+k)} & e^{j(\theta_{21}(2Ni+N+k)+\lambda+\delta)} \end{pmatrix} \begin{pmatrix} s1(2Ni+N+k) \\ s2(2Ni+N+k) \end{pmatrix} \quad \text{Equation 124}$$

Furthermore, for symbol number 2Ni+2N−1:

Math 132

$$\begin{pmatrix} r1(2Ni+2N-1) \\ r2(2Ni+2N-1) \end{pmatrix} = \frac{1}{\sqrt{\alpha^2+1}} \begin{pmatrix} Ae^{j0} & q \\ Ae^{j0} & q \end{pmatrix} \begin{pmatrix} e^{j\theta_{11}(2Ni+2N-1)} & \alpha \times e^{j(\theta_{11}(2Ni+2N-1)+\lambda)} \\ \alpha \times e^{j\theta_{21}(2Ni+2N-1)} & e^{j(\theta_{21}(2Ni+2N-1)+\lambda+\delta)} \end{pmatrix} \begin{pmatrix} s1(2Ni+2N-1) \\ s2(2Ni+2N-1) \end{pmatrix} \quad \text{Equation 125}$$

In Equations 118-125, let A be a real number and q be a complex number. Equations 118-125 can be represented as follows.

For symbol number 2Ni (where i is an integer greater than or equal to zero):

Math 133

$$\begin{pmatrix} r1(2Ni) \\ r2(2Ni) \end{pmatrix} = \frac{1}{\sqrt{\beta^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(2Ni)} & \beta \times e^{j(\theta_{11}(2Ni)+\lambda)} \\ \beta \times e^{j\theta_{21}(2Ni)} & e^{j(\theta_{21}(2Ni)+\lambda+\delta)} \end{pmatrix} \begin{pmatrix} s1(2Ni) \\ s2(2Ni) \end{pmatrix} \quad \text{Equation 126}$$

Here, j is an imaginary unit.

For symbol number 2Ni+1:

Math 134

$$\begin{pmatrix} r1(2Ni+1) \\ r2(2Ni+1) \end{pmatrix} = \frac{1}{\sqrt{\beta^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(2Ni+1)} & \beta \times e^{j(\theta_{11}(2Ni+1)+\lambda)} \\ \beta \times e^{j\theta_{21}(2Ni+1)} & e^{j(\theta_{21}(2Ni+1)+\lambda+\delta)} \end{pmatrix} \begin{pmatrix} s1(2Ni+1) \\ s2(2Ni+1) \end{pmatrix} \quad \text{Equation 127}$$

When generalized, this equation is as follows.

For symbol number 2Ni+k (k=0, 1, . . . , N−1):

Math 135

$$\begin{pmatrix} r1(2Ni+k) \\ r2(2Ni+k) \end{pmatrix} = \frac{1}{\sqrt{\beta^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(2Ni+k)} & \beta \times e^{j(\theta_{11}(2Ni+k)+\lambda)} \\ \beta \times e^{j\theta_{21}(2Ni+k)} & e^{j(\theta_{21}(2Ni+k)+\lambda+\delta)} \end{pmatrix} \begin{pmatrix} s1(2Ni+k) \\ s2(2Ni+k) \end{pmatrix} \quad \text{Equation 128}$$

Furthermore, for symbol number 2Ni+N−1:

Math 136

$$\begin{pmatrix} r1(2Ni+N-1) \\ r2(2Ni+N-1) \end{pmatrix} = \frac{1}{\sqrt{\beta^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(2Ni+N-1)} & \beta \times e^{j(\theta_{11}(2Ni+N-1)+\lambda)} \\ \beta \times e^{j\theta_{21}(2Ni+N-1)} & e^{j(\theta_{21}(2Ni+N-1)+\lambda+\delta)} \end{pmatrix} \begin{pmatrix} s1(2Ni+N-1) \\ s2(2Ni+N-1) \end{pmatrix} \quad \text{Equation 129}$$

For symbol number 2Ni+N (where i is an integer greater than or equal to zero):

Math 137

$$\begin{pmatrix} r1(2Ni+N) \\ r2(2Ni+N) \end{pmatrix} = \frac{1}{\sqrt{\alpha^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(2Ni+N)} & \alpha \times e^{j(\theta_{11}(2Ni+N)+\lambda)} \\ \alpha \times e^{j\theta_{21}(2Ni+N)} & e^{j(\theta_{21}(2Ni+N)+\lambda+\delta)} \end{pmatrix} \begin{pmatrix} s1(2Ni+N) \\ s2(2Ni+N) \end{pmatrix} \quad \text{Equation 130}$$

Here, j is an imaginary unit.

For symbol number 2Ni+N+1:

Math 138

$$\begin{pmatrix} r1(2Ni+N+1) \\ r2(2Ni+N+1) \end{pmatrix} = \frac{1}{\sqrt{\alpha^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(2Ni+N+1)} & \alpha \times e^{j(\theta_{11}(2Ni+N+1)+\lambda)} \\ \alpha \times e^{j\theta_{21}(2Ni+N+1)} & e^{j(\theta_{21}(2Ni+N+1)+\lambda+\delta)} \end{pmatrix} \begin{pmatrix} s1(2Ni+N+1) \\ s2(2Ni+N+1) \end{pmatrix} \quad \text{Equation 131}$$

When generalized, this equation is as follows.

For symbol number 2Ni+N+k (k=0, 1, . . . , N−1):

Math 139

$$\begin{pmatrix} r1(2Ni+N+k) \\ r2(2Ni+N+k) \end{pmatrix} = \frac{1}{\sqrt{\alpha^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(2Ni+N+k)} & \alpha \times e^{j(\theta_{11}(2Ni+N+k)+\lambda)} \\ \alpha \times e^{j\theta_{21}(2Ni+N+k)} & e^{j(\theta_{21}(2Ni+N+k)+\lambda+\delta)} \end{pmatrix} \begin{pmatrix} s1(2Ni+N+k) \\ s2(2Ni+N+k) \end{pmatrix} \quad \text{Equation 132}$$

Furthermore, for symbol number 2Ni+2N−1:

Math 140

$$\begin{pmatrix} r1(2Ni+2N-1) \\ r2(2Ni+2N-1) \end{pmatrix} = \frac{1}{\sqrt{\alpha^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(2Ni+2N-1)} & \alpha \times e^{j(\theta_{11}(2Ni+2N-1)+\lambda)} \\ \alpha \times e^{j\theta_{21}(2Ni+2N-1)} & e^{j(\theta_{21}(2Ni+2N-1)+\lambda+\delta)} \end{pmatrix} \begin{pmatrix} s1(2Ni+2N-1) \\ s2(2Ni+2N-1) \end{pmatrix} \quad \text{Equation 133}$$

As a result, when q is represented as follows, one of the signals s1 and s2 can no longer be obtained.

For symbol number 2Ni (where i is an integer greater than or equal to zero):

Math 141

$$q = -\frac{A}{\beta} e^{j(\theta_{11}(2Ni)-\theta_{21}(2Ni))},\ -A\beta e^{j(\theta_{11}(2Ni)-\theta_{21}(2Ni)-\delta)} \quad \text{Equation 134}$$

For symbol number 2Ni+1:

Math 142

$$q = -\frac{A}{\beta} e^{j(\theta_{11}(2Ni+1)-\theta_{21}(2Ni+1))},\ -A\beta e^{j(\theta_{11}(2Ni+1)-\theta_{21}(2Ni+1)-\delta)} \quad \text{Equation 135}$$

When generalized, this equation is as follows.

For symbol number 2Ni+k (k=0, 1, . . . , N−1):

Math 143

$$q = -\frac{A}{\beta} e^{j(\theta_{11}(2Ni+k)-\theta_{21}(2Ni+k))},\ -A\beta e^{j(\theta_{11}(2Ni+k)-\theta_{21}(2Ni+k)-\delta)} \quad \text{Equation 136}$$

Furthermore, for symbol number 2Ni+N−1:

Math 144

$$q = -\frac{A}{\beta} e^{j(\theta_{11}(2Ni+N-1)-\theta_{21}(2Ni+N-1))},\ -A\beta e^{j(\theta_{11}(2Ni+N-1)-\theta_{21}(2Ni+N-1)-\delta)} \quad \text{Equation 137}$$

For symbol number 2Ni+N (where i is an integer greater than or equal to zero):

Math 145

$$q = -\frac{A}{\alpha} e^{j(\theta_{11}(2Ni+N)-\theta_{21}(2Ni+N))},\ -A\alpha e^{j(\theta_{11}(2Ni+N)-\theta_{21}(2Ni+N)-\delta)} \quad \text{Equation 138}$$

For symbol number 2Ni+N+1:

Math 146

$$q = -\frac{A}{\alpha} e^{j(\theta_{11}(2Ni+N+1)-\theta_{21}(2Ni+N+1))},\ -A\alpha e^{j(\theta_{11}(2Ni+N+1)-\theta_{21}(2Ni+N+1)-\delta)} \quad \text{Equation 139}$$

When generalized, this equation is as follows.

For symbol number 2Ni+N+k (k=0, 1, . . . , N−1):

Math 147

$$q = -\frac{A}{\alpha} e^{j(\theta_{11}(2Ni+N+k)-\theta_{21}(2Ni+N+k))},\ -A\alpha e^{j(\theta_{11}(2Ni+N+k)-\theta_{21}(2Ni+N+k)-\delta)} \quad \text{Equation 140}$$

Furthermore, for symbol number 2Ni+2N−1:

Math 148

$$q = -\frac{A}{\alpha} e^{j(\theta_{11}(2Ni+2N-1)-\theta_{21}(2Ni+2N-1))},\ -A\alpha e^{j(\theta_{11}(2Ni+2N-1)-\theta_{21}(2Ni+2N-1)-\delta)} \quad \text{Equation 141}$$

In this case, if q has the same solution in symbol numbers 2Ni through 2Ni+N−1, then since the channel elements of the direct waves do not greatly fluctuate, excellent reception quality can no longer be obtained for any of the symbol numbers. Therefore, it is difficult to achieve the ability to correct errors, even if error correction codes are introduced. Accordingly, for q not to have the same solution, Condition #7 or Condition #8 becomes necessary from Equations 134-141 and from the fact that α≠β when focusing on one of two solutions of q which does not include δ.

Math 149

$$e^{j(\theta_{11}(2Ni+x)-\theta_{21}(2Ni+x))} \neq e^{j(\theta_{11}(2Ni+y)-\theta_{21}(2Ni+y))}$$

∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

and $$e^{j(\theta_{11}(2Ni+N+x)-\theta_{21}(2Ni+N+x))} \neq e^{j(\theta_{11}(2Ni+N+y)-\theta_{21}(2Ni+N+y))} \quad \text{Condition \#7}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 150

$$e^{j(\theta_{11}(2Ni+x)-\theta_{21}(2Ni+x))} \neq e^{j(\theta_{11}(2Ni+y)-\theta_{21}(2Ni+y))} \quad \text{Condition \#8}$$

for ∀x, ∀y (x≠y; x,y=0, 1, 2, . . . , 2−N−2, 2N−1)

In this case, Condition #8 is similar to the conditions described in Embodiment 1 through Embodiment 3. However, with regards to Condition #7, since α≠β, the solution not including δ among the two solutions of q is a different solution.

Next, design requirements for not only $\theta_{11}$ and $\theta_{12}$, but also for λ and δ are described. It suffices to set λ to a certain value; it is then necessary to establish requirements for δ. The following describes the design scheme for δ when λ is set to zero radians.

In this case, similar to the scheme of changing the precoding weights in a four-slot period (cycle), by defining $\delta$ so that $\pi/2$ radians $\leq|\delta|\leq\pi$ radians, excellent reception quality is achieved, particularly in an LOS environment.

In symbol numbers 2Ni through 2Ni+2N−1, two points q exist where reception quality becomes poor, and therefore 4N such points exist. In an LOS environment, in order to achieve excellent characteristics, these 4N points should each have a different solution. In this case, focusing on amplitude, the following condition is necessary for Condition #7 or Condition #8, since $\alpha\neq\beta$.

Math 151

$$\alpha \neq \frac{1}{\beta} \quad \text{Condition \#9}$$

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time.

In the present embodiment, the structure of the reception device is as described in Embodiment 1, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, similar to Embodiment 1, the error correction codes are not limited.

In the present embodiment, in contrast with Embodiment 1, the scheme of changing the precoding weights in the time domain has been described. As described in Embodiment 1, however, the present invention may be similarly embodied by changing the precoding weights by using a multi-carrier transmission scheme and arranging symbols in the frequency domain and the frequency-time domain. Furthermore, in the present embodiment, symbols other than data symbols, such as pilot symbols (preamble, unique word, and the like), symbols for control information, and the like, may be arranged in the frame in any way.

Embodiment 5

In Embodiment 1 through Embodiment 4, the scheme of regularly hopping between precoding weights has been described. In the present embodiment, a modification of this scheme is described.

In Embodiment 1 through Embodiment 4, the scheme of regularly hopping between precoding weights as in FIG. 6 has been described. In the present embodiment, a scheme of regularly hopping between precoding weights that differs from FIG. 6 is described.

Figure 22:
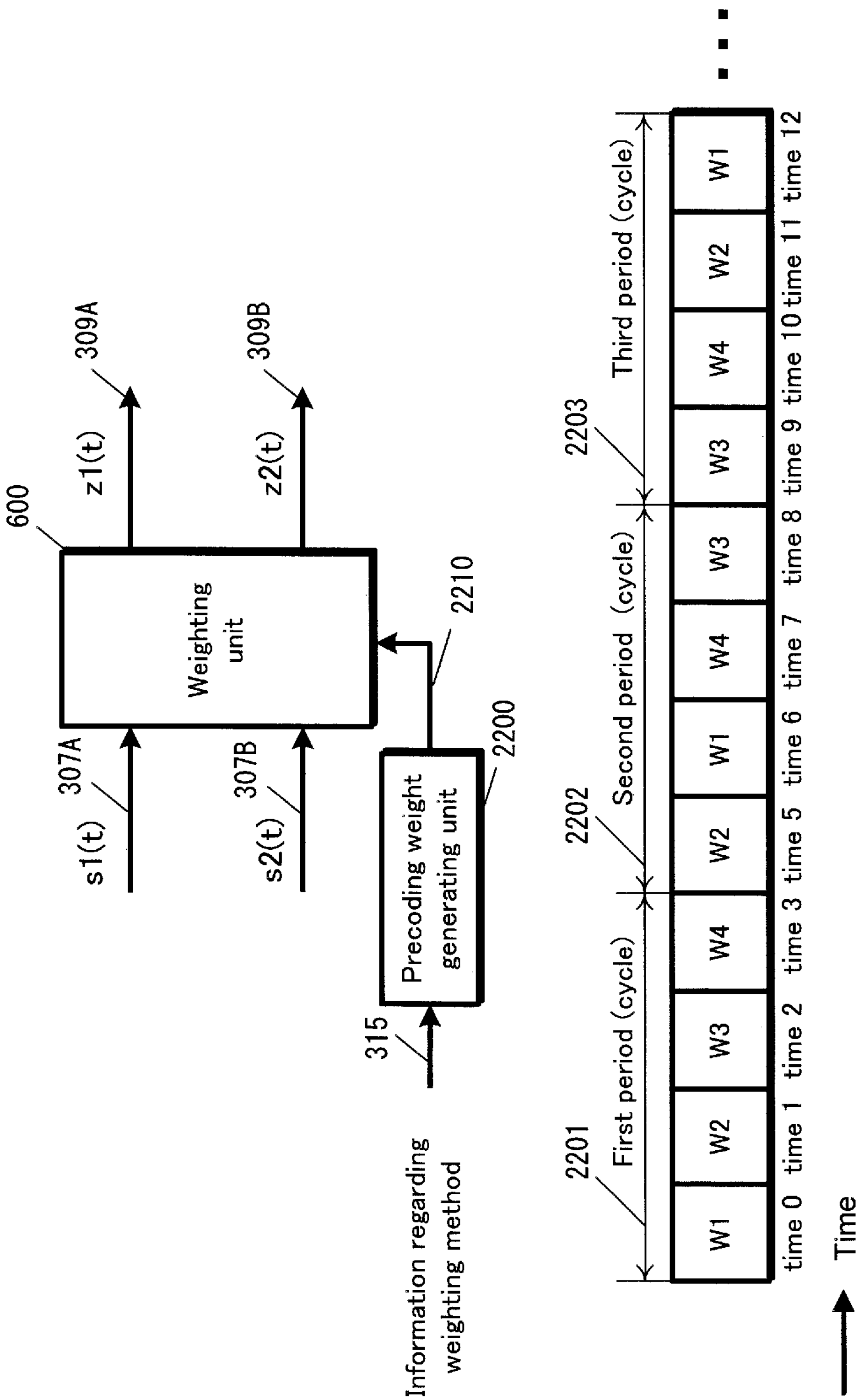
FIG. 22 is an example of a frame structure.

As in FIG. 6, this scheme hops between four different precoding weights (matrices). FIG. 22 shows the hopping scheme that differs from FIG. 6. In FIG. 22, four different precoding weights (matrices) are represented as W1, W2, W3, and W4. (For example, W1 is the precoding weight (matrix) in Equation 37, W2 is the precoding weight (matrix) in Equation 38, W3 is the precoding weight (matrix) in Equation 39, and W4 is the precoding weight (matrix) in Equation 40.) In FIG. 3, elements that operate in a similar way to FIG. 3 and FIG. 6 bear the same reference signs.

The parts unique to FIG. 22 are as follows.

The first period (cycle) 2201, the second period (cycle) 2202, the third period (cycle) 2203, . . . are all four-slot period (cycle)s.

A different precoding weight matrix is used in each of the four slots, i.e. W1, W2, W3, and W4 are each used once.

It is not necessary for W1, W2, W3, and W4 to be in the same order in the first period (cycle) 2201, the second period (cycle) 2202, the third period (cycle) 2203, . . . .

In order to implement this scheme, a precoding weight generating unit 2200 receives, as an input, a signal regarding a weighting scheme and outputs information 2210 regarding precoding weights in order for each period (cycle). The weighting unit 600 receives, as inputs, this information, s1(*t*), and s2(*t*), performs weighting, and outputs z1(*t*) and z2(*t*).

Figure 23:
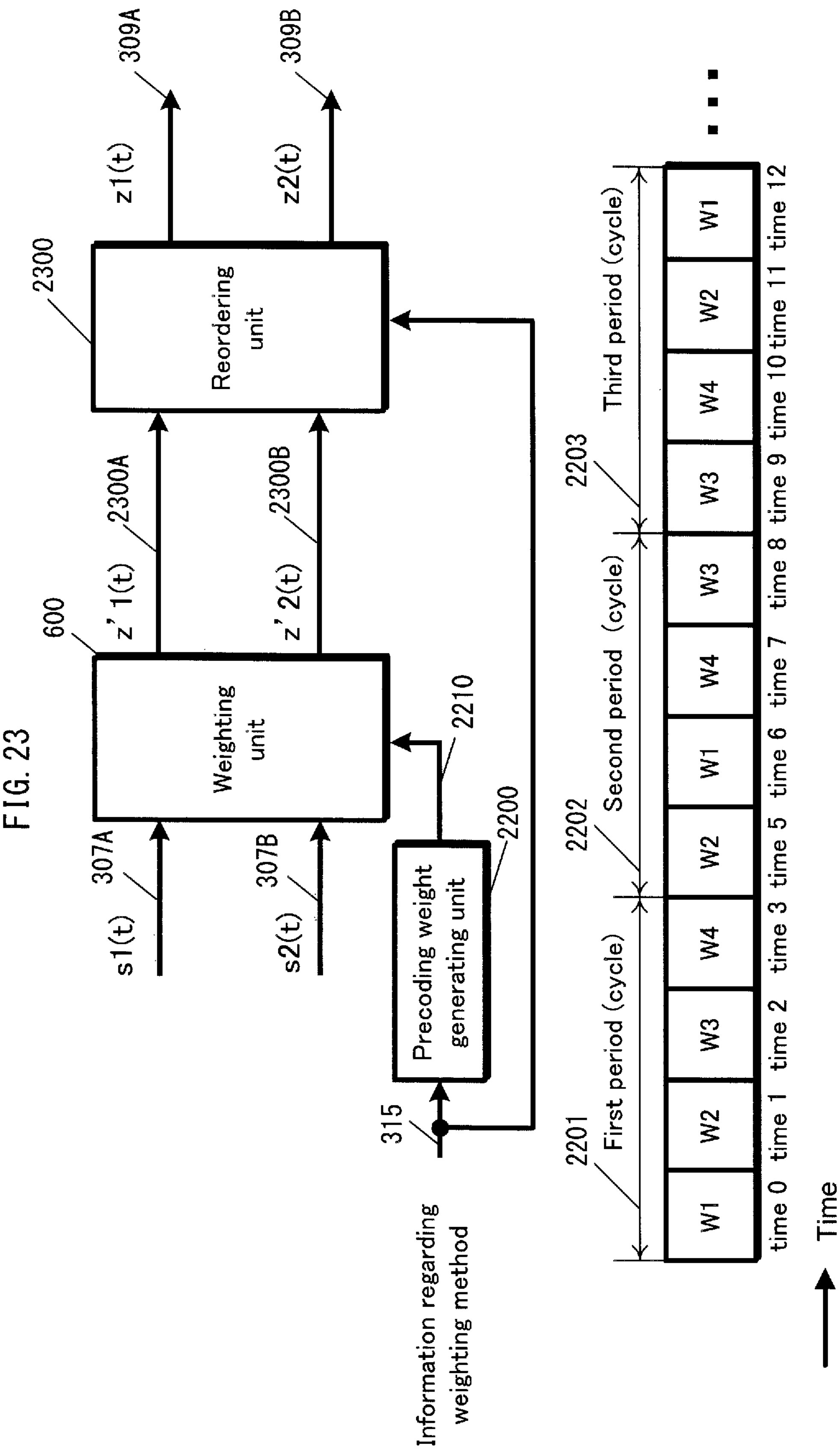
FIG. 23 is an example of a frame structure.

FIG. 23 shows a different weighting scheme than FIG. 22 for the above precoding scheme. In FIG. 23, the difference from FIG. 22 is that a similar scheme to FIG. 22 is achieved by providing a reordering unit after the weighting unit and by reordering signals.

In FIG. 23, the precoding weight generating unit 2200 receives, as an input, information 315 regarding a weighting scheme and outputs information 2210 on precoding weights in the order of precoding weights W1, W2, W3, W4, W1, W2, W3, W4, . . . . Accordingly, the weighting unit 600 uses the precoding weights in the order of precoding weights W1, W2, W3, W4, W1, W2, W3, W4, . . . and outputs precoded signals 2300A and 2300B.

A reordering unit 2300 receives, as inputs, the precoded signals 2300A and 2300B, reorders the precoded signals 2300A and 2300B in the order of the first period (cycle) 2201, the second period (cycle) 2202, and the third period (cycle) 2203 in FIG. 23, and outputs z1(*t*) and z2(*t*).

Note that in the above description, the period (cycle) for hopping between precoding weights has been described as having four slots for the sake of comparison with FIG. 6. As in Embodiment 1 through Embodiment 4, however, the present invention may be similarly embodied with a period (cycle) having other than four slots.

Furthermore, in Embodiment 1 through Embodiment 4, and in the above precoding scheme, within the period (cycle), the value of $\delta$ and $\beta$ has been described as being the same for each slot, but the value of $\delta$ and $\beta$ may change in each slot.

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time.

In the present embodiment, the structure of the reception device is as described in Embodiment 1, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, similar to Embodiment 1, the error correction codes are not limited.

In the present embodiment, in contrast with Embodiment 1, the scheme of changing the precoding weights in the time domain has been described. As described in Embodiment 1, however, the present invention may be similarly embodied by changing the precoding weights by using a multi-carrier transmission scheme and arranging symbols in the frequency domain and the frequency-time domain. Furthermore, in the present embodiment, symbols other than data symbols, such as pilot symbols (preamble, unique word, and the like), symbols for control information, and the like, may be arranged in the frame in any way.

Embodiment 6

In Embodiments 1-4, a scheme for regularly hopping between precoding weights has been described. In the present embodiment, a scheme for regularly hopping between precoding weights is again described, including the content that has been described in Embodiments 1-4.

First, out of consideration of an LOS environment, a scheme of designing a precoding matrix is described for a 2×2 spatial multiplexing MIMO system that adopts precoding in which feedback from a communication partner is not available.

Figure 30:
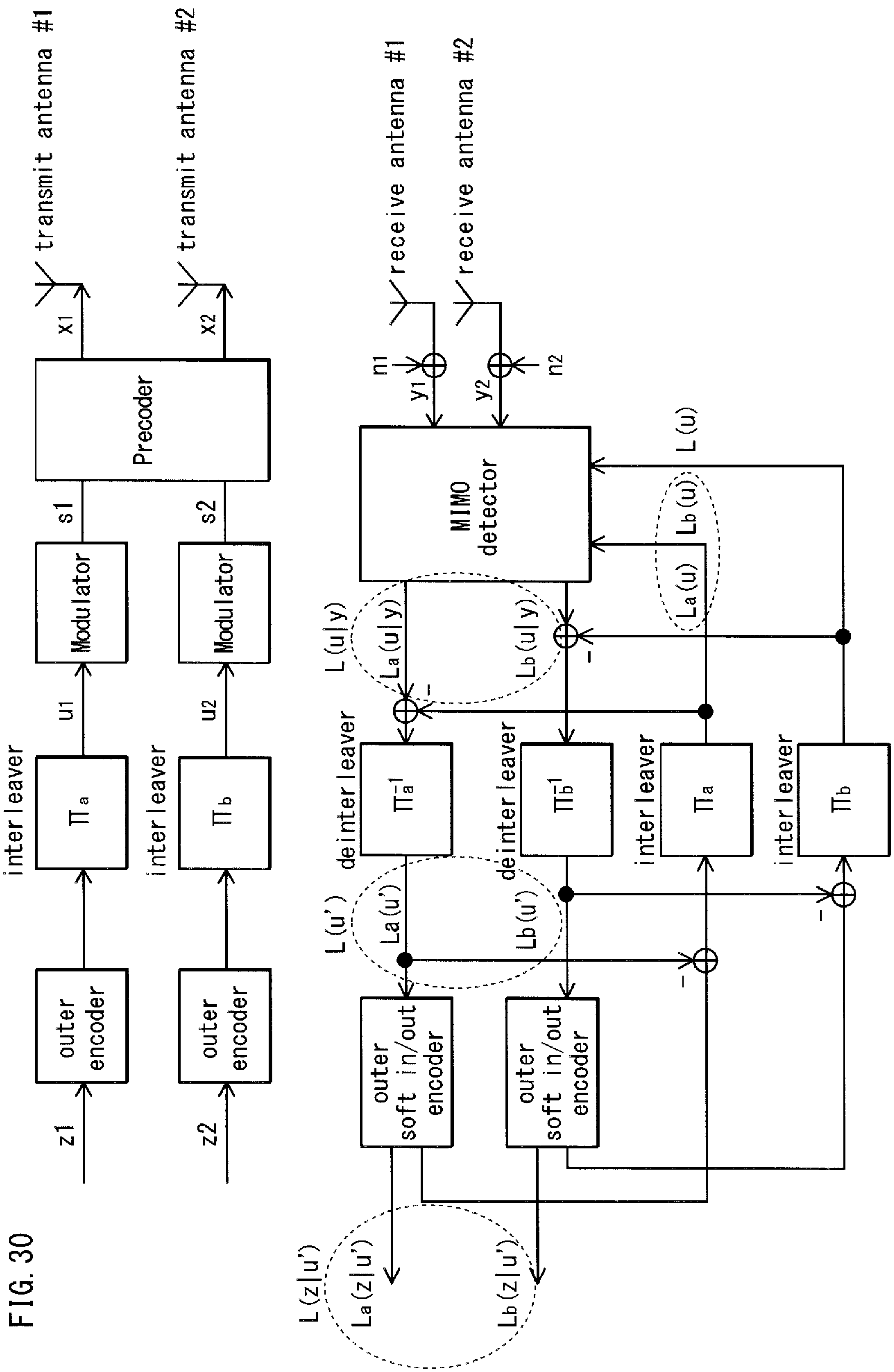
FIG. 30 is an example of a 2×2 MIMO spatial multiplexing MIMO system.

FIG. 30 shows a model of a 2×2 spatial multiplexing MIMO system that adopts precoding in which feedback from a communication partner is not available. An information vector z is encoded and interleaved. As output of the interleaving, an encoded bit vector $u(p)=(u_1(p), u_2(p))$ is acquired (where p is the slot time). Let $u_i(p)=(u_{i1}(p), \ldots, u_{ih}(p))$ (where h is the number of transmission bits per symbol). Letting a signal after modulation (mapping) be $s(p)=(s1(p), s2(p))^T$ and a precoding matrix be F(p), a precoded symbol $x(p)=(x_1(p), x_2(p))^T$ is represented by the following equation.

Math 152

$$\begin{aligned} x(p) &= (x_1(p), x_2(p))^T \\ &= F(p)s(p) \end{aligned} \quad \text{Equation 142}$$

Accordingly, letting a received vector be $y(p)=(y_1(p), y_2(p))^T$, the received vector y(p) is represented by the following equation.

Math 153

$$\begin{aligned} y(p) &= (y_1(p), y_2(p))^T \\ &= H(p)F(p)s(p) + n(p) \end{aligned} \quad \text{Equation 143}$$

In this Equation, H(p) is the channel matrix, $n(p)=(n_1(p), n_2(p))^T$ is the noise vector, and $n_i(p)$ is the i.i.d. complex Gaussian random noise with an average value 0 and variance $\sigma^2$. Letting the Rician factor be K, the above equation can be represented as follows.

Math 154

$$\begin{aligned} y(p) &= (y_1(p), y_2(p))^T \\ &= \left(\sqrt{\frac{K}{K+1}}H_d(p) + \sqrt{\frac{1}{K+1}}H_s(p)\right)F(p)s(p) + n(p) \end{aligned} \quad \text{Equation 144}$$

In this equation, $H_d(p)$ is the channel matrix for the direct wave components, and $H_s(p)$ is the channel matrix for the scattered wave components. Accordingly, the channel matrix H(p) is represented as follows.

Math 155

$$\begin{aligned} H(p) &= \sqrt{\frac{K}{K+1}}H_d(p) + \sqrt{\frac{1}{K+1}}H_s(p) \\ &= \sqrt{\frac{K}{K+1}}\begin{pmatrix} h_{11,d} & h_{12,d} \\ h_{21,d} & h_{22,d} \end{pmatrix} + \\ &\quad \sqrt{\frac{1}{K+1}}\begin{pmatrix} h_{11,s}(p) & h_{12,s}(p) \\ h_{21,s}(p) & h_{22,s}(p) \end{pmatrix} \end{aligned} \quad \text{Equation 145}$$

In Equation 145, it is assumed that the direct wave environment is uniquely determined by the positional relationship between transmitters, and that the channel matrix $H_d(p)$ for the direct wave components does not fluctuate with time. Furthermore, in the channel matrix $H_d(p)$ for the direct wave components, it is assumed that as compared to the interval between transmitting antennas, the probability of an environment with a sufficiently long distance between transmission and reception devices is high, and therefore that the channel matrix for the direct wave components can be treated as a non-singular matrix. Accordingly, the channel matrix $H_d(p)$ is represented as follows.

Math 156

$$\begin{aligned} H_d(p) &= \begin{pmatrix} h_{11,d} & h_{12,d} \\ h_{21,d} & h_{22,d} \end{pmatrix} \\ &= \begin{pmatrix} Ae^{j\psi} & q \\ Ae^{j\psi} & q \end{pmatrix} \end{aligned} \quad \text{Equation 146}$$

In this equation, let A be a positive real number and q be a complex number. Subsequently, out of consideration of an LOS environment, a scheme of designing a precoding matrix is described for a 2×2 spatial multiplexing MIMO system that adopts precoding in which feedback from a communication partner is not available.

From Equations 144 and 145, it is difficult to seek a precoding matrix without appropriate feedback in conditions including scattered waves, since it is difficult to perform analysis under conditions including scattered waves. Additionally, in a NLOS environment, little degradation in reception quality of data occurs as compared to an LOS environment. Therefore, the following describes a scheme of designing precoding matrices without appropriate feedback in an LOS environment (precoding matrices for a precoding scheme that hops between precoding matrices over time).

As described above, since it is difficult to perform analysis under conditions including scattered waves, an appropriate precoding matrix for a channel matrix including components of only direct waves is sought from Equations 144 and 145. Therefore, in Equation 144, the case when the channel matrix includes components of only direct waves is considered. It follows that from Equation 146, Equation 144 can be represented as follows.

Math 157

$$\begin{pmatrix} y_1(p) \\ y_2(p) \end{pmatrix} = H_d(p)F(p)s(p) + n(p) = \begin{pmatrix} Ae^{j\psi} & q \\ Ae^{j\psi} & q \end{pmatrix} F(p)s(p) + n(p) \quad \text{Equation 147}$$

In this equation, a unitary matrix is used as the precoding matrix. Accordingly, the precoding matrix is represented as follows.

Math 158

$$F(p) = \frac{1}{\sqrt{\alpha^2+1}} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \quad \text{Equation 148}$$

In this equation, λ is a fixed value. Therefore, Equation 147 can be represented as follows.

Math 159

$$\begin{pmatrix} y_1(p) \\ y_2(p) \end{pmatrix} = \frac{1}{\sqrt{\alpha^2+1}} \begin{pmatrix} Ae^{j\psi} & q \\ Ae^{j\psi} & q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p) \quad \text{Equation 149}$$

As is clear from Equation 149, when the reception device performs linear operation of Zero Forcing (ZF) or the Minimum Mean Squared Error (MMSE), the transmitted bit cannot be determined by s1(*p*), s2(*p*). Therefore, the iterative APP (or iterative Max-log APP) or APP (or Max-log APP) described in Embodiment 1 is performed (hereafter referred to as Maximum Likelihood (ML) calculation), the log-likelihood ratio of each bit transmitted in s1(*p*), s2(*p*) is sought, and decoding with error correction codes is performed. Accordingly, the following describes a scheme of designing a precoding matrix without appropriate feedback in an LOS environment for a reception device that performs ML calculation.

The precoding in Equation 149 is considered. The right-hand side and left-hand side of the first line are multiplied by $e^{-j\Psi}$, and similarly the right-hand side and left-hand side of the second line are multiplied by $e^{-j\Psi}$. The following equation represents the result.

Math 160

$$\begin{pmatrix} e^{-j\psi} y_1(p) \\ e^{-j\psi} y_2(p) \end{pmatrix} = e^{-j\psi} \left\{ \frac{1}{\sqrt{\alpha^2+1}} \begin{pmatrix} Ae^{j\psi} & q \\ Ae^{j\psi} & q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p) \right\} = \frac{1}{\sqrt{\alpha^2+1}} \begin{pmatrix} Ae^{j0} & e^{-j\psi} q \\ Ae^{j0} & e^{-j\psi} q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + e^{-j\psi} n(p) \quad \text{Equation 150}$$

$e^{-j\Psi}y_1(p)$, $e^{-j\Psi}y_2(p)$, and $e^{-j\Psi}q$ are respectively redefined as $y_1(p)$, $y_2(p)$, and q. Furthermore, since $e^{-j\Psi}n(p)=(e^{-j\Psi}n_1(p), e^{-j\Psi}n_2(p))^T$, and $e^{-j\Psi}n_1(p)$, $e^{-j\Psi}n_2(p)$ are the independent identically distributed (i.i.d.) complex Gaussian random noise with an average value 0 and variance $\sigma^2$, $e^{-j\Psi}n(p)$ is redefined as n(p). As a result, generality is not lost by restating Equation 150 as Equation 151.

Math 161

$$\begin{pmatrix} y_1(p) \\ y_2(p) \end{pmatrix} = \frac{1}{\sqrt{\alpha^2+1}} \begin{pmatrix} Ae^{j0} & q \\ Ae^{j0} & q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p) \quad \text{Equation 151}$$

Next, Equation 151 is transformed into Equation 152 for the sake of clarity.

Math 162

$$\begin{pmatrix} y_1(p) \\ y_2(p) \end{pmatrix} = \frac{1}{\sqrt{\alpha^2+1}} \begin{pmatrix} e^{j0} \\ e^{j0} \end{pmatrix} \begin{pmatrix} Ae^{j0} & q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p) \quad \text{Equation 152}$$

In this case, letting the minimum Euclidian distance between a received signal point and a received candidate signal point be $d_{min}^2$, then a poor point has a minimum value of zero for $d_{min}^2$, and two values of q exist at which conditions are poor in that all of the bits transmitted by s1(*p*) and all of the bits transmitted by s2(*p*) being eliminated.

In Equation 152, when s1(*p*) does not exist.

Math 163

$$q = -\frac{A}{\alpha} e^{j(\theta_{11}(p)-\theta_{21}(p))} \quad \text{Equation 153}$$

In Equation 152, when s2(*p*) does not exist.

Math 164

$$q = -A\alpha e^{j(\theta_{11}(p)-\theta_{21}(p)-\pi)} \quad \text{Equation 154}$$

(Hereinafter, the values of q satisfying Equations 153 and 154 are respectively referred to as "poor reception points for s1 and s2").

When Equation 153 is satisfied, since all of the bits transmitted by s1(*p*) are eliminated, the received log-likelihood ratio cannot be sought for any of the bits transmitted by s1(*p*). When Equation 154 is satisfied, since all of the bits transmitted by s2(*p*) are eliminated, the received log-likelihood ratio cannot be sought for any of the bits transmitted by s2(*p*).

A broadcast/multicast transmission system that does not change the precoding matrix is now considered. In this case, a system model is considered in which a base station transmits modulated signals using a precoding scheme that does not hop between precoding matrices, and a plurality of terminals (Γ terminals) receive the modulated signals transmitted by the base station.

It is considered that the conditions of direct waves between the base station and the terminals change little over time. Therefore, from Equations 153 and 154, for a terminal that is in a position fitting the conditions of Equation 155 or Equation 156 and that is in an LOS environment where the Rician factor is large, the possibility of degradation in the reception quality of data exists. Accordingly, to resolve this problem, it is necessary to change the precoding matrix over time.

Math 165

$$q \approx -\frac{A}{\alpha} e^{j(\theta_{11}(p)-\theta_{21}(p))} \quad \text{Equation 155}$$

Math 166

$$q \approx -A\alpha e^{j(\theta_{11}(p)-\theta_{21}(p)-\pi)} \quad \text{Equation 156}$$

A scheme of regularly hopping between precoding matrices over a time period (cycle) with N slots (hereinafter referred to as a precoding hopping scheme) is considered.

Since there are N slots in the time period (cycle), N varieties of precoding matrices F[i] based on Equation 148 are prepared (i=0, 1, . . . , N−1). In this case, the precoding matrices F[i] are represented as follows.

Math 167

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j\theta_{21}[i]} & e^{j(\theta_{21}[i]+\lambda+\pi)} \end{pmatrix} \quad \text{Equation 157}$$

In this equation, let α not change over time, and let λ also not change over time (though change over time may be allowed).

As in Embodiment 1, F[i] is the precoding matrix used to obtain a precoded signal x (p=N×k+i) in Equation 142 for time N×k+i (where k is an integer equal to or greater than 0, and i=0, 1, . . . , N−1). The same is true below as well.

At this point, based on Equations 153 and 154, design conditions such as the following are important for the precoding matrices for precoding hopping.

Math 168

Condition #10

$$e^{j(\theta_{11}[x]-\theta_{21}[x])} \neq e^{j(\theta_{11}[y]-\theta_{21}[y])} \quad \text{Equation 158}$$

for ∀x, ∀y (x≠y; x,y=0, 1, . . . , N−1)

Math 169

Condition #11

$$e^{j(\theta_{11}[x]-\theta_{21}[x]-\pi)} \neq e^{j(\theta_{11}[y]-\theta_{21}[y]-\pi)} \quad \text{Equation 159}$$

for ∀x, ∀y (x≠y; x,y=0, 1, . . . , N−1)

From Condition #10, in all of the Γ terminals, there is one slot or less having poor reception points for s1 among the N slots in a time period (cycle). Accordingly, the log-likelihood ratio for bits transmitted by s1(*p*) can be obtained for at least N−1 slots. Similarly, from Condition #11, in all of the Γ terminals, there is one slot or less having poor reception points for s2 among the N slots in a time period (cycle). Accordingly, the log-likelihood ratio for bits transmitted by s2(*p*) can be obtained for at least N−1 slots.

In this way, by providing the precoding matrix design model of Condition #10 and Condition #11, the number of bits for which the log-likelihood ratio is obtained among the bits transmitted by s1(*p*), and the number of bits for which the log-likelihood ratio is obtained among the bits transmitted by s2(*p*) is guaranteed to be equal to or greater than a fixed number in all of the Γ terminals. Therefore, in all of the Γ terminals, it is considered that degradation of data reception quality is moderated in an LOS environment where the Rician factor is large.

The following shows an example of a precoding matrix in the precoding hopping scheme.

The probability density distribution of the phase of a direct wave can be considered to be evenly distributed over [0 2π]. Therefore, the probability density distribution of the phase of q in Equations 151 and 152 can also be considered to be evenly distributed over [0 2π]. Accordingly, the following is established as a condition for providing fair data reception quality insofar as possible for Γ terminals in the same LOS environment in which only the phase of q differs.

Condition #12

When using a precoding hopping scheme with an N-slot time period (cycle), among the N slots in the time period (cycle), the poor reception points for s1 are arranged to have an even distribution in terms of phase, and the poor reception points for s2 are arranged to have an even distribution in terms of phase.

The following describes an example of a precoding matrix in the precoding hopping scheme based on Condition #10 through Condition #12. Let α=1.0 in the precoding matrix in Equation 157.

Example #5

Let the number of slots N in the time period (cycle) be 8. In order to satisfy Condition #10 through Condition #12, precoding matrices for a precoding hopping scheme with an N=8 time period (cycle) are provided as in the following equation.

Math 170

$$F[i] = \frac{1}{\sqrt{2}} \begin{pmatrix} e^{j0} & e^{j0} \\ e^{j\frac{i\pi}{4}} & e^{j\left(\frac{i\pi}{4}+\pi\right)} \end{pmatrix} \quad \text{Equation 160}$$

Here, j is an imaginary unit, and i=0, 1, . . . , 7. Instead of Equation 160, Equation 161 may be provided (where λ and $\theta_{11}[i]$ do not change over time (though change may be allowed)).

Math 171

$$F[i] = \frac{1}{\sqrt{2}} \begin{pmatrix} e^{j\theta_{11}[i]} & e^{j(\theta_{11}[i]+\lambda)} \\ e^{j\left(\theta_{11}[i]+\frac{i\pi}{4}\right)} & e^{j\left(\theta_{11}[i]+\frac{i\pi}{4}+\lambda+\pi\right)} \end{pmatrix} \quad \text{Equation 161}$$

Figure 31A:
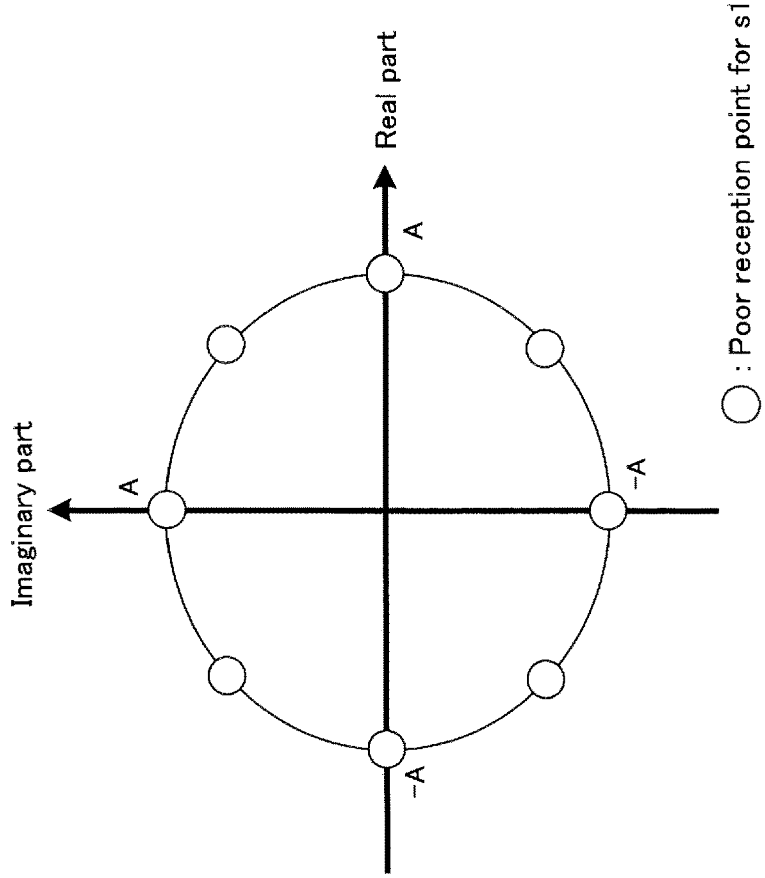
FIGS. 31A and 31B show positions of poor reception points.
Figure 31B:
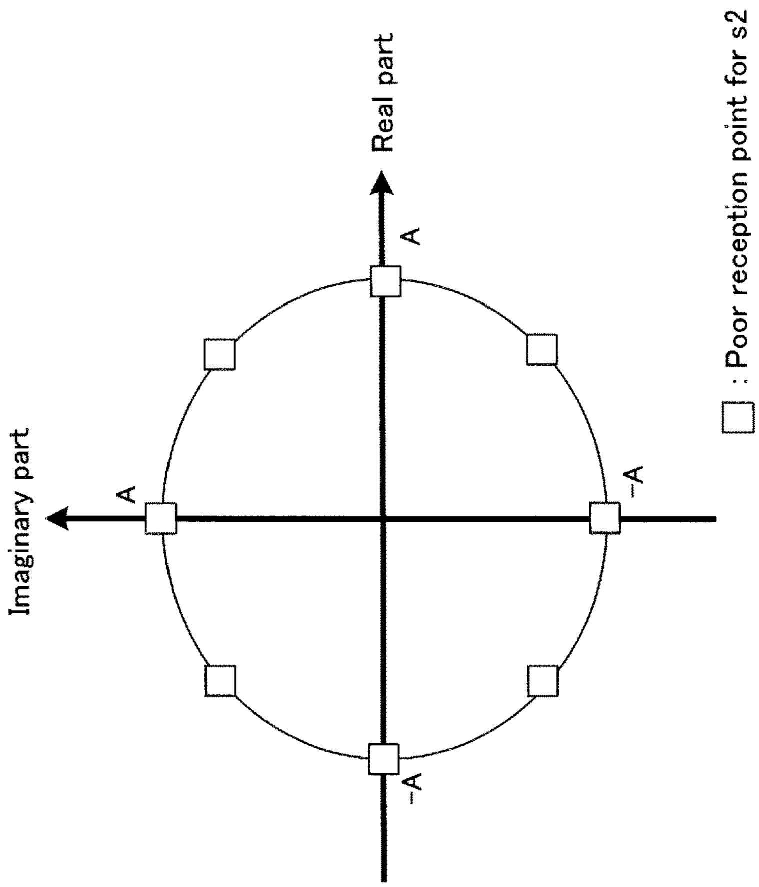

Accordingly, the poor reception points for s1 and s2 become as in FIGS. 31A and 31B. (In FIGS. 31A and 31B, the horizontal axis is the real axis, and the vertical axis is the imaginary axis.) Instead of Equations 160 and 161, Equations 162 and 163 may be provided (where i=0, 1, . . . , 7, and where λ and $\theta_{11}[i]$ do not change over time (though change may be allowed)).

Math 172

$$F[i]=\frac{1}{\sqrt{2}}\begin{pmatrix} e^{j0} & e^{j0} \\ e^{j\left(-\frac{i\pi}{4}\right)} & e^{j\left(-\frac{i\pi}{4}+\pi\right)} \end{pmatrix} \quad \text{Equation 162}$$

Math 173

$$F[i]=\frac{1}{\sqrt{2}}\begin{pmatrix} e^{j\theta_{11}[i]} & e^{j(\theta_{11}[i]+\lambda)} \\ e^{j\left(\theta_{11}[i]-\frac{i\pi}{4}\right)} & e^{j\left(\theta_{11}[i]-\frac{i\pi}{4}+\lambda+\pi\right)} \end{pmatrix} \quad \text{Equation 163}$$

Next, the following is established as a condition, different from Condition #12, for providing fair data reception quality insofar as possible for Γ terminals in the same LOS environment in which only the phase of q differs.

Condition #13

When using a precoding hopping scheme with an N-slot time period (cycle), in addition to the condition Math 174

$$e^{j(\Theta_{11}[x]-\Theta_{21}[x])}\neq e^{j(\Theta_{11}[y]-\Theta_{21}[y]-\pi)} \quad \text{Equation 164}$$

for ∀x, ∀y (x,y=0, 1, . . . , N−1)

the poor reception points for s1 and the poor reception points for s2 are arranged to be in an even distribution with respect to phase in the N slots in the time period (cycle).

The following describes an example of a precoding matrix in the precoding hopping scheme based on Condition #10, Condition #11, and Condition #13. Let α=1.0 in the precoding matrix in Equation 157.

Example #6

Let the number of slots N in the time period (cycle) be 4. Precoding matrices for a precoding hopping scheme with an N=4 time period (cycle) are provided as in the following equation.

Math 175

$$F[i]=\frac{1}{\sqrt{2}}\begin{pmatrix} e^{j0} & e^{j0} \\ e^{j\frac{i\pi}{4}} & e^{j\left(\frac{i\pi}{4}+\pi\right)} \end{pmatrix} \quad \text{Equation 165}$$

Here, j is an imaginary unit, and i=0, 1, 2, 3. Instead of Equation 165, Equation 166 may be provided (where λ and $\theta_{11}[i]$ do not change over time (though change may be allowed)).

Math 176

$$F[i]=\frac{1}{\sqrt{2}}\begin{pmatrix} e^{j\theta_{11}[i]} & e^{j(\theta_{11}[i]+\lambda)} \\ e^{j\left(\theta_{11}[i]+\frac{i\pi}{4}\right)} & e^{j\left(\theta_{11}[i]+\frac{i\pi}{4}+\lambda+\pi\right)} \end{pmatrix} \quad \text{Equation 166}$$

Figure 32:
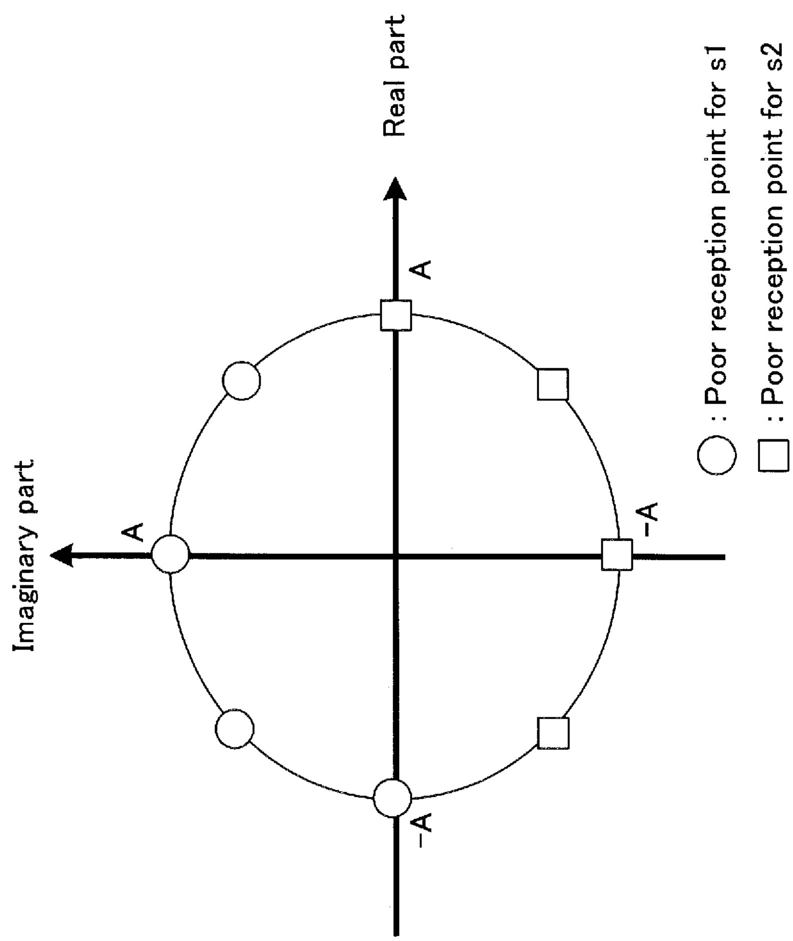
FIG. 32 shows positions of poor reception points.

Accordingly, the poor reception points for s1 and s2 become as in FIG. 32. (In FIG. 32, the horizontal axis is the real axis, and the vertical axis is the imaginary axis.) Instead of Equations 165 and 166, Equations 167 and 168 may be provided (where i=0, 1, 2, 3, and where λ and $\theta_{11}[i]$ do not change over time (though change may be allowed)).

Math 177

$$F[i]=\frac{1}{\sqrt{2}}\begin{pmatrix} e^{j0} & e^{j0} \\ e^{j\left(-\frac{i\pi}{4}\right)} & e^{j\left(-\frac{i\pi}{4}+\pi\right)} \end{pmatrix} \quad \text{Equation 167}$$

Math 178

$$F[i]=\frac{1}{\sqrt{2}}\begin{pmatrix} e^{j\theta_{11}[i]} & e^{j(\theta_{11}[i]+\lambda)} \\ e^{j\left(\theta_{11}[i]-\frac{i\pi}{4}\right)} & e^{j\left(\theta_{11}[i]-\frac{i\pi}{4}+\lambda+\pi\right)} \end{pmatrix} \quad \text{Equation 168}$$

Next, a precoding hopping scheme using a non-unitary matrix is described.

Based on Equation 148, the precoding matrices presently under consideration are represented as follows.

Math 179

$$F(p)=\frac{1}{\sqrt{\alpha^2+1}}\begin{pmatrix} e^{j\theta_{11}(p)} & \alpha\times e^{j(\theta_{11}(p)+\lambda)} \\ \alpha\times e^{j\theta_{21}(p)} & e^{j(\theta_{21}(p)+\lambda+\delta)} \end{pmatrix} \quad \text{Equation 169}$$

Equations corresponding to Equations 151 and 152 are represented as follows.

Math 180

$$\begin{pmatrix} y_1(p) \\ y_2(p) \end{pmatrix}=\frac{1}{\sqrt{\alpha^2+1}}\begin{pmatrix} Ae^{j0} & q \\ Ae^{j0} & q \end{pmatrix}\begin{pmatrix} e^{j\theta_{11}(p)} & \alpha\times e^{j(\theta_{11}(p)+\lambda)} \\ \alpha\times e^{j\theta_{21}(p)} & e^{j(\theta_{21}(p)+\lambda+\delta)} \end{pmatrix}\begin{pmatrix} s1(p) \\ s2(p) \end{pmatrix}+n(p) \quad \text{Equation 170}$$

Math 181

$$\begin{pmatrix} y_1(p) \\ y_2(p) \end{pmatrix}=\frac{1}{\sqrt{\alpha^2+1}}\begin{pmatrix} e^{j0} \\ e^{j0} \end{pmatrix}\left(Ae^{j0}\ q\right)\begin{pmatrix} e^{j\theta_{11}(p)} & \alpha\times e^{j(\theta_{11}(p)+\lambda)} \\ \alpha\times e^{j\theta_{21}(p)} & e^{j(\theta_{21}(p)+\lambda+\delta)} \end{pmatrix}\begin{pmatrix} s1(p) \\ s2(p) \end{pmatrix}+n(p) \quad \text{Equation 171}$$

In this case, there are two q at which the minimum value $d_{min}^2$ of the Euclidian distance between a received signal point and a received candidate signal point is zero.

In Equation 171, when s1(*p*) does not exist:

Math 182

$$q=-\frac{A}{\alpha}e^{j(\theta_{11}(p)-\theta_{21}(p))} \quad \text{Equation 172}$$

In Equation 171, when s2(*p*) does not exist:

Math 183

$$q=-A\alpha_e^{j(\Theta_{11}(p)-\Theta_{21}(p)-\delta)} \quad \text{Equation 173}$$

In the precoding hopping scheme for an N-slot time period (cycle), by referring to Equation 169, N varieties of the precoding matrix F[i] are represented as follows.

Math 184

$$F[i] = \frac{1}{\sqrt{\alpha^2+1}}\begin{pmatrix} e^{j\theta_{11}[i]} & \alpha\times e^{j(\theta_{11}[i]+\lambda)} \\ \alpha\times e^{j\theta_{21}[i]} & e^{j(\theta_{21}[i]+\lambda+\delta)} \end{pmatrix} \quad \text{Equation 174}$$

In this equation, let α and δ not change over time. At this point, based on Equations 34 and 35, design conditions such as the following are provided for the precoding matrices for precoding hopping.

Math 185

Condition #14

$$e^{j(\theta_{11}[x]-\theta_{21}[x])}\neq e^{j(\theta_{11}[y]-\theta_{21}[y])} \quad \text{Equation 175}$$

for ∀x, ∀y (x≠y; x,y=0, 1, . . . , N−1)

Math 186

Condition #15

$$e^{j(\theta_{11}[x]-\theta_{21}[x]-\delta)}\neq e^{j(\theta_{11}[y]-\theta_{21}[y]-\delta)} \quad \text{Equation 176}$$

for ∀x, ∀y (x≠y; x,y=0, 1, . . . , N−1)

Example #7

Let α=1.0 in the precoding matrix in Equation 174. Let the number of slots N in the time period (cycle) be 16. In order to satisfy Condition #12, Condition #14, and Condition #15, precoding matrices for a precoding hopping scheme with an N=16 time period (cycle) are provided as in the following equations.

For i=0, 1, . . . , 7:

Math 187

$$F[i] = \frac{1}{\sqrt{2}}\begin{pmatrix} e^{j0} & e^{j0} \\ e^{j\frac{i\pi}{4}} & e^{j\left(\frac{i\pi}{4}+\frac{7\pi}{8}\right)} \end{pmatrix} \quad \text{Equation 177}$$

For i=8, 9, . . . , 15:

Math 188

$$F[i] = \frac{1}{\sqrt{2}}\begin{pmatrix} e^{j\frac{i\pi}{4}} & e^{j\left(\frac{i\pi}{4}+\frac{7\pi}{8}\right)} \\ e^{j0} & e^{j0} \end{pmatrix} \quad \text{Equation 178}$$

Furthermore, a precoding matrix that differs from Equations 177 and 178 can be provided as follows.

For i=0, 1, . . . , 7:

Math 189

$$F[i] = \frac{1}{\sqrt{2}}\begin{pmatrix} e^{j\theta_{11}[i]} & e^{j(\theta_{11}[i]+\lambda)} \\ e^{j\left(\theta_{11}[i]+\frac{i\pi}{4}\right)} & e^{j\left(\theta_{11}[i]+\frac{i\pi}{4}+\lambda+\frac{7\pi}{8}\right)} \end{pmatrix} \quad \text{Equation 179}$$

For i=8, 9, . . . , 15:

Math 190

$$F[i] = \frac{1}{\sqrt{2}}\begin{pmatrix} e^{j\left(\theta_{11}[i]+\frac{i\pi}{4}\right)} & e^{j\left(\theta_{11}[i]+\frac{i\pi}{4}+\lambda+\frac{7\pi}{8}\right)} \\ e^{j\theta_{11}[i]} & e^{j(\theta_{11}[i]+\lambda)} \end{pmatrix} \quad \text{Equation 180}$$

Figure 33B:
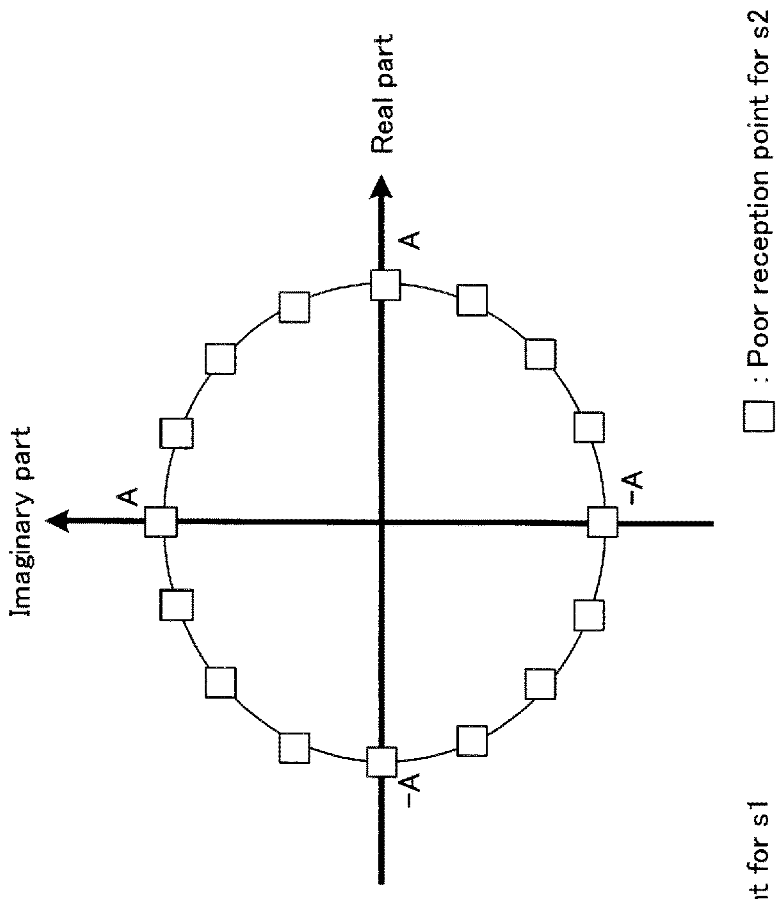
FIGS. 33A and 33B show positions of poor reception points.
Figure 33A:
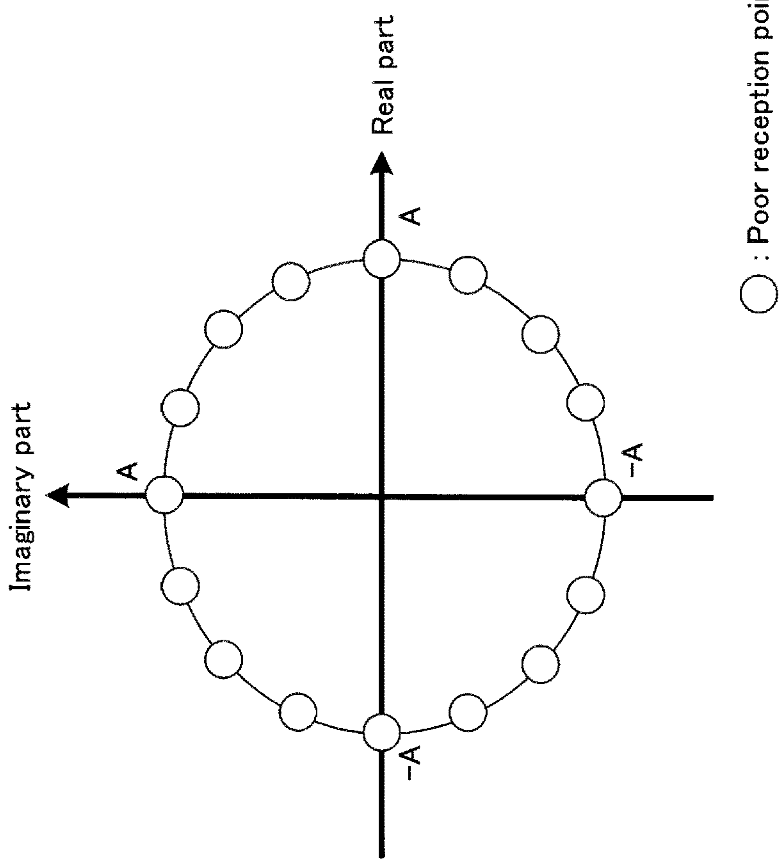

Accordingly, the poor reception points for s1 and s2 become as in FIGS. 33A and 33B.

(In FIGS. 33A and 33B, the horizontal axis is the real axis, and the vertical axis is the imaginary axis.) Instead of Equations 177 and 178, and Equations 179 and 180, precoding matrices may be provided as below.

For i=0, 1, . . . , 7:

Math 191

$$F[i] = \frac{1}{\sqrt{2}}\begin{pmatrix} e^{j0} & e^{j0} \\ e^{j\left(-\frac{i\pi}{4}\right)} & e^{j\left(-\frac{i\pi}{4}+\frac{7\pi}{8}\right)} \end{pmatrix} \quad \text{Equation 181}$$

For i=8, 9, . . . , 15:

Math 192

$$F[i] = \frac{1}{\sqrt{2}}\begin{pmatrix} e^{j\left(-\frac{i\pi}{4}\right)} & e^{j\left(-\frac{i\pi}{4}+\frac{7\pi}{8}\right)} \\ e^{j0} & e^{j0} \end{pmatrix} \quad \text{Equation 182}$$

or

For i=0, 1, . . . , 7:

Math 193

$$F[i] = \frac{1}{\sqrt{2}}\begin{pmatrix} e^{j\theta_{11}[i]} & e^{j(\theta_{11}[i]+\lambda)} \\ e^{j\left(\theta_{11}[i]-\frac{i\pi}{4}\right)} & e^{j\left(\theta_{11}[i]-\frac{i\pi}{4}+\lambda+\frac{7\pi}{8}\right)} \end{pmatrix} \quad \text{Equation 183}$$

For i=8, 9, . . . , 15:

Math 194

$$F[i] = \frac{1}{\sqrt{2}}\begin{pmatrix} e^{j\left(\theta_{11}[i]-\frac{i\pi}{4}\right)} & e^{j\left(\theta_{11}[i]-\frac{i\pi}{4}+\lambda+\frac{7\pi}{8}\right)} \\ e^{j\theta_{11}[i]} & e^{j(\theta_{11}[i]+\lambda)} \end{pmatrix} \quad \text{Equation 184}$$

(In Equations 177-184, 7π/8 may be changed to −7π/8.)

Next, the following is established as a condition, different from Condition #12, for providing fair data reception quality insofar as possible for Γ terminals in the same LOS environment in which only the phase of q differs.

Condition #16

When using a precoding hopping scheme with an N-slot time period (cycle), the following condition is set:

Math 195

$$e^{j(\theta_{11}[x]-\theta_{21}[x])}\neq e^{j(\theta_{11}[y]-\theta_{21}[y]-\delta)} \quad \text{Equation 185}$$

for ∀x, ∀y (x,y=0, 1, . . . , N−1)

and the poor reception points for s1 and the poor reception points for s2 are arranged to be in an even distribution with respect to phase in the N slots in the time period (cycle).

The following describes an example of a precoding matrix in the precoding hopping scheme based on Condition #14, Condition #15, and Condition #16. Let α=1.0 in the precoding matrix in Equation 174.

Example #8

Let the number of slots N in the time period (cycle) be 8. Precoding matrices for a precoding hopping scheme with an N=8 time period (cycle) are provided as in the following equation.

Math 196

$$F[i] = \frac{1}{\sqrt{2}}\begin{pmatrix} e^{j0} & e^{j0} \\ e^{j\frac{i\pi}{4}} & e^{j\left(\frac{i\pi}{4}+\frac{7\pi}{8}\right)} \end{pmatrix} \quad \text{Equation 186}$$

Here, i=0, 1, . . . , 7.

Furthermore, a precoding matrix that differs from Equation 186 can be provided as follows (where i=0, 1, . . . , 7, and where λ and $\theta_{11}[i]$ do not change over time (though change may be allowed)).

Math 197

$$F[i] = \frac{1}{\sqrt{2}}\begin{pmatrix} e^{j\theta_{11}[i]} & e^{j(\theta_{11}[i]+\lambda)} \\ e^{j\left(\theta_{11}[i]+\frac{i\pi}{4}\right)} & e^{j\left(\theta_{11}[i]+\frac{i\pi}{4}+\lambda+\frac{7\pi}{8}\right)} \end{pmatrix} \quad \text{Equation 187}$$

Figure 34:
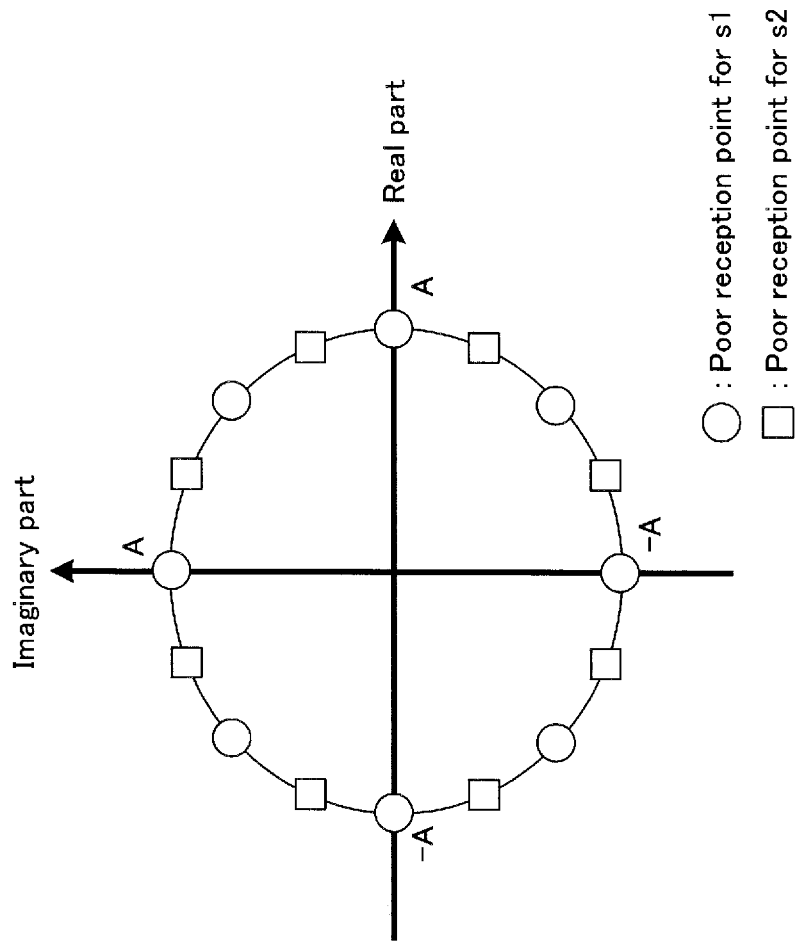
FIG. 34 shows positions of poor reception points.

Accordingly, the poor reception points for s1 and s2 become as in FIG. 34. Instead of Equations 186 and 187, precoding matrices may be provided as follows (where i=0, 1, . . . , 7, and where λ and $\theta_{11}[i]$ do not change over time (though change may be allowed)).

Math 198

$$F[i] = \frac{1}{\sqrt{2}}\begin{pmatrix} e^{j0} & \alpha\times e^{j0} \\ e^{j\left(-\frac{i\pi}{4}\right)} & e^{j\left(-\frac{i\pi}{4}+\frac{7\pi}{8}\right)} \end{pmatrix} \quad \text{Equation 188}$$

or

Math 199

$$F[i] = \frac{1}{\sqrt{2}}\begin{pmatrix} e^{j\theta_{11}[i]} & \alpha\times e^{j(\theta_{11}[i]+\lambda)} \\ e^{j\left(\theta_{11}[i]-\frac{i\pi}{4}\right)} & e^{j\left(\theta_{11}[i]-\frac{i\pi}{4}+\lambda+\frac{7\pi}{8}\right)} \end{pmatrix} \quad \text{Equation 189}$$

(In Equations 186-189, 7π/8 may be changed to −7π/8.)

Next, in the precoding matrix of Equation 174, a precoding hopping scheme that differs from Example #7 and Example #8 by letting α≠1, and by taking into consideration the distance in the complex plane between poor reception points, is examined.

In this case, the precoding hopping scheme for an N-slot time period (cycle) of Equation 174 is used, and from Condition #14, in all of the Γ terminals, there is one slot or less having poor reception points for s1 among the N slots in a time period (cycle). Accordingly, the log-likelihood ratio for bits transmitted by s1(*p*) can be obtained for at least N−1 slots. Similarly, from Condition #15, in all of the Γ terminals, there is one slot or less having poor reception points for s2 among the N slots in a time period (cycle). Accordingly, the log-likelihood ratio for bits transmitted by s2(*p*) can be obtained for at least N−1 slots.

Therefore, it is clear that a larger value for N in the N-slot time period (cycle) increases the number of slots in which the log-likelihood ratio can be obtained.

Incidentally, since the influence of scattered wave components is also present in an actual channel model, it is considered that when the number of slots N in the time period (cycle) is fixed, there is a possibility of improved data reception quality if the minimum distance in the complex plane between poor reception points is as large as possible. Accordingly, in the context of Example #7 and Example #8, precoding hopping schemes in which α≠1 and which improve on Example #7 and Example #8 are considered. The precoding scheme that improves on Example #8 is easier to understand and is therefore described first.

Example #9

From Equation 186, the precoding matrices in an N=8 time period (cycle) precoding hopping scheme that improves on Example #8 are provided in the following equation.

Math 200

$$F[i] = \frac{1}{\sqrt{\alpha^2+1}}\begin{pmatrix} e^{j0} & \alpha\times e^{j0} \\ \alpha\times e^{j\frac{i\pi}{4}} & e^{j\left(\frac{i\pi}{4}+\frac{7\pi}{8}\right)} \end{pmatrix} \quad \text{Equation 190}$$

Here, i=0, 1, . . . , 7. Furthermore, precoding matrices that differ from Equation 190 can be provided as follows (where i=0, 1, . . . , 7, and where λ and $\theta_{11}[i]$ do not change over time (though change may be allowed)).

Math 201

$$F[i] = \frac{1}{\sqrt{\alpha^2+1}}\begin{pmatrix} e^{j\theta_{11}[i]} & \alpha\times e^{j(\theta_{11}[i]+\lambda)} \\ \alpha\times e^{j\left(\theta_{11}[i]+\frac{i\pi}{4}\right)} & e^{j\left(\theta_{11}[i]+\frac{i\pi}{4}+\lambda+\frac{7\pi}{8}\right)} \end{pmatrix} \quad \text{Equation 191}$$

or

Math 202

$$F[i] = \frac{1}{\sqrt{\alpha^2+1}}\begin{pmatrix} e^{j0} & \alpha\times e^{j0} \\ \alpha\times e^{j\left(-\frac{i\pi}{4}\right)} & e^{j\left(-\frac{i\pi}{4}+\frac{7\pi}{8}\right)} \end{pmatrix} \quad \text{Equation 192}$$

or

Math 203

$$F[i] = \frac{1}{\sqrt{\alpha^2+1}}\begin{pmatrix} e^{j\theta_{11}[i]} & \alpha\times e^{j(\theta_{11}[i]+\lambda)} \\ \alpha\times e^{j\left(\theta_{11}[i]-\frac{i\pi}{4}\right)} & e^{j\left(\theta_{11}[i]-\frac{i\pi}{4}+\lambda+\frac{7\pi}{8}\right)} \end{pmatrix} \quad \text{Equation 193}$$

or

Math 204

$$F[i] = \frac{1}{\sqrt{\alpha^2+1}}\begin{pmatrix} e^{j0} & \alpha\times e^{j0} \\ \alpha\times e^{j\frac{i\pi}{4}} & e^{j\left(\frac{i\pi}{4}-\frac{7\pi}{8}\right)} \end{pmatrix} \quad \text{Equation 194}$$

or

Math 205

$$F[i] = \frac{1}{\sqrt{\alpha^2+1}}\begin{pmatrix} e^{j\theta_{11}[i]} & \alpha\times e^{j(\theta_{11}[i]+\lambda)} \\ \alpha\times e^{j\left(\theta_{11}[i]+\frac{i\pi}{4}\right)} & e^{j\left(\theta_{11}[i]+\frac{i\pi}{4}+\lambda-\frac{7\pi}{8}\right)} \end{pmatrix} \quad \text{Equation 195}$$

or

-continued

Math 206

$$F[i] = \frac{1}{\sqrt{\alpha^2+1}} \begin{pmatrix} e^{j0} & \alpha \times e^{j0} \\ \alpha \times e^{j\left(-\frac{i\pi}{4}\right)} & e^{j\left(-\frac{i\pi}{4} - \frac{7\pi}{8}\right)} \end{pmatrix} \quad \text{Equation 196}$$

or

Math 207

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j\left(\theta_{11}[i] - \frac{i\pi}{4}\right)} & e^{j\left(\theta_{11}[i] - \frac{i\pi}{4} + \lambda - \frac{7\pi}{8}\right)} \end{pmatrix} \quad \text{Equation 197}$$

Figure 35A:
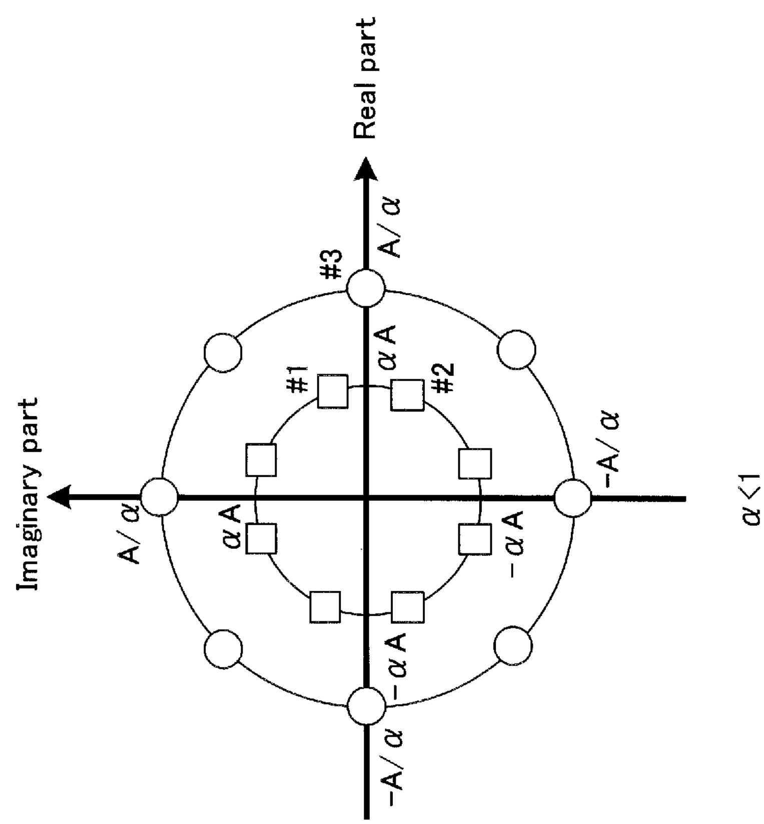
FIGS. 35A and 35B show positions of poor reception points.
Figure 35B:
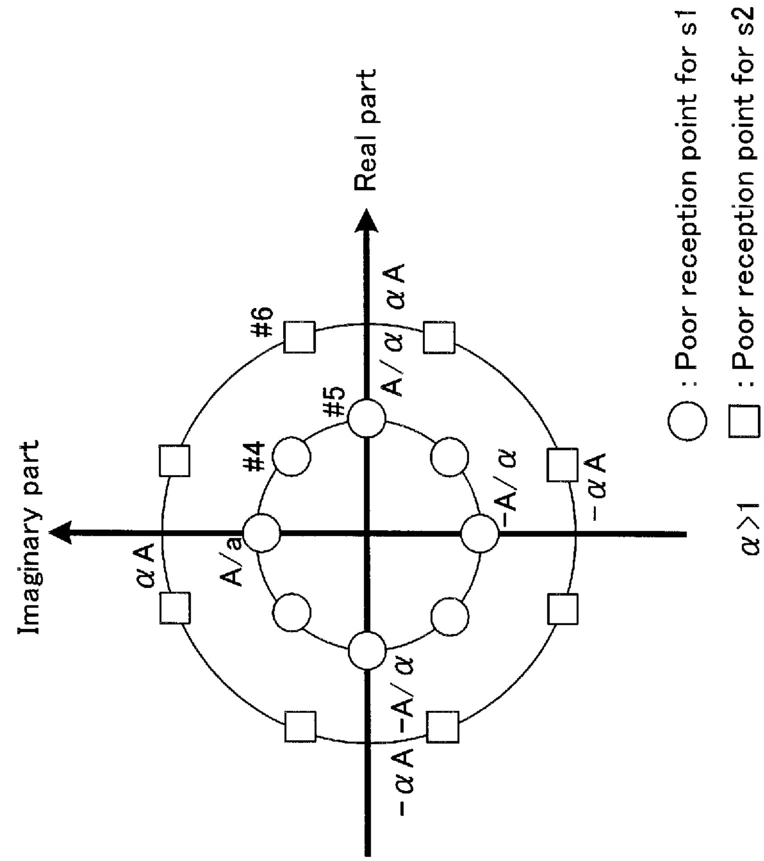

Therefore, the poor reception points for s1 and s2 are represented as in FIG. 35A when $\alpha<1.0$ and as in FIG. 35B when $\alpha>1.0$.

(i) When $\alpha<1.0$

Figure 36:
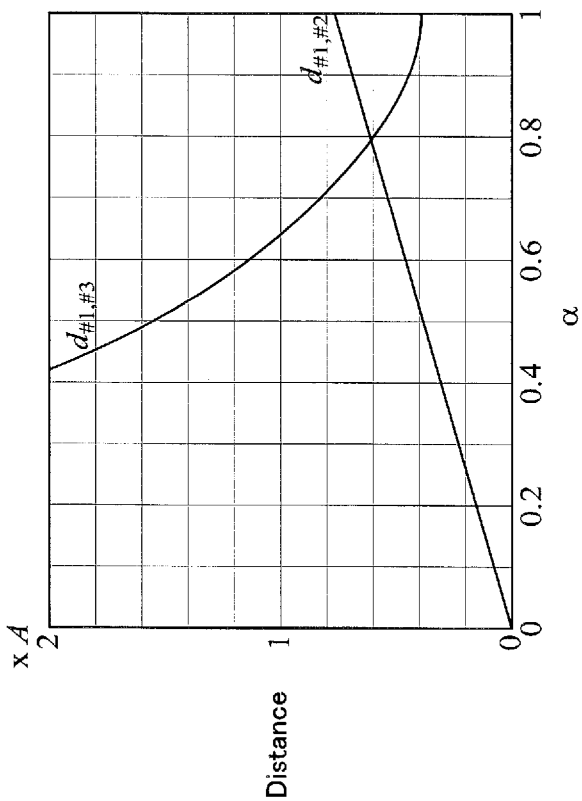
FIG. 36 shows an example of minimum distance characteristics of poor reception points in an imaginary plane.

When $\alpha<1.0$, the minimum distance in the complex plane between poor reception points is represented as $\min\{d_{\#1,\#2}, d_{\#1,\#3}\}$ when focusing on the distance ($d_{\#1,\#2}$) between poor reception points #1 and #2 and the distance ($d_{\#1,\#3}$) between poor reception points #1 and #3. In this case, the relationship between $\alpha$ and $d_{\#1,\#2}$ and between $\alpha$ and $d_{\#1,\#3}$ is shown in FIG. 36. The $\alpha$ which makes $\min\{d_{\#1,\#2}, d_{\#1,\#3}\}$ the largest is as follows.

Math 208

$$\alpha = \frac{1}{\sqrt{\cos\left(\frac{\pi}{8}\right) + \sqrt{3}\sin\left(\frac{\pi}{8}\right)}} \approx 0.7938 \quad \text{Equation 198}$$

The $\min\{d_{\#1,\#2}, d_{\#1,\#3}\}$ in this case is as follows.

Math 209

$$\min\{d_{\#1,\#2}, d_{\#1,\#3}\} = \frac{2A\sin\left(\frac{\pi}{8}\right)}{\sqrt{\cos\left(\frac{\pi}{8}\right) + \sqrt{3}\sin\left(\frac{\pi}{8}\right)}} \approx 0.6076A \quad \text{Equation 199}$$

Therefore, the precoding scheme using the value of $\alpha$ in Equation 198 for Equations 190-197 is effective. Setting the value of $\alpha$ as in Equation 198 is one appropriate scheme for obtaining excellent data reception quality. Setting a to be a value near Equation 198, however, may similarly allow for excellent data reception quality. Accordingly, the value to which a is set is not limited to Equation 198.

(ii) When $\alpha>1.0$

Figure 37:
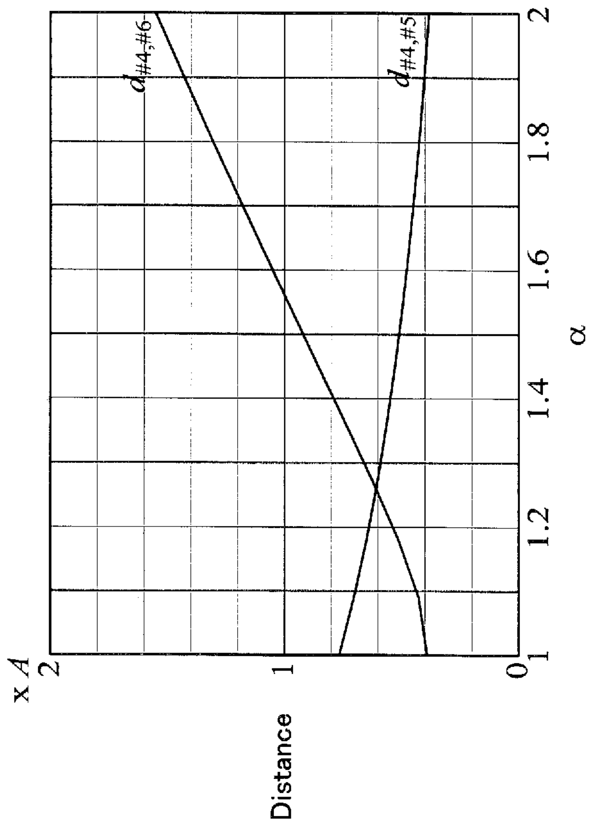
FIG. 37 shows an example of minimum distance characteristics of poor reception points in an imaginary plane.

When $\alpha>1.0$, the minimum distance in the complex plane between poor reception points is represented as $\min\{d_{\#4,\#5}, d_{\#4,\#6}\}$ when focusing on the distance ($d_{\#4,\#5}$) between poor reception points #4 and #5 and the distance ($d_{\#4,\#6}$) between poor reception points #4 and #6. In this case, the relationship between $\alpha$ and $d_{\#4,\#5}$ and between $\alpha$ and $d_{\#4,\#6}$ is shown in FIG. 37. The a which makes $\min\{d_{\#4,\#5}, d_{\#4,\#6}\}$ the largest is as follows.

Math 210

$$\alpha = \sqrt{\cos\left(\frac{\pi}{8}\right) + \sqrt{3}\sin\left(\frac{\pi}{8}\right)} \approx 1.2596 \quad \text{Equation 200}$$

The $\min\{d_{\#4,\#5}, d_{\#4,\#6}\}$ in this case is as follows.

Math 211

$$\min\{d_{\#4,\#5}, d_{\#4,\#6}\} = \frac{2A\sin\left(\frac{\pi}{8}\right)}{\sqrt{\cos\left(\frac{\pi}{8}\right) + \sqrt{3}\sin\left(\frac{\pi}{8}\right)}} \approx 0.6076A \quad \text{Equation 201}$$

Therefore, the precoding scheme using the value of $\alpha$ in Equation 200 for Equations 190-197 is effective. Setting the value of $\alpha$ as in Equation 200 is one appropriate scheme for obtaining excellent data reception quality. Setting $\alpha$ to be a value near Equation 200, however, may similarly allow for excellent data reception quality. Accordingly, the value to which $\alpha$ is set is not limited to Equation 200.

Example #10

Based on consideration of Example #9, the precoding matrices in an N=16 time period (cycle) precoding hopping scheme that improves on Example #7 are provided in the following equations (where $\lambda$ and $\theta_{11}[i]$ do not change over time (though change may be allowed)).

For i=0, 1, . . . , 7:

Math 212

$$F[i] = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{i\pi}{4} + \frac{7\pi}{8}\right)} \end{pmatrix} \quad \text{Equation 202}$$

For i=8, 9, . . . , 15:

Math 213

$$F[i] = \frac{1}{\sqrt{\alpha^2+1}} \begin{pmatrix} \alpha \times e^{j\frac{i\pi}{4}} & e^{j\left(\frac{i\pi}{4} + \frac{7\pi}{8}\right)} \\ e^{j0} & \alpha \times e^{j0} \end{pmatrix} \quad \text{Equation 203}$$

or

For i=0, 1, . . . , 7:

Math 214

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j\left(\theta_{11}[i] + \frac{i\pi}{4}\right)} & e^{j\left(\theta_{11}[i] + \frac{i\pi}{4} + \lambda + \frac{7\pi}{8}\right)} \end{pmatrix} \quad \text{Equation 204}$$

For i=8, 9, . . . , 15:

Math 215

$$F[i]=\frac{1}{\sqrt{\alpha^2+1}}\begin{pmatrix}\alpha\times e^{j\left(\theta_{11}[i]+\frac{i\pi}{4}\right)} & e^{j\left(\theta_{11}[i]+\frac{i\pi}{4}+\lambda+\frac{7\pi}{8}\right)}\\ e^{j\theta_{11}[i]} & \alpha\times e^{j(\theta_{11}[i]+\lambda)}\end{pmatrix}\quad\text{Equation 205}$$

or

For i=0, 1, . . . , 7:

Math 216

$$F[i]=\frac{1}{\sqrt{\alpha^2+1}}\begin{pmatrix}e^{j0} & \alpha\times e^{j0}\\ \alpha\times e^{j\left(-\frac{i\pi}{4}\right)} & e^{j\left(-\frac{i\pi}{4}+\frac{7\pi}{8}\right)}\end{pmatrix}\quad\text{Equation 206}$$

For i=8, 9, . . . , 15:

Math 217

$$F[i]=\frac{1}{\sqrt{\alpha^2+1}}\begin{pmatrix}\alpha\times e^{j\left(-\frac{i\pi}{4}\right)} & e^{j\left(-\frac{i\pi}{4}+\frac{7\pi}{8}\right)}\\ e^{j0} & \alpha\times e^{j0}\end{pmatrix}\quad\text{Equation 207}$$

or

For i=0, 1, . . . , 7:

Math 218

$$F[i]=\frac{1}{\sqrt{\alpha^2+1}}\begin{pmatrix}e^{j\theta_{11}[i]} & \alpha\times e^{j(\theta_{11}[i]+\lambda)}\\ \alpha\times e^{j\left(\theta_{11}[i]-\frac{i\pi}{4}\right)} & e^{j\left(\theta_{11}[i]-\frac{i\pi}{4}+\lambda+\frac{7\pi}{8}\right)}\end{pmatrix}\quad\text{Equation 208}$$

For i=8, 9, . . . , 15:

Math 219

$$F[i]=\frac{1}{\sqrt{\alpha^2+1}}\begin{pmatrix}\alpha\times e^{j\left(\theta_{11}[i]-\frac{i\pi}{4}\right)} & e^{j\left(\theta_{11}[i]-\frac{i\pi}{4}+\lambda+\frac{7\pi}{8}\right)}\\ e^{j\theta_{11}[i]} & \alpha\times e^{j(\theta_{11}[i]+\lambda)}\end{pmatrix}\quad\text{Equation 209}$$

or

For i=0, 1, . . . , 7:

Math 220

$$F[i]=\frac{1}{\sqrt{\alpha^2+1}}\begin{pmatrix}e^{j0} & \alpha\times e^{j0}\\ \alpha\times e^{j\frac{i\pi}{4}} & e^{j\left(\frac{i\pi}{4}-\frac{7\pi}{8}\right)}\end{pmatrix}\quad\text{Equation 210}$$

For i=8, 9, . . . , 15:

Math 221

$$F[i]=\frac{1}{\sqrt{\alpha^2+1}}\begin{pmatrix}\alpha\times e^{j\frac{i\pi}{4}} & e^{j\left(\frac{i\pi}{4}-\frac{7\pi}{8}\right)}\\ e^{j0} & \alpha\times e^{j0}\end{pmatrix}\quad\text{Equation 211}$$

or

For i=0, 1, . . . , 7:

Math 222

$$F[i]=\frac{1}{\sqrt{\alpha^2+1}}\begin{pmatrix}e^{j\theta_{11}[i]} & \alpha\times e^{j(\theta_{11}[i]+\lambda)}\\ \alpha\times e^{j\left(\theta_{11}[i]+\frac{i\pi}{4}\right)} & e^{j\left(\theta_{11}[i]+\frac{i\pi}{4}+\lambda-\frac{7\pi}{8}\right)}\end{pmatrix}\quad\text{Equation 212}$$

For i=8, 9, . . . , 15:

Math 223

$$F[i]=\frac{1}{\sqrt{\alpha^2+1}}\begin{pmatrix}\alpha\times e^{j\left(\theta_{11}[i]+\frac{i\pi}{4}\right)} & e^{j\left(\theta_{11}[i]+\frac{i\pi}{4}+\lambda-\frac{7\pi}{8}\right)}\\ e^{j\theta_{11}[i]} & \alpha\times e^{j(\theta_{11}[i]+\lambda)}\end{pmatrix}\quad\text{Equation 213}$$

or

For i=0, 1, . . . , 7:

Math 224

$$F[i]=\frac{1}{\sqrt{\alpha^2+1}}\begin{pmatrix}e^{j0} & \alpha\times e^{j0}\\ \alpha\times e^{j\left(-\frac{i\pi}{4}\right)} & e^{j\left(-\frac{i}{\pi 4}-\frac{7\pi}{8}\right)}\end{pmatrix}\quad\text{Equation 214}$$

For i=8, 9, . . . , 15:

Math 225

$$F[i]=\frac{1}{\sqrt{\alpha^2+1}}\begin{pmatrix}\alpha\times e^{j\left(-\frac{i\pi}{4}\right)} & e^{j\left(-\frac{i\pi}{4}-\frac{7\pi}{8}\right)}\\ e^{j0} & \alpha\times e^{j0}\end{pmatrix}\quad\text{Equation 215}$$

or

For i=0, 1, . . . , 7:

Math 226

$$F[i]=\frac{1}{\sqrt{\alpha^2+1}}\begin{pmatrix}e^{j\theta_{11}[i]} & \alpha\times e^{j(\theta_{11}[i]+\lambda)}\\ \alpha\times e^{j\left(\theta_{11}[i]-\frac{i\pi}{4}\right)} & e^{j\left(\theta_{11}[i]-\frac{i\pi}{4}+\lambda-\frac{7\pi}{8}\right)}\end{pmatrix}\quad\text{Equation 216}$$

For i=8, 9, . . . , 15:

Math 227

$$F[i]=\frac{1}{\sqrt{\alpha^2+1}}\begin{pmatrix}\alpha\times e^{j\left(\theta_{11}[i]-\frac{i\pi}{4}\right)} & e^{j\left(\theta_{11}[i]-\frac{i\pi}{4}+\lambda-\frac{7\pi}{8}\right)}\\ e^{j\theta_{11}[i]} & \alpha\times e^{j(\theta_{11}[i]+\lambda)}\end{pmatrix}\quad\text{Equation 217}$$

Figure 38A:
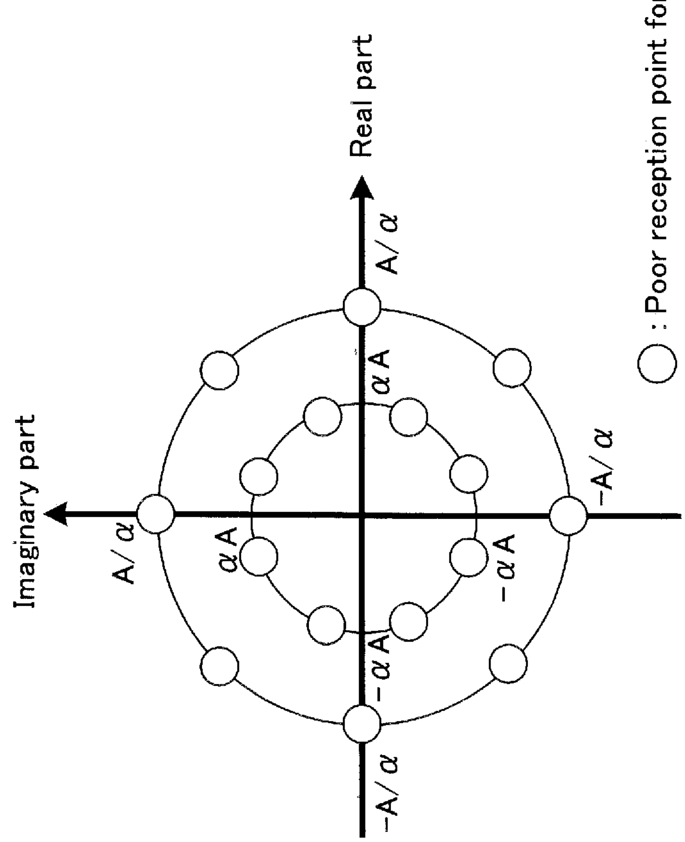
FIGS. 38A and 38B show positions of poor reception points.
Figure 38B:
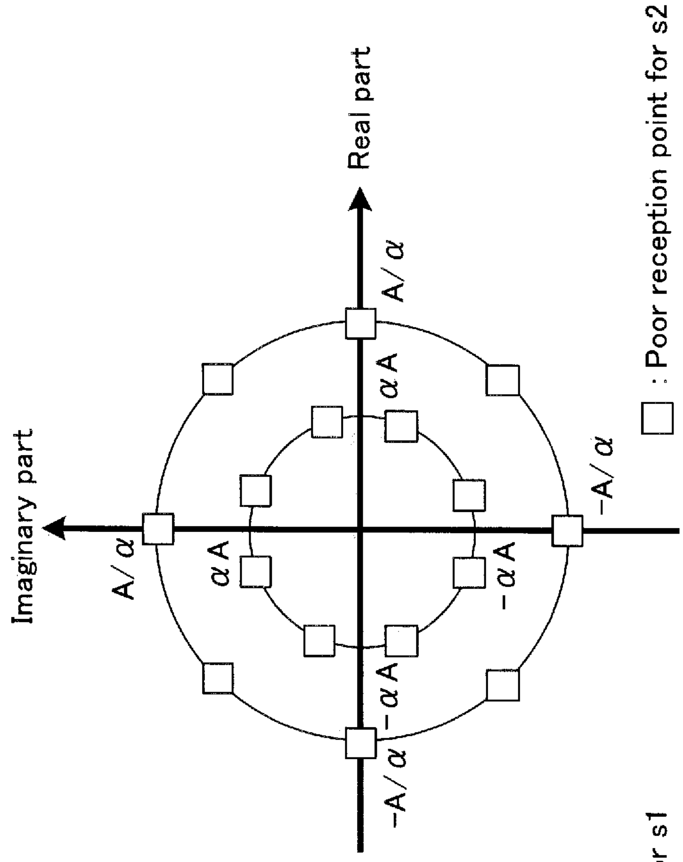
Figure 39A:
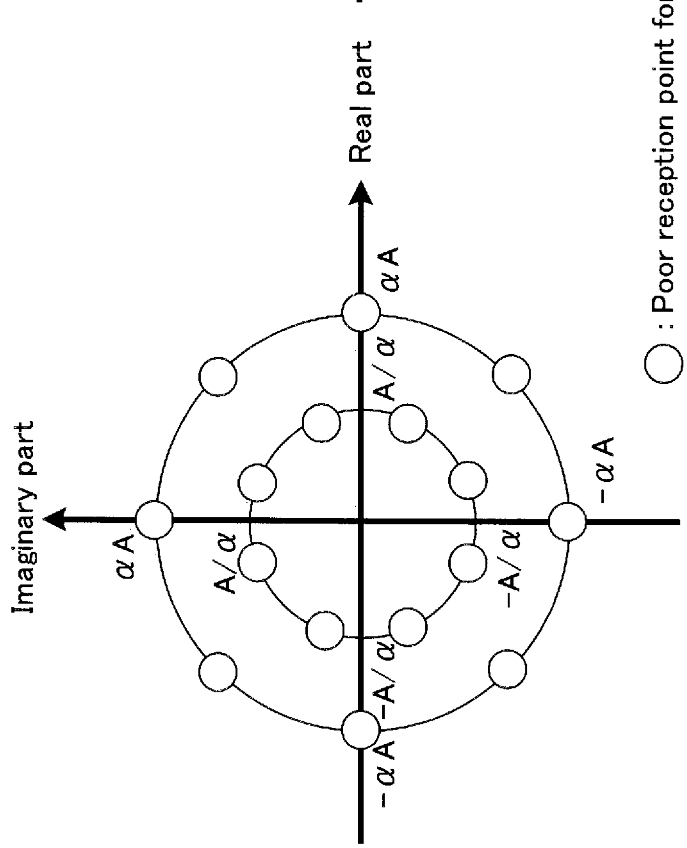
FIGS. 39A and 39B show positions of poor reception points.
Figure 39B:
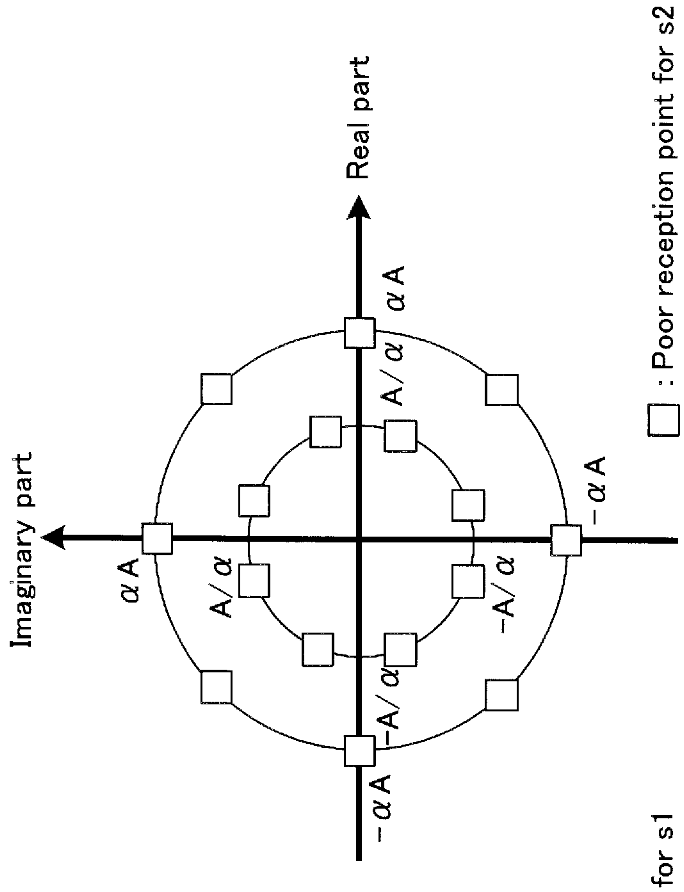

The value of α in Equation 198 and in Equation 200 is appropriate for obtaining excellent data reception quality. The poor reception points for s1 are represented as in FIGS. 38A and 38B when α<1.0 and as in FIGS. 39A and 39B when α>1.0.

In the present embodiment, the scheme of structuring N different precoding matrices for a precoding hopping scheme with an N-slot time period (cycle) has been described. In this case, as the N different precoding matrices, F[0], F[1], F[2], . . . , F[N−2], F[N−1] are prepared. In the present embodiment, an example of a single carrier transmission scheme has been described, and therefore the case of arranging symbols in the order F[0], F[1], F[2], . . . , F[N−2], F[N−1] in the time domain (or the frequency domain) has been described. The present invention is not, however, limited in this way, and the N different precoding matrices F[0], F[1], F[2], . . . , F[N−2], F[N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with an N-slot time period (cycle) has been described, but the same advantageous effects may be obtained by randomly using N different precoding matrices. In other words, the N different precoding matrices do not necessarily need to be used in a regular period (cycle).

Examples #5 through #10 have been shown based on Conditions #10 through #16. However, in order to achieve a precoding matrix hopping scheme with a longer period (cycle), the period (cycle) for hopping between precoding matrices may be lengthened by, for example, selecting a plurality of examples from Examples #5 through #10 and using the precoding matrices indicated in the selected examples. For example, a precoding matrix hopping scheme with a longer period (cycle) may be achieved by using the precoding matrices indicated in Example #7 and the precoding matrices indicated in Example #10. In this case, Conditions #10 through #16 are not necessarily observed. (In Equation 158 of Condition #10, Equation 159 of Condition #11, Equation 164 of Condition #13, Equation 175 of Condition #14, and Equation 176 of Condition #15, it becomes important for providing excellent reception quality for the conditions "all x and all y" to be "existing x and existing y".) When viewed from a different perspective, in the precoding matrix hopping scheme over an N-slot period (cycle) (where N is a large natural number), the probability of providing excellent reception quality increases when the precoding matrices of one of Examples #5 through #10 are included.

Embodiment 7

The present embodiment describes the structure of a reception device for receiving modulated signals transmitted by a transmission scheme that regularly hops between precoding matrices as described in Embodiments 1-6.

In Embodiment 1, the following scheme has been described. A transmission device that transmits modulated signals, using a transmission scheme that regularly hops between precoding matrices, transmits information regarding the precoding matrices. Based on this information, a reception device obtains information on the regular precoding matrix hopping used in the transmitted frames, decodes the precoding, performs detection, obtains the log-likelihood ratio for the transmitted bits, and subsequently performs error correction decoding.

The present embodiment describes the structure of a reception device, and a scheme of hopping between precoding matrices, that differ from the above structure and scheme.

Figure 40:
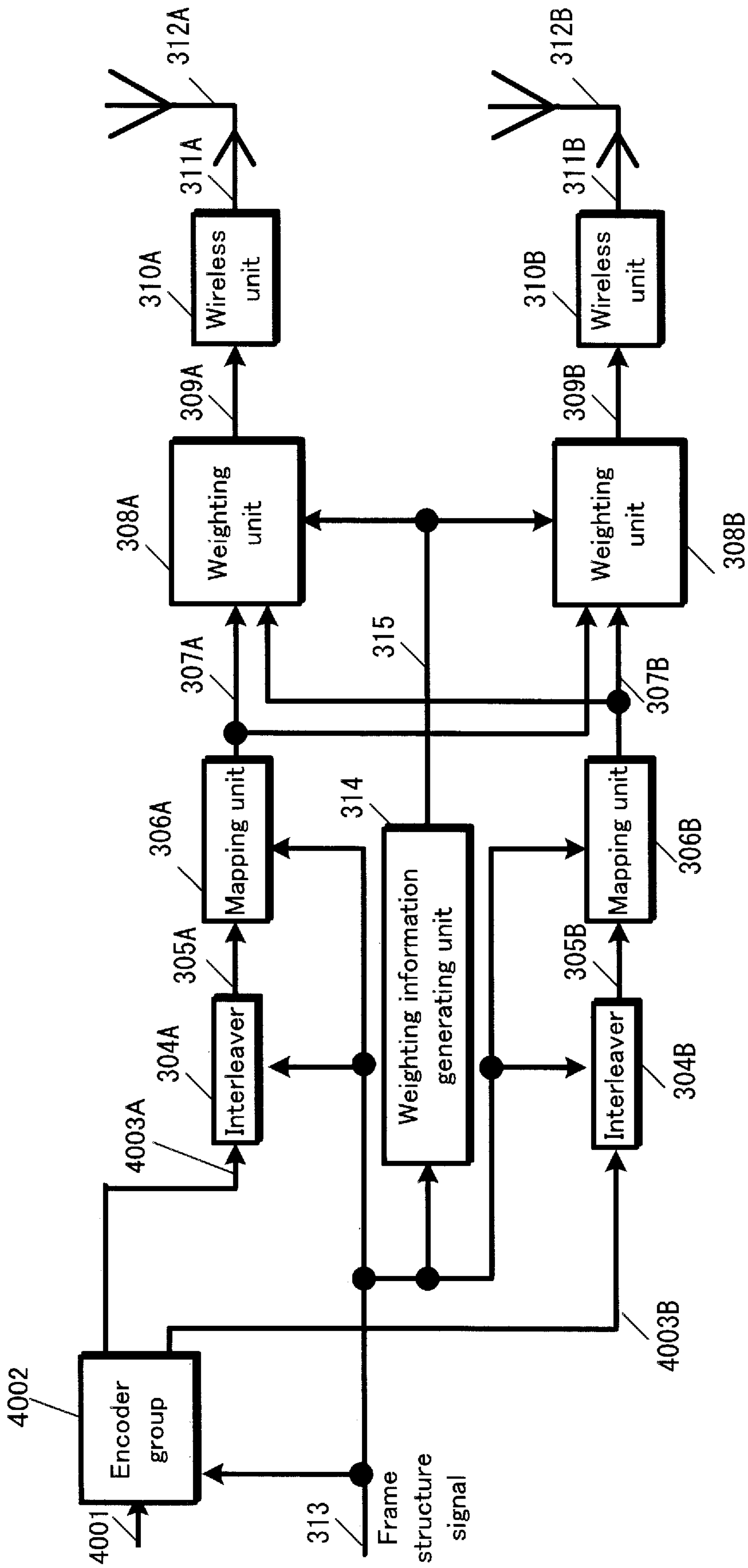
FIG. 40 is an example of the structure of a transmission device in Embodiment 7.

FIG. 40 is an example of the structure of a transmission device in the present embodiment. Elements that operate in a similar way to FIG. 3 bear the same reference signs. An encoder group (4002) receives transmission bits (4001) as input. The encoder group (4002), as described in Embodiment 1, includes a plurality of encoders for error correction coding, and based on the frame structure signal 313, a certain number of encoders operate, such as one encoder, two encoders, or four encoders.

When one encoder operates, the transmission bits (4001) are encoded to yield encoded transmission bits. The encoded transmission bits are allocated into two parts, and the encoder group (4002) outputs allocated bits (4003A) and allocated bits (4003B).

When two encoders operate, the transmission bits (4001) are divided in two (referred to as divided bits A and B). The first encoder receives the divided bits A as input, encodes the divided bits A, and outputs the encoded bits as allocated bits (4003A). The second encoder receives the divided bits B as input, encodes the divided bits B, and outputs the encoded bits as allocated bits (4003B).

When four encoders operate, the transmission bits (4001) are divided in four (referred to as divided bits A, B, C, and D). The first encoder receives the divided bits A as input, encodes the divided bits A, and outputs the encoded bits A. The second encoder receives the divided bits B as input, encodes the divided bits B, and outputs the encoded bits B. The third encoder receives the divided bits C as input, encodes the divided bits C, and outputs the encoded bits C. The fourth encoder receives the divided bits D as input, encodes the divided bits D, and outputs the encoded bits D. The encoded bits A, B, C, and D are divided into allocated bits (4003A) and allocated bits (4003B).

The transmission device supports a transmission scheme such as, for example, the following Table 1 (Table 1A and Table 1B).

TABLE 1A

| Number of modulated transmission signals (number of transmit antennas) | Modulation scheme | Number of encoders | Error correction coding scheme | Transmission information | Precoding matrix hopping scheme |
|---|---|---|---|---|---|
| 1 | QPSK | 1 | A | 00000000 | — |
| | | | B | 00000001 | — |
| | | | C | 00000010 | — |
| | 16QAM | 1 | A | 00000011 | — |
| | | | B | 00000100 | — |
| | | | C | 00000101 | — |
| | 64QAM | 1 | A | 00000110 | — |
| | | | B | 00000111 | — |
| | | | C | 00001000 | — |
| | 256QAM | 1 | A | 00001001 | — |
| | | | B | 00001010 | — |
| | | | C | 00001011 | — |
| | 1024 QAM | 1 | A | 00001100 | — |
| | | | B | 00001101 | — |
| | | | C | 00001110 | — |

TABLE 1B

| Number of modulated transmission signals (number of transmit antennas) | Modulation scheme | Number of encoders | Error correction coding scheme | Transmission information | Precoding matrix hopping scheme |
|---|---|---|---|---|---|
| 2 | #1: QPSK, #2: QPSK | 1 | A | 00001111 | D |
| | | | B | 00010000 | D |
| | | | C | 00010001 | D |
| | | 2 | A | 00010010 | E |

TABLE 1B-continued

| Number of modulated transmission signals (number of transmit antennas) | Modulation scheme | Number of encoders | Error correc-tion coding scheme | Transmission information | Pre-coding matrix hopping scheme |
|---|---|---|---|---|---|
| | | | B | 00010011 | E |
| | | | C | 00010100 | E |
| | #1: QPSK, #2: 16QAM | 1 | A | 00010101 | D |
| | | | B | 00010110 | D |
| | | | C | 00010111 | D |
| | | 2 | A | 00011000 | E |
| | | | B | 00011001 | E |
| | | | C | 00011010 | E |
| | #1: 16QAM, #2: 16QAM | 1 | A | 00011011 | D |
| | | | B | 00011100 | D |
| | | | C | 00011101 | D |
| | | 2 | A | 00011110 | E |
| | | | B | 00011111 | E |
| | | | C | 00100000 | E |
| | #1: 16QAM, #2: 64QAM | 1 | A | 00100001 | D |
| | | | B | 00100010 | D |
| | | | C | 00100011 | D |
| | | 2 | A | 00100100 | E |
| | | | B | 00100101 | E |
| | | | C | 00100110 | E |
| | #1: 64QAM, #2: 64QAM | 1 | A | 00100111 | F |
| | | | B | 00101000 | F |
| | | | C | 00101001 | F |
| | | 2 | A | 00101010 | G |
| | | | B | 00101011 | G |
| | | | C | 00101100 | G |
| | #1: 64QAM, #2: 256QAM | 1 | A | 00101101 | F |
| | | | B | 00101110 | F |
| | | | C | 00101111 | F |
| | | 2 | A | 00110000 | G |
| | | | B | 00110001 | G |
| | | | C | 00110010 | G |
| | #1: 256QAM, #2: 256QAM | 1 | A | 00110011 | F |
| | | | B | 00110100 | F |
| | | | C | 00110101 | F |
| | | 2 | A | 00110110 | G |
| | | | B | 00110111 | G |
| | | | C | 00111000 | G |
| | | 4 | A | 00111001 | H |
| | | | B | 00111010 | H |
| | | | C | 00111011 | H |
| | #1: 256QAM, #2: 1024QAM | 1 | A | 00111100 | F |
| | | | B | 00111101 | F |
| | | | C | 00111110 | F |
| | | 2 | A | 00111111 | G |
| | | | B | 01000000 | G |
| | | | C | 01000001 | G |
| | | 4 | A | 01000010 | H |
| | | | B | 01000011 | H |
| | | | C | 01000100 | H |
| | #1: 1024QAM, #2: 1024QAM | 1 | A | 01000101 | F |
| | | | B | 01000110 | F |
| | | | C | 01000111 | F |
| | | 2 | A | 01001000 | G |
| | | | B | 01001001 | G |
| | | | C | 01001010 | G |
| | | 4 | A | 01001011 | H |
| | | | B | 01001100 | H |
| | | | C | 01001101 | H |

As shown in Table 1, transmission of a one-stream signal and transmission of a two-stream signal are supported as the number of transmission signals (number of transmit antennas). Furthermore, QPSK, 16QAM, 64QAM, 256QAM, and 1024QAM are supported as the modulation scheme. In particular, when the number of transmission signals is two, it is possible to set separate modulation schemes for stream #1 and stream #2. For example, "#1: 256QAM, #2: 1024QAM" in Table 1 indicates that "the modulation scheme of stream #1 is 256QAM, and the modulation scheme of stream #2 is 1024QAM" (other entries in the table are similarly expressed). Three types of error correction coding schemes, A, B, and C, are supported. In this case, A, B, and C may all be different coding schemes. A, B, and C may also be different coding rates, and A, B, and C may be coding schemes with different block sizes.

The pieces of transmission information in Table 1 are allocated to modes that define a "number of transmission signals", "modulation scheme", "number of encoders", and "error correction coding scheme". Accordingly, in the case of "number of transmission signals: 2", "modulation scheme: #1: 1024QAM, #2: 1024QAM", "number of encoders: 4", and "error correction coding scheme: C", for example, the transmission information is set to 01001101. In the frame, the transmission device transmits the transmission information and the transmission data. When transmitting the transmission data, in particular when the "number of transmission signals" is two, a "precoding matrix hopping scheme" is used in accordance with Table 1. In Table 1, five types of the "precoding matrix hopping scheme", D, E, F, G, and H, are prepared. The precoding matrix hopping scheme is set to one of these five types in accordance with Table 1. The following, for example, are ways of implementing the five different types.

Prepare five different precoding matrices.

Use five different types of period (cycle)s, for example a four-slot period (cycle) for D, an eight-slot period (cycle) for E, . . . .

Use both different precoding matrices and different period (cycle)s.

Figure 41:
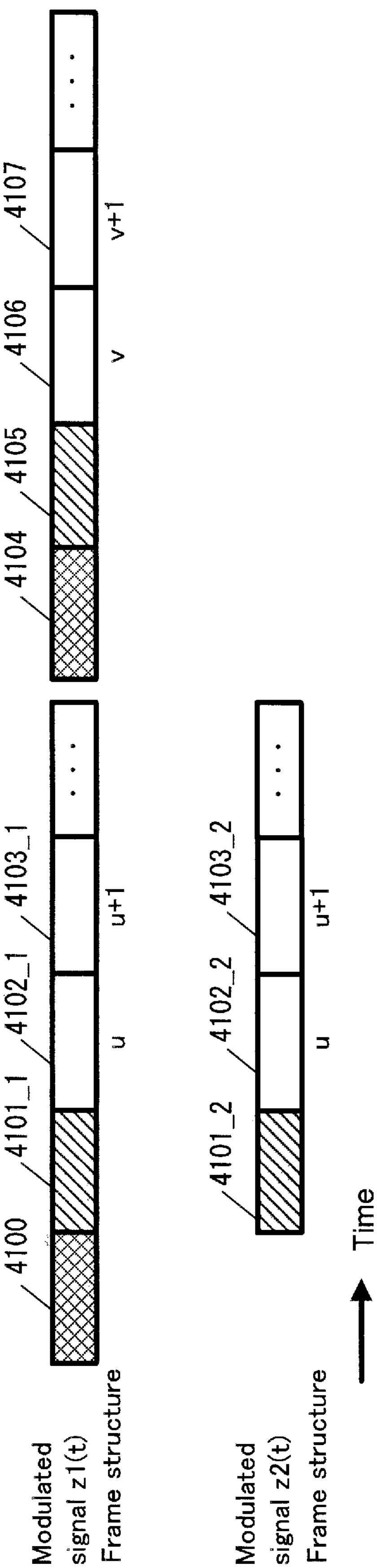
FIG. 41 is an example of the frame structure of a modulated signal transmitted by the transmission device.

FIG. 41 shows an example of a frame structure of a modulated signal transmitted by the transmission device in FIG. 40. The transmission device is assumed to support settings for both a mode to transmit two modulated signals, z1($t$) and z2($t$), and for a mode to transmit one modulated signal.

In FIG. 41, the symbol (4100) is a symbol for transmitting the "transmission information" shown in Table 1. The symbols (4101_1) and (4101_2) are reference (pilot) symbols for channel estimation. The symbols (4102_1, 4103_1) are data transmission symbols for transmitting the modulated signal z1($t$). The symbols (4102_2, 4103_2) are data transmission symbols for transmitting the modulated signal z2($t$). The symbol (4102_1) and the symbol (4102_2) are transmitted at the same time along the same (shared/common) frequency, and the symbol (4103_1) and the symbol (4103_2) are transmitted at the same time along the same (shared/common) frequency. The symbols (4102_1, 4103_1) and the symbols (4102_2, 4103_2) are the symbols after precoding matrix calculation using the scheme of regularly hopping between precoding matrices described in Embodiments 1-4 and Embodiment 6 (therefore, as described in Embodiment 1, the structure of the streams s1($t$) and s2($t$) is as in FIG. 6).

Furthermore, in FIG. 41, the symbol (4104) is a symbol for transmitting the "transmission information" shown in Table 1. The symbol (4105) is a reference (pilot) symbol for channel estimation. The symbols (4106, 4107) are data transmission symbols for transmitting the modulated signal z1($t$). The data transmission symbols for transmitting the modulated signal z1($t$) are not precoded, since the number of transmission signals is one.

Accordingly, the transmission device in FIG. 40 generates and transmits modulated signals in accordance with Table 1 and the frame structure in FIG. 41. In FIG. 40, the frame structure signal 313 includes information regarding the "number of transmission signals", "modulation scheme", "number of encoders", and "error correction coding scheme" set based on Table 1. The encoder (4002), the mapping units 306A, B, and the weighting units 308A, B receive the frame structure signal as an input and operate based on the "number of transmission signals", "modulation scheme", "number of encoders", and "error correction coding scheme" that are set based on Table 1. "Transmission information" corresponding to the set "number of transmission signals", "modulation scheme", "number of encoders", and "error correction coding scheme" is also transmitted to the reception device.

The structure of the reception device may be represented similarly to FIG. 7 of Embodiment 1. The difference with Embodiment 1 is as follows: since the transmission device and the reception device store the information in Table 1 in advance, the transmission device does not need to transmit information for regularly hopping between precoding matrices, but rather transmits "transmission information" corresponding to the "number of transmission signals", "modulation scheme", "number of encoders", and "error correction coding scheme", and the reception device obtains information for regularly hopping between precoding matrices from Table 1 by receiving the "transmission information". Accordingly, by the control information decoding unit 709 obtaining the "transmission information" transmitted by the transmission device in FIG. 40, the reception device in FIG. 7 obtains, from the information corresponding to Table 1, a signal 710 regarding information on the transmission scheme, as notified by the transmission device, which includes information for regularly hopping between precoding matrices. Therefore, when the number of transmission signals is two, the signal processing unit 711 can perform detection based on a precoding matrix hopping pattern to obtain received log-likelihood ratios.

Note that in the above description, "transmission information" is set with respect to the "number of transmission signals", "modulation scheme", "number of encoders", and "error correction coding scheme" as in Table 1, and the precoding matrix hopping scheme is set with respect to the "transmission information". However, it is not necessary to set the "transmission information" with respect to the "number of transmission signals", "modulation scheme", "number of encoders", and "error correction coding scheme". For example, as in Table 2, the "transmission information" may be set with respect to the "number of transmission signals" and "modulation scheme", and the precoding matrix hopping scheme may be set with respect to the "transmission information".

TABLE 2

| Number of modulated transmission signals (number of transmit antennas) | Modulation scheme | Transmission information | Precoding matrix hopping scheme |
|---|---|---|---|
| 1 | QPSK | 00000 | — |
| | 16QAM | 00001 | — |
| | 64QAM | 00010 | — |
| | 256QAM | 00011 | — |
| | 1024QAM | 00100 | — |
| 2 | #1: QPSK, #2: QPSK | 10000 | D |
| | #1: QPSK, #2: 16QAM | 10001 | E |
| | #1: 16QAM, #2: 16QAM | 10010 | E |
| | #1: 16QAM, #2: 64QAM | 10011 | E |
| | #1: 64QAM, #2: 64QAM | 10100 | F |
| | #1: 64QAM, #2: 256QAM | 10101 | F |
| | #1: 256QAM, #2: 256QAM | 10110 | G |
| | #1: 256QAM, #2: 1024QAM | 10111 | G |
| | #1: 1024QAM, #2: 1024QAM | 11000 | H |

In this context, the "transmission information" and the scheme of setting the precoding matrix hopping scheme is not limited to Tables 1 and 2. As long as a rule is determined in advance for hopping the precoding matrix hopping scheme based on transmission parameters, such as the "number of transmission signals", "modulation scheme", "number of encoders", "error correction coding scheme", or the like (as long as the transmission device and the reception device share a predetermined rule, or in other words, if the precoding matrix hopping scheme is hopped based on any of the transmission parameters (or on any plurality of transmission parameters)), the transmission device does not need to transmit information regarding the precoding matrix hopping scheme. The reception device can identify the precoding matrix hopping scheme used by the transmission device by identifying the information on the transmission parameters and can therefore accurately perform decoding and detection. Note that in Tables 1 and 2, a transmission scheme that regularly hops between precoding matrices is used when the number of modulated transmission signals is two, but a transmission scheme that regularly hops between precoding matrices may be used when the number of modulated transmission signals is two or greater.

Accordingly, if the transmission device and reception device share a table regarding transmission patterns that includes information on precoding hopping schemes, the transmission device need not transmit information regarding the precoding hopping scheme, transmitting instead control information that does not include information regarding the precoding hopping scheme, and the reception device can infer the precoding hopping scheme by acquiring this control information.

As described above, in the present embodiment, the transmission device does not transmit information directly related to the scheme of regularly hopping between precoding matrices. Rather, a scheme has been described wherein the reception device infers information regarding precoding for the "scheme of regularly hopping between precoding matrices" used by the transmission device. This scheme yields the advantageous effect of improved transmission efficiency of data as a result of the transmission device not transmitting information directly related to the scheme of regularly hopping between precoding matrices.

Note that the present embodiment has been described as changing precoding weights in the time domain, but as described in Embodiment 1, the present invention may be similarly embodied when using a multi-carrier transmission scheme such as OFDM or the like.

In particular, when the precoding hopping scheme only changes depending on the number of transmission signals, the reception device can learn the precoding hopping scheme by acquiring information, transmitted by the transmission device, on the number of transmission signals.

In the present description, it is considered that a communications/broadcasting device such as a broadcast station, a base station, an access point, a terminal, a mobile phone, or the like is provided with the transmission device, and that a communications device such as a television, radio, terminal, personal computer, mobile phone, access point, base station, or the like is provided with the reception device. Additionally, it is considered that the transmission device and the reception device in the present description have a communications function and are capable of being connected via some sort of interface to a device for executing applications for a television, radio, personal computer, mobile phone, or the like.

Furthermore, in the present embodiment, symbols other than data symbols, such as pilot symbols (preamble, unique word, postamble, reference symbol, and the like), symbols for control information, and the like may be arranged in the frame in any way. While the terms "pilot symbol" and "symbols for control information" have been used here, any term may be used, since the function itself is what is important.

It suffices for a pilot symbol, for example, to be a known symbol modulated with PSK modulation in the transmission and reception devices (or for the reception device to be able to synchronize in order to know the symbol transmitted by the transmission device). The reception device uses this symbol for frequency synchronization, time synchronization, channel estimation (estimation of Channel State Information (CSI) for each modulated signal), detection of signals, and the like.

A symbol for control information is for transmitting information other than data (of applications or the like) that needs to be transmitted to the communication partner for achieving communication (for example, the modulation scheme, error correction coding scheme, coding rate of the error correction coding scheme, setting information in the upper layer, and the like).

Note that the present invention is not limited to the above Embodiments 1-5 and may be embodied with a variety of modifications. For example, the above embodiments describe communications devices, but the present invention is not limited to these devices and may be implemented as software for the corresponding communications scheme.

Furthermore, a precoding hopping scheme used in a scheme of transmitting two modulated signals from two antennas has been described, but the present invention is not limited in this way. The present invention may be also embodied as a precoding hopping scheme for similarly changing precoding weights (matrices) in the context of a scheme whereby four mapped signals are precoded to generate four modulated signals that are transmitted from four antennas, or more generally, whereby N mapped signals are precoded to generate N modulated signals that are transmitted from N antennas.

In the description, terms such as "precoding" and "precoding weight" are used, but any other terms may be used. What matters in the present invention is the actual signal processing.

Different data may be transmitted in streams s1(*t*) and s2(*t*), or the same data may be transmitted.

Each of the transmit antennas of the transmission device and the receive antennas of the reception device shown in the figures may be formed by a plurality of antennas.

Programs for executing the above transmission scheme may, for example, be stored in advance in Read Only Memory (ROM) and be caused to operate by a Central Processing Unit (CPU).

Furthermore, the programs for executing the above transmission scheme may be stored in a computer-readable recording medium, the programs stored in the recording medium may be loaded in the Random Access Memory (RAM) of the computer, and the computer may be caused to operate in accordance with the programs.

The components in the above embodiments may be typically assembled as a Large Scale Integration (LSI), a type of integrated circuit. Individual components may respectively be made into discrete chips, or part or all of the components in each embodiment may be made into one chip. While an LSI has been referred to, the terms Integrated Circuit (IC), system LSI, super LSI, or ultra LSI may be used depending on the degree of integration. Furthermore, the scheme for assembling integrated circuits is not limited to LSI, and a dedicated circuit or a general-purpose processor may be used. A Field Programmable Gate Array (FPGA), which is programmable after the LSI is manufactured, or a reconfigurable processor, which allows reconfiguration of the connections and settings of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

Embodiment 8

The present embodiment describes an application of the scheme described in Embodiments 1-4 and Embodiment 6 for regularly hopping between precoding weights.

FIG. 6 relates to the weighting scheme (precoding scheme) in the present embodiment. The weighting unit 600 integrates the weighting units 308A and 308B in FIG. 3. As shown in FIG. 6, the stream s1(*t*) and the stream s2(*t*) correspond to the baseband signals 307A and 307B in FIG. 3. In other words, the streams s1(*t*) and s2(*t*) are the baseband signal in-phase components I and quadrature components Q when mapped according to a modulation scheme such as QPSK, 16QAM, 64QAM, or the like. As indicated by the frame structure of FIG. 6, the stream s1(*t*) is represented as s1(*u*) at symbol number u, as s1(*u*+1) at symbol number u+1, and so forth. Similarly, the stream s2(*t*) is represented as s2(*u*) at symbol number u, as s2(*u*+1) at symbol number u+1, and so forth. The weighting unit 600 receives the baseband signals 307A (s1(*t*)) and 307B (s2(*t*)) and the information 315 regarding weighting information in FIG. 3 as inputs, performs weighting in accordance with the information 315 regarding weighting, and outputs the signals 309A (z1(*t*)) and 309B (z2(*t*) after weighting in FIG. 3.

At this point, when for example a precoding matrix hopping scheme with an N=8 period (cycle) as in Example #8 in Embodiment 6 is used, z1(*t*) and z2(*t*) are represented as follows.

For symbol number 8i (where i is an integer greater than or equal to zero):

Math 228

$$\begin{pmatrix} z1(8i) \\ z2(8i) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i) \\ s2(8i) \end{pmatrix} \quad \text{Equation 218}$$

Here, j is an imaginary unit, and k=0.

For symbol number 8i+1:

Math 229

$$\begin{pmatrix} z1(8i+1) \\ z2(8i+1) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+1) \\ s2(8i+1) \end{pmatrix} \quad \text{Equation 219}$$

Here, k=1.

For symbol number 8i+2:

Math 230

$$\begin{pmatrix} z1(8i+2) \\ z2(8i+2) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+2) \\ s2(8i+2) \end{pmatrix} \quad \text{Equation 220}$$

Here, k=2.

For symbol number 8i+3:

Math 231

$$\begin{pmatrix} z1(8i+3) \\ z2(8i+3) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+3) \\ s2(8i+3) \end{pmatrix} \quad \text{Equation 221}$$

Here, k=3.

For symbol number 8i+4:

Math 232

$$\begin{pmatrix} z1(8i+4) \\ z2(8i+4) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+4) \\ s2(8i+4) \end{pmatrix} \quad \text{Equation 222}$$

Here, k=4.

For symbol number 8i+5:

Math 233

$$\begin{pmatrix} z1(8i+5) \\ z2(8i+5) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+5) \\ s2(8i+5) \end{pmatrix} \quad \text{Equation 223}$$

Here, k=5.

For symbol number 8i+6:

Math 234

$$\begin{pmatrix} z1(8i+6) \\ z2(8i+6) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+6) \\ s2(8i+6) \end{pmatrix} \quad \text{Equation 224}$$

Here, k=6.

For symbol number 8i+7:

Math 235

$$\begin{pmatrix} z1(8i+7) \\ z2(8i+7) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+7) \\ s2(8i+7) \end{pmatrix} \quad \text{Equation 225}$$

Here, k=7.

The symbol numbers shown here can be considered to indicate time. As described in other embodiments, in Equation 225, for example, z1(8i+7) and z2(8i+7) at time 8i+7 are signals at the same time, and the transmission device transmits z1 (8i+7) and z2(8i+7) over the same (shared/common) frequency. In other words, letting the signals at time T be s1(T), s2(T), z1(T), and z2(T), then z1(T) and z2(T) are sought from some sort of precoding matrices and from s1(T) and s2(T), and the transmission device transmits z1(T) and z2(T) over the same (shared/common) frequency (at the same time). Furthermore, in the case of using a multi-carrier transmission scheme such as OFDM or the like, and letting signals corresponding to s1, s2, z1, and z2 for (sub)carrier L and time T be s1(T, L), s2(T, L), z1(T, L), and z2(T, L), then z1(T, L) and z2(T, L) are sought from some sort of precoding matrices and from s1(T, L) and s2(T, L), and the transmission device transmits z1(T, L) and z2(T, L) over the same (shared/common) frequency (at the same time).

In this case, the appropriate value of α is given by Equation 198 or Equation 200.

The present embodiment describes a precoding hopping scheme that increases period (cycle) size, based on the above-described precoding matrices of Equation 190.

Letting the period (cycle) of the precoding hopping scheme be 8M, 8M different precoding matrices are represented as follows.

Math 236

$$F[8\times k+i] = \frac{1}{\sqrt{\alpha^2+1}} \begin{pmatrix} e^{j0} & \alpha \times e^{j0} \\ \alpha \times e^{j\left(\frac{i\pi}{4}+\frac{k\pi}{4M}\right)} & e^{j\left(\frac{i\pi}{4}+\frac{k\pi}{4M}+\frac{7\pi}{8}\right)} \end{pmatrix} \quad \text{Equation 226}$$

In this case, i=0, 1, 2, 3, 4, 5, 6, 7, and k=0, 1, . . . , M−2, M−1.

Figures 42A, 42B:
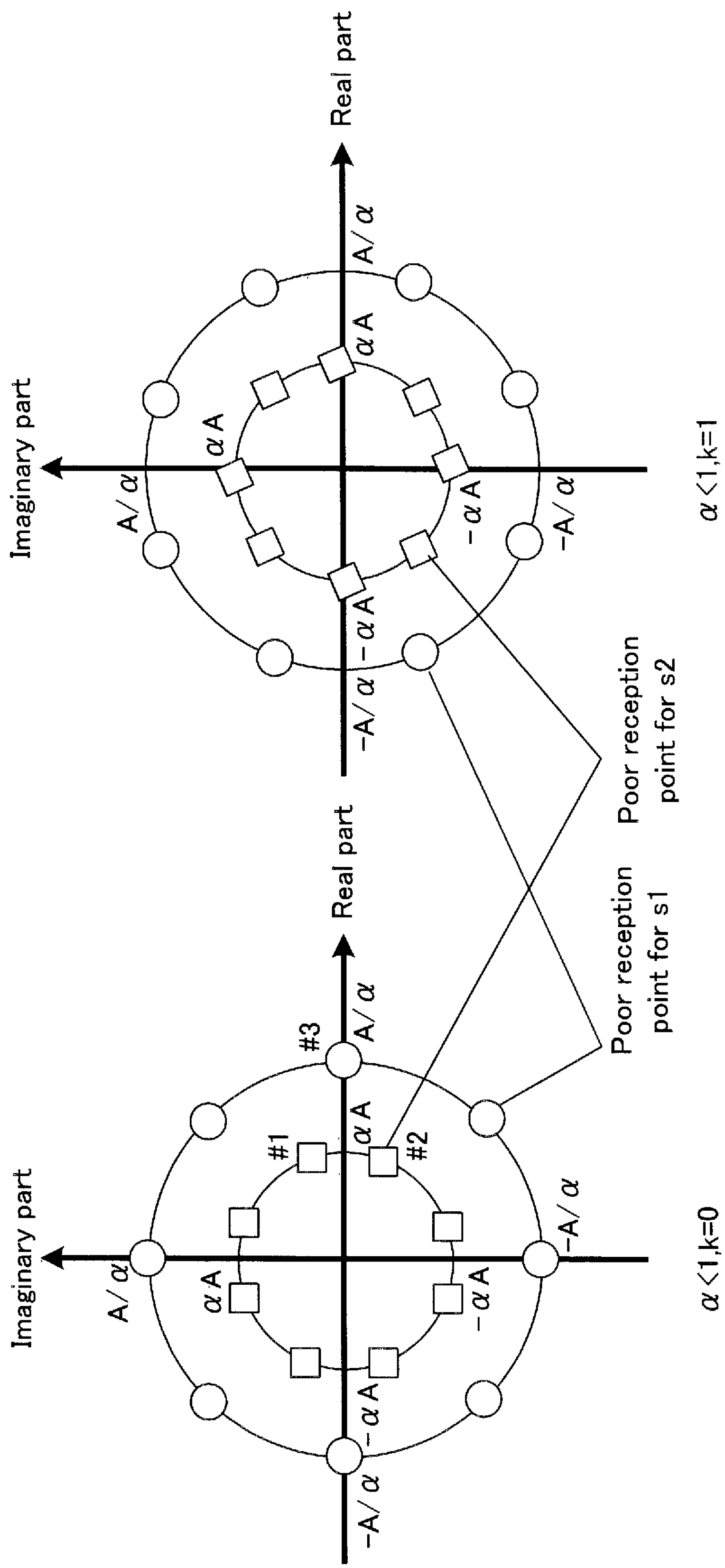
FIGS. 42A and 42B show positions of poor reception points.

For example, letting M=2 and α<1, the poor reception points for s1(○) and for s2 (□) at k=0 are represented as in FIG. 42A. Similarly, the poor reception points for s1(○) and for s2 (□) at k=1 are represented as in FIG. 42B. In this way, based on the precoding matrices in Equation 190, the poor reception points are as in FIG. 42A, and by using, as the precoding matrices, the matrices yielded by multiplying each term in the second line on the right-hand side of Equation 190 by $e^{jX}$ (see Equation 226), the poor reception points are rotated with respect to FIG. 42A (see FIG. 42B).

(Note that the poor reception points in FIG. 42A and FIG. 42B do not overlap. Even when multiplying by $e^{jX}$, the poor reception points should not overlap, as in this case. Furthermore, the matrices yielded by multiplying each term in the first line on the right-hand side of Equation 190, rather than in the second line on the right-hand side of Equation 190, by $e^{jX}$ may be used as the precoding matrices.) In this case, the precoding matrices F[0]-F[15] are represented as follows.

Math 237

$$F[8\times k+i]=\frac{1}{\sqrt{\alpha^2+1}}\begin{pmatrix} e^{j0} & \alpha\times e^{j0} \\ \alpha\times e^{j\left(\frac{i\pi}{4}+X_k\right)} & e^{j\left(\frac{i\pi}{4}+X_k+\frac{7\pi}{8}\right)} \end{pmatrix} \quad \text{Equation 227}$$

Here, i=0, 1, 2, 3, 4, 5, 6, 7, and k=0, 1.

In this case, when M=2, precoding matrices F[0]-F[15] are generated (the precoding matrices F[0]-F[15] may be in any order, and the matrices F[0]-F[15] may each be different). Symbol number 16i may be precoded using F[0], symbol number 16i+1 may be precoded using F[1], . . . , and symbol number 16i+h may be precoded using F[h], for example (h=0, 1, 2, . . . , 14, 15). (In this case, as described in previous embodiments, precoding matrices need not be hopped between regularly.)

Summarizing the above considerations, with reference to Equations 82-85, N-period (cycle) precoding matrices are represented by the following equation.

Math 238

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\delta)} \end{pmatrix} \quad \text{Equation 228}$$

Here, since the period (cycle) has N slots, i=0, 1, 2, . . . , N−2, N−1. Furthermore, the N×M period (cycle) precoding matrices based on Equation 228 are represented by the following equation.

Math 239

$$F[N\times k+i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j(\theta_{21}(i)+X_k)} & e^{j(\theta_{21}(i)+X_k+\lambda+\delta)} \end{pmatrix} \quad \text{Equation 229}$$

In this case, i=0, 1, 2, . . . , N−2, N−1, and k=0, 1, . . . , M−2, M−1.

Precoding matrices F[0]-F[N×M−1] are thus generated (the precoding matrices F[0]-F[N×M−1] may be in any order for the N×M slots in the period (cycle)). Symbol number N×M×i may be precoded using F[0], symbol number N×M×i+1 may be precoded using F[1], . . . , and symbol number N×M×i+h may be precoded using F[h], for example (h=0, 1, 2, . . . , N×M−2, N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality. Note that while the N×M period (cycle) precoding matrices have been set to Equation 229, the N×M period (cycle) precoding matrices may be set to the following equation, as described above.

Math 240

$$F[N\times k+i]=\frac{1}{\sqrt{\alpha^2+1}}\begin{pmatrix} e^{j(\theta_{11}(i)+X_k)} & \alpha\times e^{j(\theta_{11}(i)+X_k+\lambda)} \\ \alpha\times e^{j\theta_{21}(i)} & e^{j(\theta_{21}(i)+\lambda+\delta)} \end{pmatrix} \quad \text{Equation 230}$$

In this case, i=0, 1, 2, . . . , N−2, N−1, and k=0, 1, . . . , M−2, M−1.

In Equations 229 and 230, when 0 radians ≤δ<2π (radians, the matrices are a unitary matrix when δ=π radians and are a non-unitary matrix when δ≠π radians. In the present scheme, use of a non-unitary matrix for π/2 radians ≤|δ|≤π radians is one characteristic structure (the conditions for δ being similar to other embodiments), and excellent data reception quality is obtained. Use of a unitary matrix is another structure, and as described in detail in Embodiment 10 and Embodiment 16, if N is an odd number in Equations 229 and 230, the probability of obtaining excellent data reception quality increases.

Embodiment 9

The present embodiment describes a scheme for regularly hopping between precoding matrices using a unitary matrix.

As described in Embodiment 8, in the scheme of regularly hopping between precoding matrices over a period (cycle) with N slots, the precoding matrices prepared for the N slots with reference to Equations 82-85 are represented as follows.

Math 241

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\delta)} \end{pmatrix} \quad \text{Equation 231}$$

In this case, i=0, 1, 2, . . . , N−2, N−1. (Let α>0) Since a unitary matrix is used in the present embodiment, the precoding matrices in Equation 231 may be represented as follows.

Math 242

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix} \quad \text{Equation 232}$$

In this case, i=0, 1, 2, . . . , N−2, N−1. (Let α>0) From Condition #5 (Math 106) and Condition #6 (Math 107) in Embodiment 3, the following condition is important for achieving excellent data reception quality.

Math 243

$$e^{j(\theta_{11}(x)-\theta_{21}(x))}\neq e^{j(\theta_{11}(y)-\theta_{21}(y))} \quad \text{Condition \#17}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 244

$$e^{j(\theta_{11}(x)-\theta_{21}(x)-\pi)}\neq e^{j(\theta_{11}(y)-\theta_{21}(y)-\pi)} \quad \text{Condition \#18}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Embodiment 6 describes the distance between poor reception points. In order to increase the distance between poor reception points, it is important for the number of slots N to be an odd number three or greater. The following explains this point.

In order to distribute the poor reception points evenly with regards to phase in the complex plane, as described in Embodiment 6, Condition #19 and Condition #20 are provided.

Math 245

$$\frac{e^{j(\theta_{11}(x+1)-\theta_{21}(x+1))}}{e^{j(\theta_{11}(x)-\theta_{21}(x))}} = e^{j\left(\frac{2\pi}{4}\right)} \text{ for } \forall\, x(x=0,1,2,\cdots,N-2) \quad \text{Condition \#19}$$

Math 246

$$\frac{e^{j(\theta_{11}(x+1)-\theta_{21}(x+1))}}{e^{j(\theta_{11}(x)-\theta_{21}(x))}} = e^{j\left(-\frac{2\pi}{4}\right)} \text{ for } \forall\, x(x=0,1,2,\cdots,N-2) \quad \text{Condition \#20}$$

In other words, Condition #19 means that the difference in phase is 2π/N radians. On the other hand, Condition #20 means that the difference in phase is −2π/N radians.

Figure 43A:
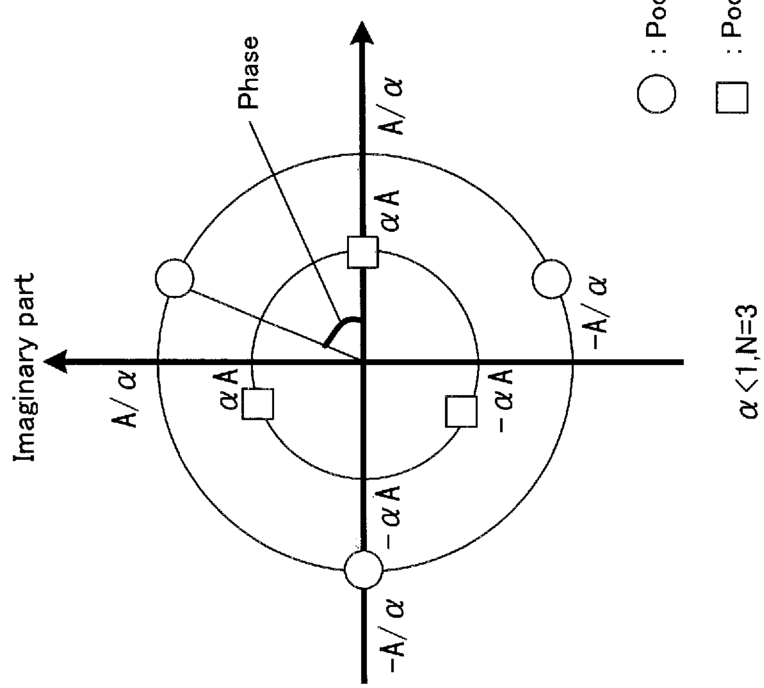
FIGS. 43A and 43B show positions of poor reception points.
Figure 43B:
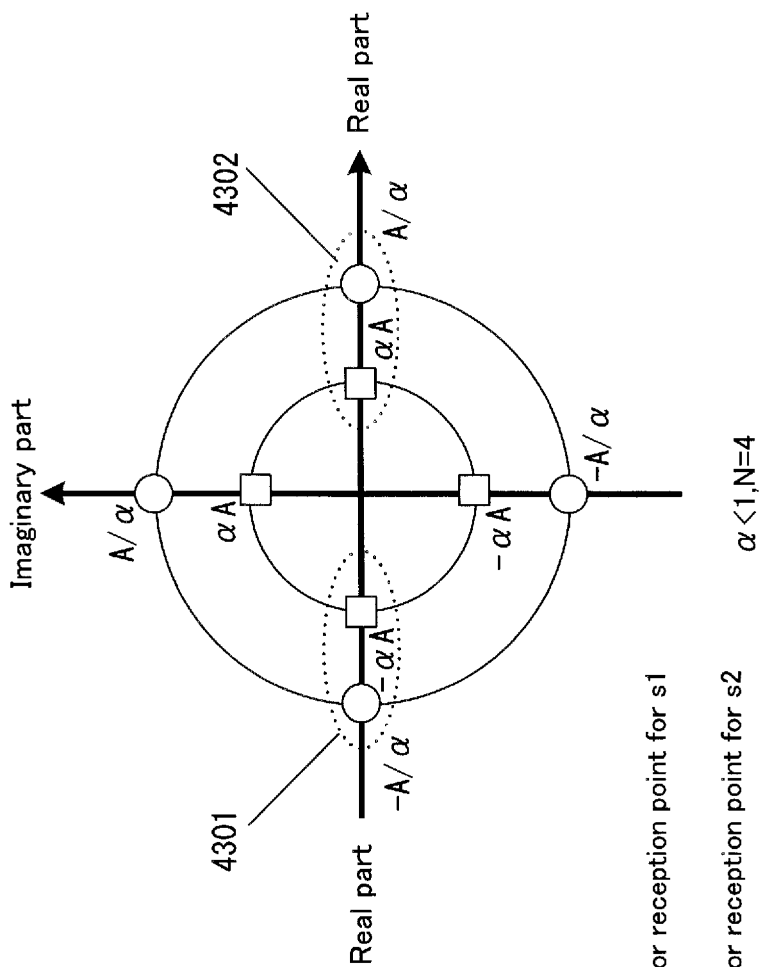
Figure 44B:
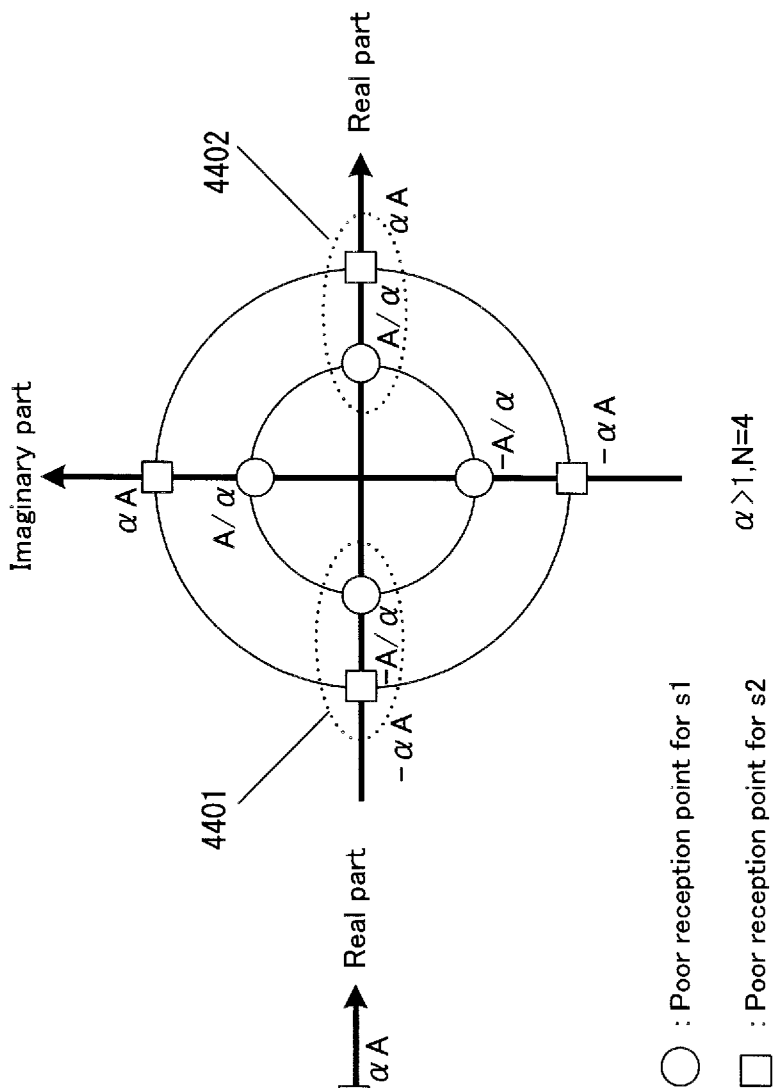
FIGS. 44A and 44B show positions of poor reception points.
Figure 44A:
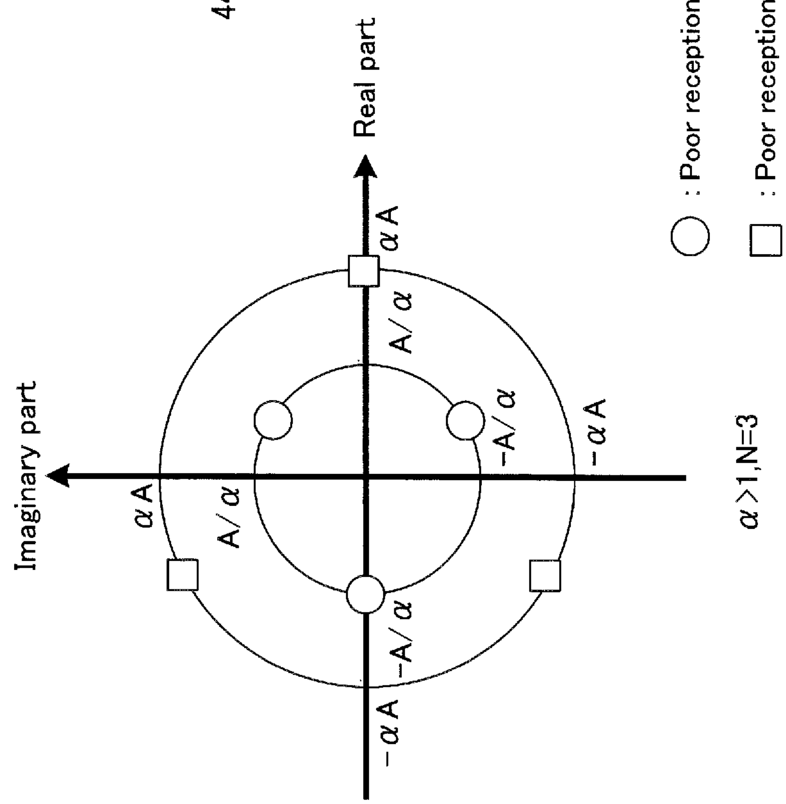

Letting $\theta_{11}(0)-\theta_{21}(0)=0$ radians, and letting α<1, the distribution of poor reception points for s1 and for s2 in the complex plane for an N=3 period (cycle) is shown in FIG. 43A, and the distribution of poor reception points for s1 and for s2 in the complex plane for an N=4 period (cycle) is shown in FIG. 43B. Letting $\theta_{11}(0)-\theta_{21}(0)=0$ radians, and letting α>1, the distribution of poor reception points for s1 and for s2 in the complex plane for an N=3 period (cycle) is shown in FIG. 44A, and the distribution of poor reception points for s1 and for s2 in the complex plane for an N=4 period (cycle) is shown in FIG. 44B.

In this case, when considering the phase between a line segment from the origin to a poor reception point and a half line along the real axis defined by real ≥0 (see FIG. 43A), then for either α>1 for α<1, when N=4, the case always occurs wherein the phase for the poor reception points for s1 and the phase for the poor reception points for s2 are the same value. (See 4301, 4302 in FIG. 43B, and 4401, 4402 in FIG. 44B.) In this case, in the complex plane, the distance between poor reception points becomes small. On the other hand, when N=3, the phase for the poor reception points for s1 and the phase for the poor reception points for s2 are never the same value.

Based on the above, considering how the case always occurs wherein the phase for the poor reception points for s1 and the phase for the poor reception points for s2 are the same value when the number of slots N in the period (cycle) is an even number, setting the number of slots N in the period (cycle) to an odd number increases the probability of a greater distance between poor reception points in the complex plane as compared to when the number of slots N in the period (cycle) is an even number. However, when the number of slots N in the period (cycle) is small, for example when N≤16, the minimum distance between poor reception points in the complex plane can be guaranteed to be a certain length, since the number of poor reception points is small. Accordingly, when N≤16, even if N is an even number, cases do exist where data reception quality can be guaranteed.

Therefore, in the scheme for regularly hopping between precoding matrices based on Equation 232, when the number of slots N in the period (cycle) is set to an odd number, the probability of improving data reception quality is high. Precoding matrices F[0]-F[N−1] are generated based on Equation 232 (the precoding matrices F[0]-F[N−1] may be in any order for the N slots in the period (cycle)). Symbol number Ni may be precoded using F[0], symbol number Ni+1 may be precoded using F[1], . . . , and symbol number N×i+h may be precoded using F[h], for example (h=0, 1, 2, . . . , N−2, N−1). (In this case, as described in previous embodiments, precoding matrices need not be hopped between regularly.) Furthermore, when the modulation scheme for both s1 and s2 is 16QAM, if α is set as follows, Math 247

$$\alpha = \frac{\sqrt{2}+4}{\sqrt{2}+2} \quad \text{Equation 233}$$

the advantageous effect of increasing the minimum distance between 16×16=256 signal points in the I-Q plane for a specific LOS environment may be achieved.

In the present embodiment, the scheme of structuring N different precoding matrices for a precoding hopping scheme with an N-slot time period (cycle) has been described. In this case, as the N different precoding matrices, F[0], F[1], F[2], . . . , F[N−2], F[N−1] are prepared. In the present embodiment, an example of a single carrier transmission scheme has been described, and therefore the case of arranging symbols in the order F[0], F[1], F[2], . . . , F[N−2], F[N−1] in the time domain (or the frequency domain) has been described. The present invention is not, however, limited in this way, and the N different precoding matrices F[0], F[1], F[2], . . . , F[N−2], F[N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with an N-slot time period (cycle) has been described, but the same advantageous effects may be obtained by randomly using N different precoding matrices. In other words, the N different precoding matrices do not necessarily need to be used in a regular period (cycle).

Furthermore, in the precoding matrix hopping scheme over an H-slot period (cycle) (H being a natural number larger than the number of slots N in the period (cycle) of the above scheme of regularly hopping between precoding matrices), when the N different precoding matrices of the present embodiment are included, the probability of excellent reception quality increases. In this case, Condition #17 and Condition #18 can be replaced by the following conditions. (The number of slots in the period (cycle) is considered to be N.)

Math 248

$$e^{j(\theta_{11}(x)-\theta_{21}(x))} \neq e^{j(\theta_{11}(y)-\theta_{21}(y))} \quad \text{Condition \#17'}$$

for ∃x, ∃y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 249

$$e^{j(\theta_{11}(x)-\theta_{21}(x)-\pi)} \neq e^{j(\theta_{11}(y)-\theta_{21}(y)-\pi)} \quad \text{Condition \#18'}$$

for ∃x, ∃y (x≠y; x,y=0, 1, 2, . . . , N−2, N−1)

(x is 0, 1, 2, . . . , N−2, N−1; y is 0, 1, 2, . . . , N−2, N−1; and x≠y.)

Embodiment 10

The present embodiment describes a scheme for regularly hopping between precoding matrices using a unitary matrix that differs from the example in Embodiment 9.

In the scheme of regularly hopping between precoding matrices over a period (cycle) with 2N slots, the precoding matrices prepared for the 2N slots are represented as follows.

Math 250 for $i = 0, 1, 2, \ldots, N-2, N-1$:

$$F[i] = \frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix} \quad \text{Equation 234}$$

Let α be a fixed value (not depending on i), where α>0.

Math 251 for $i = N, N+1, N+2, \ldots, 2N-2, 2N-1$:

$$F[i] = \frac{1}{\sqrt{\alpha^2+1}}\begin{pmatrix} \alpha\times e^{j\theta_{11}(i)} & e^{j(\theta_{11}(i)+\lambda)} \\ e^{j\theta_{21}(i)} & \alpha\times e^{j(\theta_{21}(i)+\lambda+\pi)} \end{pmatrix} \quad \text{Equation 235}$$

Let α be a fixed value (not depending on i), where α>0. (Let the α in Equation 234 and the a in Equation 235 be the same value.)

From Condition #5 (Math 106) and Condition #6 (Math 107) in Embodiment 3, the following conditions are important in Equation 234 for achieving excellent data reception quality.

Math 252

$$e^{j(\theta_{11}[x]-\theta_{21}[x])} \neq e^{j(\theta_{11}[y]-\theta_{21}[y])} \quad \text{Condition \#21}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 253

$$e^{j(\theta_{11}(x)-\theta_{21}(x)-\pi)} \neq e^{j(\theta_{11}(y)-\theta_{21}(y)-\pi)} \quad \text{Condition \#22}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Addition of the following condition is considered.

Math 254

$$\theta_{11}(x)=\theta_{11}(x+N)$$

for ∀x (x=0, 1, 2, . . . , N−2, N−1)

and $$\theta_{21}(y)=\theta_{21}(y+N) \quad \text{Condition \#23}$$

for ∀y (y=0, 1, 2, . . . , N−2, N−1)

Next, in order to distribute the poor reception points evenly with regards to phase in the complex plane, as described in Embodiment 6, Condition #24 and Condition #25 are provided.

Math 255

$$\frac{e^{j(\theta_{11}(x+1)-\theta_{21}(x+1))}}{e^{j(\theta_{11}(x)-\theta_{21}(x))}} = e^{j\left(\frac{2\pi}{4}\right)} \text{ for } \forall\, x(x = 0, 1, 2, \cdots, N-2) \quad \text{Condition \#24}$$

Math 256

$$\frac{e^{j(\theta_{11}(x+1)-\theta_{21}(x+1))}}{e^{j(\theta_{11}(x)-\theta_{21}(x))}} = e^{j\left(-\frac{2\pi}{4}\right)} \text{ for } \forall\, x(x = 0, 1, 2, \cdots, N-2) \quad \text{Condition \#25}$$

In other words, Condition #24 means that the difference in phase is 2π/N radians. On the other hand, Condition #25 means that the difference in phase is −2π/N radians.

Figure 45A:
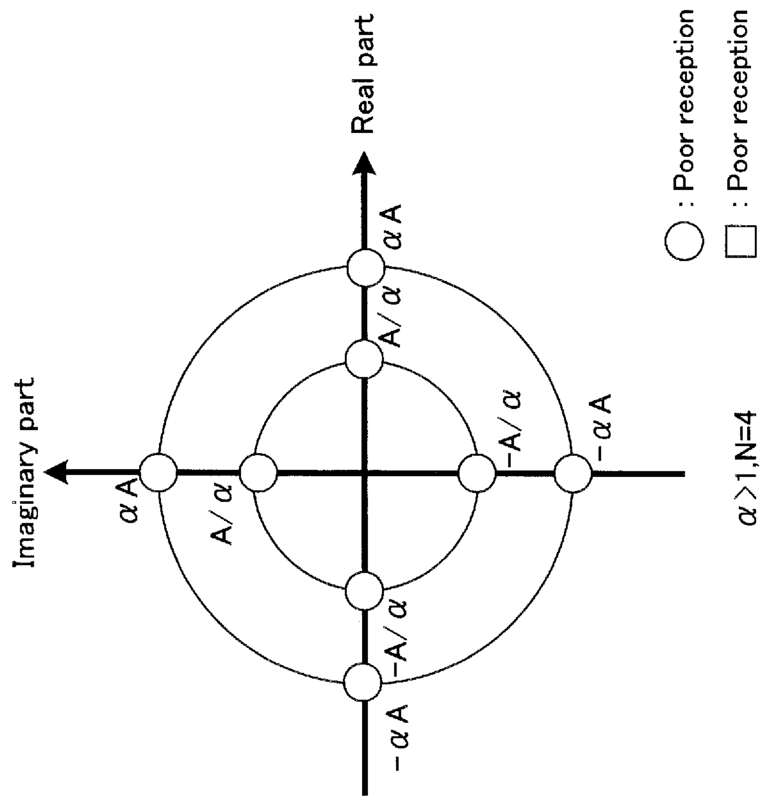
FIGS. 45A and 45B show positions of poor reception points.
Figure 45B:
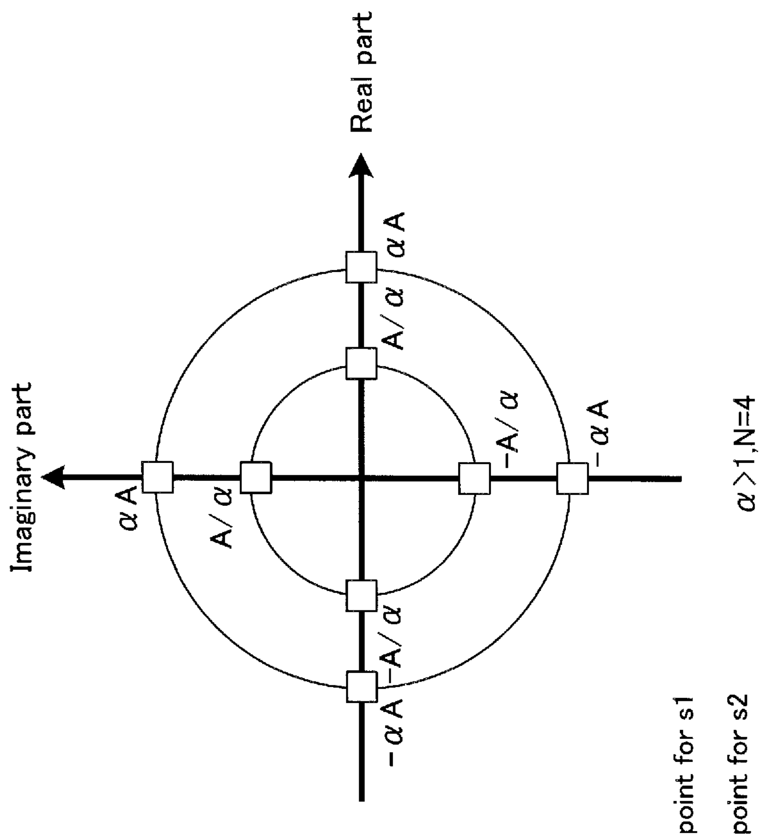

Letting $\theta_{11}(0)$-$\theta_{21}(0)$=0 radians, and letting α>1, the distribution of poor reception points for s1 and for s2 in the complex plane when N=4 is shown in FIGS. 45A and 45B. As is clear from FIGS. 45A and 45B, in the complex plane, the minimum distance between poor reception points for s1 is kept large, and similarly, the minimum distance between poor reception points for s2 is also kept large. Similar conditions are created when α<1. Furthermore, making the same considerations as in Embodiment 9, the probability of a greater distance between poor reception points in the complex plane increases when N is an odd number as compared to when N is an even number. However, when N is small, for example when N≤16, the minimum distance between poor reception points in the complex plane can be guaranteed to be a certain length, since the number of poor reception points is small. Accordingly, when N≤16, even if N is an even number, cases do exist where data reception quality can be guaranteed.

Therefore, in the scheme for regularly hopping between precoding matrices based on Equations 234 and 235, when N is set to an odd number, the probability of improving data reception quality is high. Precoding matrices F[0]-F[2N−1] are generated based on Equations 234 and 235 (the precoding matrices F[0]-F[2N−1] may be arranged in any order for the 2N slots in the period (cycle)). Symbol number 2Ni may be precoded using F[0], symbol number 2Ni+1 may be precoded using F[1], . . . , and symbol number 2N×i+h may be precoded using F[h], for example (h=0, 1, 2, . . . , 2N−2, 2N−1). (In this case, as described in previous embodiments, precoding matrices need not be hopped between regularly.) Furthermore, when the modulation scheme for both s1 and s2 is 16QAM, if α is set as in Equation 233, the advantageous effect of increasing the minimum distance between 16×16=256 signal points in the I-Q plane for a specific LOS environment may be achieved.

The following conditions are possible as conditions differing from Condition #23:

Math 257

$$e^{j(\theta_{11}(x)-\theta_{21}(x))} \neq e^{j(\theta_{11}(y)-\theta_{21}(y))} \quad \text{Condition \#26}$$

for ∀x, ∀y (x≠y; x,y=N, N+1, N+2, . . . , 2N−2, 2N−1)

(where x is N, N+1, N+2, . . . , 2N−2, 2N−1; y is N, N+1, N+2, . . . , 2N−2, 2N−1; and x≠y.)

Math 258

$$e^{j(\theta_{11}(x)-\theta_{21}(x)-\pi)} \neq e^{j(\theta_{11}(y)-\theta_{21}(y)-\pi)} \quad \text{Condition \#27}$$

for ∀x, ∀y (x≠y; x,y=N, N+1, N+2, . . . , 2N−2, 2N−1)

(where x is N, N+1, N+2, . . . , 2N−2, 2N−1; y is N, N+1, N+2, . . . , 2N−2, 2N−1; and x≠y.)

In this case, by satisfying Condition #21, Condition #22, Condition #26, and Condition #27, the distance in the complex plane between poor reception points for s1 is increased, as is the distance between poor reception points for s2, thereby achieving excellent data reception quality.

In the present embodiment, the scheme of structuring 2N different precoding matrices for a precoding hopping scheme with a 2N-slot time period (cycle) has been described. In this case, as the 2N different precoding matrices, F[0], F[1], F[2], . . . , F[2N−2], F[2N−1] are prepared. In the present embodiment, an example of a single carrier transmission scheme has been described, and therefore the case of arranging symbols in the order F[0], F[1], F[2], . . . , F[2N−2], F[2N−1] in the time domain (or the frequency domain) has been described. The present invention is not, however, limited in this way, and the 2N different precoding matrices F[0], F[1], F[2], . . . , F[2N−2], F[2N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping scheme over an H-slot period (cycle) (H being a natural number larger than the number of slots 2N in the period (cycle) of the above scheme of regularly hopping between precoding matrices), when the 2N different precoding matrices of the present embodiment are included, the probability of excellent reception quality increases.

Embodiment 11

The present embodiment describes a scheme for regularly hopping between precoding matrices using a non-unitary matrix.

In the scheme of regularly hopping between precoding matrices over a period (cycle) with 2N slots, the precoding matrices prepared for the 2N slots are represented as follows.

Math 259 for $i = 0, 1, 2, \ldots, N-2, N-1$:

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \quad \text{Equation 236}$$

Let α be a fixed value (not depending on i), where α>0. Furthermore, let δ≠π radians.

Math 260 for $i = N, N+1, N+2, \ldots, 2N-2, 2N-1$:

$$F[i] = \frac{1}{\sqrt{\alpha^2+1}}\begin{pmatrix} \alpha \times e^{j(\theta_{11}(i)+\lambda)} & e^{j\theta_{11}(i)} \\ e^{j(\theta_{21}(i)+\lambda+\delta)} & \alpha \times e^{j\theta_{21}(i)} \end{pmatrix} \quad \text{Equation 237}$$

Let α be a fixed value (not depending on i), where α>0. (Let the α in Equation 236 and the α in Equation 237 be the same value.)

From Condition #5 (Math 106) and Condition #6 (Math 107) in Embodiment 3, the following conditions are important in Equation 236 for achieving excellent data reception quality.

Math 261

$$e^{j(\theta_{11}[x]-\theta_{21}(x))} \neq e^{j(\theta_{11}(y)-\theta_{21}(y))} \quad \text{Condition \#28}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y).

Math 262

$$e^{j(\theta_{11}(x)-\theta_{21}(x)-\delta)} \neq e^{j(\theta_{11}(y)-\theta_{21}(y)-\delta)} \quad \text{Condition \#29}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Addition of the following condition is considered.

Math 263

$$\theta_{11}(x)=\theta_{11}(x+N)$$

for ∀x (x=0, 1, 2, . . . , N−2, N−1)

and $$\theta_{21}(y)=\theta_{21}(y+N) \quad \text{Condition \#30}$$

for ∀y (y=0, 1, 2, . . . , N−2, N−1)

Note that instead of Equation 237, the precoding matrices in the following Equation may be provided.

Math 264 for $i = N, N+1, N+2, \ldots, 2N-2, 2N-1$:

$$F[i] = \frac{1}{\sqrt{\alpha^2+1}}\begin{pmatrix} \alpha \times e^{j\theta_{11}(i)} & e^{j(\theta_{11}(i)+\lambda)} \\ e^{j\theta_{21}(i)} & \alpha \times e^{j(\theta_{21}(i)+\lambda-\delta)} \end{pmatrix} \quad \text{Equation 238}$$

Let α be a fixed value (not depending on i), where α>0. (Let the α in Equation 236 and the α in Equation 238 be the same value.)

As an example, in order to distribute the poor reception points evenly with regards to phase in the complex plane, as described in Embodiment 6, Condition #31 and Condition #32 are provided.

Math 265

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)} \text{ for } \forall x (x = 0, 1, 2, \cdots, N-2) \quad \text{Condition \#31}$$

Math 266

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)} \text{ for } \forall x (x = 0, 1, 2, \cdots, N-2) \quad \text{Condition \#32}$$

In other words, Condition #31 means that the difference in phase is 2π/N radians. On the other hand, Condition #32 means that the difference in phase is −2π/N radians.

Figure 46A:
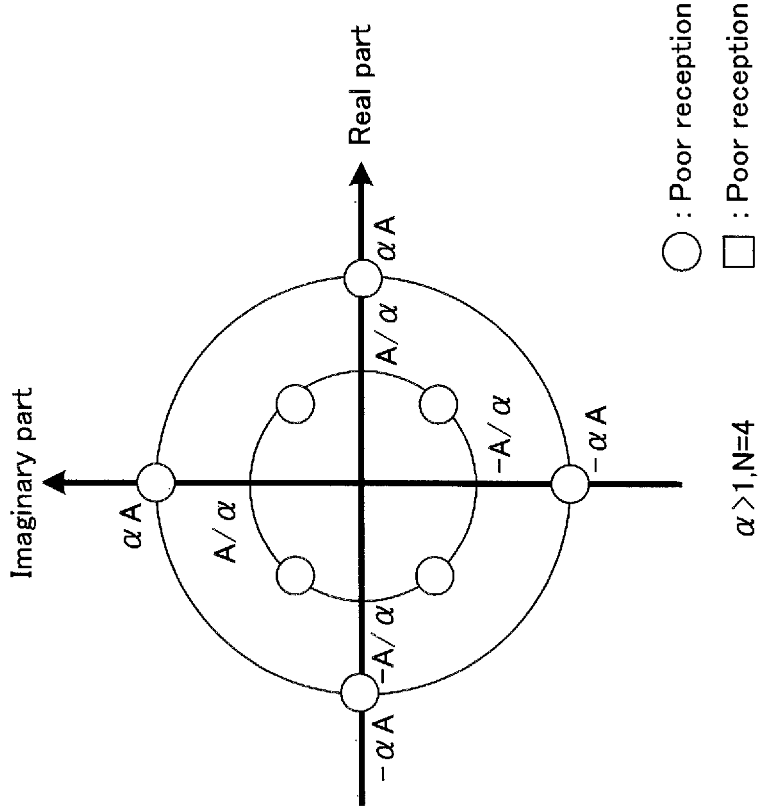
FIGS. 46A and 46B show positions of poor reception points.
Figure 46B:
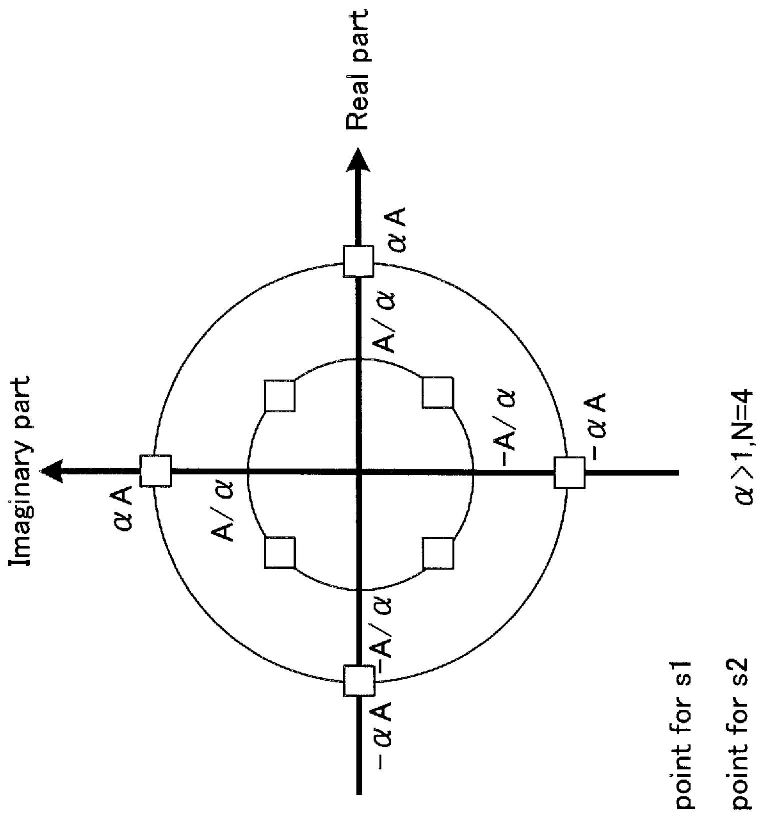

Letting $\theta_{11}(0)-\theta_{21}(0)=0$ radians, letting α>1, and letting δ=(3π)/4 radians, the distribution of poor reception points for s1 and for s2 in the complex plane when N=4 is shown in FIGS. 46A and 46B. With these settings, the period (cycle) for hopping between precoding matrices is increased, and the minimum distance between poor reception points for s1, as well as the minimum distance between poor reception points for s2, in the complex plane is kept large, thereby achieving excellent reception quality. An example in which $\alpha>1$, $\delta=(3\pi)/4$ radians, and N=4 has been described, but the present invention is not limited in this way. Similar advantageous effects may be obtained for $\pi/2$ radians $\leq|\delta|<\pi$ radians, $\alpha>0$, and $\alpha\neq 1$.

The following conditions are possible as conditions differing from Condition #30:

Math 267

$$e^{j(\theta_{11}(x)-\theta_{21}(x))}\neq e^{j(\theta_{11}(y)-\theta_{21}(y))} \quad \text{Condition \#33}$$

for ∀x, ∀y (x≠y; x,y=N, N+1, N+2, . . . , 2N−2, 2N−1)
(where x is N, N+1, N+2, . . . , 2N−2, 2N−1; y is N, N+1, N+2, . . . , 2N−2, 2N−1; and x≠y.)

Math 268

$$e^{j(\theta_{11}(x)-\theta_{21}(x)-\pi)}\neq e^{j(\theta_{11}(y)-\theta_{21}(y)-\pi)} \quad \text{Condition \#34}$$

for ∀x, ∀y (x≠y; x,y=N, N+1, N+2, . . . , 2N−2, 2N−1)
(where x is N, N+1, N+2, . . . , 2N−2, 2N−1; y is N, N+1, N+2, . . . , 2N−2, 2N−1; and x≠y.)

In this case, by satisfying Condition #28, Condition #29, Condition #33, and Condition #34, the distance in the complex plane between poor reception points for s1 is increased, as is the distance between poor reception points for s2, thereby achieving excellent data reception quality.

In the present embodiment, the scheme of structuring 2N different precoding matrices for a precoding hopping scheme with a 2N-slot time period (cycle) has been described. In this case, as the 2N different precoding matrices, F[0], F[1], F[2], . . . , F[2N−2], F[2N−1] are prepared. In the present embodiment, an example of a single carrier transmission scheme has been described, and therefore the case of arranging symbols in the order F[0], F[1], F[2], . . . , F[2N−2], F[2N−1] in the time domain (or the frequency domain) has been described. The present invention is not, however, limited in this way, and the 2N different precoding matrices F[0], F[1], F[2], . . . , F[2N−2], F[2N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping scheme over an H-slot period (cycle) (H being a natural number larger than the number of slots 2N in the period (cycle) of the above scheme of regularly hopping between precoding matrices), when the 2N different precoding matrices of the present embodiment are included, the probability of excellent reception quality increases.

Embodiment 12

The present embodiment describes a scheme for regularly hopping between precoding matrices using a non-unitary matrix.

In the scheme of regularly hopping between precoding matrices over a period (cycle) with N slots, the precoding matrices prepared for the N slots are represented as follows.

Math 269

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\delta)} \end{pmatrix} \quad \text{Equation 239}$$

Let α be a fixed value (not depending on i), where $\alpha>0$. Furthermore, let $\delta\neq\pi$ radians (a fixed value not depending on i), and i=0, 1, 2, . . . , N−2, N−1.

From Condition #5 (Math 106) and Condition #6 (Math 107) in Embodiment 3, the following conditions are important in Equation 239 for achieving excellent data reception quality.

Math 270

$$e^{j(\theta_{11}(x)-\theta_{21}(x))}\neq e^{j(\theta_{11}(y)-\theta_{21}(y))} \quad \text{Condition \#35}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

Math 271

$$e^{j(\theta_{11}(x)-\theta_{21}(x)-\delta)}\neq e^{j(\theta_{11}(y)-\theta_{21}(y)-\delta)} \quad \text{Condition \#36}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

As an example, in order to distribute the poor reception points evenly with regards to phase in the complex plane, as described in Embodiment 6, Condition #37 and Condition #38 are provided.

Math 272

$$\frac{e^{j(\theta_{11}(x+1)-\theta_{21}(x+1))}}{e^{j(\theta_{11}(x)-\theta_{21}(x))}}=e^{j\left(\frac{2\pi}{N}\right)} \text{ for } \forall x\,(x=0,1,2,\cdots,N-2) \quad \text{Condition \#37}$$

Math 273

$$\frac{e^{j(\theta_{11}(x+1)-\theta_{21}(x+1))}}{e^{j(\theta_{11}(x)-\theta_{21}(x))}}=e^{j\left(-\frac{2\pi}{N}\right)} \text{ for } \forall x\,(x=0,1,2,\cdots,N-2) \quad \text{Condition \#38}$$

In other words, Condition #37 means that the difference in phase is 2π/N radians. On the other hand, Condition #38 means that the difference in phase is −2π/N radians.

In this case, if $\pi/2$ radians $\leq|\delta|<\pi$ radians, $\alpha>0$, and $\alpha\neq 1$, the distance in the complex plane between poor reception points for s1 is increased, as is the distance between poor reception points for s2, thereby achieving excellent data reception quality. Note that Condition #37 and Condition #38 are not always necessary.

In the present embodiment, the scheme of structuring N different precoding matrices for a precoding hopping scheme with an N-slot time period (cycle) has been described. In this case, as the N different precoding matrices, F[0], F[1], F[2], . . . , F[N−2], F[N−1] are prepared. In the present embodiment, an example of a single carrier transmission scheme has been described, and therefore the case of arranging symbols in the order F[0], F[1], F[2], . . . , F[N−2], F[N−1] in the time domain (or the frequency domain) has been described. The present invention is not, however, limited in this way, and the N different precoding matrices F[0], F[1], F[2], . . . , F[N−2], F[N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with an N-slot time period (cycle) has been described, but the same advantageous effects may be obtained by randomly using N different precoding matrices. In other words, the N different precoding matrices do not necessarily need to be used in a regular period (cycle).

Furthermore, in the precoding matrix hopping scheme over an H-slot period (cycle) (H being a natural number larger than the number of slots N in the period (cycle) of the above scheme of regularly hopping between precoding matrices), when the N different precoding matrices of the present embodiment are included, the probability of excellent reception quality increases. In this case, Condition #35 and Condition #36 can be replaced by the following conditions. (The number of slots in the period (cycle) is considered to be N.)

Math 274

$$e^{j(\theta_{11}(x)-\theta_{21}(x))} \neq e^{j(\theta_{11}(y)-\theta_{21}(y))} \quad \text{Condition \#35'}$$

for ∃x, ∃y (x≠y; x,y=0, 1, 2, . . . , N−2, N−1)
(x is 0, 1, 2, . . . , N−2, N−1; y is 0, 1, 2, . . . , N−2, N−1; and x≠y.)

Math 275

$$e^{j(\theta_{11}(x)-\theta_{21}(x)-\delta)} \neq e^{j(\theta_{11}(y)-\theta_{21}(y)-\delta)} \quad \text{Condition \#35}$$

for ∃x, ∃y (x≠y; x,y=0, 1, 2, . . . , N−2, N−1)
(x is 0, 1, 2, . . . , N−2, N−1; y is 0, 1, 2, . . . , N−2, N−1; and x≠y.)

Embodiment 13

The present embodiment describes a different example than Embodiment 8.

In the scheme of regularly hopping between precoding matrices over a period (cycle) with 2N slots, the precoding matrices prepared for the 2N slots are represented as follows.

Math 276 for $i = 0, 1, 2, \ldots, N-2, N-1$:

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \quad \text{Equation 240}$$

Let α be a fixed value (not depending on i), where α>0. Furthermore, let δ≠π radians.

Math 277 for $i = N, N+1, N+2, \ldots, 2N-2, 2N-1$:

$$F[i] = \frac{1}{\sqrt{\alpha^2+1}}\begin{pmatrix} \alpha \times e^{j(\theta_{11}(i)+\lambda)} & e^{j\theta_{11}(i)} \\ e^{j(\theta_{21}(i)+\lambda+\delta)} & \alpha \times e^{j\theta_{21}(i)} \end{pmatrix} \quad \text{Equation 241}$$

Let α be a fixed value (not depending on i), where α>0. (Let the α in Equation 240 and the α in Equation 241 be the same value.)

Furthermore, the 2×N×M period (cycle) precoding matrices based on Equations 240 and 241 are represented by the following equations.

Math 278 for $i = 0, 1, 2, \ldots, N-2, N-1$:

$$F[2 \times N \times k + i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \quad \text{Equation 242}$$

In this case, k=0, 1, . . . , M−2, M−1.

Math 279 for $i = N, N+1, N+2, \ldots, 2N-2, 2N-1$:

$$F[2 \times N \times k + i] = \frac{1}{\sqrt{\alpha^2+1}}\begin{pmatrix} \alpha \times e^{j(\theta_{11}(i)+\lambda)} & e^{j\theta_{11}(i)} \\ e^{j(\theta_{21}(i)+\lambda+\delta+Y_k)} & \alpha \times e^{j\theta_{21}(i+Y_k)} \end{pmatrix} \quad \text{Equation 243}$$

In this case, k=0, 1, . . . , M−2, M−1. Furthermore, Xk=Yk may be true, or Xk≠Yk may be true.

Precoding matrices F[0]-F[2×N×M−1] are thus generated (the precoding matrices F[0]-F[2×N×M−1] may be in any order for the 2×N×M slots in the period (cycle)). Symbol number 2×N×M×i may be precoded using F[0], symbol number 2×N×M×i+1 may be precoded using F[1], . . . , and symbol number 2×N×M×i+h may be precoded using F[h], for example (h=0, 1, 2, . . . , 2×N×M−2, 2×N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality.

The 2×N×M period (cycle) precoding matrices in Equation 242 may be changed to the following equation.

Math 280 for $i = 0, 1, 2, \ldots, N-2, N-1$:

$$F[2 \times N \times k + i] = \frac{1}{\sqrt{\alpha^2+1}}\begin{pmatrix} e^{j(\theta_{11}(i)+X_k)} & \alpha \times e^{j(\theta_{11}(i)+X_k+\lambda)} \\ \alpha \times e^{j\theta_{21}(i)} & e^{j(\theta_{21}(i)+\lambda+\delta)} \end{pmatrix} \quad \text{Equation 244}$$

In this case, k=0, 1, . . . , M−2, M−1.

The 2×N×M period (cycle) precoding matrices in Equation 243 may also be changed to any of Equations 245-247.

Math 281 for $i = N, N+1, N+2, \ldots, 2N-2, 2N-1$:

$$F[2 \times N \times k + i] = \frac{1}{\sqrt{\alpha^2+1}}\begin{pmatrix} \alpha \times e^{j(\theta_{11}(i)+\lambda+Y_k)} & e^{j\theta_{11}(i+Y_k)} \\ e^{j(\theta_{21}(i)+\lambda+\delta)} & \alpha \times e^{j\theta_{21}(i)} \end{pmatrix} \quad \text{Equation 245}$$

In this case, k=0, 1, . . . , M−2, M−1.

Math 282 for $i = N, N+1, N+2, \ldots, 2N-2, 2N-1$:

$$F[2\times N\times k+i] = \frac{1}{\sqrt{\alpha^2+1}}\begin{pmatrix} \alpha\times e^{j\theta_{11}(i)} & e^{j(\theta_{11}(i)+\lambda)} \\ e^{j\theta_{21}(i+Y_k)} & \alpha\times e^{j(\theta_{21}(i)+\lambda+\delta+Y_k)} \end{pmatrix} \quad \text{Equation 246}$$

In this case, k=0, 1, . . . , M−2, M−1.

Math 283 for $i = N, N+1, N+2, \ldots, 2N-2, 2N-1$:

$$F[2\times N\times k+i] = \frac{1}{\sqrt{\alpha^2+1}}\begin{pmatrix} \alpha\times e^{j\theta_{11}(i+Y_k)} & e^{j(\theta_{11}(i)+\lambda+Y_k)} \\ e^{j\theta_{21}(i)} & \alpha\times e^{j(\theta_{21}(i)+\lambda-\delta)} \end{pmatrix} \quad \text{Equation 247}$$

In this case, k=0, 1, . . . , M−2, M−1.

Focusing on poor reception points, if Equations 242 through 247 satisfy the following conditions, Math 284

$$e^{j(\theta_{11}(x)-\theta_{21}(x))} \neq e^{j(\theta_{11}(y)-\theta_{21}(y))} \quad \text{Condition \#39}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 274

$$e^{j(\theta_{11}(x)-\theta_{21}(x)-\delta)} \neq e^{j(\theta_{11}(y)-\theta_{21}(y)-\delta)} \quad \text{Condition \#40}$$

for ∃x, ∃y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 286

$$\theta_{11}(x)=\theta_{11}(x+N)$$

for ∀x (x is 0, 1, 2, . . . , N−2, N−1)

and $$\theta_{21}(y)=\theta_{21}(y+N)$$

for ∀y (y is 0, 1, 2, . . . , N−2, N−1)

then excellent data reception quality is achieved. Note that in Embodiment 8, Condition #39 and Condition #40 should be satisfied.

Focusing on Xk and Yk, if Equations 242 through 247 satisfy the following conditions, Math 287

$$X_a \neq X_b+2\times s\times\pi \quad \text{Condition \#42}$$

for ∀a, ∀b (a≠b; a,b=0, 1, 2, . . . , M−2, M−1)

(a is 0, 1, 2, . . . , M−2, M−1; b is 0, 1, 2, . . . , M−2, M−1; and a≠b.)

(Here, s is an integer.)

Math 288

$$Y_a \neq Y_b+2\times u\times\pi \quad \text{Condition \#43}$$

for ∀a, ∀b (a≠b; a,b=0, 1, 2, . . . , M−2, M−1)

(a is 0, 1, 2, . . . , M−2, M−1; b is 0, 1, 2, . . . , M−2, M−1; and a≠b.)

(Here, u is an integer.)

then excellent data reception quality is achieved. Note that in Embodiment 8, Condition #42 should be satisfied.

In Equations 242 and 247, when 0 radians ≤δ<2π radians, the matrices are a unitary matrix when δ=π radians and are a non-unitary matrix when δ≠π radians. In the present scheme, use of a non-unitary matrix for π/2 radians ≤|δ|<π radians is one characteristic structure, and excellent data reception quality is obtained. Use of a unitary matrix is another structure, and as described in detail in Embodiment 10 and Embodiment 16, if N is an odd number in Equations 242 through 247, the probability of obtaining excellent data reception quality increases.

Embodiment 14

The present embodiment describes an example of differentiating between usage of a unitary matrix and a non-unitary matrix as the precoding matrix in the scheme for regularly hopping between precoding matrices.

The following describes an example that uses a two-by-two precoding matrix (letting each element be a complex number), i.e. the case when two modulated signals (s1(*t*) and s2(*t*)) that are based on a modulation scheme are precoded, and the two precoded signals are transmitted by two antennas.

When transmitting data using a scheme of regularly hopping between precoding matrices, the mapping units 306A and 306B in the transmission device in FIG. 3 and FIG. 13 hop the modulation scheme in accordance with the frame structure signal 313. The relationship between the modulation level (the number of signal points for the modulation scheme in the I-Q plane) of the modulation scheme and the precoding matrices is described.

The advantage of the scheme of regularly hopping between precoding matrices is that, as described in Embodiment 6, excellent data reception quality is achieved in an LOS environment. In particular, when the reception device performs ML calculation or applies APP (or Max-log APP) based on ML calculation, the advantageous effect is considerable. Incidentally, ML calculation greatly impacts circuit scale (calculation scale) in accordance with the modulation level of the modulation scheme. For example, when two precoded signals are transmitted from two antennas, and the same modulation scheme is used for two modulated signals (signals based on the modulation scheme before precoding), the number of candidate signal points in the I-Q plane (received signal points 1101 in FIG. 11) is 4×4=16 when the modulation scheme is QPSK, 16×16=256 when the modulation scheme is 16QAM, 64×64=4096 when the modulation scheme is 64QAM, 256×256=65,536 when the modulation scheme is 256QAM, and 1024×1024=1,048,576 when the modulation scheme is 256QAM. In order to keep the calculation scale of the reception device down to a certain circuit size, when the modulation scheme is QPSK, 16QAM, or 64QAM, ML calculation ((Max-log) APP based on ML calculation) is used, and when the modulation scheme is 256QAM or 1024QAM, linear operation such as MMSE or ZF is used in the reception device. (In some cases, ML calculation may be used for 256QAM.)

When such a reception device is assumed, consideration of the Signal-to-Noise Power Ratio (SNR) after separation of multiple signals indicates that a unitary matrix is appropriate as the precoding matrix when the reception device performs linear operation such as MMSE or ZF, whereas either a unitary matrix or a non-unitary matrix may be used when the reception device performs ML calculation. Taking any of the above embodiments into consideration, when two precoded signals are transmitted from two antennas, the same modulation scheme is used for two modulated signals (signals based on the modulation scheme before precoding), a non-unitary matrix is used as the precoding matrix in the scheme for regularly hopping between precoding matrices, the modulation level of the modulation scheme is equal to or less than 64 (or equal to or less than 256), and a unitary matrix is used when the modulation level is greater than 64 (or greater than 256), then for all of the modulation schemes supported by the transmission system, there is an increased probability of achieving the advantageous effect whereby excellent data reception quality is achieved for any of the modulation schemes while reducing the circuit scale of the reception device.

When the modulation level of the modulation scheme is equal to or less than 64 (or equal to or less than 256) as well, in some cases use of a unitary matrix may be preferable. Based on this consideration, when a plurality of modulation schemes are supported in which the modulation level is equal to or less than 64 (or equal to or less than 256), it is important that in some cases, in some of the plurality of supported modulation schemes where the modulation level is equal to or less than 64, a non-unitary matrix is used as the precoding matrix in the scheme for regularly hopping between precoding matrices.

The case of transmitting two precoded signals from two antennas has been described above as an example, but the present invention is not limited in this way. In the case when N precoded signals are transmitted from N antennas, and the same modulation scheme is used for N modulated signals (signals based on the modulation scheme before precoding), a threshold $\beta_N$ may be established for the modulation level of the modulation scheme. When a plurality of modulation schemes for which the modulation level is equal to or less than $\beta_N$ are supported, in some of the plurality of supported modulation schemes where the modulation level is equal to or less than $\beta_N$, a non-unitary matrix is used as the precoding matrices in the scheme for regularly hopping between precoding matrices, whereas for modulation schemes for which the modulation level is greater than $\beta_N$, a unitary matrix is used. In this way, for all of the modulation schemes supported by the transmission system, there is an increased probability of achieving the advantageous effect whereby excellent data reception quality is achieved for any of the modulation schemes while reducing the circuit scale of the reception device. (When the modulation level of the modulation scheme is equal to or less than $\beta_N$, a non-unitary matrix may always be used as the precoding matrix in the scheme for regularly hopping between precoding matrices.)

In the above description, the same modulation scheme has been described as being used in the modulation scheme for simultaneously transmitting N modulated signals. The following, however, describes the case in which two or more modulation schemes are used for simultaneously transmitting N modulated signals.

As an example, the case in which two precoded signals are transmitted by two antennas is described. The two modulated signals (signals based on the modulation scheme before precoding) are either modulated with the same modulation scheme, or when modulated with different modulation schemes, are modulated with a modulation scheme having a modulation level of $2^{a1}$ or a modulation level of $2^{a2}$. In this case, when the reception device uses ML calculation ((Max-log) APP based on ML calculation), the number of candidate signal points in the I-Q plane (received signal points 1101 in FIG. 11) is $2^{a1}\times 2^{a2}=2^{a1+a2}$. As described above, in order to achieve excellent data reception quality while reducing the circuit scale of the reception device, a threshold $2^{\beta}$ may be provided for $2^{a1+a2}$, and when $2^{a1+a2}\leq 2^{\beta}$, a non-unitary matrix may be used as the precoding matrix in the scheme for regularly hopping between precoding matrices, whereas a unitary matrix may be used when $2^{a1+a2}>2^{\beta}$.

Furthermore, when $2^{a1+a2}\leq 2^{\beta}$, in some cases use of a unitary matrix may be preferable. Based on this consideration, when a plurality of combinations of modulation schemes are supported for which $2^{a1+a2}\leq 2^{\beta}$, it is important that in some of the supported combinations of modulation schemes for which $2^{a1+a2}\leq 2^{\beta}$, a non-unitary matrix is used as the precoding matrix in the scheme for regularly hopping between precoding matrices.

As an example, the case in which two precoded signals are transmitted by two antennas has been described, but the present invention is not limited in this way. For example, N modulated signals (signals based on the modulation scheme before precoding) may be either modulated with the same modulation scheme or, when modulated with different modulation schemes, the modulation level of the modulation scheme for the $i^{th}$ modulated signal may be $2^{ai}$ (where i=1, 2, . . . , N−1, N).

In this case, when the reception device uses ML calculation ((Max-log) APP based on ML calculation), the number of candidate signal points in the I-Q plane (received signal points 1101 in FIG. 11) is $2^{a1}\times 2^{a2}\times \ldots \times 2^{ai}\times \ldots \times 2^{aN}=2^{a1+a2+ \ldots +ai+ \ldots +aN}$. As described above, in order to achieve excellent data reception quality while reducing the circuit scale of the reception device, a threshold $2^{\beta}$ may be provided for $2^{a1+a2+ \ldots +ai+ \ldots +aN}$.

Math 289

$$2^{a1+a2+\cdots+ai+\cdots+aN} = 2^{Y} \leq 2^{\beta} \quad \text{Condition \#44}$$

where $$Y = \sum_{i=1}^{N} a_i$$

When a plurality of combinations of a modulation schemes satisfying Condition #44 are supported, in some of the supported combinations of modulation schemes satisfying Condition #44, a non-unitary matrix is used as the precoding matrix in the scheme for regularly hopping between precoding matrices.

Math 290

$$2^{a1+a2+\cdots+ai+\cdots+aN} = 2^{Y} > 2^{\beta} \quad \text{Condition \#45}$$

where $$Y = \sum_{i=1}^{N} a_i$$

By using a unitary matrix in all of the combinations of modulation schemes satisfying Condition #45, then for all of the modulation schemes supported by the transmission system, there is an increased probability of achieving the advantageous effect whereby excellent data reception quality is achieved while reducing the circuit scale of the reception device for any of the combinations of modulation schemes. (A non-unitary matrix may be used as the precoding matrix in the scheme for regularly hopping between precoding matrices in all of the supported combinations of modulation schemes satisfying Condition #44.)

Embodiment 15

The present embodiment describes an example of a system that adopts a scheme for regularly hopping between precoding matrices using a multi-carrier transmission scheme such as OFDM.

Figure 47A:
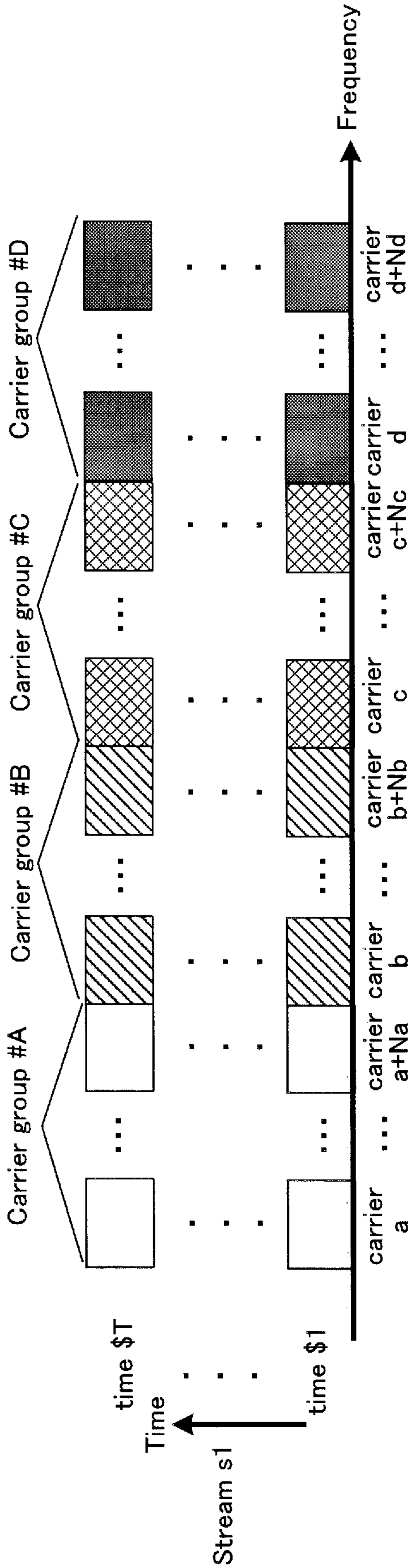
FIGS. 47A and 47B are examples of a frame structure in the time and frequency domains.
Figure 47B:
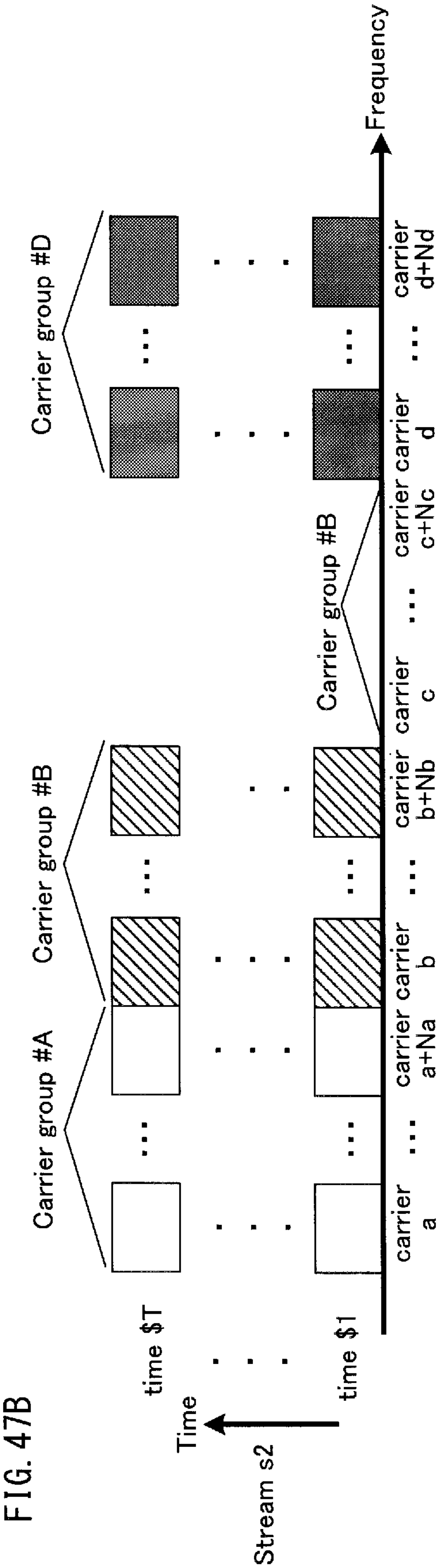

FIGS. 47A and 47B show an example according to the present embodiment of frame structure in the time and frequency domains for a signal transmitted by a broadcast station (base station) in a system that adopts a scheme for regularly hopping between precoding matrices using a multi-carrier transmission scheme such as OFDM. (The frame structure is set to extend from time $1 to time $T.) FIG. 47A shows the frame structure in the time and frequency domains for the stream s1 described in Embodiment 1, and FIG. 47B shows the frame structure in the time and frequency domains for the stream s2 described in Embodiment 1. Symbols at the same time and the same (sub)carrier in stream s1 and stream s2 are transmitted by a plurality of antennas at the same time and the same frequency.

In FIGS. 47A and 47B, the (sub)carriers used when using OFDM are divided as follows: a carrier group #A composed of (sub)carrier a—(sub)carrier a+Na, a carrier group #B composed of (sub)carrier b—(sub)carrier b+Nb, a carrier group #C composed of (sub)carrier c—(sub)carrier c+Nc, a carrier group #D composed of (sub)carrier d—(sub)carrier d+Nd, . . . . In each subcarrier group, a plurality of transmission schemes are assumed to be supported. By supporting a plurality of transmission schemes, it is possible to effectively capitalize on the advantages of the transmission schemes. For example, in FIGS. 47A and 47B, a spatial multiplexing MIMO system, or a MIMO system with a fixed precoding matrix is used for carrier group #A, a MIMO system that regularly hops between precoding matrices is used for carrier group #B, only stream s1 is transmitted in carrier group #C, and space-time block coding is used to transmit carrier group #D.

Figure 48A:
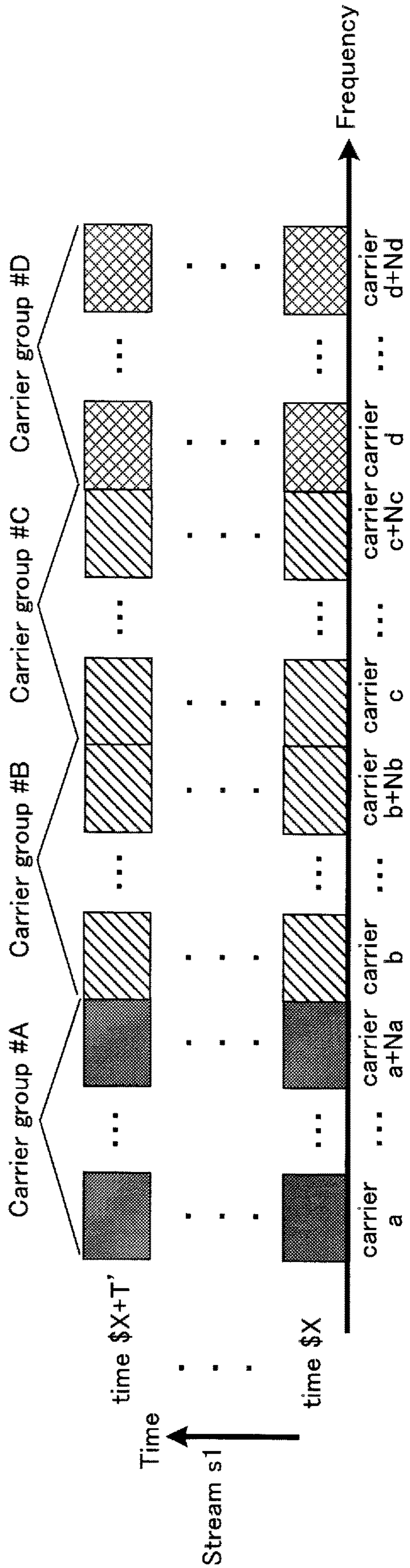
FIGS. 48A and 48B are examples of a frame structure in the time and frequency domains.
Figure 48B:
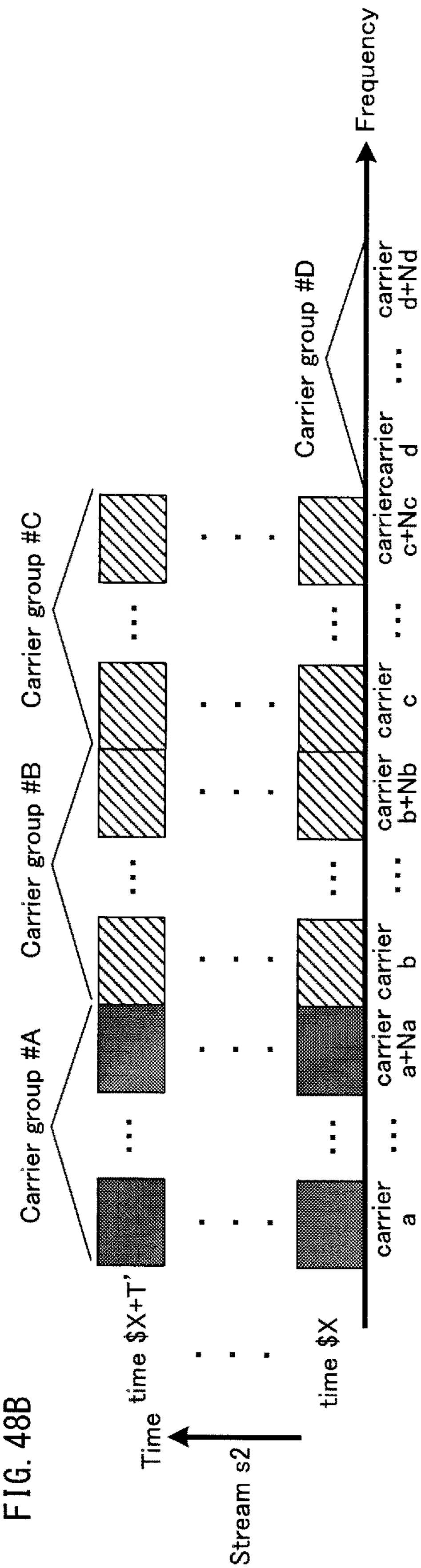

FIGS. 48A and 48B show an example according to the present embodiment of frame structure in the time and frequency domains for a signal transmitted by a broadcast station (base station) in a system that adopts a scheme for regularly hopping between precoding matrices using a multi-carrier transmission scheme such as OFDM. FIGS. 48A and 48B show a frame structure at a different time than FIGS. 47A and 47B, from time $X to time $X+T'. In FIGS. 48A and 48B, as in FIGS. 47A and 47B, the (sub)carriers used when using OFDM are divided as follows: a carrier group #A composed of (sub)carrier a—(sub)carrier a+Na, a carrier group #B composed of (sub)carrier b—(sub)carrier b+Nb, a carrier group #C composed of (sub)carrier c—(sub) carrier c+Nc, a carrier group #D composed of (sub)carrier d—(sub)carrier d+Nd, . . . . The difference between FIGS. 47A and 47B and FIGS. 48A and 48B is that in some carrier groups, the transmission scheme used in FIGS. 47A and 47B differs from the transmission scheme used in FIGS. 48A and 48B. In FIGS. 48A and 48B, space-time block coding is used to transmit carrier group #A, a MIMO system that regularly hops between precoding matrices is used for carrier group #B, a MIMO system that regularly hops between precoding matrices is used for carrier group #C, and only stream s1 is transmitted in carrier group #D.

Next, the supported transmission schemes are described.

FIG. 49 shows a signal processing scheme when using a spatial multiplexing MIMO system or a MIMO system with a fixed precoding matrix. FIG. 49 bears the same numbers as in FIG. 6. A weighting unit 600, which is a baseband signal in accordance with a certain modulation scheme, receives as inputs a stream s1(*t*) (307A), a stream s2(*t*) (307B), and information 315 regarding the weighting scheme, and outputs a modulated signal z1(*t*) (309A) after weighting and a modulated signal z2(*t*) (309B) after weighting. Here, when the information 315 regarding the weighting scheme indicates a spatial multiplexing MIMO system, the signal processing in scheme #1 of FIG. 49 is performed. Specifically, the following processing is performed.

Math 291

$$\begin{pmatrix} z1(t) \\ z2(t) \end{pmatrix} = \begin{pmatrix} e^{j0} & 0 \\ 0 & e^{j0} \end{pmatrix} \begin{pmatrix} s1(t) \\ s2(t) \end{pmatrix} = \begin{pmatrix} 1 & 0 \\ 0 & 1 \end{pmatrix} \begin{pmatrix} s1(t) \\ s2(t) \end{pmatrix} = \begin{pmatrix} s1(t) \\ s2(t) \end{pmatrix} \quad \text{Equation 250}$$

When a scheme for transmitting one modulated signal is supported, from the standpoint of transmission power, Equation 250 may be represented as Equation 251.

Math 292

$$\begin{pmatrix} z1(t) \\ z2(t) \end{pmatrix} = \frac{1}{\sqrt{2}} \begin{pmatrix} e^{j0} & 0 \\ 0 & e^{j0} \end{pmatrix} \begin{pmatrix} s1(t) \\ s2(t) \end{pmatrix} = \frac{1}{\sqrt{2}} \begin{pmatrix} 1 & 0 \\ 0 & 1 \end{pmatrix} \begin{pmatrix} s1(t) \\ s2(t) \end{pmatrix} = \begin{pmatrix} \frac{1}{\sqrt{2}} s1(t) \\ \frac{1}{\sqrt{2}} s2(t) \end{pmatrix} \quad \text{Equation 251}$$

When the information 315 regarding the weighting scheme indicates a MIMO system in which precoding matrices are regularly hopped between, signal processing in scheme #2, for example, of FIG. 49 is performed. Specifically, the following processing is performed.

Math 293

$$\begin{pmatrix} z1(t) \\ z2(t) \end{pmatrix} = \frac{1}{\sqrt{\alpha^2+1}} \begin{pmatrix} e^{j\theta_{11}} & \alpha \times e^{j(\theta_{11}+\lambda)} \\ \alpha \times e^{j\theta_{21}} & e^{j(\theta_{21}+\lambda+\delta)} \end{pmatrix} \begin{pmatrix} s1(t) \\ s2(t) \end{pmatrix} \quad \text{Equation 252}$$

Here, $\theta_{11}$, $\theta_{12}$, $\lambda$, and $\delta$ are fixed values.

Figure 50:
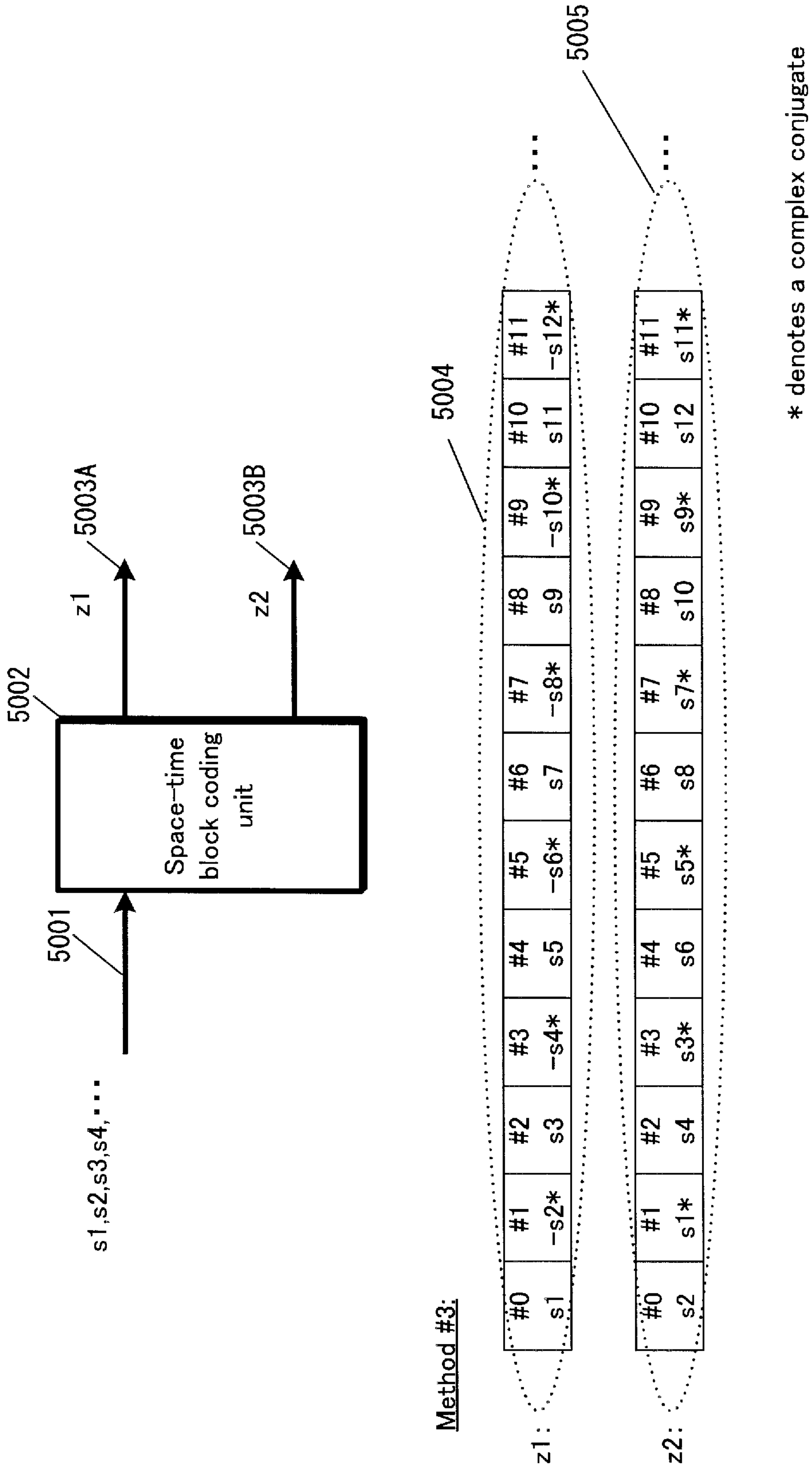
FIG. 50 shows the structure of modulated signals when using space-time block coding.

FIG. 50 shows the structure of modulated signals when using space-time block coding. A space-time block coding unit (5002) in FIG. 50 receives, as input, a baseband signal based on a certain modulation signal. For example, the space-time block coding unit (5002) receives symbol s1, symbol s2, . . . as inputs. As shown in FIG. 50, space-time block coding is performed, z1(5003A) becomes "s1 as symbol #0", "−s2* as symbol #0", "s3 as symbol #2", "−s4* as symbol #3" . . . , and z2(5003B) becomes "s2 as symbol #0", "s1* as symbol #1", "s4 as symbol #2", "s3* as symbol #3" . . . . In this case, symbol #X in z1 and symbol #X in z2 are transmitted from the antennas at the same time, over the same frequency.

Figure 51:
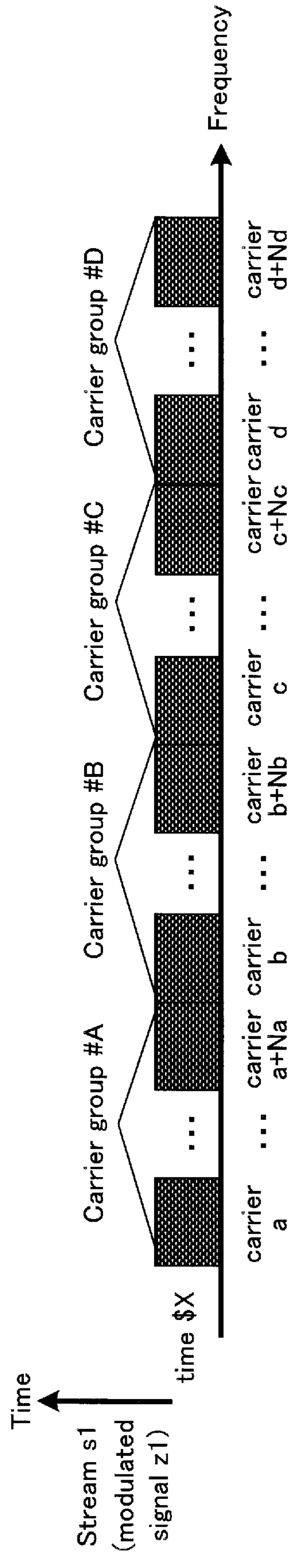
FIG. 51 is a detailed example of a frame structure in the time and frequency domains.

In FIGS. 47A, 47B, 48A, and 48B, only symbols transmitting data are shown. In practice, however, it is necessary to transmit information such as the transmission scheme, modulation scheme, error correction scheme, and the like. For example, as in FIG. 51, these pieces of information can be transmitted to a communication partner by regular transmission with only one modulated signal z1. It is also necessary to transmit symbols for estimation of channel fluctuation, i.e. for the reception device to estimate channel fluctuation (for example, a pilot symbol, reference symbol, preamble, a Phase Shift Keying (PSK) symbol known at the transmission and reception sides, and the like). In FIGS. 47A, 47B, 48A, and 48B, these symbols are omitted. In practice, however, symbols for estimating channel fluctuation are included in the frame structure in the time and frequency domains. Accordingly, each carrier group is not composed only of symbols for transmitting data. (The same is true for Embodiment 1 as well.)

Figure 52:
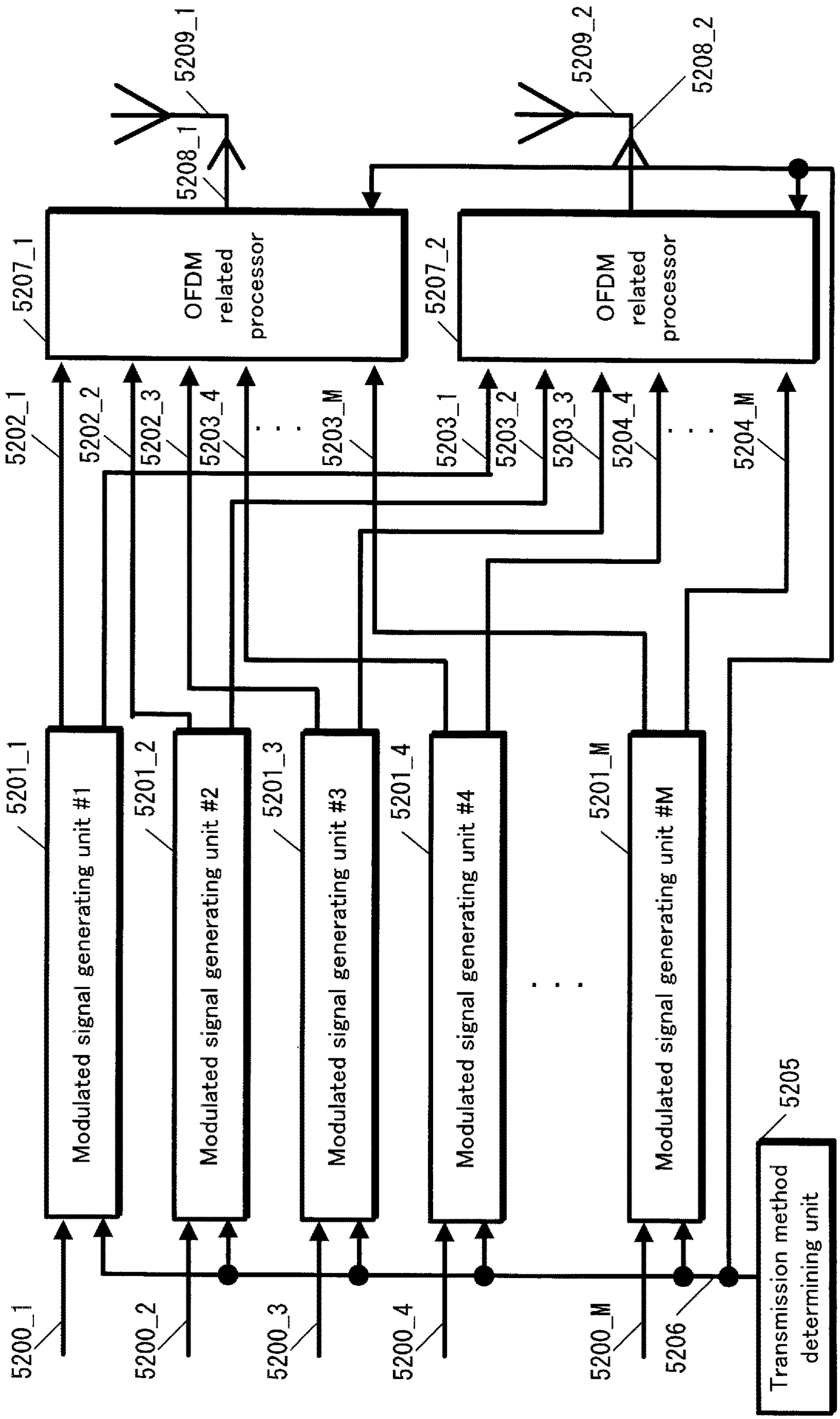
FIG. 52 is an example of the structure of a transmission device.

FIG. 52 is an example of the structure of a transmission device in a broadcast station (base station) according to the present embodiment. A transmission scheme determining unit (5205) determines the number of carriers, modulation scheme, error correction scheme, coding rate for error correction coding, transmission scheme, and the like for each carrier group and outputs a control signal (5206).

A modulated signal generating unit #1 (5201_1) receives, as input, information (5200_1) and the control signal (5206) and, based on the information on the transmission scheme in the control signal (5206), outputs a modulated signal z1 (5202_1) and a modulated signal z2 (5203_1) in the carrier group #A of FIGS. 47A, 47B, 48A, and 48B.

Similarly, a modulated signal generating unit #2 (5201_2) receives, as input, information (5200_2) and the control signal (5206) and, based on the information on the transmission scheme in the control signal (5206), outputs a modulated signal z1 (5202_2) and a modulated signal z2 (5203_2) in the carrier group #B of FIGS. 47A, 47B, 48A, and 48B.

Similarly, a modulated signal generating unit #3 (5201_3) receives, as input, information (5200_3) and the control signal (5206) and, based on the information on the transmission scheme in the control signal (5206), outputs a modulated signal z1 (5202_3) and a modulated signal z2 (5203_3) in the carrier group #C of FIGS. 47A, 47B, 48A, and 48B.

Similarly, a modulated signal generating unit #4 (5201_4) receives, as input, information (5200_4) and the control signal (5206) and, based on the information on the transmission scheme in the control signal (5206), outputs a modulated signal z1 (5202_4) and a modulated signal z2 (5203_4) in the carrier group #D of FIGS. 47A, 47B, 48A, and 48B.

While not shown in the figures, the same is true for modulated signal generating unit #5 through modulated signal generating unit #M−1.

Similarly, a modulated signal generating unit #M (5201_M) receives, as input, information (5200_M) and the control signal (5206) and, based on the information on the transmission scheme in the control signal (5206), outputs a modulated signal z1 (5202_M) and a modulated signal z2 (5203_M) in a certain carrier group.

An OFDM related processor (5207_1) receives, as inputs, the modulated signal z1 (5202_1) in carrier group #A, the modulated signal z1 (5202_2) in carrier group #B, the modulated signal z1 (5202_3) in carrier group #C, the modulated signal z1 (5202_4) in carrier group #D, . . . , the modulated signal z1 (5202_M) in a certain carrier group #M, and the control signal (5206), performs processing such as reordering, inverse Fourier transform, frequency conversion, amplification, and the like, and outputs a transmission signal (5208_1). The transmission signal (5208_1) is output as a radio wave from an antenna (5209_1).

Similarly, an OFDM related processor (5207_2) receives, as inputs, the modulated signal z1 (5203_1) in carrier group #A, the modulated signal z1 (5203_2) in carrier group #B, the modulated signal z1 (5203_3) in carrier group #C, the modulated signal z1 (5203_4) in carrier group #D, . . . , the modulated signal z1 (5203_M) in a certain carrier group #M, and the control signal (5206), performs processing such as reordering, inverse Fourier transform, frequency conversion, amplification, and the like, and outputs a transmission signal (5208_2). The transmission signal (5208_2) is output as a radio wave from an antenna (5209_2).

Figure 53:
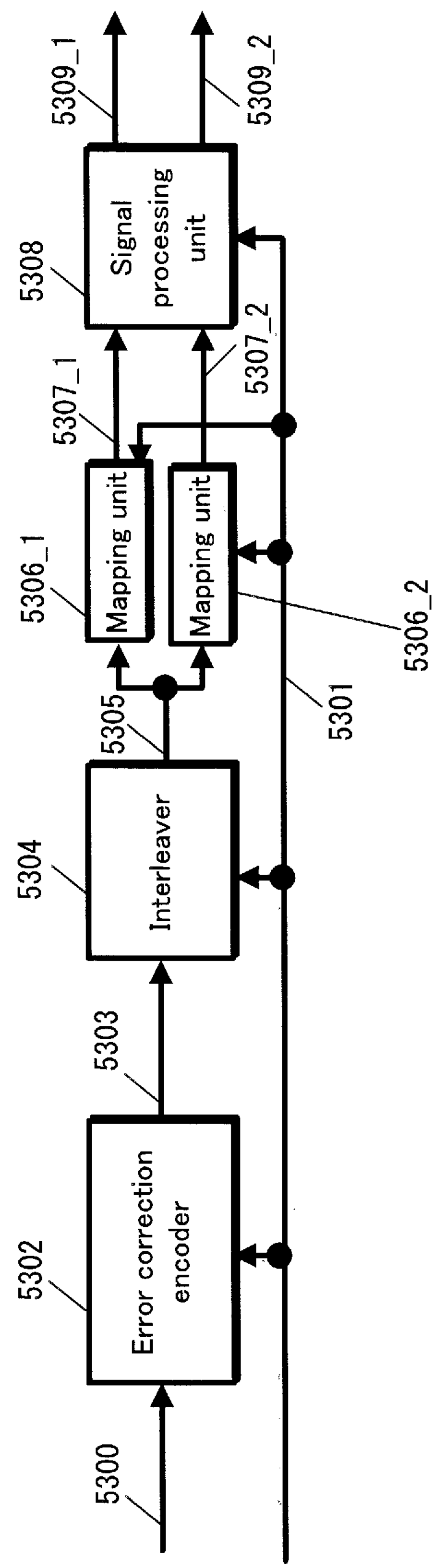
FIG. 53 is an example of a structure of the modulated signal generating units #1-#M in FIG. 52.

FIG. 53 shows an example of a structure of the modulated signal generating units #1-#M in FIG. 52. An error correction encoder (5302) receives, as inputs, information (5300) and a control signal (5301) and, in accordance with the control signal (5301), sets the error correction coding scheme and the coding rate for error correction coding, performs error correction coding, and outputs data (5303) after error correction coding. (In accordance with the setting of the error correction coding scheme and the coding rate for error correction coding, when using LDPC coding, turbo coding, or convolutional coding, for example, depending on the coding rate, puncturing may be performed to achieve the coding rate.)

An interleaver (5304) receives, as input, error correction coded data (5303) and the control signal (5301) and, in accordance with information on the interleaving scheme included in the control signal (5301), reorders the error correction coded data (5303) and outputs interleaved data (5305).

A mapping unit (5306_1) receives, as input, the interleaved data (5305) and the control signal (5301) and, in accordance with the information on the modulation scheme included in the control signal (5301), performs mapping and outputs a baseband signal (5307_1).

Similarly, a mapping unit (5306_2) receives, as input, the interleaved data (5305) and the control signal (5301) and, in accordance with the information on the modulation scheme included in the control signal (5301), performs mapping and outputs a baseband signal (5307_2).

A signal processing unit (5308) receives, as input, the baseband signal (5307_1), the baseband signal (5307_2), and the control signal (5301) and, based on information on the transmission scheme (for example, in this embodiment, a spatial multiplexing MIMO system, a MIMO scheme using a fixed precoding matrix, a MIMO scheme for regularly hopping between precoding matrices, space-time block coding, or a transmission scheme for transmitting only stream s1) included in the control signal (5301), performs signal processing. The signal processing unit (5308) outputs a processed signal z1 (5309_1) and a processed signal z2 (5309_2). Note that when the transmission scheme for transmitting only stream s1 is selected, the signal processing unit (5308) does not output the processed signal z2 (5309_2). Furthermore, in FIG. 53, one error correction encoder is shown, but the present invention is not limited in this way. For example, as shown in FIG. 3, a plurality of encoders may be provided.

Figure 54:
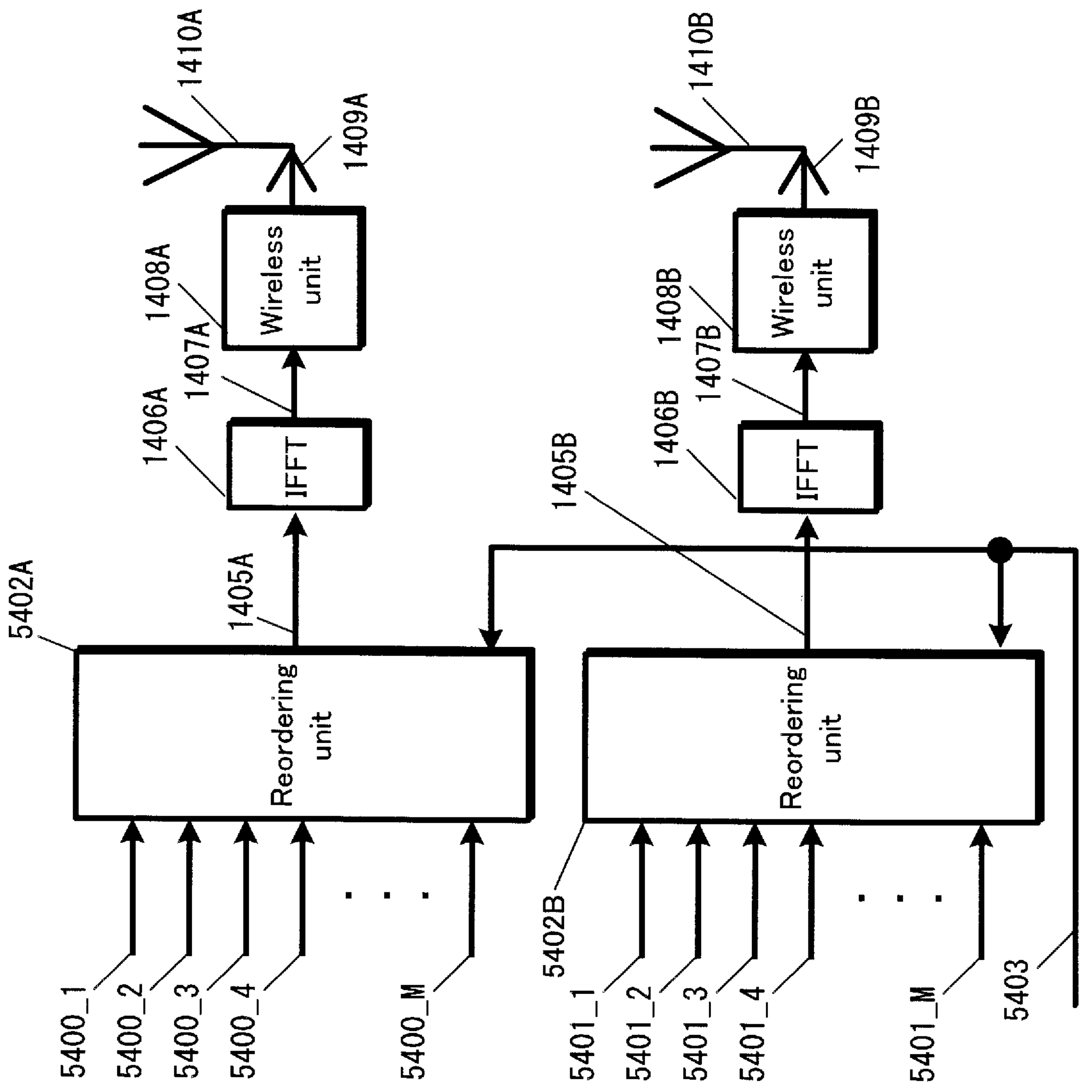
FIG. 54 shows the structure of the OFDM related processors (5207_1 and 5207_2) in FIG. 52.

FIG. 54 shows an example of the structure of the OFDM related processors (5207_1 and 5207_2) in FIG. 52. Elements that operate in a similar way to FIG. 14 bear the same reference signs. A reordering unit (5402A) receives, as input, the modulated signal z1 (5400_1) in carrier group #A, the modulated signal z1 (5400_2) in carrier group #B, the modulated signal z1 (5400_3) in carrier group #C, the modulated signal z1 (5400_4) in carrier group #D, . . . , the modulated signal z1 (5400_M) in a certain carrier group, and a control signal (5403), performs reordering, and output reordered signals 1405A and 1405B. Note that in FIGS. 47A, 47B, 48A, 48B, and 51, an example of allocation of the carrier groups is described as being formed by groups of subcarriers, but the present invention is not limited in this way. Carrier groups may be formed by discrete subcarriers at each time interval. Furthermore, in FIGS. 47A, 47B, 48A, 48B, and 51, an example has been described in which the number of carriers in each carrier group does not change over time, but the present invention is not limited in this way. This point will be described separately below.

Figures 55A, 55B:
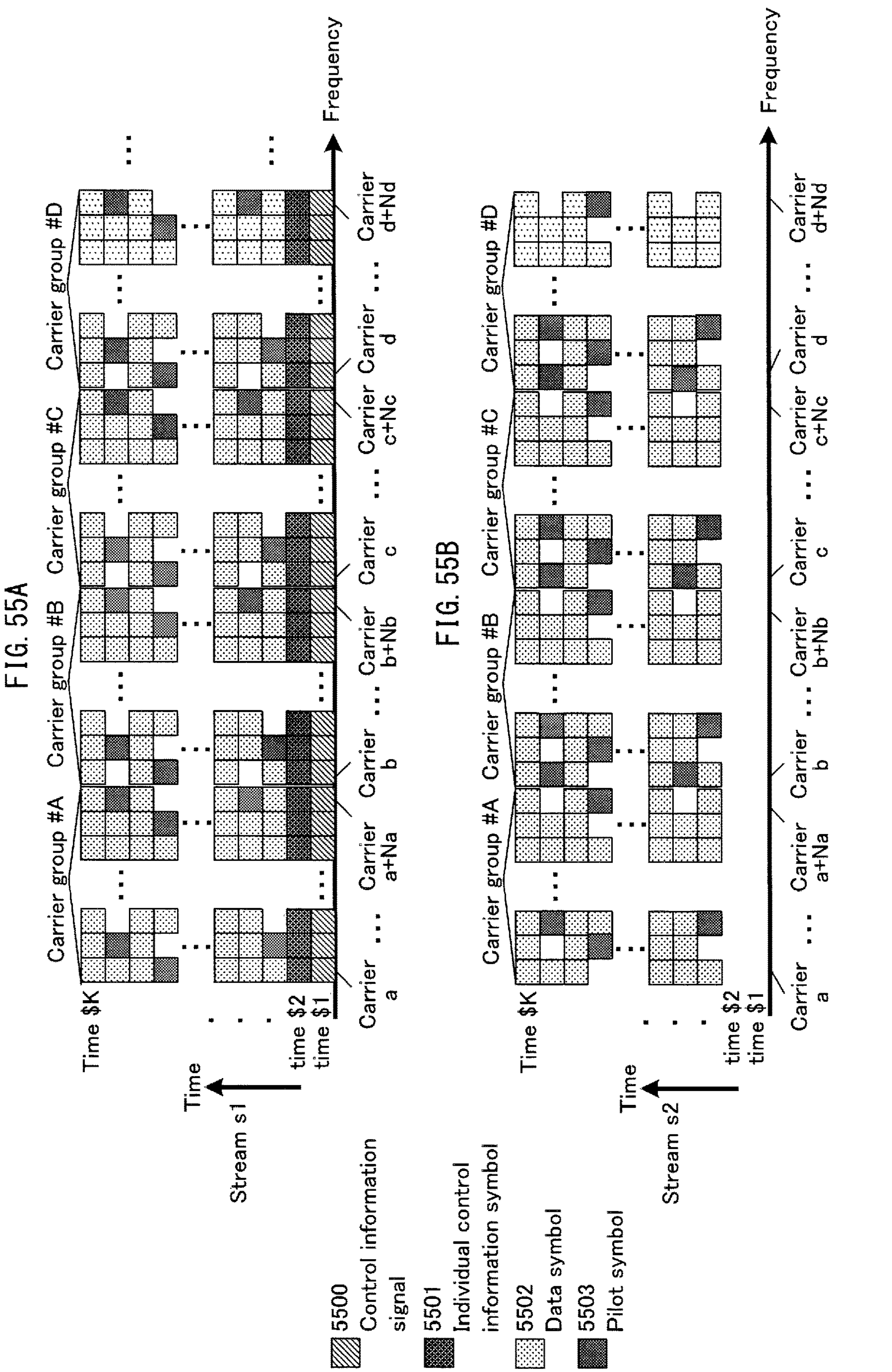
FIGS. 55A and 55B are detailed examples of a frame structure in the time and frequency domains.

FIGS. 55A and 55B show an example of frame structure in the time and frequency domains for a scheme of setting the transmission scheme for each carrier group, as in FIGS. 47A, 47B, 48A, 48B, and 51. In FIGS. 55A and 55B, control information symbols are labeled 5500, individual control information symbols are labeled 5501, data symbols are labeled 5502, and pilot symbols are labeled 5503. Furthermore, FIG. 55A shows the frame structure in the time and frequency domains for stream s1, and FIG. 55B shows the frame structure in the time and frequency domains for stream s2.

The control information symbols are for transmitting control information shared by the carrier group and are composed of symbols for the transmission and reception devices to perform frequency and time synchronization, information regarding the allocation of (sub)carriers, and the like. The control information symbols are set to be transmitted from only stream s1 at time $1.

The individual control information symbols are for transmitting control information on individual subcarrier groups and are composed of information on the transmission scheme, modulation scheme, error correction coding scheme, coding rate for error correction coding, block size of error correction codes, and the like for the data symbols, information on the insertion scheme of pilot symbols, information on the transmission power of pilot symbols, and the like. The individual control information symbols are set to be transmitted from only stream s1 at time $1.

The data symbols are for transmitting data (information), and as described with reference to FIGS. 47A through 50, are symbols of one of the following transmission schemes, for example: a spatial multiplexing MIMO system, a MIMO scheme using a fixed precoding matrix, a MIMO scheme for regularly hopping between precoding matrices, space-time block coding, or a transmission scheme for transmitting only stream s1. Note that in carrier group #A, carrier group #B, carrier group #C, and carrier group #D, data symbols are shown in stream s2, but when the transmission scheme for transmitting only stream s1 is used, in some cases there are no data symbols in stream s2.

The pilot symbols are for the reception device to perform channel estimation, i.e. to estimate fluctuation corresponding to $h_{11}(t)$, $h_{12}(t)$, $h_{21}(t)$, and $h_{22}(t)$ in Equation 36. (In this embodiment, since a multi-carrier transmission scheme such as an OFDM scheme is used, the pilot symbols are for estimating fluctuation corresponding to $h_{11}(t)$, $h_{12}(t)$, $h_{21}(t)$, and $h_{22}(t)$ in each subcarrier.) Accordingly, the PSK transmission scheme, for example, is used for the pilot symbols, which are structured to form a pattern known by the transmission and reception devices. Furthermore, the reception device may use the pilot symbols for estimation of frequency offset, estimation of phase distortion, and time synchronization.

Figure 56:
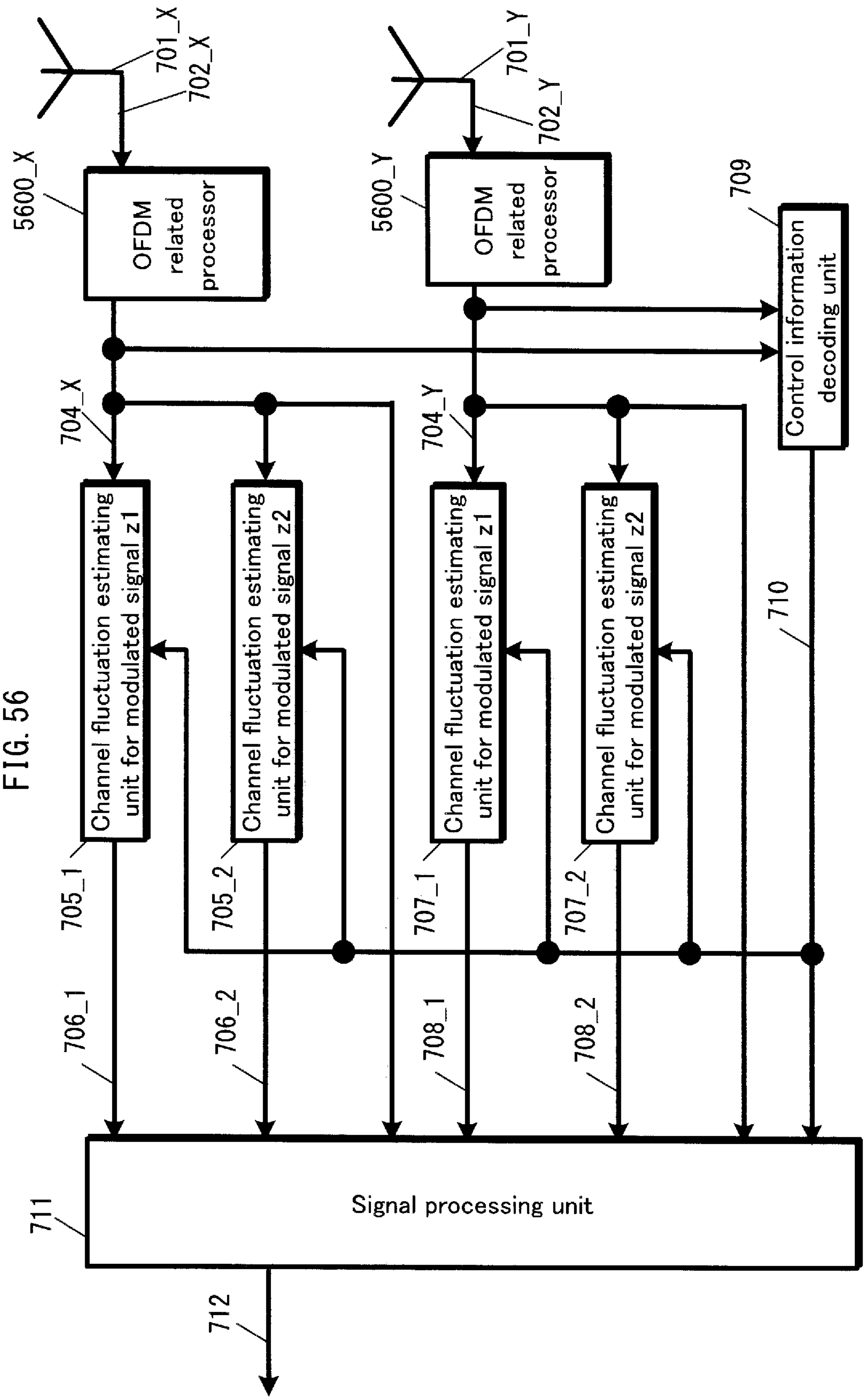
FIG. 56 is an example of the structure of a reception device.

FIG. 56 shows an example of the structure of a reception device for receiving modulated signals transmitted by the transmission device in FIG. 52. Elements that operate in a similar way to FIG. 7 bear the same reference signs.

In FIG. 56, an OFDM related processor (5600_X) receives, as input, a received signal 702_X, performs predetermined processing, and outputs a processed signal 704_X. Similarly, an OFDM related processor (5600_Y) receives, as input, a received signal 702_Y, performs predetermined processing, and outputs a processed signal 704_Y.

The control information decoding unit 709 in FIG. 56 receives, as input, the processed signals 704_X and 704_Y, extracts the control information symbols and individual control information symbols in FIGS. 55A and 55B to obtain the control information transmitted by these symbols, and outputs a control signal 710 that includes the obtained information.

The channel fluctuation estimating unit 705_1 for the modulated signal z1 receives, as inputs, the processed signal 704_X and the control signal 710, performs channel estimation in the carrier group required by the reception device (the desired carrier group), and outputs a channel estimation signal 706_1.

Similarly, the channel fluctuation estimating unit 705_2 for the modulated signal z2 receives, as inputs, the processed signal 704_X and the control signal 710, performs channel estimation in the carrier group required by the reception device (the desired carrier group), and outputs a channel estimation signal 706_2.

Similarly, the channel fluctuation estimating unit 705_1 for the modulated signal z1 receives, as inputs, the processed signal 704_Y and the control signal 710, performs channel estimation in the carrier group required by the reception device (the desired carrier group), and outputs a channel estimation signal 708_1.

Similarly, the channel fluctuation estimating unit 705_2 for the modulated signal z2 receives, as inputs, the processed signal 704_Y and the control signal 710, performs channel estimation in the carrier group required by the reception device (the desired carrier group), and outputs a channel estimation signal 708_2.

The signal processing unit 711 receives, as inputs, the signals 706_1, 706_2, 708_1, 708_2, 704_X, 704_Y, and the control signal 710. Based on the information included in the control signal 710 on the transmission scheme, modulation scheme, error correction coding scheme, coding rate for error correction coding, block size of error correction codes, and the like for the data symbols transmitted in the desired carrier group, the signal processing unit 711 demodulates and decodes the data symbols and outputs received data 712.

Figure 57:
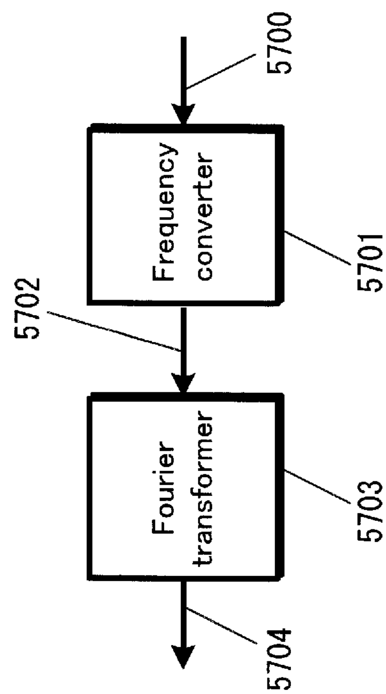
FIG. 57 shows the structure of the OFDM related processors (5600_X and 5600_Y) in FIG. 56.

FIG. 57 shows the structure of the OFDM related processors (5600_X, 5600_Y) in FIG. 56. A frequency converter (5701) receives, as input, a received signal (5700), performs frequency conversion, and outputs a frequency converted signal (5702).

A Fourier transformer (5703) receives, as input, the frequency converted signal (5702), performs a Fourier transform, and outputs a Fourier transformed signal (5704).

As described above, when using a multi-carrier transmission scheme such as an OFDM scheme, carriers are divided into a plurality of carrier groups, and the transmission scheme is set for each carrier group, thereby allowing for the reception quality and transmission speed to be set for each carrier group, which yields the advantageous effect of construction of a flexible system. In this case, as described in other embodiments, allowing for choice of a scheme of regularly hopping between precoding matrices offers the advantages of obtaining high reception quality, as well as high transmission speed, in an LOS environment. While in the present embodiment, the transmission schemes to which a carrier group can be set are "a spatial multiplexing MIMO system, a MIMO scheme using a fixed precoding matrix, a MIMO scheme for regularly hopping between precoding matrices, space-time block coding, or a transmission scheme for transmitting only stream s1", but the transmission schemes are not limited in this way. Furthermore, the space-time coding is not limited to the scheme described with reference to FIG. 50, nor is the MIMO scheme using a fixed precoding matrix limited to scheme #2 in FIG. 49, as any structure with a fixed precoding matrix is acceptable. In the present embodiment, the case of two antennas in the transmission device has been described, but when the number of antennas is larger than two as well, the same advantageous effects may be achieved by allowing for selection of a transmission scheme for each carrier group from among "a spatial multiplexing MIMO system, a MIMO scheme using a fixed precoding matrix, a MIMO scheme for regularly hopping between precoding matrices, space-time block coding, or a transmission scheme for transmitting only stream s1".

Figures 58A, 58B:
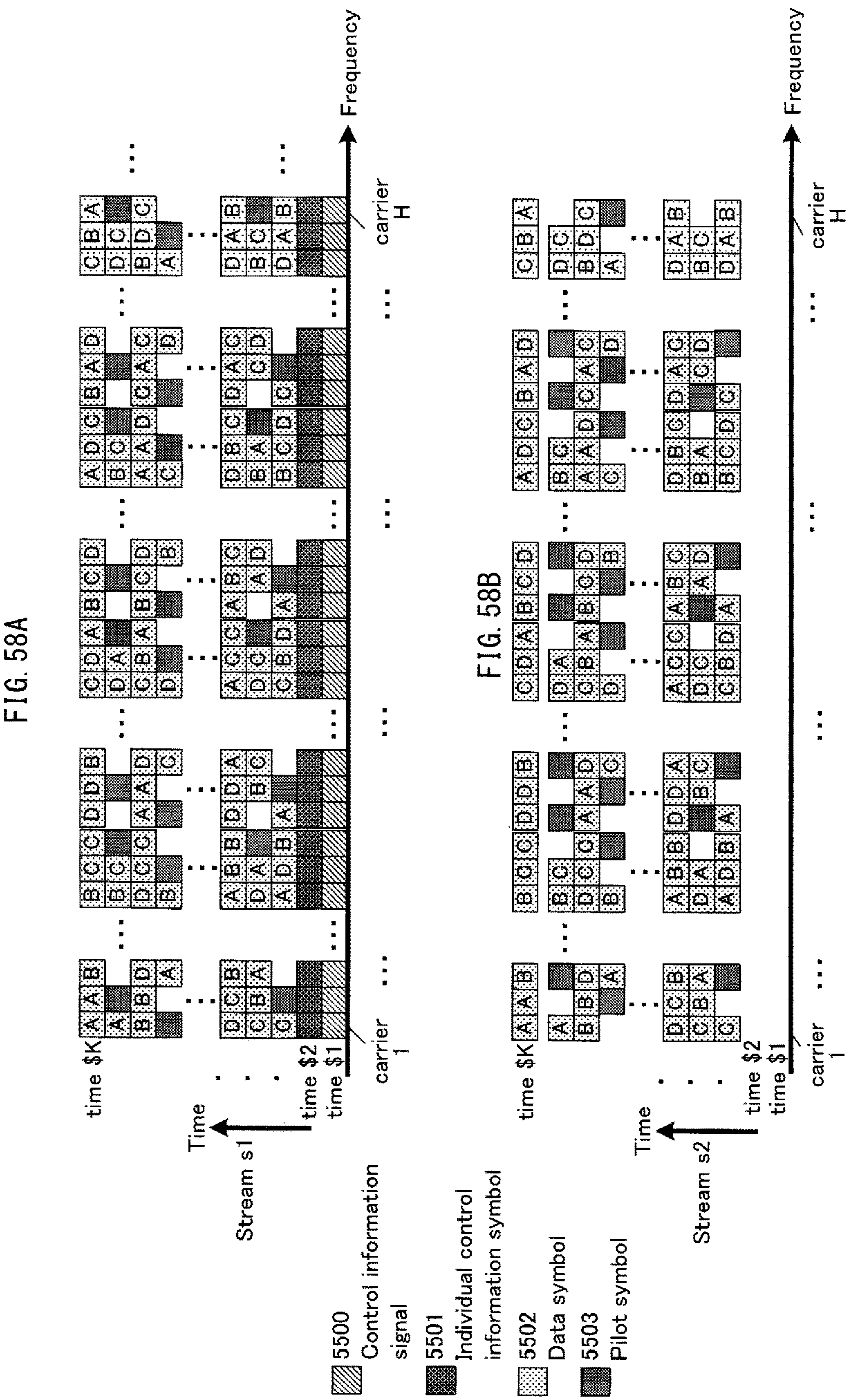
FIGS. 58A and 58B are detailed examples of a frame structure in the time and frequency domains.

FIGS. 58A and 58B show a scheme of allocation into carrier groups that differs from FIGS. 47A, 47B, 48A, 48B, and 51. In FIGS. 47A, 47B, 48A, 48B, 51, 55A, and 55B, carrier groups have described as being formed by groups of subcarriers. In FIGS. 58A and 58B, on the other hand, the carriers in a carrier group are arranged discretely. FIGS. 58A and 58B show an example of frame structure in the time and frequency domains that differs from FIGS. 47A, 47B, 48A, 48B, 51, 55A, and 55B. FIGS. 58A and 58B show the frame structure for carriers 1 through H, times $1 through $K. Elements that are similar to FIGS. 55A and 55B bear the same reference signs. Among the data symbols in FIGS. 58A and 58B, the "A" symbols are symbols in carrier group A, the "B" symbols are symbols in carrier group B, the "C" symbols are symbols in carrier group C, and the "D" symbols are symbols in carrier group D. The carrier groups can thus be similarly implemented by discrete arrangement along (sub)carriers, and the same carrier need not always be used in the time domain. This type of arrangement yields the advantageous effect of obtaining time and frequency diversity gain.

In FIGS. 47A, 47B, 48A, 48B, 51, 58A, and 58B, the control information symbols and the individual control information symbols are allocated to the same time in each carrier group, but these symbols may be allocated to different times. Furthermore, the number of (sub)carriers used by a carrier group may change over time.

Embodiment 16

Like Embodiment 10, the present embodiment describes a scheme for regularly hopping between precoding matrices using a unitary matrix when N is an odd number.

In the scheme of regularly hopping between precoding matrices over a period (cycle) with 2N slots, the precoding matrices prepared for the 2N slots are represented as follows.

Math 294 for $i = 0, 1, 2, \ldots, N-2, N-1$:

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \quad \text{Equation 253}$$

Let α be a fixed value (not depending on i), where α>0.

Math 295 for $i = N, N+1, N+2, \ldots, 2N-2, 2N-1$:

$$F[i] = \frac{1}{\sqrt{\alpha^2+1}}\begin{pmatrix} \alpha \times e^{j\theta_{11}(i)} & e^{j(\theta_{11}(i)+\lambda)} \\ e^{j\theta_{21}(i)} & \alpha \times e^{j(\theta_{21}(i)+\lambda+\pi)} \end{pmatrix} \quad \text{Equation 254}$$

Let α be a fixed value (not depending on i), where α>0. (Let the α in Equation 253 and the α in Equation 254 be the same value.)

From Condition #5 (Math 106) and Condition #6 (Math 107) in Embodiment 3, the following conditions are important in Equation 253 for achieving excellent data reception quality.

Math 296

$$e^{j(\theta_{11}(x)-\theta_{21}(x))} \neq e^{j(\theta_{11}(y)-\theta_{21}(y))} \quad \text{Condition \#46}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 297

$$e^{j(\theta_{11}(x)-\theta_{21}(x)-\delta)} \neq e^{j(\theta_{11}(y)-\theta_{21}(y)-\delta)} \quad \text{Condition \#47}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Addition of the following condition is considered.

Math 298

$$\theta_{11}(x)=\theta_{11}(x+N)$$

for ∀x (x=0, 1, 2, . . . , N−2, N−1)

and $$\theta_{21}(y)=\theta_{21}(y+N) \quad \text{Condition \#48}$$

for ∀y (y is 0, 1, 2, . . . , N−2, N−1)

Next, in order to distribute the poor reception points evenly with regards to phase in the complex plane, as described in Embodiment 6, Condition #49 and Condition #50 are provided.

Math 299

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)} \text{ for } \forall\, x(x = 0, 1, 2, \cdots, N-2) \quad \text{Condition \#49}$$

Math 300

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)} \text{ for } \forall\, x(x = 0, 1, 2, \cdots, N-2) \quad \text{Condition \#50}$$

In other words, Condition #49 means that the difference in phase is 2π/N radians. On the other hand, Condition #50 means that the difference in phase is −2π/N radians.

Figures 60A, 60B:
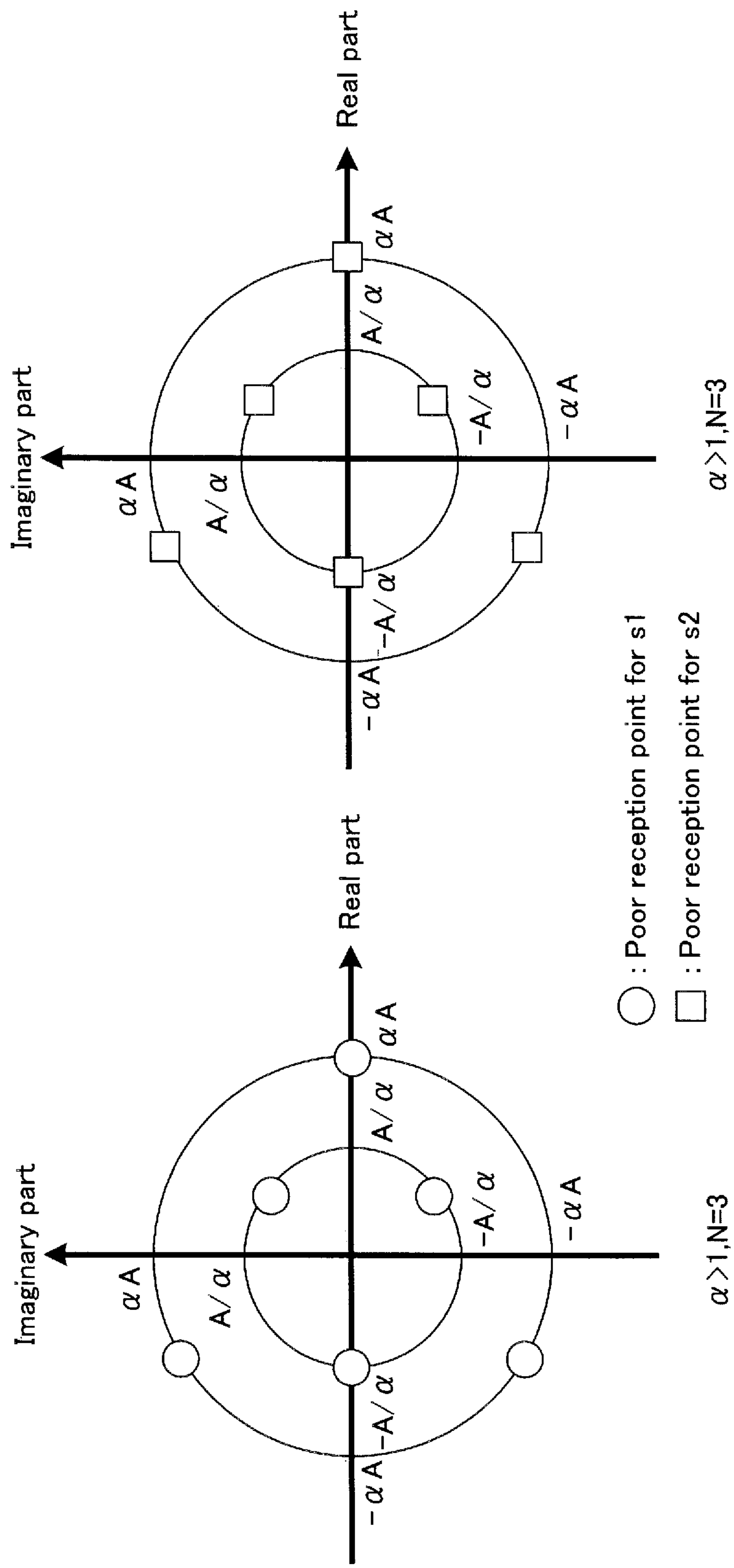
FIGS. 60A and 60B show positions of poor reception points.

Letting $\theta_{11}(0)-\theta_{21}(0)=0$ radians, and letting $\alpha>1$, the distribution of poor reception points for s1 and for s2 in the complex plane for N=3 is shown in FIGS. 60A and 60B. As is clear from FIGS. 60A and 60B, in the complex plane, the minimum distance between poor reception points for s1 is kept large, and similarly, the minimum distance between poor reception points for s2 is also kept large. Similar conditions are created when $\alpha<1$. Furthermore, upon comparison with FIGS. 45A and 45B in Embodiment 10, making the same considerations as in Embodiment 9, the probability of a greater distance between poor reception points in the complex plane increases when N is an odd number as compared to when N is an even number. However, when N is small, for example when N≤16, the minimum distance between poor reception points in the complex plane can be guaranteed to be a certain length, since the number of poor reception points is small. Accordingly, when N≤16, even if N is an even number, cases do exist where data reception quality can be guaranteed.

Therefore, in the scheme for regularly hopping between precoding matrices based on Equations 253 and 254, when N is set to an odd number, the probability of improving data reception quality is high. Precoding matrices F[0]-F[2N−1] are generated based on Equations 253 and 254 (the precoding matrices F[0]-F[2N−1] may be in any order for the 2N slots in the period (cycle)). Symbol number 2Ni may be precoded using F[0], symbol number 2Ni+1 may be precoded using F[1], . . . , and symbol number 2N×i+h may be precoded using F[h], for example (h=0, 1, 2, . . . , 2N−2, 2N−1). (In this case, as described in previous embodiments, precoding matrices need not be hopped between regularly.) Furthermore, when the modulation scheme for both s1 and s2 is 16QAM, if α is set as in Equation 233, the advantageous effect of increasing the minimum distance between 16×16=256 signal points in the I-Q plane for a specific LOS environment may be achieved.

The following conditions are possible as conditions differing from Condition #48:

Math 301

$$e^{j(\theta_{11}(x)-\theta_{21}(x))} \neq e^{j(\theta_{11}(y)-\theta_{21}(y))} \quad \text{Condition \#51}$$

for ∀x, ∀y (x≠y; x,y=N, N+1, N+2, . . . , 2N−2, 2,2N−1) (where x is N, N+1, N+2, . . . , 2N−2, 2N−1; y is N, N+1, N+2, . . . , 2N−2, 2N−1; and x≠y.)

Math 302

$$e^{j(\theta_{11}(x)-\theta_{21}(x)-\pi)} \neq e^{j(\theta_{11}(y)-\theta_{21}(y)-\pi)} \quad \text{Condition \#52}$$

for ∀x, ∀y (x≠y; x,y=N, N+1, N+2, . . . , 2N−2, 2N−1) (where x is N, N+1, N+2, . . . , 2N−2, 2N−1; y is N, N+1, N+2, . . . , 2N−2, 2N−1; and x≠y.)

In this case, by satisfying Condition #46, Condition #47, Condition #51, and Condition #52, the distance in the complex plane between poor reception points for s1 is increased, as is the distance between poor reception points for s2, thereby achieving excellent data reception quality.

In the present embodiment, the scheme of structuring 2N different precoding matrices for a precoding hopping scheme with a 2N-slot time period (cycle) has been described. In this case, as the 2N different precoding matrices, F[0], F[1], F[2], . . . , F[2N−2], F[2N−1] are prepared. In the present embodiment, an example of a single carrier transmission scheme has been described, and therefore the case of arranging symbols in the order F[0], F[1], F[2], . . . , F[2N−2], F[2N−1] in the time domain (or the frequency domain) has been described. The present invention is not, however, limited in this way, and the 2N different precoding matrices F[0], F[1], F[2], . . . , F[2N−2], F[2N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping scheme over an H-slot period (cycle) (H being a natural number larger than the number of slots 2N in the period (cycle) of the above scheme of regularly hopping between precoding matrices), when the 2N different precoding matrices of the present embodiment are included, the probability of excellent reception quality increases.

Embodiment 17

The present embodiment describes a concrete example of the scheme of regularly changing precoding weights, based on Embodiment 8.

FIG. 6 relates to the weighting scheme (precoding scheme) in the present embodiment. The weighting unit 600 integrates the weighting units 308A and 308B in FIG. 3. As shown in FIG. 6, the stream s1(*t*) and the stream s2(*t*) correspond to the baseband signals 307A and 307B in FIG. 3. In other words, the streams s1(*t*) and s2(*t*) are the baseband signal in-phase components I and quadrature components Q when mapped according to a modulation scheme such as QPSK, 16QAM, 64QAM, or the like. As indicated by the frame structure of FIG. 6, in the stream s1(*t*), a signal at symbol number u is represented as s1(*u*), a signal at symbol number u+1 as s1(*u*+1), and so forth. Similarly, in the stream s2(*t*), a signal at symbol number u is represented as s2(*u*), a signal at symbol number u+1 as s2(*u*+1), and so forth. The weighting unit 600 receives the baseband signals 307A (s1(*t*)) and 307B (s2(*t*)) and the information 315 regarding weighting information in FIG. 3 as inputs, performs weighting in accordance with the information 315 regarding weighting, and outputs the signals 309A (z1(*t*)) and 309B (z2(*t*)) after weighting in FIG. 3.

At this point, when for example a precoding matrix hopping scheme with an N=8 period (cycle) as in Example #8 in Embodiment 6 is used, z1(*t*) and z2(*t*) are represented as follows. For symbol number 8i (where i is an integer greater than or equal to zero):

Math 303

$$\begin{pmatrix} z1(8i) \\ z2(8i) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i) \\ s2(8i) \end{pmatrix} \quad \text{Equation 255}$$

Here, j is an imaginary unit, and k=0.

For symbol number 8i+1:

Math 304

$$\begin{pmatrix} z1(8i+1) \\ z2(8i+1) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+1) \\ s2(8i+1) \end{pmatrix} \quad \text{Equation 256}$$

Here, k=1.

For symbol number 8i+2:

Math 305

$$\begin{pmatrix} z1(8i+2) \\ z2(8i+2) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+2) \\ s2(8i+2) \end{pmatrix} \quad \text{Equation 257}$$

Here, k=2.

For symbol number 8i+3:

Math 306

$$\begin{pmatrix} z1(8i+3) \\ z2(8i+3) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+3) \\ s2(8i+3) \end{pmatrix} \quad \text{Equation 258}$$

Here, k=3.

For symbol number 8i+4:

Math 307

$$\begin{pmatrix} z1(8i+4) \\ z2(8i+4) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+4) \\ s2(8i+4) \end{pmatrix} \quad \text{Equation 259}$$

Here, k=4.

For symbol number 8i+5:

Math 308

$$\begin{pmatrix} z1(8i+5) \\ z2(8i+5) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+5) \\ s2(8i+5) \end{pmatrix} \quad \text{Equation 260}$$

Here, k=5.

For symbol number 8i+6:

Math 309

$$\begin{pmatrix} z1(8i+6) \\ z2(8i+6) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+6) \\ s2(8i+6) \end{pmatrix} \quad \text{Equation 261}$$

Here, k=6.

For symbol number 8i+7:

Math 310

$$\begin{pmatrix} z1(8i+7) \\ z2(8i+7) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+7) \\ s2(8i+7) \end{pmatrix} \quad \text{Equation 262}$$

Here, k=7.

The symbol numbers shown here can be considered to indicate time. As described in other embodiments, in Equation 262, for example, z1(8i+7) and z2(8i+7) at time 8i+7 are signals at the same time, and the transmission device transmits z1(8i+7) and z2(8i+7) over the same (shared/common) frequency. In other words, letting the signals at time T be s1(T), s2(T), z1(T), and z2(T), then z1(T) and z2(T) are sought from some sort of precoding matrices and from s1(T) and s2(T), and the transmission device transmits z1(T) and z2(T) over the same (shared/common) frequency (at the same time). Furthermore, in the case of using a multi-carrier transmission scheme such as OFDM or the like, and letting signals corresponding to s1, s2, z1, and z2 for (sub)carrier L and time T be s1(T, L), s2(T, L), z1(T, L), and z2(T, L), then z1(T, L) and z2(T, L) are sought from some sort of precoding matrices and from s1(T, L) and s2(T, L), and the transmission device transmits z1(T, L) and z2(T, L) over the same (shared/common) frequency (at the same time). In this case, the appropriate value of α is given by Equation 198 or Equation 200. Also, different values of a may be set in Equations 255-262. That is to say, when two equations (Equations X and Y) are extracted from Equations 255-262, the value of α given by Equation X may be different from the value of α given by Equation Y.

The present embodiment describes a precoding hopping scheme that increases period (cycle) size, based on the above-described precoding matrices of Equation 190.

Letting the period (cycle) of the precoding hopping scheme be 8M, 8M different precoding matrices are represented as follows.

Math 311

$$F[8 \times k + i] = \frac{1}{\sqrt{\alpha^2+1}} \begin{pmatrix} e^{j0} & \alpha \times e^{j0} \\ \alpha \times e^{j\left(\frac{i\pi}{4}+\frac{k\pi}{4M}\right)} & e^{j\left(\frac{i\pi}{4}+\frac{5\pi}{4M}+\frac{7\pi}{8}\right)} \end{pmatrix} \quad \text{Equation 263}$$

In this case, i=0, 1, 2, 3, 4, 5, 6, 7, and k=0, 1, . . . , M−2, M−1.

For example, letting M=2 and α<1, the poor reception points for s1(○) and for s2 (□) at k=0 are represented as in FIG. 42A. Similarly, the poor reception points for s1(○) and for s2 (□) at k=1 are represented as in FIG. 42B. In this way, based on the precoding matrices in Equation 190, the poor reception points are as in FIG. 42A, and by using, as the precoding matrices, the matrices yielded by multiplying each term in the second line on the right-hand side of Equation 190 by $e^{jX}$ (see Equation 226), the poor reception points are rotated with respect to FIG. 42A (see FIG. 42B). (Note that the poor reception points in FIG. 42A and FIG. 42B do not overlap. Even when multiplying by $e^{jX}$, the poor reception points should not overlap, as in this case. Furthermore, the matrices yielded by multiplying each term in the first line on the right-hand side of Equation 190, rather than in the second line on the right-hand side of Equation 190, by $e^{jX}$ may be used as the precoding matrices.) In this case, the precoding matrices F[0]-F[15] are represented as follows.

Math 312

$$F[8\times k+i]=\frac{1}{\sqrt{\alpha^2+1}}\begin{pmatrix} e^{j0} & \alpha\times e^{j0} \\ \alpha\times e^{j\left(\frac{i\pi}{4}+X_k\right)} & e^{j\left(\frac{i\pi}{4}+X_k+\frac{7\pi}{8}\right)} \end{pmatrix} \quad \text{Equation 264}$$

Here, i=0, 1, 2, 3, 4, 5, 6, 7, and k=0, 1.

In this case, when M=2, precoding matrices F[0]-F[15] are generated (the precoding matrices F[0]-F[15] may be in any order. Also, matrices F[0]-F[15] may be different matrices). Symbol number 16i may be precoded using F[0], symbol number 16+1 may be precoded using F[1], . . . , and symbol number 16i+h may be precoded using F[h], for example (h=0, 1, 2, . . . , 14, 15). (In this case, as described in previous embodiments, precoding matrices need not be hopped between regularly.) Summarizing the above considerations, with reference to Equations 82-85, N-period (cycle) precoding matrices are represented by the following equation.

Math 313

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\delta)} \end{pmatrix} \quad \text{Equation 265}$$

Here, since the period (cycle) has N slots, i=0, 1, 2, . . . , N−2, N−1. Furthermore, the N×M period (cycle) precoding matrices based on Equation 265 are represented by the following equation.

Math 314

$$F[N\times k+i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j(\theta_{21}(i)+X_k)} & e^{j(\theta_{21}(i)+X_k+\lambda+\delta)} \end{pmatrix} \quad \text{Equation 266}$$

In this case, i=0, 1, 2, . . . , N−2, N−1, and k=0, 1, . . . , M−2, M−1.

In this case, precoding matrices F[0]-F[N×M−1] are generated. (Precoding matrices F[0]-F[N×M−1] may be in any order for the N×M slots in the period (cycle)). Symbol number N×M×i may be precoded using F[0], symbol number N×M×i+1 may be precoded using F[1], . . . , and symbol number N×M×i+h may be precoded using F[h], for example (h=0, 1, 2, . . . , N×M−2, N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality. Note that while the N×M period (cycle) precoding matrices have been set to Equation 266, the N×M period (cycle) precoding matrices may be set to the following equation, as described above.

Math 315

$$F[N\times k+i]=\frac{1}{\sqrt{\alpha^2+1}}\begin{pmatrix} e^{j(\theta_{11}(i)+X_k)} & \alpha\times e^{j(\theta_{11}(i)+X_k+\lambda)} \\ \alpha\times e^{j\theta_{21}(i)} & e^{j(\theta_{21}(i)+\lambda+\delta)} \end{pmatrix} \quad \text{Equation 267}$$

In this case, i=0, 1, 2, . . . , N−2, N−1, and k=0, 1, . . . , M−2, M−1.

In Equations 265 and 266, when 0 radians ≤δ<2π radians, the matrices are a unitary matrix when δ=π radians and are a non-unitary matrix when δ≠π radians. In the present scheme, use of a non-unitary matrix for π/2 radians ≤|δ|<π radians is one characteristic structure (the conditions for δ being similar to other embodiments), and excellent data reception quality is obtained. However, not limited to this, a unitary matrix may be used instead.

In the present embodiment, as one example of the case where λ is treated as a fixed value, a case where λ=0 radians is described. However, in view of the mapping according to the modulation scheme, λ may be set to a fixed value defined as λ=π/2 radians, λ=π radians, or λ=(3π)/2 radians. (For example, λ may be set to a fixed value defined as λ=π radians in the precoding matrices of the precoding scheme in which hopping between precoding matrices is performed regularly.) With this structure, as is the case where λ is set to a value defined as λ=0 radians, a reduction in circuit size is achieved.

Embodiment 18

The present embodiment describes a scheme for regularly hopping between precoding matrices using a unitary matrix based on Embodiment 9.

As described in Embodiment 8, in the scheme of regularly hopping between precoding matrices over a period (cycle) with N slots, the precoding matrices prepared for the N slots with reference to Equations 82-85 are represented as follows.

Math 316

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\delta)} \end{pmatrix} \quad \text{Equation 268}$$

In this case, i=0, 1, 2, . . . , N−2, N−1. (α>0.) Since a unitary matrix is used in the present embodiment, the precoding matrices in Equation 268 may be represented as follows.

Math 317

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix} \quad \text{Equation 269}$$

In this case, i=0, 1, 2, . . . , N−2, N−1. (α>0.) From Condition #5 (Math 106) and Condition #6 (Math 107) in Embodiment 3, the following condition is important for achieving excellent data reception quality.

Math 318

$$e^{j(\theta_{11}(x)-\theta_{21}(x))}\neq e^{j(\theta_{11}(y)-\theta_{21}(y))} \quad \text{Condition \#53}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

Math 319

$$e^{j(\theta_{11}(x)-\theta_{21}(x)-\delta)} \neq e^{j(\theta_{11}(y)-\theta_{21}(y)-\delta)} \quad \text{Condition \#54}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

Embodiment 6 has described the distance between poor reception points. In order to increase the distance between poor reception points, it is important for the number of slots N to be an odd number three or greater. The following explains this point.

In order to distribute the poor reception points evenly with regards to phase in the complex plane, as described in Embodiment 6, Condition #55 and Condition #56 are provided.

Math 320

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)} \text{ for } \forall\, x(x = 0, 1, 2, \cdots, N-2) \quad \text{Condition \#55}$$

Math 321

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)} \text{ for } \forall\, x(x = 0, 1, 2, \cdots, N-2) \quad \text{Condition \#56}$$

Letting $\theta_{11}(0)$-$\theta_{21}(0)$=0 radians, and letting α<1, the distribution of poor reception points for s1 and for s2 in the complex plane for an N=3 period (cycle) is shown in FIG. 43A, and the distribution of poor reception points for s1 and for s2 in the complex plane for an N=4 period (cycle) is shown in FIG. 43B. Letting $\theta_{11}(0)-\theta_{21}(0)$=0 radians, and letting α>1, the distribution of poor reception points for s1 and for s2 in the complex plane for an N=3 period (cycle) is shown in FIG. 44A, and the distribution of poor reception points for s1 and for s2 in the complex plane for an N=4 period (cycle) is shown in FIG. 44B.

In this case, when considering the phase between a line segment from the origin to a poor reception point and a half line along the real axis defined by real ≥0 (see FIG. 43A), then for either α>1 for α<1, when N=4, the case always occurs wherein the phase for the poor reception points for s1 and the phase for the poor reception points for s2 are the same value. (See 4301, 4302 in FIG. 43B, and 4401, 4402 in FIG. 44B.) In this case, in the complex plane, the distance between poor reception points becomes small. On the other hand, when N=3, the phase for the poor reception points for s1 and the phase for the poor reception points for s2 are never the same value.

Based on the above, considering how the case always occurs wherein the phase for the poor reception points for s1 and the phase for the poor reception points for s2 are the same value when the number of slots N in the period (cycle) is an even number, setting the number of slots N in the period (cycle) to an odd number increases the probability of a greater distance between poor reception points in the complex plane as compared to when the number of slots N in the period (cycle) is an even number. However, when the number of slots N in the period (cycle) is small, for example when N≤16, the minimum distance between poor reception points in the complex plane can be guaranteed to be a certain length, since the number of poor reception points is small. Accordingly, when N≤16, even if N is an even number, cases do exist where data reception quality can be guaranteed.

Therefore, in the scheme for regularly hopping between precoding matrices based on Equation 269, when the number of slots N in the period (cycle) is set to an odd number, the probability of improving data reception quality is high. Precoding matrices F[0]-F[N−1] are generated based on Equation 269 (the precoding matrices F[0]-F[N−1] may be in any order for the N slots in the period (cycle)). Symbol number Ni may be precoded using F[0], symbol number Ni+1 may be precoded using F[1], . . . , and symbol number N×i+h may be precoded using F[h], for example (h=0, 1, 2, . . . , N−2, N−1). (In this case, as described in previous embodiments, precoding matrices need not be hopped between regularly.) Furthermore, when the modulation scheme for both s1 and s2 is 16QAM, if α is set as follows, Math 322

$$\alpha = \frac{\sqrt{2}+4}{\sqrt{2}+2} \quad \text{Equation 270}$$

the advantageous effect of increasing the minimum distance between 16×16=256 signal points in the I-Q plane for a specific LOS environment may be achieved.

Figure 94:
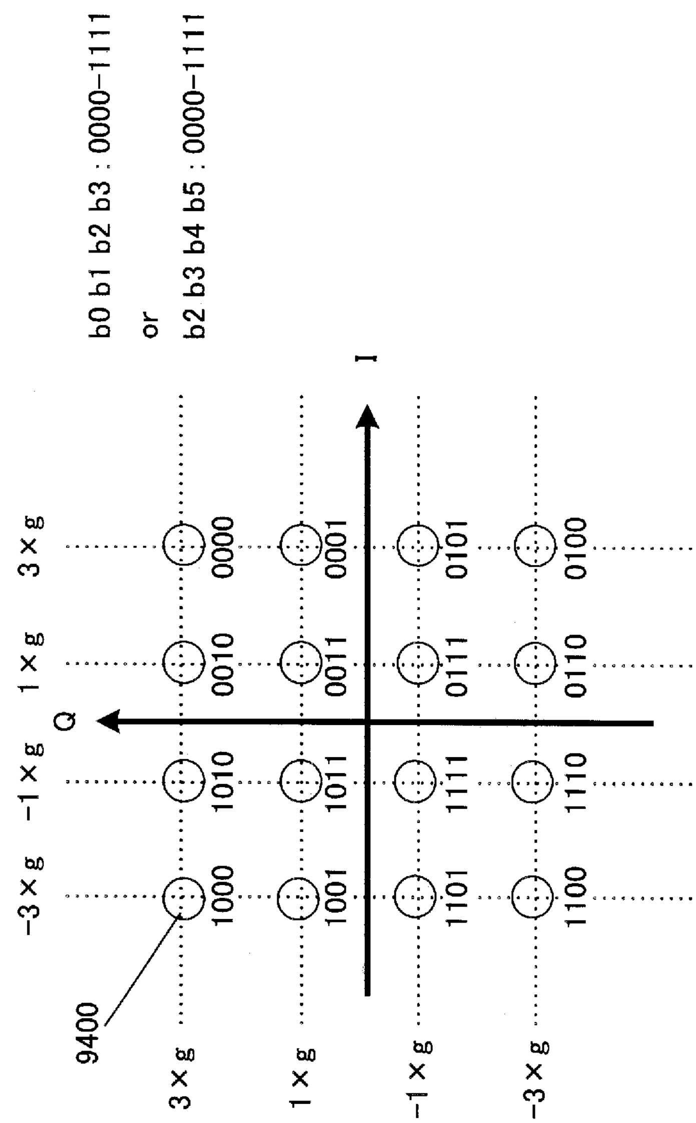
FIG. 94 is an example of signal point layout for 16QAM.

FIG. 94 shows signal point layout in the I-Q plane for 16QAM. In FIG. 94, signal point 9400 is a signal point when bits to be transmitted (input bits) b0-b3 represent a value "(b0, b1, b2, b3)=(1, 0, 0, 0)" (as shown in FIG. 94), and its coordinates in the I-Q plane are (−3×g, 3×g). With regard to the signal points other than signal point 9400, the bits to be transmitted and the coordinates in the I-Q plane can be identified from FIG. 94.

Figure 95:
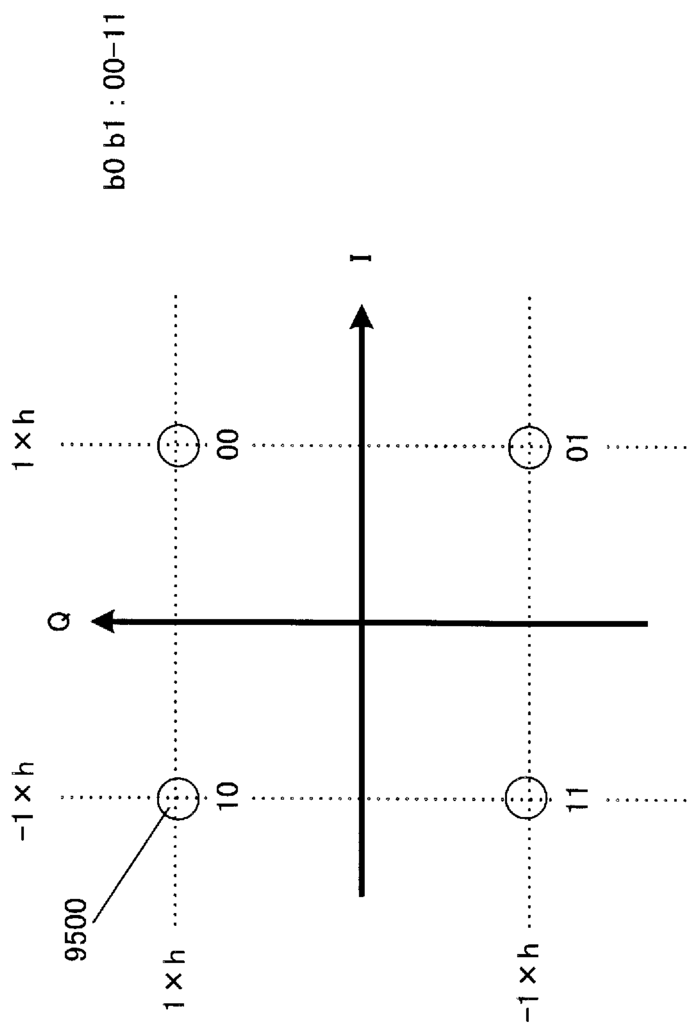
FIG. 95 is an example of signal point layout for QPSK.

FIG. 95 shows signal point layout in the I-Q plane for QPSK. In FIG. 95, signal point 9500 is a signal point when bits to be transmitted (input bits) b0 and b1 represent a value "(b0, b1)=(1, 0)" (as shown in FIG. 95), and its coordinates in the I-Q plane are (−1×g, 1×g). With regard to the signal points other than signal point 9500, the bits to be transmitted and the coordinates in the I-Q plane can be identified from FIG. 95.

Also, when the modulation scheme for s1 is QPSK modulation and the modulation scheme for s2 is 16QAM, if α is set as follows, Math 323

$$\alpha = \frac{\sqrt{2}+3+\sqrt{5}}{\sqrt{2}+3-\sqrt{5}} \quad \text{Equation 271}$$

the advantageous effect of increasing the minimum distance between candidate signal points in the I-Q plane for a specific LOS environment may be achieved.

Note that a signal point layout in the I-Q plane for 16QAM is shown in FIG. 94, and a signal point layout in the I-Q plane for QPSK is shown in FIG. 95. Here, if g in FIG. 94 is set as follows, Math 324

$$g = \frac{z}{\sqrt{10}} \quad \text{Equation 272}$$

h in FIG. 94 is obtained as follows.

Math 325

$$h = \frac{z}{\sqrt{2}} \quad \text{Equation 273}$$

As an example of the precoding matrices prepared for the N slots based on Equation 269, the following matrices are considered:

Math 326

$$F[i=0] = \frac{1}{\sqrt{\alpha^2+1}}\begin{pmatrix} e^{j0} & \alpha\times e^{j0} \\ \alpha\times e^{j0} & e^{j\pi} \end{pmatrix} \quad \text{Equation 274}$$

Math 327

$$F[i=1] = \frac{1}{\sqrt{\alpha^2+1}}\begin{pmatrix} e^{j0} & \alpha\times e^{j0} \\ \alpha\times e^{j\frac{2}{5}\pi} & e^{j\left(\frac{2}{5}\pi+\pi\right)} \end{pmatrix} \quad \text{Equation 275}$$

Math 328

$$F[i=2] = \frac{1}{\sqrt{\alpha^2+1}}\begin{pmatrix} e^{j0} & \alpha\times e^{j0} \\ \alpha\times e^{j\frac{4}{5}\pi} & e^{j\left(\frac{4}{5}\pi+\pi\right)} \end{pmatrix} \quad \text{Equation 276}$$

Math 329

$$F[i=3] = \frac{1}{\sqrt{\alpha^2+1}}\begin{pmatrix} e^{j0} & \alpha\times e^{j0} \\ \alpha\times e^{j\frac{6}{5}\pi} & e^{j\left(\frac{6}{5}\pi+\pi\right)} \end{pmatrix} \quad \text{Equation 277}$$

Math 330

$$F[i=4] = \frac{1}{\sqrt{\alpha^2+1}}\begin{pmatrix} e^{j0} & \alpha\times e^{j0} \\ \alpha\times e^{j\frac{8}{5}\pi} & e^{j\left(\frac{8}{5}\pi+\pi\right)} \end{pmatrix} \quad \text{Equation 278}$$

Note that, in order to restrict the calculation scale of the above precoding in the transmission device, $\theta_{11}(i)=0$ radians and $\lambda=0$ radians may be set in Equation 269. In this case, however, in Equation 269, λ may vary depending on i, or may be the same value. That is to say, in Equation 269, λ in F[i=x] and λF[i=y] (x≠y) may be the same value or may be different values.

As the value to which a is set, the above-described set value is one of effective values. However, not limited to this, a may be set, for example, for each value of i in the precoding matrix F[i] as described in Embodiment 17. (That is to say, in F[i], a is not necessarily be always set to a constant value for i).

In the present embodiment, the scheme of structuring N different precoding matrices for a precoding hopping scheme with an N-slot time period (cycle) has been described. In this case, as the N different precoding matrices, F[0], F[1], F[2], . . . , F[N−2], F[N−1] are prepared. In the single carrier transmission scheme, symbols are arranged in the order F[0], F[1], F[2], . . . , F[N−2], F[N−1] in the time domain (or the frequency domain in the case of the multi-carrier transmission scheme). The present invention is not, however, limited in this way, and the N different precoding matrices F[0], F[1], F[2], . . . , F[N−2], F[N−1] generated in the present embodiment may be adapted to a multi-carrier transmission scheme such as an OFDM transmission scheme or the like. As in Embodiment 1, as a scheme of adaptation in this case, precoding weights may be changed by arranging symbols in the frequency domain and in the frequency-time domain. Note that a precoding hopping scheme with an N-slot time period (cycle) has been described, but the same advantageous effects may be obtained by randomly using N different precoding matrices. In other words, the N different precoding matrices do not necessarily need to be used in a regular period (cycle).

Furthermore, in the precoding matrix hopping scheme over an H-slot period (cycle) (H being a natural number larger than the number of slots N in the period (cycle) of the above scheme of regularly hopping between precoding matrices), when the N different precoding matrices of the present embodiment are included, the probability of excellent reception quality increases. In this case, Condition #55 and Condition #56 can be replaced by the following conditions. (The number of slots in the period (cycle) is considered to be N.)

Math 331

$$e^{j(\theta_{11}(x)-\theta_{21}(x))} \neq e^{j(\theta_{11}(y)-\theta_{21}(y))} \quad \text{Condition \#55'}$$

for ∃x, ∃y (x≠y; x,y=0, 1, 2, . . . , N−2, N−1)

Math 332

$$e^{j(\theta_{11}(x)-\theta_{21}(x)-\delta)} \neq e^{j(\theta_{11}(y)-\theta_{21}(y)-\delta)} \quad \text{Condition \#56'}$$

for ∃x, ∃y (x≠y; x,y=0, 1, 2, . . . , N−2, N−1)
(x is 0, 1, 2, . . . , N−2, N−1; y is 0, 1, 2, . . . , N−2, N−1; and x≠y.)

In the present embodiment, as one example of the case where λ is treated as a fixed value, a case where λ=0 radians is described. However, in view of the mapping according to the modulation scheme, λ may be set to a fixed value defined as λ=π/2 radians, λ=π radians, or λ=(3π)/2 radians. (For example, λ may be set to a fixed value defined as λ=π radians in the precoding matrices of the precoding scheme in which hopping between precoding matrices is performed regularly.) With this structure, as is the case where λ is set to a value defined as λ=0 radians, a reduction in circuit size is achieved.

Embodiment 19

The present embodiment describes a scheme for regularly hopping between precoding matrices using a unitary matrix based on Embodiment 10.

In the scheme of regularly hopping between precoding matrices over a period (cycle) with 2N slots, the precoding matrices prepared for the 2N slots are represented as follows.

Math 333

When $i = 0, 1, 2, \ldots, N-2, N-1$:

$$F[i] = \frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix} \quad \text{Equation 279}$$

α>0, and α is a fixed value (regardless of i).

Math 334

When $i = N, N+1, N+2, \ldots, 2N-2, 2N-1$:

-continued $$F[i]=\frac{1}{\sqrt{\alpha^2+1}}\begin{pmatrix}\alpha\times e^{j\theta_{11}(i)} & e^{j(\theta_{11}(i)+\lambda)}\\ e^{j\theta_{21}(i)} & \alpha\times e^{j(\theta_{21}(i)+\lambda+\pi)}\end{pmatrix}\quad\text{Equation 280}$$

$\alpha>0$, and $\alpha$ is a fixed value (regardless of i).
(The value of $\alpha$ in Equation 279 is the same as the value of $\alpha$ in Equation 280.)
(The value of $\alpha$ may be set as $\alpha<0$.)

From Condition #5 (Math 106) and Condition #6 (Math 107) in Embodiment 3, the following condition is important for achieving excellent data reception quality.

Math 335

$$e^{j(\theta_{11}(x)-\theta_{21}(x))}\neq e^{j(\theta_{11}(y)-\theta_{21}(y))}\quad\text{Condition #57}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

Math 336

$$e^{j(\theta_{11}(x)-\theta_{21}(x)-\delta)}\neq e^{j(\theta_{11}(y)-\theta_{21}(y)-\delta)}\quad\text{Condition #58}$$

for ∀x, ∀y (x≠y; x,y=0, 1, 2, . . . , N−2, N−1)
(x is 0, 1, 2, . . . , N−2, N−1; y is 0, 1, 2 . . . , N−2, N−1; and x≠y.)

Addition of the following condition is considered.

Math 337

$$\theta_{11}(x)=\theta_{11}(x+N)\quad\text{Condition #59}$$

for ∀x (x=0, 1, 2, . . . , N−2, N−1)
and $$\theta_{21}(y)=\theta_{21}(y+N)\quad\text{Condition #59}$$

for ∀y (y=0, 1, 2, . . . , N−2, N−1)

Next, in order to distribute the poor reception points evenly with regards to phase in the complex plane, as described in Embodiment 6, Condition #60 and Condition #61 are provided.

Math 338

$$\frac{e^{j(\theta_{11}(x+1)-\theta_{21}(x+1))}}{e^{j(\theta_{11}(x)-\theta_{21}(x))}}=e^{j\left(\frac{2\pi}{N}\right)}\text{ for }\forall x(x=0,1,2,\cdots,N-2)\quad\text{Condition #60}$$

Math 339

$$\frac{e^{j(\theta_{11}(x+1)-\theta_{21}(x+1))}}{e^{j(\theta_{11}(x)-\theta_{21}(x))}}=e^{j\left(-\frac{2\pi}{N}\right)}\text{ for }\forall x(x=0,1,2,\cdots,N-2)\quad\text{Condition #61}$$

Letting $\theta_{11}(0)-\theta_{21}(0)=0$ radians, and letting $\alpha>1$, the distribution of poor reception points for s1 and for s2 in the complex plane for N=4 is shown in FIGS. 43A and 43B. As is clear from FIGS. 43A and 43B, in the complex plane, the minimum distance between poor reception points for s1 is kept large, and similarly, the minimum distance between poor reception points for s2 is also kept large. Similar conditions are created when $\alpha<1$. Furthermore, making the same considerations as in Embodiment 9, the probability of a greater distance between poor reception points in the complex plane increases when N is an odd number as compared to when N is an even number. However, when N is small, for example when N≤16, the minimum distance between poor reception points in the complex plane can be guaranteed to be a certain length, since the number of poor reception points is small. Accordingly, when N≤16, even if N is an even number, cases do exist where data reception quality can be guaranteed.

Therefore, in the scheme for regularly hopping between precoding matrices based on Equations 279 and 280, when N is set to an odd number, the probability of improving data reception quality is high. Note that precoding matrices F[0]-F[2N−1] have been generated based on Equations 279 and 280. (The precoding matrices F[0]-F[2N−1] may be in any order for the 2N slots in the period (cycle)). Symbol number 2Ni may be precoded using F[0], symbol number 2Ni+1 may be precoded using F[1], . . . , and symbol number 2N×i+h may be precoded using F[h], for example (h=0, 1, 2, . . . , 2N−2, 2N−1). (In this case, as described in previous embodiments, precoding matrices need not be hopped between regularly.) Furthermore, when the modulation scheme for both s1 and s2 is 16QAM, if $\alpha$ is set as in Equation 270, the advantageous effect of increasing the minimum distance between 16×16=256 signal points in the I-Q plane for a specific LOS environment may be achieved.

Also, when the modulation scheme for s1 is QPSK modulation and the modulation scheme for s2 is 16QAM, if $\alpha$ is set as in Equation 271, the advantageous effect of increasing the minimum distance between candidate signal points in the I-Q plane for a specific LOS environment may be achieved. Note that a signal point layout in the I-Q plane for 16QAM is shown in FIG. 60, and $\alpha$ signal point layout in the I-Q plane for QPSK is shown in FIG. 94. Here, if "g" in FIG. 60 is set as in Equation 272, follows, "h" in FIG. 94 is obtained as in Equation 273.

The following conditions are possible as conditions differing from Condition #59:

Math 340

$$e^{j(\theta_{11}(x)-\theta_{21}(x))}\neq e^{j(\theta_{11}(y)-\theta_{21}(y))}\quad\text{Condition #62}$$

for ∀x, ∀y (x≠y; x,y=N, N+1, N+2, . . . , 2N−2, 2N−1)
(x is N, N+1, N+2, . . . , 2N−2, 2N−1; y is N, N+1, N+2, . . . , 2N−2, 2N−1; and x≠y.)

Math 341

$$e^{j(\theta_{11}(x)-\theta_{21}(x)-\delta)}\neq e^{j(\theta_{11}(y)-\theta_{21}(y)-\delta)}\quad\text{Condition #63}$$

for ∀x, ∀y (x≠y; x,y=N, N+1, N+2, . . . , 2N−2, 2N−1)
(x is N, N+1, N+2, . . . , 2N−2, 2N−1; y is N, N+1, N+2, . . . , 2N−2, 2N−1; and x≠y.)

In this case, by satisfying Condition #57 and Condition #58 and Condition #62 and Condition #63, the distance in the complex plane between poor reception points for s1 is increased, as is the distance between poor reception points for s2, thereby achieving excellent data reception quality.

As an example of the precoding matrices prepared for the 2N slots based on Equations 279 and 280, the following matrices are considered when N=15:

Math 342

$$F[i=0]=\frac{1}{\sqrt{\alpha^2+1}}\begin{pmatrix}e^{j0} & \alpha\times e^{j0}\\ \alpha\times e^{j0} & e^{j\pi}\end{pmatrix}\quad\text{Equation 281}$$

Math 343

$$F[i=1]=\frac{1}{\sqrt{\alpha^2+1}}\begin{pmatrix}e^{j0} & \alpha\times e^{j0}\\ \alpha\times e^{j\frac{2}{15}\pi} & e^{j\left(\frac{2}{15}\pi+\pi\right)}\end{pmatrix}\quad\text{Equation 282}$$

-continued

Math 344

$$F[i=2]=\frac{1}{\sqrt{\alpha^2+1}}\begin{pmatrix} e^{j0} & \alpha\times e^{j0} \\ \alpha\times e^{j\frac{4}{15}\pi} & e^{j\left(\frac{4}{15}\pi+\pi\right)} \end{pmatrix}$$ Equation 283

Math 345

$$F[i=3]=\frac{1}{\sqrt{\alpha^2+1}}\begin{pmatrix} e^{j0} & \alpha\times e^{j0} \\ \alpha\times e^{j\frac{6}{15}\pi} & e^{j\left(\frac{6}{15}\pi+\pi\right)} \end{pmatrix}$$ Equation 284

Math 346

$$F[i=4]=\frac{1}{\sqrt{\alpha^2+1}}\begin{pmatrix} e^{j0} & \alpha\times e^{j0} \\ \alpha\times e^{j\frac{8}{15}\pi} & e^{j\left(\frac{8}{15}\pi+\pi\right)} \end{pmatrix}$$ Equation 285

Math 347

$$F[i=5]=\frac{1}{\sqrt{\alpha^2+1}}\begin{pmatrix} e^{j0} & \alpha\times e^{j0} \\ \alpha\times e^{j\frac{10}{15}\pi} & e^{j\left(\frac{10}{15}\pi+\pi\right)} \end{pmatrix}$$ Equation 286

Math 348

$$F[i=6]=\frac{1}{\sqrt{\alpha^2+1}}\begin{pmatrix} e^{j0} & \alpha\times e^{j0} \\ \alpha\times e^{j\frac{12}{15}\pi} & e^{j\left(\frac{12}{15}\pi+\pi\right)} \end{pmatrix}$$ Equation 287

Math 349

$$F[i=7]=\frac{1}{\sqrt{\alpha^2+1}}\begin{pmatrix} e^{j0} & \alpha\times e^{j0} \\ \alpha\times e^{j\frac{14}{15}\pi} & e^{j\left(\frac{14}{15}\pi+\pi\right)} \end{pmatrix}$$ Equation 288

Math 350

$$F[i=8]=\frac{1}{\sqrt{\alpha^2+1}}\begin{pmatrix} e^{j0} & \alpha\times e^{j0} \\ \alpha\times e^{j\frac{16}{15}\pi} & e^{j\left(\frac{16}{15}\pi+\pi\right)} \end{pmatrix}$$ Equation 289

Math 351

$$F[i=9]=\frac{1}{\sqrt{\alpha^2+1}}\begin{pmatrix} e^{j0} & \alpha\times e^{j0} \\ \alpha\times e^{j\frac{18}{15}\pi} & e^{j\left(\frac{18}{15}\pi+\pi\right)} \end{pmatrix}$$ Equation 290

Math 352

$$F[i=10]=\frac{1}{\sqrt{\alpha^2+1}}\begin{pmatrix} e^{j0} & \alpha\times e^{j0} \\ \alpha\times e^{j\frac{20}{15}\pi} & e^{j\left(\frac{20}{15}\pi+\pi\right)} \end{pmatrix}$$ Equation 291

Math 353

$$F[i=11]=\frac{1}{\sqrt{\alpha^2+1}}\begin{pmatrix} e^{j0} & \alpha\times e^{j0} \\ \alpha\times e^{j\frac{22}{15}\pi} & e^{j\left(\frac{22}{15}\pi+\pi\right)} \end{pmatrix}$$ Equation 292

Math 354

$$F[i=12]=\frac{1}{\sqrt{\alpha^2+1}}\begin{pmatrix} e^{j0} & \alpha\times e^{j0} \\ \alpha\times e^{j\frac{24}{15}\pi} & e^{j\left(\frac{24}{15}\pi+\pi\right)} \end{pmatrix}$$ Equation 293

Math 355

$$F[i=13]=\frac{1}{\sqrt{\alpha^2+1}}\begin{pmatrix} e^{j0} & \alpha\times e^{j0} \\ \alpha\times e^{j\frac{26}{15}\pi} & e^{j\left(\frac{26}{15}\pi+\pi\right)} \end{pmatrix}$$ Equation 294

-continued

Math 356

$$F[i=14]=\frac{1}{\sqrt{\alpha^2+1}}\begin{pmatrix} e^{j0} & \alpha\times e^{j0} \\ \alpha\times e^{j\frac{28}{15}\pi} & e^{j\left(\frac{28}{15}\pi+\pi\right)} \end{pmatrix}$$ Equation 295

Math 357

$$F[i=15]=\frac{1}{\sqrt{\alpha^2+1}}\begin{pmatrix} \alpha\times e^{j0} & e^{j\pi} \\ e^{j0} & \alpha\times e^{j0} \end{pmatrix}$$ Equation 296

Math 358

$$F[i=16]=\frac{1}{\sqrt{\alpha^2+1}}\begin{pmatrix} \alpha\times e^{j\frac{2}{15}\pi} & e^{j\left(\frac{2}{15}\pi+\pi\right)} \\ e^{j0} & \alpha\times e^{j0} \end{pmatrix}$$ Equation 297

Math 359

$$F[i=17]=\frac{1}{\sqrt{\alpha^2+1}}\begin{pmatrix} \alpha\times e^{j\frac{4}{15}\pi} & e^{j\left(\frac{4}{15}\pi+\pi\right)} \\ e^{j0} & \alpha\times e^{j0} \end{pmatrix}$$ Equation 298

Math 360

$$F[i=18]=\frac{1}{\sqrt{\alpha^2+1}}\begin{pmatrix} \alpha\times e^{j\frac{6}{15}\pi} & e^{j\left(\frac{6}{15}\pi+\pi\right)} \\ e^{j0} & \alpha\times e^{j0} \end{pmatrix}$$ Equation 299

Math 361

$$F[i=19]=\frac{1}{\sqrt{\alpha^2+1}}\begin{pmatrix} \alpha\times e^{j\frac{8}{15}\pi} & e^{j\left(\frac{8}{15}\pi+\pi\right)} \\ e^{j0} & \alpha\times e^{j0} \end{pmatrix}$$ Equation 300

Math 362

$$F[i=20]=\frac{1}{\sqrt{\alpha^2+1}}\begin{pmatrix} \alpha\times e^{j\frac{10}{15}\pi} & e^{j\left(\frac{10}{15}\pi+\pi\right)} \\ e^{j0} & \alpha\times e^{j0} \end{pmatrix}$$ Equation 301

Math 363

$$F[i=21]=\frac{1}{\sqrt{\alpha^2+1}}\begin{pmatrix} \alpha\times e^{j\frac{12}{15}\pi} & e^{j\left(\frac{12}{15}\pi+\pi\right)} \\ e^{j0} & \alpha\times e^{j0} \end{pmatrix}$$ Equation 302

Math 364

$$F[i=22]=\frac{1}{\sqrt{\alpha^2+1}}\begin{pmatrix} \alpha\times e^{j\frac{14}{15}\pi} & e^{j\left(\frac{14}{15}\pi+\pi\right)} \\ e^{j0} & \alpha\times e^{j0} \end{pmatrix}$$ Equation 303

Math 365

$$F[i=23]=\frac{1}{\sqrt{\alpha^2+1}}\begin{pmatrix} \alpha\times e^{j\frac{16}{15}\pi} & e^{j\left(\frac{16}{15}\pi+\pi\right)} \\ e^{j0} & \alpha\times e^{j0} \end{pmatrix}$$ Equation 304

Math 366

$$F[i=24]=\frac{1}{\sqrt{\alpha^2+1}}\begin{pmatrix} \alpha\times e^{j\frac{18}{15}\pi} & e^{j\left(\frac{18}{15}\pi+\pi\right)} \\ e^{j0} & \alpha\times e^{j0} \end{pmatrix}$$ Equation 305

Math 367

$$F[i=25]=\frac{1}{\sqrt{\alpha^2+1}}\begin{pmatrix} \alpha\times e^{j\frac{20}{15}\pi} & e^{j\left(\frac{20}{15}\pi+\pi\right)} \\ e^{j0} & \alpha\times e^{j0} \end{pmatrix}$$ Equation 306

Math 368

$$F[i=26]=\frac{1}{\sqrt{\alpha^2+1}}\begin{pmatrix} \alpha\times e^{j\frac{22}{15}\pi} & e^{j\left(\frac{22}{15}\pi+\pi\right)} \\ e^{j0} & \alpha\times e^{j0} \end{pmatrix}$$ Equation 307

-continued

Math 369

$$F[i=27]=\frac{1}{\sqrt{\alpha^2+1}}\begin{pmatrix}\alpha\times e^{j\frac{24}{15}\pi} & e^{j\left(\frac{24}{15}\pi+\pi\right)}\\ e^{j0} & \alpha\times e^{j0}\end{pmatrix}\quad\text{Equation 308}$$

Math 370

$$F[i=28]=\frac{1}{\sqrt{\alpha^2+1}}\begin{pmatrix}\alpha\times e^{j\frac{26}{15}\pi} & e^{j\left(\frac{26}{15}\pi+\pi\right)}\\ e^{j0} & \alpha\times e^{j0}\end{pmatrix}\quad\text{Equation 309}$$

Math 371

$$F[i=29]=\frac{1}{\sqrt{\alpha^2+1}}\begin{pmatrix}\alpha\times e^{j\frac{28}{15}\pi} & e^{j\left(\frac{28}{15}\pi+\pi\right)}\\ e^{j0} & \alpha\times e^{j0}\end{pmatrix}\quad\text{Equation 310}$$

Note that, in order to restrict the calculation scale of the above precoding in the transmission device, $\theta_{11}(i)=0$ radians and $\lambda=0$ radians may be set in Equation 279, and $\theta21(i)=0$ radians and $\lambda=0$ radians may be set in Equation 280.

In this case, however, in Equations 279 and 280, λ may be set as a value that varies depending on i, or may be set as the same value. That is to say, in Equations 279 and 280, λ in F[i=x] and λ in F[i=y] (x y) may be the same value or may be different values. As another scheme, λ is set as a fixed value in Equation 279, λ is set as a fixed value in Equation 280, and the fixed values of λ in Equations 279 and 280 are set as different values. (As still another scheme, the fixed values of λ in Equations 279 and 280 are used.)

As the value to which α is set, the above-described set value is one of effective values. However, not limited to this, a may be set, for example, for each value of i in the precoding matrix F[i] as described in Embodiment 17. (That is to say, in F[i], α is not necessarily be always set to a constant value for i.)

In the present embodiment, the scheme of structuring 2N different precoding matrices for a precoding hopping scheme with a 2N-slot time period (cycle) has been described. In this case, as the 2N different precoding matrices, F[0], F[1], F[2], . . . , F[2N−2], F[2N−1] are prepared. In the single carrier transmission scheme, symbols are arranged in the order F[0], F[1], F[2], . . . , F[2N−2], F[2N−1] in the time domain (or the frequency domain in the case of the multi-carrier transmission scheme). The present invention is not, however, limited in this way, and the 2N different precoding matrices F[0], F[1], F[2], . . . , F[2N−2], F[2N−1] generated in the present embodiment may be adapted to a multi-carrier transmission scheme such as an OFDM transmission scheme or the like. As in Embodiment 1, as a scheme of adaptation in this case, precoding weights may be changed by arranging symbols in the frequency domain and in the frequency-time domain. Note that a precoding hopping scheme with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping scheme over an H-slot period (cycle) (H being a natural number larger than the number of slots 2N in the period (cycle) of the above scheme of regularly hopping between precoding matrices), when the 2N different precoding matrices of the present embodiment are included, the probability of excellent reception quality increases.

In the present embodiment, as one example of the case where λ is treated as a fixed value, a case where λ=0 radians is described. However, in view of the mapping according to the modulation scheme, λ may be set to a fixed value defined as λ=π/2 radians, λ=π radians, or λ=(3π)/2 radians. (For example, λ may be set to a fixed value defined as λ=π radians in the precoding matrices of the precoding scheme in which hopping between precoding matrices is performed regularly.) With this structure, as is the case where λ is set to a value defined as λ=0 radians, a reduction in circuit size is achieved.

Embodiment 20

The present embodiment describes a scheme for regularly hopping between precoding matrices using a unitary matrix based on Embodiment 13.

In the scheme of regularly hopping between precoding matrices over a period (cycle) with 2N slots, the precoding matrices prepared for the 2N slots are represented as follows.

Math 372

When $i=0,1,2,\ldots,N-2,N-1$:

$$F[i]=\frac{1}{\sqrt{\alpha^2+1}}\begin{pmatrix}e^{j\theta_{11}(i)} & \alpha\times e^{j(\theta_{11}(i)+\lambda)}\\ \alpha\times e^{j\theta_{21}(i)} & e^{j(\theta_{21}(i)+\lambda+\delta)}\end{pmatrix}\quad\text{Equation 311}$$

Let α be a fixed value (not depending on i), where α>0.

Math 373

When $i=N,N+1,N+2,\ldots,2N-2,2N-1$:

$$F[i]=\frac{1}{\sqrt{\alpha^2+1}}\begin{pmatrix}\alpha\times e^{j(\theta_{11}(i)+\lambda)} & e^{j\theta_{11}(i)}\\ e^{j(\theta_{21}(i)+\lambda+\delta)} & \alpha\times e^{j\theta_{21}(i)}\end{pmatrix}\quad\text{Equation 312}$$

Let α be a fixed value (not depending on i), where α>0. (The value of α may be set as α<0.)

Furthermore, the 2×N×M period (cycle) precoding matrices based on Equations 311 and 312 are represented by the following equations.

Math 374

When $i=0,1,2,\ldots,N-2,N-1$:

$$F[2\times N\times k+i]=\frac{1}{\sqrt{\alpha^2+1}}\begin{pmatrix}e^{j\theta_{11}(i)} & \alpha\times e^{j(\theta_{11}(i)+\lambda)}\\ \alpha\times e^{j(\theta_{21}(i)+X_k)} & e^{j(\theta_{21}(i)+X_k+\lambda+\delta)}\end{pmatrix}\quad\text{Equation 313}$$

In this case, k=0, 1, . . . , M−2, M−1.

Math 375

When $i=N,N+1,N+2,\ldots,2N-2,2N-1$:

$$F[2\times n\times K+i]=\frac{1}{\sqrt{\alpha^2+1}}\begin{pmatrix}\alpha\times e^{j(\theta_{11}(i)+\lambda)} & e^{j\theta_{11}(i)}\\ e^{j(\theta_{21}(i)+\lambda+\delta+Y_k)} & \alpha\times e^{j\theta_{21}(i+Y_k)}\end{pmatrix}\quad\text{Equation 314}$$

In this case, k=0, 1, . . . , M−2, M−1. Furthermore, Xk=Yk may be true, or Xk≠Yk may be true.

In this case, precoding matrices F[0]-F[2N×M−1] are generated. (Precoding matrices F[0]-F[2×N×M−1] may be in any order for the 2×N×M slots in the period (cycle)). Symbol number 2×N×M×i may be precoded using F[0], symbol number 2×N×M×i+1 may be precoded using F[1], . . . , and symbol number 2×N×M×i+h may be precoded using F[h], for example (h=0, 1, 2, . . . , 2×N×M−2, 2×N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality.

The 2×N×M period (cycle) precoding matrices in Equation 313 may be changed to the following equation.

Math 376

When $i = N, N+1, N+2, \ldots, 2N-2, 2N-1$:

$$F[2\times n\times K+i]=\frac{1}{\sqrt{\alpha^2+1}}\begin{pmatrix}\alpha\times e^{j(\theta_{11}(i)+\lambda)} & e^{j\theta_{11}(i)}\\ e^{j(\theta_{21}(i)+\lambda+\delta+Y_k)} & \alpha\times e^{j\theta_{21}(i+Y_k)}\end{pmatrix}\qquad\text{Equation 315}$$

In this case, k=0, 1, . . . , M−2, M−1.

The 2×N×M period (cycle) precoding matrices in Equation 314 may also be changed to any of Equations 316-318.

Math 377

When $i = N, N+1, N+2, \ldots, 2N-2, 2N-1$:

$$F[2\times n\times K+i]=\frac{1}{\sqrt{\alpha^2+1}}\begin{pmatrix}\alpha\times e^{j(\theta_{11}(i)+\lambda+Y_k)} & e^{j(\theta_{11}(i)+Y_k)}\\ e^{j(\theta_{21}(i)+\lambda+\delta)} & \alpha\times e^{j\theta_{21}(i)}\end{pmatrix}\qquad\text{Equation 316}$$

In this case, k=0, 1, . . . , M−2, M−1.

Math 378

When $i = N, N+1, N+2, \ldots, 2N-2, 2N-1$:

$$F[2\times n\times K+i]=\frac{1}{\sqrt{\alpha^2+1}}\begin{pmatrix}\alpha\times e^{j\theta_{11}(i)} & e^{j(\theta_{11}(i)+\lambda)}\\ e^{j(\theta_{21}(i)+Y_k)} & \alpha\times e^{j(\theta_{21}(i)+\lambda+\delta+Y_k)}\end{pmatrix}\qquad\text{Equation 317}$$

In this case, k=0, 1, . . . , M−2, M−1.

Math 379

When $i = N, N+1, N+2, \ldots, 2N-2, 2N-1$:

$$F[2\times n\times K+i]=\frac{1}{\sqrt{\alpha^2+1}}\begin{pmatrix}\alpha\times e^{j(\theta_{11}(i)+Y_k)} & e^{j(\theta_{11}(i)+\lambda+Y_k)}\\ e^{j\theta_{21}(i)} & \alpha\times e^{j(\theta_{21}(i)+\lambda-\delta)}\end{pmatrix}\qquad\text{Equation 318}$$

In this case, k=0, 1, . . . , M−2, M−1.

Focusing on poor reception points, if Equations 313 through 318 satisfy the following conditions, Math 380

$$e^{j(\theta_{11}(x)-\theta_{21}(x))}\neq e^{j(\theta_{11}(y)-\theta_{21}(y))}\qquad\text{Condition \#64}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

Math 381

$$e^{j(\theta_{11}(x)-\theta_{21}(x)-\delta)}\neq e^{j(\theta_{11}(y)-\theta_{21}(y)-\delta)}\qquad\text{Condition \#65}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

Math 382

$$\theta_{11}(x)=\theta_{11}(x+N)$$

for ∀x (x=0, 1, 2, . . . , N−2, N−1)
and $$\theta_{21}(y)=\theta_{21}(y+N)\qquad\text{Condition \#23}$$

for ∀y (y is 0, 1, 2, . . . , N−2, N−1)
then excellent data reception quality is achieved. Note that in Embodiment 8, Condition #39 and Condition #40 should be satisfied.

Focusing on Xk and Yk, if Equations 313 through 318 satisfy the following conditions, Math 383

$$X_a\neq X_b+2\times s\times\pi\qquad\text{Condition \#67}$$

for ∀a, ∀b (a≠b; a,b=0, 1, 2, . . . , M−2, M−1)
(a is 0, 1, 2, . . . , M−2, M−1; b is 0, 1, 2, . . . , M−2, M−1; and a≠b.) (Here, s is an integer.)

Math 384

$$X_a\neq X_b+2\times s\times\pi\qquad\text{Condition \#67}$$

for ∀a, ∀b (a≠b; a,b=0, 1, 2, . . . , M−2, M−1)
(a is 0, 1, 2, . . . , M−2, M−1; b is 0, 1, 2, . . . , M−2, M−1; and a≠b.) (Here, u is an integer.),
then excellent data reception quality is achieved. Note that in Embodiment 8, Condition #42 should be satisfied. In Equations 313 and 318, when 0 radians ≤δ<2π radians, the matrices are a unitary matrix when δ=π radians and are a non-unitary matrix when δ≠π radians. In the present scheme, use of a non-unitary matrix for π/2 radians ≤|δ|<π radians is one characteristic structure, and excellent data reception quality is obtained, but use of a unitary matrix is also possible.

The following provides an example of precoding matrices in the precoding hopping scheme of the present embodiment. The following matrices are considered when N=5, M=2 as an example of the 2×N×M period (cycle) precoding matrices based on Equations 313 through 318:

Math 385

$$F[i=0]=\frac{1}{\sqrt{\alpha^2+1}}\begin{pmatrix}e^{j0} & \alpha\times e^{j0}\\ \alpha\times e^{j0} & e^{j\pi}\end{pmatrix}\qquad\text{Equation 319}$$

-continued

Math 386

$$F[i=1]=\frac{1}{\sqrt{\alpha^2+1}}\begin{pmatrix} e^{j0} & \alpha\times e^{j0} \\ \alpha\times e^{j\left(\frac{2}{5}\pi\right)} & e^{j\left(\frac{2}{5}\pi+\pi\right)} \end{pmatrix}$$ Equation 320

Math 387

$$F[i=2]=\frac{1}{\sqrt{\alpha^2+1}}\begin{pmatrix} e^{j0} & \alpha\times e^{j0} \\ \alpha\times e^{j\left(\frac{4}{5}\pi\right)} & e^{j\left(\frac{4}{5}\pi+\pi\right)} \end{pmatrix}$$ Equation 321

Math 388

$$F[i=3]=\frac{1}{\sqrt{\alpha^2+1}}\begin{pmatrix} e^{j0} & \alpha\times e^{j0} \\ \alpha\times e^{j\left(\frac{6}{5}\pi\right)} & e^{j\left(\frac{6}{5}\pi+\pi\right)} \end{pmatrix}$$ Equation 322

Math 389

$$F[i=4]=\frac{1}{\sqrt{\alpha^2+1}}\begin{pmatrix} e^{j0} & \alpha\times e^{j0} \\ \alpha\times e^{j\left(\frac{8}{5}\pi\right)} & e^{j\left(\frac{8}{5}\pi+\pi\right)} \end{pmatrix}$$ Equation 323

Math 390

$$F[i=5]=\frac{1}{\sqrt{\alpha^2+1}}\begin{pmatrix} \alpha\times e^{j0} & e^{j\pi} \\ e^{j0} & \alpha\times e^{j0} \end{pmatrix}$$ Equation 324

Math 391

$$F[i=6]=\frac{1}{\sqrt{\alpha^2+1}}\begin{pmatrix} \alpha\times e^{j\frac{2}{5}\pi} & e^{j\left(\frac{2}{5}\pi+\pi\right)} \\ e^{j0} & \alpha\times e^{j0} \end{pmatrix}$$ Equation 325

Math 392

$$F[i=7]=\frac{1}{\sqrt{\alpha^2+1}}\begin{pmatrix} \alpha\times e^{j\frac{4}{5}\pi} & e^{j\left(\frac{4}{5}\pi+\pi\right)} \\ e^{j0} & \alpha\times e^{j0} \end{pmatrix}$$ Equatiobn 326

Math 393

$$F[i=8]=\frac{1}{\sqrt{\alpha^2+1}}\begin{pmatrix} \alpha\times e^{j\frac{6}{5}\pi} & e^{j\left(\frac{6}{5}\pi+\pi\right)} \\ e^{j0} & \alpha\times e^{j0} \end{pmatrix}$$ Equation 327

Math 394

$$F[i=9]=\frac{1}{\sqrt{\alpha^2+1}}\begin{pmatrix} \alpha\times e^{j\frac{8}{5}\pi} & e^{j\left(\frac{8}{5}\pi+\pi\right)} \\ e^{j0} & \alpha\times e^{j0} \end{pmatrix}$$ Equation 328

Math 395

$$F[i=10]=\frac{1}{\sqrt{\alpha^2+1}}\begin{pmatrix} e^{j0} & \alpha\times e^{j0} \\ \alpha\times e^{j(0+\pi)} & e^{j(\pi+\pi)} \end{pmatrix}$$ Equation 329

Math 396

$$F[i=11]=\frac{1}{\sqrt{\alpha^2+1}}\begin{pmatrix} e^{j0} & \alpha\times e^{j0} \\ \alpha\times e^{j\left(\frac{2}{5}\pi+\pi\right)} & e^{j\left(\frac{2}{5}\pi+\pi+\pi\right)} \end{pmatrix}$$ Equation 330

Math 397

$$F[i=12]=\frac{1}{\sqrt{\alpha^2+1}}\begin{pmatrix} e^{j0} & \alpha\times e^{j0} \\ \alpha\times e^{j\left(\frac{4}{5}\pi+\pi\right)} & e^{j\left(\frac{4}{5}\pi+\pi+\pi\right)} \end{pmatrix}$$ Equation 331

Math 398

$$F[i=13]=\frac{1}{\sqrt{\alpha^2+1}}\begin{pmatrix} e^{j0} & \alpha\times e^{j0} \\ \alpha\times e^{j\left(\frac{6}{5}\pi+\pi\right)} & e^{j\left(\frac{6}{5}\pi+\pi+\pi\right)} \end{pmatrix}$$ Equation 332

-continued

Math 399

$$F[i=14]=\frac{1}{\sqrt{\alpha^2+1}}\begin{pmatrix} e^{j0} & \alpha\times e^{j0} \\ \alpha\times e^{j\left(\frac{8}{5}\pi+\pi\right)} & e^{j\left(\frac{8}{5}\pi+\pi+\pi\right)} \end{pmatrix}$$ Equation 333

Math 400

$$F[i=15]=\frac{1}{\sqrt{\alpha^2+1}}\begin{pmatrix} \alpha\times e^{j0} & e^{j\pi} \\ e^{j(0+\pi)} & \alpha\times e^{j(0+\pi)} \end{pmatrix}$$ Equation 334

Math 401

$$F[i=16]=\frac{1}{\sqrt{\alpha^2+1}}\begin{pmatrix} \alpha\times e^{j\frac{2}{5}\pi} & e^{j\left(\frac{2}{5}\pi+\pi\right)} \\ e^{j(0+\pi)} & \alpha\times e^{j(0+\pi)} \end{pmatrix}$$ Equation 335

Math 402

$$F[i=17]=\frac{1}{\sqrt{\alpha^2+1}}\begin{pmatrix} \alpha\times e^{j\frac{4}{5}\pi} & e^{j\left(\frac{4}{5}\pi+\pi\right)} \\ e^{j(0+\pi)} & \alpha\times e^{j(0+\pi)} \end{pmatrix}$$ Equation 336

Math 403

$$F[i=18]=\frac{1}{\sqrt{\alpha^2+1}}\begin{pmatrix} \alpha\times e^{j\frac{6}{5}\pi} & e^{j\left(\frac{6}{5}\pi+\pi\right)} \\ e^{j(0+\pi)} & \alpha\times e^{j(0+\pi)} \end{pmatrix}$$ Equation 337

Math 404

$$F[i=19]=\frac{1}{\sqrt{\alpha^2+1}}\begin{pmatrix} \alpha\times e^{j\frac{8}{5}\pi} & e^{j\left(\frac{8}{5}\pi+\pi\right)} \\ e^{j(0+\pi)} & \alpha\times e^{j(0+\pi)} \end{pmatrix}$$ Equastion 338

In this way, in the above example, in order to restrict the calculation scale of the above precoding in the transmission device, λ=0 radians, δ=π radians, X1=0 radians, and X2=π radians are set in Equation 313, and λ=0 radians, δ=π radians, Y1=0 radians, and Y2=π radians are set in Equation 314. In this case, however, in Equations 313 and 314, λ may be set as a value that varies depending on i, or may be set as the same value. That is to say, in Equations 313 and 314, λ in F[i=x] and λ in F[i=y] (x≠y) may be the same value or may be different values. As another scheme, λ is set as a fixed value in Equation 313, λ is set as a fixed value in Equation 314, and the fixed values of λ in Equations 313 and 314 are set as different values. (As still another scheme, the fixed values of λ in Equations 313 and 314 are used.)

As the value to which a is set, the set value described in Embodiment 18 is one of effective values. However, not limited to this, α may be set, for example, for each value of i in the precoding matrix F[i] as described in Embodiment 17. (That is to say, in F[i], α is not necessarily be always set to a constant value for i.)

In the present embodiment, as one example of the case where λ is treated as a fixed value, a case where λ=0 radians is described. However, in view of the mapping according to the modulation scheme, λ may be set to a fixed value defined as λ=π/2 radians, λ=π radians, or λ=(3π)/2 radians. (For example, λ may be set to a fixed value defined as λ=π radians in the precoding matrices of the precoding scheme in which hopping between precoding matrices is performed regularly.) With this structure, as is the case where λ is set to a value defined as λ=0 radians, a reduction in circuit size is achieved.

Embodiment 21

The present embodiment describes an example of the precoding scheme of Embodiment 18 in which hopping between precoding matrices is performed regularly.

As an example of the precoding matrices prepared for the N slots based on Equation 269, the following matrices are considered:

Math 405

$$F[i=0]=\frac{1}{\sqrt{\alpha^2+1}}\begin{pmatrix} e^{j0} & \alpha\times e^{j0} \\ \alpha\times e^{j0} & e^{j\pi} \end{pmatrix} \quad \text{Equation 339}$$

Math 406

$$F[i=1]=\frac{1}{\sqrt{\alpha^2+1}}\begin{pmatrix} e^{j0} & \alpha\times e^{j0} \\ \alpha\times e^{j\frac{2}{9}\pi} & e^{j\left(\frac{2}{9}\pi+\pi\right)} \end{pmatrix} \quad \text{Equation 340}$$

Math 407

$$F[i=2]=\frac{1}{\sqrt{\alpha^2+1}}\begin{pmatrix} e^{j0} & \alpha\times e^{j0} \\ \alpha\times e^{j\frac{4}{9}\pi} & e^{j\left(\frac{4}{9}\pi+\pi\right)} \end{pmatrix} \quad \text{Equation 341}$$

Math 408

$$F[i=3]=\frac{1}{\sqrt{\alpha^2+1}}\begin{pmatrix} e^{j0} & \alpha\times e^{j0} \\ \alpha\times e^{j\frac{6}{9}\pi} & e^{j\left(\frac{6}{9}\pi+\pi\right)} \end{pmatrix} \quad \text{Equation 342}$$

Math 409

$$F[i=4]=\frac{1}{\sqrt{\alpha^2+1}}\begin{pmatrix} e^{j0} & \alpha\times e^{j0} \\ \alpha\times e^{j\frac{8}{9}\pi} & e^{j\left(\frac{8}{9}\pi+\pi\right)} \end{pmatrix} \quad \text{Equation 343}$$

Math 410

$$F[i=5]=\frac{1}{\sqrt{\alpha^2+1}}\begin{pmatrix} e^{j0} & \alpha\times e^{j0} \\ \alpha\times e^{j\frac{10}{9}\pi} & e^{j\left(\frac{10}{9}\pi+\pi\right)} \end{pmatrix} \quad \text{Equation 344}$$

Math 411

$$F[i=6]=\frac{1}{\sqrt{\alpha^2+1}}\begin{pmatrix} e^{j0} & \alpha\times e^{j0} \\ \alpha\times e^{j\frac{12}{9}\pi} & e^{j\left(\frac{12}{9}\pi+\pi\right)} \end{pmatrix} \quad \text{Equation 345}$$

Math 412

$$F[i=7]=\frac{1}{\sqrt{\alpha^2+1}}\begin{pmatrix} e^{j0} & \alpha\times e^{j0} \\ \alpha\times e^{j\frac{14}{9}\pi} & e^{j\left(\frac{14}{9}\pi+\pi\right)} \end{pmatrix} \quad \text{Equation 346}$$

Math 413

$$F[i=8]=\frac{1}{\sqrt{\alpha^2+1}}\begin{pmatrix} e^{j0} & \alpha\times e^{j0} \\ \alpha\times e^{j\frac{16}{9}\pi} & e^{j\left(\frac{16}{9}\pi+\pi\right)} \end{pmatrix} \quad \text{Equation 347}$$

In the above equations, there is a special case where a can be set to 1. In this case, Equations 339 through 347 are represented as follows.

Math 414

$$F[i=0]=\frac{1}{\sqrt{2}}\begin{pmatrix} e^{j0} & e^{j0} \\ e^{j0} & e^{j\pi} \end{pmatrix} \quad \text{Equation 348}$$

Math 415

$$F[i=1]=\frac{1}{\sqrt{2}}\begin{pmatrix} e^{j0} & e^{j0} \\ e^{j\frac{2}{9}\pi} & e^{j\left(\frac{2}{9}\pi+\pi\right)} \end{pmatrix} \quad \text{Equation 349}$$

-continued

Math 416

$$F[i=2]=\frac{1}{\sqrt{2}}\begin{pmatrix} e^{j0} & e^{j0} \\ e^{j\frac{4}{9}\pi} & e^{j\left(\frac{4}{9}\pi+\pi\right)} \end{pmatrix} \quad \text{Equation 350}$$

Math 417

$$F[i=3]=\frac{1}{\sqrt{2}}\begin{pmatrix} e^{j0} & e^{j0} \\ e^{j\frac{6}{9}\pi} & e^{j\left(\frac{6}{9}\pi+\pi\right)} \end{pmatrix} \quad \text{Equation 351}$$

Math 418

$$F[i=4]=\frac{1}{\sqrt{2}}\begin{pmatrix} e^{j0} & e^{j0} \\ e^{j\frac{8}{9}\pi} & e^{j\left(\frac{8}{9}\pi+\pi\right)} \end{pmatrix} \quad \text{Equation 352}$$

Math 419

$$F[i=5]=\frac{1}{\sqrt{2}}\begin{pmatrix} e^{j0} & e^{j0} \\ e^{j\frac{10}{9}\pi} & e^{j\left(\frac{10}{9}\pi+\pi\right)} \end{pmatrix} \quad \text{Equation 353}$$

Math 420

$$F[i=6]=\frac{1}{\sqrt{2}}\begin{pmatrix} e^{j0} & e^{j0} \\ e^{j\frac{12}{9}\pi} & e^{j\left(\frac{12}{9}\pi+\pi\right)} \end{pmatrix} \quad \text{Equation 354}$$

Math 421

$$F[i=7]=\frac{1}{\sqrt{2}}\begin{pmatrix} e^{j0} & e^{j0} \\ e^{j\frac{14}{9}\pi} & e^{j\left(\frac{14}{9}\pi+\pi\right)} \end{pmatrix} \quad \text{Equation 355}$$

Math 422

$$F[i=8]=\frac{1}{\sqrt{2}}\begin{pmatrix} e^{j0} & e^{j0} \\ e^{j\frac{16}{9}\pi} & e^{j\left(\frac{16}{9}\pi+\pi\right)} \end{pmatrix} \quad \text{Equation 356}$$

As another example, as an example of the precoding matrices prepared for the N slots based on Equation 269, the following matrices are considered when N=15:

Math 423

$$F[i=0]=\frac{1}{\sqrt{\alpha^2+1}}\begin{pmatrix} e^{j0} & \alpha\times e^{j0} \\ \alpha\times e^{j0} & e^{j\pi} \end{pmatrix} \quad \text{Equation 357}$$

Math 424

$$F[i=1]=\frac{1}{\sqrt{\alpha^2+1}}\begin{pmatrix} e^{j0} & \alpha\times e^{j0} \\ \alpha\times e^{j\frac{2}{15}\pi} & e^{j\left(\frac{2}{15}\pi+\pi\right)} \end{pmatrix} \quad \text{Equation 358}$$

Math 425

$$F[i=2]=\frac{1}{\sqrt{\alpha^2+1}}\begin{pmatrix} e^{j0} & \alpha\times e^{j0} \\ \alpha\times e^{j\frac{4}{15}\pi} & e^{j\left(\frac{4}{15}\pi+\pi\right)} \end{pmatrix} \quad \text{Equation 359}$$

Math 426

$$F[i=3]=\frac{1}{\sqrt{\alpha^2+1}}\begin{pmatrix} e^{j0} & \alpha\times e^{j0} \\ \alpha\times e^{j\frac{6}{15}\pi} & e^{j\left(\frac{6}{15}\pi+\pi\right)} \end{pmatrix} \quad \text{Equation 360}$$

-continued

Math 427

$$F[i=4]=\frac{1}{\sqrt{\alpha^2+1}}\begin{pmatrix} e^{j0} & \alpha\times e^{j0} \\ \alpha\times e^{j\frac{8}{15}\pi} & e^{j\left(\frac{8}{15}\pi+\pi\right)} \end{pmatrix}$$ Equation 361

Math 428

$$F[i=5]=\frac{1}{\sqrt{\alpha^2+1}}\begin{pmatrix} e^{j0} & \alpha\times e^{j0} \\ \alpha\times e^{j\frac{10}{15}\pi} & e^{j\left(\frac{10}{15}\pi+\pi\right)} \end{pmatrix}$$ Equation 362

Math 429

$$F[i=6]=\frac{1}{\sqrt{\alpha^2+1}}\begin{pmatrix} e^{j0} & \alpha\times e^{j0} \\ \alpha\times e^{j\frac{12}{15}\pi} & e^{j\left(\frac{12}{15}\pi+\pi\right)} \end{pmatrix}$$ Equation 363

Math 430

$$F[i=7]=\frac{1}{\sqrt{\alpha^2+1}}\begin{pmatrix} e^{j0} & \alpha\times e^{j0} \\ \alpha\times e^{j\frac{14}{15}\pi} & e^{j\left(\frac{14}{15}\pi+\pi\right)} \end{pmatrix}$$ Equation 364

Math 431

$$F[i=8]=\frac{1}{\sqrt{\alpha^2+1}}\begin{pmatrix} e^{j0} & \alpha\times e^{j0} \\ \alpha\times e^{j\frac{16}{15}\pi} & e^{j\left(\frac{16}{15}\pi+\pi\right)} \end{pmatrix}$$ Equation 365

Math 432

$$F[i=9]=\frac{1}{\sqrt{\alpha^2+1}}\begin{pmatrix} e^{j0} & \alpha\times e^{j0} \\ \alpha\times e^{j\frac{18}{15}\pi} & e^{j\left(\frac{18}{15}\pi+\pi\right)} \end{pmatrix}$$ Equation 366

Math 433

$$F[i=10]=\frac{1}{\sqrt{\alpha^2+1}}\begin{pmatrix} e^{j0} & \alpha\times e^{j0} \\ \alpha\times e^{j\frac{20}{15}\pi} & e^{j\left(\frac{20}{15}\pi+\pi\right)} \end{pmatrix}$$ Equation 367

Math 434

$$F[i=11]=\frac{1}{\sqrt{\alpha^2+1}}\begin{pmatrix} e^{j0} & \alpha\times e^{j0} \\ \alpha\times e^{j\frac{22}{15}\pi} & e^{j\left(\frac{22}{15}\pi+\pi\right)} \end{pmatrix}$$ Equation 368

Math 435

$$F[i=12]=\frac{1}{\sqrt{\alpha^2+1}}\begin{pmatrix} e^{j0} & \alpha\times e^{j0} \\ \alpha\times e^{j\frac{24}{9}\pi} & e^{j\left(\frac{24}{9}\pi+\pi\right)} \end{pmatrix}$$ Equation 369

Math 436

$$F[i=13]=\frac{1}{\sqrt{\alpha^2+1}}\begin{pmatrix} e^{j0} & \alpha\times e^{j0} \\ \alpha\times e^{j\frac{26}{15}\pi} & e^{j\left(\frac{26}{15}\pi+\pi\right)} \end{pmatrix}$$ Equation 370

Math 437

$$F[i=14]=\frac{1}{\sqrt{\alpha^2+1}}\begin{pmatrix} e^{j0} & \alpha\times e^{j0} \\ \alpha\times e^{j\frac{28}{15}\pi} & e^{j\left(\frac{28}{15}\pi+\pi\right)} \end{pmatrix}$$ Equation 371

In the above equations, there is a special case where α can be set to 1. In this case, Equations 357 through 371 are represented as follows.

Math 438

$$F[i=0]=\frac{1}{\sqrt{2}}\begin{pmatrix} e^{j0} & e^{j0} \\ e^{j0} & e^{j\pi} \end{pmatrix}$$ Equation 372

Math 439

$$F[i=1]=\frac{1}{\sqrt{2}}\begin{pmatrix} e^{j0} & e^{j0} \\ e^{j\frac{2}{15}\pi} & e^{j\left(\frac{2}{15}\pi+\pi\right)} \end{pmatrix}$$ Equation 373

Math 440

$$F[i=2]=\frac{1}{\sqrt{2}}\begin{pmatrix} e^{j0} & e^{j0} \\ e^{j\frac{4}{15}\pi} & e^{j\left(\frac{4}{15}\pi+\pi\right)} \end{pmatrix}$$ Equation 374

Math 441

$$F[i=3]=\frac{1}{\sqrt{2}}\begin{pmatrix} e^{j0} & e^{j0} \\ e^{j\frac{6}{15}\pi} & e^{j\left(\frac{6}{15}\pi+\pi\right)} \end{pmatrix}$$ Equation 375

Math 442

$$F[i=4]=\frac{1}{\sqrt{2}}\begin{pmatrix} e^{j0} & e^{j0} \\ e^{j\frac{8}{15}\pi} & e^{j\left(\frac{8}{15}\pi+\pi\right)} \end{pmatrix}$$ Equation 376

Math 443

$$F[i=5]=\frac{1}{\sqrt{2}}\begin{pmatrix} e^{j0} & e^{j0} \\ e^{j\frac{10}{15}\pi} & e^{j\left(\frac{10}{15}\pi+\pi\right)} \end{pmatrix}$$ Equation 377

Math 444

$$F[i=6]=\frac{1}{\sqrt{2}}\begin{pmatrix} e^{j0} & e^{j0} \\ e^{j\frac{12}{15}\pi} & e^{j\left(\frac{12}{15}\pi+\pi\right)} \end{pmatrix}$$ Equation 378

Math 445

$$F[i=7]=\frac{1}{\sqrt{2}}\begin{pmatrix} e^{j0} & e^{j0} \\ e^{j\frac{14}{15}\pi} & e^{j\left(\frac{14}{15}\pi+\pi\right)} \end{pmatrix}$$ Equation 379

Math 446

$$F[i=8]=\frac{1}{\sqrt{2}}\begin{pmatrix} e^{j0} & e^{j0} \\ e^{j\frac{16}{15}\pi} & e^{j\left(\frac{16}{15}\pi+\pi\right)} \end{pmatrix}$$ Equation 380

Math 447

$$F[i=9]=\frac{1}{\sqrt{2}}\begin{pmatrix} e^{j0} & e^{j0} \\ e^{j\frac{18}{15}\pi} & e^{j\left(\frac{18}{15}\pi+\pi\right)} \end{pmatrix}$$ Equation 381

Math 448

$$F[i=10]=\frac{1}{\sqrt{2}}\begin{pmatrix} e^{j0} & e^{j0} \\ e^{j\frac{20}{15}\pi} & e^{j\left(\frac{20}{15}\pi+\pi\right)} \end{pmatrix}$$ Equation 382

Math 449

$$F[i=11]=\frac{1}{\sqrt{2}}\begin{pmatrix} e^{j0} & e^{j0} \\ e^{j\frac{22}{15}\pi} & e^{j\left(\frac{22}{15}\pi+\pi\right)} \end{pmatrix}$$ Equation 383

Math 450

$$F[i=12]=\frac{1}{\sqrt{2}}\begin{pmatrix} e^{j0} & e^{j0} \\ e^{j\frac{24}{9}\pi} & e^{j\left(\frac{24}{9}\pi+\pi\right)} \end{pmatrix}$$ Equation 384

-continued

Math 451

$$F[i=13]=\frac{1}{\sqrt{2}}\begin{pmatrix} e^{j0} & e^{j0} \\ e^{j\frac{26}{15}\pi} & e^{j\left(\frac{26}{15}\pi+\pi\right)} \end{pmatrix} \quad \text{Equation 385}$$

Math 452

$$F[i=14]=\frac{1}{\sqrt{2}}\begin{pmatrix} e^{j0} & e^{j0} \\ e^{j\frac{28}{15}\pi} & e^{j\left(\frac{28}{15}\pi+\pi\right)} \end{pmatrix} \quad \text{Equation 386}$$

In the present example, α is set to 1. However, the value to which α is set is not limited to this. For example, the set value of α may be applied to the following case. That is to say, as shown in FIG. 3 or the like, the encoder performs an error correction coding. The value of α may be varied depending on the coding rate for error correction coding used in the error correction coding. For example, there is considered a scheme in which α is set to 1 when the coding rate is ½, and to a value other than 1 such as a value satisfying the relationship α>1 (or α<1) when the coding rate is ⅔. With this structure, in the reception device, excellent data reception quality may be achieved regardless of the coding rate. (Excellent data reception quality may be achieved even if α is set as a fixed value.)

As another example, as described in Embodiment 17, α may be set for each value of i in the precoding matrix F[i]. (That is to say, in F[i], α is not necessarily be always set to a constant value for i.)

In the present embodiment, the scheme of structuring N different precoding matrices for a precoding hopping scheme with an N-slot time period (cycle) has been described. In this case, as the N different precoding matrices, F[0], F[1], F[2], . . . , F[N−2], F[N−1] are prepared. In the single carrier transmission scheme, symbols are arranged in the order F[0], F[1], F[2], . . . , F[N−2], F[N−1] in the time domain (or the frequency domain in the case of the multi-carrier transmission scheme). The present invention is not, however, limited in this way, and the N different precoding matrices F[0], F[1], F[2], . . . , F[N−2], F[N−1] generated in the present embodiment may be adapted to a multi-carrier transmission scheme such as an OFDM transmission scheme or the like. As in Embodiment 1, as a scheme of adaptation in this case, precoding weights may be changed by arranging symbols in the frequency domain and in the frequency-time domain. Note that a precoding hopping scheme with an N-slot time period (cycle) has been described, but the same advantageous effects may be obtained by randomly using N different precoding matrices. In other words, the N different precoding matrices do not necessarily need to be used in a regular period (cycle).

Embodiment 22

The present embodiment describes an example of the precoding scheme of Embodiment 19 in which hopping between precoding matrices is performed regularly.

As an example of the precoding matrices prepared for the 2N slots based on Equations 279 and 280, the following matrices are considered when N=9:

Math 453

$$F[i=0]=\frac{1}{\sqrt{\alpha^2+1}}\begin{pmatrix} e^{j0} & \alpha\times e^{j0} \\ \alpha\times e^{j0} & e^{j\pi} \end{pmatrix} \quad \text{Equation 387}$$

Math 454

$$F[i=1]=\frac{1}{\sqrt{\alpha^2+1}}\begin{pmatrix} e^{j0} & \alpha\times e^{j0} \\ \alpha\times e^{j\frac{2}{9}\pi} & e^{j\left(\frac{2}{9}\pi+\pi\right)} \end{pmatrix} \quad \text{Equation 388}$$

Math 455

$$F[i=2]=\frac{1}{\sqrt{\alpha^2+1}}\begin{pmatrix} e^{j0} & \alpha\times e^{j0} \\ \alpha\times e^{j\frac{4}{9}\pi} & e^{j\left(\frac{4}{9}\pi+\pi\right)} \end{pmatrix} \quad \text{Equation 389}$$

Math 456

$$F[i=3]=\frac{1}{\sqrt{\alpha^2+1}}\begin{pmatrix} e^{j0} & \alpha\times e^{j0} \\ \alpha\times e^{j\frac{6}{9}\pi} & e^{j\left(\frac{6}{9}\pi+\pi\right)} \end{pmatrix} \quad \text{Equation 390}$$

Math 457

$$F[i=4]=\frac{1}{\sqrt{\alpha^2+1}}\begin{pmatrix} e^{j0} & \alpha\times e^{j0} \\ \alpha\times e^{j\frac{8}{9}\pi} & e^{j\left(\frac{8}{9}\pi+\pi\right)} \end{pmatrix} \quad \text{Equation 391}$$

Math 458

$$F[i=5]=\frac{1}{\sqrt{\alpha^2+1}}\begin{pmatrix} e^{j0} & \alpha\times e^{j0} \\ \alpha\times e^{j\frac{10}{9}\pi} & e^{j\left(\frac{10}{9}\pi+\pi\right)} \end{pmatrix} \quad \text{Equation 392}$$

Math 459

$$F[i=6]=\frac{1}{\sqrt{\alpha^2+1}}\begin{pmatrix} e^{j0} & \alpha\times e^{j0} \\ \alpha\times e^{j\frac{12}{9}\pi} & e^{j\left(\frac{12}{9}\pi+\pi\right)} \end{pmatrix} \quad \text{Equation 393}$$

Math 460

$$F[i=7]=\frac{1}{\sqrt{\alpha^2+1}}\begin{pmatrix} e^{j0} & \alpha\times e^{j0} \\ \alpha\times e^{j\frac{14}{9}\pi} & e^{j\left(\frac{14}{9}\pi+\pi\right)} \end{pmatrix} \quad \text{Equation 394}$$

Math 461

$$F[i=8]=\frac{1}{\sqrt{\alpha^2+1}}\begin{pmatrix} e^{j0} & \alpha\times e^{j0} \\ \alpha\times e^{j\frac{16}{9}\pi} & e^{j\left(\frac{16}{9}\pi+\pi\right)} \end{pmatrix} \quad \text{Equation 395}$$

Math 462

$$F[i=9]=\frac{1}{\sqrt{\alpha^2+1}}\begin{pmatrix} \alpha\times e^{j0} & e^{j\pi} \\ e^{j0} & \alpha\times e^{j0} \end{pmatrix} \quad \text{Equation 396}$$

Math 463

$$F[i=10]=\frac{1}{\sqrt{\alpha^2+1}}\begin{pmatrix} \alpha\times e^{j\frac{2}{9}\pi} & e^{j\left(\frac{2}{9}\pi+\pi\right)} \\ e^{j0} & \alpha\times e^{j0} \end{pmatrix} \quad \text{Equation 397}$$

Math 464

$$F[i=11]=\frac{1}{\sqrt{\alpha^2+1}}\begin{pmatrix} \alpha\times e^{j\frac{4}{9}\pi} & e^{j\left(\frac{4}{9}\pi+\pi\right)} \\ e^{j0} & \alpha\times e^{j0} \end{pmatrix} \quad \text{Equation 398}$$

Math 465

$$F[i=12]=\frac{1}{\sqrt{\alpha^2+1}}\begin{pmatrix} \alpha\times e^{j\frac{6}{9}\pi} & e^{j\left(\frac{6}{9}\pi+\pi\right)} \\ e^{j0} & \alpha\times e^{j0} \end{pmatrix} \quad \text{Equation 399}$$

-continued

Math 466

$$F[i=13]=\frac{1}{\sqrt{\alpha^2+1}}\begin{pmatrix}\alpha\times e^{j\frac{8}{9}\pi} & e^{j\left(\frac{8}{9}\pi+\pi\right)}\\ e^{j0} & \alpha\times e^{j0}\end{pmatrix}\quad\text{Equation 400}$$

Math 467

$$F[i=14]=\frac{1}{\sqrt{\alpha^2+1}}\begin{pmatrix}\alpha\times e^{j\frac{10}{9}\pi} & e^{j\left(\frac{10}{9}\pi+\pi\right)}\\ e^{j0} & \alpha\times e^{j0}\end{pmatrix}\quad\text{Equation 401}$$

Math 468

$$F[i=15]=\frac{1}{\sqrt{\alpha^2+1}}\begin{pmatrix}\alpha\times e^{j\frac{12}{9}\pi} & e^{j\left(\frac{12}{9}\pi+\pi\right)}\\ e^{j0} & \alpha\times e^{j0}\end{pmatrix}\quad\text{Equation 402}$$

Math 469

$$F[i=16]=\frac{1}{\sqrt{\alpha^2+1}}\begin{pmatrix}\alpha\times e^{j\frac{14}{9}\pi} & e^{j\left(\frac{14}{9}\pi+\pi\right)}\\ e^{j0} & \alpha\times e^{j0}\end{pmatrix}\quad\text{Equation 403}$$

Math 470

$$F[i=17]=\frac{1}{\sqrt{\alpha^2+1}}\begin{pmatrix}\alpha\times e^{j\frac{16}{9}\pi} & e^{j\left(\frac{16}{9}\pi+\pi\right)}\\ e^{j0} & \alpha\times e^{j0}\end{pmatrix}\quad\text{Equation 404}$$

In the above equations, there is a special case where α can be set to 1. In this case, Equations 387 through 404 are represented as follows.

Math 471

$$F[i=0]=\frac{1}{\sqrt{2}}\begin{pmatrix}e^{j0} & \alpha\times e^{j0}\\ \alpha\times e^{j0} & e^{j\pi}\end{pmatrix}\quad\text{Equation 405}$$

Math 472

$$F[i=1]=\frac{1}{\sqrt{2}}\begin{pmatrix}e^{j0} & \alpha\times e^{j0}\\ \alpha\times e^{j\frac{2}{9}\pi} & e^{j\left(\frac{2}{9}\pi+\pi\right)}\end{pmatrix}\quad\text{Equation 406}$$

Math 473

$$F[i=2]=\frac{1}{\sqrt{2}}\begin{pmatrix}e^{j0} & \alpha\times e^{j0}\\ \alpha\times e^{j\frac{4}{9}\pi} & e^{j\left(\frac{4}{9}\pi+\pi\right)}\end{pmatrix}\quad\text{Equation 407}$$

Math 474

$$F[i=3]=\frac{1}{\sqrt{2}}\begin{pmatrix}e^{j0} & \alpha\times e^{j0}\\ \alpha\times e^{j\frac{6}{9}\pi} & e^{j\left(\frac{6}{9}\pi+\pi\right)}\end{pmatrix}\quad\text{Equation 408}$$

Math 475

$$F[i=4]=\frac{1}{\sqrt{2}}\begin{pmatrix}e^{j0} & \alpha\times e^{j0}\\ \alpha\times e^{j\frac{8}{9}\pi} & e^{j\left(\frac{8}{9}\pi+\pi\right)}\end{pmatrix}\quad\text{Equation 409}$$

Math 476

$$F[i=5]=\frac{1}{\sqrt{2}}\begin{pmatrix}e^{j0} & \alpha\times e^{j0}\\ \alpha\times e^{j\frac{10}{9}\pi} & e^{j\left(\frac{10}{9}\pi+\pi\right)}\end{pmatrix}\quad\text{Equation 410}$$

-continued

Math 477

$$F[i=6]=\frac{1}{\sqrt{2}}\begin{pmatrix}e^{j0} & \alpha\times e^{j0}\\ \alpha\times e^{j\frac{12}{9}\pi} & e^{j\left(\frac{12}{9}\pi+\pi\right)}\end{pmatrix}\quad\text{Equation 411}$$

Math 478

$$F[i=7]=\frac{1}{\sqrt{2}}\begin{pmatrix}e^{j0} & \alpha\times e^{j0}\\ \alpha\times e^{j\frac{14}{9}\pi} & e^{j\left(\frac{14}{9}\pi+\pi\right)}\end{pmatrix}\quad\text{Equation 412}$$

Math 479

$$F[i=8]=\frac{1}{\sqrt{2}}\begin{pmatrix}e^{j0} & \alpha\times e^{j0}\\ \alpha\times e^{j\frac{16}{9}\pi} & e^{j\left(\frac{16}{9}\pi+\pi\right)}\end{pmatrix}\quad\text{Equation 413}$$

Math 480

$$F[i=9]=\frac{1}{\sqrt{2}}\begin{pmatrix}\alpha\times e^{j0} & e^{j\pi}\\ e^{j0} & \alpha\times e^{j0}\end{pmatrix}\quad\text{Equation 414}$$

Math 481

$$F[i=10]=\frac{1}{\sqrt{2}}\begin{pmatrix}\alpha\times e^{j\frac{2}{9}\pi} & e^{j\left(\frac{2}{9}\pi+\pi\right)}\\ e^{j0} & \alpha\times e^{j0}\end{pmatrix}\quad\text{Equation 415}$$

Math 482

$$F[i=11]=\frac{1}{\sqrt{2}}\begin{pmatrix}\alpha\times e^{j\frac{4}{9}\pi} & e^{j\left(\frac{4}{9}\pi+\pi\right)}\\ e^{j0} & \alpha\times e^{j0}\end{pmatrix}\quad\text{Equation 416}$$

Math 483

$$F[i=12]=\frac{1}{\sqrt{2}}\begin{pmatrix}\alpha\times e^{j\frac{6}{9}\pi} & e^{j\left(\frac{6}{9}\pi+\pi\right)}\\ e^{j0} & \alpha\times e^{j0}\end{pmatrix}\quad\text{Equation 417}$$

Math 484

$$F[i=13]=\frac{1}{\sqrt{2}}\begin{pmatrix}\alpha\times e^{j\frac{8}{9}\pi} & e^{j\left(\frac{8}{9}\pi+\pi\right)}\\ e^{j0} & \alpha\times e^{j0}\end{pmatrix}\quad\text{Equation 418}$$

Math 485

$$F[i=14]=\frac{1}{\sqrt{2}}\begin{pmatrix}\alpha\times e^{j\frac{10}{9}\pi} & e^{j\left(\frac{10}{9}\pi+\pi\right)}\\ e^{j0} & \alpha\times e^{j0}\end{pmatrix}\quad\text{Equation 419}$$

Math 486

$$F[i=15]=\frac{1}{\sqrt{2}}\begin{pmatrix}\alpha\times e^{j\frac{12}{9}\pi} & e^{j\left(\frac{12}{9}\pi+\pi\right)}\\ e^{j0} & \alpha\times e^{j0}\end{pmatrix}\quad\text{Equation 420}$$

Math 487

$$F[i=16]=\frac{1}{\sqrt{2}}\begin{pmatrix}\alpha\times e^{j\frac{14}{9}\pi} & e^{j\left(\frac{14}{9}\pi+\pi\right)}\\ e^{j0} & \alpha\times e^{j0}\end{pmatrix}\quad\text{Equation 421}$$

Math 488

$$F[i=17]=\frac{1}{\sqrt{2}}\begin{pmatrix}\alpha\times e^{j\frac{16}{9}\pi} & e^{j\left(\frac{16}{9}\pi+\pi\right)}\\ e^{j0} & \alpha\times e^{j0}\end{pmatrix}\quad\text{Equation 422}$$

Also, α may be set to 1 in Equations 281 through 310 presented in Embodiment 19. As the value to which α is set, the above-described set value is one of effective values. However, not limited to this, a may be set, for example, for each value of i in the precoding matrix F[i] as described in Embodiment 17. (That is to say, in F[i], a is not necessarily be always set to a constant value for i.)

In the present embodiment, the scheme of structuring 2N different precoding matrices for a precoding hopping scheme with a 2N-slot time period (cycle) has been described. In this case, as the 2N different precoding matrices, F[0], F[1], F[2], . . . , F[2N−2], F[2N−1] are prepared. In the single carrier transmission scheme, symbols are arranged in the order F[0], F[1], F[2], . . . , F[2N−2], F[2N−1] in the time domain (or the frequency domain in the case of the multi-carrier transmission scheme). The present invention is not, however, limited in this way, and the 2N different precoding matrices F[0], F[1], F[2], . . . , F[2N−2], F[2N−1] generated in the present embodiment may be adapted to a multi-carrier transmission scheme such as an OFDM transmission scheme or the like. As in Embodiment 1, as a scheme of adaptation in this case, precoding weights may be changed by arranging symbols in the frequency domain and in the frequency-time domain. Note that a precoding hopping scheme with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping scheme over an H-slot period (cycle) (H being a natural number larger than the number of slots 2N in the period (cycle) of the above scheme of regularly hopping between precoding matrices), when the 2N different precoding matrices of the present embodiment are included, the probability of excellent reception quality increases.

Embodiment 23

In Embodiment 9, a scheme for regularly hopping between precoding matrices with use of a unitary matrix has been described. In the present embodiment, a scheme for regularly hopping between precoding matrices with use of a matrix different from that in Embodiment 9 is described.

First, a precoding matrix F, a basic precoding matrix, is expressed by the following equation.

Math 489

$$F = \begin{pmatrix} A \times e^{j\mu_{11}} & B \times e^{j\mu_{12}} \\ C \times e^{j\mu_{21}} & 0 \end{pmatrix} \quad \text{Equation 423}$$

In Equation 423, A, B, and C are real numbers, $\mu_{11}$, $\mu_{12}$, and $\mu_{21}$ are real numbers, and the units of them are radians. In the scheme of regularly hopping between precoding matrices over a period (cycle) with N slots, the precoding matrices prepared for the N slots are represented as follows.

Math 490

$$F[i] = \begin{pmatrix} A \times e^{j(\mu_{11}+\theta_{11}(i))} & B \times e^{j(\mu_{12}+\theta_{11}(i))} \\ C \times e^{j(\mu_{21}+\theta_{21}(i))} & 0 \end{pmatrix} \quad \text{Equation 424}$$

In this case, i=0, 1, 2, . . . , N−2, N−1. Also, A, B, and C are fixed values regardless of i, and $\mu_{11}$, $\mu_{12}$, and $\mu_{21}$ are fixed values regardless of i. If a matrix represented by the format of Equation 424 is treated as a precoding matrix, "0" is present as one element of the precoding matrix, thus it has an advantageous effect that the poor reception points described in other embodiments can be reduced.

Also, another basic precoding matrix different from that expressed by Equation 423 is expressed by the following equation.

Math 491

$$F = \begin{pmatrix} A \times e^{j\mu_{11}} & B \times e^{j\mu_{12}} \\ 0 & D \times e^{j\mu_{22}} \end{pmatrix} \quad \text{Equation 425}$$

In Equation 425, A, B, and C are real numbers, $\mu_{11}$, $\mu_{12}$, and $\mu_{22}$ are real numbers, and the units of them are radians. In the scheme of regularly hopping between precoding matrices over a period (cycle) with N slots, the precoding matrices prepared for the N slots are represented as follows.

Math 492

$$F[i] = \begin{pmatrix} A \times e^{j(\mu_{11}+\theta_{11}(i))} & B \times e^{j(\mu_{12}+\theta_{11}(i))} \\ 0 & D \times e^{j(\mu_{22}+\theta_{21}(i))} \end{pmatrix} \quad \text{Equation 426}$$

In this case, i=0, 1, 2, . . . , N−2, N−1. Also, A, B, and D are fixed values regardless of i, and $\mu_{11}$, $\mu_{12}$, and $\mu_{22}$ are fixed values regardless of i. If a matrix represented by the format of Equation 426 is treated as a precoding matrix, "0" is present as one element of the precoding matrix, thus it has an advantageous effect that the poor reception points described in other embodiments can be reduced.

Also, another basic precoding matrix different from those expressed by Equations 423 and 425 is expressed by the following equation.

Math 493

$$F = \begin{pmatrix} A \times e^{j\mu_{11}} & 0 \\ C \times e^{j\mu_{21}} & D \times e^{j\mu_{22}} \end{pmatrix} \quad \text{Equation 427}$$

In Equation 427, A, C, and D are real numbers, $\mu_{11}$, $\mu_{21}$, and $\mu_{22}$ are real numbers, and the units of them are radians. In the scheme of regularly hopping between precoding matrices over a period (cycle) with N slots, the precoding matrices prepared for the N slots are represented as follows.

Math 494

$$F[i] = \begin{pmatrix} A \times e^{j(\mu_{11}+\theta_{11}(i))} & 0 \\ C \times e^{j(\mu_{21}+\theta_{21}(i))} & D \times e^{j(\mu_{22}+\theta_{21}(i))} \end{pmatrix} \quad \text{Equation 428}$$

In this case, i=0, 1, 2, . . . , N−2, N−1. Also, A, C, and D are fixed values regardless of i, and $\mu_{11}$, $\mu_{21}$, and $\mu_{22}$ are fixed values regardless of i. If a matrix represented by the format of Equation 428 is treated as a precoding matrix, "0" is present as one element of the precoding matrix, thus it has an advantageous effect that the poor reception points described in other embodiments can be reduced.

Also, another basic precoding matrix different from those expressed by Equations 423, 425, and 427 is expressed by the following equation.

Math 495

$$F = \begin{pmatrix} 0 & B\times e^{j\mu_{12}} \\ C\times e^{j\mu_{21}} & D\times e^{j\mu_{22}} \end{pmatrix} \quad \text{Equation 429}$$

In Equation 429, B, C, and D are real numbers, $\mu_{12}$, $\mu_{21}$, and $\mu_{22}$ are real numbers, and the units of them are radians. In the scheme of regularly hopping between precoding matrices over a period (cycle) with N slots, the precoding matrices prepared for the N slots are represented as follows.

Math 496

$$F[i] = \begin{pmatrix} 0 & B\times e^{j(\mu_{12}+\theta_{11}(i))} \\ C\times e^{j(\mu_{21}+\theta_{21}(i))} & D\times e^{j(\mu_{22}+\theta_{21}(i))} \end{pmatrix} \quad \text{Equation 430}$$

In this case, i=0, 1, 2, . . . , N−2, N−1. Also, B, C, and D are fixed values regardless of i, and $\mu_{12}$, $\mu_{21}$, and $\mu_{22}$ are fixed values regardless of i. If a matrix represented by the format of Equation 430 is treated as a precoding matrix, “0” is present as one element of the precoding matrix, thus it has an advantageous effect that the poor reception points described in other embodiments can be reduced. From Condition #5 (Math 106) and Condition #6 (Math 107) in Embodiment 3, the following conditions are important for achieving excellent data reception quality.

Math 497

$$e^{j(\theta_{11}(x)-\theta_{21}(x))} \neq e^{j(\theta_{11}(y)-\theta_{21}(y))} \quad \text{Condition \#69}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

Math 498

$$e^{j(\theta_{11}(x)-\theta_{21}(x)-\pi)} \neq e^{j(\theta_{11}(y)-\theta_{21}(y)-\pi)} \quad \text{Condition \#70}$$

for ∀x, ∀y (x≠y; x,y=0, 1, 2, . . . , N−2, N−1)
(x is 0, 1, 2, . . . , N−2, N−1; y is 0, 1, 2, . . . , N−2, N−1; and x≠y.)

In order to distribute the poor reception points evenly with regards to phase in the complex plane, as described in Embodiment 6, Condition #71 and Condition #72 are provided.

Math 499

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)} \text{ for } \forall x (x = 0, 1, 2, \ldots, N-2) \quad \text{Condition \#71}$$

Math 500

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)} \text{ for } \forall x (x = 0, 1, 2, \ldots, N-2) \quad \text{Condition \#72}$$

With this structure, the reception device can avoid poor reception points in the LOS environment, and thus can obtain the advantageous effect of improving the data reception quality.

Note that, as an example of the above-described scheme for regularly hopping between precoding matrices, there is a scheme for fixing $\theta_{11}(i)$ to 0 radians ($\theta_{11}(i)$ is set to a constant value regardless of i. In this case, $\theta_{11}(i)$ may be set to a value other than 0 radians.) so that $\theta_{11}(i)$ and $\theta_{21}(i)$ satisfy the above-described conditions. Also, there is a scheme for not fixing $\theta_{11}(i)$ to 0 radians, but fixing $\theta_{21}(i)$ to 0 radians ($\theta_{21}(i)$ is set to a constant value regardless of i. In this case, $\theta_{21}(i)$ may be set to a value other than 0 radians.) so that $\theta_{11}(i)$ and $\theta_{21}(i)$ satisfy the above-described conditions.

The present embodiment describes the scheme of structuring N different precoding matrices for a precoding hopping scheme with an N-slot time period (cycle). In this case, as the N different precoding matrices, F[0], F[1], F[2], . . . , F[N−2], F[N−1] are prepared. In a single carrier transmission scheme, symbols are arranged in the order F[0], F[1], F[2], . . . , F[N−2], F[N−1] in the time domain (or the frequency domain in the case of multi-carrier transmission scheme). However, this is not the only example, and the N different precoding matrices F[0], F[1], F[2], . . . , F[N−2], F[N−1] generated according to the present embodiment may be adapted to a multi-carrier transmission scheme such as an OFDM transmission scheme or the like. As in Embodiment 1, as a scheme of adaption in this case, precoding weights may be changed by arranging symbols in the frequency domain or in the frequency-time domains. Note that a precoding hopping scheme with an N-slot time period (cycle) has been described, but the same advantageous effects may be obtained by randomly using N different precoding matrices. In other words, the N different precoding matrices do not necessarily need to be used in a regular period (cycle).

Furthermore, in the precoding matrix hopping scheme over an H-slot period (cycle) (H being a natural number larger than the number of slots N in the period (cycle) of the above scheme of regularly hopping between precoding matrices), when the N different precoding matrices of the present embodiment are included, the probability of excellent reception quality increases. In this case, Condition #69 and Condition #70 can be replaced by the following conditions. (The number of slots in the period (cycle) is considered to be N.)

Math 501

$$e^{j(\theta_{11}(x)-\theta_{21}(x))} \neq e^{j(\theta_{11}(y)-\theta_{21}(y))} \quad \text{Condition \#73}$$

for ∃x, ∃y (x≠y; x,y=0, 1, 2, . . . , N−2, N−1)
(x is 0, 1, 2, . . . , N−2, N−1; y is 0, 1, 2, . . . , N−2, N−1; and x≠y.)

Math 502

$$e^{j(\theta_{11}(x)-\theta_{21}(x)-\pi)} \neq e^{j(\theta_{11}(y)-\theta_{21}(y)-\pi)} \quad \text{Condition \#74}$$

for ∃x, ∃y (x≠y; x,y=0, 1, 2, . . . , N−2, N−1)
(x is 0, 1, 2, . . . , N−2, N−1; y is 0, 1, 2, . . . , N−2, N−1; and x≠y.)

Embodiment 24

In Embodiment 10, the scheme for regularly hopping between precoding matrices using a unitary matrix is described. However, the present embodiment describes a scheme for regularly hopping between precoding matrices using a matrix different from that used in Embodiment 10.

In the scheme of regularly hopping between precoding matrices over a period (cycle) with 2N slots, the precoding matrices prepared for the 2N slots are represented as follows.

Math 503

Here, $i = 0, 1, 2, \ldots, N-2, N-1$. Equation 431

$$F[i] = \begin{pmatrix} A \times e^{j(\mu_{11}+\theta_{11}(i))} & B \times e^{j(\mu_{12}+\theta_{11}(i))} \\ C \times e^{j(\mu_{21}+\theta_{21}(i))} & 0 \end{pmatrix}$$

Here, let A, B, and C be real numbers, and $\mu_{11}$, $\mu_{12}$, and $\mu_{21}$ be real numbers expressed in radians. In addition, A, B, and C are fixed values not depending on i. Similarly, $\mu_{11}$, $\mu_{12}$, and $\mu_{21}$ are fixed values not depending on i.

Math 504

For $i = N, N+1, N+2, \ldots, 2N-2, 2N-1$: Equation 432

$$F[i] = \begin{pmatrix} \alpha \times e^{j(v_{11}+\psi_{11}(i))} & \beta \times e^{j(v_{12}+\psi_{11}(i))} \\ 0 & \delta \times e^{j(v_{22}+\psi_{21}(i))} \end{pmatrix}$$

Here, let α, β, and δ be real numbers, and $v_{11}$, $v_{12}$, and $v_{22}$ be real numbers expressed in radians. In addition, α, β, and δ are fixed values not depending on i. Similarly, $v_{11}$, $v_{12}$, and $v_{22}$ are fixed values not depending on i.

The precoding matrices prepared for the 2N slots different from those in Equations 431 and 432 are represented by the following equations.

Math 505

For $i = 0, 1, 2, \ldots, N-2, N-1$: Equation 433

$$F[i] = \begin{pmatrix} A \times e^{j(\mu_{11}+\theta_{11}(i))} & B \times e^{j(\mu_{12}+\theta_{11}(i))} \\ C \times e^{j(\mu_{21}+\theta_{21}(i))} & 0 \end{pmatrix}$$

Here, let A, B, and C be real numbers, and $\mu_{11}$, $\mu_{12}$, and $\mu_{21}$ be real numbers expressed in radians. In addition, A, B, and C are fixed values not depending on i. Similarly, $\mu_{11}$, $\mu_{12}$, and $\mu_{21}$ are fixed values not depending on i.

Math 506

For $i = N, N+1, N+2, \ldots, 2N-2, 2N-1$: Equation 434

$$F[i] = \begin{pmatrix} 0 & \beta \times e^{j(v_{12}+\psi_{11}(i))} \\ \gamma \times e^{j(v_{21}+\psi_{21}(i))} & \delta \times e^{j(v_{22}+\psi_{21}(i))} \end{pmatrix}$$

Here, let β, γ, and δ be real numbers, and $v_{12}$, $v_{21}$, and $v_{22}$ be real numbers expressed in radians. In addition, β, γ, and δ are fixed values not depending on i. Similarly, $v_{12}$, $v_{21}$, and $v_{22}$ are fixed values not depending on i.

The precoding matrices prepared for the 2N slots different from those described above are represented by the following equations.

Math 507

For $i = 0, 1, 2, \ldots, N-2, N-1$: Equation 435

$$F[i] = \begin{pmatrix} A \times e^{j(\mu_{11}+\theta_{11}(i))} & 0 \\ C \times e^{j(\mu_{21}+\theta_{21}(i))} & D \times e^{j(\mu_{22}+\theta_{21}(i))} \end{pmatrix}$$

Here, let A, C, and D be real numbers, and $\mu_{11}$, $\mu_{21}$, and $\mu_{22}$ be real numbers expressed in radians. In addition, A, C, and D are fixed values not depending on i. Similarly, $\mu_{11}$, $\mu_{21}$, and $\mu_{22}$ are fixed values not depending on i.

Math 508

For $i = N, N+1, N+2, \ldots, 2N-2, 2N-1$: Equation 436

$$F[i] = \begin{pmatrix} \alpha \times e^{j(v_{11}+\psi_{11}(i))} & \beta \times e^{j(v_{12}+\psi_{11}(i))} \\ 0 & \delta \times e^{j(v_{22}+\psi_{21}(i))} \end{pmatrix}$$

Here, let α, β, and δ be real numbers, and $v_{11}$, $v_{12}$, and $v_{22}$ be real numbers expressed in radians. In addition, α, β, and δ are fixed values not depending on i. Similarly, $v_{11}$, $v_{12}$, and $v_{22}$ are fixed values not depending on i.

The precoding matrices prepared for the 2N slots different from those described above are represented by the following equations.

Math 509

For $i = 0, 1, 2, \ldots, N-2, N-1$: Equation 437

$$F[i] = \begin{pmatrix} A \times e^{j(\mu_{11}+\theta_{11}(i))} & 0 \\ C \times e^{j(\mu_{21}+\theta_{21}(i))} & D \times e^{j(\mu_{22}+\theta_{21}(i))} \end{pmatrix}$$

Here, let A, C, and D be real numbers, and $\mu_{11}$, $\mu_{21}$, and $\mu_{22}$ be real numbers expressed in radians. In addition, A, C, and D are fixed values not depending on i. Similarly, $\mu_{11}$, $\mu_{21}$, and $\mu_{22}$ are fixed values not depending on i.

Math 510

For $i = N, N+1, N+2, \ldots, 2N-2, 2N-1$: Equation 438

$$F[i] = \begin{pmatrix} 0 & \beta \times e^{j(v_{12}+\psi_{11}(i))} \\ \gamma \times e^{j(v_{21}+\psi_{21}(i))} & \delta \times e^{j(v_{22}+\psi_{21}(i))} \end{pmatrix}$$

Here, let β, γ, and δ be real numbers, and $v_{12}$, $v_{21}$, and $v_{22}$ be real numbers expressed in radians. In addition, β, γ, and δ are fixed values not depending on i. Similarly, $v_{12}$, $v_{21}$, and $v_{22}$ are fixed values not depending on i.

Making the same considerations as in Condition #5 (Math 106) and Condition #6 (Math 107) of Embodiment 3, the following conditions are important for achieving excellent data reception quality.

Math 511

$$e^{j(\theta_{11}(x)-\theta_{21}(x))} \neq e^{j(\theta_{11}(y)-\theta_{21}(y))} \quad \text{Condition \#75}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 512

$$e^{j(\psi_{11}(x)-\psi_{21}(x))} \neq e^{j(\psi_{11}(y)-\psi_{21}(y))} \quad \text{Condition \#76}$$

for ∀x, ∀y (x≠y; x,y=N, N+1, N+2, . . . , 2N−2, 2N−1)

(x is N, N+1, N+2, . . . , 2N−2, 2N−1; y is N, N+1, N+2, . . . , 2N−2, 2N−1; and x≠y.)

Next, in order to distribute the poor reception points evenly with regards to phase in the complex plane, as described in Embodiment 6, Condition #77 or Condition #78 is provided.

Math 513

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)} \text{ for } \forall x (x = 0, 1, 2, \ldots , N-2) \quad \text{Condition \#77}$$

Math 514

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)} \text{ for } \forall x (x = 0, 1, 2, \ldots , N-2) \quad \text{Condition \#78}$$

Similarly, in order to distribute the poor reception points evenly with regards to phase in the complex plane, Condition #79 or Condition #80 is provided.

Math 515

$$\frac{e^{j(\psi_{11}(x+1)-\psi_{21}(x+1))}}{e^{j(\psi_{11}(x)-\psi_{21}(x))}} = e^{j\left(\frac{2\pi}{N}\right)} \text{ for } \forall x (x = N, N+1, N+2, \ldots , 2N-2) \quad \text{Condition \#79}$$

Math 516

$$\frac{e^{j(\psi_{11}(x+1)-\psi_{21}(x+1))}}{e^{j(\psi_{11}(x)-\psi_{21}(x))}} = e^{j\left(-\frac{2\pi}{N}\right)} \text{ for } \forall x (x = N, N+1, N+2, \ldots , 2N-2) \quad \text{Condition \#80}$$

The above arrangement ensures to reduce the number of poor reception points described in the other embodiments because one of the elements of precoding matrices is "0". In addition, the reception device is enabled to improve reception quality because poor reception points are effectively avoided especially in an LOS environment.

In an alternative scheme to the above-described precoding scheme of regularly hopping between precoding matrices, $\theta_{11}(i)$ is fixed, for example, to 0 radians (a fixed value not depending on i, and a value other than 0 radians may be applicable) and $\theta_{11}(i)$ and $\theta_{21}(i)$ satisfy the conditions described above. In another alternative scheme, $\theta_{21}(i)$ instead of $\theta_{11}(i)$ is fixed, for example, to 0 radians (a fixed value not depending on i, and a value other than 0 radians may be applicable) and $\theta_{11}(i)$ and $\theta_{21}(i)$ satisfy the conditions described above.

Similarly, in another alternative scheme, $\Psi_{11}(i)$ is fixed, for example, to 0 radians (a fixed value not depending on i, and a value other than 0 radians may be applicable) and $\Psi_{11}(i)$ and $\Psi_{21}(i)$ satisfy the conditions described above. Similarly, in another alternative scheme, $\Psi_{21}(i)$ instead of $\Psi_{11}(i)$ is fixed, for example, to 0 radians (a fixed value not depending on i, and a value other than 0 radians may be applicable) and $\Psi_{11}(i)$ and $\Psi_{21}(i)$ satisfy the conditions described above.

The present embodiment describes the scheme of structuring 2N different precoding matrices for a precoding hopping scheme with a 2N-slot time period (cycle). In this case, as the 2N different precoding matrices, F[0], F[1], F[2], . . . , F[2N−2], F[2N−1] are prepared. In a single carrier transmission scheme, symbols are arranged in the order F[0], F[1], F[2], . . . , F[2N−2], F[2N−1] in the time domain (or the frequency domain in the case of multi-carrier). However, this is not the only example, and the 2N different precoding matrices F[0], F[1], F[2], . . . , F[2N−2], F[2N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain or in the frequency-time domain. Note that a precoding hopping scheme with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping scheme over an H-slot period (cycle) (H being a natural number larger than the number of slots 2N in the period (cycle) of the above scheme of regularly hopping between precoding matrices), when the 2N different precoding matrices of the present embodiment are included, the probability of excellent reception quality increases.

Embodiment 25

The present embodiment describes a scheme for increasing the period (cycle) size of precoding hops between the precoding matrices, by applying Embodiment 17 to the precoding matrices described in Embodiment 23.

As described in Embodiment 23, in the scheme of regularly hopping between precoding matrices over a period (cycle) with N slots, the precoding matrices prepared for the N slots are represented as follows.

Math 517

$$F[i] = \begin{pmatrix} A \times e^{j(\mu_{11}+\theta_{11}(i))} & B \times e^{j(\mu_{12}+\theta_{11}(i))} \\ C \times e^{j(\mu_{21}+\theta_{21}(i))} & 0 \end{pmatrix} \quad \text{Equation 439}$$

Here, i=0, 1, 2, . . . , N−2, N−1. In addition, A, B, and C are fixed values not depending on i. Similarly, $\mu_{11}$, $\mu_{12}$, and $\mu_{21}$ are fixed values not depending on i. Furthermore, the N×M period (cycle) precoding matrices based on Equation 439 are represented by the following equation.

Math 518

$$F[N \times k + i] = \begin{pmatrix} A \times e^{j(\mu_{11}+\theta_{11}(i))} & B \times e^{j(\mu_{12}+\theta_{11}(i))} \\ C \times e^{j(\mu_{21}+\theta_{21}(i)+X_k)} & 0 \end{pmatrix} \quad \text{Equation 440}$$

Here, i=0, 1, 2, . . . , N−2, N−1, and k=0, 1, M−2, M−1. Precoding matrices F[0] to F[N×M−1] are thus generated (the precoding matrices F[0] to F[N×M−1] may be in any order for the N×M slots in the period (cycle)). Symbol number N×M×i may be precoded using F[0], symbol number N×M×i+1 may be precoded using F[1], . . . , and symbol number N×M×i+h may be precoded using F[h], for example (h=0, 1, 2, . . . , N×M−2, N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality. Note that while the N×M period (cycle) precoding matrices have been set to Equation 440, the N×M period (cycle) precoding matrices may be set to the following equation, as described above.

Math 519

$$F[N\times k+i]=\begin{pmatrix} A\times e^{j(\mu_{11}+\theta_{11}(i)+X_k)} & B\times e^{j(\mu_{12}+\theta_{11}(i)+X_k)} \\ C\times e^{j(\mu_{21}+\theta_{21}(i))} & 0 \end{pmatrix} \quad \text{Equation 441}$$

Here, i=0, 1, 2, . . . , N−2, N−1, and k=0, 1, . . . , M−2, M−1.

As described in Embodiment 23, in the scheme of regularly hopping between precoding matrices over a period (cycle) with N slots that is different from the above-described N slots, the precoding matrices prepared for the N slots are represented as follows.

Math 520

$$F[i]=\begin{pmatrix} A\times e^{j(\mu_{11}+\theta_{11}(i))} & B\times e^{j(\mu_{12}+\theta_{11}(i))} \\ 0 & D\times e^{j(\mu_{22}+\theta_{21}(i))} \end{pmatrix} \quad \text{Equation 442}$$

Here, i=0, 1, 2, . . . , N−2, N−1. In addition, A, B, and D are fixed values not depending on i. Similarly, $\mu_{11}$, $\mu_{12}$, and $\mu_{22}$ are fixed values not depending on i. Furthermore, the N×M period (cycle) precoding matrices based on Equation 441 are represented by the following equation.

Math 521

$$F[N\times k+i]=\begin{pmatrix} A\times e^{j(\mu_{11}+\theta_{11}(i))} & B\times e^{j(\mu_{12}+\theta_{11}(i))} \\ 0 & D\times e^{j(\mu_{22}+\theta_{21}(i)+X_k)} \end{pmatrix} \quad \text{Equation 443}$$

Here, i=0, 1, 2, . . . , N−2, N−1, and k=0, 1, . . . , M−2, M−1.

Precoding matrices F[0] to F[N×M−1] are thus generated (the precoding matrices F[0] to F[N×M−1] may be in any order for the N×M slots in the period (cycle)). Symbol number N×M×i may be precoded using F[0], symbol number N×M×i+1 may be precoded using F[1], . . . , and symbol number N×M×i+h may be precoded using F[h], for example (h=0, 1, 2, . . . , N×M−2, N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality. Note that while the N×M period (cycle) precoding matrices have been set to Equation 443, the N×M period (cycle) precoding matrices may be set to the following equation, as described above.

Math 522

$$F[N\times k+i]=\begin{pmatrix} A\times e^{j(\mu_{11}+\theta_{11}(i)+X_k)} & B\times e^{j(\mu_{12}+\theta_{11}(i)+X_k)} \\ 0 & D\times e^{j(\mu_{22}+\theta_{21}(i))} \end{pmatrix} \quad \text{Equation 444}$$

Here, i=0, 1, 2, . . . , N−2, N−1, and k=0, 1, . . . , M−2, M−1.

As described in Embodiment 23, in the scheme of regularly hopping between precoding matrices over a period (cycle) with N slots that is different from the above-described N slots, the precoding matrices prepared for the N slots are represented as follows.

Math 523

$$F[i]=\begin{pmatrix} A\times e^{j(\mu_{11}+\theta_{11}(i))} & 0 \\ C\times e^{j(\mu_{21}+\theta_{21}(i))} & D\times e^{j(\mu_{22}+\theta_{21}(i))} \end{pmatrix} \quad \text{Equation 445}$$

Here, i=0, 1, 2, . . . , N−2, N−1. In addition, A, C, and D are fixed values not depending on i. Similarly, $\mu_{11}$, $\mu_{21}$, and $\mu_{22}$ are fixed values not depending on i. Furthermore, the N×M period (cycle) precoding matrices based on Equation 445 are represented by the following equation.

Math 524

$$F[N\times k+i]=\begin{pmatrix} A\times e^{j(\mu_{11}+\theta_{11}(i))} & 0 \\ C\times e^{j(\mu_{21}+\theta_{21}(i)+X_k)} & D\times e^{j(\mu_{22}+\theta_{21}(i)+X_k)} \end{pmatrix} \quad \text{Equation 446}$$

Here, i=0, 1, 2, . . . , N−2, N−1, and k=0, 1, . . . , M−2, M−1.

Precoding matrices F[0] to F[N×M−1] are thus generated (the precoding matrices F[0] to F[N×M−1] may be in any order for the N×M slots in the period (cycle)). Symbol number N×M×i may be precoded using F[0], symbol number N×M×i+1 may be precoded using F[1], . . . , and symbol number N×M×i+h may be precoded using F[h], for example (h=0, 1, 2, . . . , N×M−2, N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality. Note that while the N×M period (cycle) precoding matrices have been set to Equation 446, the N×M period (cycle) precoding matrices may be set to the following equation, as described above.

Math 525

$$F[N\times k+i]=\begin{pmatrix} A\times e^{j(\mu_{11}+\theta_{11}(i)+X_k)} & 0 \\ C\times e^{j(\mu_{21}+\theta_{21}(i))} & D\times e^{j(\mu_{22}+\theta_{21}(i))} \end{pmatrix} \quad \text{Equation 447}$$

Here, i=0, 1, 2, . . . , N−2, N−1, and k=0, 1, . . . , M−2, M−1.

As described in Embodiment 23, in the scheme of regularly hopping between precoding matrices over a period (cycle) with N slots that is different from the above-described N slots, the precoding matrices prepared for the N slots are represented as follows.

Math 526

$$F[i]=\begin{pmatrix} 0 & B\times e^{j(\mu_{12}+\theta_{11}(i))} \\ C\times e^{j(\mu_{21}+\theta_{21}(i))} & D\times e^{j(\mu_{22}+\theta_{21}(i))} \end{pmatrix} \quad \text{Equation 448}$$

Here, i=0, 1, 2, . . . , N−2, N−1. In addition, B, C, and D are fixed values not depending on i. Similarly, $\mu_{12}$, $\mu_{21}$, and $\mu_{22}$ are fixed values not depending on i. Furthermore, the N×M period (cycle) precoding matrices based on Equation 448 are represented by the following equation.

Math 527

$$F[N\times k+i]=\begin{pmatrix}0 & B\times e^{j(\mu_{12}+\theta_{11}(i))}\\ C\times e^{j(\mu_{21}+\theta_{21}(i)+X_k)} & D\times e^{j(\mu_{22}+\theta_{21}(i)+X_k)}\end{pmatrix}\quad\text{Equation 449}$$

Here, i=0, 1, 2, . . . , N−2, N−1, and k=0, 1, . . . , M−2, M−1.

Precoding matrices F[0] to F[N×M−1] are thus generated (the precoding matrices F[0] to F[N×M−1] may be in any order for the N×M slots in the period (cycle)). Symbol number N×M×i may be precoded using F[0], symbol number N×M×i+1 may be precoded using F[1], . . . , and symbol number N×M×i+h may be precoded using F[h], for example (h=0, 1, 2, . . . , N×M−2, N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality. Note that while the N×M period (cycle) precoding matrices have been set to Equation 449, the N×M period (cycle) precoding matrices may be set to the following equation, as described above.

Math 528

$$F[N\times k+i]=\begin{pmatrix}0 & B\times e^{j(\mu_{12}+\theta_{11}(i)+X_k)}\\ C\times e^{j(\mu_{21}+\theta_{21}(i))} & D\times e^{j(\mu_{22}+\theta_{21}(i))}\end{pmatrix}\quad\text{Equation 450}$$

Here, i=0, 1, 2, . . . , N−2, N−1, and k=0, 1, . . . , M−2, M−1.

The present embodiment describes the scheme of structuring N×M different precoding matrices for a precoding hopping scheme with N×M slots in the time period (cycle). In this case, as the N×M different precoding matrices, F[0], F[1], F[2], . . . , F[N×M−2], F[N×M−1] are prepared. In a single carrier transmission scheme, symbols are arranged in the order F[0], F[1], F[2], . . . , F[N×M−2], F[N×M−1] in the time domain (or the frequency domain in the case of multi-carrier). However, this is not the only example, and the N×M different precoding matrices F[0], F[1], F[2], . . . , F[N×M−2], F[N×M−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain or in the frequency-time domain. Note that a precoding hopping scheme with N×M slots in the time period (cycle) has been described, but the same advantageous effects may be obtained by randomly using N×M different precoding matrices. In other words, the N×M different precoding matrices do not necessarily need to be used in a regular period (cycle).

Furthermore, in the precoding matrix hopping scheme over an H-slot period (cycle) (H being a natural number larger than the number of slots N×M in the period (cycle) of the above scheme of regularly hopping between precoding matrices), when the N×M different precoding matrices of the present embodiment are included, the probability of excellent reception quality increases.

Embodiment 26

The present embodiment describes a scheme for increasing the period (cycle) size of precoding hops between the precoding matrices, by applying Embodiment 20 to the precoding matrices described in Embodiment 24.

In the scheme of regularly hopping between precoding matrices over a period (cycle) with 2N slots, the precoding matrices prepared for the 2N slots are represented as follows.

Math 529

For $i=0, 1, 2, \ldots, N-2, N-1$:

$$F[i]=\begin{pmatrix}A\times e^{j(\mu_{11}+\theta_{11}(i))} & B\times e^{j(\mu_{12}+\theta_{11}(i))}\\ C\times e^{j(\mu_{21}+\theta_{21}(i))} & 0\end{pmatrix}\quad\text{Equation 451}$$

Here, let A, B, and C be real numbers, and $\mu_{11}$, $\mu_{12}$, and $\mu_{21}$ be real numbers expressed in radians. In addition, A, B, and C are fixed values not depending on i. Similarly, $\mu_{11}$, $\mu_{12}$, and $\mu_{21}$ are fixed values not depending on i.

Math 530

For $i=N, N+1, N+2, \ldots, 2N-2, 2N-1$:

$$F[i]=\begin{pmatrix}\alpha\times e^{j(\nu_{11}+\psi_{11}(i))} & \beta\times e^{j(\nu_{12}+\psi_{11}(i))}\\ 0 & \delta\times e^{j(\nu_{22}+\psi_{21}(i))}\end{pmatrix}\quad\text{Equation 452}$$

Here, let α, β, and δ be real numbers, and $\nu_{11}$, $\nu_{12}$, and $\nu_{22}$ be real numbers expressed in radians. In addition, α, β, and δ are fixed values not depending on i. Similarly, $\nu_{11}$, $\nu_{12}$, and $\nu_{22}$ are fixed values not depending on i. Furthermore, the 2×N×M period (cycle) precoding matrices based on Equations 451 and 452 are represented by the following equation.

Math 531

For $i=0, 1, 2, \ldots, N-2, N-1$:

$$F[2\times N\times k+i]=\begin{pmatrix}A\times e^{j(\mu_{11}+\theta_{11}(i))} & B\times e^{j(\mu_{12}+\theta_{11}(i))}\\ C\times e^{j(\mu_{21}+\theta_{21}(i)+X_k)} & 0\end{pmatrix}\quad\text{Equation 453}$$

Here, k=0, 1, M−2, M−1.

Math 532

For $i=N, N+1, N+2, \ldots, 2N-2, 2N-1$:

$$F[2\times N\times k+i]=\begin{pmatrix}\alpha\times e^{j(\nu_{11}+\psi_{11}(i))} & \beta\times e^{j(\nu_{12}+\psi_{11}(i))}\\ 0 & \delta\times e^{j(\nu_{22}+\psi_{21}(i)+Y_k)}\end{pmatrix}\quad\text{Equation 454}$$

Here, k=0, 1, M−2, M−1. In addition, Xk=Yk may be true or Xk≠Yk may be true.

Precoding matrices F[0] to F[2×N×M−1] are thus generated (the precoding matrices F[0] to F[2×N×M−1] may be in any order for the 2×N×M slots in the period (cycle)). Symbol number 2×N×M×i may be precoded using F[0], symbol number 2×N×M×i+1 may be precoded using F[1], . . . , and symbol number 2×N×M×i+h may be precoded using F[h], for example (h=0, 1, 2, . . . , 2×N×M−2, 2×N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality.

The 2×N×M period (cycle) precoding matrices in Equation 453 may be changed to the following equation.

Math 533

For $i = 0, 1, 2, \ldots, N-2, N-1$: Equation 455

$$F[2\times N\times k+i]=\begin{pmatrix} A\times e^{j(\mu_{11}+\theta_{11}(i)+X_k)} & B\times e^{j(\mu_{12}+\theta_{11}(i)+X_k)} \\ C\times e^{j(\mu_{21}+\theta_{21}(i))} & 0 \end{pmatrix}$$

Here, k=0, 1, . . . , M−2, M−1.

The 2×N×M period (cycle) precoding matrices in Equation 454 may be changed to the following equation.

Math 534

For $i = N, N+1, N+2, \ldots, 2N-2, 2N-1$: Equation 456

$$F[2\times N\times k+i]=\begin{pmatrix} \alpha\times e^{j(v_{11}+\psi_{11}(i)+Y_k)} & \beta\times e^{j(v_{12}+\psi_{11}(i)+Y_k)} \\ 0 & \delta\times e^{j(v_{22}+\psi_{21}(i))} \end{pmatrix}$$

Here, k=0, 1, . . . , M−2, M−1.

Another example is shown below. In the scheme of regularly hopping between precoding matrices over a period (cycle) with 2N slots, the precoding matrices prepared for the 2N slots are represented as follows.

Math 535

For $i = 0, 1, 2, \ldots, N-2, N-1$: Equation 457

$$F[i]=\begin{pmatrix} A\times e^{j(\mu_{11}+\theta_{11}(i))} & B\times e^{j(\mu_{12}+\theta_{11}(i))} \\ C\times e^{j(\mu_{21}+\theta_{21}(i))} & 0 \end{pmatrix}$$

Here, let A, B, and C be real numbers, and $\mu_{11}$, $\mu_{12}$, and $\mu_{21}$ be real numbers expressed in radians. In addition, A, B, and C are fixed values not depending on i. Similarly, $\mu_{11}$, $\mu_{12}$, and $\mu_{21}$ are fixed values not depending on i.

Math 536

For $i = N, N+1, N+2, \ldots, 2N-2, 2N-1$: Equation 458

$$F[i]=\begin{pmatrix} 0 & \beta\times e^{j(v_{12}+\psi_{11}(i))} \\ \gamma\times e^{j(v_{21}+\psi_{21}(i))} & \delta\times e^{j(v_{22}+\psi_{21}(i))} \end{pmatrix}$$

Here, let β, γ, and δ be real numbers, and $v_{12}$, $v_{21}$, and $v_{22}$ be real numbers expressed in radians. In addition, β, γ, and δ are fixed values not depending on i. Similarly, $v_{12}$, $v_{21}$, and $v_{22}$ are fixed values not depending on i. Furthermore, the 2×N×M period (cycle) precoding matrices based on Equations 457 and 458 are represented by the following equation.

Math 537

For $i = 0, 1, 2, \ldots, N-2, N-1$: Equation 459

$$F[2\times N\times k+i]=\begin{pmatrix} A\times e^{j(\mu_{11}+\theta_{11}(i))} & B\times e^{j(\mu_{12}+\theta_{11}(i))} \\ C\times e^{j(\mu_{21}+\theta_{21}(i)+X_k)} & 0 \end{pmatrix}$$

Here, k=0, 1, . . . , M−2, M−1.

Math 538

For $i = N, N+1, N+2, \ldots, 2N-2, 2N-1$: Equation 460

$$F[2\times N\times k+i]=\begin{pmatrix} 0 & \beta\times e^{j(v_{12}+\psi_{11}(i))} \\ \gamma\times e^{j(v_{21}+\psi_{21}(i)+Y_k)} & \delta\times e^{j(v_{22}+\psi_{21}(i)+Y_k)} \end{pmatrix}$$

Here, k=0, 1, . . . , M−2, M−1. Furthermore, Xk=Yk may be true, or Xk≠Yk may be true.

Precoding matrices F[0] to F[2×N×M−1] are thus generated (the precoding matrices F[0] to F[2×N×M−1] may be in any order for the 2×N×M slots in the period (cycle)). Symbol number 2×N×M×i may be precoded using F[0], symbol number 2×N×M×i+1 may be precoded using F[1], . . . , and symbol number 2×N×M×i+h may be precoded using F[h], for example (h=0, 1, 2, . . . , 2×N×M−2, 2×N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality.

The 2×N×M period (cycle) precoding matrices in Equation 459 may be changed to the following equation.

Math 539

For $i = 0, 1, 2, \ldots, N-2, N-1$: Equation 461

$$F[2\times N\times k+i]=\begin{pmatrix} A\times e^{j(\mu_{11}+\theta_{11}(i)+X_k)} & B\times e^{j(\mu_{12}+\theta_{11}(i)+X_k)} \\ C\times e^{j(\mu_{21}+\theta_{21}(i))} & 0 \end{pmatrix}$$

Here, k=0, 1, . . . , M−2, M−1.

The 2×N×M period (cycle) precoding matrices in Equation 460 may be changed to the following equation.

Math 540

For $i = N, N+1, N+2, \ldots, 2N-2, 2N-1$: Equation 462

$$F[2\times N\times k+i]=\begin{pmatrix} 0 & \beta\times e^{j(v_{12}+\psi_{11}(i)+Y_k)} \\ \gamma\times e^{j(v_{21}+\psi_{21}(i))} & \delta\times e^{j(v_{22}+\psi_{21}(i))} \end{pmatrix}$$

Here, k=0, 1, . . . , M−2, M−1.

Another example is shown below. In the scheme of regularly hopping between precoding matrices over a period (cycle) with 2N slots, the precoding matrices prepared for the 2N slots are represented as follows.

Math 541

$$\text{For } i = 0, 1, 2, \ldots, N-2, N-1: \quad F[i] = \begin{pmatrix} A \times e^{j(\mu_{11}+\theta_{11}(i))} & 0 \\ C \times e^{j(\mu_{21}+\theta_{21}(i))} & D \times e^{j(\mu_{22}+\theta_{21}(i))} \end{pmatrix} \quad \text{Equation 463}$$

Here, let A, C, and D be real numbers, and $\mu_{11}$, $\mu_{21}$, and $\mu_{22}$ be real numbers expressed in radians. In addition, A, C, and D are fixed values not depending on i. Similarly, $\mu_{11}$, $\mu_{21}$, and $\mu_{22}$ are fixed values not depending on i.

Math 542

$$\text{For } i = N, N+1, N+2, \ldots, 2N-2, 2N-1: \quad F[i] = \begin{pmatrix} \alpha \times e^{j(v_{11}+\psi_{11}(i))} & \beta \times e^{j(v_{12}+\psi_{11}(i))} \\ 0 & \delta \times e^{j(v_{22}+\psi_{21}(i))} \end{pmatrix} \quad \text{Equation 464}$$

Here, let α, β, and δ be real numbers, and $v_{11}$, $v_{12}$, and $v_{22}$ be real numbers expressed in radians. In addition, α, β, and δ are fixed values not depending on i. Similarly, $v_{11}$, $v_{12}$, and $v_{22}$ are fixed values not depending on i. Furthermore, the 2×N×M period (cycle) precoding matrices based on Equations 463 and 464 are represented by the following equation.

Math 543

$$\text{For } i = 0, 1, 2, \ldots, N-2, N-1: \quad F[2 \times N \times k + i] = \begin{pmatrix} A \times e^{j(\mu_{11}+\theta_{11}(i))} & 0 \\ C \times e^{j(\mu_{21}+\theta_{21}(i)+X_k)} & D \times e^{j(\mu_{22}+\theta_{21}(i)+X_k)} \end{pmatrix} \quad \text{Equation 465}$$

Here, k=0, 1, . . . , M−2, M−1.

Math 544

$$\text{For } i = N, N+1, N+2, \ldots, 2N-2, 2N-1: \quad F[2 \times N \times k + i] = \begin{pmatrix} \alpha \times e^{j(v_{11}+\psi_{11}(i))} & \beta \times e^{j(v_{12}+\psi_{11}(i))} \\ 0 & \delta \times e^{j(v_{22}+\psi_{21}(i)+Y_k)} \end{pmatrix} \quad \text{Equation 466}$$

Here, k=0, 1, . . . , M−2, M−1. Furthermore, Xk=Yk may be true, or Xk≠Yk may be true.

Precoding matrices F[0] to F[2×N×M−1] are thus generated (the precoding matrices F[0] to F[2×N×M−1] may be in any order for the 2×N×M slots in the period (cycle)). Symbol number 2×N×M×i may be precoded using F[0], symbol number 2×N×M×i+1 may be precoded using F[1], . . . , and symbol number 2×N×M×i+h may be precoded using F[h], for example (h=0, 1, 2, . . . , 2×N×M−2, 2×N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality.

The 2×N×M period (cycle) precoding matrices in Equation 465 may be changed to the following equation.

Math 545

$$\text{For } i = 0, 1, 2, \ldots, N-2, N-1: \quad F[2 \times N \times k + i] = \begin{pmatrix} A \times e^{j(\mu_{11}+\theta_{11}(i)+X_k)} & 0 \\ C \times e^{j(\mu_{21}+\theta_{21}(i))} & D \times e^{j(\mu_{22}+\theta_{21}(i))} \end{pmatrix} \quad \text{Equation 467}$$

Here, k=0, 1, . . . , M−2, M−1.

The 2×N×M period (cycle) precoding matrices in Equation 466 may be changed to the following equation.

Math 546

$$\text{For } i = N, N+1, N+2, \ldots, 2N-2, 2N-1: \quad F[2 \times N \times k + i] = \begin{pmatrix} \alpha \times e^{j(v_{11}+\psi_{11}(i)+Y_k)} & \beta \times e^{j(v_{12}+\psi_{11}(i)+Y_k)} \\ 0 & \delta \times e^{j(v_{22}+\psi_{21}(i))} \end{pmatrix} \quad \text{Equation 468}$$

Here, k=0, 1, . . . , M−2, M−1.

Another example is shown below. In the scheme of regularly hopping between precoding matrices over a period (cycle) with 2N slots, the precoding matrices prepared for the 2N slots are represented as follows.

Math 547

$$\text{For } i = 0, 1, 2, \ldots, N-2, N-1: \quad F[i] = \begin{pmatrix} A \times e^{j(\mu_{11}+\theta_{11}(i))} & 0 \\ C \times e^{j(\mu_{21}+\theta_{21}(i))} & D \times e^{j(\mu_{22}+\theta_{21}(i))} \end{pmatrix} \quad \text{Equation 469}$$

Here, let A, C, and D be real numbers, and $\mu_{11}$, $\mu_{21}$, and $\mu_{22}$ be real numbers expressed in radians. In addition, A, C, and D are fixed values not depending on i. Similarly, $\mu_{11}$, $\mu_{21}$, and $\mu_{22}$ are fixed values not depending on i.

Math 548

$$\text{For } i = N, N+1, N+2, \ldots, 2N-2, 2N-1: \quad F[i] = \begin{pmatrix} 0 & \beta \times e^{j(v_{12}+\psi_{11}(i))} \\ \gamma \times e^{j(v_{21}+\psi_{21}(i))} & \delta \times e^{j(v_{22}+\psi_{21}(i))} \end{pmatrix} \quad \text{Equation 470}$$

Here, let β, γ, and δ be real numbers, and $v_{12}$, $v_{21}$, and $v_{22}$ be real numbers expressed in radians. In addition, β, γ, and δ are fixed values not depending on i. Similarly, $v_{12}$, $v_{21}$, and $v_{22}$ are fixed values not depending on i. Furthermore, the 2×N×M period (cycle) precoding matrices based on Equations 469 and 470 are represented by the following equation.

Math 549

$$\text{For } i=0,1,2,\ldots,N-2,N-1: \quad \text{Equation 471}$$

$$F[2\times N\times k+i]=\begin{pmatrix} A\times e^{j(\mu_{11}+\theta_{11}(i))} & 0 \\ C\times e^{j(\mu_{21}+\theta_{21}(i)+X_k)} & D\times e^{j(\mu_{22}+\theta_{21}(i)+X_k)} \end{pmatrix}$$

Here, k=0, 1, . . . , M−2, M−1.

Math 550

$$\text{For } i=N,N+1,N+2,\ldots,2N-2,2N-1: \quad \text{Equation 472}$$

$$F[2\times N\times k+i]=\begin{pmatrix} 0 & \beta\times e^{j(\nu_{12}+\psi_{11}(i))} \\ \gamma\times e^{j(\nu_{21}+\psi_{21}(i)+Y_k)} & \delta\times e^{j(\nu_{22}+\psi_{21}(i)+Y_k)} \end{pmatrix}$$

Here, k=0, 1, . . . , M−2, M−1. Furthermore, Xk=Yk may be true, or Xk≠Yk may be true.

Precoding matrices F[0] to F[2×N×M−1] are thus generated (the precoding matrices F[0] to F[2×N×M−1] may be in any order for the 2×N×M slots in the period (cycle)). Symbol number 2×N×M×i may be precoded using F[0], symbol number 2×N×M×i+1 may be precoded using F[1], . . . , and symbol number 2×N×M×i+h may be precoded using F[h], for example (h=0, 1, 2, . . . , 2×N×M−2, 2×N×M−1). (In this case, as described in previous embodiments, precoding matrices need not be hopped between regularly.)

Generating the precoding matrices in this way achieves a precoding matrix hopping scheme with a large period (cycle), allowing for the position of poor reception points to be easily changed, which may lead to improved data reception quality.

The 2×N×M period (cycle) precoding matrices in Equation 471 may be changed to the following equation.

Math 551

$$\text{For } i=0,1,2,\ldots,N-2,N-1: \quad \text{Equation 473}$$

$$F[2\times N\times k+i]=\begin{pmatrix} A\times e^{j(\mu_{11}+\theta_{11}(i)+X_k)} & 0 \\ C\times e^{j(\mu_{21}+\theta_{21}(i))} & D\times e^{j(\mu_{22}+\theta_{21}(i))} \end{pmatrix}$$

Here, k=0, 1, . . . , M−2, M−1.

The 2×N×M period (cycle) precoding matrices in Equation 472 may be changed to the following equation.

Math 552

$$\text{For } i=N,N+1,N+2,\ldots,2N-2,2N-1: \quad \text{Equation 474}$$

$$F[2\times N\times k+i]=\begin{pmatrix} 0 & \beta\times e^{j(\nu_{12}+\psi_{11}(i)+Y_k)} \\ \gamma\times e^{j(\nu_{21}+\psi_{21}(i))} & \delta\times e^{j(\nu_{22}+\psi_{21}(i))} \end{pmatrix}$$

Here, k=0, 1, . . . , M−2, M−1.

Focusing on poor reception points in the above examples, the following conditions are important.

Math 553

$$e^{j(\theta_{11}(x)-\theta_{21}(x))}\neq e^{j(\theta_{11}(y)-\theta_{21}(y))} \quad \text{Condition \#81}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 554

$$e^{j(\psi_{11}(x)-\psi_{21}(x))}\neq e^{j(\psi_{11}(y)-\psi_{21}(y))} \quad \text{Condition \#82}$$

for ∀x, ∀y (x≠y; x,y=N, N−1, N−2, . . . , 2N−2, 2N−1)

(x is N, N+1, N+2, . . . , 2N−2, 2N−1; y is N, N+1, N+2, . . . , 2N−2,2N−1; and x≠y.)

Math 555

$$\theta_{11}(x)=\theta_{11}(x+N)$$

for ∀x (x=0, 1, 2, . . . , N−2, N−1) and $$\theta_{21}(y)=\theta_{21}(y+N) \quad \text{Condition \#83}$$

for ∀y (y is 0, 1, 2, . . . , N−2, N−1)

Math 556

$$\psi_{11}(x)=\psi_{11}(x+N)$$

for ∀x (x=N, N+1, N+2, . . . , 2N−2, 2N−1) and $$\psi_{21}(y)=\psi_{21}(y+N) \quad \text{Condition \#84}$$

for ∀y (y=N, N+1, N+2, . . . , 2N−2, 2N−1)

By satisfying the conditions shown above, excellent data reception quality is achieved. Furthermore, the following conditions should be satisfied (See Embodiment 24).

Math 557

$$e^{j(\theta_{11}(x)-\theta_{21}(x))}\neq e^{j(\theta_{11}(y)-\theta_{21}(y))} \quad \text{Condition \#85}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 558

$$e^{j(\psi_{11}(x)-\psi_{21}(x))}\neq e^{j(\psi_{11}(y)-\psi_{21}(y))} \quad \text{Condition \#86}$$

for ∀x, ∀y (x≠y; x,y=N, N+1, N+2, . . . , 2N−2, 2N−1)

(x is N, N+1, N+2, . . . , 2N−2, 2N−1; y is N, N+1, N+2, . . . , 2N−2, 2N−1; and x≠y.)

Focusing on Xk and Yk, the following conditions are noted.

Math 559

$$X_a\neq X_b+2\times s\times\pi \quad \text{Condition \#87}$$

for ∀a, ∀b (a≠b; a,b=0, 1, 2, . . . , M−2, M−1)

(a is 0, 1, 2, . . . , M−2, M−1; b is 0, 1, 2, . . . , M−2, M−1; and a≠b.)

Here, s is an integer.

Math 560

$$Y_a\neq Y_b+2\times u\times\pi \quad \text{Condition \#88}$$

for ∀a, ∀b (a≠b; a,b=0, 1, 2, . . . , M−2, M−1)

(a is 0, 1, 2, . . . , M−2, M−1; b is 0, 1, 2, . . . , M−2, M−1; and a≠b.)

(Here, u is an integer.)

By satisfying the two conditions shown above, excellent data reception quality is achieved. In Embodiment 25, Condition #87 should be satisfied.

The present embodiment describes the scheme of structuring 2×N×M different precoding matrices for a precoding hopping scheme with 2N×M slots in the time period (cycle). In this case, as the 2×N×M different precoding matrices, F[0], F[1], F[2], . . . , F[2×N×M−2], F[2×N×M−1] are prepared. In a single carrier transmission scheme, symbols are arranged in the order F[0], F[1], F[2], . . . , F[2×N×M−2], F[2×N×M−1] in the time domain (or the frequency domain in the case of multi-carrier). However, this is not the only example, and the 2×N×M different precoding matrices F[0], F[1], F[2], . . . , F[2×N×M−2], F[2×N×M−1] generated in the present embodiment may be adapted to a multi-carrier transmission scheme such as an OFDM transmission scheme or the like.

As in Embodiment 1, as a scheme of adaption in this case, precoding weights may be changed by arranging symbols in the frequency domain or in the frequency-time domain. Note that a precoding hopping scheme with 2×N×M slots the time period (cycle) has been described, but the same advantageous effects may be obtained by randomly using 2×N×M different precoding matrices. In other words, the 2×N×M different precoding matrices do not necessarily need to be used in a regular period (cycle).

Furthermore, in the precoding matrix hopping scheme over an H-slot period (cycle) (H being a natural number larger than the number of slots 2×N×M in the period (cycle) of the above scheme of regularly hopping between precoding matrices), when the 2×N×M different precoding matrices of the present embodiment are included, the probability of excellent reception quality increases.

Embodiment A1

In the present embodiment, a detailed description is given of a scheme for adapting the above-described transmission schemes that regularly hops between precoding matrices to a communications system compliant with the DVB (Digital Video Broadcasting)-T2 (T:Terrestrial) standard (DVB for a second generation digital terrestrial television broadcasting system).

Figure 61:
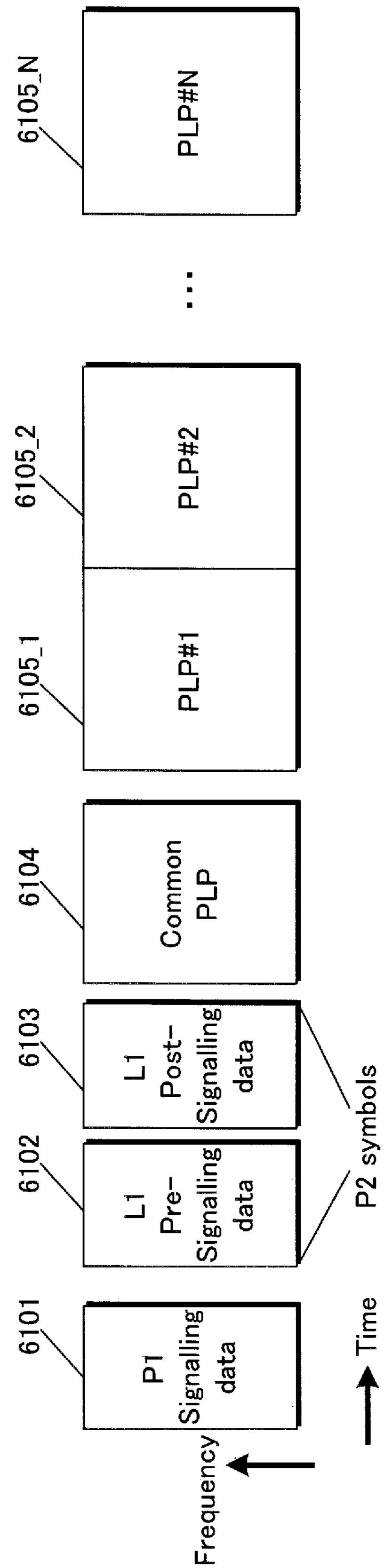
FIG. 61 is an example of the frame structure.

FIG. 61 is an overview of the frame structure of a signal a signal transmitted by a broadcast station according to the DVB-T2 standard. According to the DVB-T2 standard, an OFDM scheme is employed. Thus, frames are structured in the time and frequency domains. FIG. 61 shows the frame structure in the time and frequency domains. The frame is composed of P1 Signalling data (6101), L1 Pre-Signalling data (6102), L1 Post-Signalling data (6103), Common PLP (6104), and PLPs #1 to #N (6105_1 to 6105_N) (PLP: Physical Layer Pipe). (Here, L1 Pre-Signalling data (6102) and L1 Post-Signalling data (6103) are referred to as P2 symbols.) As above, the frame composed of P1 Signalling data (6101), L1 Pre-Signalling data (6102), L1 Post-Signalling data (6103), Common PLP (6104), and PLPs #1 to #N (6105_1 to 6105_N) is referred to as a T2 frame, which is a unit of frame structure.

The P1 Signalling data (6101) is a symbol for use by a reception device for signal detection and frequency synchronization (including frequency offset estimation). Also, the P1 Signalling data (6101) transmits information including information indicating the FFT (Fast Fourier Transform) size, and information indicating which of SISO (Single-Input Single-Output) and MISO (Multiple-Input Single-Output) is employed to transmit a modulated signal. (The SISO scheme is for transmitting one modulated signal, whereas the MISO scheme is for transmitting a plurality of modulated signals using space-time block coding.)

The L1 Pre-Signalling data (6102) transmits information including: information about the guard interval used in transmitted frames; information about PAPR (Peak to Average Power Ratio) method; information about the modulation scheme, error correction scheme (FEC: Forward Error Correction), and coding rate of the error correction scheme all used in transmitting L1 Post-Signalling data; information about the size of L1 Post-Signalling data and the information size; information about the pilot pattern; information about the cell (frequency region) unique number; and information indicating which of the normal mode and extended mode (the respective modes differs in the number of subcarriers used in data transmission) is used.

The L1 Post-Signalling data (6103) transmits information including: information about the number of PLPs; information about the frequency region used; information about the unique number of each PLP; information about the modulation scheme, error correction scheme, coding rate of the error correction scheme all used in transmitting the PLPs; and information about the number of blocks transmitted in each PLP.

The Common PLP (6104) and PLPs #1 to #N (6105_1 to 6105N) are fields used for transmitting data.

Figure 62:
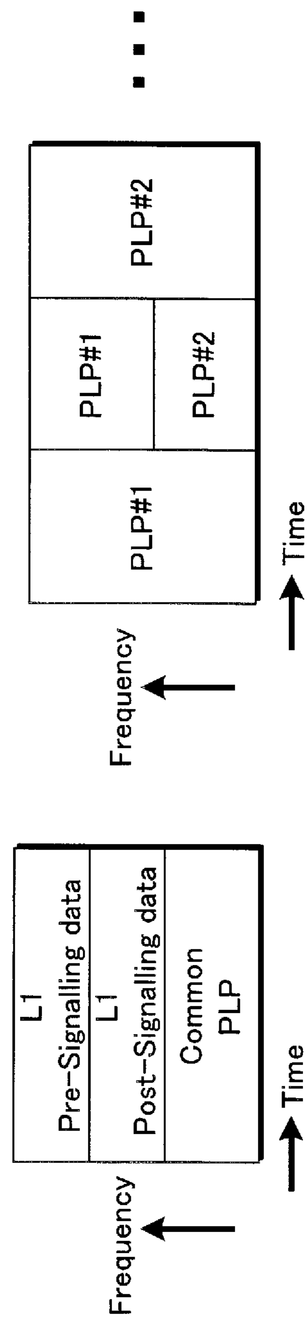
FIG. 62 is an example of a frame structure in the time and frequency domain.

In the frame structure shown in FIG. 61, the P1 Signalling data (6101), L1 Pre-Signalling data (6102), L1 Post-Signalling data (6103), Common PLP (6104), and PLPs #1 to #N (6105_1 to 6105_N) are illustrated as being transmitted by time-sharing. In practice, however, two or more of the signals are concurrently present. FIG. 62 shows such an example. As shown in FIG. 62, L1 Pre-Signalling data, L1 Post-Signalling data, and Common PLP may be present at the same time, and PLP #1 and PLP#2 may be present at the same time. That is, the signals constitute a frame using both time-sharing and frequency-sharing.

Figure 63:
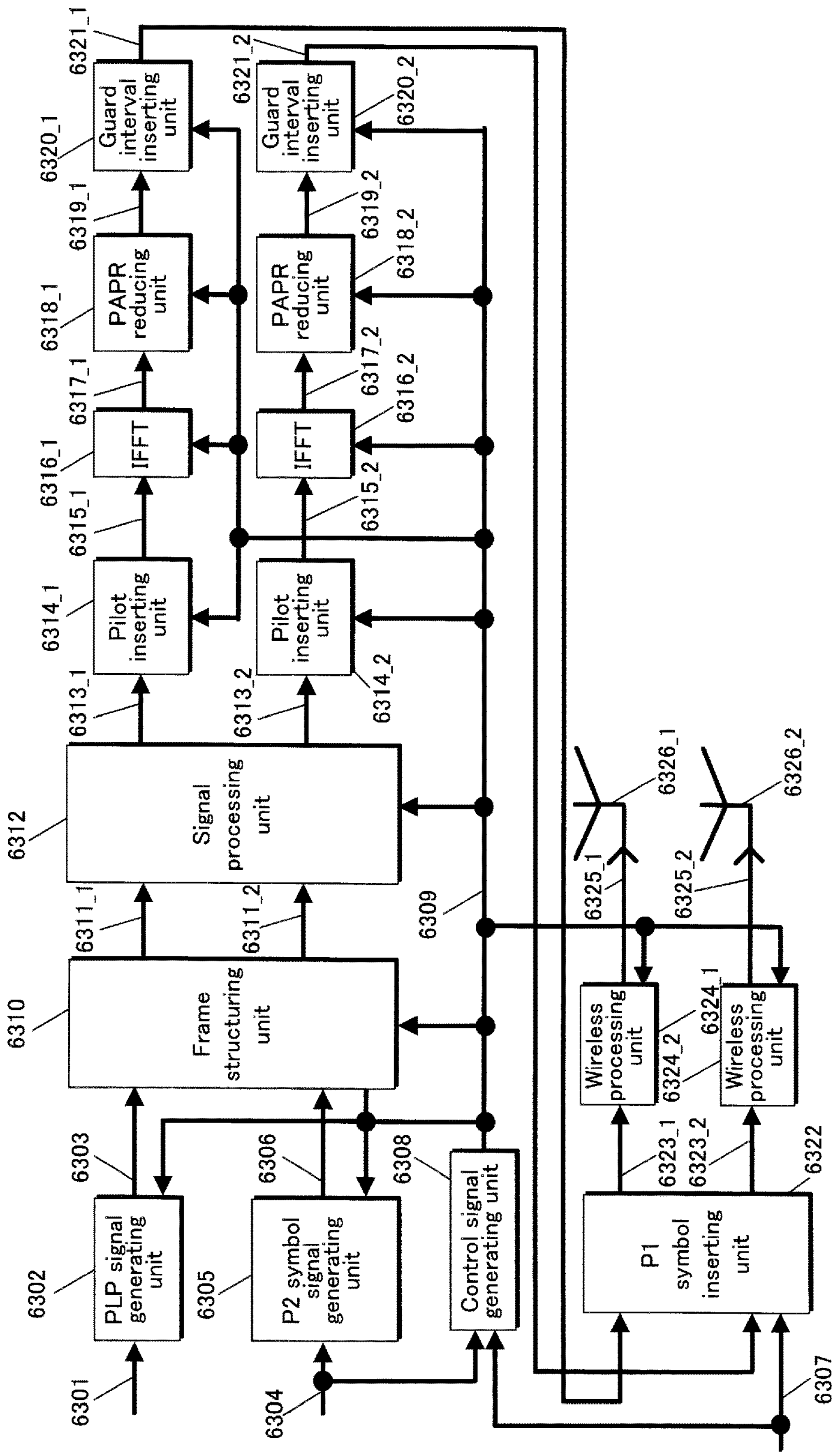
FIG. 63 is an example of a structure of a transmission device.

FIG. 63 shows an example of the structure of a transmission device obtained by applying the above-described schemes of regularly hopping between precoding matrices to a transmission device compliant with the DVB-T2 standard (i.e., to a transmission device of a broadcast station). A PLP signal generating unit 6302 receives PLP transmission data (transmission data for a plurality of PLPs) 6301 and a control signal 6309 as input, performs mapping of each PLP according to the error correction scheme and modulation scheme indicated for the PLP by the information included in the control signal 6309, and outputs a (quadrature) baseband signal 6303 carrying a plurality of PLPs.

A P2 symbol signal generating unit 6305 receives P2 symbol transmission data 6304 and the control signal 6309 as input, performs mapping according to the error correction scheme and modulation scheme indicated for each P2 symbol by the information included in the control signal 6309, and outputs a (quadrature) baseband signal 6306 carrying the P2 symbols.

A control signal generating unit 6308 receives P1 symbol transmission data 6307 and P2 symbol transmission data 6304 as input, and then outputs, as the control signal 6309, information about the transmission scheme (the error correction scheme, coding rate of the error correction, modulation scheme, block length, frame structure, selected transmission schemes including a transmission scheme that regularly hops between precoding matrices, pilot symbol insertion scheme, IFFT (Inverse Fast Fourier Transform)/FFT, method of reducing PAPR, and guard interval insertion scheme) of each symbol group shown in FIG. 61 (P1 Signalling data (6101), L1 Pre-Signalling data (6102), L1 Post-Signalling data (6103), Common PLP (6104), PLPs #1 to #N (6105_1 to 6105_N)). A frame structuring unit 6310 receives, as input, the baseband signal 6303 carrying PLPs, the baseband signal 6306 carrying P2 symbols, and the control signal 630. On receipt of the input, the frame structuring unit 6310 changes the order of input data in frequency domain and time domain based on the information about frame structure included in the control signal, and outputs a (quadrature) baseband signal 6311_1 corresponding to stream 1 and a (quadrature) baseband signal 6311_2 corresponding to stream 2 both in accordance with the frame structure.

A signal processing unit 6312 receives, as input, the baseband signal 6311_1 corresponding to stream 1, the baseband signal 6311_2 corresponding to stream 2, and the control signal 6309 and outputs a modulated signal 1 (6313_1) and a modulated signal 2(6313_2) each obtained as a result of signal processing based on the transmission scheme indicated by information included in the control signal 6309. The characteristic feature noted here lies in the following. That is, when a transmission scheme that regularly hops between precoding matrices is selected, the signal processing unit hops between precoding matrices and performs weighting (precoding) in a manner similar to FIGS. 6, 22, 23, and 26. Thus, precoded signals so obtained are the modulated signal 1 (6313_1) and modulated signal 2 (6313_2) obtained as a result of the signal processing.

A pilot inserting unit 6314_1 receives, as input, the modulated signal 1 (6313_1) obtained as a result of the signal processing and the control signal 6309, inserts pilot symbols into the received modulated signal 1 (6313_1), and outputs a modulated signal 6315_1 obtained as a result of the pilot signal insertion. Note that the pilot symbol insertion is carried out based on information indicating the pilot symbol insertion scheme included the control signal 6309.

A pilot inserting unit 6314_2 receives, as input, the modulated signal 2 (6313_2) obtained as a result of the signal processing and the control signal 6309, inserts pilot symbols into the received modulated signal 2 (6313_2), and outputs a modulated signal 6315_2 obtained as a result of the pilot symbol insertion. Note that the pilot symbol insertion is carried out based on information indicating the pilot symbol insertion scheme included the control signal 6309.

An IFFT (Inverse Fast Fourier Transform) unit 6316_1 receives, as input, the modulated signal 6315_1 obtained as a result of the pilot symbol insertion and the control signal 6309, and applies IFFT based on the information about the IFFT method included in the control signal 6309, and outputs a signal 6317_1 obtained as a result of the IFFT.

An IFFT unit 6316_2 receives, as input, the modulated signal 6315_2 obtained as a result of the pilot symbol insertion and the control signal 6309, and applies IFFT based on the information about the IFFT method included in the control signal 6309, and outputs a signal 6317_2 obtained as a result of the IFFT.

A PAPR reducing unit 6318_1 receives, as input, the signal 6317_1 obtained as a result of the IFFT and the control signal 6309, performs processing to reduce PAPR on the received signal 6317_1, and outputs a signal 6319_1 obtained as a result of the PAPR reduction processing. Note that the PAPR reduction processing is performed based on the information about the PAPR reduction included in the control signal 6309.

A PAPR reducing unit 6318_2 receives, as input, the signal 6317_2 obtained as a result of the IFFT and the control signal 6309, performs processing to reduce PAPR on the received signal 6317_2, and outputs a signal 6319_2 obtained as a result of the PAPR reduction processing. Note that the PAPR reduction processing is carried out based on the information about the PAPR reduction included in the control signal 6309.

A guard interval inserting unit 6320_1 receives, as input, the signal 6319_1 obtained as a result of the PAPR reduction processing and the control signal 6309, inserts guard intervals into the received signal 6319_1, and outputs a signal 6321_1 obtained as a result of the guard interval insertion. Note that the guard interval insertion is carried out based on the information about the guard interval insertion scheme included in the control signal 6309.

A guard interval inserting unit 6320_2 receives, as input, the signal 6319_2 obtained as a result of the PAPR reduction processing and the control signal 6309, inserts guard intervals into the received signal 6319_2, and outputs a signal 6321_2 obtained as a result of the guard interval insertion. Note that the guard interval insertion is carried out based on the information about the guard interval insertion scheme included in the control signal 6309.

A P1 symbol inserting unit 6322 receives, as input, the signal 6321_1 obtained as a result of the guard interval insertion, the signal 6321_2 obtained as a result of the guard interval insertion, and the P1 symbol transmission data 6307, generates a P1 symbol signal from the P1 symbol transmission data 6307, adds the P1 symbol to the signal 6321_1 obtained as a result of the guard interval insertion, and adds the P1 symbol to the signal 6321_2 obtained as a result of the guard interval insertion. Then, the P1 symbol inserting unit 6322 outputs a signal 6323_1 obtained as a result of the processing related to P1 symbol and a signal 6323_2 obtained as a result of the processing related to P1 symbol. Note that a P1 symbol signal may be added to both the signals 6323_1 and 6323_2 or to one of the signals 6323_1 and 6323_2. In the case where the P1 symbol signal is added to one of the signals 6323_1 and 6323_2, the following is noted. For purposes of description, an interval of the signal to which a P1 symbol is added is referred to as a P1 symbol interval. Then, the signal to which a P1 signal is not added includes, as a baseband signal, a zero signal in an interval corresponding to the P1 symbol interval of the other signal. A wireless processing unit 6324_1 receives the signal 6323_1 obtained as a result of the processing related to P1 symbol, performs processing such as frequency conversion, amplification, and the like, and outputs a transmission signal 6325_1. The transmission signal 6325_1 is then output as a radio wave from an antenna 6326_1.

A wireless processing unit 6324_2 receives the signal 6323_2 obtained as a result of the processing related to P1 symbol, performs processing such as frequency conversion, amplification, and the like, and outputs a transmission signal 6325_2. The transmission signal 6325_2 is then output as a radio wave from an antenna 6326_2.

Next, a detailed description is given of the frame structure of a transmission signal and the transmission scheme of control information (information carried by the P1 symbol and P2 symbols) employed by a broadcast station (base station) in the case where the scheme of regularly hopping between precoding matrices is adapted to a DVB-T2 system.

Figure 64:
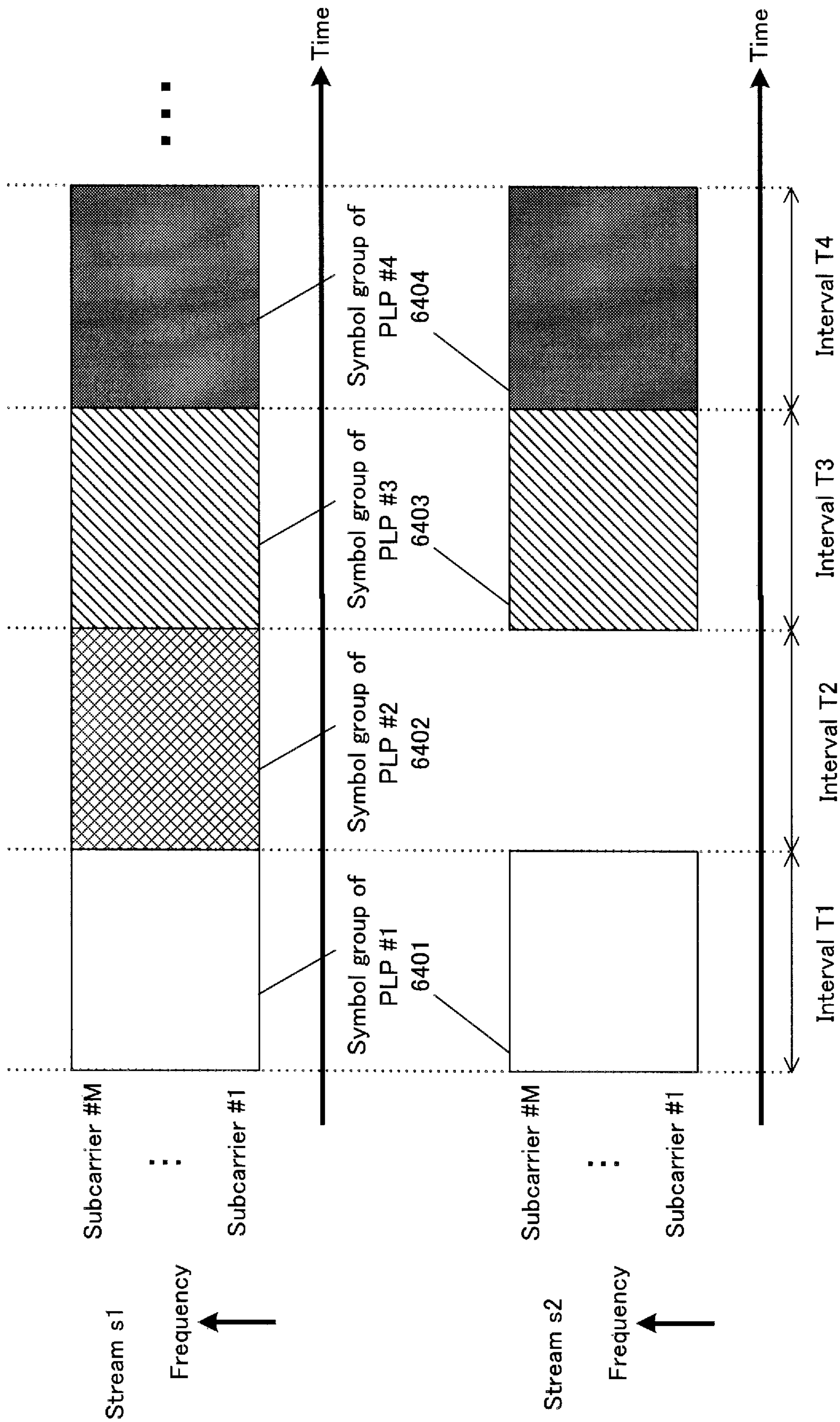
FIG. 64 is an example of a frame structure in the frequency and time domain.

FIG. 64 shows an example of the frame structure in the time and frequency domains, in the case where a plurality of PLPs are transmitted after transmission of P1 symbol, P2 symbols, and Common PLP. In FIG. 64, stream s1 uses subcarriers #1 to #M in the frequency domain. Similarly, stream s2 uses subcarriers #1 to #M in the frequency domain. Therefore, when streams s1 and s2 both have a symbol in the same subcarrier and at the same time, symbols of the two streams are present at the same frequency. In the case where precoding performed includes the precoding according to the scheme for regularly hopping between precoding matrices as described in the other embodiments, streams s1 and s2 are subjected to weighting performed using the precoding matrices and z1 and z2 are output from the respective antennas.

As shown in FIG. 64, in interval 1, a symbol group 6401 of PLP #1 is transmitted using streams s1 and s2, and the data transmission is carried out using the spatial multiplexing MIMO system shown in FIG. 49 or the MIMO system with a fixed precoding matrix.

In interval 2, a symbol group 6402 of PLP #2 is transmitted using stream s1, and the data transmission is carried out by transmitting one modulated signal.

In interval 3, a symbol group 6403 of PLP #3 is transmitted using streams s1 and s2, and the data transmission is carried out using a precoding scheme of regularly hopping between precoding matrices.

In interval 4, a symbol group 6404 of PLP #4 is transmitted using streams s1 and s2, and the data transmission is carried out using space-time block coding shown in FIG. 50. Note that the symbol arrangement used in space-time block coding is not limited to the arrangement in the time domain. Alternatively, the symbol arrangement may be in the frequency domain or in symbol groups formed in the time and frequency domains. In addition, the space-time block coding is not limited to the one shown in FIG. 50.

In the case where a broadcast station transmits PLPs in the frame structure shown in FIG. 64, a reception device receiving the transmission signal shown in FIG. 64 needs to know the transmission scheme used for each PLP. As has been already described above, it is therefore necessary to transmit information indicating the transmission scheme for each PLP, using L1 Post-Signalling data (6103 shown in FIG. 61), which is a P2 symbol. The following describes an example of the scheme of structuring a P1 symbol used herein and the scheme of structuring a P2 symbol used herein.

Table 3 shows a specific example of control information transmitted using a P1 symbol.

TABLE 3

| | |
|---|---|
| S1 | 000: T2_SISO (One modulated signal transmission compliant with DVB-T2 standard)<br>001: T2_MISO (Transmission using space-time block coding compliant with DVB-T2 standard)<br>010: NOT_T2 (compliant with standard other than DVB-T2) |

According to the DVB-T2 standard, the control information S1 (three bits) enables the reception device to determine whether or not the DVB-T2 standard is used and also to determine, if DVB-T2 is used, which transmission scheme is used. If the three bits are set to “000”, the S1 information indicates that the modulated signal transmitted in accordance with “transmission of a modulated signal compliant with the DVB-T2 standard”.

If the three bits are set to “001”, the S1 information indicates that the modulated signal transmitted is in accordance with “transmission using space-time block coding compliant with the DVB-T2 standard”.

In the DVB-T2 standard, the bit sets “010” to “111” are “Reserved” for future use. In order to adapt the present invention in a manner to establish compatibility with the DVB-T2, the three bits constituting the S1 information may be set to “010” (or any bit set other than “000” and “001”) to indicate that the modulated signal transmitted is compliant with a standard other than DVB-T2. On determining that the S1 information received is set to “010”, the reception device is informed that the modulated signal transmitted from the broadcast station is compliant with a standard other than DVB-T2.

Next, a description is given of examples of the scheme of structuring a P2 symbol in the case where a modulated signal transmitted by the broadcast station is compliant with a standard other than DVB-T2. The first example is directed to a scheme in which P2 symbol compliant with the DVB-T2 standard is used.

Table 4 shows a first example of control information transmitted using L1 Post-Signalling data, which is one of P2 symbols.

TABLE 4

| | |
|---|---|
| PLP_MODE (2 bits) | 00: SISO/SIMO<br>01: MISO/MIMO (Space-time block code)<br>10: MIMO (Precoding scheme of regularly hopping between precoding matrices)<br>11: MIMO (MIMO system with fixed precoding matrix or Spatial multiplexing MIMO system) |

SISO: Single-Input Single-Output (one modulated signal is transmitted and receive with one antenna)

SIMO: Single-Input Multiple-Output (one modulated signal is transmitted and received with a plurality of antennas)

MISO: Multiple-Input Single-Output (a plurality of modulated signals are transmitted from a plurality of antennas and received with one antenna)

MIMO: Multiple-Input Multiple-Output (a plurality of modulated signals are transmitted from a plurality of antennas and received with a plurality of antennas)

The 2-bit information “PLP_MODE” shown in Table 4 is control information used to indicate the transmission scheme used for each PLP as shown in FIG. 64 (PLPs #1 to #4 in FIG. 64). That is, a separate piece of “PLP_MODE” information is provided for each PLP. That is, in the example shown in FIG. 64, PLP_MODE for PLP #1, PLP_MODE for PLP #2, PLP_MODE for PLP #3, PLP_MODE for PLP #4 . . . are transmitted from the broadcast station. As a matter of course, by demodulating (and also performing error correction) those pieces of information, the terminal at the receiving end is enabled to recognize the transmission scheme that the broadcast station used for transmitting each PLP.

When the PLP_MODE is set to “00”, the data transmission by a corresponding PLP is carried out by “transmitting one modulated signal”. When the PLP_MODE is set to “01”, the data transmission by a corresponding PLP is carried out by “transmitting a plurality of modulated signals obtained by space-time block coding”. When the PLP_MODE is set to “10”, the data transmission by a corresponding PLP is carried out using a “precoding scheme of regularly hopping between precoding matrices”. When the PLP_MODE is set to “11”, the data transmission by a corresponding PLP is carried out using a “MIMO system with a fixed precoding matrix or spatial multiplexing MIMO system”.

Note that when the PLP_MODE is set to “01” to “11”, the information indicating the specific processing conducted by the broadcast station (for example, the specific hopping scheme used in the scheme of regularly hopping between precoding matrices, the specific space-time block coding scheme used, and the structure of precoding matrices used) needs to be notified to the terminal. The following describes the scheme of structuring control information that includes such information and that is different from the example shown in Table 4.

Table 5 shows a second example of control information transmitted using L1 Post-Signalling data, which is one of P2 symbols. The second example shown in Table 5 is different from the first example shown in Table 4.

TABLE 5

| | |
|---|---|
| PLP_MODE (1 bit) | 0: SISO/SIMO<br>1: MISO/MIMO<br>(Space-time block coding, or<br>Precoding scheme of regularly hopping between precoding matrices, or<br>MIMO system with fixed precoding matrix, or<br>Spatial multiplexing MIMO system) |
| MIMO_MODE (1 bit) | 0: Precoding scheme of regularly hopping between precoding matrices --- OFF<br>1: Precoding scheme of regularly hopping between precoding matrices --- ON |
| MIMO_PATTERN #1 (2 bits) | 00: Space-time block coding<br>01: MIMO system with fixed precoding matrix and Precoding matrix #1<br>10: MIMO system with fixed precoding matrix and Precoding matrix #2<br>11: Spatial multiplexing MIMO system |
| MIMO_PATTERN #2 (2 bits) | 00: Precoding scheme of regularly hopping between precoding matrices, using precoding matrix hopping scheme #1<br>01: Precoding scheme of regularly hopping between precoding matrices, using precoding matrix hopping scheme #2<br>10: Precoding scheme of regularly hopping between recoding matrices, using precoding matrix hopping scheme #3<br>11: Precoding scheme of regularly hopping between precoding matrices, using precoding matrix hopping scheme #4 |

As shown in Table 5, the control information includes "PLP_MODE" which is one bit long, "MIMO_MODE" which is one bit long, "MIMO_PATTERN #1" which is two bits long, and "MIMO_PATTERN #2" which is two bits long. As shown in FIG. 64, these four pieces of control information is to notify the transmission scheme of a corresponding one of PLPs (PLPs #1 to #4 in the example shown in FIG. 64). Thus, a set of four pieces of information is provided for each PLP. That is, in the example shown in FIG. 64, the broadcast station transmits a set of PLP_MODE information, MIMO_MODE information, MIMO_PATTERN #1 information, and MIMO_PATTERN #2 information for PLP #1, a set of PLP_MODE information, MIMO_MODE information, MIMO_PATTERN #1 information, and MIMO_PATTERN #2 information for PLP #2, a set of PLP_MODE information, MIMO_MODE information, MIMO_PATTERN #1 information, and MIMO_PATTERN #2 information for PLP #3, a set of PLP_MODE information, MIMO_MODE information, MIMO_PATTERN #1 information, and MIMO_PATTERN #2 information for PLP #4 . . . . As a matter of course, by demodulating (and also performing error correction) those pieces of information, the terminal at the receiving end is enabled to recognize the transmission scheme that the broadcast station used for transmitting each PLP.

With the PLP_MODE set to "0", the data transmission by a corresponding PLP is carried out by "transmitting one modulated signal". With the PLP_MODE set to "1", the data transmission by a corresponding PLP is carried out by "transmitting a plurality of modulated signals obtained by space-time block coding", "precoding scheme of regularly hopping between precoding matrices", "MIMO system with a fixed precoding matrix", or "spatial multiplexing MIMO system".

With the "PLP_MODE" set to "1", the "MIMO_MODE" information is made effective. With "MIMO_MODE" set to "0", data transmission is carried out by a scheme other than the "precoding scheme of regularly hopping between precoding matrices". With "MIMO_MODE" set to "1", on the other hand, data transmission is carried out by the "precoding scheme of regularly hopping between precoding matrices".

With "PLP_MODE" set to "1" and "MIMO_MODE" set to "0", the "MIMO_PATTERN #1" information is made effective. With "MIMO_PATTERN #1" set to "00", data transmission is carried out using space-time block coding. With "MIMO_PATTERN" set to "01", data transmission is carried out using a precoding scheme in which weighting is performed using a fixed precoding matrix #1. With "MIMO_PATTERN" set to "10", data transmission is carried out using a precoding scheme in which weighting is performed using a fixed precoding matrix #2 (Note that the precoding matrix #1 and precoding matrix #2 are mutually different). When "MIMO_PATTERN" set to "11", data transmission is carried out using spatial multiplexing MIMO system (Naturally, it may be construed that Scheme 1 shown in FIG. 49 is selected here).

With "PLP_MODE" set to "1" and "MIMO_MODE" set to "1", the "MIMO_PATTERN #2" information is made effective. Then, with "MIMO_PATTERN #2" set to "00", data transmission is carried out using the precoding matrix hopping scheme #1 according to which precoding matrices are regularly hopped. With "MIMO_PATTERN #2" set to "01", data transmission is carried out using the precoding matrix hopping scheme #2 according to which precoding matrices are regularly hopped. With "MIMO_PATTERN #2" set to "10", data transmission is carried out using the precoding matrix hopping scheme #3 according to which precoding matrices are regularly hopped. With "MIMO_PATTERN #2" set to "11", data transmission is carried out using the precoding matrix hopping scheme #4 according to which precoding matrices are regularly hopped. Note that the precoding matrix hopping schemes #1 to #4 are mutually different. Here, to define a scheme being different, it is supposed that #A and #B are mutually different schemes and then one of the following is true.

The precoding matrices used in #A include the same matrices used in #b but the periods (cycles) of the matrices are different.

The precoding matrices used in #A include precoding matrices not used in #B.

None of the precoding matrices used in #A is used in #B.

Figure 65:
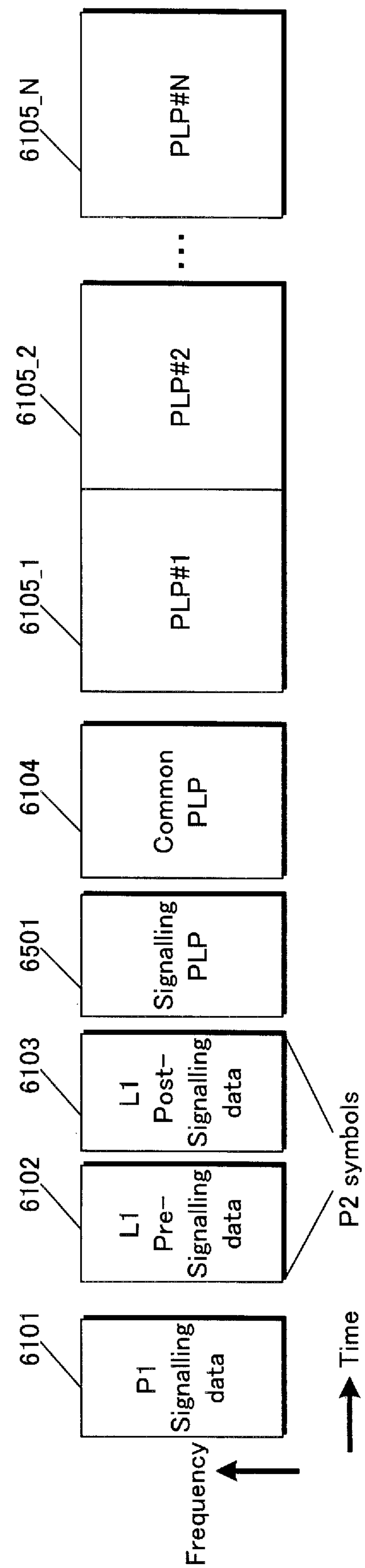
FIG. 65 is an example of the frame structure.

In the above description, the control information shown in Tables 4 and 5 is transmitted on L1 Post-Signalling data, which is one of P2 symbols. According to the DVB-T2 standard, however, the amount of information that can be transmitted as P2 symbols is limited. Therefore, addition of information shown in Tables 4 and 5 to the information required in the DVB-T2 standard to be transmitted using P2 symbols may result in an amount exceeding the maximum amount that can be transmitted as P2 symbols. In such a case, Signalling PLP (6501) may be provided as shown in FIG. 65 to transmit control information required by a standard other than the DVB-T2 standard (that is, data transmission is carried out using both L1 Post-Signalling data and Signalling PLP). In the example shown in FIG. 65, the same frame structure as shown in FIG. 61 is used. However, the frame structure is not limited to this specific example. For example, similarly to L1 Pre-signalling data and other data shown in FIG. 62, Signalling PLP may be allocated to a specific carrier range in a specific time domain in the time and frequency domains. In short, Signalling PLP may be allocated in the time and frequency domains in any way.

As described above, the present embodiment allows for choice of a scheme of regularly hopping between precoding matrices while using a multi-carrier scheme, such as an OFDM scheme, without compromising the compatibility with the DVB-T2 standard. This offers the advantages of obtaining high reception quality, as well as high transmission speed, in an LOS environment. While in the present embodiment, the transmission schemes to which α carrier group can be set are “a spatial multiplexing MIMO system, a MIMO scheme using a fixed precoding matrix, a MIMO scheme for regularly hopping between precoding matrices, space-time block coding, or a transmission scheme for transmitting only stream s1”, but the transmission schemes are not limited in this way. Furthermore, the MIMO scheme using a fixed precoding matrix limited to scheme #2 in FIG. 49, as any structure with a fixed precoding matrix is acceptable.

Furthermore, the above description is directed to a scheme in which the schemes selectable by the broadcast station are “a spatial multiplexing MIMO system, a MIMO scheme using a fixed precoding matrix, a MIMO scheme for regularly hopping between precoding matrices, space-time block coding, or a transmission scheme for transmitting only stream s1”. However, it is not necessary that all of the transmission schemes are selectable. Any of the following examples is also possible.

- A transmission scheme in which any of the following is selectable: a MIMO scheme using a fixed precoding matrix, a MIMO scheme for regularly hopping between precoding matrices, space-time block coding, and a transmission scheme for transmitting only stream s1.
- A transmission scheme in which any of the following is selectable: a MIMO scheme using a fixed precoding matrix, a MIMO scheme for regularly hopping between precoding matrices, and space-time block coding.
- A transmission scheme in which any of the following is selectable: a MIMO scheme using a fixed precoding matrix, a MIMO scheme for regularly hopping between precoding matrices, and a transmission scheme for transmitting only stream s1.
- A transmission scheme in which any of the following is selectable: a MIMO scheme for regularly hopping between precoding matrices, space-time block coding, and a transmission scheme for transmitting only stream s1.
- A transmission scheme in which any of the following is selectable: a MIMO scheme using a fixed precoding matrix, and a MIMO scheme for regularly hopping between precoding matrices.
- A transmission scheme in which any of the following is selectable: a MIMO scheme for regularly hopping between precoding matrices, and space-time block coding.
- A transmission scheme in which any of the following is selectable: a MIMO scheme for regularly hopping between precoding matrices, and transmission scheme for transmitting only stream s1.

As listed above, as long as a MIMO scheme for regularly hopping between precoding matrices is included as a selectable scheme, the advantageous effects of high-speed data transmission is obtained in an LOS environment, in addition to excellent reception quality for the reception device.

Here, it is necessary to set the control information S1 in P1 symbols as described above. In addition, as P2 symbols, the control information may be set differently from a scheme (the scheme for setting the transmission scheme of each PLP) shown in Table 4. Table 6 shows one example of such a scheme.

TABLE 6

| | |
|---|---|
| PLP-MODE (2 bits) | 00: SISO/SIMO<br>01: MISO/MIMO (Space-time block code)<br>10: MIMO (Precoding scheme of regularly hopping between precoding matrices)<br>11: Reserved |

Table 6 differs from Table 4 in that the “PLP_MODE” set to “11” is “Reserved.” In this way, the number of bits constituting the “PLP_MODE” shown in Tables 4 and 6 may be increased or decreased depending on the number of selectable PLP transmission schemes, in the case where the selectable transmission schemes are as shown in the above examples.

The same holds with respect to Table 5. For example, if the only MIMO scheme supported is a precoding scheme of regularly hopping between precoding matrices, the control information “MIMO_MODE” is no longer necessary. Furthermore, the control information “MIMO_PATTERN #1” may not be necessary in the case, for example, where a MIMO scheme using a fixed precoding matrix is not supported. Furthermore, the control information “MIMO_PATTERN #1” may be one bit long instead of two bits long, in the case where, for example, no more than one precoding matrix is required for a MIMO scheme using a fixed precoding matrix. Furthermore, the control information “MIMO_PATTERN #1” may be two bits long or more in the case where a plurality of precoding matrices are selectable.

The same applies to “MIMO_PATTERN #2”. That is, the control information “MIMO_PATTERN #2” may be one bit long instead of two bits long, in the case where no more than one precoding scheme of regularly hopping between precoding matrices is available. Alternatively, the control information “MIMO_PATTERN #2” may be two bits long or more in the case where a plurality of precoding schemes of regularly hopping between precoding matrices are selectable.

In the present embodiment, the description is directed to the transmission device having two antennas, but the number of antennas is not limited to two. With a transmission device having more than two antennas, the control information may be transmitted in the same manner. Yet, to enable the modulated signal transmission with the use of four antennas in addition to the modulated signal transmission with the use of two antennas, there may be a case where the number of bits constituting respective pieces of control information needs to be increased. In such a modification, it still holds that the control information is transmitted by the P1 symbol and the control information is transmitted by P2 symbols as set forth above.

The above description is directed to the frame structure of PLP symbol groups transmitted by a broadcast station in a time-sharing transmission scheme as shown in FIG. 64.

Figure 66:
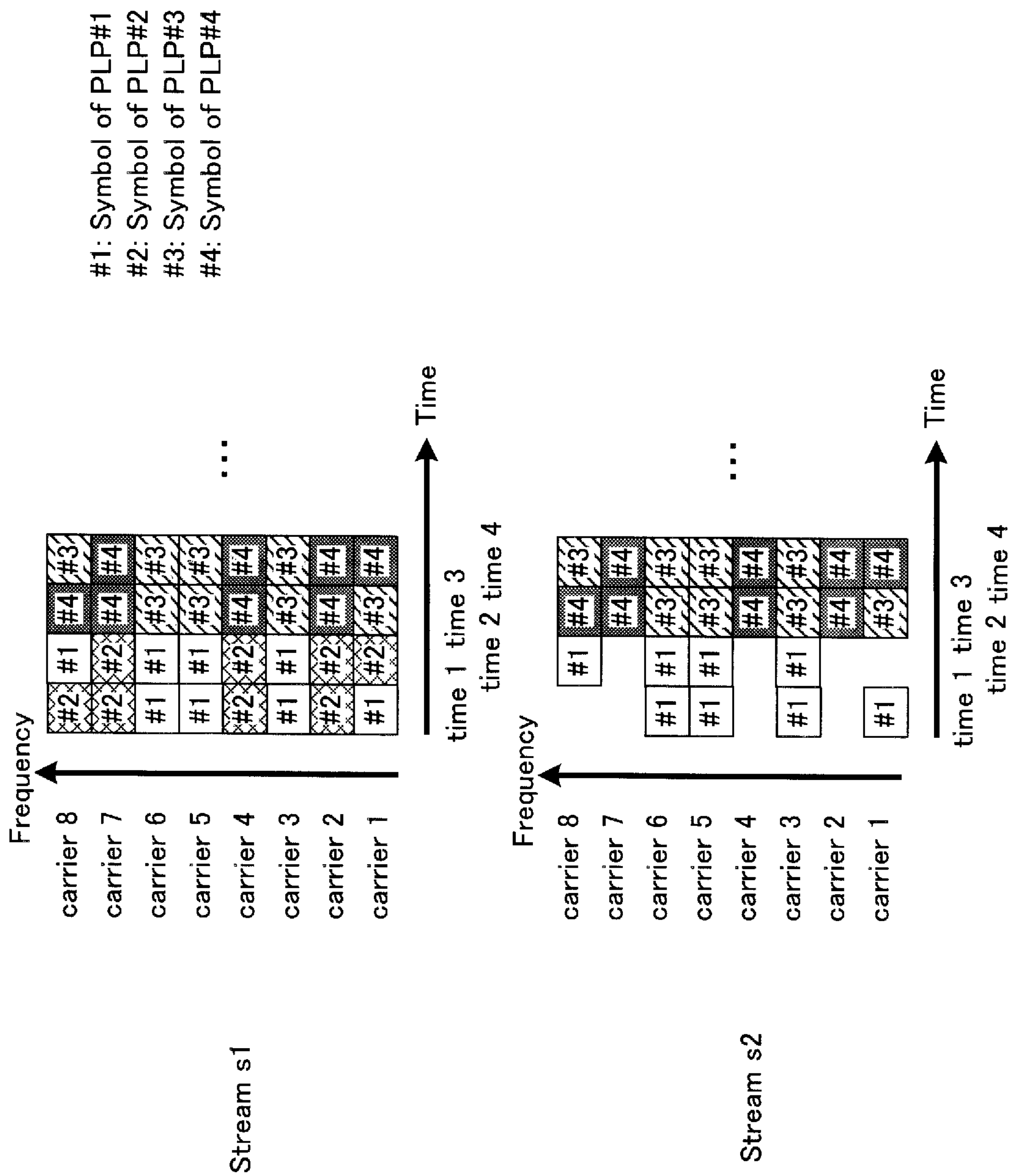
FIG. 66 is an example of symbol arrangement scheme.

FIG. 66 shows another example of a symbol arranging scheme in the time and frequency domains, which is different from the symbol arranging scheme shown in FIG. 64. The symbols shown in FIG. 66 are of the stream s1 and s2 and to be transmitted after the transmission of P1 symbol, P2 symbols, and Common PLP. In FIG. 66, each symbol denoted by “#1” represents one symbol of the symbol group of PLP #1 shown in FIG. 64. Similarly, each symbol denoted as “#2” represents one symbol of the symbol group of PLP #2 shown in FIG. 64, each symbol denoted as “#3” represents one symbol of the symbol group of PLP #3 shown in FIG. 64, and each symbol denoted as “#4” represents one symbol of the symbol group of PLP shown in FIG. 64.

Similarly to FIG. 64, PLP #1 transmits data using spatial multiplexing MIMO system shown in FIG. 49 or the MIMO system with a fixed precoding matrix. In addition, PLP #2 transmits data thereby to transmit one modulated signal. PLP #3 transmits data using a precoding scheme of regularly hopping between precoding matrices. PLP #4 transmits data using space-time block coding shown in FIG. 50. Note that the symbol arrangement used in space-time block coding is not limited to the arrangement in the time domain. Alternatively, the symbol arrangement may be in the frequency domain or in symbol groups formed in the time and frequency domains. In addition, space-time block coding is not limited to the one shown in FIG. 50.

In FIG. 66, where streams s1 and s2 both have a symbol in the same subcarrier and at the same time, symbols of the two streams are present at the same frequency. In the case where precoding performed includes the precoding according to the scheme for regularly hopping between precoding matrices as described in the other embodiments, streams s1 and s2 are subjected to weighting performed using the precoding matrices, and z1 and z2 are output from the respective antennas.

FIG. 66 differs from FIG. 64 in the following points. That is, the example shown in FIG. 64 is an arrangement of a plurality of PLPs using time-sharing, whereas the example shown in FIG. 66 is an arrangement of a plurality of PLPs using both time-sharing and frequency-sharing. That is, for example, at time 1, a symbol of PLP #1 and a symbol of PLP #2 are both present. Similarly, at time 3, a symbol of PLP #3 and a symbol of PLP #4 are both present. In this way, PLP symbols having different index numbers (#X; X=1, 2 . . . ) may be allocated on a symbol-by-symbol basis (for each symbol composed of one subcarrier per time).

For the sake of simplicity, FIG. 66 only shows symbols denoted by "#1" and "#2" at time 1. However, this is not a limiting example, and PLP symbols having any index numbers other than "#1" and "#2" may be present at time 1. In addition, the relation between subcarriers present at time 1 and PLP index numbers are not limited to that shown in FIG. 66. Alternatively, a PLP symbol having any index number may be allocated to any subcarrier. Similarly, in addition, a PLP symbol having any index number may be allocated to any subcarrier at any time other than time 1.

Figure 67:
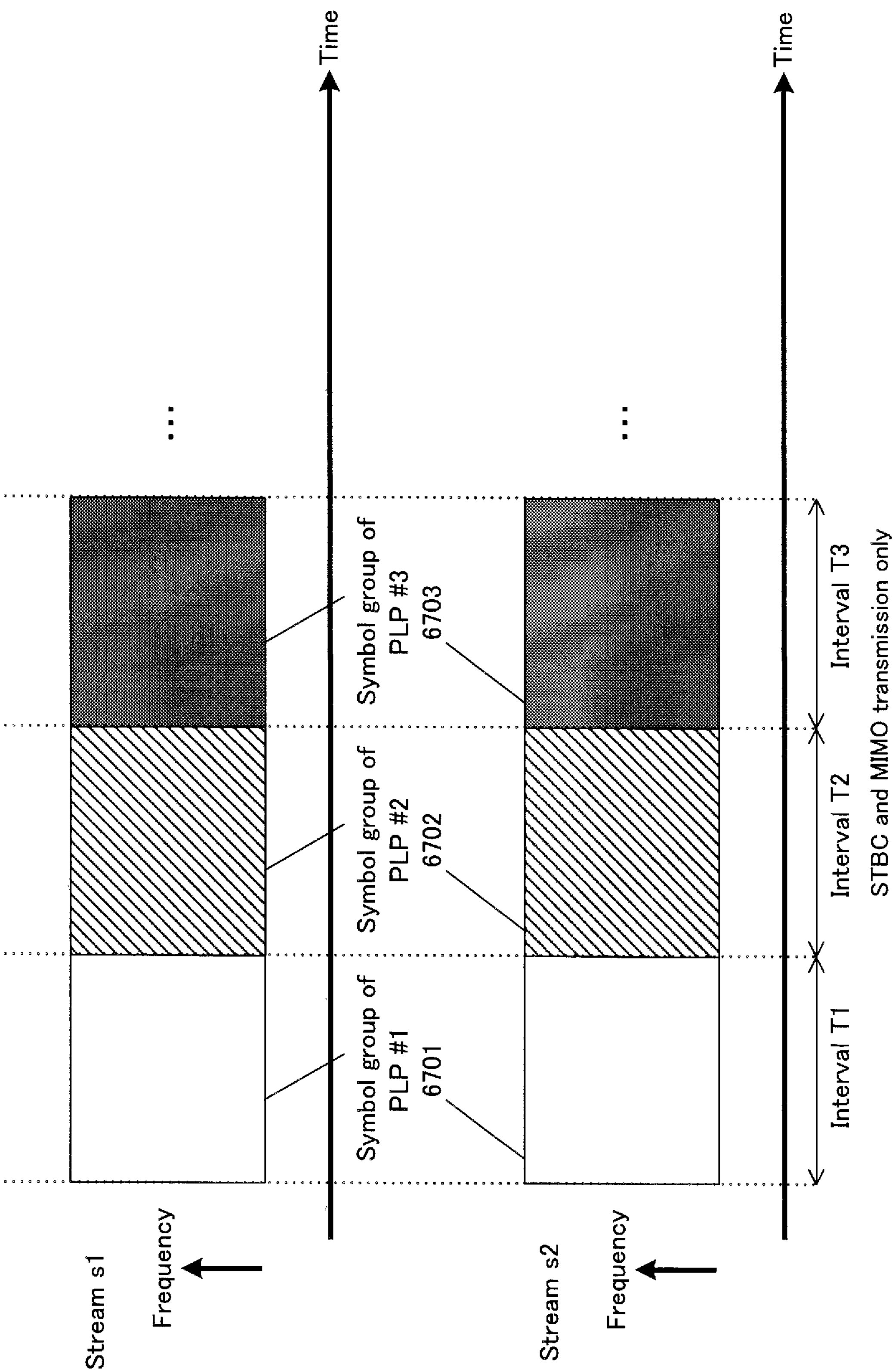
FIG. 67 is an example of symbol arrangement scheme.

FIG. 67 shows another example of a symbol arranging scheme in the time and frequency domains, which is different from the symbol arranging scheme shown in FIG. 64. The symbols shown in FIG. 67 are of the stream s1 and s2 and to be transmitted after the transmission of P1 symbol, P2 symbols, and Common PLP. The characterizing feature of the example shown in FIG. 67 is that the "transmission scheme for transmitting only stream s1" is not selectable in the case where PLP transmission for T2 frames is carried out basically with a plurality of antennas.

Therefore, data transmission by the symbol group 6701 of PLP #1 shown in FIG. 67 is carried out by "a spatial multiplexing MIMO system or a MIMO scheme using a fixed precoding matrix". Data transmission by the symbol group 6702 of PLP #2 is carried out using "a precoding scheme of regularly hopping between precoding matrices". Data transmission by the symbol group 6703 of PLP #3 is carried out by "space-time block coding". Note that data transmission by the PLP symbol group 6703 of PLP #3 and the following symbol groups in T2 frame is carried out by using one of "a spatial multiplexing MIMO system or a MIMO scheme using a fixed precoding matrix," "a precoding scheme of regularly hopping between precoding matrices" and "space-time block coding".

Figure 68:
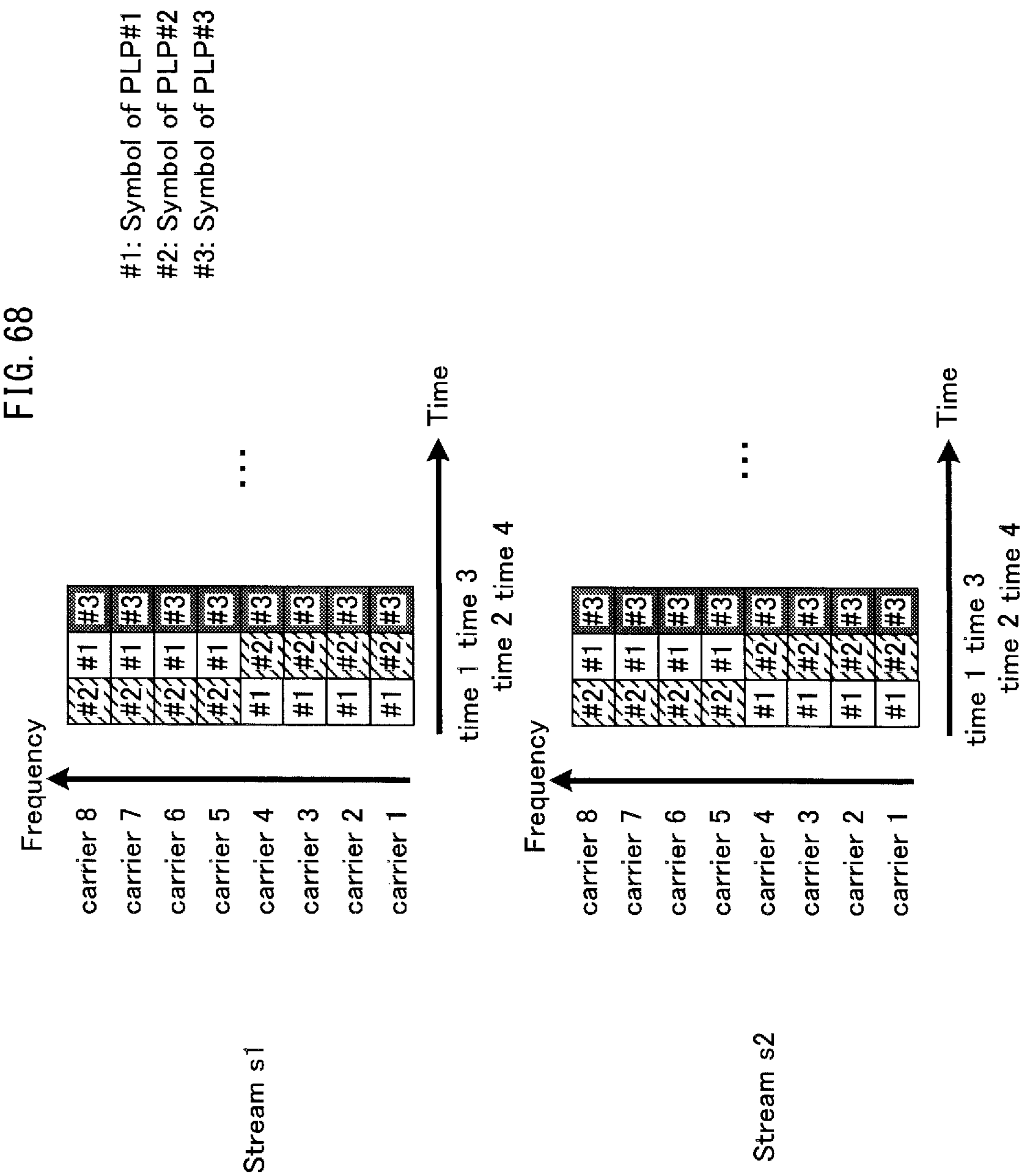
FIG. 68 is an example of symbol arrangement scheme.

FIG. 68 shows another example of a symbol arranging scheme in the time and frequency domains, which is different from the symbol arranging scheme shown in FIG. 66. The symbols shown in FIG. 66 are of the stream s1 and s2 and to be transmitted after the transmission of P1 symbol, P2 symbols, and Common PLP. In FIG. 68, each symbol denoted by "#1" represents one symbol of the symbol group of PLP #1 shown in FIG. 67. Similarly, each symbol denoted as "#2" represents one symbol of the symbol group of PLP #2 shown in FIG. 67, each symbol denoted as "#3" represents one symbol of the symbol group of PLP #3 shown in FIG. 67, and each symbol denoted as "#4" represents one symbol of the symbol group of PLP shown in FIG. 67. Similarly to FIG. 67, PLP #1 transmits data using spatial multiplexing MIMO system shown in FIG. 49 or the MIMO system with a fixed precoding matrix. PLP #2 transmits data using a precoding scheme of regularly hopping between precoding matrices. PLP #3 transmits data using space-time block coding shown in FIG. 50. Note that the symbol arrangement used in the space-time block coding is not limited to the arrangement in the time domain. Alternatively, the symbol arrangement may be in the frequency domain or in symbol groups formed in the time and frequency domains. In addition, the space-time block coding is not limited to the one shown in FIG. 50.

In FIG. 68, where streams s1 and s2 both have a symbol in the same subcarrier and at the same time, symbols of the two streams are present at the same frequency. In the case where precoding performed includes the precoding according to the scheme for regularly hopping between precoding matrices as described in the other embodiments, streams s1 and s2 are subjected to weighting performed using the precoding matrices and z1 and z2 are output from the respective antennas.

FIG. 68 differs from FIG. 67 in the following points. That is, the example shown in FIG. 67 is an arrangement of a plurality of PLPs using time-sharing, whereas the example shown in FIG. 68 is an arrangement of a plurality of PLPs using both time-sharing and frequency-sharing. That is, for example, at time 1, a symbol of PLP #1 and a symbol of PLP #2 are both present. In this way, PLP symbols having different index numbers (#X; X=1, 2 . . . ) may be allocated on a symbol-by-symbol basis (for each symbol composed of one subcarrier per time). For the sake of simplicity, FIG. 68 only shows symbols denoted by "#1" and "#2" at time 1. However, this is not a limiting example, and PLP symbols having any index numbers other than "#1" and "#2" may be present at time 1. In addition, the relation between subcarriers present at time 1 and PLP index numbers are not limited to that shown in FIG. 68. Alternatively, a PLP symbol having any index number may be allocated to any subcarrier. Similarly, in addition, a PLP symbol having any index number may be allocated to any subcarrier at any time other than time 1. Alternatively, on the other hand, only one PLP symbol may be allocated at a specific time as at time t3. That is, in a framing scheme of arranging PLP symbols in the time and frequency domains, any allocation is applicable.

As set forth above, no PLPs using "a transmission scheme for transmitting only stream s1" exist in the T2 frame, so that the dynamic range of a signal received by the terminal is ensured to be narrow. As a result, the advantageous effect is achieved that the probability of excellent reception quality increases.

Note that the description of FIG. 68 is described using an example in which the transmission scheme selected is one of "spatial multiplexing MIMO system or a MIMO scheme using a fixed precoding matrix", "a precoding scheme of regularly hopping between precoding matrices", and "space-time block coding". Yet, it is not necessary that all of these transmission schemes are selectable. For example, the following combinations of the transmission schemes may be made selectable.

"a precoding scheme of regularly hopping between precoding matrices", "space-time block coding", and "a MIMO scheme using a fixed precoding matrix" are selectable.

"a precoding scheme of regularly hopping between precoding matrices" and "space-time block coding" are selectable.

"a precoding scheme of regularly hopping between precoding matrices" and "a MIMO scheme using a fixed precoding matrix" are selectable.

The above description relates to an example in which the T2 frame includes a plurality of PLPs. The following describes an example in which T2 frame includes one PLP only.

Figure 69:
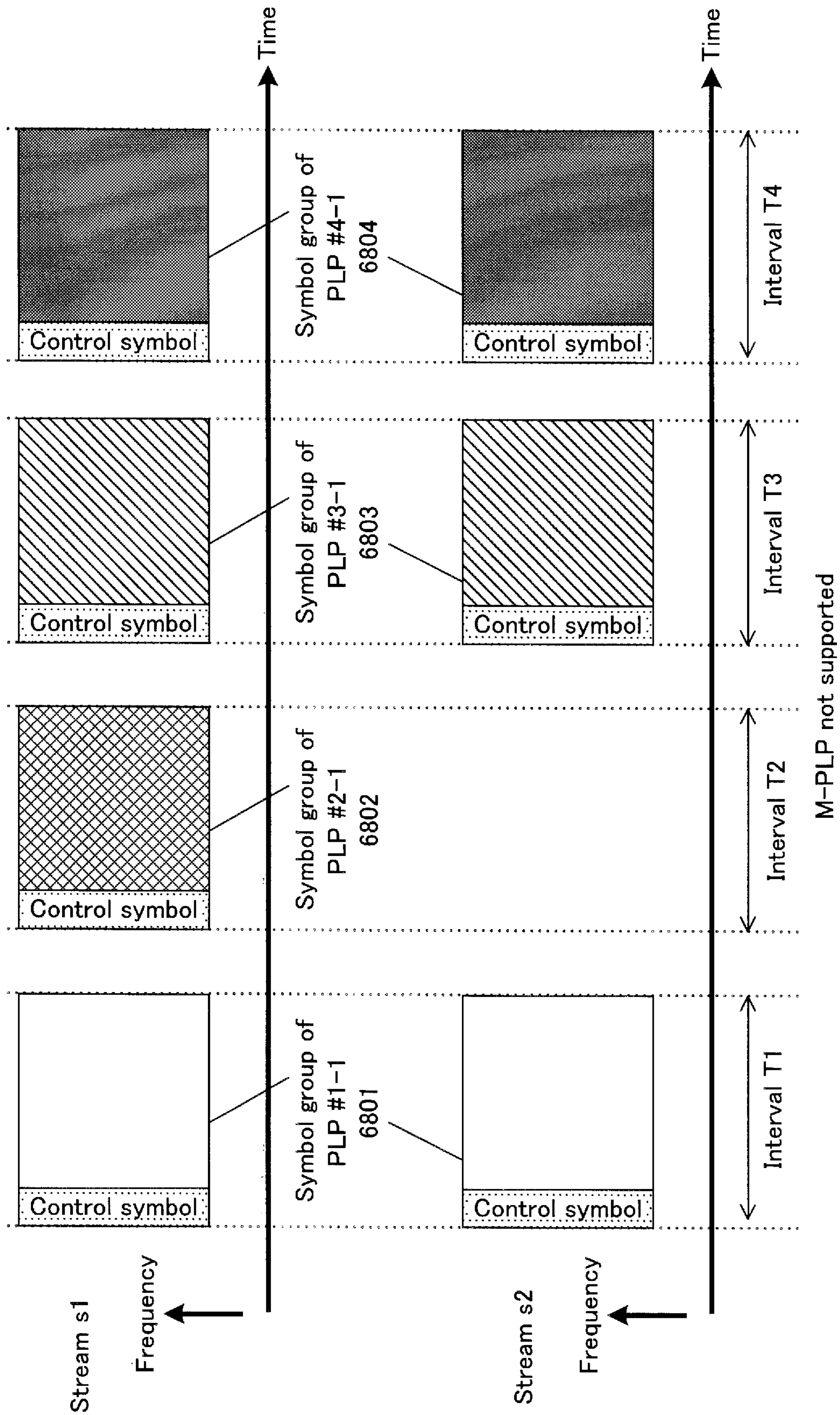
FIG. 69 is an example of the frame structure.

FIG. 69 shows an example of frame structure in the time and frequency domains for stream s1 and s2 in the case where only one PLP exits in T2 frame. In FIG. 69, the denotation "control symbol" represents a symbol such as P1 symbol, P2 symbol, or the like. In the example shown in FIG. 69, the first T2 frame is transmitted using interval 1. Similarly, the second T2 frame is transmitted using interval 2, the third T2 frame is transmitted using interval 3, and the fourth T2 frame is transmitted using interval 4.

In the example shown in FIG. 69, in the first T2 frame, a symbol group 6801 for PLP #1-1 is transmitted and the transmission scheme selected is "spatial multiplexing MIMO system or MIMO scheme using a fixed precoding matrix".

In the second T2 frame, a symbol group 6802 for PLP #2-1 is transmitted and the transmission scheme selected is "a scheme for transmitting one modulated signal".

In the third T2 frame, a symbol group 6803 for PLP #3-1 is transmitted and the transmission scheme selected is "a precoding scheme of regularly hopping between precoding matrices".

In the fourth T2 frame, a symbol group 6804 for PLP #4-1 is transmitted and the transmission scheme selected is "space-time block coding". Note that the symbol arrangement used in the space-time block coding is not limited to the arrangement in the time domain. Alternatively, the symbol arrangement may be in the frequency domain or in symbol groups formed in the time and frequency domains. In addition, the space-time block coding is not limited to the one shown in FIG. 50.

In FIG. 69, where streams s1 and s2 both have a symbol in the same subcarrier and at the same time, symbols of the two streams are present at the same frequency. In the case where precoding performed includes the precoding according to the scheme for regularly hopping between precoding matrices as described in the other embodiments, streams s1 and s2 are subjected to weighting performed using the precoding matrices and z1 and z2 are output from the respective antennas.

In the above manner, a transmission scheme may be set for each PLP in consideration of the data transmission speed and the data reception quality at the receiving terminal, so that increase in data transmission seeped and excellent reception quality are both achieved. As an example scheme of structuring control information, the control information indicating, for example, the transmission scheme and other information of P1 symbol and P2 symbols (and also Signalling PLP where applicable) may be configured in a similar manner to Tables 3-6. The difference is as follows. In the frame structure shown, for example, in FIG. 64, one T2 frame includes a plurality of PLPs. Thus, it is necessary to provide the control information indicating the transmission scheme and the like for each PLP. On the other hand, in the frame structure shown, for example, in FIG. 69, one T2 frame includes one PLP only. Thus, it is sufficient to provide the control information indicating the transmission scheme and the like only for the one PLP.

Although the above description is directed to the scheme of transmitting information about the PLP transmission scheme using P1 symbol and P2 symbols (and Signalling PLPs where applicable), the following describes in particular the scheme of transmitting information about the PLP transmission scheme without using P2 symbols.

Figure 70:
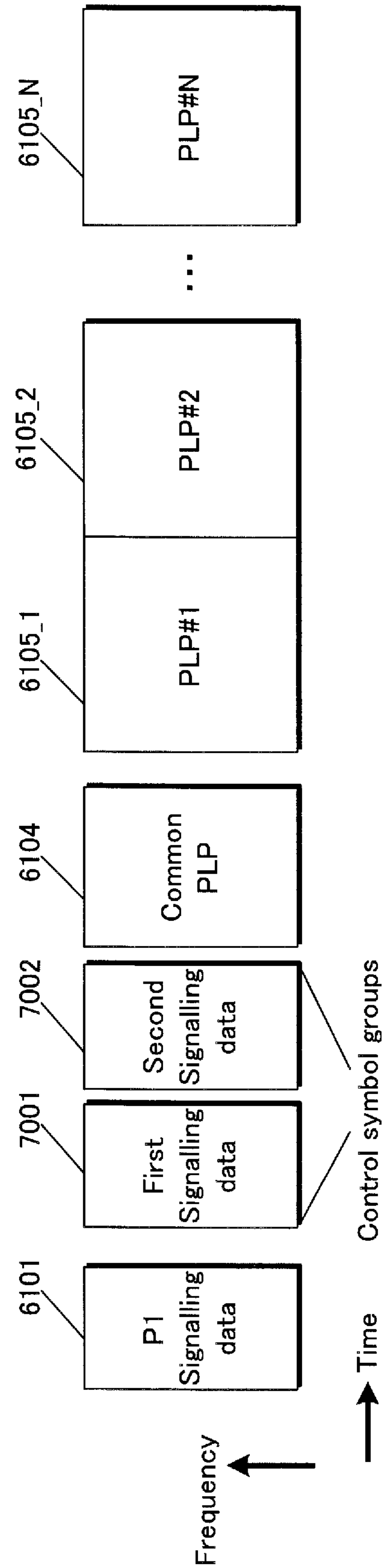
FIG. 70 shows a frame structure in the time and frequency domain.

FIG. 70 shows a frame structure in the time and frequency domains for the case where a terminal at a receiving end of data broadcasting by a broadcast station supporting a standard other than the DVB-T2 standard. In FIG. 70, the same reference signs are used to denote the blocks that operate in a similar way to those shown in FIG. 61. The frame shown in FIG. 70 is composed of P1 Signalling data (6101), first Signalling data (7001), second Signalling data (7002), Common PLP (6104), and PLPs #1 to N (6105_1 to 6105_N) (PLP: Physical Layer Pipe). In this way, a frame composed of P1 Signalling data (6101), first Signalling data (7001), second Signalling data (7002), Common PLP (6104), PLPs #1 to N (6105_1 to 6105_N) constitutes one frame unit.

By the P1 Signalling data (6101), data indicating that the symbol is for a reception device to perform signal detection and frequency synchronization (including frequency offset estimation) is transmitted. In this example, in addition, data identifying whether or not the frame supports the DVB-T2 standard needs to be transmitted. For example, by S1 shown in Table 3, data indicating whether or not the signal supports the DVB-T2 standard needs to be transmitted.

By the first 1 Signalling data (7001), the following information may be transmitted for example: information about the guard interval used in the transmission frame; information about the method of PAPR (Peak to Average Power Ratio); information about the modulation scheme, error correction scheme, coding rate of the error correction scheme all of which are used in transmitting the second Signalling data; information about the size of the second Signalling data and about information size; information about the pilot pattern; information about the cell (frequency domain) unique number; and information indicating which of the norm mode and extended mode is used. Here, it is not necessary that the first Signalling data (7001) transmits data supporting the DVB-T2 standard. By L2 Post-Signalling data (7002), the following information may be transmitted for example: information about the number of PLPs; information about the frequency domain used; information about the unique number of each PLP; information about the modulation scheme, error correction scheme, coding rate of the error correction scheme all of which are used in transmitting the PLPs; and information about the number of blocks transmitted in each PLP.

Figure 71:
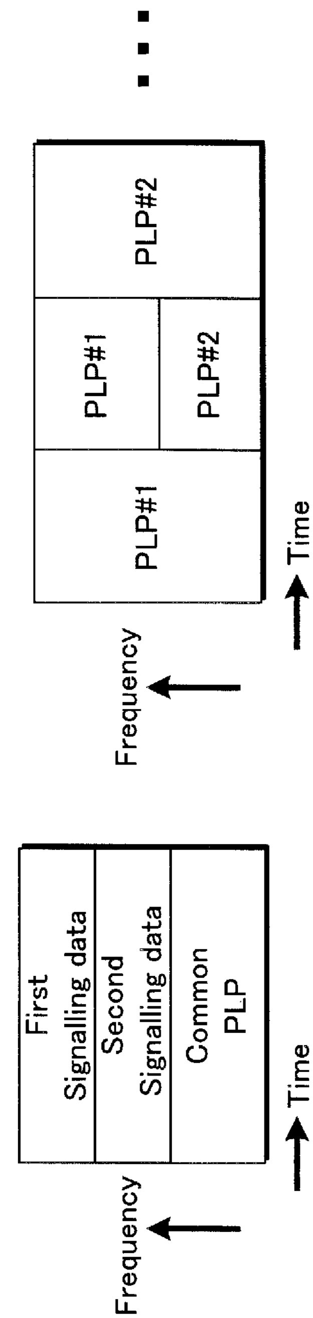
FIG. 71 is an example of a frame structure in the time and frequency domain.

In the frame structure shown in FIG. 70, first Signalling data (7001), second Signalling data (7002), L1 Post-Signalling data (6103), Common PLP (6104), PLPs #1 to #N (6105_1 to 6105_N) are appear to be transmitted by time sharing. In practice, however, two or more of the signals are concurrently present. FIG. 71 shows such an example. As shown in FIG. 71, first Signalling data, second Signalling data, and Common PLP may be present at the same time, and PLP #1 and PLP #2 may be present at the same time. That is, the signals constitute a frame using both time-sharing and frequency-sharing.

Figure 72:
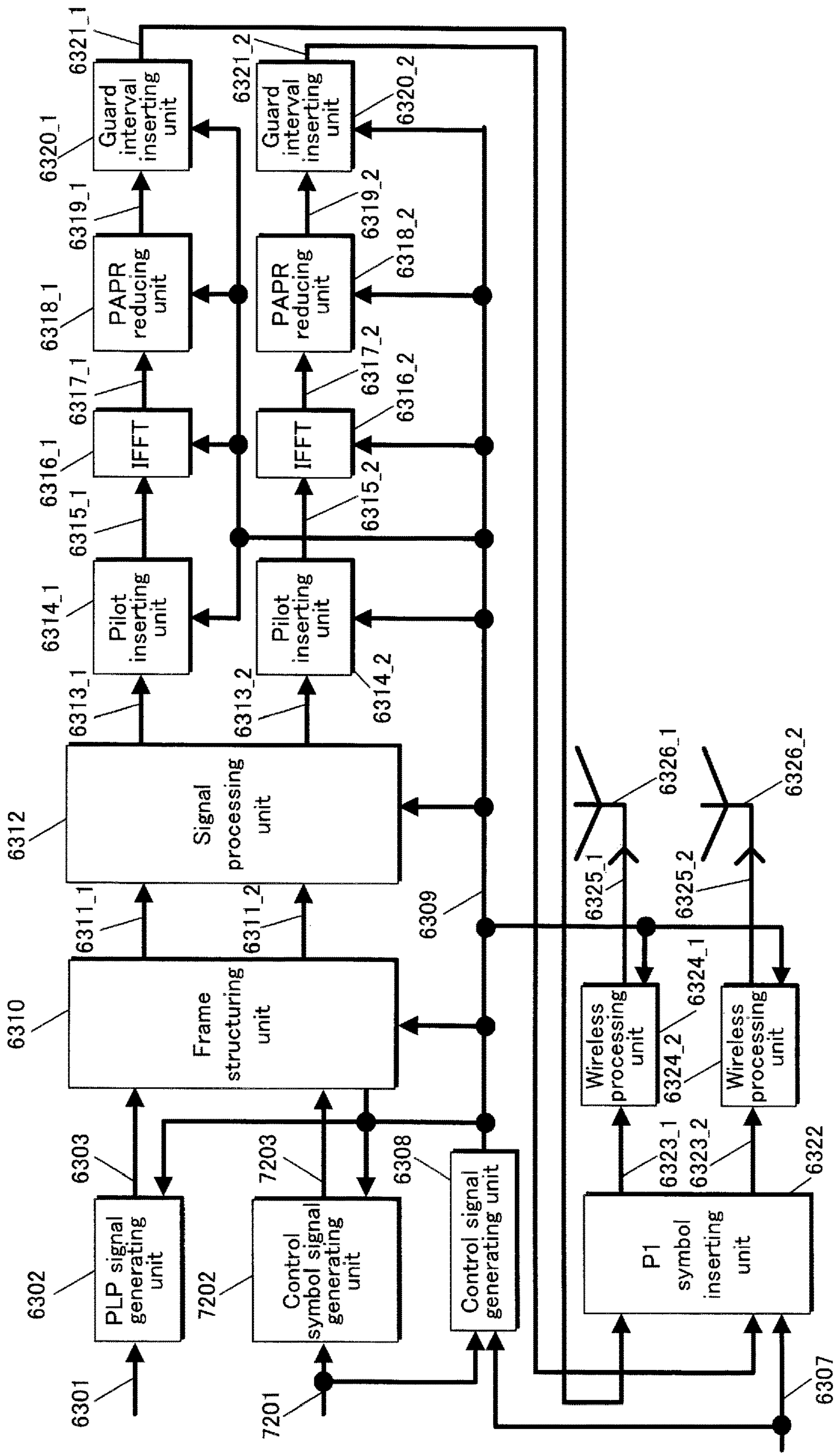
FIG. 72 is an example of a structure of a transmission device.

FIG. 72 shows an example of the structure of a transmission device obtained by applying the above-described schemes of regularly hopping between precoding matrices to a transmission device (of a broadcast station, for example) that is compliant with a standard other than the DVB-T2 standard. In FIG. 72, the same reference signs are used to denote the components that operate in a similar way to those shown in FIG. 63 and the description of such components are the same as above. A control signal generating unit 6308 receives transmission data 7201 for the first and second Signalling data, transmission data 6307 for P1 symbol as input. As output, the control signal generating unit 6308 outputs a control signal 6309 carrying information about the transmission scheme of each symbol group shown in FIG. 70. (The information about the transmission scheme output herein includes: error correction coding, coding rate of the error correction, modulation scheme, block length, frame structure, the selected transmission schemes including a transmission scheme that regularly hops between precoding matrices, pilot symbol insertion scheme, information about IFFT (Inverse Fast Fourier Transform)/FFT and the like, information about the method of reducing PAPR, and information about guard interval insertion scheme.)

The control signal generating unit 7202 receives the control signal 6309 and the transmission data 7201 for first and second Signalling data as input. The control signal generating unit 7202 then performs error correction coding and mapping based on the modulation scheme, according to the information carried in the control signal 6309 (namely, information about the error correction of the first and second Signalling data, information about the modulation scheme) and outputs a (quadrature) baseband signal 7203 of the first and second Signalling data.

Next, a detailed description is given of the frame structure of a transmission signal and the transmission scheme of control information (information carried by the P1 symbol and first and second 2 Signalling data) employed by a broadcast station (base station) in the case where the scheme of regularly hopping between precoding matrices is adapted to a system compliant with a standard other than the DVB-T2 standard.

FIG. 64 shows an example of the frame structure in the time and frequency domains, in the case where a plurality of PLPs are transmitted after transmission of P1 symbol, first and second 2 Signalling data, and Common PLP. In FIG. 64, stream s1 uses subcarriers #1 to #M in the frequency domain. Similarly, stream s2 uses subcarriers #1 to #M in the frequency domain. Therefore, when streams s1 and s2 both have a symbol in the same subcarrier and at the same time, symbols of the two streams are present at the same frequency. In the case where precoding performed includes the precoding according to the scheme for regularly hopping between precoding matrices as described in the other embodiments, streams s1 and s2 are subjected to weighting performed using the precoding matrices and z1 and z2 are output from the respective antennas.

As shown in FIG. 64, in interval 1, a symbol group 6401 of PLP #1 is transmitted using streams s1 and s2, and the data transmission is carried out using the spatial multiplexing MIMO system shown in FIG. 49 or the MIMO system with a fixed precoding matrix.

In interval 2, a symbol group 6402 of PLP #2 is transmitted using stream s1, and the data transmission is carried out by transmitting one modulated signal.

In interval 3, a symbol group 6403 of PLP #3 is transmitted using streams s1 and s2, and the data transmission is carried out using a precoding scheme of regularly hopping between precoding matrices.

In interval 4, a symbol group 6404 of PLP #4 is transmitted using streams s1 and s2, and the data transmission is carried out using the space-time block coding shown in FIG. 50. Note that the symbol arrangement used in the space-time block coding is not limited to the arrangement in the time domain. Alternatively, the symbol arrangement may be in the frequency domain or in symbol groups formed in the time and frequency domains. In addition, the space-time block coding is not limited to the one shown in FIG. 50.

In the case where a broadcast station transmits PLPs in the frame structure shown in FIG. 64, a reception device receiving the transmission signal shown in FIG. 64 needs to know the transmission scheme used for each PLP. As has been already described above, it is therefore necessary to transmit information indicating the transmission scheme for each PLP, using the first and second Signalling data. The following describes an example of the scheme of structuring a P1 symbol used herein and the scheme of structuring first and second Signalling data used herein. Specific examples of control information transmitted using a P1 symbol are as shown in Table 3. According to the DVB-T2 standard, the control information 51 (three bits) enables the reception device to determine whether or not the DVB-T2 standard is used and also determine, if DVB-T2 is used, the transmission scheme used. If the three bits are set to "000", the S1 information indicates that the modulated signal transmitted is in compliant with "transmission of a modulated signal compliant with the DVB-T2 standard".

If the three bits are set to "001", the S1 information indicates that the modulated signal transmitted is in compliant with "transmission using space-time block coding compliant with the DVB-T2 standard".

In the DVB-T2 standard, the bit sets "010" to "111" are "Reserved" for future use. In order to adapt the present invention in a manner to establish compatibility with the DVB-T2, the three bits constituting the S1 information may be set to "010" (or any bit set other than "000" and "001") to indicate that the modulated signal transmitted is compliant with a standard other than DVB-T2. On determining that the S1 information received is set to "010", the reception device is informed that the modulated signal transmitted from the broadcast station is compliant with a standard other than DVB-T2.

Next, a description is given of examples of the scheme of structuring first and second Signalling data in the case where a modulated signal transmitted by the broadcast station is compliant with a standard other than DVB-T2. A first example of the control information for the first and second Signalling data is as shown in Table 4.

The 2-bit information "PLP_MODE" shown in Table 4 is control information used to indicate the transmission scheme used for each PLP as shown in FIG. 64 (PLPs #1 to #4 in FIG. 64). That is, a separate piece of "PLP_MODE" information is provided for each PLP. That is, in the example shown in FIG. 64, PLP_MODE for PLP #1, PLP_MODE for PLP #2, PLP_MODE for PLP #3, PLP_MODE for PLP #4 . . . are transmitted from the broadcast station. As a matter of course, by demodulating (and also performing error correction) those pieces of information, the terminal at the receiving end is enabled to recognize the transmission scheme that the broadcast station used for transmitting each PLP.

With the PLP_MODE set to "00", the data transmission by a corresponding PLP is carried out by "transmitting one modulated signal". When the PLP_MODE is set to "01", the data transmission by a corresponding PLP is carried out by "transmitting a plurality of modulated signals obtained by space-time block coding". When the PLP_MODE is set to "10", the data transmission by a corresponding PLP is carried out using a "precoding scheme of regularly hopping between precoding matrices". When the PLP_MODE is set to "11", the data transmission by a corresponding PLP is carried out using a "MIMO system with a fixed precoding matrix or spatial multiplexing MIMO system".

Note that when the PLP_MODE is set to "01" to "11", the information indicating the specific processing conducted by the broadcast station (for example, the specific hopping scheme used in the scheme of regularly hopping between precoding matrices, the specific space-time block coding scheme used, and the structure of precoding matrices used) needs to be notified to the terminal. The following describes the scheme of structuring control information that includes such information and that is different from the example shown in Table 4.

A second example of the control information for the first and second Signalling data is as shown in Table 5.

As shown in Table 5, the control information includes "PLP_MODE" which is one bit long, "MIMO_MODE" which is one bit long, "MIMO_PATTERN #1" which is two bits long, and "MIMO_PATTERN #2" which is two bits long. As shown in FIG. 64, these four pieces of control information is to notify the transmission scheme of a corresponding one of PLPs (PLPs #1 to #4 in the example shown in FIG. 64). Thus, a set of four pieces of information is provided for each PLP. That is, in the example shown in FIG. 64, the broadcast station transmits a set of PLP_MODE information, MIMO_MODE information, MIMO_PATTERN #1 information, and MIMO_PATTERN #2 information for PLP #1, a set of PLP_MODE information, MIMO_MODE information, MIMO_PATTERN #1 information, and MIMO_PATTERN #2 information for PLP #2, a set of PLP_MODE information, MIMO_MODE information, MIMO_PATTERN #1 information, and MIMO_PATTERN #2 information for PLP #3, a set of PLP_MODE information, MIMO_MODE information, MIMO_PATTERN #1 information, and MIMO_PATTERN #2 information for PLP #4 . . . . As a matter of course, by demodulating (and also performing error correction) those pieces of information, the terminal at the receiving end is enabled to recognize the transmission scheme that the broadcast station used for transmitting each PLP.

With the PLP_MODE set to "0", the data transmission by a corresponding PLP is carried out by "transmitting one modulated signal". With the PLP_MODE set to "1", the data transmission by a corresponding PLP is carried out by "transmitting a plurality of modulated signals obtained by space-time block coding", "precoding scheme of regularly hopping between precoding matrices", "MIMO system with a fixed precoding matrix or spatial multiplexing MIMO system", or "spatial multiplexing MIMO system".

With the "PLP_MODE" set to "1", the "MIMO_MODE" information is made effective. With "MIMO_MODE" set to "0", data transmission is carried out by a scheme other than the "precoding scheme of regularly hopping between precoding matrices". With "MIMO_MODE" set to "1", on the other hand, data transmission is carried out by the "precoding scheme of regularly hopping between precoding matrices".

With "PLP_MODE" set to "1" and "MIMO_MODE" set to "0", the "MIMO_PATTERN #1" information is made effective. With "MIMO_PATTERN #1" set to "00", data transmission is carried out using space-time block coding. With "MIMO_PATTERN" set to "01", data transmission is carried out using a precoding scheme in which weighting is performed using a fixed precoding matrix #1. With "MIMO_PATTERN" set to "10", data transmission is carried out using a precoding scheme in which weighting is performed using a fixed precoding matrix #2 (Note that the precoding matrix #1 and precoding matrix #2 are mutually different). When "MIMO_PATTERN" set to "11", data transmission is carried out using spatial multiplexing MIMO system (Naturally, it may be construed that Scheme 1 shown in FIG. 49 is selected here).

With "PLP_MODE" set to "1" and "MIMO_MODE" set to "1", the "MIMO_PATTERN #2" information is made effective. With "MIMO_PATTERN #2" set to "00", data transmission is carried out using the precoding matrix hopping scheme #1 according to which precoding matrices are regularly hopped. With "MIMO_PATTERN #2" set to "01", data transmission is carried out using the precoding matrix hopping scheme #2 according to which precoding matrices are regularly hopped. With "MIMO_PATTERN #3" set to "10", data transmission is carried out using the precoding matrix hopping scheme #2 according to which precoding matrices are regularly hopped. With "MIMO_PATTERN #4" set to "11", data transmission is carried out using the precoding matrix hopping scheme #2 according to which precoding matrices are regularly hopped. Note that the precoding matrix hopping schemes #1 to #4 are mutually different. Here, to define a scheme being different, it is supposed that #A and #B are mutually different schemes. Then one of the following is true.

- The precoding matrices used in #A include the same matrices used in #b but the periods (cycles) of the matrices are different.
- The precoding matrices used in #A include precoding matrices not used in #B.
- None of the precoding matrices used in #A is used in #B.

In the above description, the control information shown in Tables 4 and 5 is transmitted by first and second Signalling data. In this case, the advantage of eliminating the need to specifically use PLPs to transmit control information is achieved.

As described above, the present embodiment allows for choice of a scheme of regularly hopping between precoding matrices while using a multi-carrier scheme, such as an OFDM scheme and while allowing a standard other than DVB-T2 to be distinguished from DVB-T2. This offers the advantages of obtaining high reception quality, as well as high transmission speed, in an LOS environment. While in the present embodiment, the transmission schemes to which a carrier group can be set are "a spatial multiplexing MIMO system, a MIMO scheme using a fixed precoding matrix, a MIMO scheme for regularly hopping between precoding matrices, space-time block coding, or a transmission scheme for transmitting only stream s1", but the transmission schemes are not limited in this way. Furthermore, the MIMO scheme using a fixed precoding matrix limited to scheme #2 in FIG. 49, as any structure with a fixed precoding matrix is acceptable.

Furthermore, the above description is directed to a scheme in which the schemes selectable by the broadcast station are "a spatial multiplexing MIMO system, a MIMO scheme using a fixed precoding matrix, a MIMO scheme for regularly hopping between precoding matrices, space-time block coding, or a transmission scheme for transmitting only stream s1". However, it is not necessary that all of the transmission schemes are selectable. Any of the following examples is also possible.

A transmission scheme in which any of the following is selectable: a MIMO scheme using a fixed precoding matrix, a MIMO scheme for regularly hopping between precoding matrices, space-time block coding, and a transmission scheme for transmitting only stream s1.

A transmission scheme in which any of the following is selectable: a MIMO scheme using a fixed precoding matrix, a MIMO scheme for regularly hopping between precoding matrices, and space-time block coding.

A transmission scheme in which any of the following is selectable: a MIMO scheme using a fixed precoding matrix, a MIMO scheme for regularly hopping between precoding matrices, and a transmission scheme for transmitting only stream s1.

A transmission scheme in which any of the following is selectable: a MIMO scheme for regularly hopping between precoding matrices, space-time block coding, and a transmission scheme for transmitting only stream s1.

A transmission scheme in which any of the following is selectable: a MIMO scheme using a fixed precoding matrix, and a MIMO scheme for regularly hopping between precoding matrices.

A transmission scheme in which any of the following is selectable: a MIMO scheme for regularly hopping between precoding matrices, and space-time block coding.

A transmission scheme in which any of the following is selectable: a MIMO scheme for regularly hopping between precoding matrices, and a transmission scheme for transmitting only stream s1.

As listed above, as long as a MIMO scheme for regularly hopping between precoding matrices is included as a selectable scheme, the advantageous effects of high-speed data transmission is obtained in an LOS environment, in addition to excellent reception quality for the reception device.

Here, it is necessary to set the control information S1 in P1 symbols as described above. In addition, as first and second Signalling data, the control information may be set differently from a scheme (the scheme for setting the transmission scheme of each PLP) shown in Table 4. Table 6 shows one example of such a scheme.

Table 6 differs from Table 4 in that the "PLP_MODE" set to "11" is "Reserved" In this way, the number of bits constituting the "PLP_MODE" shown in Tables 4 and 6 may be increased or decreased depending on the number of selectable PLP transmission schemes, which varies as in the examples listed above.

The same holds with respect to Table 5. For example, if the only MIMO scheme supported is a precoding scheme of regularly hopping between precoding matrices, the control information "MIMO_MODE" is no longer necessary. Furthermore, the control information "MIMO_PATTERN #1" may not be necessary in the case, for example, where a MIMO scheme using a fixed precoding matrix is not supported. Furthermore, the control information "MIMO_PATTERN #1" may not necessarily be two bits long and may alternatively be one bit long in the case where, for example, no more than one precoding matrix is required for such a MIMO scheme using a fixed precoding matrix. Furthermore, the control information "MIMO_PATTERN #1" may be two bits long or more in the case where a plurality of precoding matrices are selectable.

The same applies to "MIMO_PATTERN #2". That is, the control information "MIMO_PATTERN #2" may be one bit long instead of two bits long, in the case where no more than one precoding scheme of regularly hopping between precoding matrices is available. Alternatively, the control information "MIMO_PATTERN #2" may be two bits long or more in the case where a plurality of precoding schemes of regularly hopping between precoding matrices are selectable.

In the present embodiment, the description is directed to the transmission device having two antennas, but the number of antennas is not limited to two. With a transmission device having more than two antennas, the control information may be transmitted in the same manner. Yet, to enable the modulated signal transmission with the use of four antennas in addition to the modulated signal transmission with the use of two antennas may require that the number of bits constituting respective pieces of control information needs to be increased. In such a modification, it still holds that the control information is transmitted by the P1 symbol and the control information is transmitted by first and second Signalling data as set forth above.

The above description is directed to the frame structure of PLP symbol groups transmitted by a broadcast station in a time-sharing transmission scheme as shown in FIG. 64.

FIG. 66 shows another example of a symbol arranging scheme in the time and frequency domains, which is different from the symbol arranging scheme shown in FIG. 64. The symbols shown in FIG. 66 are of the stream s1 and s2 and to be transmitted after the transmission of the P1 symbol, first and second Signalling data, and Common PLP.

In FIG. 66, each symbol denoted by "#1" represents one symbol of the symbol group of PLP #1 shown in FIG. 67. Similarly, each symbol denoted as "#2" represents one symbol of the symbol group of PLP #2 shown in FIG. 64, each symbol denoted as "#3" represents one symbol of the symbol group of PLP shown in FIG. 64, and each symbol denoted as "#4" represents one symbol of the symbol group of PLP #4 shown in FIG. 64. Similarly to FIG. 64, PLP #1 transmits data using spatial multiplexing MIMO system shown in FIG. 49 or the MIMO system with a fixed precoding matrix. In addition, PLP #2 transmits data thereby to transmit one modulated signal. PLP #3 transmits data using a precoding scheme of regularly hopping between precoding matrices. PLP #4 transmits data using space-time block coding shown in FIG. 50. Note that the symbol arrangement used in the space-time block coding is not limited to the arrangement in the time domain. Alternatively, the symbol arrangement may be in the frequency domain or in symbol groups formed in the time and frequency domains. In addition, the space-time block coding is not limited to the one shown in FIG. 50.

In FIG. 66, where streams s1 and s2 both have a symbol in the same subcarrier and at the same time, symbols of the two streams are present at the same frequency. In the case where precoding performed includes the precoding according to the scheme for regularly hopping between precoding matrices as described in the other embodiments, streams s1 and s2 are subjected to weighting performed using the precoding matrices and z1 and z2 are output from the respective antennas.

FIG. 66 differs from FIG. 64 in the following points. That is, the example shown in FIG. 64 is an arrangement of a plurality of PLPs using time-sharing, whereas the example shown in FIG. 66 is an arrangement of a plurality of PLPs using both time-sharing and frequency-sharing. That is, for example, at time 1, a symbol of PLP #1 and a symbol of PLP

#2 are both present. Similarly, at time 3, a symbol of PLP #3 and a symbol of PLP #4 are both present. In this way, PLP symbols having different index numbers (#X; X=1, 2 . . . ) may be allocated on a symbol-by-symbol basis (for each symbol composed of one subcarrier per time).

For the sake of simplicity, FIG. 66 only shows symbols denoted by "#1" and "#2" at time 1. However, this is not a limiting example, and PLP symbols having any index numbers other than "#1" and "#2" may be present at time 1. In addition, the relation between subcarriers present at time 1 and PLP index numbers are not limited to that shown in FIG. 66. Alternatively, a PLP symbol having any index number may be allocated to any subcarrier. Similarly, in addition, a PLP symbol having any index number may be allocated to any subcarrier at any time other than time 1.

FIG. 67 shows another example of a symbol arranging scheme in the time and frequency domains, which is different from the symbol arranging scheme shown in FIG. 64. The symbols shown in FIG. 67 are of the stream s1 and s2 and to be transmitted after the transmission of the P1 symbol, first and second Signalling data, and Common PLP. The characterizing feature of the example shown in FIG. 67 is that the "transmission scheme for transmitting only stream s1" is not selectable in the case where PLP transmission for T2 frames is carried out basically with a plurality of antennas.

Therefore, data transmission by the symbol group 6701 of PLP #1 shown in FIG. 67 is carried out by "a spatial multiplexing MIMO system or a MIMO scheme using a fixed precoding matrix". Data transmission by the symbol group 6702 of PLP #2 is carried out using "a precoding scheme of regularly hopping between precoding matrices". Data transmission by the symbol group 6703 of PLP #3 is carried out by "space-time block coding". Note that data transmission by the PLP symbol group 6703 of PLP #3 and the following symbol groups in unit frame is carried out by using one of "a spatial multiplexing MIMO system or a MIMO scheme using a fixed precoding matrix," "a precoding scheme of regularly hopping between precoding matrices" and "space-time block coding".

FIG. 68 shows another example of a symbol arranging scheme in the time and frequency domains, which is different from the symbol arranging scheme shown in FIG. 66. The symbols shown in FIG. 68 are of the stream s1 and s2 and to be transmitted after the transmission of the P1 symbol, first and second Signalling data, and Common PLP.

In FIG. 68, each symbol denoted by "#1" represents one symbol of the symbol group of PLP #1 shown in FIG. 67. Similarly, each symbol denoted as "#2" represents one symbol of the symbol group of PLP #2 shown in FIG. 67, each symbol denoted as "#3" represents one symbol of the symbol group of PLP shown in FIG. 67, and each symbol denoted as "#4" represents one symbol of the symbol group of PLP #4 shown in FIG. 67. Similarly to FIG. 67, PLP #1 transmits data using spatial multiplexing MIMO system shown in FIG. 49 or the MIMO system with a fixed precoding matrix. PLP #2 transmits data using a precoding scheme of regularly hopping between precoding matrices. PLP #3 transmits data using space-time block coding shown in FIG. 50. Note that the symbol arrangement used in the space-time block coding is not limited to the arrangement in the time domain. Alternatively, the symbol arrangement may be in the frequency domain or in symbol groups formed in the time and frequency domains. In addition, the space-time block coding is not limited to the one shown in FIG. 50.

In FIG. 68, where streams s1 and s2 both have a symbol in the same subcarrier and at the same time, symbols of the two streams are present at the same frequency. In the case where precoding performed includes the precoding according to the scheme for regularly hopping between precoding matrices as described in the other embodiments, streams s1 and s2 are subjected to weighting performed using the precoding matrices and z1 and z2 are output from the respective antennas.

FIG. 68 differs from FIG. 67 in the following points. That is, the example shown in FIG. 67 is an arrangement of a plurality of PLPs using time-sharing, whereas the example shown in FIG. 68 is an arrangement of a plurality of PLPs using both time-sharing and frequency-sharing. That is, for example, at time 1, a symbol of PLP #1 and a symbol of PLP #2 are both present. In this way, PLP symbols having different index numbers (#X; X=1, 2 . . . ) may be allocated on a symbol-by-symbol basis (for each symbol composed of one subcarrier per time).

For the sake of simplicity, FIG. 68 only shows symbols denoted by "#1" and "#2" at time 1. However, this is not a limiting example, and PLP symbols having any index numbers other than "#1" and "#2" may be present at time 1. In addition, the relation between subcarriers present at time 1 and PLP index numbers are not limited to that shown in FIG. 68. Alternatively, a PLP symbol having any index number may be allocated to any subcarrier. Similarly, in addition, a PLP symbol having any index number may be allocated to any subcarrier at any time other than time 1. Alternatively, on the other hand, only one PLP symbol may be allocated at a specific time as at time t3. That is, in a framing scheme of arranging PLP symbols in the time and frequency domains, any allocation is applicable.

As set forth above, no PLPs using "a transmission scheme for transmitting only stream s1" exist in a unit frame, so that the dynamic range of a signal received by the terminal is ensured to be narrow. As a result, the advantageous effect is achieved that the probability of excellent reception quality increases.

Note that the description of FIG. 68 is described using an example in which the transmission scheme selected is one of "spatial multiplexing MIMO system or a MIMO scheme using a fixed precoding matrix", "a precoding scheme of regularly hopping between precoding matrices", and "space-time block coding". Yet, it is not necessary that all of these transmission schemes are selectable. For example, the following combinations of the transmission schemes may be made selectable.

A "precoding scheme of regularly hopping between precoding matrices", "space-time block coding", and "MIMO scheme using a fixed precoding matrix" are selectable.

A "precoding scheme of regularly hopping between precoding matrices" and "space-time block coding" are selectable.

A "precoding scheme of regularly hopping between precoding matrices" and "MIMO scheme using a fixed precoding matrix" are selectable.

The above description relates to an example in which a unit frame includes a plurality of PLPs. The following describes an example in which a unit frame includes one PLP only.

FIG. 69 shows an example of frame structure in the time and frequency domains for stream s1 and s2 in the case where only one PLP exits in a unit frame.

In FIG. 69, the denotation "control symbol" represents a symbol such as P1 symbol, first and second Signalling data, or the like. In the example shown in FIG. 69, the first unit frame is transmitted using interval 1. Similarly, the second unit frame is transmitted using interval 2, the third unit frame is transmitted using interval 3, and the fourth unit frame is transmitted using interval 4.

In the example shown in FIG. 69, in the first unit frame, a symbol group 6801 for PLP #1-1 is transmitted and the transmission scheme selected is "spatial multiplexing MIMO system or MIMO scheme using a fixed precoding matrix".

In the second unit frame, a symbol group 6802 for PLP #2-1 is transmitted and the transmission scheme selected is "a scheme for transmitting one modulated signal."

In the third unit frame, a symbol group 6803 for PLP #3-1 is transmitted and the transmission scheme selected is "a precoding scheme of regularly hopping between precoding matrices".

In the fourth unit frame, a symbol group 6804 for PLP #4-1 is transmitted and the transmission scheme selected is "space-time block coding". Note that the symbol arrangement used in the space-time block coding is not limited to the arrangement in the time domain. Alternatively, the symbols may be arranged in the frequency domain or in symbol groups formed in the time and frequency domains. In addition, the space-time block coding is not limited to the one shown in FIG. 50.

In FIG. 69, where streams s1 and s2 both have a symbol in the same subcarrier and at the same time, symbols of the two streams are present at the same frequency. In the case where precoding performed includes the precoding according to the scheme for regularly hopping between precoding matrices as described in the other embodiments, streams s1 and s2 are subjected to weighting performed using the precoding matrices and z1 and z2 are output from the respective antennas.

In the above manner, a transmission scheme may be set for each PLP in consideration of the data transmission speed and the data reception quality at the receiving terminal, so that increase in data transmission seeped and excellent reception quality are both achieved. As an example scheme of structuring control information, the control information indicating, for example, the transmission scheme and other information of the P1 symbol and first and second Signalling data may be configured in a similar manner to Tables 3-6. The difference is as follows. In the frame structure shown, for example, in FIG. 64, one unit frame includes a plurality of PLPs. Thus, it is necessary to provide the control information indicating the transmission scheme and the like for each PLP. On the other hand, in the frame structure shown, for example, in FIG. 69, one unit frame includes one PLP only. Thus, it is sufficient to provide the control information indicating the transmission scheme and the like only for the one PLP.

The present embodiment has described how a precoding scheme of regularly hopping between precoding matrices is applied to a system compliant with the DVB standard. Embodiments 1 to 16 have described examples of the precoding scheme of regularly hopping between precoding matrices. However, the scheme of regularly hopping between precoding matrices is not limited to the schemes described in Embodiments 1 to 16. The present embodiment can be implemented in the same manner by using a scheme comprising the steps of (i) preparing a plurality of precoding matrices, (ii) selecting, from among the prepared plurality of precoding matrices, one precoding matrix for each slot, and (iii) performing the precoding while regularly hopping between precoding matrices to be used for each slot.

Although control information has unique names in the present embodiment, the names of the control information do not influence the present invention.

Embodiment A2

The present embodiment provides detailed descriptions of a reception scheme and the structure of a reception device used in a case where a scheme of regularly hopping between precoding matrices is applied to a communication system compliant with the DVB-T2 standard, which is described in Embodiment A1.

Figure 73:
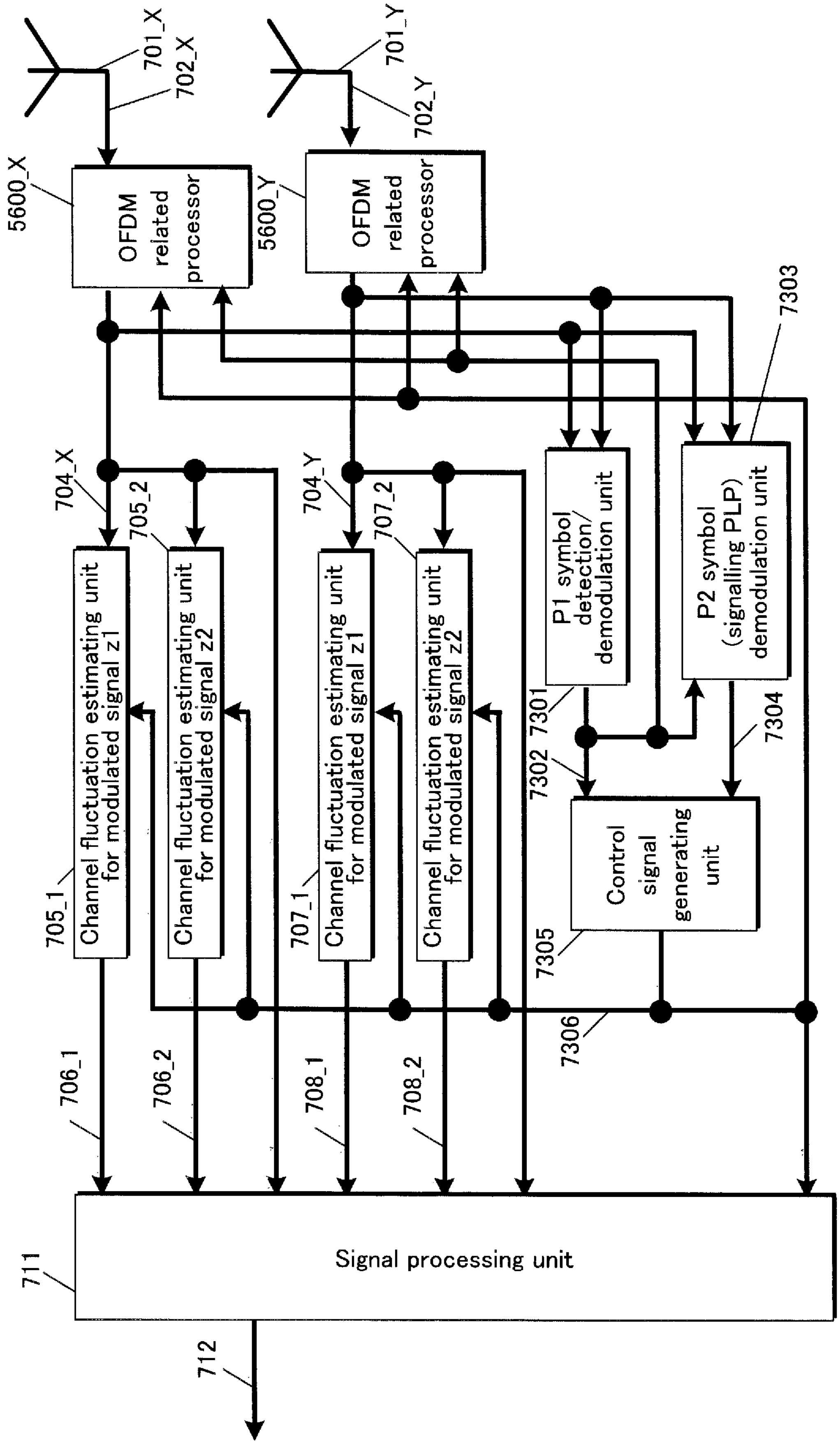
FIG. 73 is an example of a structure of a reception device.

FIG. 73 shows, by way of example, the structure of a reception device of a terminal used in a case where the transmission device of the broadcast station shown in FIG. 63 has adopted a scheme of regularly hopping between precoding matrices. In FIG. 73, the elements that operate in the same manner as in FIGS. 7 and 56 have the same reference signs thereas.

Referring to FIG. 73, a P1 symbol detection/demodulation unit 7301 performs signal detection and temporal frequency synchronization by receiving a signal transmitted by a broadcast station and detecting a P1 symbol based on the inputs, namely signals 704_X and 704_Y that have been subjected to signal processing. The P1 symbol detection/demodulation unit 7301 also obtains control information included in the P1 symbol (by applying demodulation and error correction decoding) and outputs P1 symbol control information 7302. The P1 symbol control information 7302 is input to OFDM related processors 5600_X and 5600_Y. Based on the input information, the OFDM related processors 5600_X and 5600_Y change a signal processing scheme for the OFDM scheme (this is because, as described in Embodiment A1, the P1 symbol includes information on a scheme for transmitting the signal transmitted by the broadcast station).

Signals 704_X and 704_Y that have been subjected to signal processing, as well as the P1 symbol control information 7302, are input to a P2 symbol demodulation unit 7303 (note, a P2 symbol may include a signalling PLP). The P2 symbol demodulation unit 7303 performs signal processing and demodulation (including error correction decoding) based on the P1 symbol control information, and outputs P2 symbol control information 7304.

The P1 symbol control information 7302 and the P2 symbol control information 7304 are input to a control signal generating unit 7305. The control signal generating unit 7305 forms a set of pieces of control information (relating to receiving operations) and outputs the same as a control signal 7306. As illustrated in FIG. 73, the control signal 7306 is input to each unit.

A signal processing unit 711 receives, as inputs, the signals 706_1, 706_2, 708_1, 708_2, 704_X, 704_Y, and the control signal 7306. Based on the information included in the control signal 7306 on the transmission scheme, modulation scheme, error correction coding scheme, coding rate for error correction coding, block size of error correction codes, and the like used to transmit each PLP, the signal processing unit 711 performs demodulation processing and decoding processing, and outputs received data 712.

Here, the signal processing unit 711 may perform demodulation processing by using Equation 41 of Math 41 and Equation 143 of Math 153 in a case where any of the following transmission schemes is used for to transmit each PLP: a spatial multiplexing MIMO system; a MIMO scheme employing a fixed precoding matrix;

and a precoding scheme of regularly hopping between precoding matrices. Note that the channel matrix (H) can be obtained from the resultant outputs from channel fluctuation estimating units (705_1, 705_2, 707_1 and 707_2). The matrix structure of the precoding matrix (F or W) differs depending on the transmission scheme actually used. Especially, when the precoding scheme of regularly hopping between precoding matrices is used, the precoding matrices to be used are hopped between and demodulation is performed every time. Also, when space-time block coding is used, demodulation is performed by using values obtained from channel estimation and a received (baseband) signal.

Figure 74:
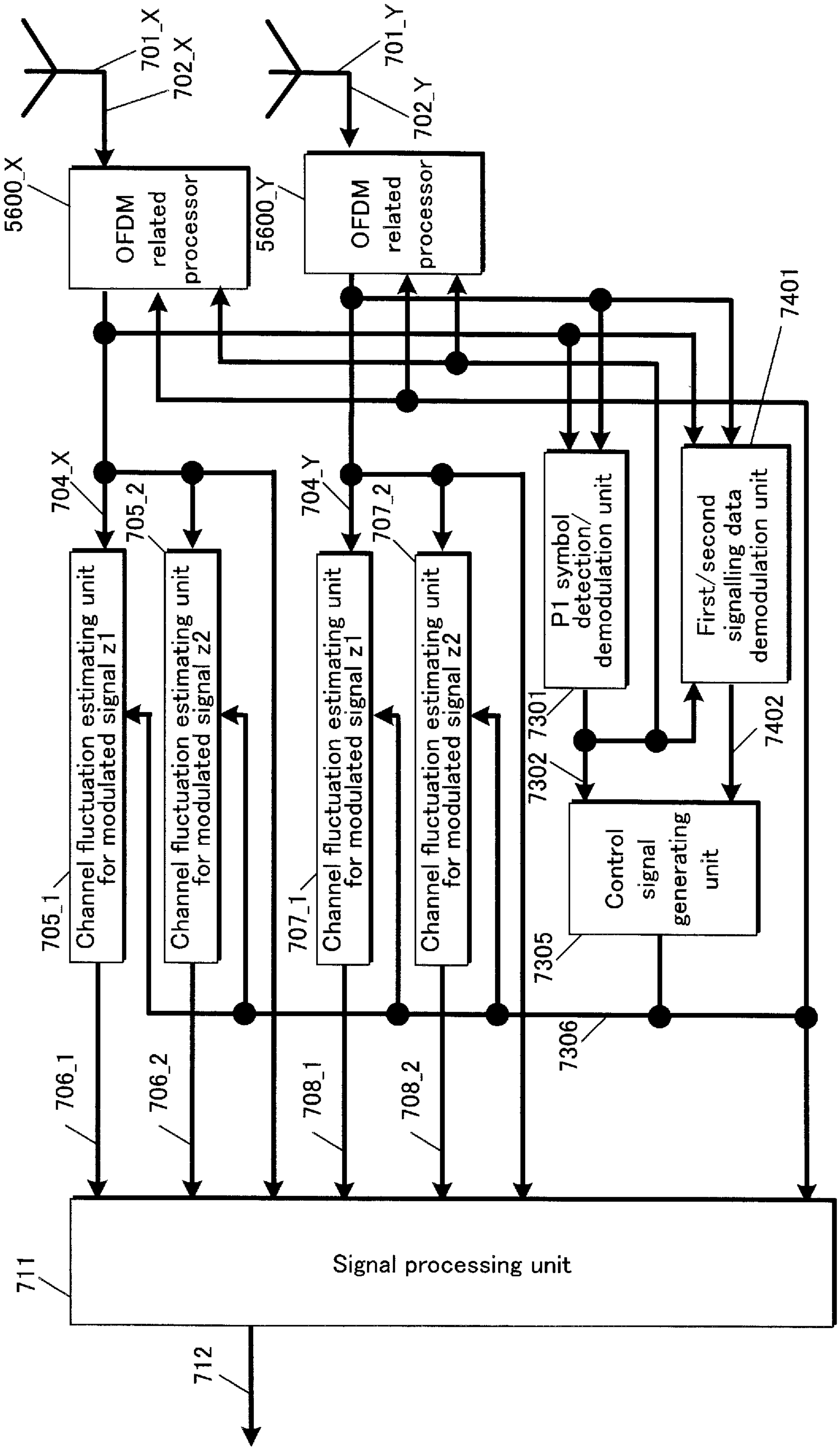
FIG. 74 is an example of a structure of a reception device.

FIG. 74 shows, by way of example, the structure of a reception device of a terminal used in a case where the transmission device of the broadcast station shown in FIG. 72 has adopted a scheme of regularly hopping between precoding matrices. In FIG. 74, the elements that operate in the same manner as in FIGS. 7, 56 and 73 have the same reference signs thereas.

The reception device shown in FIG. 74 and the reception device shown in FIG. 73 are different in that the reception device shown in FIG. 73 can obtain data by receiving signals conforming to the DVB-T2 standard and signals conforming to standards other than the DVB-T2 standard, whereas the reception device shown in FIG. 74 can obtain data by receiving only signals conforming to standards other than the DVB-T2 standard. Referring to FIG. 74, a P1 symbol detection/demodulation unit 7301 performs signal detection and temporal frequency synchronization by receiving a signal transmitted by a broadcast station and detecting a P1 symbol based on the inputs, namely signals 704_X and 704_Y that have been subjected to signal processing. The P1 symbol detection/demodulation unit 7301 also obtains control information included in the P1 symbol (by applying demodulation and error correction decoding) and outputs P1 symbol control information 7302. The P1 symbol control information 7302 is input to OFDM related processors 5600_X and 5600_Y. Based on the input information, the OFDM related processors 5600_X and 5600_Y change a signal processing scheme for the OFDM scheme. (This is because, as described in Embodiment A1, the P1 symbol includes information on a scheme for transmitting the signal transmitted by the broadcast station.)

Signals 704_X and 704_Y that have been subjected to signal processing, as well as the P1 symbol control information 7302, are input to a first/second signalling data demodulation unit 7401. The first/second signalling data demodulation unit 7401 performs signal processing and demodulation (including error correction decoding) based on the P1 symbol control information, and outputs first/second signalling data control information 7402.

The P1 symbol control information 7302 and the first/second signalling data control information 7402 are input to a control signal generating unit 7305. The control signal generating unit 7305 forms a set of pieces of control information (relating to receiving operations) and outputs the same as a control signal 7306. As illustrated in FIG. 74, the control signal 7306 is input to each unit.

A signal processing unit 711 receives, as inputs, the signals 706_1, 706_2, 708_1, 708_2, 704_X, 704_Y, and the control signal 7306. Based on the information included in the control signal 7306 on the transmission scheme, modulation scheme, error correction coding scheme, coding rate for error correction coding, block size of error correction codes, and the like used to transmit each PLP, the signal processing unit 711 performs demodulation processing and decoding processing, and outputs received data 712.

Here, the signal processing unit 711 may perform demodulation processing by using Equation 41 of Math 41 and Equation 143 of Math 153 in a case where any of the following transmission schemes is used to transmit each PLP: a spatial multiplexing MIMO system; a MIMO scheme employing a fixed precoding matrix; and a precoding scheme of regularly hopping between precoding matrices. Note that the channel matrix (H) can be obtained from the resultant outputs from channel fluctuation estimating units (705_1, 705_2, 707_1 and 707_2). The matrix structure of the precoding matrix (F or W) differs depending on the transmission scheme actually used. Especially, when the precoding scheme of regularly hopping between precoding matrices is used, the precoding matrices to be used are hopped between and demodulation is performed every time. Also, when space-time block coding is used, demodulation is performed by using values obtained from channel estimation and a received (baseband) signal.

Figure 75:
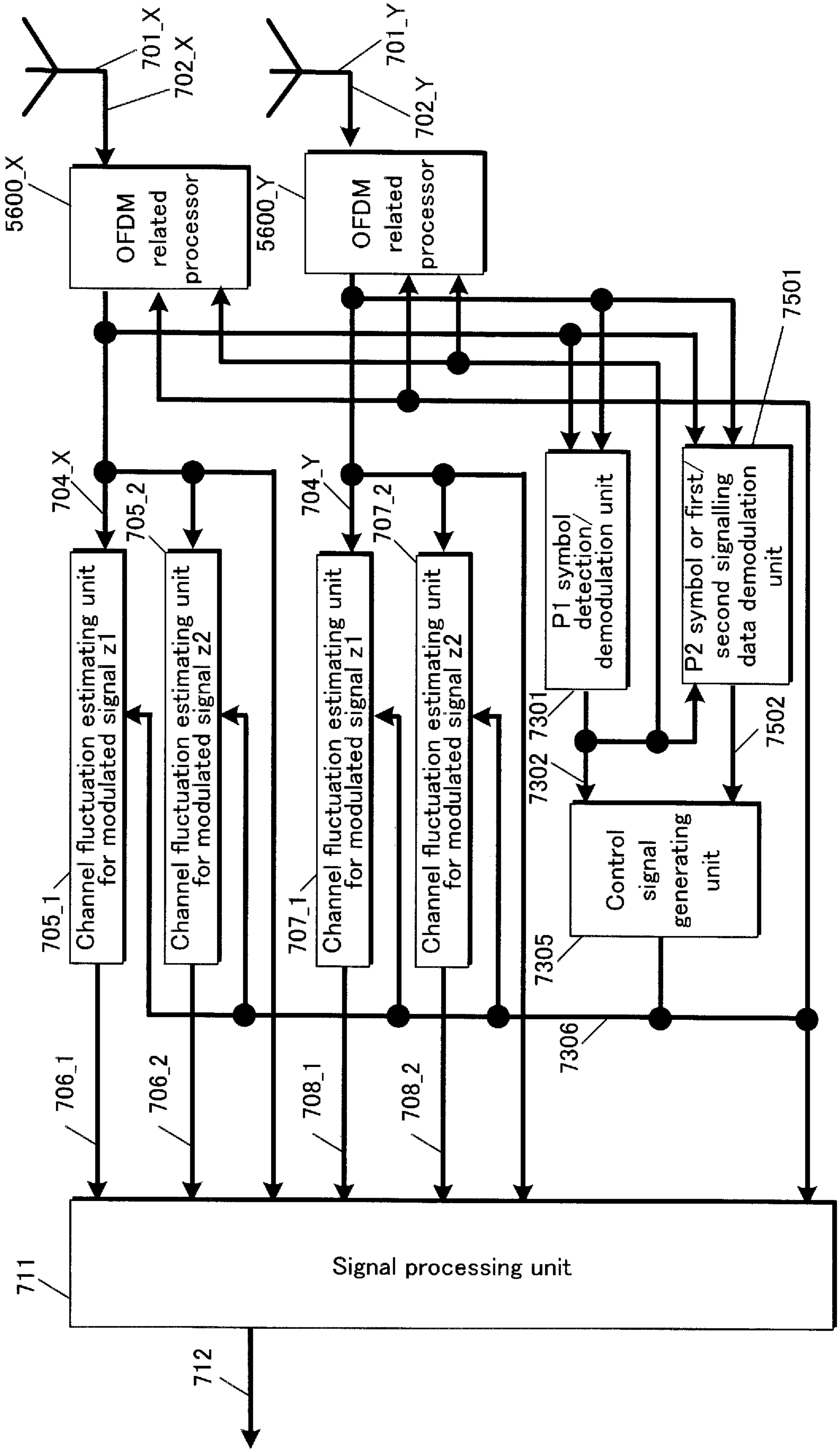
FIG. 75 is an example of a structure of a reception device.

FIG. 75 shows the structure of a reception device of a terminal compliant with both the DVB-T2 standard and standards other than the DVB-T2 standard. In FIG. 75, the elements that operate in the same manner as in FIGS. 7, 56 and 73 have the same reference signs thereas.

The reception device shown in FIG. 75 is different from the reception devices shown in FIGS. 73 and 74 in that the reception device shown in FIG. 75 comprises a P2 symbol or first/second signalling data demodulation unit 7501 so as to be able to demodulate both signals compliant with the DVB-T2 standard and signals compliant with standards other than the DVB-T2 standard.

Signals 704_X and 704_Y that have been subjected to signal processing, as well as P1 symbol control information 7302, are input to the P2 symbol or first/second signalling data demodulation unit 7501. Based on the P1 symbol control information, the P2 symbol or first/second signalling data demodulation unit 7501 judges whether the received signal is compliant with the DVB-T2 standard or with a standard other than the DVB-T2 standard (this judgment can be made with use of, for example, Table 3), performs signal processing and demodulation (including error correction decoding), and outputs control information 7502 that includes information indicating the standard with which the received signal is compliant. Other operations are similar to FIGS. 73 and 74.

As set forth above, the structure of the reception device described in the present embodiment allows obtaining data with high reception quality by receiving the signal transmitted by the transmission device of the broadcast station, which has been described in Embodiment A1, and by performing appropriate signal processing. Especially, when receiving a signal associated with a precoding scheme of regularly hopping between precoding matrices, both the data transmission efficiency and the data reception quality can be improved in an LOS environment.

As the present embodiment has described the structure of the reception device that corresponds to the transmission scheme used by the broadcast station described in Embodiment A1, the reception device is provided with two receive antennas in the present embodiment. However, the number of antennas provided in the reception device is not limited to two. The present embodiment can be implemented in the same manner when the reception device is provided with three or more antennas. In this case, the data reception quality can be improved due to an increase in the diversity gain. Furthermore, when the transmission device of the broadcast station is provided with three or more transmit antennas and transmits three or more modulated signals, the present embodiment can be implemented in the same manner by increasing the number of receive antennas provided in the reception device of the terminal. In this case, it is preferable that the precoding scheme of regularly hopping between precoding matrices be used as a transmission scheme.

Note that Embodiments 1 to 16 have described examples of the precoding scheme of regularly hopping between precoding matrices. However, the scheme of regularly hopping between precoding matrices is not limited to the schemes described in Embodiments 1 to 16. The present embodiment can be implemented in the same manner by using a scheme comprising the steps of (i) preparing a plurality of precoding matrices, (ii) selecting, from among the prepared plurality of precoding matrices, one precoding matrix for each slot, and (iii) performing the precoding while regularly hopping between precoding matrices to be used for each slot.

Embodiment A3

In the system described in Embodiment A1 where the precoding scheme of regularly hopping between precoding matrices is applied to the DVB-T2 standard, there is control information for designating a pilot insertion pattern in L1 pre-signalling. The present embodiment describes how to apply the precoding scheme of regularly hopping between precoding matrices when the pilot insertion pattern is changed in the L1 pre-signalling.

Figure 76A:
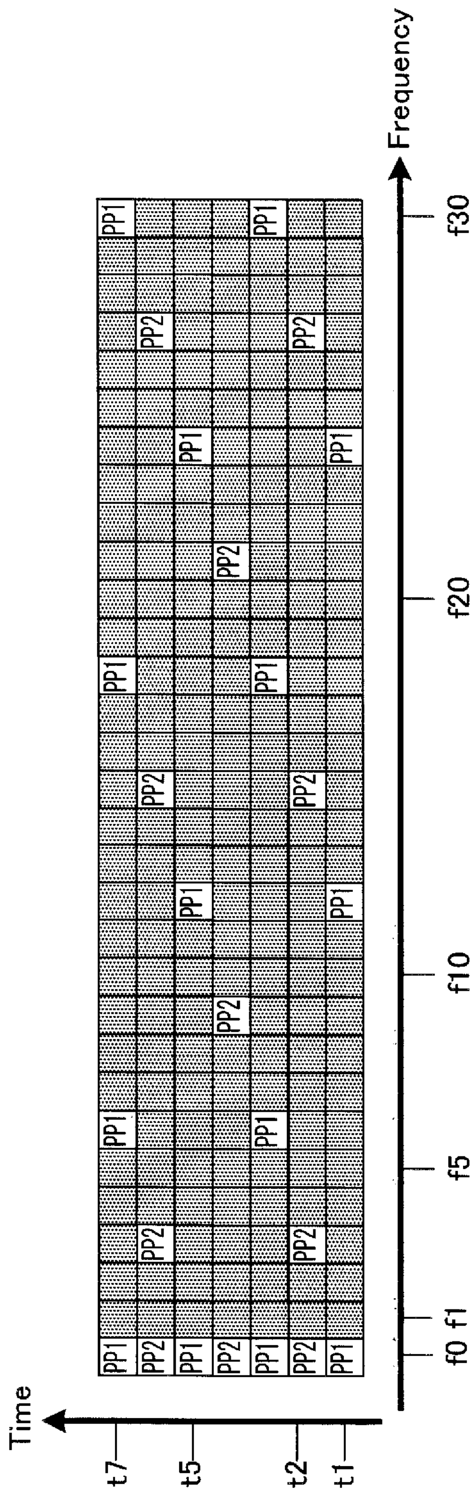
FIGS. 76A and 76B show examples of a frame structure in a frequency-time domain.
Figure 76B:
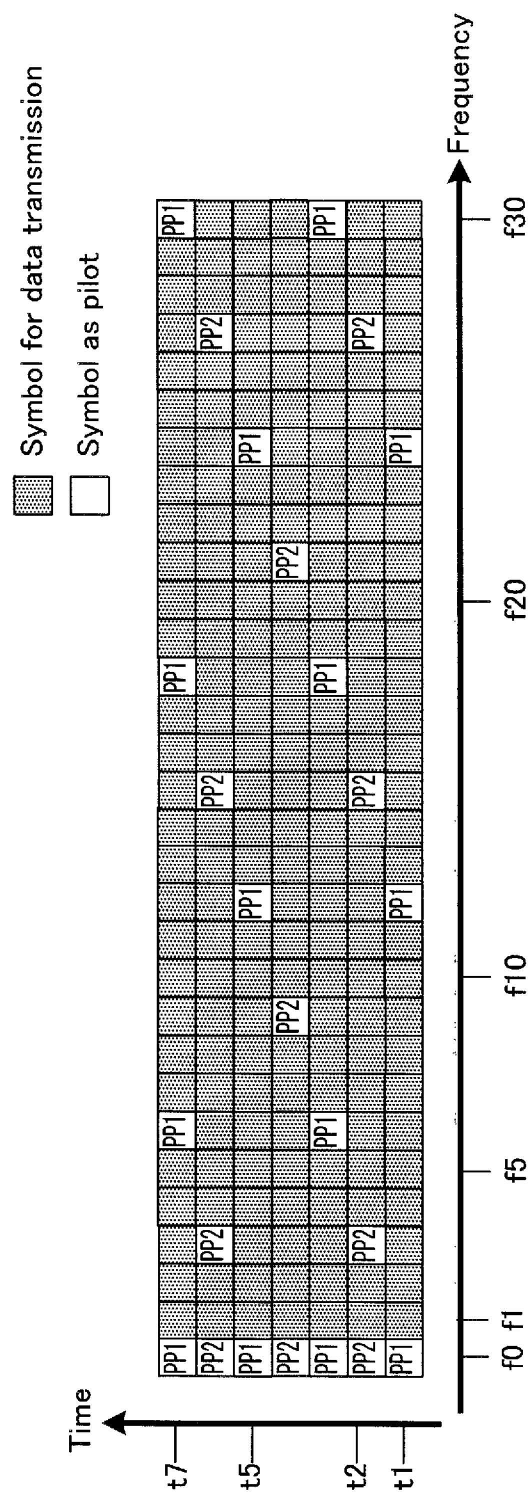
Figure 77A:
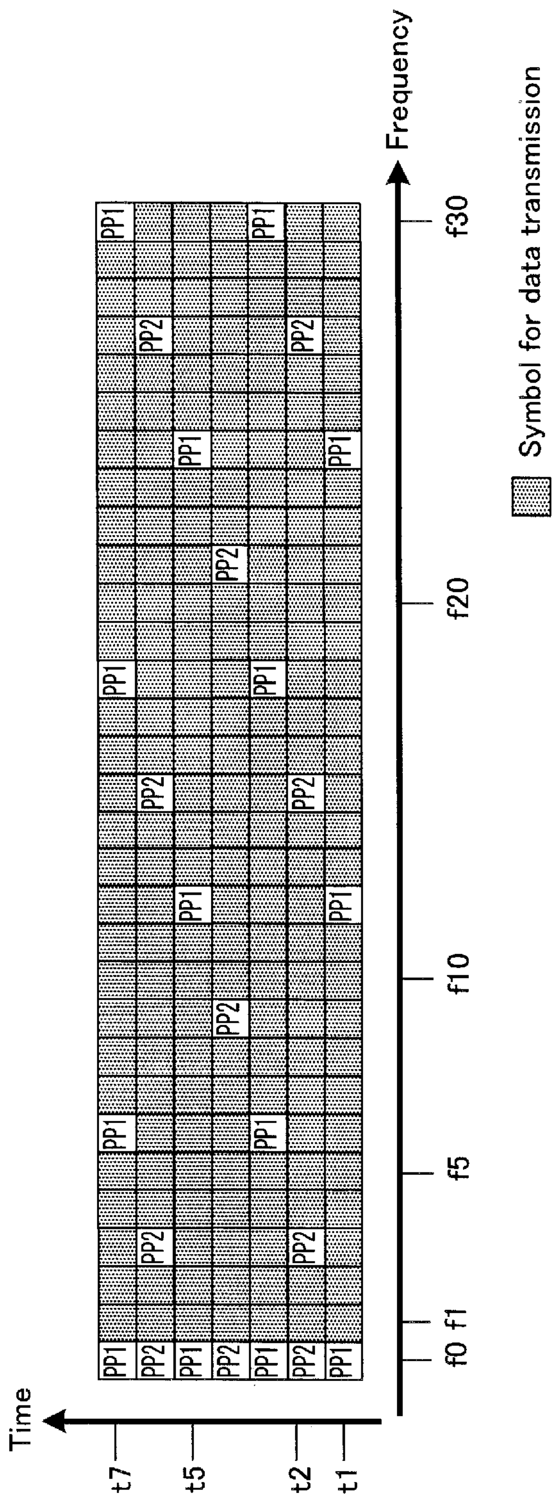
FIGS. 77A and 77B show examples of a frame structure in a frequency-time domain.
Figure 77B:
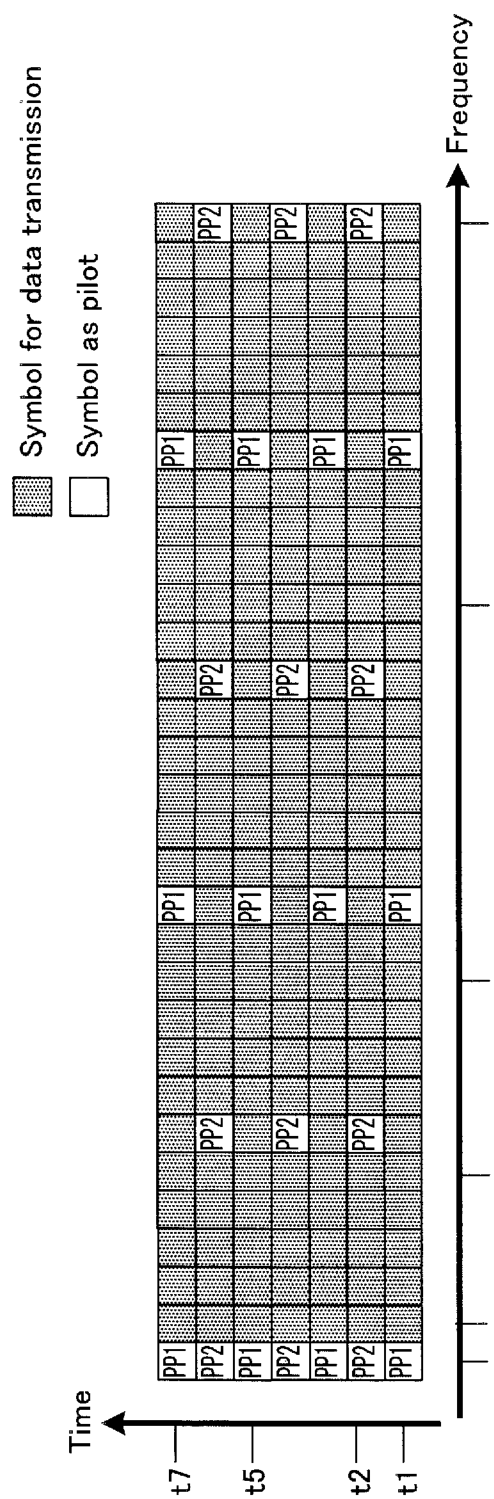

FIGS. 76A, 76B, 77A and 77B show examples of a frame structure represented in a frequency-time domain for the DVB-T2 standard in a case where a plurality of modulated signals are transmitted from a plurality of antennas using the same frequency bandwidth. In each of FIGS. 76A to 77B, the horizontal axis represents frequency and carrier numbers are shown therealong, whereas the vertical axis represents time. FIGS. 76A and 77A each show a frame structure for a modulated signal z1 pertaining to the embodiments that have been described so far. FIGS. 76B and 77B each show a frame structure for a modulated signal z2 pertaining to the embodiments that have been described so far. Indexes "f0, f1, f2, . . . " are assigned as carrier numbers, and indexes "t1, t2, t3, . . . " are assigned as time. In FIGS. 76A to 77B, symbols that are assigned the same carrier number and the same time exist over the same frequency at the same time.

FIGS. 76A to 77B show examples of positions in which pilot symbols are inserted according to the DVB-T2 standard (when a plurality of modulated signals are transmitted by using a plurality of antennas according to the DVB-T2, there are eight schemes regarding the positions in which pilots are inserted; FIGS. 76A to 77B show two of such schemes). FIGS. 76A to 77B show two types of symbols, namely, symbols as pilots and symbols for data transmission ("data transmission symbols"). As described in other embodiments, when a precoding scheme of regularly hopping between precoding matrices or a precoding scheme employing a fixed precoding matrix is used, data transmission symbols in the modulated signal z1 are obtained as a result of performing weighting on the streams s1 and s2, and data transmission symbols in the modulated signal z2 are obtained as a result of performing weighting on the streams s1 and s2. When the space-time block coding or the spatial multiplexing MIMO system is used, data transmission symbols in the modulated signal z1 are either for the stream s1 or for the stream s2, and data transmission symbols in the modulated signal z2 are either for the stream s1 or for the stream s2.

In FIGS. 76A to 77B, the symbols as pilots are each assigned an index "PP1" or "PP2". A pilot symbol with the index "PP1" and a pilot symbol with the index "PP2" are structured by using different schemes. As mentioned earlier, according to the DVB-T2 standard, the broadcast station can designate one of the eight pilot insertion schemes (that differ from one another in the frequency of insertion of pilot symbols in a frame). FIGS. 76A to 77B show two of the eight pilot insertion schemes. Information on one of the eight pilot insertion schemes selected by the broadcast station is transmitted to a transmission destination (terminal) as L1 pre-signalling data of P2 symbols, which has been described in embodiment A1.

Figure 78A:
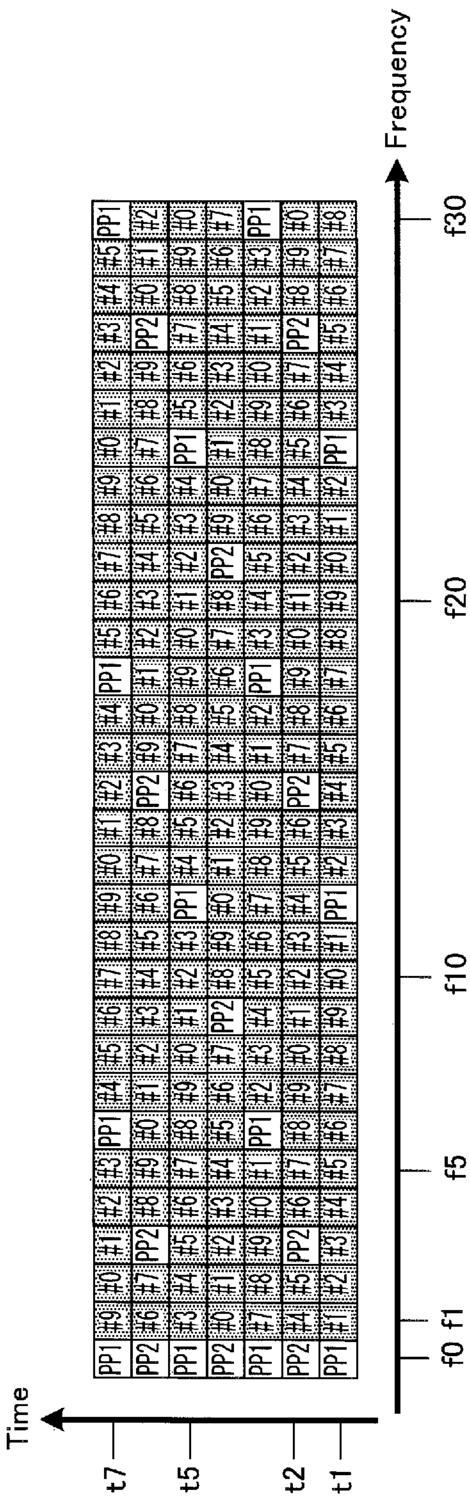
FIGS. 78A and 78B show a result of allocating precoding matrices.
Figure 78B:
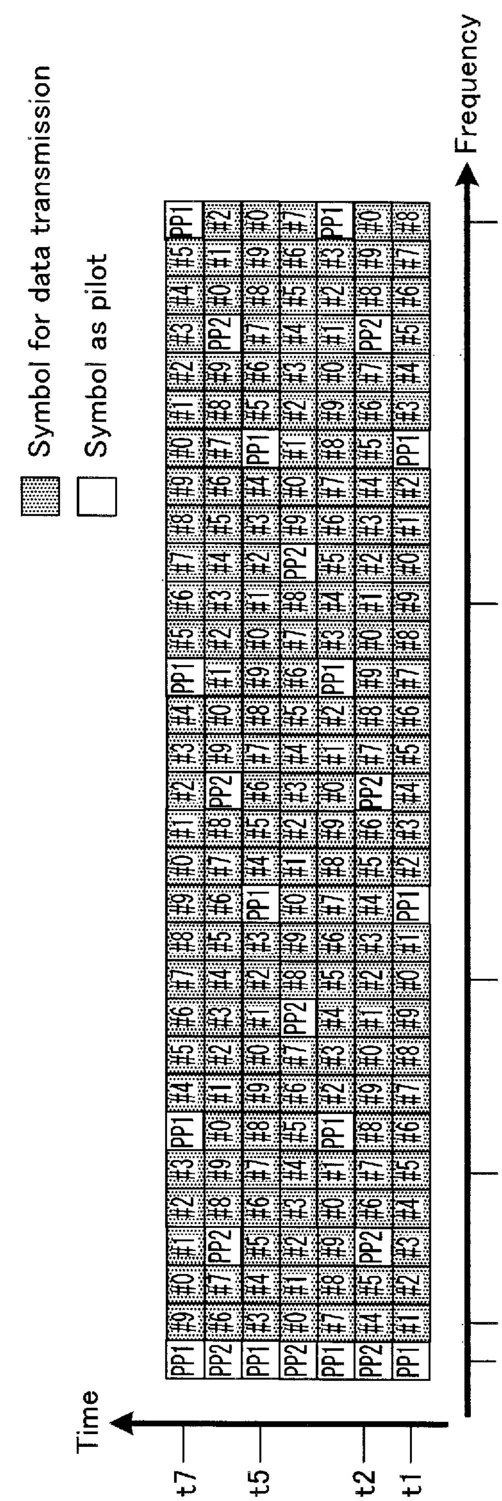
Figure 79A:
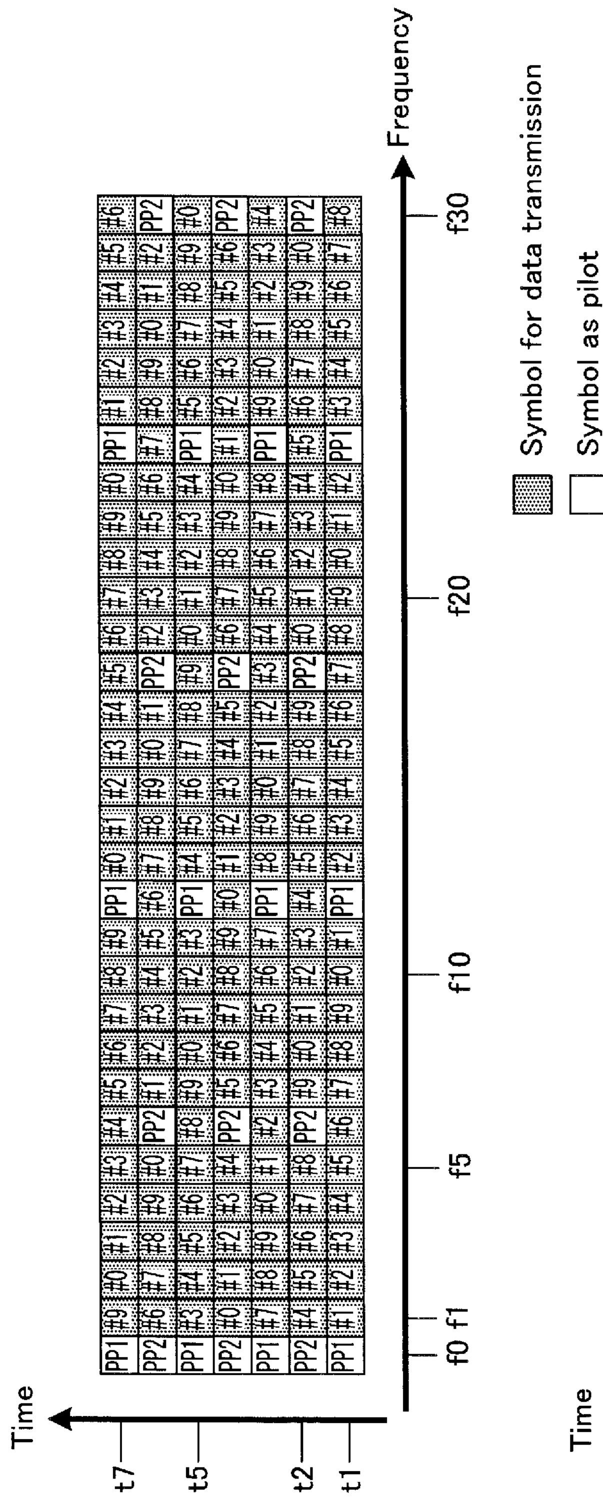
FIGS. 79A and 79B show a result of allocating precoding matrices.
Figure 79B:
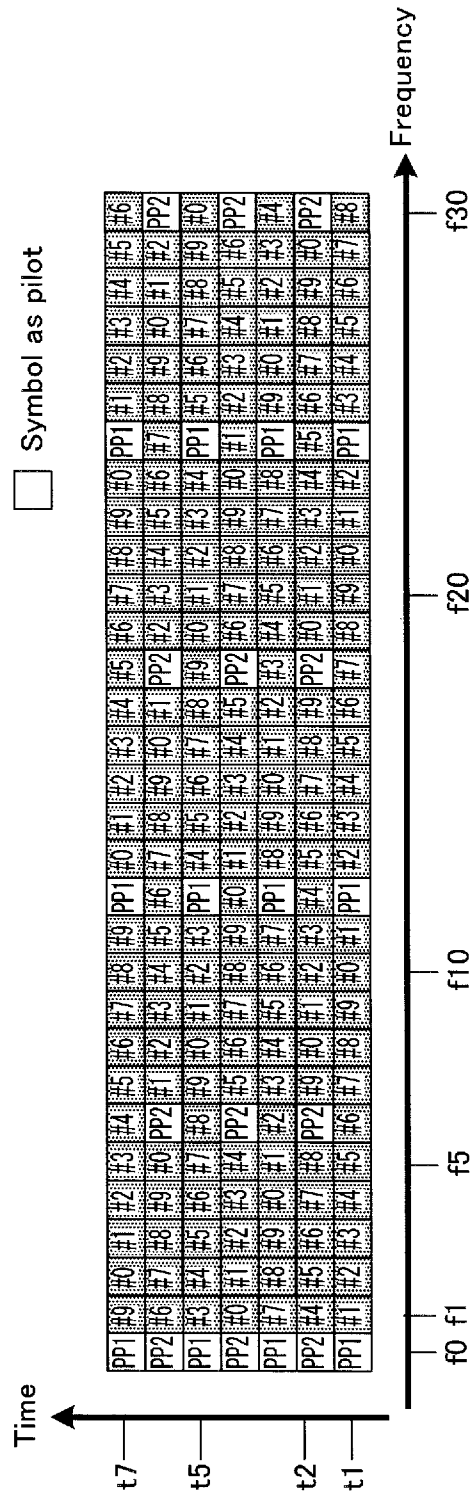

Next, a description is given of how to apply the precoding scheme of regularly hopping between precoding matrices in association with a pilot insertion scheme. By way of example, it is assumed here that 10 different types of precoding matrices F are prepared for the precoding scheme of regularly hopping between precoding matrices, and these 10 different types of precoding matrices F are expressed as F[0], F[1], F[2], F[3], F[4], F[5], F[6], F[7], F[8], and F[9]. FIGS. 78A and 78B show the result of allocating the precoding matrices to the frame structure represented in the frequency-time domains shown in FIGS. 76A and 76B when the precoding scheme of regularly hopping between precoding matrices is applied. FIGS. 79A and 79B show the result of allocating the precoding matrices to the frame structure represented in the frequency-time domains shown in FIGS. 77A and 77B when the precoding scheme of regularly hopping between precoding matrices is applied. For example, in both of the frame structure for the modulated signal z1 shown in FIG. 78A and the frame structure for the modulated signal z2 shown in FIG. 78B, a symbol at the carrier f1 and the time t1 shows "#1". This means that precoding is performed on this symbol by using the precoding matrix F[1]. Likewise, in FIGS. 78A to 79B, a symbol at the carrier fx and the time ty showing "#Z" denotes that precoding is performed on this symbol by using the precoding matrix F[Z] (here, x=0, 1, 2, . . . , and y=1, 2, 3, . . . ).

It should be naturally appreciated that different schemes for inserting pilot symbols (different insertion intervals) are used for the frame structure represented in the frequency-time domain shown in FIGS. 78A and 78B and the frame structure represented in the frequency-time domain shown in FIGS. 79A and 79B. Furthermore, the precoding scheme of regularly hopping between the coding matrices is not applied to pilot symbols. For this reason, even if all of the signals shown in FIGS. 78A to 79B are subjected to the same precoding scheme that regularly hops between precoding matrices over a certain period (cycle) (i.e., the same number of different precoding matrices are prepared for this scheme applied to all of the signals shown in FIGS. 78A to 79B), a precoding matrix allocated to a symbol at a certain carrier and a certain time in FIGS. 78A and 78B may be different from a precoding matrix allocated to the corresponding symbol in FIGS. 79A and 79B. This is apparent from FIGS. 78A to 79B. For example, in FIGS. 78A and 78B, a symbol at the carrier f5 and the time t2 shows "#7", meaning that precoding is performed thereon by using the precoding matrix F[7]. On the other hand, in FIGS. 79A and 79B, a symbol at the carrier f5 and the time t2 shows "#8", meaning that precoding is performed thereon by using the precoding matrix F[8].

Therefore, the broadcast station transmits control information indicating a pilot pattern (pilot insertion scheme) using the L1 pre-signalling data. Note, when the broadcast station has selected the precoding scheme of regularly hopping between precoding matrices as a scheme for transmitting each PLP based on control information shown in Table 4 or 5, the control information indicating the pilot pattern (pilot insertion scheme) may additionally indicate a scheme for allocating the precoding matrices (hereinafter "precoding matrix allocation scheme") prepared for the precoding scheme of regularly hopping between precoding matrices. Hence, the reception device of the terminal that receives modulated signals transmitted by the broadcast station can acknowledge the precoding matrix allocation scheme used in the precoding scheme of regularly hopping between precoding matrices by obtaining the control information indicating the pilot pattern, which is included in the L1 pre-signalling data (on the premise that the broadcast station has selected the precoding scheme of regularly hopping between precoding matrices as a scheme for transmitting each PLP based on control information shown in Table 4 or 5). Although the description of the present embodiment has been given with reference to L1 pre-signalling data, in the case of the frame structure shown in FIG. 70 where no P2 symbol exists, the control information indicating the pilot pattern and the precoding matrix allocation scheme used in the precoding scheme of regularly hopping between precoding matrices is included in first signalling data and second signalling data.

The following describes another example. For example, the above description is also true of a case where the precoding matrices used in the precoding scheme of regularly hopping between precoding matrices are determined at the same time as designation of a modulation scheme, as shown in Table 2. In this case, by transmitting only the pieces of control information indicating a pilot pattern, a scheme for transmitting each PLP and a modulation scheme from P2 symbols, the reception device of the terminal can estimate, via obtainment of these pieces of control information, the precoding matrix allocation scheme used in the precoding scheme of regularly hopping between precoding matrices (note, the allocation is performed in the frequency-time domain). Assume a case where the precoding matrices used in the precoding scheme of regularly hopping between precoding matrices are determined at the same time as designation of a modulation scheme and an error correction coding scheme, as shown in Table 1B. In this case also, by transmitting only the pieces of control information indicating a pilot pattern, a scheme for transmitting each PLP and a modulation scheme, as well as an error correction coding scheme, from P2 symbols, the reception device of the terminal can estimate, via obtainment of these pieces of information, the precoding matrix allocation scheme used in the precoding scheme of regularly hopping between precoding matrices (note, the allocation is performed in the frequency-time domain).

However, unlike the cases of Tables 1B and 2, a precoding matrix hopping scheme used in the precoding scheme of regularly hopping between precoding matrices is transmitted, as indicated by Table 5, in any of the following situations (i) to (iii): (i) when one of two or more different schemes of regularly hopping between precoding matrices can be selected even if the modulation scheme is determined (examples of such two or more different schemes include: precoding schemes that regularly hop between precoding matrices over different periods (cycles); and precoding schemes that regularly hop between precoding matrices, where the precoding matrices used in one scheme is different from those used in another; (ii) when one of two or more different schemes of regularly hopping between precoding matrices can be selected even if the modulation scheme and the error correction scheme are determined; and (iii) when one of two or more different schemes of regularly hopping between precoding matrices can be selected even if the error correction scheme is determined. In any of these situations (i) to (iii), it is permissible to transmit information on the precoding matrix allocation scheme used in the precoding scheme of regularly hopping between precoding matrices, in addition to the precoding matrix hopping scheme used in the precoding scheme of regularly hopping between precoding matrices (note, the allocation is performed in the frequency-time domain).

Table 7 shows an example of the structure of control information for the information on the precoding matrix allocation scheme used in the precoding scheme of regularly hopping between precoding matrices (note, the allocation is performed in the frequency-time domain).

TABLE 7

| | |
|---|---|
| MATRIX_FRAME_ARRANGEMENT (2 bits) | 00: Precoding matrix allocation scheme #1 in frames<br>01: Precoding matrix allocation scheme #2 in frames<br>10: Precoding matrix allocation scheme #3 in frames<br>11: Precoding matrix allocation scheme #4 in frames |

Figure 80A:
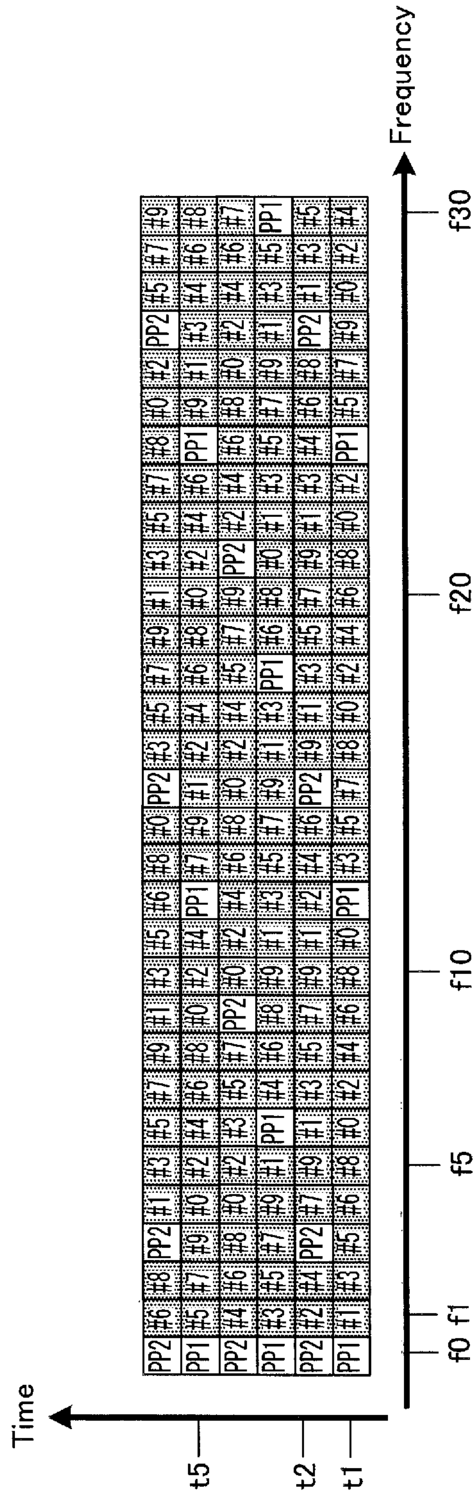
FIGS. 80A and 80B show a result of allocating precoding matrices.
Figure 80B:
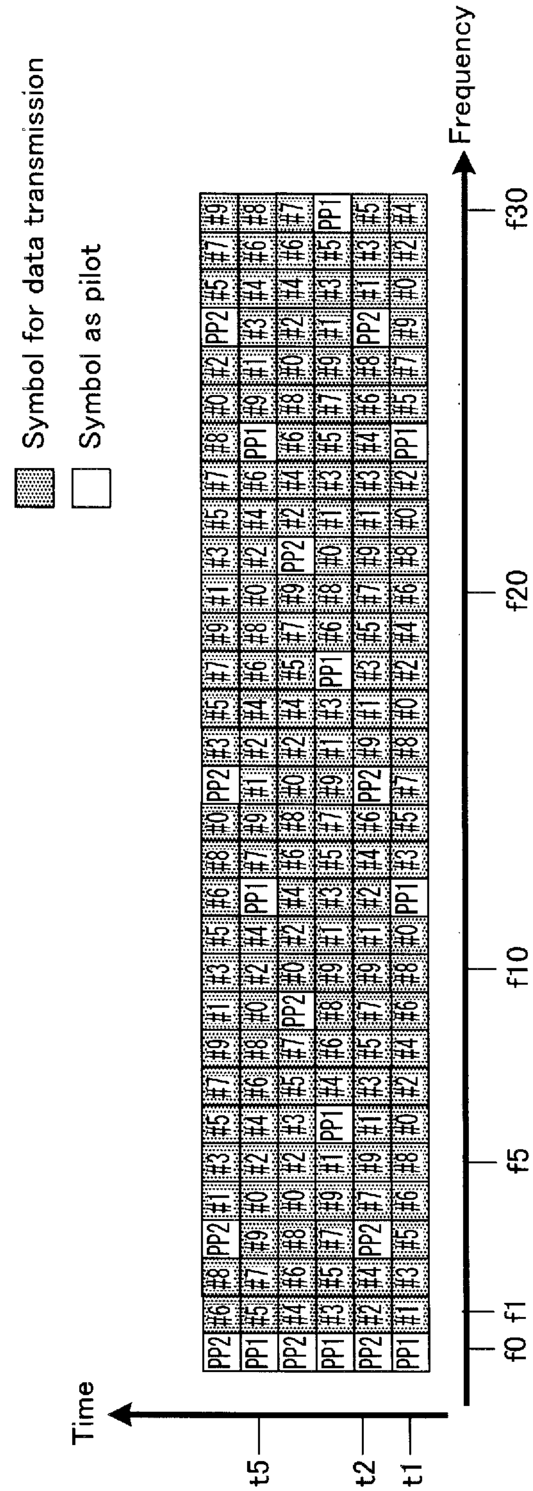

By way of example, assume a case where the transmission device of the broadcast station has selected the pilot insertion pattern shown in FIGS. 76A and 76B, and selected a scheme A as the precoding scheme of regularly hopping between precoding matrices. In this case, the transmission device of the broadcast station can select either the precoding matrix allocation scheme shown in FIGS. 78A and 78B or the precoding matrix allocation scheme shown in FIGS. 80A and 80B (note, the allocation is performed in the frequency-time domain). For example, when the transmission device of the broadcast station has selected the precoding matrix allocation scheme shown in FIGS. 78A and 78B, "MATRIX_FRAME_ARRANGEMENT" in Table 7 is set to "00". On the other hand, when the transmission device has selected the precoding matrix allocation scheme shown in FIGS. 80A and 80B, "MATRIX_FRAME_ARRANGEMENT" in Table 7 is set to "01". Then, the reception device of the terminal can acknowledge the precoding matrix allocation scheme by obtaining the control information shown in Table 7 (note, the allocation is performed in the frequency-time domain). Note that the control information shown in Table 7 can be transmitted by using P2 symbols, or by using first signalling data and second signalling data.

As set forth above, by implementing the precoding matrix allocation scheme used in the precoding scheme of regularly hopping between precoding matrices based on the pilot insertion scheme, and by properly transmitting the information indicative of the precoding matrix allocation scheme to the transmission destination (terminal), the reception device of the terminal can achieve the advantageous effect of improving both the data transmission efficiency and the data reception quality.

The present embodiment has described a case where the broadcast station transmits two signals. However, the present embodiment can be implemented in the same manner when the transmission device of the broadcast station is provided with three or more transmit antennas and transmits three or more modulated signals. Embodiments 1 to 16 have described examples of the precoding scheme of regularly hopping between precoding matrices. However, the scheme of regularly hopping between precoding matrices is not limited to the schemes described in Embodiments 1 to 16. The present embodiment can be implemented in the same manner by using a scheme comprising the steps of (i) preparing a plurality of precoding matrices, (ii) selecting, from among the prepared plurality of precoding matrices, one precoding matrix for each slot, and (iii) performing the precoding while regularly hopping between precoding matrices to be used for each slot.

Embodiment A4

In the present embodiment, a description is given of a repetition scheme used in a precoding scheme of regularly hopping between precoding matrices in order to improve the data reception quality.

FIGS. 3, 4, 13, 40 and 53 each show the structure of a transmission device employing the precoding scheme of regularly hopping between precoding matrices. On the other hand, the present embodiment describes the examples where repetition is used in the precoding scheme of regularly hopping between precoding matrices.

Figure 81:
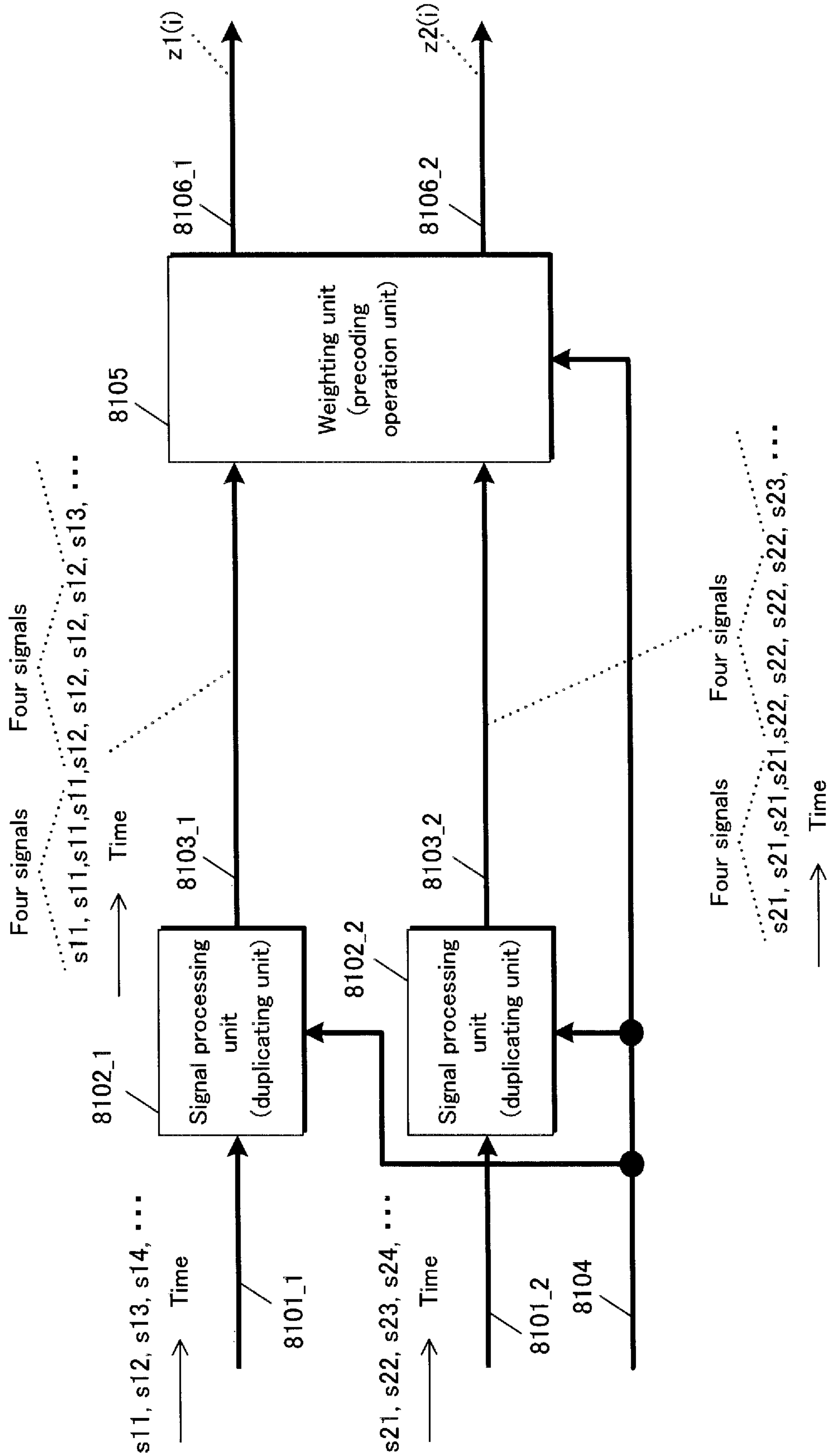
FIG. 81 is an example of the structure of a signal processing unit.

FIG. 81 shows an example of the structure of the signal processing unit pertaining to a case where repetition is used in the precoding scheme of regularly hopping between precoding matrices. In light of FIG. 53, the structure of FIG. 81 corresponds to the signal processing unit 5308.

A baseband signal 8101_1 shown in FIG. 81 corresponds to the baseband signal 5307_1 shown in FIG. 53. The baseband signal 8101_1 is obtained as a result of mapping, and constitutes the stream s1. Likewise, a baseband signal 8101_2 shown in FIG. 81 corresponds to the baseband signal 5307_2 shown in FIG. 53. The baseband signal 8101_2 is obtained as a result of mapping, and constitutes the stream s2.

The baseband signal 8101_1 and a control signal 8104 are input to a signal processing unit (duplicating unit) 8102_1. The signal processing unit (duplicating unit) 8102_1 generates duplicates of the baseband signal in accordance with the information on the number of repetitions included in the control signal 8104. For example, in a case where the information on the number of repetitions included in the control signal 8104 indicates four repetitions, provided that the baseband signal 8101_1 includes signals s11, s12, s13, s14, . . . arranged in the stated order along the time axis, the signal processing unit (duplicating unit) 8102_1 generates a duplicate of each signal four times, and outputs the resultant duplicates. That is, after the four repetitions, the signal processing unit (duplicating unit) 8102_1 outputs, as the baseband signal 8103_1, four pieces of s11 (i.e., s11, s11, s11, s11), four pieces of s12 (i.e., s12, s12, s12, s12), four pieces of s13 (i.e., s13, s13, s13, s13), four pieces of s14 (i.e., s14, s14, s14, s14) and so on, in the stated order along the time axis.

The baseband signal 8101_2 and the control signal 8104 are input to a signal processing unit (duplicating unit) 8102_2. The signal processing unit (duplicating unit) 8102_2 generates duplicates of the baseband signal in accordance with the information on the number of repetitions included in the control signal 8104. For example, in a case where the information on the number of repetitions included in the control signal 8104 indicates four repetitions, provided that the baseband signal 8101_2 includes signals s21, s22, s23, s24, . . . arranged in the stated order along the time axis, the signal processing unit (duplicating unit) 8102_2 generates a duplicate of each signal four times, and outputs the resultant duplicates. That is, after the four repetitions, the signal processing unit (duplicating unit) 8102_2 outputs, as the baseband signal 8103_2, four pieces of s21 (i.e., s21, s21, s21, s21), four pieces of s22 (i.e., s22, s22, s22, s22), four pieces of s23 (i.e., s23, s23, s23, s13), four pieces of s24 (i.e., s14, s24, s24, s24) and so on, in the stated order along the time axis.

The baseband signals 8103_1 and 8103_2 obtained as a result of repetitions, as well as the control signal 8104, are input to a weighting unit (precoding operation unit) 8105. The weighting unit (precoding operation unit) 8105 performs precoding based on the information on the precoding scheme of regularly hopping between precoding matrices, which is included in the control signal 8104. More specifically, the weighting unit (precoding operation unit) 8105 performs weighting on the baseband signals 8103_1 and 8103_2 obtained as a result of repetitions, and outputs baseband signals 8106_1 and 8106_2 on which the precoding has been performed (here, the baseband signals 8106_1 and 8106_2 are respectively expressed as z1(*i*) and z2(*i*), where i represents the order (along time or frequency)).

Provided that the baseband signals 8103_1 and 8103_2 obtained as a result of repetitions are respectively y1(*i*) and y2(*i*) and the precoding matrix is F(i), the following relationship is satisfied.

Math 561

$$\begin{pmatrix} z1(i) \\ z2(i) \end{pmatrix} = F(i)\begin{pmatrix} y1(i) \\ y2(i) \end{pmatrix} \qquad \text{Equation 475}$$

Provided that N precoding matrices prepared for the precoding scheme of regularly hopping between precoding matrices are F[0], F[1], F[2], F[3], . . . , F[N−1] (where N is an integer larger than or equal to two), one of the precoding matrices F[0], F[1], F[2], F[3], . . . , F[N−1] is used as F(i) in Equation 475.

By way of example, assume that i=0, 1, 2, 3; y1(*i*) represents four duplicated baseband signals s11, s11, s11, s11; and y2(*i*) represents four duplicated baseband signals s21, s21, s21, s21. Under this assumption, it is important that the following condition be met.

Math 562

For $^{\forall}\alpha^{\forall}\beta$, the relationship $F(\alpha)\neq F(\beta)$ is satisfied (for α, β=0, 1, 2, 3 and α≠β).

The following description is derived by generalizing the above. Assume that the number of repetitions is K; $i=g_0, g_1, g_2, \ldots, g_{K-1}$ (i.e., $g_j$ where j is an integer in a range of 0 to K−1); and y1(*i*) represents s11. Under this assumption, it is important that the following condition be met.

Math 563

For $^{\forall}\alpha^{\forall}\beta$, the relationship $F(\alpha)\neq F(\beta)$ is satisfied (for α, $\beta=g_j$ (j being an integer in a range of 0 to K−1) and α≠β).

Likewise, assume that the number of repetitions is K; $i=h_0, h_1, h_2, \ldots, h_{K-1}$ (i.e., $h_j$ where j is an integer in a range of 0 to K−1); and y2(*i*) represents s21. Under this assumption, it is important that the following condition be met.

Math 564

For $^{\forall}\alpha^{\forall}\beta$, the relationship $F(\alpha)\neq F(\beta)$ is satisfied (for α, $\beta=h_j$ being an integer in a range of 0 to K−1) and α≠β).

Here, the relationship $g_j=h_j$ may be or may not be satisfied. This way, the identical streams generated through the repetitions are transmitted while using different precoding matrices therefor, and thus the advantageous effect of improving the data reception quality is achieved.

The present embodiment has described a case where the broadcast station transmits two signals. However, the present embodiment can be implemented in the same manner when the transmission device of the broadcast station is provided with three or more transmit antennas and transmits three or more modulated signals. Assume that the number of transmitted signals is Q; the number of repetitions is K; i=$g_0$, $g_1$, $g_2$, . . . , $g_{K-1}$ (i.e., $g_j$ where j is an integer in a range of 0 to K−1); and yb(i) represents sb1 (where b is an integer in a range of 1 to Q). Under this assumption, it is important that the following condition be met.

Math 565 For $^\forall\alpha^\forall\beta$, the relationship F(α)≠F(β) is satisfied (for α, β=$g_j$ (j being an integer in a range of 0 to K−1) and α≠β).

Note that F(i) is a precoding matrix pertaining to a case where the number of transmitted signals is Q.

Figure 82:
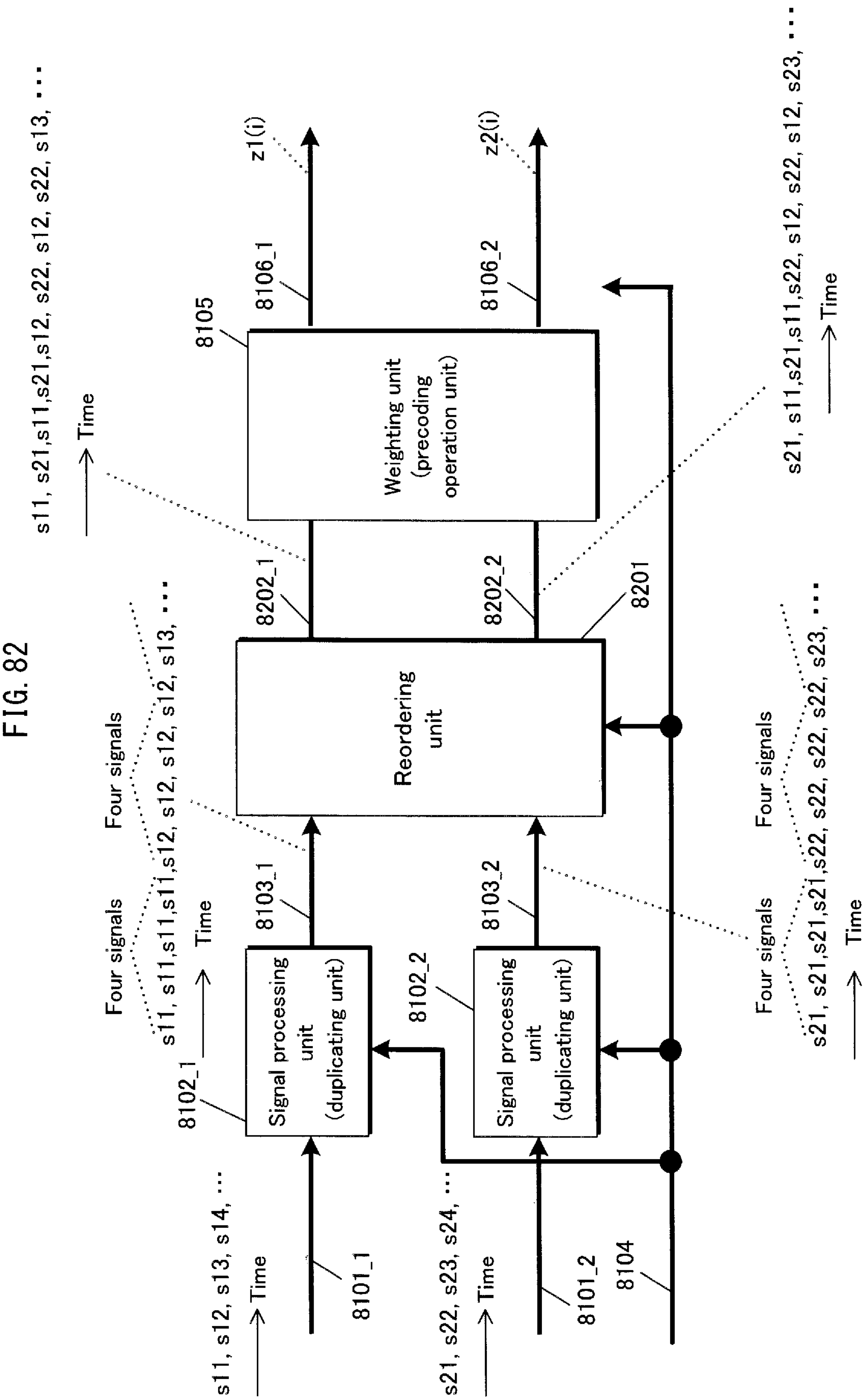
FIG. 82 is an example of the structure of a signal processing unit.

Next, an embodiment different from the embodiment illustrated in FIG. 81 is described with reference to FIG. 82. In FIG. 82, the elements that operate in the same manner as in FIG. 81 have the same reference signs thereas. The structure shown in FIG. 82 is different from the structure shown in FIG. 81 in that data pieces are reorders so as to transmit identical data pieces from different antennas.

A baseband signal 8101_1 shown in FIG. 82 corresponds to the baseband signal 5307_1 shown in FIG. 53. The baseband signal 8101_1 is obtained as a result of mapping, and constitutes the s1 stream. Similarly, a baseband signal 8101_2 shown in FIG. 81 corresponds to the baseband signal 5307_2 shown in FIG. 53. The baseband signal 8101_2 is obtained as a result of mapping, and constitutes the s2 stream.

The baseband signal 8101_1 and the control signal 8104 are input to a signal processing unit (duplicating unit) 8102_1. The signal processing unit (duplicating unit) 8102_1 generates duplicates of the baseband signal in accordance with the information on the number of repetitions included in the control signal 8104. For example, in a case where the information on the number of repetitions included in the control signal 8104 indicates four repetitions, provided that the baseband signal 8101_1 includes signals s11, s12, s13, s14, . . . arranged in the stated order along the time axis, the signal processing unit (duplicating unit) 8102_1 generates a duplicate of each signal four times, and outputs the resultant duplicates. That is, after the four repetitions, the signal processing unit (duplicating unit) 8102_1 outputs, as the baseband signal 8103_1, four pieces of s11 (i.e., s11, s11, s11, s11), four pieces of s12 (i.e., s12, s12, s12, s12), four pieces of s13 (i.e., s13, s13, s13, s13), four pieces of s14 (i.e., s14, s14, s14, s14) and so on, in the stated order along the time axis.

The baseband signal 8101_2 and the control signal 8104 are input to a signal processing unit (duplicating unit) 8102_2. The signal processing unit (duplicating unit) 8102_2 generates duplicates of the baseband signal in accordance with the information on the number of repetitions included in the control signal 8104. For example, in a case where the information on the number of repetitions included in the control signal 8104 indicates four repetitions, provided that the baseband signal 8101_2 includes signals s21, s22, s23, s24, . . . arranged in the stated order along the time axis, the signal processing unit (duplicating unit) 8102_1 generates a duplicate of each signal four times, and outputs the resultant duplicates. That is, after the four repetitions, the signal processing unit (duplicating unit) 8102_2 outputs, as the baseband signal 8103_2, four pieces of s21 (i.e., s21, s21, s21, s21), four pieces of s22 (i.e., s22, s22, s22, s22), four pieces of s23 (i.e., s23, s23, s23, s23), four pieces of s24 (i.e., s24, s24, s24, s24) and so on, in the stated order along the time axis.

The baseband signals 8103_1 and 8103_2 obtained as a result of repetitions, as well as the control signal 8104, are input to a reordering unit 8201. The reordering unit 8201 reorders the data pieces in accordance with information on a repetition scheme included in the control signal 8104, and outputs baseband signals 8202_1 and 8202_2 obtained as a result of reordering. For example, assume that the baseband signal 8103_1 obtained as a result of repetitions is composed of four pieces of s11 (s11, s11, s11, s11) arranged along the time axis, and the baseband signal 8103_2 obtained as a result of repetitions is composed of four pieces of s21 (s21, s21, s21, s21) arranged along the time axis. In FIG. 82, s11 is output as both y1(*i*) and y2(*i*) of Equation 475, and s21 is similarly output as both y1(*i*) and y2(*i*) of Equation 475. Likewise, the reordering similar to the reordering performed on s11 is performed on s12, s13, . . . , and the reordering similar to the reordering performed on s21 is performed on s22, s23, . . . . Hence, the baseband signal 8202_1 obtained as a result of reordering includes s11, s21, s11, s21, s12, s22, s12, s22, s13, s23, s13, s23, . . . arranged in the stated order, which are equivalent to y1(*i*) of Equation 475. Although the pieces of s11 and s21 are arranged in the order s11, s21, s11 and s21 in the above description, the pieces of s11 and s21 are not limited to being arranged in this way, but may be arranged in any order. Similarly, the pieces of s12 and s22, as well as the pieces of s13 and s23, may be arranged in any order. The baseband signal 8202_2 obtained as a result of reordering includes s21, s11, s21, s11, s22, s12, s22, s12, s23, s13, s23, s13, . . . in the stated order, which are equivalent to y2(*i*) of Equation 475. Although the pieces of s11 and s21 are arranged in the order s21, s11, s21 and s11 in the above description, the pieces of s11 and s21 are not limited to being arranged in this way, but may be arranged in any order. Similarly, the pieces of s12 and s22, as well as the pieces of s13 and s23, may be arranged in any order.

The baseband signals 8202_1 and 8202_2 obtained as a result of reordering, as well as the control signal 8104, are input to a weighting unit (precoding operation unit) 8105. The weighting unit (precoding operation unit) 8105 performs precoding based on the information on the precoding scheme of regularly hopping between precoding matrices, which is included in the control signal 8104. More specifically, the weighting unit (precoding operation unit) 8105 performs weighting on the baseband signals 8202_1 and 8202_2 obtained as a result of reordering, and outputs baseband signals 8106_1 and 8106_2 on which the precoding has been performed (here, the baseband signals 8106_1 and 8106_2 are respectively expressed as z1(*i*) and z2(*i*), where i represents the order (along time or frequency)).

As described earlier, under the assumption that the baseband signals 8202_1 and 8202_2 obtained as a result of reordering are respectively y1(*i*) and y2(*i*) and the precoding matrix is F(i), the relationship in Equation 475 is satisfied.

Provided that N precoding matrices prepared for the precoding scheme of regularly hopping between precoding matrices are F[0], F[1], F[2], F[3], . . . , F[N−1] (where N is an integer larger than or equal to two), one of the precoding matrices F[0], F[1], F[2], F[3], . . . , F[N−1] is used as F(i) in Equation 475.

Although it has been described above that four repetitions are performed, the number of repetitions is not limited to four. As with the structure shown in FIG. 81, the structure shown in FIG. 82 also achieves high reception quality when the relationships set out in Math 304 to Math 307 are satisfied.

The structure of the reception device is illustrated in FIGS. 7 and 56. By taking advantage of fulfillment of the relationships set out in Equation 144 and Equation 475, the signal processing unit demodulates bits transmitted by each of s11, s12, s13, s14, . . . , and bits transmitted by each of s21, s22, s23, s24, . . . . Note that each bit may be calculated as a log-likelihood ratio or as a hard-decision value. Furthermore, by taking advantage of the fact that K repetitions are performed on s11, it is possible to obtain highly reliable estimate values for bits transmitted by s1. Likewise, by taking advantage of the fact that K repetitions are performed on s12, s13, . . . , and on s21, s22, s23, . . . , it is possible to obtain highly reliable estimate values for bits transmitted by s12, s13, . . . , and by s21, s22, s23, . . . .

The present embodiment has described a scheme for applying a precoding scheme of regularly hopping between precoding matrices in the case where the repetitions are performed. When there are two types of slots, i.e., slots over which data is transmitted after performing the repetitions, and slots over which data is transmitted without performing the repetitions, either of a precoding scheme of regularly hopping between precoding matrices or a precoding scheme employing a fixed precoding matrix may be used as a transmission scheme for the slots over which data is transmitted without performing the repetitions. Put another way, in order for the reception device to achieve high data reception quality, it is important that the transmission scheme pertaining to the present embodiment be used for the slots over which data is transmitted after performing the repetitions.

In the systems associated with the DVB standard that have been described in Embodiments A1 through A3, it is necessary to secure higher reception qualities for P2 symbols, first signalling data and second signalling data than for PLPs. When P2 symbols, first signalling data and second signalling data are transmitted by using the precoding scheme of regularly hopping between precoding matrices described in the present embodiment, which incorporates the repetitions, the reception quality of control information improves in the reception device. This is important for stable operations of the systems.

Embodiments 1 to 16 have provided examples of the precoding scheme of regularly hopping between precoding matrices described in the present embodiment. However, the scheme of regularly hopping between precoding matrices is not limited to the schemes described in Embodiments 1 to 16. The present embodiment can be implemented in the same manner by using a scheme comprising the steps of (i) preparing a plurality of precoding matrices, (ii) selecting, from among the prepared plurality of precoding matrices, one precoding matrix for each slot, and (iii) performing the precoding while regularly hopping between precoding matrices for each slot.

Embodiment A5

The present embodiment describes a scheme for transmitting modulated signals by applying common amplification to the transmission scheme described in Embodiment A1.

Figure 83:
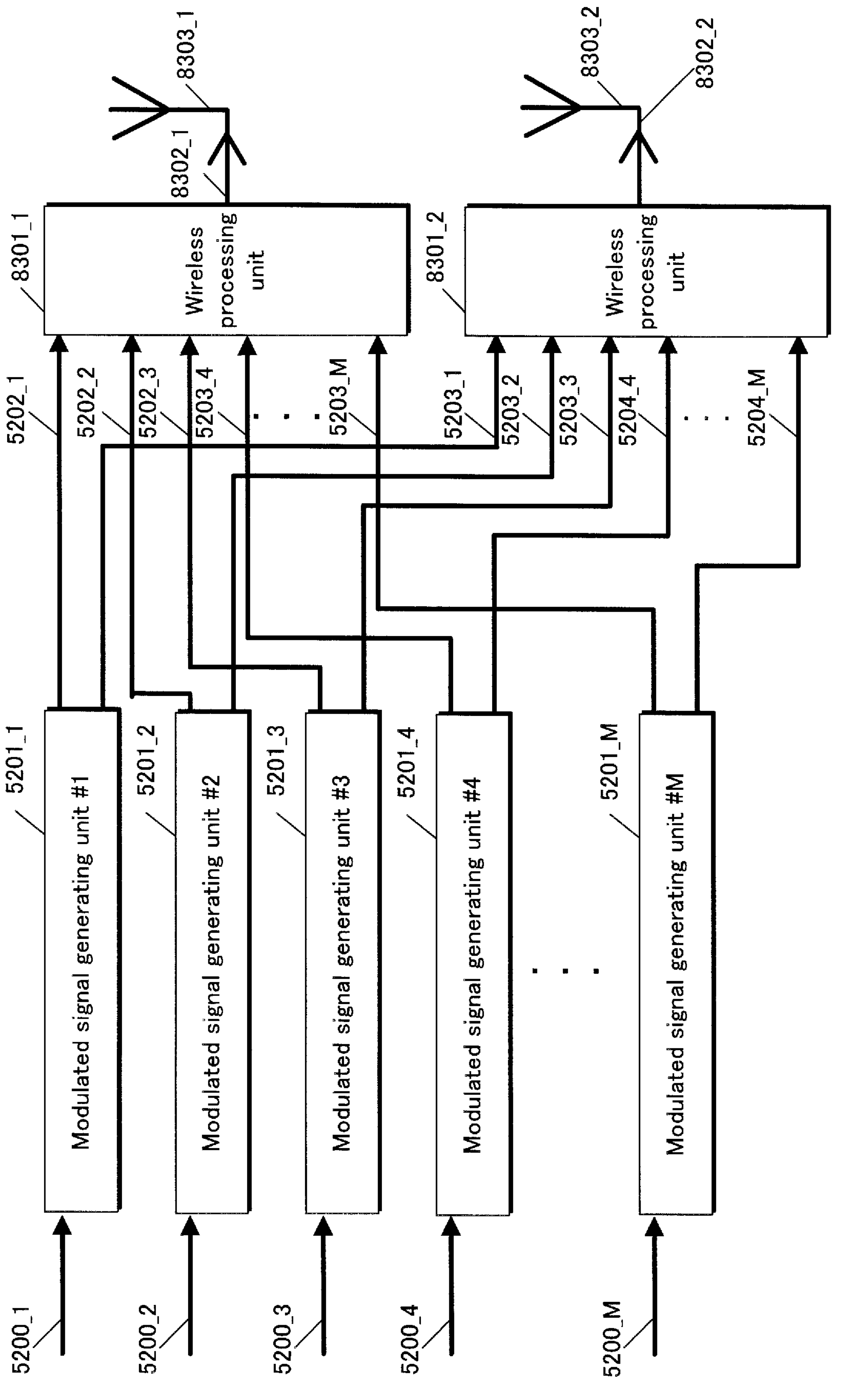
FIG. 83 is an example of the structure of the transmission device.

FIG. 83 shows an example of the structure of a transmission device. In FIG. 83, the elements that operate in the same manner as in FIG. 52 have the same reference signs thereas.

Modulated signal generating units #1 to #M (i.e., 5201_1 to 5201_M) shown in FIG. 83 generate the signals 6323_1 and 6323_2 from the input signals (input data), the signals 6323_1 and 6323_2 being subjected to processing for a P1 symbol and shown in FIG. 63 or 72. The modulated signal generating units #1 to #M output modulated signals z1 (5202_1 to 5202_M) and modulated signals z2 (5203_1 to 5203_M).

The modulated signals z1 (5202_1 to 5202_M) are input to a wireless processing unit 8301_1 shown in FIG. 83. The wireless processing unit 8301_1 performs signal processing (e.g., frequency conversion) and amplification, and outputs a modulated signal 8302_1. Thereafter, the modulated signal 8302_1 is output from an antenna 8303_1 as a radio wave.

Similarly, the modulated signals z2 (5203_1 to 5203_M) are input to a wireless processing unit 8301_2. The wireless processing unit 8301_2 performs signal processing (e.g., frequency conversion) and amplification, and outputs a modulated signal 8302_2. Thereafter, the modulated signal 8302_2 is output from an antenna 8303_2 as a radio wave.

As set forth above, it is permissible to use the transmission scheme described in Embodiment A1 while performing frequency conversion and amplification simultaneously on modulated signals having different frequency bandwidths.

Embodiment B1

The following describes a structural example of an application of the transmission schemes and reception schemes shown in the above embodiments and a system using the application.

Figure 84:
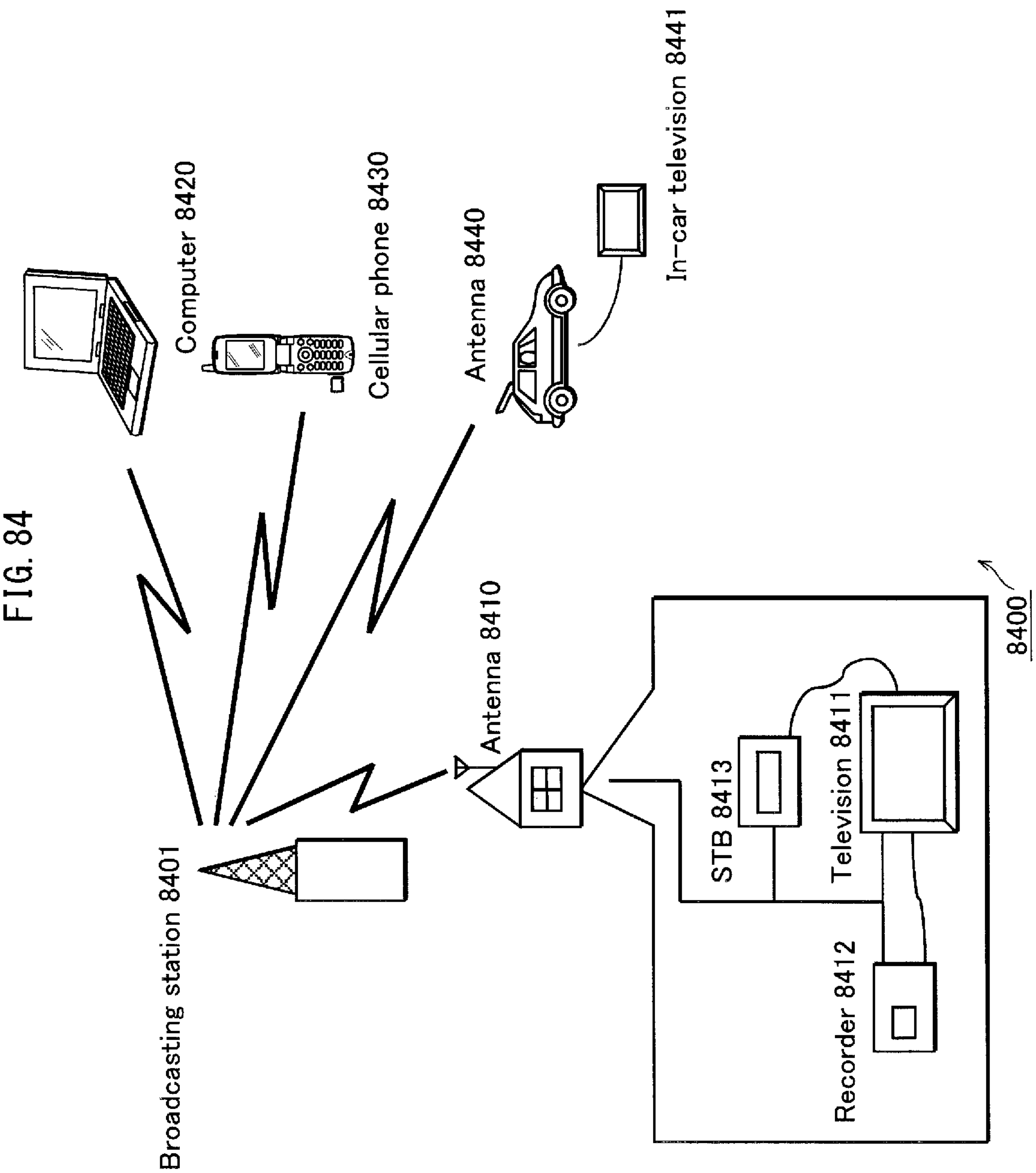
FIG. 84 shows the overall structure of a digital broadcasting system.

FIG. 84 shows an example of the structure of a system that includes devices implementing the transmission schemes and reception schemes described in the above embodiments. The transmission scheme and reception scheme described in the above embodiments are implemented in a digital broadcasting system 8400, as shown in FIG. 84, that includes a broadcasting station and a variety of reception devices such as a television 8411, a DVD recorder 8412, a Set Top Box (STB) 8413, a computer 8420, an in-car television 8441, and a mobile phone 8430. Specifically, the broadcasting station 8401 transmits multiplexed data, in which video data, audio data, and the like are multiplexed, using the transmission schemes in the above embodiments over a predetermined broadcasting band.

An antenna (for example, antennas 8560 and 8440) internal to each reception device, or provided externally and connected to the reception device, receives the signal transmitted from the broadcasting station 8401. Each reception device obtains the multiplexed data by using the reception schemes in the above embodiments to demodulate the signal received by the antenna. In this way, the digital broadcasting system 8400 obtains the advantageous effects of the present invention described in the above embodiments.

The video data included in the multiplexed data has been coded with a moving picture coding method compliant with a standard such as Moving Picture Experts Group (MPEG)-2, MPEG-4 Advanced Video Coding (AVC), VC-1, or the like. The audio data included in the multiplexed data has been encoded with an audio coding method compliant with a standard such as Dolby Audio Coding (AC)-3, Dolby Digital Plus, Meridian Lossless Packing (MLP), Digital Theater Systems (DTS), DTS-HD, Linear Pulse-Code Modulation (PCM), or the like.

Figure 85:
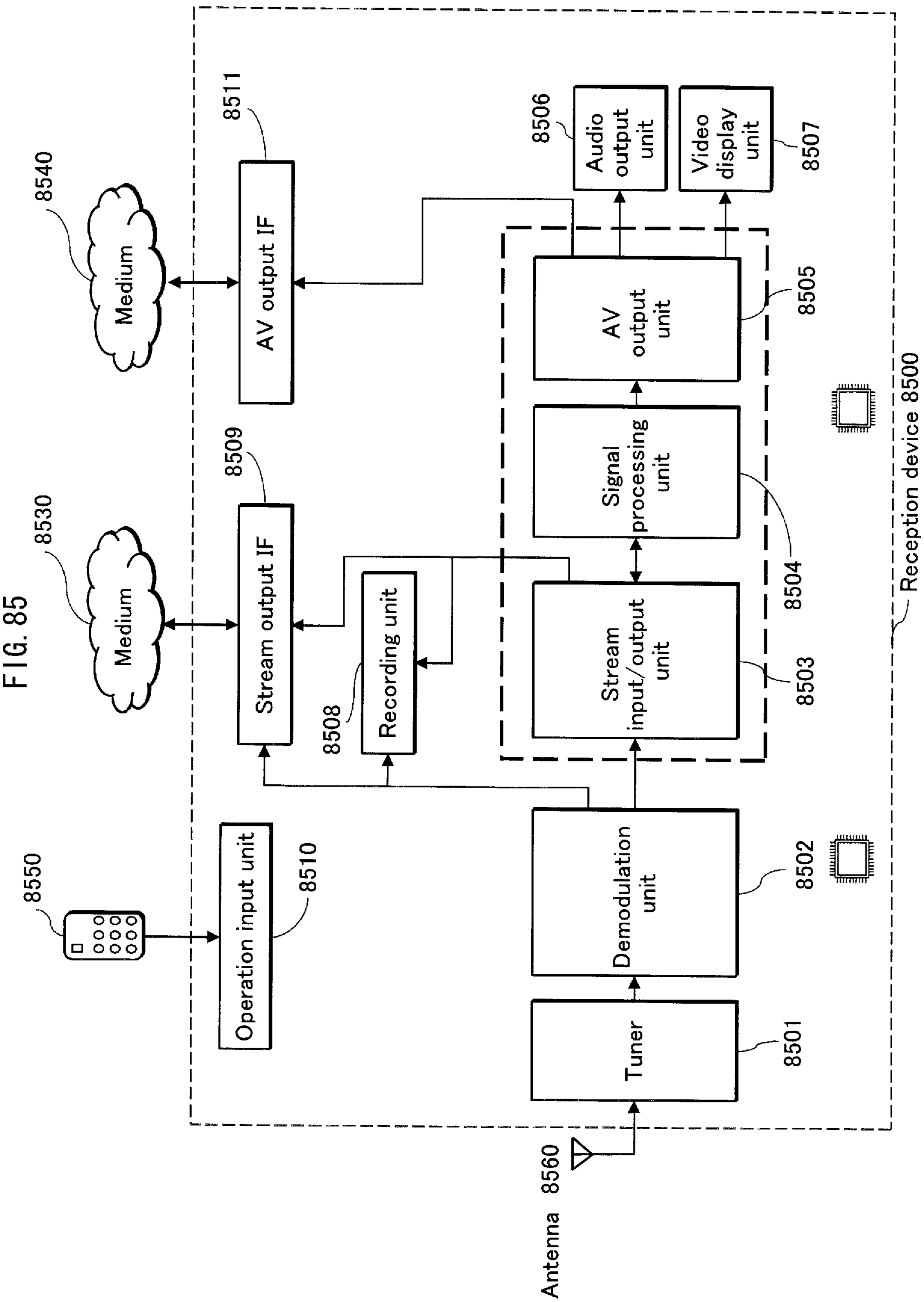
FIG. 85 is a block diagram showing an example of the structure of a reception device.

FIG. 85 is a schematic view illustrating an exemplary structure of a reception device 8500 for carrying out the reception schemes described in the above embodiments. As illustrated in FIG. 85, in one exemplary structure, the reception device 8500 may be composed of a modem portion implemented on a single LSI (or a single chip set) and a codec portion implemented on another single LSI (or another single chip set). The reception device 8500 shown in FIG. 85 corresponds to a component that is included, for example, in the television 8411, the DVD recorder 8412, the STB 8413, the computer 8420, the in-car television 8441, the mobile phone 8430, or the like illustrated in FIG. 84. The reception device 8500 includes a tuner 8501, for transforming a high-frequency signal received by an antenna 8560 into a baseband signal, and a demodulation unit 8502, for demodulating multiplexed data from the baseband signal obtained by frequency conversion. The reception schemes described in the above embodiments are implemented in the demodulation unit 8502, thus obtaining the advantageous effects of the present invention described in the above embodiments.

The reception device 8500 includes a stream input/output unit 8520, a signal processing unit 8504, an audio output unit 8506, and a video display unit 8507. The stream input/output unit 8520 demultiplexes video and audio data from multiplexed data obtained by the demodulation unit 8502. The signal processing unit 8504 decodes the demultiplexed video data into a video signal using an appropriate method picture decoding method and decodes the demultiplexed audio data into an audio signal using an appropriate audio decoding scheme. The audio output unit 8506, such as a speaker, produces audio output according to the decoded audio signal. The video display unit 8507, such as a display monitor, produces video output according to the decoded video signal.

For example, the user may operate the remote control 8550 to select a channel (of a TV program or audio broadcast), so that information indicative of the selected channel is transmitted to an operation input unit 8510. In response, the reception device 8500 demodulates, from among signals received with the antenna 8560, a signal carried on the selected channel and applies error correction decoding, so that reception data is extracted. At this time, the reception device 8500 receives control symbols included in a signal corresponding to the selected channel and containing information indicating the transmission scheme (the transmission scheme, modulation scheme, error correction scheme, and the like in the above embodiments) of the signal (exactly as described in Embodiments A1 through A4 and as shown in FIGS. 5 and 41). With this information, the reception device 8500 is enabled to make appropriate settings for the receiving operations, demodulation scheme, scheme of error correction decoding, and the like to duly receive data included in data symbols transmitted from a broadcasting station (base station). Although the above description is directed to an example in which the user selects a channel using the remote control 8550, the same description applies to an example in which the user selects a channel using a selection key provided on the reception device 8500.

With the above structure, the user can view a broadcast program that the reception device 8500 receives by the reception schemes described in the above embodiments.

The reception device 8500 according to this embodiment may additionally include a recording unit (drive) 8508 for recording various data onto a recording medium, such as a magnetic disk, optical disc, or a non-volatile semiconductor memory. Examples of data to be recorded by the recording unit 8508 include data contained in multiplexed data that is obtained as a result of demodulation and error correction decoding by the demodulation unit 8502, data equivalent to such data (for example, data obtained by compressing the data), and data obtained by processing the moving pictures and/or audio. (Note here that there may be a case where no error correction decoding is applied to a signal obtained as a result of demodulation by the demodulation unit 8502 and where the reception device 8500 conducts further signal processing after error correction decoding. The same holds in the following description where similar wording appears.) Note that the term "optical disc" used herein refers to a recording medium, such as Digital Versatile Disc (DVD) or BD (Blu-ray Disc), that is readable and writable with the use of a laser beam. Further, the term "magnetic disk" used herein refers to a recording medium, such as a floppy disk (FD, registered trademark) or hard disk, that is writable by magnetizing a magnetic substance with magnetic flux. Still further, the term "non-volatile semiconductor memory" refers to a recording medium, such as flash memory or ferroelectric random access memory, composed of semiconductor element(s). Specific examples of non-volatile semiconductor memory include an SD card using flash memory and a flash Solid State Drive (SSD). It should be naturally appreciated that the specific types of recording media mentioned herein are merely examples, and any other types of recording mediums may be usable.

With the above structure, the user can record a broadcast program that the reception device 8500 receives with any of the reception schemes described in the above embodiments, and time-shift viewing of the recorded broadcast program is possible anytime after the broadcast.

In the above description of the reception device 8500, the recording unit 8508 records multiplexed data obtained as a result of demodulation and error correction decoding by the demodulation unit 8502. However, the recording unit 8508 may record part of data extracted from the data contained in the multiplexed data. For example, the multiplexed data obtained as a result of demodulation and error correction decoding by the demodulation unit 8502 may contain contents of data broadcast service, in addition to video data and audio data. In this case, new multiplexed data may be generated by multiplexing the video data and audio data, without the contents of broadcast service, extracted from the multiplexed data demodulated by the demodulation unit 8502, and the recording unit 8508 may record the newly generated multiplexed data. Alternatively, new multiplexed data may be generated by multiplexing either of the video data and audio data contained in the multiplexed data obtained as a result of demodulation and error correction decoding by the demodulation unit 8502, and the recording unit 8508 may record the newly generated multiplexed data. The recording unit 8508 may also record the contents of data broadcast service included, as described above, in the multiplexed data.

The reception device 8500 described in this embodiment may be included in a television, a recorder (such as DVD recorder, Blu-ray recorder, HDD recorder, SD card recorder, or the like), or a mobile telephone. In such a case, the multiplexed data obtained as a result of demodulation and error correction decoding by the demodulation unit 8502 may contain data for correcting errors (bugs) in software used to operate the television or recorder or in software used to prevent disclosure of personal or confidential information. If such data is contained, the data is installed on the television or recorder to correct the software errors. Further, if data for correcting errors (bugs) in software installed in the reception device 8500 is contained, such data is used to correct errors that the reception device 8500 may have. This arrangement ensures more stable operation of the TV, recorder, or mobile phone in which the reception device 8500 is implemented.

Note that it may be the stream input/output unit 8503 that handles extraction of data from the whole data contained in multiplexed data obtained as a result of demodulation and error correction decoding by the demodulation unit 8502 and multiplexing of the extracted data. More specifically, under instructions given from a control unit not illustrated in the figures, such as a CPU, the stream input/output unit 8503 demultiplexes video data, audio data, contents of data broadcast service etc. from the multiplexed data demodulated by the demodulation unit 8502, extracts specific pieces of data from the demultiplexed data, and multiplexes the extracted data pieces to generate new multiplexed data. The data pieces to be extracted from demultiplexed data may be determined by the user or determined in advance for the respective types of recording mediums.

With the above structure, the reception device 8500 is enabled to extract and record only data necessary to view a recorded broadcast program, which is effective to reduce the size of data to be recorded.

In the above description, the recording unit 8508 records multiplexed data obtained as a result of demodulation and error correction decoding by the demodulation unit 8502. Alternatively, however, the recording unit 8508 may record new multiplexed data generated by multiplexing video data newly yielded by encoding the original video data contained in the multiplexed data obtained as a result of demodulation and error correction decoding by the demodulation unit 8502. Here, the moving picture coding method to be employed may be different from that used to encode the original video data, so that the data size or bit rate of the new video data is smaller than the original video data. Here, the moving picture coding method used to generate new video data may be of a different standard from that used to generate the original video data. Alternatively, the same moving picture coding method may be used but with different parameters. Similarly, the recording unit 8508 may record new multiplexed data generated by multiplexing audio data newly obtained by encoding the original audio data contained in the multiplexed data obtained as a result of demodulation and error correction decoding by the demodulation unit 8502. Here, the audio coding method to be employed may be different from that used to encode the original audio data, such that the data size or bit rate of the new audio data is smaller than the original audio data.

The process of converting the original video or audio data contained in the multiplexed data obtained as a result of demodulation and error correction decoding by the demodulation unit 8502 into the video or audio data of a different data size of bit rate is performed, for example, by the stream input/output unit 8503 and the signal processing unit 8504. More specifically, under instructions given from the control unit such as the CPU, the stream input/output unit 8503 demultiplexes video data, audio data, contents of data broadcast service etc. from the multiplexed data obtained as a result of demodulation and error correction decoding by the demodulation unit 8502. Under instructions given from the control unit, the signal processing unit 8504 converts the demultiplexed video data and audio data respectively using a moving picture coding method and an audio coding method each different from the method that was used in the conversion applied to obtain the video and audio data. Under instructions given from the control unit, the stream input/output unit 8503 multiplexes the newly converted video data and audio data to generate new multiplexed data. Note that the signal processing unit 8504 may perform the conversion of either or both of the video or audio data according to instructions given from the control unit. In addition, the sizes of video data and audio data to be obtained by encoding may be specified by a user or determined in advance for the types of recording mediums.

With the above arrangement, the reception device 8500 is enabled to record video and audio data after converting the data to a size recordable on the recording medium or to a size or bit rate that matches the read or write rate of the recording unit 8508. This arrangement enables the recoding unit to duly record a program, even if the size recordable on the recording medium is smaller than the data size of the multiplexed data obtained as a result of demodulation and error correction decoding by the demodulation unit 8502, or if the rate at which the recording unit records or reads is lower than the bit rate of the multiplexed data. Consequently, time-shift viewing of the recorded program by the user is possible anytime after the broadcast.

Furthermore, the reception device 8500 additionally includes a stream output interface (IF) 8509 for transmitting multiplexed data demodulated by the demodulation unit 8502 to an external device via a transport medium 8530. In one example, the stream output IF 8509 may be a wireless communication device that transmits multiplexed data via a wireless medium (equivalent to the transport medium 8530) to an external device by modulating the multiplexed data in accordance with a wireless communication scheme compliant with a wireless communication standard such as Wi-Fi (registered trademark, a set of standards including IEEE 802.11a, IEEE 802.11b, IEEE 802.11g, and IEEE 802.11n), WiGiG, Wireless HD, Bluetooth, ZigBee, or the like. The stream output IF 8509 may also be a wired communication device that transmits multiplexed data via a transmission line (equivalent to the transport medium 8530) physically connected to the stream output IF 8509 to an external device, modulating the multiplexed data using a communication scheme compliant with wired communication standards, such as Ethernet (registered trademark), Universal Serial Bus (USB), Power Line Communication (PLC), or High-Definition Multimedia Interface (HDMI).

With the above structure, the user can use, on an external device, multiplexed data received by the reception device 8500 using the reception scheme described according to the above embodiments. The usage of multiplexed data by the user mentioned herein includes use of the multiplexed data for real-time viewing on an external device, recording of the multiplexed data by a recording unit included in an external device, and transmission of the multiplexed data from an external device to a yet another external device.

In the above description of the reception device 8500, the stream output IF 8509 outputs multiplexed data obtained as a result of demodulation and error correction decoding by the demodulation unit 8502. However, the reception device 8500 may output data extracted from data contained in the multiplexed data, rather than the whole data contained in the multiplexed data. For example, the multiplexed data obtained as a result of demodulation and error correction decoding by the demodulation unit 8502 may contain contents of data broadcast service, in addition to video data and audio data. In this case, the stream output IF 8509 may output multiplexed data newly generated by multiplexing video and audio data extracted from the multiplexed data obtained as a result of demodulation and error correction decoding by the demodulation unit 8502. In another example, the stream output IF 8509 may output multiplexed data newly generated by multiplexing either of the video data and audio data contained in the multiplexed data obtained as a result of demodulation and error correction decoding by the demodulation unit 8502.

Note that it may be the stream input/output unit 8503 that handles extraction of data from the whole data contained in multiplexed data obtained as a result of demodulation and error correction decoding by the demodulation unit 8502 and multiplexing of the extracted data. More specifically, under instructions given from a control unit not illustrated in the figures, such as a Central Processing Unit (CPU), the stream input/output unit 8503 demultiplexes video data, audio data, contents of data broadcast service etc. from the multiplexed data demodulated by the demodulation unit 8502, extracts specific pieces of data from the demultiplexed data, and multiplexes the extracted data pieces to generate new multiplexed data. The data pieces to be extracted from demultiplexed data may be determined by the user or determined in advance for the respective types of the stream output IF 8509.

With the above structure, the reception device 8500 is enabled to extract and output only data necessary for an external device, which is effective to reduce the communication bandwidth used to output the multiplexed data.

In the above description, the stream output IF 8509 outputs multiplexed data obtained as a result of demodulation and error correction decoding by the demodulation unit 8502. Alternatively, however, the stream output IF 8509 may output new multiplexed data generated by multiplexing video data newly yielded by encoding the original video data contained in the multiplexed data obtained as a result of demodulation and error correction decoding by the demodulation unit 8502. The new video data is encoded with a moving picture coding method different from that used to encode the original video data, so that the data size or bit rate of the new video data is smaller than the original video data. Here, the moving picture coding method used to generate new video data may be of a different standard from that used to generate the original video data. Alternatively, the same moving picture coding method may be used but with different parameters. Similarly, the stream output IF 8509 may output new multiplexed data generated by multiplexing audio data newly obtained by encoding the original audio data contained in the multiplexed data obtained as a result of demodulation and error correction decoding by the demodulation unit 8502. The new audio data is encoded with an audio coding method different from that used to encode the original audio data, such that the data size or bit rate of the new audio data is smaller than the original audio data.

The process of converting the original video or audio data contained in the multiplexed data obtained as a result of demodulation and error correction decoding by the demodulation unit 8502 into the video or audio data of a different data size of bit rate is performed, for example, by the stream input/output unit 8503 and the signal processing unit 8504. More specifically, under instructions given from the control unit, the stream input/output unit 8503 demultiplexes video data, audio data, contents of data broadcast service etc. from the multiplexed data obtained as a result of demodulation and error correction decoding by the demodulation unit 8502. Under instructions given from the control unit, the signal processing unit 8504 converts the demultiplexed video data and audio data respectively using a moving picture coding method and an audio coding method each different from the method that was used in the conversion applied to obtain the video and audio data. Under instructions given from the control unit, the stream input/output unit 8503 multiplexes the newly converted video data and audio data to generate new multiplexed data. Note that the signal processing unit 8504 may perform the conversion of either or both of the video or audio data according to instructions given from the control unit. In addition, the sizes of video data and audio data to be obtained by conversion may be specified by the user or determined in advance for the types of the stream output IF 8509.

With the above structure, the reception device 8500 is enabled to output video and audio data after converting the data to a bit rate that matches the transfer rate between the reception device 8500 and an external device. This arrangement ensures that even if multiplexed data obtained as a result of demodulation and error correction decoding by the demodulation unit 8502 is higher in bit rate than the data transfer rate to an external device, the stream output IF duly outputs new multiplexed data at an appropriate bit rate to the external device. Consequently, the user can use the new multiplexed data on another communication device.

Furthermore, the reception device 8500 also includes an audio and visual output interface (hereinafter, AV output IF) 8511 that outputs video and audio signals decoded by the signal processing unit 8504 to an external device via an external transport medium. In one example, the AV output IF 8511 may be a wireless communication device that transmits modulated video and audio signals via a wireless medium to an external device, using a wireless communication scheme compliant with wireless communication standards, such as Wi-Fi (registered trademark), which is a set of standards including IEEE 802.11a, IEEE 802.11b, IEEE 802.11g, and IEEE 802.11n, WiGiG, Wireless HD, Bluetooth, ZigBee, or the like. In another example, the stream output IF 8509 may be a wired communication device that transmits modulated video and audio signals via a transmission line physically connected to the stream output IF 8509 to an external device, using a communication scheme compliant with wired communication standards, such as Ethernet (registered trademark), USB, PLC, HDMI, or the like. In yet another example, the stream output IF 8509 may be a terminal for connecting a cable to output the video and audio signals in analog form.

With the above structure, the user is allowed to use, on an external device, the video and audio signals decoded by the signal processing unit 8504.

Furthermore, the reception device 8500 additionally includes an operation input unit 8510 for receiving a user operation. According to control signals indicative of user operations input to the operation input unit 8510, the reception device 8500 performs various operations, such as switching the power ON or OFF, switching the reception channel, switching the display of subtitle text ON or OFF, switching the display of subtitle text to another language, changing the volume of audio output of the audio output unit 8506, and changing the settings of channels that can be received.

Additionally, the reception device 8500 may have a function of displaying the antenna level indicating the quality of the signal being received by the reception device 8500. Note that the antenna level is an indicator of the reception quality calculated based on, for example, the Received Signal Strength Indication, Received Signal Strength Indicator (RSSI), received field strength, Carrier-to-noise power ratio (C/N), Bit Error Rate (BER), packet error rate, frame error rate, and channel state information of the signal received on the reception device 8500. In other words, the antenna level is a signal indicating the level and quality of the received signal. In this case, the demodulation unit 8502 also includes a reception quality measuring unit for measuring the received signal characteristics, such as RSSI, received field strength, C/N, BER, packet error rate, frame error rate, and channel state information. In response to a user operation, the reception device 8500 displays the antenna level (i.e., signal indicating the level and quality of the received signal) on the video display unit 8507 in a manner identifiable by the user. The antenna level (i.e., signal indicating the level and quality of the received signal) may be numerically displayed using a number that represents RSSI, received field strength, C/N, BER, packet error rate, frame error rate, channel state information or the like. Alternatively, the antenna level may be displayed using an image representing RSSI, received field strength, C/N, BER, packet error rate, frame error rate, channel state information or the like. Furthermore, the reception device 8500 may display a plurality of antenna levels (signals indicating the level and quality of the received signal) calculated for each of the plurality of streams s1, s2, . . . received and separated using the reception schemes shown in the above embodiments, or one antenna level (signal indicating the level and quality of the received signal) calculated from the plurality of streams s1, s2, . . . . When video data and audio data composing a program are transmitted hierarchically, the reception device 8500 may also display the signal level (signal indicating the level and quality of the received signal) for each hierarchical level.

With the above structure, users are able to grasp the antenna level (signal indicating the level and quality of the received signal) numerically or visually during reception with the reception schemes shown in the above embodiments.

Although the reception device 8500 is described above as having the audio output unit 8506, video display unit 8507, recording unit 8508, stream output IF 8509, and AV output IF 8511, it is not necessary for the reception device 8500 to have all of these units. As long as the reception device 8500 is provided with at least one of the units described above, the user is enabled to use multiplexed data obtained as a result of demodulation and error correction decoding by the demodulation unit 8502. The reception device 8300 may therefore include any combination of the above-described units depending on its intended use.

(Multiplexed Data)

The following is a detailed description of an exemplary structure of multiplexed data. The data structure typically used in broadcasting is an MPEG2 transport stream (TS), so therefore the following description is given by way of an example related to MPEG2-TS. It should be naturally appreciated, however, that the data structure of multiplexed data transmitted by the transmission and reception schemes described in the above embodiments is not limited to MPEG2-TS and the advantageous effects of the above embodiments are achieved even if any other data structure is employed.

FIG. 86 is a view illustrating an exemplary multiplexed data structure. As illustrated in FIG. 86, multiplexed data is obtained by multiplexing one or more elementary streams, which are elements constituting a broadcast program (program or an event which is part of a program) currently provided through respective services. Examples of elementary streams include a video stream, audio stream, presentation graphics (PG) stream, and interactive graphics (IG) stream. In the case where α broadcast program carried by multiplexed data is a movie, the video streams represent main video and sub video of the movie, the audio streams represent main audio of the movie and sub audio to be mixed with the main audio, and the PG stream represents subtitles of the movie. The term "main video" used herein refers to video images normally presented on a screen, whereas "sub video" refers to video images (for example, images of text explaining the outline of the movie) to be presented in a small window inserted within the video images. The IG stream represents an interactive display constituted by presenting GUI components on a screen.

Each stream contained in multiplexed data is identified by an identifier called PID uniquely assigned to the stream. For example, the video stream carrying main video images of a movie is assigned with "0x1011", each audio stream is assigned with a different one of "0x1100" to "0x111F", each PG stream is assigned with a different one of "0x1200" to "0x121F", each IG stream is assigned with a different one of "0x1400" to "0x141F", each video stream carrying sub video images of the movie is assigned with a different one of "0x1B00" to "0x1B1F", each audio stream of sub-audio to be mixed with the main audio is assigned with a different one of "0x1A00" to "0x1A1F".

Figure 87:
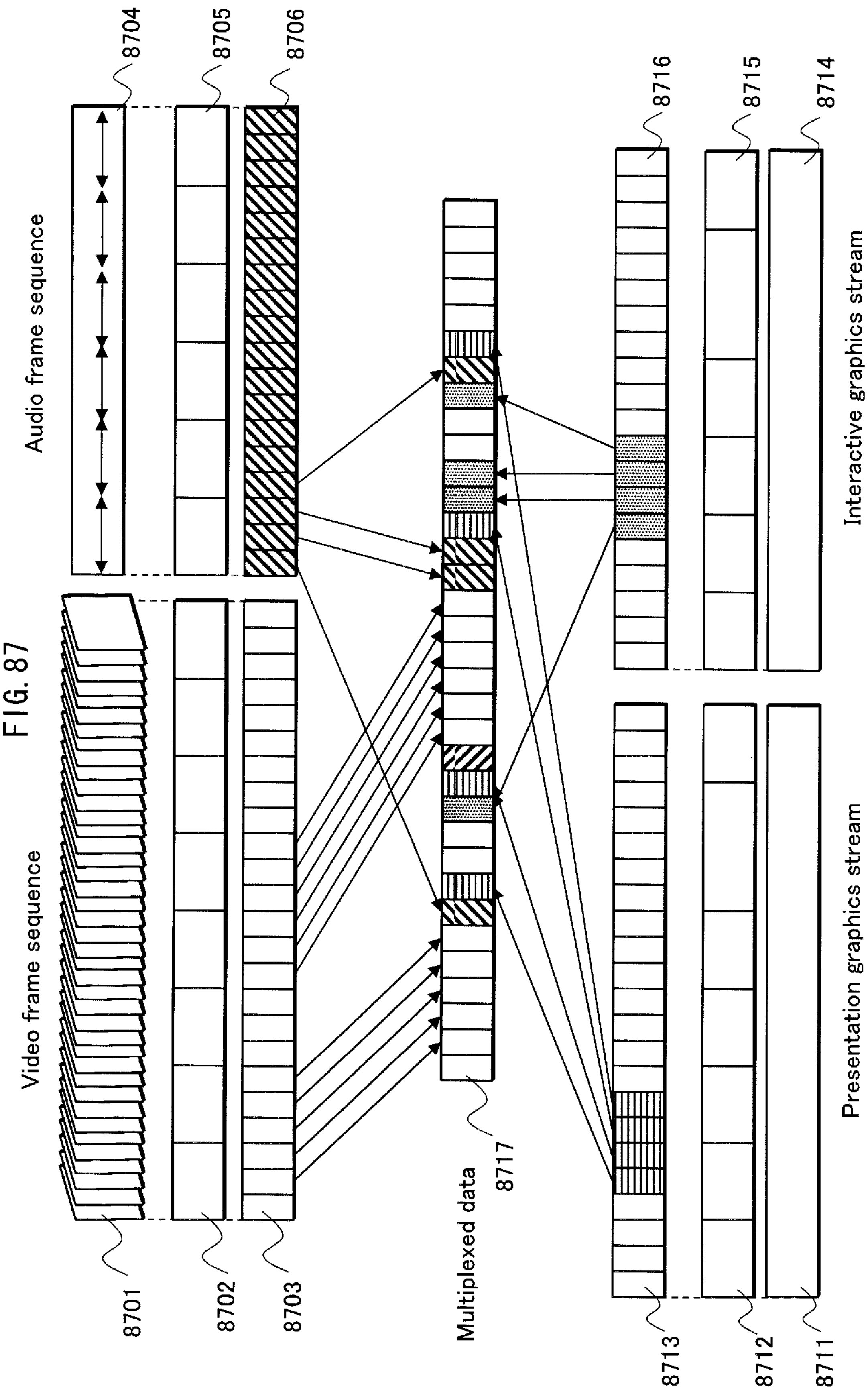
FIG. 87 schematically shows how each stream is multiplexed in the multiplexed data.

FIG. 87 is a schematic view illustrating an example of how the respective streams are multiplexed into multiplexed data. First, a video stream 8701 composed of a plurality of video frames is converted into a PES packet sequence 8702 and then into a TS packet sequence 8703, whereas an audio stream 8704 composed of a plurality of audio frames is converted into a PES packet sequence 8705 and then into a TS packet sequence 8706. Similarly, the PG stream 8711 is first converted into a PES packet sequence 8712 and then into a TS packet sequence 8713, whereas the IG stream 8714 is converted into a PES packet sequence 8715 and then into a TS packet sequence 8716. The multiplexed data 8717 is obtained by multiplexing the TS packet sequences (8703, 8706, 8713 and 8716) into one stream.

Figure 88:
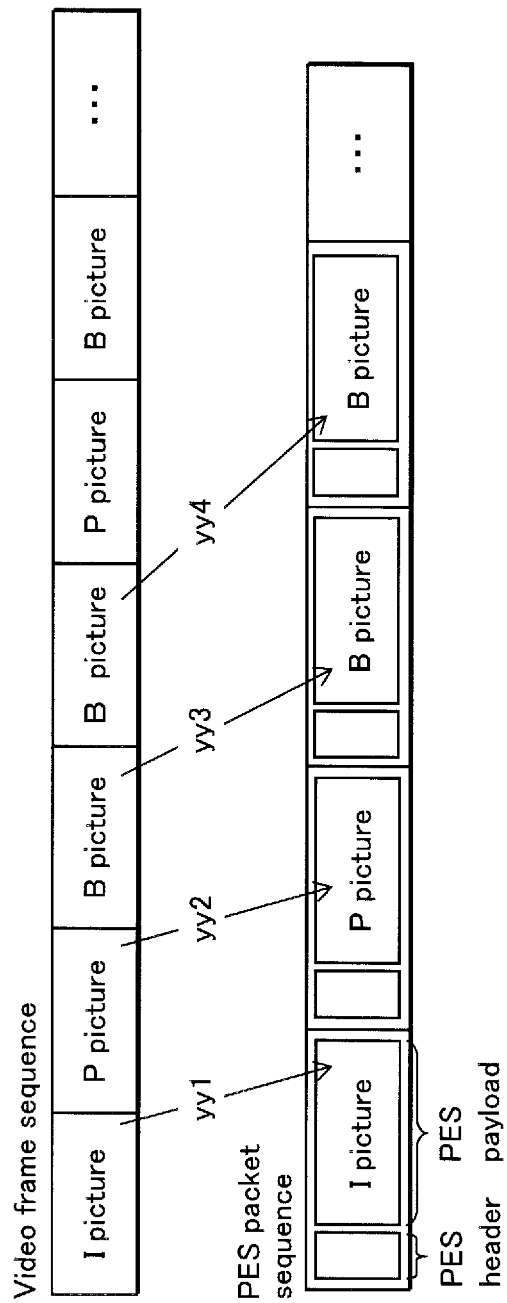
FIG. 88 shows in more detail how a video stream is stored in a sequence of PES packets.

FIG. 88 illustrates the details of how a video stream is divided into a sequence of PES packets. In FIG. 88, the first tier shows a sequence of video frames included in a video stream. The second tier shows a sequence of PES packets. As indicated by arrows yy1, yy2, yy3, and yy4 shown in FIG. 88, a plurality of video presentation units, namely I pictures, B pictures, and P pictures, of a video stream are separately stored into the payloads of PES packets on a picture-by-picture basis. Each PES packet has a PES header and the PES header stores a Presentation Time-Stamp (PTS) and Decoding Time-Stamp (DTS) indicating the display time and decoding time of a corresponding picture.

Figure 89:
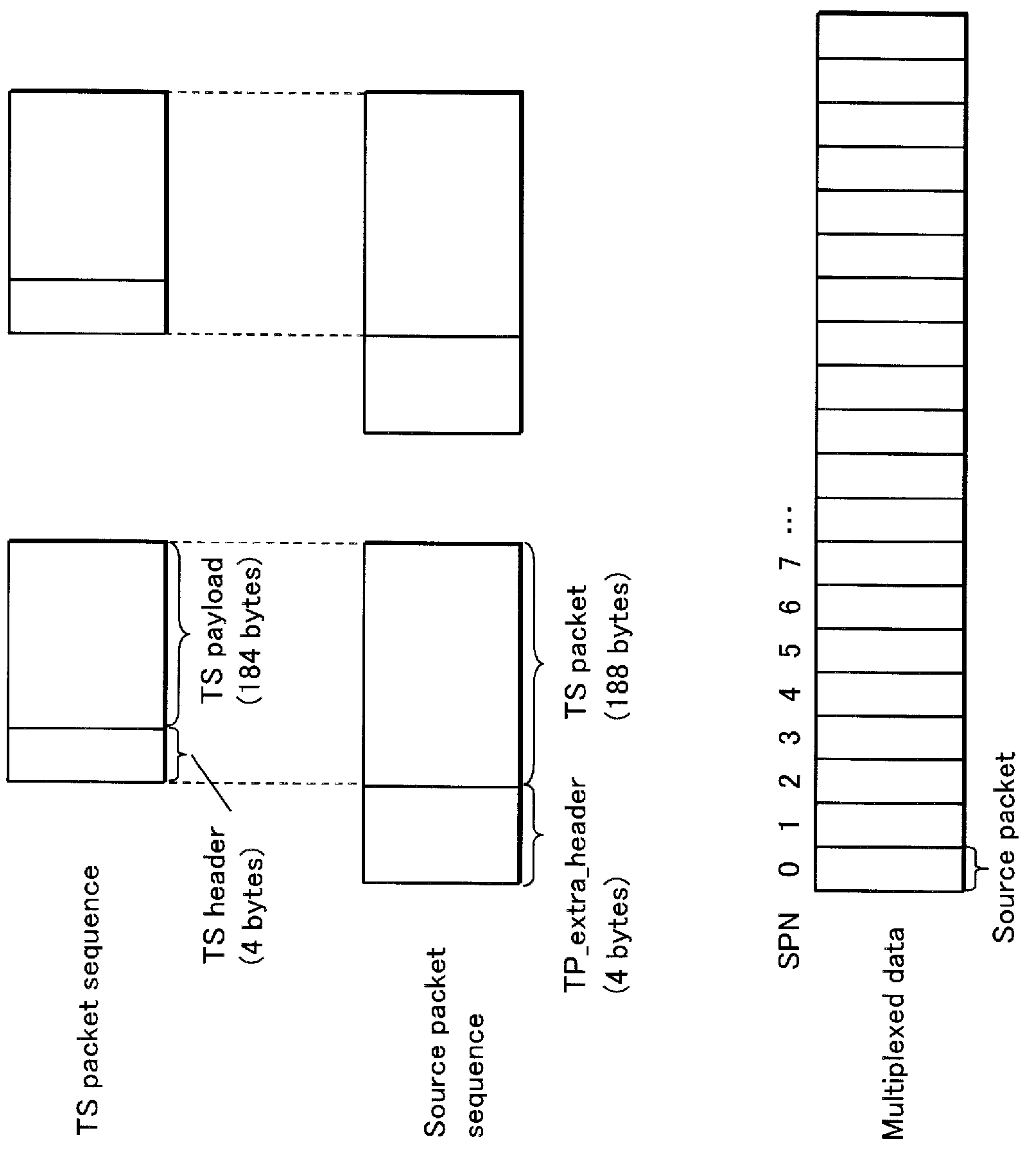
FIG. 89 shows the structure of a TS packet and a source packet in multiplexed data.

FIG. 89 illustrates the format of a TS packet to be eventually written as multiplexed data. The TS packet is a fixed length packet of 188 bytes and has a 4-byte TS header containing such information as PID identifying the stream and a 184-byte TS payload carrying actual data. The PES packets described above are divided to be stored into the TS payloads of TS packets. In the case of BD-ROM, each TS packet is attached with a TP_Extra_Header of 4 bytes to build a 192-byte source packet, which is to be written as multiplexed data. The TP_Extra_Header contains such information as an Arrival_Time_Stamp (ATS). The ATS indicates a time for starring transfer of the TS packet to the PID filter of a decoder. As shown on the lowest tier in FIG. 89, multiplexed data includes a sequence of source packets each bearing a source packet number (SPN), which is a number incrementing sequentially from the start of the multiplexed data.

In addition to the TS packets storing streams such as video, audio, and PG streams, multiplexed data also includes TS packets storing a Program Association Table (PAT), a Program Map Table (PMT), and a Program Clock Reference (PCR). The PAT in multiplexed data indicates the PID of a PMT used in the multiplexed data, and the PID of the PAT is "0". The PMT includes PIDs identifying the respective streams, such as video, audio and subtitles, contained in multiplexed data and attribute information (frame rate, aspect ratio, and the like) of the streams identified by the respective PIDs. In addition, the PMT includes various types of descriptors relating to the multiplexed data. One of such descriptors may be copy control information indicating whether or not copying of the multiplexed data is permitted. The PCR includes information for synchronizing the Arrival Time Clock (ATC), which is the time axis of ATS, with the System Time Clock (STC), which is the time axis of PTS and DTS. More specifically, the PCR packet includes information indicating an STC time corresponding to the ATS at which the PCR packet is to be transferred.

Figure 90:
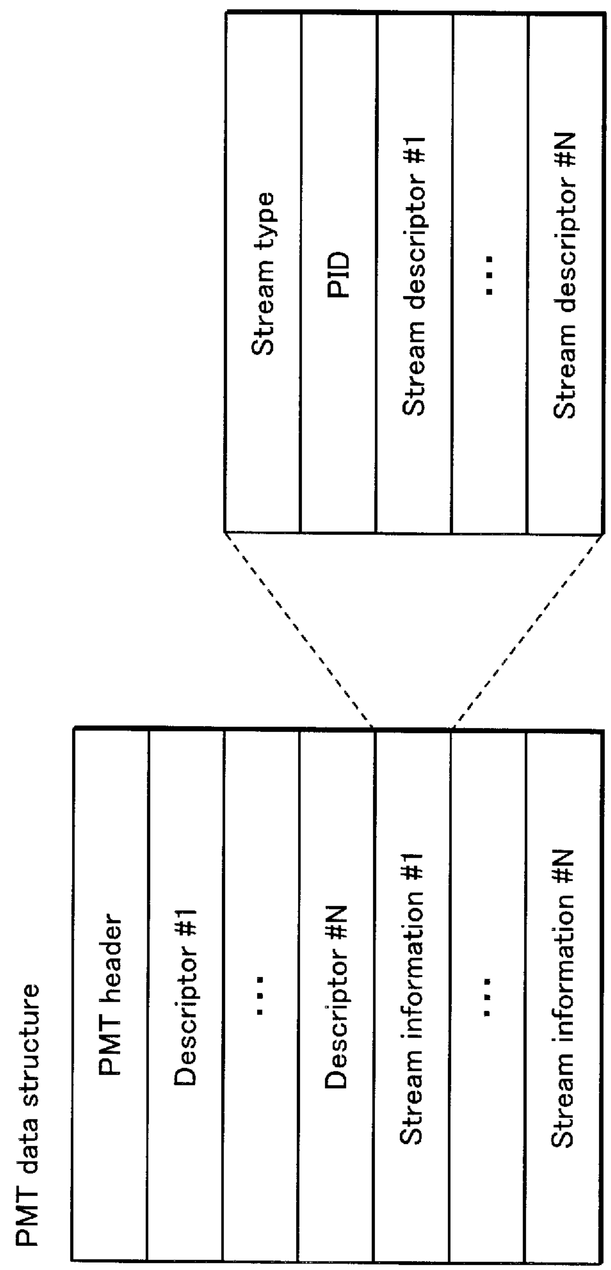
FIG. 90 shows the data structure of a PMT.

FIG. 90 is a view illustrating the data structure of the PMT in detail. The PMT starts with a PMT header indicating, for example, the length of data contained in the PMT. Following the PMT header, descriptors relating to the multiplexed data are disposed. One example of a descriptor included in the PMT is copy control information described above. Following the descriptors, pieces of stream information relating to the respective streams included in the multiplexed data are arranged. Each piece of stream information is composed of stream descriptors indicating a stream type identifying a compression codec employed for a corresponding stream, a PID of the stream, and attribute information (frame rate, aspect ratio, and the like) of the stream. The PMT includes as many stream descriptors as the number of streams included in the multiplexed data.

When recorded onto a recoding medium, for example, the multiplexed data is recorded along with a multiplexed data information file.

Figure 91:
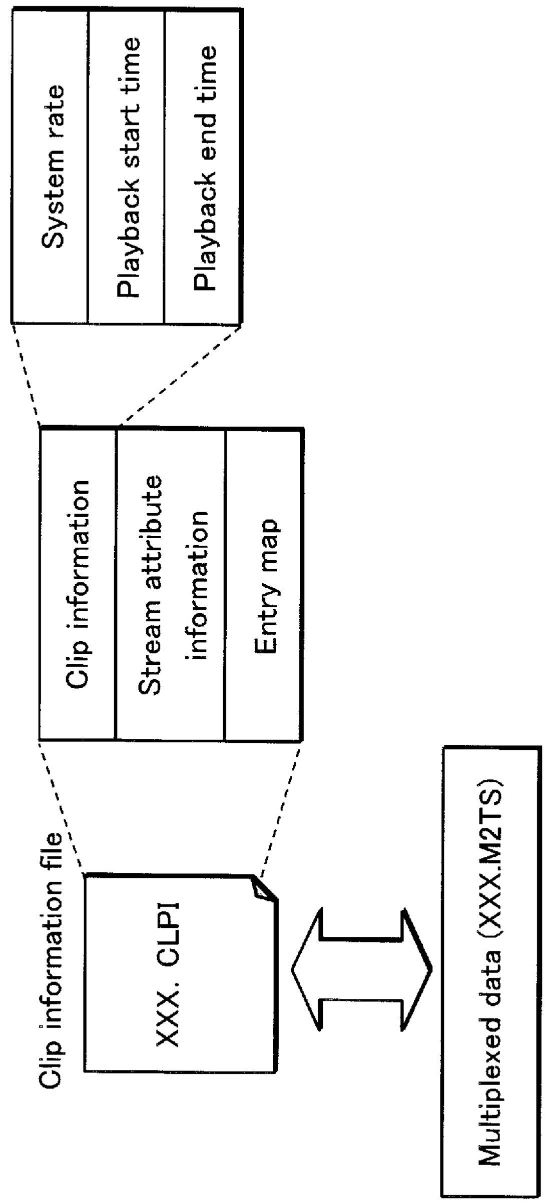
FIG. 91 shows the internal structure of multiplexed data information.

FIG. 91 is a view illustrating the structure of the multiplexed data file information. As illustrated in FIG. 91, the multiplexed data information file is management information of corresponding multiplexed data and is composed of multiplexed data information, stream attribute information, and an entry map. Note that multiplexed data information files and multiplexed data are in a one-to-one relationship.

As illustrated in FIG. 91, the multiplexed data information is composed of a system rate, playback start time, and playback end time. The system rate indicates the maximum transfer rate of the multiplexed data to the PID filter of a system target decoder, which is described later. The multiplexed data includes ATSs at intervals set so as not to exceed the system rate. The playback start time is set to the time specified by the PTS of the first video frame in the multiplexed data, whereas the playback end time is set to the time calculated by adding the playback period of one frame to the PTS of the last video frame in the multiplexed data.

Figure 92:
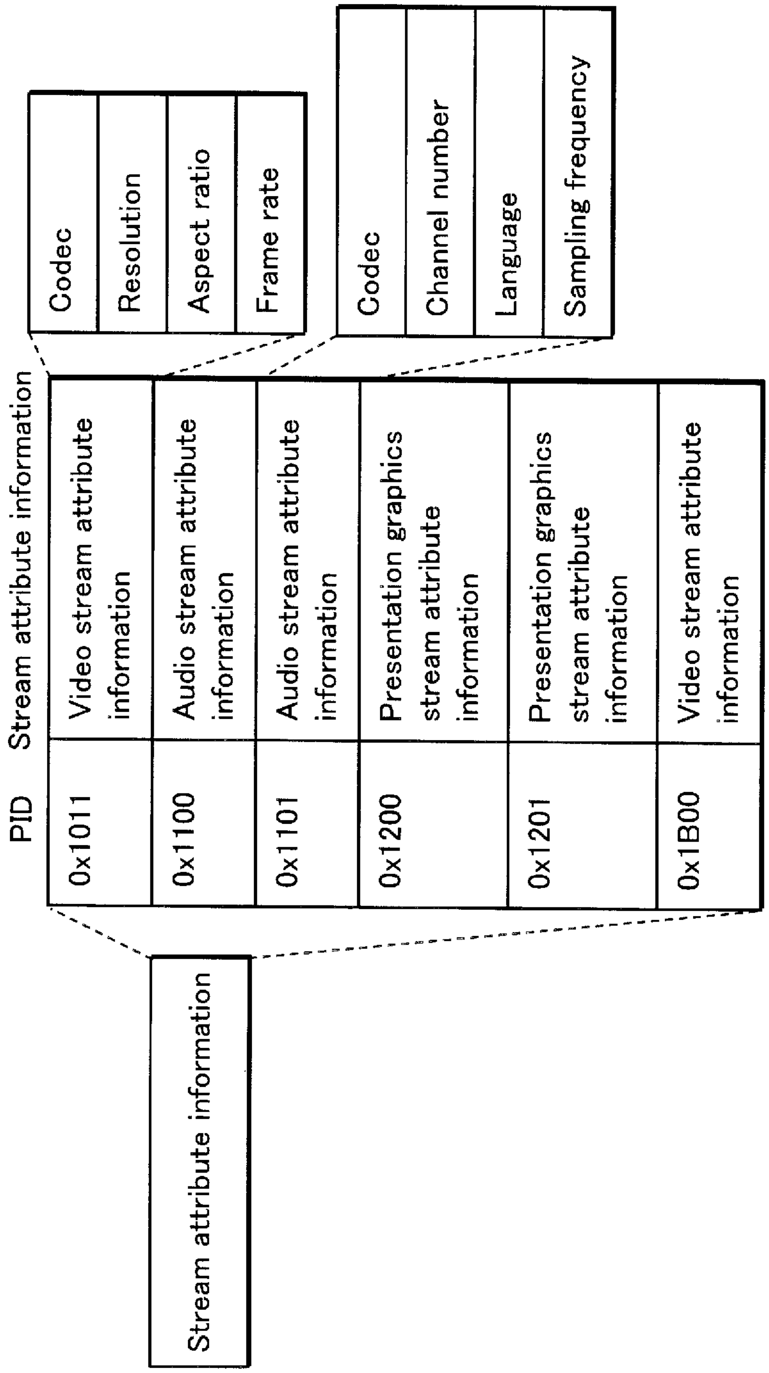
FIG. 92 shows the internal structure of stream attribute information.

FIG. 92 illustrates the structure of stream attribute information contained in multiplexed data file information. As illustrated in FIG. 92, the stream attribute information includes pieces of attribute information of the respective streams included in multiplexed data, and each piece of attribute information is registered with a corresponding PID. That is, different pieces of attribute information are provided for different streams, namely a video stream, an audio stream, a PG stream and an IG stream. The video stream attribute information indicates the compression codec employed to compress the video stream, the resolutions of individual pictures constituting the video stream, the aspect ratio, the frame rate, and so on. The audio stream attribute information indicates the compression codec employed to compress the audio stream, the number of channels included in the audio stream, the language of the audio stream, the sampling frequency, and so on. These pieces of information are used to initialize a decoder before playback by a player.

In the present embodiment, from among the pieces of information included in the multiplexed data, the stream type included in the PMT is used. In the case where the multiplexed data is recorded on a recording medium, the video stream attribute information included in the multiplexed data information is used. More specifically, the moving picture coding method and device described in any of the above embodiments may be modified to additionally include a step or unit of setting a specific piece of information in the stream type included in the PMT or in the video stream attribute information. The specific piece of information is for indicating that the video data is generated by the moving picture coding method and device described in the embodiment. With the above structure, video data generated by the moving picture coding method and device described in any of the above embodiments is distinguishable from video data compliant with other standards.

Figure 93:
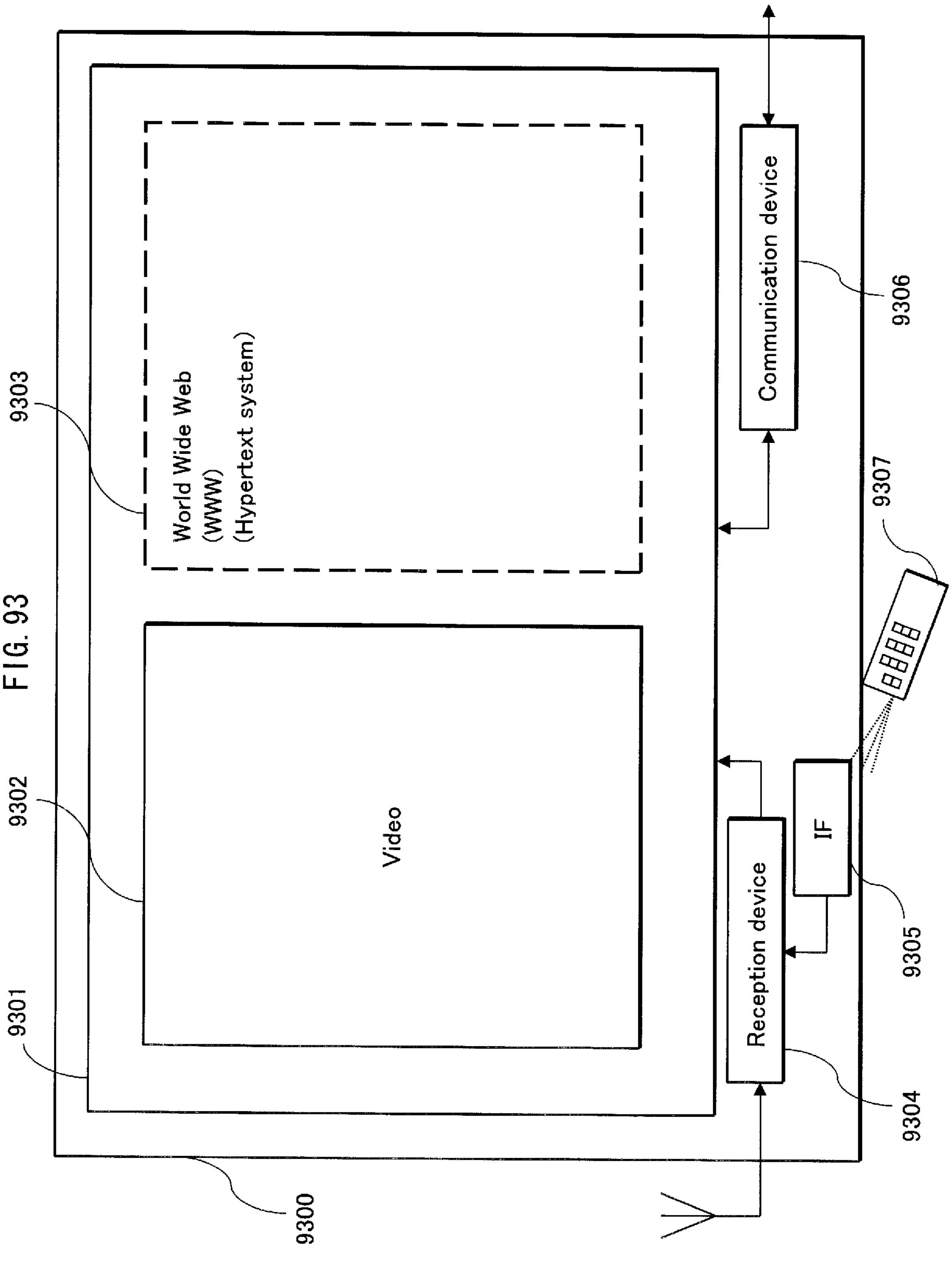
FIG. 93 is a structural diagram of a video display and an audio output device.

FIG. 93 illustrates an exemplary structure of a video and audio output device 9300 that includes a reception device 9304 for receiving a modulated signal carrying video and audio data or data for data broadcasting from a broadcasting station (base station). Note that the structure of the reception device 9304 corresponds to the reception device 8500 illustrated in FIG. 85. The video and audio output device 9300 is installed with an Operating System (OS), for example, and also with a communication device 9306 (a communication device for a wireless Local Area Network (LAN) or Ethernet, for example) for establishing an Internet connection. With this structure, hypertext (World Wide Web (WWW)) 9303 provided over the Internet can be displayed on a display area 9301 simultaneously with images 9302 reproduced on the display area 9301 from the video and audio data or data provided by data broadcasting. By operating a remote control (which may be a mobile phone or keyboard) 9307, the user can make a selection on the images 9302 reproduced from data provided by data broadcasting or the hypertext 9303 provided over the Internet to change the operation of the video and audio output device 9300. For example, by operating the remote control to make a selection on the hypertext 9303 provided over the Internet, the user can change the WWW site currently displayed to another site. Alternatively, by operating the remote control 9307 to make a selection on the images 9302 reproduced from the video or audio data or data provided by the data broadcasting, the user can transmit information indicating a selected channel (such as a selected broadcast program or audio broadcasting). In response, an interface (IF) 9305 acquires information transmitted from the remote control, so that the reception device 9304 operates to obtain reception data by demodulation and error correction decoding of a signal carried on the selected channel. At this time, the reception device 9304 receives control symbols included in a signal corresponding to the selected channel and containing information indicating the transmission scheme of the signal (exactly as described in Embodiments A1 through A4 and as shown in FIGS. 5 and 41). With this information, the reception device 9304 is enabled to make appropriate settings for the receiving operations, demodulation scheme, scheme of error correction decoding, and the like to duly receive data included in data symbols transmitted from a broadcasting station (base station). Although the above description is directed to an example in which the user selects a channel using the remote control 9307, the same description applies to an example in which the user selects a channel using a selection key provided on the video and audio output device 9300.

In addition, the video and audio output device 9300 may be operated via the Internet. For example, a terminal connected to the Internet may be used to make settings on the video and audio output device 9300 for pre-programmed recording (storing). (The video and audio output device 9300 therefore would have the recording unit 8508 as illustrated in FIG. 85.) In this case, before starting the pre-programmed recording, the video and audio output device 9300 selects the channel, so that the reception device 9304 operates to obtain reception data by demodulation and error correction decoding of a signal carried on the selected channel. At this time, the reception device 9304 receives control symbols included in a signal corresponding to the selected channel and containing information indicating the transmission scheme (the transmission scheme, modulation scheme, error correction scheme, and the like in the above embodiments) of the signal (exactly as described in Embodiments A1 through A4 and as shown in FIGS. 5 and 41). With this information, the reception device 9304 is enabled to make appropriate settings for the receiving operations, demodulation scheme, scheme of error correction decoding, and the like to duly receive data included in data symbols transmitted from a broadcasting station (base station).

Embodiment C1

Embodiment 2 describes a precoding scheme of regularly hopping between precoding matrices, and (Example #1) and (Example #2) as schemes of setting precoding matrices in consideration of poor reception points. The present embodiment is directed to generalization of (Example #1) and (Example #2) described in Embodiment 2.

With respect to a scheme of regularly hopping between precoding matrices with an N-slot period (cycle), a precoding matrix prepared for an N-slot period (cycle) is represented as follows.

Math 566

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \quad \text{Equation \#1}$$

In this case, i=0, 1, 2, . . . , N−2, N−1. (Let a>0.) In the present embodiment, a unitary matrix is used and the precoding matrix in Equation #1 is represented as follows.

Math 567

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \quad \text{Equation \#2}$$

In this case, i=0, 1, 2, . . . , N−2, N−1. (Let a>0.) (In order to simplify the mapping performed by the transmission device and the reception device, it is preferable that λ be one of the following fixed values: 0 radians; π/2 radians; π radians; and (3π)/2 radians.) Embodiment 2 is specifically implemented under the assumption α=1. In Embodiment 2, Equation #2 is represented as follows.

Math 568

$$F[i] = \frac{1}{\sqrt{2}}\begin{pmatrix} e^{j\theta_{11}(i)} & e^{j(\theta_{11}(i)+\lambda)} \\ e^{j\theta_{21}(i)} & e^{j(\theta_{21}(i)+\lambda+\pi)} \end{pmatrix} \quad \text{Equation \#3}$$

In order to distribute the poor reception points evenly with regards to phase in the complex plane, as described in Embodiment 2, Condition #101 or #102 is provided in Equation #1 or #2.

Math 569

$$\frac{e^{j(\theta_{11}(x+1)-\theta_{21}(x+1))}}{e^{j(\theta_{11}(x)-\theta_{21}(x))}} = e^{j\left(\frac{\pi}{N}\right)} \text{ for } \forall x (x = 0, 1, 2, \ldots, N-2) \quad \text{Condition \#101}$$

Math 570

$$\frac{e^{j(\theta_{11}(x+1)-\theta_{21}(x+1))}}{e^{j(\theta_{11}(x)-\theta_{21}(x))}} = e^{j\left(-\frac{\pi}{N}\right)} \text{ for } \forall x (x = 0, 1, 2, \ldots, N-2) \quad \text{Condition \#102}$$

Especially, when $\theta_{11}(i)$ is a fixed value independent of i, Condition #103 or #104 may be provided.

Math 571

$$\frac{e^{j\theta_{21}(x+1)}}{e^{j\theta_{21}(x)}} = e^{j\left(\frac{\pi}{N}\right)} \text{ for } \forall x (x = 0, 1, 2, \ldots, N-2) \quad \text{Condition \#103}$$

Math 572

$$\frac{e^{j\theta_{21}(x+1)}}{e^{j\theta_{21}(x)}} = e^{j\left(-\frac{\pi}{N}\right)} \text{ for } \forall x (x = 0, 1, 2, \ldots, N-2) \quad \text{Condition \#104}$$

Similarly, when $\theta_{21}(i)$ is a fixed value independent of i, Condition #105 or #106 may be provided.

Math 573

$$\frac{e^{j\theta_{11}(x+1)}}{e^{j\theta_{11}(x)}} = e^{j\left(\frac{\pi}{N}\right)} \text{ for } \forall x (x = 0, 1, 2, \ldots, N-2) \quad \text{Condition \#105}$$

Math 574

$$\frac{e^{j\theta_{11}(x+1)}}{e^{j\theta_{11}(x)}} = e^{j\left(-\frac{\pi}{N}\right)} \text{ for } \forall x (x = 0, 1, 2, \ldots, N-2) \quad \text{Condition \#106}$$

The following is an example of a precoding matrix using the above-mentioned unitary matrix for the scheme of regularly hopping between precoding matrices with an N-slot period (cycle). A precoding matrix that is based on Equation #2 and prepared for an N-slot period (cycle) is represented as follows. (In Equation #2, λ is 0 radians, and $\theta_{11}(i)$ is 0 radians.)

Math 575

$$F[i] = \frac{1}{\sqrt{\alpha^2+1}}\begin{pmatrix} e^{j0} & \alpha \times e^{j0} \\ \alpha \times e^{j\theta_{21}(i)} & e^{j(\theta_{21}(i)+\pi)} \end{pmatrix} \quad \text{Equation \#10}$$

In this case, i=0, 1, 2, . . . , N−2, N−1. (Let $\alpha>0$.) Also, Condition #103 or #104 is satisfied. In addition, $\theta_{21}(i=0)$ may be set to a certain value, such as 0 radians.

With respect to a scheme of regularly hopping between precoding matrices with an N-slot period (cycle), another example of a precoding matrix prepared for an N-slot period (cycle) is represented as follows. (In Equation #2, $\lambda$ is 0 radians, and $\theta_{11}(i)$ is 0 radians.)

Math 576

$$F[i] = \frac{1}{\sqrt{\alpha^2+1}}\begin{pmatrix} e^{j0} & \alpha\times e^{j\pi} \\ \alpha\times e^{j\theta_{21}(i)} & e^{j\theta_{21}(i)} \end{pmatrix} \quad \text{Equation \#9}$$

In this case, i=0, 1, 2, . . . , N−2, N−1. (Let $\alpha>0$.) Also, Condition #103 or #104 is satisfied. In addition, $\theta_{21}(i=0)$ may be set to a certain value, such as 0 radians.

As yet another example, a precoding matrix prepared for an N-slot period (cycle) is represented as follows. (In Equation #2, $\lambda$ is 0 radians, and $\theta_{21}(i)$ is 0 radians.)

Math 577

$$F[i] = \frac{1}{\sqrt{\alpha^2+1}}\begin{pmatrix} e^{j\theta_{11}(i)} & \alpha\times e^{j(\theta_{11}(i))} \\ \alpha\times e^{j0} & e^{j\pi} \end{pmatrix} \quad \text{Equation \#12}$$

In this case, i=0, 1, 2, . . . , N−2, N−1. (Let $\alpha>0$.) Also, Condition #105 or #106 is satisfied. In addition, $\theta_{11}(i=0)$ may be set to a certain value, such as 0 radians.

As yet another example, a precoding matrix prepared for an N-slot period (cycle) is represented as follows.
(In Equation #2, $\lambda$ is $\pi$ radians, and $\theta_{21}(i)$ is 0 radians.)

Math 578

$$F[i] = \frac{1}{\sqrt{\alpha^2+1}}\begin{pmatrix} e^{j\theta_{11}(i)} & \alpha\times e^{j(\theta_{11}(i)+\pi)} \\ \alpha\times e^{j0} & e^{j0} \end{pmatrix} \quad \text{Equation \#13}$$

In this case, i=0, 1, 2, . . . , N−2, N−1 (let $\alpha>0$), and Condition #105 or #106 is satisfied. In addition, $\theta_{11}(i=0)$ may be set to a certain value, such as 0 radians.

In view of the examples of Embodiment 2, yet another example of a precoding matrix prepared for an N-slot period (cycle) is represented as follows. (In Equation #3, $\lambda$ is 0 radians, and $\theta_{11}(i)$ is 0 radians.)

Math 579

$$F[i] = \frac{1}{\sqrt{2}}\begin{pmatrix} e^{j0} & e^{j0} \\ e^{j\theta_{21}(i)} & e^{j(\theta_{21}(i)+\pi)} \end{pmatrix} \quad \text{Equation \#14}$$

In this case, i=0, 1, 2, . . . , N−2, N−1, and Condition #103 or #104 is satisfied. In addition, $\theta_{21}(i=0)$ may be set to a certain value, such as 0 radians.

With respect to a scheme of regularly hopping between precoding matrices with an N-slot period (cycle), yet another example of a precoding matrix prepared for an N-slot period (cycle) is represented as follows. (In Equation #3, $\lambda$ is $\pi$ radians, and $\theta_{11}(i)$ is 0 radians.)

Math 580

$$F[i] = \frac{1}{\sqrt{2}}\begin{pmatrix} e^{j0} & e^{j\pi} \\ e^{j\theta_{21}(i)} & e^{j\theta_{21}(i)} \end{pmatrix} \quad \text{Equation \#15}$$

In this case, i=0, 1, 2, . . . , N−2, N−1, and Condition #103 or #104 is satisfied. In addition, $\theta_{21}(i=0)$ may be set to a certain value, such as 0 radians.

As yet another example, a precoding matrix prepared for an N-slot period (cycle) is represented as follows. (In Equation #3, $\lambda$ is 0 radians, and $\theta_{21}(i)$ is 0 radians.)

Math 581

$$F[i] = \frac{1}{\sqrt{2}}\begin{pmatrix} e^{j\theta_{11}(i)} & e^{j(\theta_{11}(i))} \\ e^{j0} & e^{j\pi} \end{pmatrix} \quad \text{Equation \#16}$$

In this case, i=0, 1, 2, . . . , N−2, N−1, and Condition #105 or #106 is satisfied. In addition, $\theta_{11}(i=0)$ may be set to a certain value, such as 0 radians.

As yet another example, a precoding matrix prepared for an N-slot period (cycle) is represented as follows. (In Equation #3, $\lambda$ is $\pi$ radians, and $\theta_{21}(i)$ is 0 radians.)

Math 582

$$F[i] = \frac{1}{\sqrt{\alpha^2+1}}\begin{pmatrix} e^{j\theta_{11}(i)} & \alpha\times e^{j(\theta_{11}(i)+\pi)} \\ \alpha\times e^{j0} & e^{j0} \end{pmatrix} \quad \text{Equation \#17}$$

In this case, i=0, 1, 2, . . . , N−2, N−1, and Condition #105 or #106 is satisfied. In addition, $\theta_{11}(i=0)$ may be set to a certain value, such as 0 radians.

As compared to the precoding scheme of regularly hopping between precoding matrices described in Embodiment 9, the precoding scheme pertaining to the present embodiment has a probability of achieving high data reception quality even if the length of the period (cycle) pertaining to the present embodiment is reduced to approximately half of the length of the period (cycle) pertaining to Embodiment 9. Therefore, the precoding scheme pertaining to the present embodiment can reduce the number of precoding matrices to be prepared, which brings about the advantageous effect of reducing the scale of circuits for the transmission device and the reception device. The above advantageous effect can be enhanced with a transmission device that is provided with one encoder and distributes encoded data as shown in FIG. 4, or with a reception device corresponding to such a transmission device.

A preferable example of a appearing in the above examples can be obtained by using any of the schemes described in Embodiment 18. However, a is not limited to being obtained in this way.

In the present embodiment, the scheme of structuring N different precoding matrices for a precoding hopping scheme with an N-slot time period (cycle) has been described. In this case, the N different precoding matrices, F[0], F[1], F[2], . . . , F[N−2], F[N−1] are prepared. In the case of a single-carrier transmission scheme, the order F[0], F[1], F[2], . . . , F[N−2], F[N−1] is maintained in the time domain (or the frequency domain). The present invention is not, however, limited in this way, and the N different precoding matrices F[0], F[1], F[2], . . . , F[N−2], F[N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with an N-slot period (cycle) has been described, but the same advantageous effects may be obtained by randomly using N different precoding matrices. In other words, the N different precoding matrices do not necessarily need to be used in a regular period (cycle).

Furthermore, in the precoding matrix hopping scheme over an H-slot period (cycle) (H being a natural number larger than the number of slots N in the period (cycle) of the above scheme of regularly hopping between precoding matrices), when the N different precoding matrices of the present embodiment are included, the probability of excellent reception quality increases.

Embodiment C2

The following describes a precoding scheme of regularly hopping between precoding matrices that is different from Embodiment C1 where Embodiment 9 is incorporated—i.e., a scheme of implementing Embodiment C1 in a case where the number of slots in a period (cycle) is an odd number in Embodiment 9.

With respect to a scheme of regularly hopping between precoding matrices with an N-slot period (cycle), a precoding matrix prepared for an N-slot period (cycle) is represented as follows.

Math 583

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\delta)} \end{pmatrix} \quad \text{Equation \#18}$$

In this case, i=0, 1, 2, . . . , N−2, N−1 (let a>0). In the present embodiment, a unitary matrix is used and the precoding matrix in Equation #1 is represented as follows.

Math 584

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix} \quad \text{Equation \#19}$$

In this case, i=0, 1, 2, . . . , N−2, N−1 (let a>0). (In order to simplify the mapping performed by the transmission device and the reception device, it is preferable that λ be one of the following fixed values: 0 radians; π/2 radians; π radians; and (3π)/2 radians.) Specifically, it is assumed here that α=1. Here, Equation #19 is represented as follows.

Math 585

$$F[i]=\frac{1}{\sqrt{2}}\begin{pmatrix} e^{j\theta_{11}(i)} & e^{j(\theta_{11}(i)+\lambda)} \\ e^{j\theta_{21}(i)} & e^{j(\theta_{21}(i)+\lambda+\pi)} \end{pmatrix} \quad \text{Equation \#20}$$

The precoding matrices used in the precoding scheme of regularly hopping between precoding matrices pertaining to the present embodiment are expressed in the above manner. The present embodiment is characterized in that the number of slots in an N-slot period (cycle) for the precoding scheme of regularly hopping between precoding matrices pertaining to the present embodiment is an odd number, i.e., expressed as N=2n+1. To realize an N-slot period (cycle) where N=2n+1, the number of different precoding matrices to be prepared is n+1 (note, the description of these different precoding matrices will be given later). From among the n+1 different precoding matrices, each of the n precoding matrices is used twice in one period (cycle), and the remaining one precoding matrix is used once in one period (cycle), which results in an N-slot period (cycle) where N=2n+1. The following is a detailed description of these precoding matrices.

Assume that the n+1 different precoding matrices, which are necessary to implement the precoding scheme of regularly hopping between precoding matrices with an N-slot period (cycle) where N=2n+1, are F[0], F[1], . . . , F[i], . . . , F[n−1], F[n] (i=0, 1, 2, . . . , n−2, n−1, n). Here, the n+1 different precoding matrices F[0], F[1], . . . , F[i], . . . , F[n−1], F[n] based on Equation #19 are represented as follows.

Math 586

$$F[i]=\frac{1}{\sqrt{\alpha^2+1}}\begin{pmatrix} e^{j\theta_{11}} & \alpha\times e^{j(\theta_{11}+\lambda)} \\ \alpha\times e^{j\left(\theta_{11}+\frac{2i\pi}{2n+1}\right)} & e^{j\left(\theta_{11}+\frac{2i\pi}{2n+1}+\lambda+\pi\right)} \end{pmatrix} \quad \text{Equation \#21}$$

In this case, i=0, 1, 2, . . . , n−2, n−1, n. Out of the n+1 different precoding matrices according to Equation #21 (namely, F[0], F[1], . . . , F[i], . . . , F[n−1], F[n]), F[0] is used once, and each of F[1] through F[n] is used twice (i.e., F[1] is used twice, F[2] is used twice, . . . , F[n−1] is used twice, and F[n] is used twice). As a result, the precoding scheme of regularly hopping between precoding matrices with an N-slot period (cycle) where N=2n+1 is achieved, and the reception device can achieve excellent data reception quality, similarly to the case where the number of slots in a period (cycle) for the precoding scheme of regularly hopping between precoding matrices is an odd number in Embodiment 9. In this case, high data reception quality may be achieved even if the length of the period (cycle) pertaining to the present embodiment is reduced to approximately half of the length of the period (cycle) pertaining to Embodiment 9. This can reduce the number of precoding matrices to be prepared, which brings about the advantageous effect of reducing the scale of circuits for the transmission device and the reception device. The above advantageous effect can be enhanced with a transmission device that is provided with one encoder and distributes encoded data as shown in FIG. 4, or with a reception device corresponding to such a transmission device.

Especially, when λ=0 radians and $\theta_{11}$=0 radians, the above equation can be expressed as follows.

Math 587

$$F[i]=\frac{1}{\sqrt{\alpha^2+1}}\begin{pmatrix} e^{j0} & \alpha\times e^{j0} \\ \alpha\times e^{j\left(\frac{2i\pi}{2n+1}\right)} & e^{j\left(\frac{2i\pi}{2n+1}+\pi\right)} \end{pmatrix} \quad \text{Equation \#22}$$

In this case, i=0, 1, 2, . . . , n−2, n−1, n. Out of the n+1 different precoding matrices according to Equation #22 (namely, F[0], F[1], . . . , F[i], . . . , F[n−1], F[n]), F[0] is used once, and each of F[1] through F[n] is used twice (i.e., F[1] is used twice, F[2] is used twice, . . . , F[n−1] is used twice, and F[n] is used twice). As a result, the precoding scheme of regularly hopping between precoding matrices with an N-slot period (cycle) where N=2n+1 is achieved, and the reception device can achieve excellent data reception quality, similarly to the case where the number of slots in a period (cycle) for the precoding scheme of regularly hopping between precoding matrices is an odd number in Embodiment 9. In this case, high data reception quality may be achieved even if the length of the period (cycle) pertaining to the present embodiment is reduced to approximately half of the length of the period (cycle) pertaining to Embodiment 9. This can reduce the number of precoding matrices to be prepared, which brings about the advantageous effect of reducing the scale of circuits for the transmission device and the reception device.

Especially, when $\lambda=\pi$ radians and $\theta_{11}=0$ radians, the following equation is true.

Math 588

$$F[i] = \frac{1}{\sqrt{\alpha^2+1}}\begin{pmatrix} e^{j0} & \alpha\times e^{j\pi} \\ \alpha\times e^{j\left(\frac{2i\pi}{2n+1}\right)} & e^{j\left(\frac{2i\pi}{2n+1}\right)} \end{pmatrix} \quad \text{Equation \#23}$$

In this case, i=0, 1, 2, . . . , n−2, n−1, n. Out of the n+1 different precoding matrices according to Equation #23 (namely, F[0], F[1], . . . , F[i], . . . , F[n−1], F[n]), F[0] is used once, and each of F[1] through F[n] is used twice (i.e., F[1] is used twice, F[2] is used twice, . . . , F[n−1] is used twice, and F[n] is used twice). As a result, the precoding scheme of regularly hopping between precoding matrices with an N-slot period (cycle) where N=2n+1 is achieved, and the reception device can achieve excellent data reception quality, similarly to the case where the number of slots in a period (cycle) for the precoding scheme of regularly hopping between precoding matrices is an odd number in Embodiment 9. In this case, high data reception quality may be achieved even if the length of the period (cycle) pertaining to the present embodiment is reduced to approximately half of the length of the period (cycle) pertaining to Embodiment 9. This can reduce the number of precoding matrices to be prepared, which brings about the advantageous effect of reducing the scale of circuits for the transmission device and the reception device.

Furthermore, when $\alpha=1$ as in the relationships shown in Equation #19 and Equation #20, Equation #21 can be expressed as follows.

Math 589

$$F[i] = \frac{1}{\sqrt{2}}\begin{pmatrix} e^{j\theta_{11}} & e^{j(\theta_{11}+\lambda)} \\ e^{j\left(\theta_{11}+\frac{2i\pi}{2n+1}\right)} & e^{j\left(\theta_{11}+\frac{2i\pi}{2n+1}+\lambda+\pi\right)} \end{pmatrix} \quad \text{Equation \#24}$$

In this case, i=0, 1, 2, . . . , n−2, n−1, n. Out of the n+1 different precoding matrices according to Equation #24 (namely, F[0], F[1], . . . , F[i], . . . , F[n−1], F[n]), F[0] is used once, and each of F[1] through F[n] is used twice (i.e., F[1] is used twice, F[2] is used twice, . . . , F[n−1] is used twice, and F[n] is used twice). As a result, the precoding scheme of regularly hopping between precoding matrices with an N-slot period (cycle) where N=2n+1 is achieved, and the reception device can achieve excellent data reception quality, similarly to the case where the number of slots in a period (cycle) for the precoding scheme of regularly hopping between precoding matrices is an odd number in Embodiment 9. In this case, high data reception quality may be achieved even if the length of the period (cycle) pertaining to the present embodiment is reduced to approximately half of the length of the period (cycle) pertaining to Embodiment 9. This can reduce the number of precoding matrices to be prepared, which brings about the advantageous effect of reducing the scale of circuits for the transmission device and the reception device.

Similarly, when $\alpha=1$ in Equation #22, the following equation is true.

Math 590

$$F[i] = \frac{1}{\sqrt{2}}\begin{pmatrix} e^{j0} & e^{j0} \\ e^{j\left(\frac{2i\pi}{2n+1}\right)} & e^{j\left(\frac{2i\pi}{2n+1}+\pi\right)} \end{pmatrix} \quad \text{Equation \#25}$$

In this case, i=0, 1, 2, . . . , n−2, n−1, n. Out of the n+1 different precoding matrices according to Equation #25 (namely, F[0], F[1], . . . , F[i], . . . , F[n−1], F[n]), F[0] is used once, and each of F[1] through F[n] is used twice (i.e., F[1] is used twice, F[2] is used twice, . . . , F[n−1] is used twice, and F[n] is used twice). As a result, the precoding scheme of regularly hopping between precoding matrices with an N-slot period (cycle) where N=2n+1 is achieved, and the reception device can achieve excellent data reception quality, similarly to the case where the number of slots in a period (cycle) for the precoding scheme of regularly hopping between precoding matrices is an odd number in Embodiment 9. In this case, high data reception quality may be achieved even if the length of the period (cycle) pertaining to the present embodiment is reduced to approximately half of the length of the period (cycle) pertaining to Embodiment 9. This can reduce the number of precoding matrices to be prepared, which brings about the advantageous effect of reducing the scale of circuits for the transmission device and the reception device.

Similarly, when $\alpha=1$ in Equation #23, the following equation is true.

Math 591

$$F[i] = \frac{1}{\sqrt{2}}\begin{pmatrix} e^{j0} & e^{j\pi} \\ e^{j\left(\frac{2i\pi}{2n+1}\right)} & e^{j\left(\frac{2i\pi}{2n+1}\right)} \end{pmatrix} \quad \text{Equation \#26}$$

In this case, i=0, 1, 2, . . . , n−2, n−1, n. Out of the n+1 different precoding matrices according to Equation #26 (namely, F[0], F[1], . . . , F[i], . . . , F[n−1], F[n]), F[0] is used once, and each of F[1] through F[n] is used twice (i.e., F[1] is used twice, F[2] is used twice, . . . , F[n−1] is used twice, and F[n] is used twice). As a result, the precoding scheme of regularly hopping between precoding matrices with an N-slot period (cycle) where N=2n+1 is achieved, and the reception device can achieve excellent data reception quality, similarly to the case where the number of slots in a period (cycle) for the precoding scheme of regularly hopping between precoding matrices is an odd number in Embodiment 9. In this case, high data reception quality may be achieved even if the length of the period (cycle) pertaining to the present embodiment is reduced to approximately half of the length of the period (cycle) pertaining to Embodiment 9. This can reduce the number of precoding matrices to be prepared, which brings about the advantageous effect of reducing the scale of circuits for the transmission device and the reception device.

A preferable example of a appearing in the above examples can be obtained by using any of the schemes described in Embodiment 18. However, a is not limited to being obtained in this way.

According to the present embodiment, in the case of a single-carrier transmission scheme, the precoding matrices W[0], W[1], . . . , W[2n−1], W[2n] (which are constituted by F[0], F[1], F[2], . . . , F[n−1], F[n]) for a precoding hopping scheme with a an N-slot period (cycle) where N=2n+1 (i.e., a precoding scheme of regularly hopping between precoding matrices with an N-slot period (cycle) where N=2n+1) are arranged in the order W[0], W[1], . . . , W[2n−1], W[2n] in the time domain (or the frequency domain). The present invention is not, however, limited in this way, and the precoding matrices W[0], W[1], . . . , W[2n−1], W[2n] may be applied to a multi-carrier transmission scheme such as an OFDM transmission scheme or the like. As in Embodiment 1, as a scheme of adaption in this case, precoding weights may be changed by arranging symbols in the frequency domain and in the frequency-time domain. Although the above has described the precoding hopping scheme with an N-slot period (cycle) where N=2n+1, the same advantageous effects may be obtained by randomly using W[0], W[1], . . . , W[2n−1], W[2n]. In other words, W[0], W[1], . . . , W[2n−1], W[2n] do not necessarily need to be used in a regular period (cycle).

Furthermore, in the precoding matrix hopping scheme over an H-slot period (cycle) (H being a natural number larger than the number of slots N=2n+1 in the period (cycle) of the above scheme of regularly hopping between precoding matrices), when the N different precoding matrices of the present embodiment are included, the probability of excellent reception quality increases.

Embodiment C3

The present embodiment provides detailed descriptions of a case where, as shown in Non-Patent Literature 12 through Non-Patent Literature 15, a Quasi-Cyclic Low-Density Parity-Check (QC-LDPC) code (or an LDPC (block) code other than a QC-LDPC code) and a block code (e.g., a concatenated code consisting of an LDPC code and a Bose-Chaudhuri-Hocquenghem (BCH) code, and a turbo code) are used, especially when the scheme of regularly hopping between precoding matrices described in Embodiments 16 through 26 and C1 is employed. This embodiment describes an example of transmitting two streams, s1 and s2. However, for the case of coding using block codes, when control information or the like is not necessary, the number of bits in a coding (encoded) block matches the number of bits composing the block code (the control information or the like listed below may, however, be included therein). For the case of coding using block codes, when control information or the like (such as a cyclic redundancy check (CRC), transmission parameters, or the like) is necessary, the number of bits in a coding (encoded) block is the sum of the number of bits composing the block code and the number of bits in the control information or the like.

Figure 97:
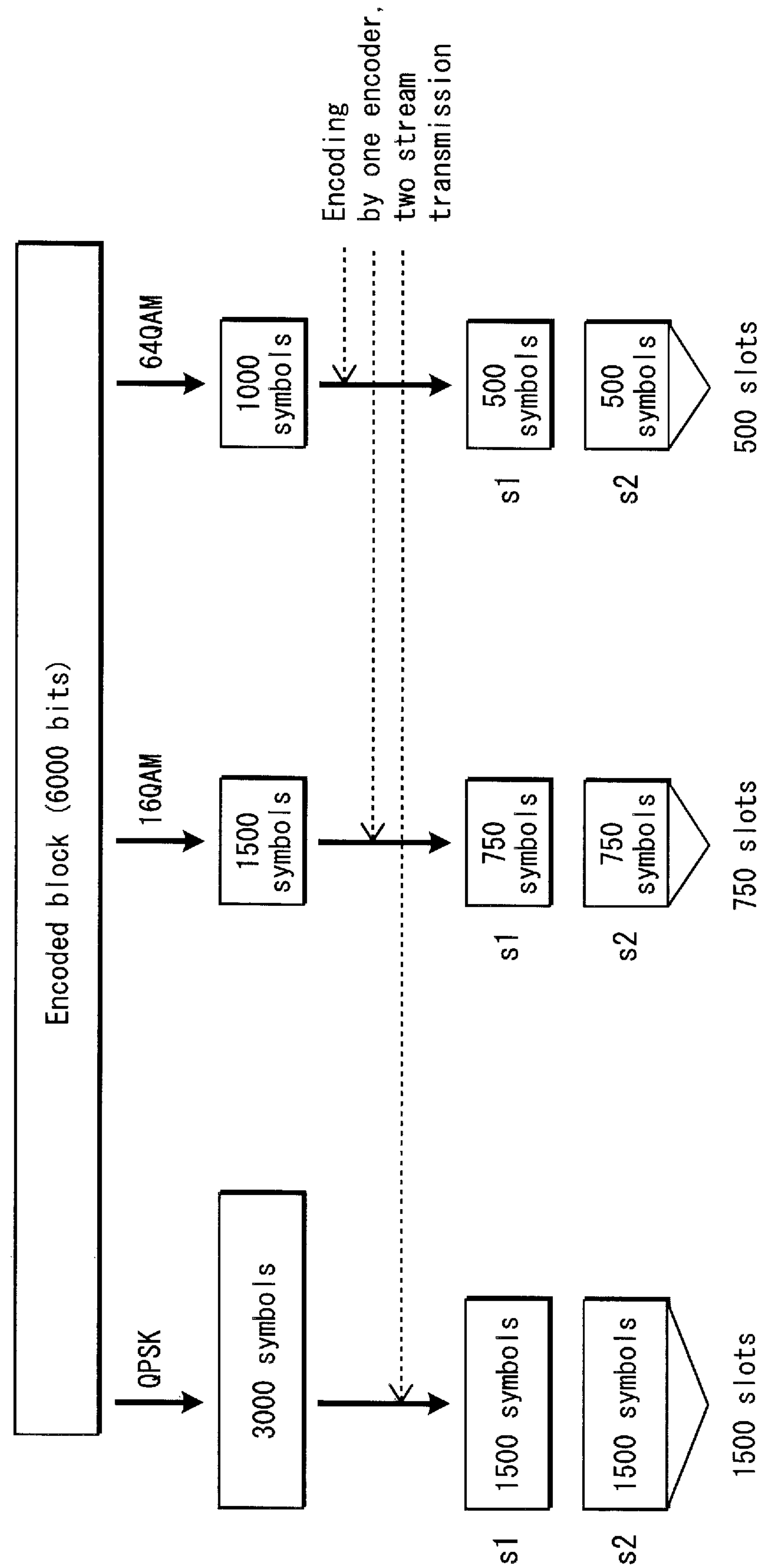
FIG. 97 shows the number of symbols and the number of slots.

FIG. 97 shows a modification of the number of symbols and of slots necessary for one coding (encoded) block when using block coding. FIG. 97 "shows a modification of the number of symbols and of slots necessary for one coding (encoded) block when using block coding" for the case when, for example as shown in the transmission device in FIG. 4, two streams, s1 and s2, are transmitted, and the transmission device has one encoder. (In this case, the transmission scheme may be either single carrier transmission, or multicarrier transmission such as OFDM.)

As shown in FIG. 97, the number of bits constituting one block that has been encoded via block coding is set to 6,000. In order to transmit these 6,000 bits, 3,000 symbols are required when the modulation scheme is QPSK, 1,500 when the modulation scheme is 16QAM, and 1,000 when the modulation scheme is 64QAM.

Since the transmission device in FIG. 4 simultaneously transmits two streams, 1,500 of the 3,000 symbols when the modulation scheme is QPSK are allocated to s1, and 1,500 to s2. Therefore, 1,500 slots (the term "slot" is used here) are required to transmit the 1,500 symbols transmitted in s1 and the 1,500 symbols transmitted in s2.

By similar reasoning, when the modulation scheme is 16QAM, 750 slots are necessary to transmit all of the bits constituting one coding (encoded) block, and when the modulation scheme is 64QAM, 500 slots are necessary to transmit all of the bits constituting one block.

The following describes the relationship between the slots defined above and the precoding matrices in the scheme of regularly hopping between precoding matrices.

Here, the number of precoding matrices prepared for the scheme of regularly hopping between precoding matrices is set to five. In other words, five different precoding matrices are prepared for the weighting unit in the transmission device in FIG. 4 (the weighting unit selects one of the plurality of precoding matrices and performs precoding for each slot). These five different precoding matrices are represented as F[0], F[1], F[2], F[3], and F[4].

When the modulation scheme is QPSK, among the 1,500 slots described above for transmitting the 6,000 bits constituting one coding (encoded) block, it is necessary for 300 slots to use the precoding matrix F[0], 300 slots to use the precoding matrix F[1], 300 slots to use the precoding matrix F[2], 300 slots to use the precoding matrix F[3], and 300 slots to use the precoding matrix F[4]. This is because if use of the precoding matrices is biased, the reception quality of data is greatly influenced by the precoding matrix that was used a greater number of times.

When the modulation scheme is 16QAM, among the 750 slots described above for transmitting the 6,000 bits constituting one coding (encoded) block, it is necessary for 150 slots to use the precoding matrix F[0], 150 slots to use the precoding matrix F[1], 150 slots to use the precoding matrix F[2], 150 slots to use the precoding matrix F[3], and 150 slots to use the precoding matrix F[4].

When the modulation scheme is 64QAM, among the 500 slots described above for transmitting the 6,000 bits constituting one coding (encoded) block, it is necessary for 100 slots to use the precoding matrix F[0], 100 slots to use the precoding matrix F[1], 100 slots to use the precoding matrix F[2], 100 slots to use the precoding matrix F[3], and 100 slots to use the precoding matrix F[4].

As described above, in the scheme of regularly hopping between precoding matrices, if there are N different precoding matrices (represented as F[0], F[1], F[2], . . . , F[N−2], and F[N−1]), when transmitting all of the bits constituting one coding (encoded) block, Condition #107 should be satisfied, wherein $K_0$ is the number of slots using the precoding matrix F[0], $K_1$ is the number of slots using the precoding matrix F[1], $K_i$ is the number of slots using the precoding matrix F[i] (i=0, 1, 2, . . . , N−1), and $K_{N-1}$ is the number of slots using the precoding matrix F[N−1].

Condition #107

$K_0=K_1= \ldots =K_i= \ldots =K_{N-1}$, i.e. $K_a=K_b$ (for ∀a, ∀b, where a, b, =0, 1, 2, . . . , N−1 (each of a and b being an integer in a range of 0 to N−1), and a≠b).

If the communications system supports a plurality of modulation schemes, and the modulation scheme that is used is selected from among the supported modulation schemes, then a modulation scheme for which Condition #107 is satisfied should be selected.

When a plurality of modulation schemes are supported, it is typical for the number of bits that can be transmitted in one symbol to vary from modulation scheme to modulation scheme (although it is also possible for the number of bits to be the same), and therefore some modulation schemes may not be capable of satisfying Condition #107. In such a case, instead of Condition #107, the following condition should be satisfied.

Condition #108

The difference between $K_a$ and $K_b$ is 0 or 1, i.e. $|K_a-K_b|$ is 0 or 1 (for ∀a, ∀b, where a, b, =0, 1, 2, . . . , N−1 (each of a and b being an integer in a range of 0 to N−1), and a≠b).

Figure 98:
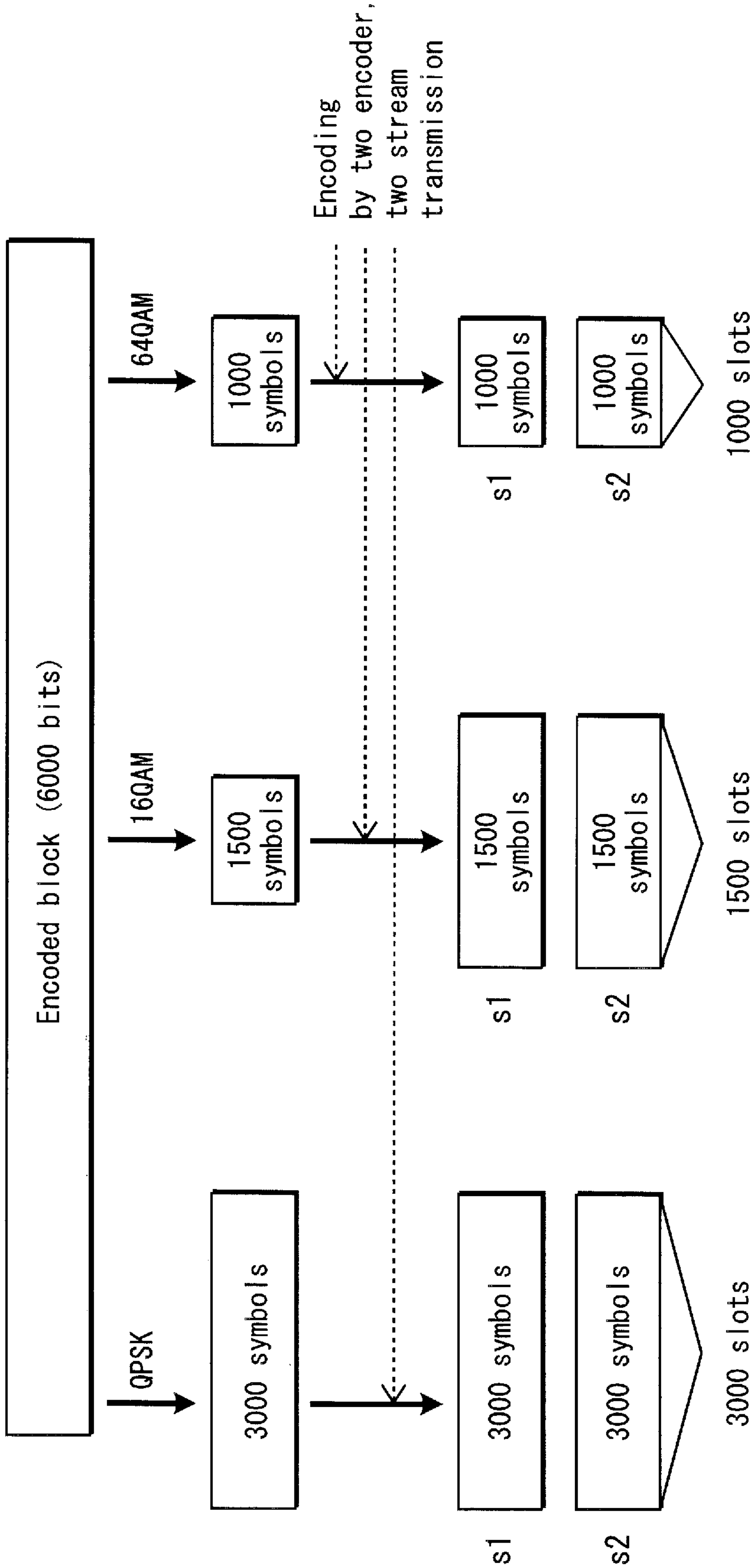
FIG. 98 shows the number of symbols and the number of slots.

FIG. 98 shows a modification of the number of symbols and of slots necessary for two coding (encoded) blocks when using block coding. FIG. 98 "shows a modification of the number of symbols and of slots necessary for two coding (encoded) blocks when using block coding" for the case when, for example as shown in the transmission device in FIG. 3 and in FIG. 13, two streams are transmitted, i.e. s1 and s2, and the transmission device has two encoders. (In this case, the transmission scheme may be either single carrier transmission, or multicarrier transmission such as OFDM.)

As shown in FIG. 98, the number of bits constituting one block that has been encoded via block coding is set to 6,000. In order to transmit these 6,000 bits, 3,000 symbols are required when the modulation scheme is QPSK, 1,500 when the modulation scheme is 16QAM, and 1,000 when the modulation scheme is 64QAM.

The transmission device in FIG. 3 or in FIG. 13 transmits two streams simultaneously, and since two encoders are provided, different coding (encoded) blocks are transmitted in the two streams. Accordingly, when the modulation scheme is QPSK, two coding (encoded) blocks are transmitted in s1 and s2 within the same interval. For example, a first coding (encoded) block is transmitted in s1, and a second coding (encoded) block is transmitted in s2, and therefore, 3,000 slots are required to transmit the first and second coding (encoded) blocks.

By similar reasoning, when the modulation scheme is 16QAM, 1,500 slots are necessary to transmit all of the bits constituting two coding (encoded) blocks, and when the modulation scheme is 64QAM, 1,000 slots are necessary to transmit all of the bits constituting two blocks.

The following describes the relationship between the slots defined above and the precoding matrices in the scheme of regularly hopping between precoding matrices.

Here, the number of precoding matrices prepared for the scheme of regularly hopping between precoding matrices is set to five. In other words, five different precoding matrices are prepared for the weighting unit in the transmission device in FIG. 3 or in FIG. 13 (the weighting unit selects one of the plurality of precoding matrices and performs precoding for each slot). These five different precoding matrices are represented as F[0], F[1], F[2], F[3], and F[4].

When the modulation scheme is QPSK, among the 3,000 slots described above for transmitting the 6,000×2 bits constituting two coding (encoded) blocks, it is necessary for 600 slots to use the precoding matrix F[0], 600 slots to use the precoding matrix F[1], 600 slots to use the precoding matrix F[2], 600 slots to use the precoding matrix F[3], and 600 slots to use the precoding matrix F[4]. This is because if use of the precoding matrices is biased, the reception quality of data is greatly influenced by the precoding matrix that was used a greater number of times.

To transmit the first coding (encoded) block, it is necessary for the slot using the precoding matrix F[0] to occur 600 times, the slot using the precoding matrix F[1] to occur 600 times, the slot using the precoding matrix F[2] to occur 600 times, the slot using the precoding matrix F[3] to occur 600 times, and the slot using the precoding matrix F[4] to occur 600 times. To transmit the second coding (encoded) block, the slot using the precoding matrix F[0] should occur 600 times, the slot using the precoding matrix F[1] should occur 600 times, the slot using the precoding matrix F[2] should occur 600 times, the slot using the precoding matrix F[3] should occur 600 times, and the slot using the precoding matrix F[4] should occur 600 times.

Similarly, when the modulation scheme is 16QAM, among the 1,500 slots described above for transmitting the 6,000×2 bits constituting two coding (encoded) blocks, it is necessary for 300 slots to use the precoding matrix F[0], 300 slots to use the precoding matrix F[1], 300 slots to use the precoding matrix F[2], 300 slots to use the precoding matrix F[3], and 300 slots to use the precoding matrix F[4].

To transmit the first coding (encoded) block, it is necessary for the slot using the precoding matrix F[0] to occur 300 times, the slot using the precoding matrix F[1] to occur 300 times, the slot using the precoding matrix F[2] to occur 300 times, the slot using the precoding matrix F[3] to occur 300 times, and the slot using the precoding matrix F[4] to occur 300 times. To transmit the second coding (encoded) block, the slot using the precoding matrix F[0] should occur 300 times, the slot using the precoding matrix F[1] should occur 300 times, the slot using the precoding matrix F[2] should occur 300 times, the slot using the precoding matrix F[3] should occur 300 times, and the slot using the precoding matrix F[4] should occur 300 times.

Similarly, when the modulation scheme is 64QAM, among the 1,000 slots described above for transmitting the 6,000×2 bits constituting two coding (encoded) blocks, it is necessary for 200 slots to use the precoding matrix F[0], 200 slots to use the precoding matrix F[1], 200 slots to use the precoding matrix F[2], 200 slots to use the precoding matrix F[3], and 200 slots to use the precoding matrix F[4].

To transmit the first coding (encoded) block, it is necessary for the slot using the precoding matrix F[0] to occur 200 times, the slot using the precoding matrix F[1] to occur 200 times, the slot using the precoding matrix F[2] to occur 200 times, the slot using the precoding matrix F[3] to occur 200 times, and the slot using the precoding matrix F[4] to occur 200 times. To transmit the second coding (encoded) block, the slot using the precoding matrix F[0] should occur 200 times, the slot using the precoding matrix F[1] should occur 200 times, the slot using the precoding matrix F[2] should occur 200 times, the slot using the precoding matrix F[3] should occur 200 times, and the slot using the precoding matrix F[4] should occur 200 times.

As described above, in the scheme of regularly hopping between precoding matrices, if there are N different precoding matrices (represented as F[0], F[1], F[2], . . . , F[N−2], and F[N−1]), when transmitting all of the bits constituting two coding (encoded) blocks, Condition #109 should be satisfied, wherein $K_0$ is the number of slots using the precoding matrix F[0], $K_1$ is the number of slots using the precoding matrix F[1], $K_i$ is the number of slots using the precoding matrix F[i] (i=0, 1, 2, . . . , N−1), and $K_{N-1}$ is the number of slots using the precoding matrix F[N−1].

Condition #109

$K_0=K_1=\ldots=K_i=\ldots=K_{N-1}$, i.e. $K_a=K_b$ (for ∀a, ∀b, where a, b, =0, 1, 2, . . . , N−1 (each of a and b being an integer in a range of 0 to N−1), and a≠b).

When transmitting all of the bits constituting the first coding (encoded) block, Condition #110 should be satisfied, wherein $K_{0,1}$ is the number of times the precoding matrix F[0] is used, $K_{1,1}$ is the number of times the precoding matrix F[1] is used, $K_{i,1}$ is the number of times the precoding matrix F[i] is used (i=0, 1, 2, . . . , N−1), and $K_{N-1,1}$ is the number of times the precoding matrix F[N−1] is used.

Condition #110

$K_{0,1}=K_{1,1}=\ldots=K_{i,1}=\ldots=K_{N-1,1}$, i.e. $K_{a,i}=K_{b,1}$ (for ∀a, ∀b, where a, b, =0, 1, 2, . . . , N−1 (each of a and b being an integer in a range of 0 to N−1), and a≠b).

When transmitting all of the bits constituting the second coding (encoded) block, Condition #111 should be satisfied, wherein $K_{0,2}$ is the number of times the precoding matrix F[0] is used, $K_{1,2}$ is the number of times the precoding matrix F[1] is used, $K_{i,2}$ is the number of times the precoding matrix F[i] is used (i=0, 1, 2, . . . , N−1), and $K_{N-1,2}$ is the number of times the precoding matrix F[N−1] is used.

Condition #111

$K_{0,2}=K_{1,2}=\ldots=K_{1,2}=\ldots=K_{N-1,2}$, i.e. $K_{a,2}=K_{b,2}$ (for ∀a, ∀b, where a, b, =0, 1, 2, . . . , N−1 (each of a and b being an integer in a range of 0 to N−1), and a≠b).

If the communications system supports a plurality of modulation schemes, and the modulation scheme that is used is selected from among the supported modulation schemes, the selected modulation scheme preferably satisfies Conditions #109, #110, and #111.

When a plurality of modulation schemes are supported, it is typical for the number of bits that can be transmitted in one symbol to vary from modulation scheme to modulation scheme (although it is also possible for the number of bits to be the same), and therefore some modulation schemes may not be capable of satisfying Conditions #109, #110, and #111. In such a case, instead of Conditions #109, #110, and #111, the following conditions should be satisfied.

Condition #112

The difference between $K_a$ and $K_b$ is 0 or 1, i.e. $|K_a-K_b|$ is 0 or 1 (for ∀a, ∀b, where a, b, =0, 1, 2, . . . , N−1 (each of a and b being an integer in a range of 0 to N−1), and a≠b).

Condition #113

The difference between $K_{a,1}$ and $K_{b,1}$ is 0 or 1, i.e. $|K_{a,1}-K_{b,1}|$ is 0 or 1 (for ∀a, ∀b, where a, b, =0, 1, 2, . . . , N−1 (each of a and b being an integer in a range of 0 to N−1), and a≠b).

Condition #114

The difference between $K_{a,2}$ and $K_{b,2}$ is 0 or 1, i.e. $|K_{a,2}-K_{b,2}|$ is 0 or 1 (for ∀a, ∀b, where a, b, =0, 1, 2, . . . , N−1 (each of a and b being an integer in a range of 0 to N−1), and a≠b).

Associating coding (encoded) blocks with precoding matrices in this way eliminates bias in the precoding matrices that are used for transmitting coding (encoded) blocks, thereby achieving the advantageous effect of improving reception quality of data by the reception device.

In the present embodiment, in the scheme of regularly hopping between precoding matrices, N different precoding matrices are necessary for a precoding hopping scheme with an N-slot period (cycle). In this case, F[0], F[1], F[2], . . . , F[N−2], F[N−1] are prepared as the N different precoding matrices. These precoding matrices may be arranged in the frequency domain in the order of F[0], F[1], F[2], . . . , F[N−2], F[N−1], but arrangement is not limited in this way. With N different precoding matrices F[0], F[1], F[2], . . . , F[N−2], F[N−1] generated in the present Embodiment, precoding weights may be changed by arranging symbols in the time domain or in the frequency-time domains as in Embodiment 1. Note that a precoding hopping scheme with an N-slot period (cycle) has been described, but the same advantageous effects may be obtained by randomly using N different precoding matrices. In other words, the N different precoding matrices do not necessarily need to be used in a regular period (cycle). Here, when the conditions provided in the present embodiment are satisfied, the reception device has a high possibility of achieving excellent data reception quality.

Furthermore, as described in Embodiment 15, a spatial multiplexing MIMO system, a MIMO system in which precoding matrices are fixed, a space-time block coding scheme, a one-stream-only transmission mode, and modes for schemes of regularly hopping between precoding matrices may exist, and the transmission device (broadcast station, base station) may select the transmission scheme from among these modes. In this case, in the spatial multiplexing MIMO system, the MIMO system in which precoding matrices are fixed, the space-time block coding scheme, the one-stream-only transmission mode, and the modes for schemes of regularly hopping between precoding matrices, it is preferable to implement the present embodiment in the (sub)carriers for which a scheme of regularly hopping between precoding matrices is selected.

Embodiment C4

The present embodiment provides detailed descriptions of a case where, as shown in Non-Patent Literature 12 through Non-Patent Literature 15, a QC-LDPC code (or an LDPC (block) code other than a QC-LDPC code) and a block code (e.g., a concatenated code consisting of an LDPC code and a BCH code, and a turbo code) are used, especially when the scheme of regularly hopping between precoding matrices described in Embodiments C2 is employed. This embodiment describes an example of transmitting two streams, s1 and s2. However, for the case of coding using block codes, when control information or the like is not necessary, the number of bits in a coding (encoded) block matches the number of bits composing the block code (the control information or the like listed below may, however, be included therein). For the case of coding using block codes, when control information or the like (such as a cyclic redundancy check (CRC), transmission parameters, or the like) is necessary, the number of bits in a coding (encoded) block is the sum of the number of bits composing the block code and the number of bits in the control information or the like.

FIG. 97 shows a modification of the number of symbols and of slots necessary for one coding (encoded) block when using block coding. FIG. 97 "shows a modification of the number of symbols and of slots necessary for one coding (encoded) block when using block coding" for the case when, for example as shown in the transmission device in FIG. 4, two streams, s1 and s2, are transmitted, and the transmission device has one encoder. (In this case, the transmission scheme may be either single carrier transmission, or multicarrier transmission such as OFDM.)

As shown in FIG. 97, the number of bits constituting one block that has been encoded via block coding is set to 6,000. In order to transmit these 6,000 bits, 3,000 symbols are required when the modulation scheme is QPSK, 1,500 when the modulation scheme is 16QAM, and 1,000 when the modulation scheme is 64QAM.

Since the transmission device in FIG. 4 simultaneously transmits two streams, 1,500 of the 3,000 symbols when the modulation scheme is QPSK are allocated to s1, and 1,500 to s2. Therefore, 1,500 slots (the term "slot" is used here) are required to transmit the 1,500 symbols transmitted in s1 and the 1,500 symbols transmitted in s2.

By similar reasoning, when the modulation scheme is 16QAM, 750 slots are necessary to transmit all of the bits constituting one coding (encoded) block, and when the modulation scheme is 64QAM, 500 slots are necessary to transmit all of the bits constituting one block.

The following describes the relationship between the slots defined above and the precoding matrices in the scheme of regularly hopping between precoding matrices.

Here, five precoding matrices for realizing the precoding scheme of regularly hopping between precoding matrices with a five-slot period (cycle), as described in Embodiment C2, are expressed as W[0], W[1], W[2], W[3], and W[4] (the weighting unit of the transmission device selects one of a plurality of precoding matrices and performs precoding for each slot).

When the modulation scheme is QPSK, among the 1,500 slots described above for transmitting the 6,000 bits constituting one coding (encoded) block, it is necessary for 300 slots to use the precoding matrix W[0], 300 slots to use the precoding matrix W[1], 300 slots to use the precoding matrix W[2], 300 slots to use the precoding matrix W[3], and 300 slots to use the precoding matrix W[4]. This is because if use of the precoding matrices is biased, the reception quality of data is greatly influenced by the precoding matrix that was used a greater number of times.

When the modulation scheme is 16QAM, among the 750 slots described above for transmitting the 6,000 bits constituting one coding (encoded) block, it is necessary for 150 slots to use the precoding matrix W[0], 150 slots to use the precoding matrix W[1], 150 slots to use the precoding matrix W[2], 150 slots to use the precoding matrix W[3], and 150 slots to use the precoding matrix W[4].

When the modulation scheme is 64QAM, among the 500 slots described above for transmitting the 6,000 bits constituting one coding (encoded) block, it is necessary for 100 slots to use the precoding matrix W[0], 100 slots to use the precoding matrix W[1], 100 slots to use the precoding matrix W[2], 100 slots to use the precoding matrix W[3], and 100 slots to use the precoding matrix W[4].

As described above, in the scheme of regularly hopping between precoding matrices pertaining to Embodiment C2, provided that the precoding matrices W[0], W[1], . . . , W[2n−1], and W[2n] (which are constituted by F[0], F[1], F[2], . . . , F[n−1], and F[n]; see Embodiment C2) are prepared to achieve an N-slot period (cycle) where N=2n+1, when transmitting all of the bits constituting one coding (encoded) block, Condition #115 should be satisfied, wherein $K_0$ is the number of slots using the precoding matrix W[0], $K_1$ is the number of slots using the precoding matrix W[1], $K_i$ is the number of slots using the precoding matrix W[i] (i=0, 1, 2, . . . , 2n−1, 2n), and $K_{2n}$ is the number of slots using the precoding matrix W[2n].

Condition #115

$K_0=K_1=\ldots=K_i=\ldots=K_{2n}$, i.e. $K_a=K_b$ (for ∀a, ∀b, where a, b, =0, 1, 2, . . . , 2n−1, 2n (each of a and b being an integer in a range of 0 to 2n), and a≠b).

In the scheme of regularly hopping between precoding matrices pertaining to Embodiment C2, provided that the different precoding matrices F[0], F[1], F[2], . . . , F[n−1], and F[n] are prepared to achieve an N-slot period (cycle) where N=2n+1, when transmitting all of the bits constituting one coding (encoded) block, Condition #115 can be expressed as follows, wherein $G_0$ is the number of slots using the precoding matrix F[0], $G_1$ is the number of slots using the precoding matrix F[1], $G_i$ is the number of slots using the precoding matrix F[i] (i=0, 1, 2, . . . , n−1, n), and $G_n$ is the number of slots using the precoding matrix F[n].

Condition #116

$2\times G_0=G_1=\ldots=G_i=\ldots=G_n$, i.e. $2\times G_0=G_a$ (for ∀a, where a=1, 2, . . . , n−1, n (a being an integer in a range of 1 to n)).

If the communications system supports a plurality of modulation schemes, and the modulation scheme that is used is selected from among the supported modulation schemes, then a modulation scheme for which Condition #115 (#116) is satisfied should be selected.

When a plurality of modulation schemes are supported, it is typical for the number of bits that can be transmitted in one symbol to vary from modulation scheme to modulation scheme (although it is also possible for the number of bits to be the same), and therefore some modulation schemes may not be capable of satisfying Condition #115 (#116). In such a case, instead of Condition #115, the following condition should be satisfied.

Condition #117

The difference between $K_a$ and $K_b$ is 0 or 1, i.e. $|K_a-K_b|$ is 0 or 1 (for ∀a, ∀b, where a, b, =0, 1, 2, . . . , 2n−1, 2n (each of a and b being an integer in a range of 0 to 2n), and a≠b).

Condition #117 can also be expressed as follows.

Condition #118

The difference between $G_a$ and $G_b$ is 0, 1 or 2, i.e. $|G_a-G_b|$ is 0, 1 or 2 (for ∀a, ∀b, where a, b, =1, 2, . . . , n−1, n (each of a and b being an integer in a range of 1 to n), and a≠b); and the difference between $2\times G_0$ and $G_a$ is 0, 1 or 2, i.e. $|2\times G_0-G_a|$ is 0, 1 or 2 (for ∀a, where a=1, 2, . . . , n−1, n (a being an integer in a range of 1 to n)).

FIG. 98 shows a modification of the number of symbols and of slots necessary for one coding (encoded) block when using block coding. FIG. 98 "shows a modification of the number of symbols and of slots necessary for two coding (encoded) blocks when using block coding" for the case when, for example as shown in the transmission device in FIG. 3 and in FIG. 13, two streams are transmitted, i.e. s1 and s2, and the transmission device has two encoders. (In this case, the transmission scheme may be either single carrier transmission, or multicarrier transmission such as OFDM.)

As shown in FIG. 98, the number of bits constituting one block that has been encoded via block coding is set to 6,000. In order to transmit these 6,000 bits, 3,000 symbols are required when the modulation scheme is QPSK, 1,500 when the modulation scheme is 16QAM, and 1,000 when the modulation scheme is 64QAM.

The transmission device in FIG. 3 or in FIG. 13 transmits two streams simultaneously, and since two encoders are provided, different coding (encoded) blocks are transmitted in the two streams. Accordingly, when the modulation scheme is QPSK, two coding (encoded) blocks are transmitted in s1 and s2 within the same interval. For example, a first coding (encoded) block is transmitted in s1, and α second coding (encoded) block is transmitted in s2, and therefore, 3,000 slots are required to transmit the first and second coding (encoded) blocks.

By similar reasoning, when the modulation scheme is 16QAM, 1,500 slots are necessary to transmit all of the bits constituting two coding (encoded) blocks, and when the modulation scheme is 64QAM, 1,000 slots are necessary to transmit all of the bits constituting two blocks.

The following describes the relationship between the slots defined above and the precoding matrices in the scheme of regularly hopping between precoding matrices.

Below, the five precoding matrices prepared in Embodiment C2 to implement the precoding scheme of regularly hopping between precoding matrices with a five-slot period (cycle) are expressed as W[0], W[1], W[2], W[3], and W[4]. (The weighting unit in the transmission device selects one of a plurality of precoding matrices and performs precoding for each slot).

When the modulation scheme is QPSK, among the 3,000 slots described above for transmitting the 6,000×2 bits constituting two coding (encoded) blocks, it is necessary for 600 slots to use the precoding matrix W[0], 600 slots to use the precoding matrix W[1], 600 slots to use the precoding matrix W[2], 600 slots to use the precoding matrix W[3], and 600 slots to use the precoding matrix W[4]. This is because if use of the precoding matrices is biased, the reception quality of data is greatly influenced by the precoding matrix that was used a greater number of times.

To transmit the first coding (encoded) block, it is necessary for the slot using the precoding matrix W[0] to occur 600 times, the slot using the precoding matrix W[1] to occur 600 times, the slot using the precoding matrix W[2] to occur 600 times, the slot using the precoding matrix W[3] to occur 600 times, and the slot using the precoding matrix W[4] to occur 600 times. To transmit the second coding (encoded) block, the slot using the precoding matrix W[0] should occur 600 times, the slot using the precoding matrix W[1] should occur 600 times, the slot using the precoding matrix W[2] should occur 600 times, the slot using the precoding matrix W[3] should occur 600 times, and the slot using the precoding matrix W[4] should occur 600 times.

Similarly, when the modulation scheme is 16QAM, among the 1,500 slots described above for transmitting the 6,000×2 bits constituting two coding (encoded) blocks, it is necessary for 300 slots to use the precoding matrix W[0], 300 slots to use the precoding matrix W[1], 300 slots to use the precoding matrix W[2], 300 slots to use the precoding matrix W[3], and 300 slots to use the precoding matrix W[4].

To transmit the first coding (encoded) block, it is necessary for the slot using the precoding matrix W[0] to occur 300 times, the slot using the precoding matrix W[1] to occur 300 times, the slot using the precoding matrix W[2] to occur 300 times, the slot using the precoding matrix W[3] to occur 300 times, and the slot using the precoding matrix W[4] to occur 300 times. To transmit the second coding (encoded) block, the slot using the precoding matrix W[0] should occur 300 times, the slot using the precoding matrix W[1] should occur 300 times, the slot using the precoding matrix W[2] should occur 300 times, the slot using the precoding matrix W[3] should occur 300 times, and the slot using the precoding matrix W[4] should occur 300 times.

Similarly, when the modulation scheme is 64QAM, among the 1,000 slots described above for transmitting the 6,000×2 bits constituting two coding (encoded) blocks, it is necessary for 200 slots to use the precoding matrix W[0], 200 slots to use the precoding matrix W[1], 200 slots to use the precoding matrix W[2], 200 slots to use the precoding matrix W[3], and 200 slots to use the precoding matrix W[4].

To transmit the first coding (encoded) block, it is necessary for the slot using the precoding matrix W[0] to occur 200 times, the slot using the precoding matrix W[1] to occur 200 times, the slot using the precoding matrix W[2] to occur 200 times, the slot using the precoding matrix W[3] to occur 200 times, and the slot using the precoding matrix W[4] to occur 200 times. To transmit the second coding (encoded) block, the slot using the precoding matrix W[0] should occur 200 times, the slot using the precoding matrix W[1] should occur 200 times, the slot using the precoding matrix W[2] should occur 200 times, the slot using the precoding matrix W[3] should occur 200 times, and the slot using the precoding matrix W[4] should occur 200 times.

As described above, in the scheme of regularly hopping between precoding matrices pertaining to Embodiment C2, provided that the precoding matrices W[0], W[1], . . . , W[2n−1], and W[2n] (which are constituted by F[0], F[1], F[2], . . . , F[n− 1], and F[n]; see Embodiment C2) are prepared to achieve an N-slot period (cycle) where N=2n+1, when transmitting all of the bits constituting two coding (encoded) blocks, Condition #119 should be satisfied, wherein $K_0$ is the number of slots using the precoding matrix W[0], $K_1$ is the number of slots using the precoding matrix W[1], $K_i$ is the number of slots using the precoding matrix W[i] (i=0, 1, 2, . . . , 2n−1, 2n), and $K_{2n}$ is the number of slots using the precoding matrix W[2n].

Condition #119

$K_0=K_1=\ldots=K_i=\ldots=K_{2n}$, i.e. $K_a=K_b$ (for ∀a, ∀b, where a, b, =0, 1, 2, . . . , 2n−1, 2n (each of a and b being an integer in a range of 0 to 2n), and a≠b).

When transmitting all of the bits constituting the first coding (encoded) block, Condition #120 should be satisfied, wherein $K_{0,1}$ is the number of times the precoding matrix W[0] is used, $K_{1,1}$ is the number of times the precoding matrix W[1] is used, $K_{i,1}$ is the number of times the precoding matrix W[i] is used (i=0, 1, 2, . . . , 2n−1, 2n), and $K_{2n,1}$ is the number of times the precoding matrix W[2n] is used.

Condition #120

$K_{0,1}=K_{1,1}=\ldots=K_{i,1}=\ldots=K_{2n,1}$, i.e. $K_{a,1}=K_{b,1}$ (for ∀a, ∀b, where a, b, =0, 1, 2, . . . , 2n−1, 2n (each of a and b being an integer in a range of 0 to 2n), and a≠b).

When transmitting all of the bits constituting the second coding (encoded) block, Condition #121 should be satisfied, wherein $K_{0,2}$ is the number of times the precoding matrix W[0] is used, $K_{1,2}$ is the number of times the precoding matrix W[1] is used, $K_{i,2}$ is the number of times the precoding matrix W[i] is used (i=0, 1, 2, . . . , 2n−1, 2n), and $K_{2n,2}$ is the number of times the precoding matrix W[2n] is used.

Condition #121

$K_{0,2}=K_{1,2}=\ldots=K_{1,2}=\ldots=K_{2n,2}$, i.e. $K_{a,2}=K_{b,2}$ (for ∀a, ∀b, where a, b, =0, 1, 2, . . . , 2n−1, 2n (each of a and b being an integer in a range of 0 to 2n), and a≠b).

In the scheme of regularly hopping between precoding matrices pertaining to Embodiment C2, provided that the different precoding matrices F[0], F[1], F[2], . . . , F[n−1], and F[n] are prepared to achieve an N-slot period (cycle) where N=2n+1, when transmitting all of the bits constituting two coding (encoded) blocks, Condition #119 can be expressed as follows, wherein $G_0$ is the number of slots using the precoding matrix F[0], $G_1$ is the number of slots using the precoding matrix F[1], $G_i$ is the number of slots using the precoding matrix F[i] (i=0, 1, 2, . . . , n−1, n), and $G_n$ is the number of slots using the precoding matrix F[n].

Condition #122

$2\times G_0=G_1=\ldots=G_i=\ldots=G_n$ i.e. $2\times G_0=G_a$ (for ∀a, where a=1, 2, . . . , n−1, n (a being an integer in a range of 1 to n)).

When transmitting all of the bits constituting the first coding (encoded) block, Condition #123 should be satisfied, wherein $G_{0,1}$ is the number of times the precoding matrix F[0] is used, $K_{1,1}$ is the number of times the precoding matrix F[1] is used, $G_{i,1}$ is the number of times the precoding matrix F[i] is used (i=0, 1, 2, . . . , n−1, n), and $G_{n,1}$ is the number of times the precoding matrix F[n] is used.

Condition #123

$2\times G_{0,1}=G_{1,1}=\ldots=G_{i,1}=\ldots=G_{n,1}$, i.e. $2\times G_{0,1}=G_{a,1}$ (for ∀a, where a=1, 2, . . . , n−1, n (a being an integer in a range of 1 to n)).

When transmitting all of the bits constituting the second coding (encoded) block, Condition #124 should be satisfied, wherein $G_{0,2}$ is the number of times the precoding matrix F[0] is used, $G_{1,2}$ is the number of times the precoding matrix F[1] is used, $G_{i,2}$ is the number of times the precoding matrix F[i] is used (i=0, 1, 2, . . . , n−1, n), and $G_{n,2}$ is the number of times the precoding matrix F[n] is used.

Condition #124

$2\times G_{0,2}=G_{1,2}=\ldots=G_{i,2}=\ldots=G_{n,2}$, i.e. $2\times G_{0,2}=G_{a,2}$ (for ∀a, where a=1, 2, . . . , n−1, n (a being an integer in a range of 1 to n)).

If the communications system supports a plurality of modulation schemes, and the modulation scheme that is used is selected from among the supported modulation schemes, then a modulation scheme for which Conditions #119, #120 and #121 (#122, #123 and #124) are satisfied should be selected. When a plurality of modulation schemes are supported, it is typical for the number of bits that can be transmitted in one symbol to vary from modulation scheme to modulation scheme (although it is also possible for the number of bits to be the same), and therefore some modulation schemes may not be capable of satisfying Conditions #119, #120, and #121 (#122, #123 and #124). In such a case, instead of Conditions #119, #120, and #121, the following conditions should be satisfied.

Condition #125

The difference between $K_a$ and $K_b$ is 0 or 1, i.e. $|K_a-K_b|$ is 0 or 1 (for ∀a, ∀b, where a, b, =0, 1, 2, . . . , 2n−1, 2n (each of a and b being an integer in a range of 0 to 2n), and a≠b).

Condition #126

The difference between $K_{a,1}$ and $K_{b,1}$ is 0 or 1, i.e. $|K_{a,1}-K_{b,1}|$ is 0 or 1 (for ∀a, ∀b, where a, b, =0, 1, 2, . . . , 2n−1, 2n (each of a and b being an integer in a range of 0 to 2n), and a≠b).

Condition #127

The difference between $K_{a,2}$ and $K_{b,2}$ is 0 or 1, i.e. $|K_{a,2}-K_{b,2}|$ is 0 or 1 (for ∀a, ∀b, where a, b, =0, 1, 2, . . . , 2n−1, 2n (each of a and b being an integer in a range of 0 to 2n), and a≠b).

Conditions #125, #126 and #127 can also be expressed as follows. Condition #128

The difference between $G_a$ and $G_b$ is 0, 1 or 2, i.e. $|G_a-G_b|$ is 0, 1 or 2 (for ∀a, ∀b, where a, b, =1, 2, . . . , n−1, n (each of a and b being an integer in a range of 1 to n), and a≠b); and the difference between $2\times G_0$ and $G_a$ is 0, 1 or 2, i.e. $|2\times G_0-G_a|$ is 0, 1 or 2 (for ∀a, where a=1, 2, . . . , n−1, n (a being an integer in a range of 1 to n)).

Condition #129

The difference between $G_{a,1}$ and $G_{b,1}$ is 0, 1 or 2, i.e. $|G_{a,1}-G_{b,1}|$ is 0, 1 or 2 (for ∀a, ∀b, where a, b, =1, 2, . . . , n−1, n (each of a and b being an integer in a range of 1 to n), and a≠b); and the difference between $2\times G_{0,1}$ and $G_{a,1}$ is 0, 1 or 2, i.e. $|2\times G_{0,1}-G_{a,1}|$ is 0, 1 or 2 (for ∀a, where a=1, 2, . . . , n−1, n (a being an integer in a range of 1 to n)).

Condition #130

The difference between $G_{a,2}$ and $G_{b,2}$ is 0, 1 or 2, i.e. $|G_{a,2}-G_{b,2}|$ is 0, 1 or 2 (for ∀a, ∀b, where a, b, =1, 2, . . . , n−1, n (each of a and b being an integer in a range of 1 to n), and a≠b); and the difference between $2\times G_{0,2}$ and $G_{a,2}$ is 0, 1 or 2, i.e. $|2\times G_{0,2}-G_{a,2}|$ is 0, 1 or 2 (for ∀a, where a=1, 2, . . . , n−1, n (a being an integer in a range of 1 to n)).

Associating coding (encoded) blocks with precoding matrices in this way eliminates bias in the precoding matrices that are used for transmitting coding (encoded) blocks, thereby achieving the advantageous effect of improving reception quality of data by the reception device.

In the present embodiment, precoding matrices W[0], W[1], . . . , W[2n−1], W[2n] (note that W[0], W[1], W[2n−1], W[2n] are composed of F[0], F[1], F[2], . . . , F[n−1], F[n]) for the precoding hopping scheme with the period (cycle) of N=2n+1 slots as described in Embodiment C2 (the precoding scheme of regularly hopping between precoding matrices with the period (cycle) of N=2n+1 slots) are arranged in the order W[0], W[1], . . . , W[2n−1], W[2] in the time domain (or the frequency domain) in the single carrier transmission scheme. The present invention is not, however, limited in this way, and the precoding matrices W[0], W[1], . . . , W[2n−1], W[2n] may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that the precoding hopping scheme with the period (cycle) of N=2n+1 slots has been described, but the same advantageous effect may be obtained by randomly using the precoding matrices W[0], W[1], . . . , W[2n−1], W[2n]. In other words, the precoding matrices W[0], W[1], . . . , W[2n−1], W[2n] do not need to be used in a regular period (cycle). In this case, when the conditions described in the present embodiment are satisfied, the probability that the reception device achieves excellent data reception quality is high.

Furthermore, in the precoding matrix hopping scheme with an H-slot period (cycle) (H being a natural number larger than the number of slots N=2n+1 in the period (cycle) of the above-mentioned scheme of regularly hopping between precoding matrices), when n+1 different precoding matrices of the present embodiment are included, the probability of providing excellent reception quality increases.

As described in Embodiment 15, there are modes such as the spatial multiplexing MIMO system, the MIMO system with a fixed precoding matrix, the space-time block coding scheme, the scheme of transmitting one stream and the scheme of regularly hopping between precoding matrices. The transmission device (broadcast station, base station) may select one transmission scheme from among these modes. In this case, from among the spatial multiplexing MIMO system, the MIMO system with a fixed precoding matrix, the space-time block coding scheme, the scheme of transmitting one stream and the scheme of regularly hopping between precoding matrices, a (sub)carrier group selecting the scheme of regularly hopping between precoding matrices may implement the present embodiment.

Embodiment C5

As shown in Non-Patent Literature 12 through Non-Patent Literature 15, the present embodiment describes a case where Embodiment C3 and Embodiment C4 are generalized when using a Quasi-Cyclic Low-Density Parity-Check (QC-LDPC) code (or an LDPC (block) code other than a QC-LDPC code), a block code such as a concatenated code consisting of an LDPC code and a Bose-Chaudhuri-Hocquenghem (BCH) code, and a block code such as a turbo code. The following describes a case of transmitting two streams s1 and s2 as an example. Note that, when the control information and the like are not required to perform encoding using the block code, the number of bits constituting the coding (encoded) block is the same as the number of bits constituting the block code (however, the control information and the like described below may be included). When the control information and the like (e.g. CRC (cyclic redundancy check), a transmission parameter) are required to perform encoding using the block code, the number of bits constituting the coding (encoded) block can be a sum of the number of bits constituting the block code and the number of bits of the control information and the like.

FIG. 97 shows a change in the number of symbols and slots required for one coding (encoded) block when the block code is used. FIG. 97 shows a change in the number of symbols and slots required for one coding (encoded) block when the block code is used in a case where the two streams s1 and s2 are transmitted and the transmission device has a single encoder, as shown in the transmission device in FIG. 4 (note that, in this case, either the single carrier transmission or the multi-carrier transmission such as the OFDM may be used as a transmission system).

As shown in FIG. 97, let the number of bits constituting one coding (encoded) block in the block code be 6000 bits. In order to transmit the 6000 bits, 3000 symbols, 1500 symbols and 1000 symbols are necessary when the modulation scheme is QPSK, 16QAM and 64QAM, respectively.

Since two streams are to be simultaneously transmitted in the transmission device shown in FIG. 4, when the modulation scheme is QPSK, 1500 symbols are allocated to s1 and remaining 1500 symbols are allocated to s2 out of the above-mentioned 3000 symbols. Therefore, 1500 slots (referred to as slots) are necessary to transmit 1500 symbols by s1 and transmit 1500 symbols by s2.

Making the same considerations, 750 slots are necessary to transmit all the bits constituting one coding (encoded) block when the modulation scheme is 16QAM, and 500 slots are necessary to transmit all the bits constituting one block when the modulation scheme is 64QAM.

The following describes the relationship between the slots defined above and precoding matrices in the scheme of regularly hopping between precoding matrices.

Here, let the precoding matrices for the scheme of regularly hopping between precoding matrices with a five-slot period (cycle) be W[0], W[1], W[2], W[3], W[4]. Note that at least two or more different precoding matrices may be included in W[0], W[1], W[2], W[3], W[4] (the same precoding matrices may be included in W[0], W[1], W[2], W[3], W[4]). In the weighting combination unit of the transmission device in FIG. 4, W[0], W[1], W[2], W[3], W[4] are used (the weighting combination unit selects one precoding matrix from among a plurality of precoding matrices in each slot, and performs precoding).

Out of the above-mentioned 1500 slots required to transmit 6000 bits, which is the number of bits constituting one coding (encoded) block, when the modulation scheme is QPSK, 300 slots are necessary for each of a slot using the precoding matrix W[0], a slot using the precoding matrix W[1], a slot using the precoding matrix W[2], a slot using the precoding matrix W[3] and a slot using the precoding matrix W[4]. This is because, if precoding matrices to be used are biased, data reception quality is greatly influenced by a large number of precoding matrices to be used.

Similarly, out of the above-mentioned 750 slots required to transmit 6000 bits, which is the number of bits constituting one coding (encoded) block, when the modulation scheme is 16QAM, 150 slots are necessary for each of the slot using the precoding matrix W[0], the slot using the precoding matrix W[1], the slot using the precoding matrix W[2], the slot using the precoding matrix W[3] and the slot using the precoding matrix W[4].

Similarly, out of the above-mentioned 500 slots required to transmit 6000 bits, which is the number of bits constituting one coding (encoded) block, when the modulation scheme is 64QAM, 100 slots are necessary for each of the slot using the precoding matrix W[0], the slot using the precoding matrix W[1], the slot using the precoding matrix W[2], the slot using the precoding matrix W[3] and the slot using the precoding matrix W[4].

As described above, the precoding matrices in the scheme of regularly hopping between precoding matrices with an N-slot period (cycle) are represented as W[0], W[1], W[2], . . . , W[N−2], W[N−1].

Note that W[0], W[1], W[2], . . . , W[N−2], W[N−1] are composed of at least two or more different precoding matrices (the same precoding matrices may be included in W[0], W[1], W[2], . . . , W[N−2], W[N−1]). When all the bits constituting one coding (encoded) block are transmitted, letting the number of slots using the precoding matrix W[0] be $K_0$, letting the number of slots using the precoding matrix W[1] be $K_1$, letting the number of slots using the precoding matrix W[i] be $K_i$ (i=0, 1, 2, . . . , N−1), and letting the number of slots using the precoding matrix W[N−1] be $K_{N-1}$, the following condition should be satisfied.

Condition #131

$K_0=K_1= \ldots =K_i= \ldots =K_{N-1}$, i.e., $K_a=K_b$ for ∀a, ∀b (a, b=0, 1, 2, . . . , N−1 (a, b are integers from 0 to N−1); a≠b)

When the communication system supports a plurality of modulation schemes, and a modulation scheme is selected and used from among the supported modulation schemes, Condition #94 should be satisfied.

When the plurality of modulation schemes are supported, however, since the number of bits that one symbol can transmit is generally different depending on modulation schemes (in some cases, the number of bits can be the same), there can be a modulation scheme that is not able to satisfy Condition #131. In such a case, instead of satisfying Condition #131, the following condition may be satisfied. Condition #132

The difference between $K_a$ and $K_b$ is 0 or 1, i.e., $|K_a-K_b|$ is 0 or 1 for ∀a, ∀b (a, b=0, 1, 2, . . . , N−1 (a, b are integers from 0 to N−1); a≠b)

FIG. 98 shows a change in the number of symbols and slots required for two coding (encoded) blocks when the block code is used. FIG. 98 shows a change in the number of symbols and slots required for one coding (encoded) block when the block code is used in a case where the two streams s1 and s2 are transmitted and the transmission device has two encoders, as shown in the transmission device in FIG. 3 and the transmission device in FIG. 13 (note that, in this case, either the single carrier transmission or the multi-carrier transmission such as the OFDM may be used as a transmission system).

As shown in FIG. 98, let the number of bits constituting one coding (encoded) block in the block code be 6000 bits. In order to transmit the 6000 bits, 3000 symbols, 1500 symbols and 1000 symbols are necessary when the modulation scheme is QPSK, 16QAM and 64QAM, respectively.

Since two streams are to be simultaneously transmitted in the transmission device shown in FIG. 3 and in the transmission device in FIG. 13, and there are two encoders, different coding (encoded) blocks are to be transmitted. Therefore, when the modulation scheme is QPSK, s1 and s2 transmit two coding (encoded) blocks within the same interval. For example, s1 transmits a first coding (encoded) block, and s2 transmits a second coding (encoded) block. Therefore, 3000 slots are necessary to transmit the first coding (encoded) block and the second coding (encoded) block.

Making the same considerations, 1500 slots are necessary to transmit all the bits constituting two coding (encoded) blocks when the modulation scheme is 16QAM, and 1000 slots are necessary to transmit all the bits constituting 22 blocks when the modulation scheme is 64QAM.

The following describes the relationship between the slots defined above and precoding matrices in the scheme of regularly hopping between precoding matrices.

Here, let the precoding matrices for the scheme of regularly hopping between precoding matrices with a five-slot period (cycle) be W[0], W[1], W[2], W[3], W[4]. Note that at least two or more different precoding matrices may be included in W[0], W[1], W[2], W[3], W[4] (the same precoding matrices may be included in W[0], W[1], W[2], W[3], W[4]). In the weighting combination unit of the transmission device in FIG. 3 and the transmission device in FIG. 13, W[0], W[1], W[2], W[3], W[4] are used (the weighting combination unit selects one precoding matrix from among a plurality of precoding matrices in each slot, and performs precoding).

Out of the above-mentioned 3000 slots required to transmit 6000×2 bits, which is the number of bits constituting two coding (encoded) blocks, when the modulation scheme is QPSK, 600 slots are necessary for each of the slot using the precoding matrix W[0], the slot using the precoding matrix W[1], the slot using the precoding matrix W[2], the slot using the precoding matrix W[3] and the slot using the precoding matrix W[4]. This is because, if precoding matrices to be used are biased, data reception quality is greatly influenced by a large number of precoding matrices to be used.

Also, in order to transmit the first coding (encoded) block, 600 slots are necessary for each of the slot using the precoding matrix W[0], the slot using the precoding matrix W[1], the slot using the precoding matrix W[2], the slot using the precoding matrix W[3] and the slot using the precoding matrix W[4]. In order to transmit the second coding (encoded) block, 600 slots are necessary for each of the slot using the precoding matrix W[0], the slot using the precoding matrix W[1], the slot using the precoding matrix W[2], the slot using the precoding matrix W[3] and the slot using the precoding matrix W[4].

Similarly, out of the above-mentioned 1500 slots required to transmit 6000×2 bits, which is the number of bits constituting two coding (encoded) blocks, when the modulation scheme is 64QAM, 300 slots are necessary for each of the slot using the precoding matrix W[0], the slot using the precoding matrix W[1], the slot using the precoding matrix W[2], the slot using the precoding matrix W[3] and the slot using the precoding matrix W[4].

Also, in order to transmit the first coding (encoded) block, 300 slots are necessary for each of the slot using the precoding matrix W[0], the slot using the precoding matrix W[1], the slot using the precoding matrix W[2], the slot using the precoding matrix W[3] and the slot using the precoding matrix W[4]. In order to transmit the second coding (encoded) block, 300 slots are necessary for each of the slot using the precoding matrix W[0], the slot using the precoding matrix W[1], the slot using the precoding matrix W[2], the slot using the precoding matrix W[3] and the slot using the precoding matrix W[4].

Similarly, out of the above-mentioned 1000 slots required to transmit 6000×2 bits, which is the number of bits constituting two coding (encoded) blocks, when the modulation scheme is 64QAM, 200 slots are necessary for each of the slot using the precoding matrix W[0], the slot using the precoding matrix W[1], the slot using the precoding matrix W[2], the slot using the precoding matrix W[3] and the slot using the precoding matrix W[4].

Also, in order to transmit the first coding (encoded) block, 200 slots are necessary for each of the slot using the precoding matrix W[0], the slot using the precoding matrix W[1], the slot using the precoding matrix W[2], the slot using the precoding matrix W[3] and the slot using the precoding matrix W[4]. In order to transmit the second coding (encoded) block, 200 slots are necessary for each of the slot using the precoding matrix W[0], the slot using the precoding matrix W[1], the slot using the precoding matrix W[2], the slot using the precoding matrix W[3] and the slot using the precoding matrix W[4].

As described above, the precoding matrices in the scheme of regularly hopping between precoding matrices with an N-slot period (cycle) are represented as W[0], W[1], W[2], . . . , W[N−2], W[N−1].

Note that W[0], W[1], W[2], . . . , W[N−2], W[N−1] are composed of at least two or more different precoding matrices (the same precoding matrices may be included in W[0], W[1], W[2], . . . , W[N−2], W[N−1]). When all the bits constituting two coding (encoded) blocks are transmitted, letting the number of slots using the precoding matrix W[0] be $K_0$, letting the number of slots using the precoding matrix W[1] be $K_1$, letting the number of slots using the precoding matrix W[i] be $K_i$ (i=0, 1, 2, . . . , N−1), and letting the number of slots using the precoding matrix W[N−1] be $K_{N-1}$, the following condition should be satisfied.

Condition #133

$K_0=K_1=\ldots=K_i=\ldots=K_{N-1}$, i.e., $K_a=K_b$ for ∀a, ∀b (a, b=0, 1, 2, . . . , N−1 (a, b are integers from 0 to N−1); a≠b)

When all the bits constituting the first coding (encoded) block are transmitted, letting the number of slots using the precoding matrix W[0] be $K_{0,1}$, letting the number of slots using the precoding matrix W[1] be $K_{1,1}$, letting the number of slots using the precoding matrix W[i] be $K_{i,1}$ (i=0, 1, 2, . . . , N−1), and letting the number of slots using the precoding matrix W[N−1] be $K_{N-1,1}$, the following condition should be satisfied.

Condition #134

$K_{0,1}=K_{1,1}=\ldots=K_{i,1}=\ldots=K_{N-1,1}$, i.e., $K_{a,1}=K_{b,1}$ for ∀a, ∀b (a, b=0, 1, 2, . . . , N−1 (a, b are integers from 0 to N−1); a≠b)

When all the bits constituting the second coding (encoded) block are transmitted, letting the number of slots using the precoding matrix W[0] be $K_{0,2}$, letting the number of slots using the precoding matrix W[1] be $K_{1,2}$, letting the number of slots using the precoding matrix W[i] be $K_{i,2}$ (i=0, 1, 2, . . . , N−1), and letting the number of slots using the precoding matrix W[N−1] be $K_{N-1, 2}$, the following condition should be satisfied.

Condition #135

$K_{0,2}=K_{1,2}= \ldots =K_{1,2}= \ldots =K_{N-1,2}$, i.e., $K_{a,2}=K_{b,2}$ for ∀a, ∀b (a, b=0, 1, 2, . . . , N−1 (a, b are integers from 0 to N−1); a≠b)

When the communication system supports a plurality of modulation schemes, and a modulation scheme is selected and used from among the supported modulation schemes, Condition #133, Condition #134 and Condition #135 should be satisfied.

When the plurality of modulation schemes are supported, however, since the number of bits that one symbol can transmit is generally different depending on modulation schemes (in some cases, the number of bits can be the same), there can be a modulation scheme that is not able to satisfy Condition #133, Condition #134 and Condition #135. In such a case, instead of satisfying Condition #133, Condition #134 and Condition #135, the following condition may be satisfied.

Condition #136

The difference between $K_a$ and $K_b$ is 0 or 1, i.e., $|K_a-K_b|$ is 0 or 1 for ∀a, ∀b (a, b=0, 1, 2, . . . , N−1 (a, b are integers from 0 to N−1); a≠b)

Condition #137

The difference between $K_{a,1}$ and $K_{b,1}$ is 0 or 1, i.e., $|K_{a,1}-K_{b,1}|$ is 0 or 1 for ∀a, ∀b (a, b=0, 1, 2, . . . , N−1 (a, b are integers from 0 to N−1); a≠b)

Condition #138

The difference between $K_{a,2}$ and $K_{b,2}$ is 0 or 1, i.e., $|K_{a,2}-K_{b,2}|$ is 0 or 1 for ∀a, ∀b (a, b=0, 1, 2, . . . , N−1 (a, b are integers from 0 to N−1); a≠b)

By associating the coding (encoded) blocks with precoding matrices as described above, precoding matrices used to transmit the coding (encoded) block are unbiased. Therefore, an effect of improving data reception quality in the reception device is obtained.

In the present embodiment, in the scheme of regularly hopping between precoding matrices, N precoding matrices W[0], W[1], W[2], . . . , W[N−2], W[N−1] are prepared for the precoding hopping scheme with an N-slot period (cycle). There is a way to arrange precoding matrices in the order W[0], W[1], W[2], . . . , W[N−2], W[N−1] in frequency domain. The present invention is not, however, limited in this way. As described in Embodiment 1, precoding weights may be changed by arranging N precoding matrices W[0], W[1], W[2], . . . , W[N−2], W[N−1] generated in the present embodiment in time domain and in the frequency-time domain. Note that a precoding hopping scheme with the N-slot period (cycle) has been described, but the same advantageous effect may be obtained by randomly using N different precoding matrices. In other words, the N different precoding matrices do not need to be used in a regular period (cycle). In this case, when the conditions described in the present embodiment are satisfied, the probability that the reception device achieves excellent data reception quality is high.

As described in Embodiment 15, there are modes such as the spatial multiplexing MIMO system, the MIMO system with a fixed precoding matrix, the space-time block coding scheme, the scheme of transmitting one stream and the scheme of regularly hopping between precoding matrices. The transmission device (broadcast station, base station) may select one transmission scheme from among these modes. In this case, from among the spatial multiplexing MIMO system, the MIMO system with a fixed precoding matrix, the space-time block coding scheme, the scheme of transmitting one stream and the scheme of regularly hopping between precoding matrices, a (sub)carrier group selecting the scheme of regularly hopping between precoding matrices may implement the present embodiment.

Supplementary Explanation

In the present description, it is considered that a communication/broadcasting device such as a broadcast station, a base station, an access point, a terminal, a mobile phone, or the like is provided with the transmission device, and that a communication device such as a television, radio, terminal, personal computer, mobile phone, access point, base station, or the like is provided with the reception device. Additionally, it is considered that the transmission device and the reception device in the present invention have a communication function and are capable of being connected via some sort of interface (such as a USB) to a device for executing applications for a television, radio, personal computer, mobile phone, or the like.

Furthermore, in the present embodiment, symbols other than data symbols, such as pilot symbols (preamble, unique word, postamble, reference symbol, and the like), symbols for control information, and the like may be arranged in the frame in any way. While the terms "pilot symbol" and "symbols for control information" have been used here, any term may be used, since the function itself is what is important.

It suffices for a pilot symbol, for example, to be a known symbol modulated with PSK modulation in the transmission and reception devices (or for the reception device to be able to synchronize in order to know the symbol transmitted by the transmission device). The reception device uses this symbol for frequency synchronization, time synchronization, channel estimation (estimation of Channel State Information (CSI) for each modulated signal), detection of signals, and the like.

A symbol for control information is for transmitting information other than data (of applications or the like) that needs to be transmitted to the communication partner for achieving communication (for example, the modulation scheme, error correction coding scheme, coding rate of the error correction coding scheme, setting information in the upper layer, and the like).

Note that the present invention is not limited to the above Embodiments 1-5 and may be embodied with a variety of modifications. For example, the above embodiments describe communication devices, but the present invention is not limited to these devices and may be implemented as software for the corresponding communication scheme.

Furthermore, a precoding hopping scheme used in a scheme of transmitting two modulated signals from two antennas has been described, but the present invention is not limited in this way. The present invention may be also embodied as a precoding hopping scheme for similarly changing precoding weights (matrices) in the context of a scheme whereby four mapped signals are precoded to generate four modulated signals that are transmitted from four antennas, or more generally, whereby N mapped signals are precoded to generate N modulated signals that are transmitted from N antennas.

In the present description, the terms "precoding", "precoding weight", "precoding matrix" and the like are used, but any term may be used (such as "codebook", for example) since the signal processing itself is what is important in the present invention.

Furthermore, in the present description, the reception device has been described as using ML calculation, APP, Max-log APP, ZF, MMSE, or the like, which yields soft decision results (log-likelihood, log-likelihood ratio) or hard decision results ("0" or "1") for each bit of data transmitted by the transmission device. This process may be referred to as detection, demodulation, estimation, or separation.

Assume that precoded baseband signals z1(*i*), z2(*i*) (where i represents the order in terms of time or frequency (carrier)) are generated by precoding baseband signals s1(*i*) and s2(*i*) for two streams while regularly hopping between precoding matrices. Let the in-phase component I and the quadrature component Q of the precoded baseband signal z1(*i*) be $I_1$(i) and $Q_1$(i) respectively, and let the in-phase component I and the quadrature component Q of the precoded baseband signal z2(*i*) be $I_2$(i) and $Q_2$(i) respectively. In this case, the baseband components may be switched, and modulated signals corresponding to the switched baseband signal r1(*i*) and the switched baseband signal r2(*i*) may be transmitted from different antennas at the same time and over the same frequency by transmitting a modulated signal corresponding to the switched baseband signal r1(*i*) from transmit antenna 1 and a modulated signal corresponding to the switched baseband signal r2(*i*) from transmit antenna 2 at the same time and over the same frequency. Baseband components may be switched as follows.

Let the in-phase component and the quadrature component of the switched baseband signal r1(*i*) be $I_1$(i) and $Q_2$(i) respectively, and the in-phase component and the quadrature component of the switched baseband signal r2(*i*) be $I_2$(i) and $Q_1$(i) respectively.

Let the in-phase component and the quadrature component of the switched baseband signal r1(*i*) be $I_1$(i) and $I_2$(i) respectively, and the in-phase component and the quadrature component of the switched baseband signal r2(*i*) be $Q_1$(i) and $Q_2$(i) respectively.

Let the in-phase component and the quadrature component of the switched baseband signal r1(*i*) be $I_2$(i) and $I_1$(i) respectively, and the in-phase component and the quadrature component of the switched baseband signal r2(*i*) be $Q_1$(i) and $Q_2$(i) respectively.

Let the in-phase component and the quadrature component of the switched baseband signal r1(*i*) be $I_1$(i) and $I_2$(i) respectively, and the in-phase component and the quadrature component of the switched baseband signal r2(*i*) be $Q_2$(i) and $Q_1$(i) respectively.

Let the in-phase component and the quadrature component of the switched baseband signal r1(*i*) be $I_2$(i) and $I_1$(i) respectively, and the in-phase component and the quadrature component of the switched baseband signal r2(*i*) be $Q_2$(i) and $Q_1$(i) respectively.

Let the in-phase component and the quadrature component of the switched baseband signal r1(*i*) be $I_1$(i) and $Q_2$(i) respectively, and the in-phase component and the quadrature component of the switched baseband signal r2(*i*) be $Q_1$(i) and $I_2$(i) respectively.

Let the in-phase component and the quadrature component of the switched baseband signal r1(*i*) be $Q_2$(i) and $I_1$(i) respectively, and the in-phase component and the quadrature component of the switched baseband signal r2(*i*) be $I_2$(i) and $Q_1$(i) respectively.

Let the in-phase component and the quadrature component of the switched baseband signal r1(*i*) be $Q_2$(i) and $I_1$(i) respectively, and the in-phase component and the quadrature component of the switched baseband signal r2(*i*) be $Q_1$(i) and $I_2$(i) respectively.

Let the in-phase component and the quadrature component of the switched baseband signal r2(*i*) be $I_1$(i) and $I_2$(i) respectively, and the in-phase component and the quadrature component of the switched baseband signal r1(*i*) be $Q_1$(i) and $Q_2$(i) respectively.

Let the in-phase component and the quadrature component of the switched baseband signal r2(*i*) be $I_2$(i) and $I_1$(i) respectively, and the in-phase component and the quadrature component of the switched baseband signal r1(*i*) be $Q_1$(i) and $Q_2$(i) respectively.

Let the in-phase component and the quadrature component of the switched baseband signal r2(*i*) be $I_1$(i) and $I_2$(i) respectively, and the in-phase component and the quadrature component of the switched baseband signal r1(*i*) be $Q_2$(i) and $Q_1$(i) respectively.

Let the in-phase component and the quadrature component of the switched baseband signal r2(*i*) be $I_2$(i) and $I_1$(i) respectively, and the in-phase component and the quadrature component of the switched baseband signal r1(*i*) be $Q_2$(i) and $Q_1$(i) respectively.

Let the in-phase component and the quadrature component of the switched baseband signal r2(*i*) be $I_1$(i) and $Q_2$(i) respectively, and the in-phase component and the quadrature component of the switched baseband signal r1(*i*) be $I_2$(i) and $Q_1$(i) respectively.

Let the in-phase component and the quadrature component of the switched baseband signal r2(*i*) be $I_1$(i) and $Q_2$(i) respectively, and the in-phase component and the quadrature component of the switched baseband signal r1(*i*) be $Q_1$(i) and $I_2$(i) respectively.

Let the in-phase component and the quadrature component of the switched baseband signal r2(*i*) be $Q_2$(i) and $I_1$(i) respectively, and the in-phase component and the quadrature component of the switched baseband signal r1(*i*) be $I_2$(i) and $Q_1$(i) respectively.

Let the in-phase component and the quadrature component of the switched baseband signal r2(*i*) be $Q_2$(i) and $I_1$(i) respectively, and the in-phase component and the quadrature component of the switched baseband signal r1(*i*) be $Q_1$(i) and $I_2$(i) respectively. In the above description, signals in two streams are precoded, and in-phase components and quadrature components of the precoded signals are switched, but the present invention is not limited in this way. Signals in more than two streams may be precoded, and the in-phase components and quadrature components of the precoded signals may be switched.

In the above-mentioned example, switching between baseband signals at the same time (at the same frequency ((sub)carrier)) has been described, but the present invention is not limited to the switching between baseband signals at the same time. As an example, the following description can be made.

Let the in-phase component and the quadrature component of the switched baseband signal r1(*i*) be $I_1$(i+v) and $Q_2$(i+w) respectively, and the in-phase component and the quadrature component of the switched baseband signal r2(*i*) be $I_2$(i+w) and $Q_1$(i+v) respectively.

Let the in-phase component and the quadrature component of the switched baseband signal r1(*i*) be $I_1$(i+v) and $I_2$(i+w) respectively, and the in-phase component and the quadrature component of the switched baseband signal r2(*i*) be $Q_1$(i+v) and $Q_2$(i+w) respectively.

Let the in-phase component and the quadrature component of the switched baseband signal r1(*i*) be $I_2$(i+w) and $I_1$(i+v) respectively, and the in-phase component and the quadrature component of the switched baseband signal r2(*i*) be $Q_1$(i+v) and $Q_2$(i+w) respectively.

Let the in-phase component and the quadrature component of the switched baseband signal r1(*i*) be $I_1$(i+v) and $I_2$(i+w) respectively, and the in-phase component and the quadrature component of the switched baseband signal r2(*i*) be $Q_2$(i+w) and $Q_1$(i+v) respectively.

Let the in-phase component and the quadrature component of the switched baseband signal r1(*i*) be $I_2$(i+w) and $I_1$(i+v) respectively, and the in-phase component and the quadrature component of the switched baseband signal r2(*i*) be $Q_2$(i+w) and $Q_1$(i+v) respectively.

Let the in-phase component and the quadrature component of the switched baseband signal r1(*i*) be $I_1$(i+v) and $Q_2$(i+w) respectively, and the in-phase component and the quadrature component of the switched baseband signal r2(*i*) be $Q_1$(i+v) and $I_2$(i+w) respectively.

Let the in-phase component and the quadrature component of the switched baseband signal r1(*i*) be $Q_2$(i+w) and $I_1$(i+v) respectively, and the in-phase component and the quadrature component of the switched baseband signal r2(*i*) be $I_2$(i+w) and $Q_1$(i+v) respectively.

Let the in-phase component and the quadrature component of the switched baseband signal r1(*i*) be $Q_2$(i+w) and $I_1$(i+v) respectively, and the in-phase component and the quadrature component of the switched baseband signal r2(*i*) be $Q_1$(i+v) and $I_2$(i+w) respectively.

Let the in-phase component and the quadrature component of the switched baseband signal r2(*i*) be $I_1$(i+v) and $I_2$(i+w) respectively, and the in-phase component and the quadrature component of the switched baseband signal r1(*i*) be $Q_1$(i+v) and $Q_2$(i+w) respectively.

Let the in-phase component and the quadrature component of the switched baseband signal r2(*i*) be $I_2$(i+w) and $I_1$(i+v) respectively, and the in-phase component and the quadrature component of the switched baseband signal r1(*i*) be $Q_1$(i+v) and $Q_2$(i+w) respectively.

Let the in-phase component and the quadrature component of the switched baseband signal r2(*i*) be $I_1$(i+v) and $I_2$(i+w) respectively, and the in-phase component and the quadrature component of the switched baseband signal r1(*i*) be $Q_2$(i+w) and $Q_1$(i+v) respectively.

Let the in-phase component and the quadrature component of the switched baseband signal r2(*i*) be $I_2$(i+w) and $I_1$(i+v) respectively, and the in-phase component and the quadrature component of the switched baseband signal r1(*i*) be $Q_2$(i+w) and $Q_1$(i+v) respectively.

Let the in-phase component and the quadrature component of the switched baseband signal r2(*i*) be $I_1$(i+v) and $Q_2$(i+w) respectively, and the in-phase component and the quadrature component of the switched baseband signal r1(*i*) be $I_2$(i+w) and $Q_1$(i+v) respectively.

Let the in-phase component and the quadrature component of the switched baseband signal r2(*i*) be $I_1$(i+v) and $Q_2$(i+w) respectively, and the in-phase component and the quadrature component of the switched baseband signal r1(*i*) be $Q_1$(i+v) and $I_2$(i+w) respectively.

Let the in-phase component and the quadrature component of the switched baseband signal r2(*i*) be $Q_2$(i+w) and $I_1$(i+v) respectively, and the in-phase component and the quadrature component of the switched baseband signal r1(*i*) be $I_2$(i+w) and $Q_1$(i+v) respectively.

Let the in-phase component and the quadrature component of the switched baseband signal r2(*i*) be $Q_2$(i+w) and $I_1$(i+v) respectively, and the in-phase component and the quadrature component of the switched baseband signal r1(*i*) be $Q_1$(i+v) and $I_2$(i+w) respectively.

Figure 96:
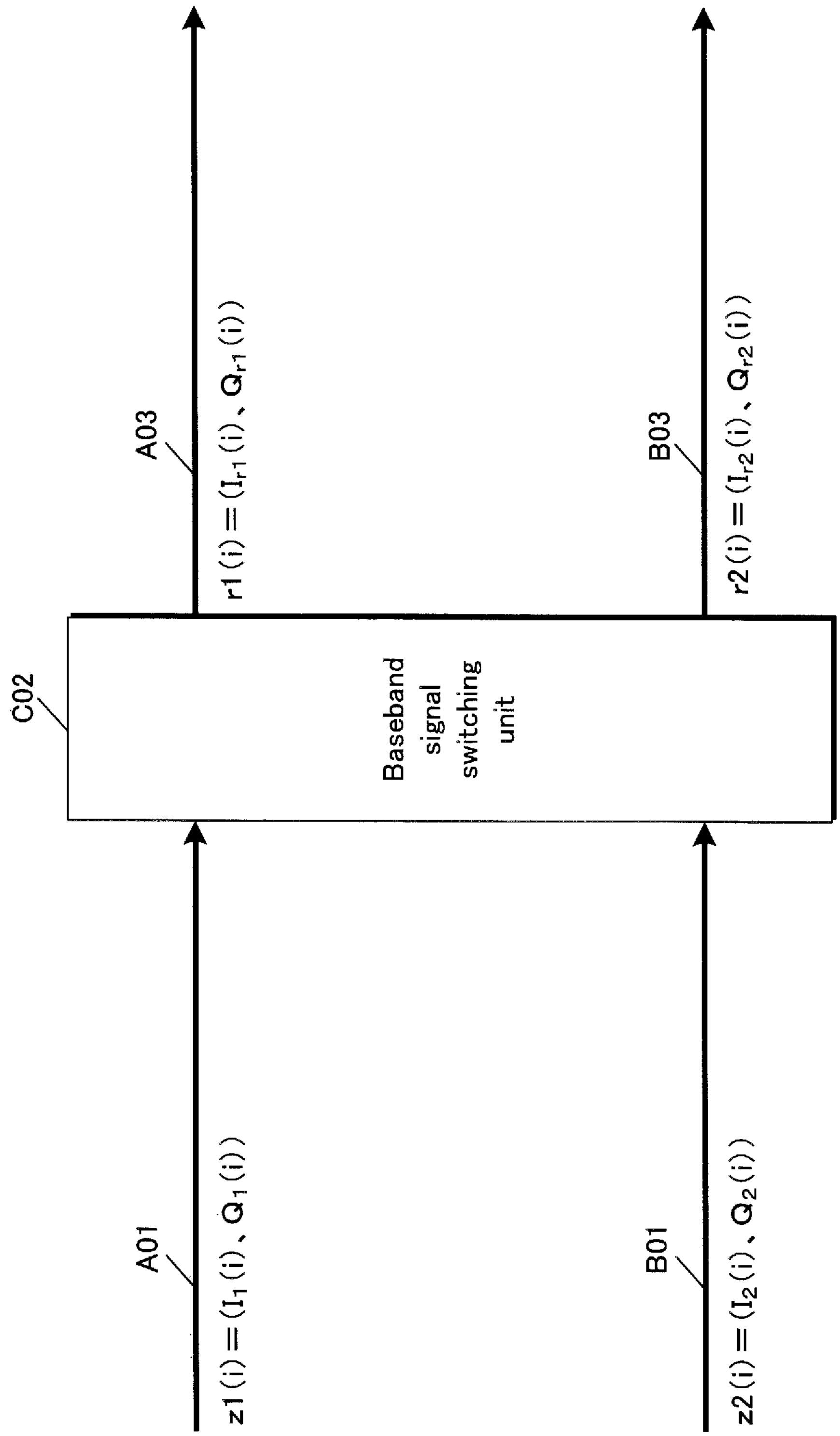
FIG. 96 shows a baseband signal hopping unit.

FIG. 96 explains the above description. As shown in FIG. 96, let the in-phase component I and the quadrature component of the precoded baseband signal z1(*i*) be $I_1$(i) and $Q_1$(i) respectively, and the in-phase component I and the quadrature component of the precoded baseband signal z2(*i*) be $I_2$(i) and $Q_2$(i) respectively. Then, let the in-phase component and the quadrature component of the switched baseband signal r1(*i*) be $I_{r1}$(i) and $Q_{r1}$(i) respectively, and the in-phase component and the quadrature component of the switched baseband signal r2(*i*) be $I_{r2}$(i) and $Q_{r2}$(i) respectively, and the in-phase component $I_{r1}$(i) and the quadrature component $Q_{r1}$(i) of the switched baseband signal r1(*i*) and the in-phase component $I_{r2}$(i) and the quadrature component $Q_{r1}$(i) of the switched baseband signal r2(*i*) are represented by any of the above descriptions. Note that, in this example, switching between precoded baseband signals at the same time (at the same frequency ((sub)carrier)) has been described, but the present invention may be switching between precoded baseband signals at different times (at different frequencies ((sub)carrier)), as described above.

In this case, modulated signals corresponding to the switched baseband signal r1(*i*) and the switched baseband signal r2(*i*) may be transmitted from different antennas at the same time and over the same frequency by transmitting a modulated signal corresponding to the switched baseband signal r1(*i*) from transmit antenna 1 and a modulated signal corresponding to the switched baseband signal r2(*i*) from transmit antenna 2 at the same time and over the same frequency.

Each of the transmit antennas of the transmission device and the receive antennas of the reception device shown in the figures may be formed by a plurality of antennas.

In this description, the symbol "∀" represents the universal quantifier, and the symbol "∃" represents the existential quantifier.

Furthermore, in this description, the units of phase, such as argument, in the complex plane are radians.

When using the complex plane, complex numbers may be shown in polar form by polar coordinates. If a complex number z=a+jb (where a and b are real numbers and j is an imaginary unit) corresponds to a point (a, b) on the complex plane, and this point is represented in polar coordinates as [r, θ], then the following math is satisfied.

$$a = r \times \cos\theta$$

$$b = r \times \sin\theta$$

$$r = \sqrt{a^2 + b^2} \qquad \text{Math 592}$$

r is the absolute value of z (r=|z|), and θ is the argument. Furthermore, z=a+jb is represented as $re^{j\theta}$.

In the description of the present invention, the baseband signal, modulated signal s1, modulated signal s2, modulated signal z1, and modulated signal z2 are complex signals. Complex signals are represented as I+jQ (where j is an imaginary unit), I being the in-phase signal, and Q being the quadrature signal. In this case, I may be zero, or Q may be zero.

Figure 59:
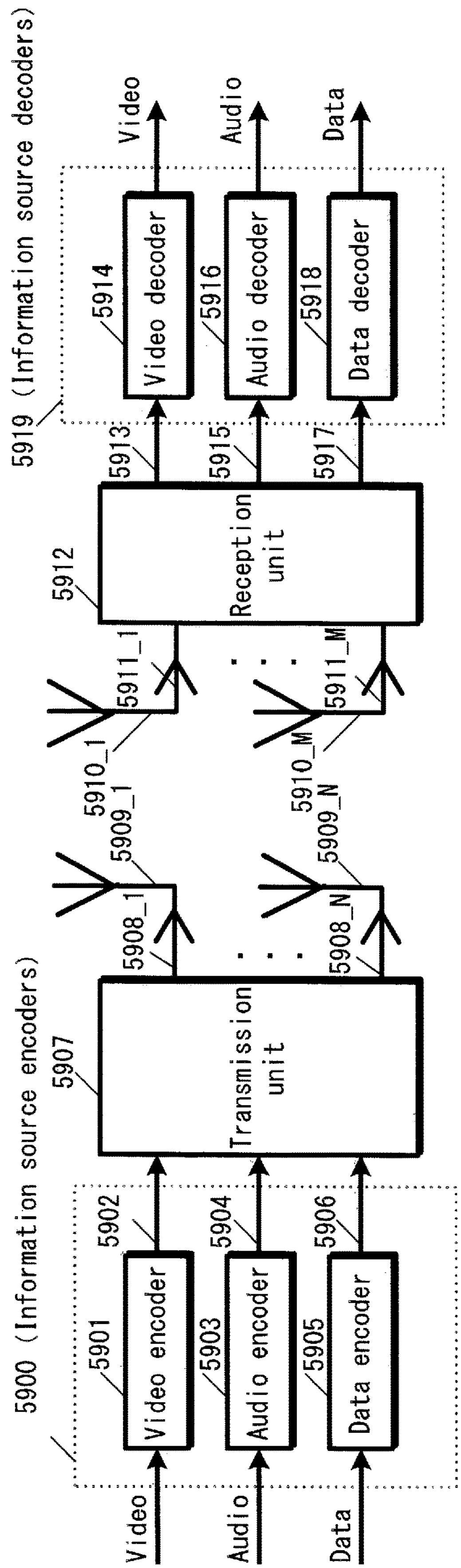
FIG. 59 is an example of a broadcasting system.

FIG. 59 shows an example of a broadcasting system that uses the scheme of regularly hopping between precoding matrices described in this description. In FIG. 59, a video encoder 5901 receives video images as input, encodes the video images, and outputs encoded video images as data 5902. An audio encoder 5903 receives audio as input, encodes the audio, and outputs encoded audio as data 5904.

A data encoder 5905 receives data as input, encodes the data (for example by data compression), and outputs encoded data as data 5906. Together, these encoders are referred to as information source encoders 5900.

A transmission unit 5907 receives, as input, the data 5902 of the encoded video, the data 5904 of the encoded audio, and the data 5906 of the encoded data, sets some or all of these pieces of data as transmission data, and outputs transmission signals 5908_1 through 5908_N after performing processing such as error correction encoding, modulation, and precoding (for example, the signal processing of the transmission device in FIG. 3). The transmission signals 5908_1 through 5908_N are transmitted by antennas 5909_1 through 5909_N as radio waves.

A reception unit 5912 receives, as input, received signals 5911_1 through 5911_M received by antennas 5910_1 through 5910_M, performs processing such as frequency conversion, decoding of precoding, log-likelihood ratio calculation, and error correction decoding (processing by the reception device in FIG. 7, for example), and outputs received data 5913, 5915, and 5917. Information source decoders 5919 receive, as input, the received data 5913, 5915, and 5917. A video decoder 5914 receives, as input, the received data 5913, performs video decoding, and outputs a video signal. Video images are then shown on a television or display monitor. Furthermore, an audio decoder 5916 receives, as input, the received data 5915, performs audio decoding, and outputs an audio signal. Audio is then produced by a speaker. A data encoder 5918 receives, as input, the received data 5917, performs data decoding, and outputs information in the data.

In the above embodiments describing the present invention, the number of encoders in the transmission device when using a multi-carrier transmission scheme such as OFDM may be any number, as described above. Therefore, as in FIG. 4, for example, it is of course possible for the transmission device to have one encoder and to adapt a scheme of distributing output to a multi-carrier transmission scheme such as OFDM. In this case, the wireless units 310A and 310B in FIG. 4 are replaced by the OFDM related processors 1301A and 1301B in FIG. 13. The description of the OFDM related processors is as per Embodiment 1.

The symbol arrangement scheme described in Embodiments A1 through A5 and in Embodiment 1 may be similarly implemented as a precoding scheme for regularly hopping between precoding matrices using a plurality of different precoding matrices, the precoding scheme differing from the "scheme for hopping between different precoding matrices" in the present description. The same holds true for other embodiments as well. The following is a supplementary explanation regarding a plurality of different precoding matrices.

Let N precoding matrices be represented as F[0], F[1], F[2], . . . , F[N−3], F[N−2], F[N−1] for a precoding scheme for regularly hopping between precoding matrices. In this case, the "plurality of different precoding matrices" referred to above are assumed to satisfy the following two conditions (Condition *1 and Condition *2).

Math 593

$$F[x]\neq F[y] \qquad \text{Condition *1}$$

for ∀x, ∀y (x,y=0, 1, 2, . . . , N−3, N−2, N−1; x≠y)

Here, x is an integer from 0 to N−1, y is an integer from 0 to N−1 and x≠y. With respect to all x and all y satisfying the above, the relationship F[x]≠F[y] holds.

Math 594

$$F[x]=k\times F[y] \qquad \text{Condition *2}$$

Letting x be an integer from 0 to N−1, y be an integer from 0 to N−1, and x≠y, for all x and all y, no real or complex number k satisfying the above equation exists.

The following is a supplementary explanation using a 2×2 matrix as an example. Let 2×2 matrices R and S be represented as follows:

$$R=\begin{pmatrix} a & b \\ c & d \end{pmatrix} \qquad \text{Math 595}$$

$$S=\begin{pmatrix} e & f \\ g & h \end{pmatrix} \qquad \text{Math 596}$$

Let $a=Ae^{j\delta_{11}}$, $b=Be^{j\delta_{12}}$, $c=Ce^{j\delta_{21}}$ and $d=De^{j\delta_{22}}$, and $e=Ee^{j\gamma_{11}}$, $f=Fe^{j\gamma_{12}}$, $g=Ge^{j\gamma_{21}}$ and $h=He^{j\gamma_{22}}$. A, B, C, D, E, F, G, and H are real numbers 0 or greater, and $\delta_{11}$, $\delta_{12}$, $\delta_{21}$, $\delta_{22}$, $\gamma_{11}$, $\gamma_{12}$, $\gamma_{21}$, and $\gamma_{22}$ are expressed in radians. In this case, R≠S means that at least one of the following holds: (1) a≠e, (2) b≠f, (3) c≠g and (4) d≠h.

A precoding matrix may be the matrix R wherein one of a, b, c, and d is zero. In other words, the precoding matrix may be such that (1) a is zero, and b, c, and d are not zero; (2) b is zero, and a, c, and d are not zero; (3) c is zero, and a, b, and d are not zero; or (4) d is zero, and a, b, and c are not zero.

In the system example in the description of the present invention, a communication system using a MIMO scheme was described, wherein two modulated signals are transmitted from two antennas and are received by two antennas. The present invention may, however, of course also be adopted in a communication system using a MISO (Multiple Input Single Output) scheme. In the case of the MISO scheme, adoption of a precoding scheme for regularly hopping between a plurality of precoding matrices in the transmission device is the same as described above. On the other hand, the reception device is not provided with the antenna 701_Y, the wireless unit 703_Y, the channel fluctuation estimating unit 707_1 for the modulated signal z1, or the channel fluctuation estimating unit 707_2 for the modulated signal z2 in the structure shown in FIG. 7. In this case as well, however, the processing detailed in the present description may be performed to estimate data transmitted by the transmission device. Note that it is widely known that a plurality of signals transmitted at the same frequency and the same time can be received by one antenna and decoded (for one antenna reception, it suffices to perform calculation such as ML calculation (Max-log APP or the like)). In the present invention, it suffices for the signal processing unit 711 in FIG. 7 to perform demodulation (detection) taking into consideration the precoding scheme for regularly hopping that is used at the transmitting end.

Programs for executing the above communication scheme may, for example, be stored in advance in ROM (Read Only Memory) and be caused to operate by a CPU (Central Processing Unit).

Furthermore, the programs for executing the above communication scheme may be stored in a computer-readable recording medium, the programs stored in the recording medium may be loaded in the RAM (Random Access Memory) of the computer, and the computer may be caused to operate in accordance with the programs.

The components in the above embodiments and the like may be typically assembled as an LSI (Large Scale Integration), a type of integrated circuit. Individual components may respectively be made into discrete chips, or part or all of the components in each embodiment may be made into one chip. While an LSI has been referred to, the terms IC (Integrated Circuit), system LSI, super LSI, or ultra LSI may be used depending on the degree of integration. Furthermore, the scheme for assembling integrated circuits is not limited to LSI, and α dedicated circuit or a general-purpose processor may be used. A FPGA (Field Programmable Gate Array), which is programmable after the LSI is manufactured, or a reconfigurable processor, which allows reconfiguration of the connections and settings of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

With the symbol arranging scheme described in Embodiments A1 through A5 and Embodiment 1, the present invention may be similarly implemented by replacing the "scheme of hopping between different precoding matrices" with a "scheme of regularly hopping between precoding matrices using a plurality of different precoding matrices". Note that the "plurality of different precoding matrices" are as described above.

The above describes that "with the symbol arranging scheme described in Embodiments A1 through A5 and Embodiment 1, the present invention may be similarly implemented by replacing the "scheme of hopping between different precoding matrices" with a "scheme of regularly hopping between precoding matrices using a plurality of different precoding matrices". As the "scheme of hopping between precoding matrices using a plurality of different precoding matrices", a scheme of preparing N different precoding matrices described above, and hopping between precoding matrices using the N different precoding matrices with an H-slot period (cycle) (H being a natural number larger than N) may be used (as an example, there is a scheme described in Embodiment C2).

With the symbol arranging scheme described in Embodiment 1, the present invention may be similarly implemented using the precoding scheme of regularly hopping between precoding matrices described in Embodiments C1 through C5. Similarly, the present invention may be similarly implemented using the precoding scheme of regularly hopping between precoding matrices described in Embodiments C1 through C5 as the precoding scheme of regularly hopping between precoding matrices described in Embodiments A1 through A5.

Embodiment D1

The following describes the scheme of regularly hopping between precoding matrices described in Non-Patent Literatures 12 through 15 when using a Quasi-Cyclic Low-Density Parity-Check (QC-LDPC) code (or an LDPC code other than a QC-LDPC code), a concatenated code consisting of an LDPC code and a Bose-Chaudhuri-Hocquenghem (BCH) code, and a block code such as a turbo code or a duo-binary turbo code using tail-biting. Note that the present embodiment may be implemented using either a scheme of regularly hopping between precoding matrices represented by complex numbers or a scheme of regularly hopping between precoding matrices represented by real numbers, which is described below, as the scheme of regularly hopping between precoding matrices.

The following describes a case of transmitting two streams s1 and s2 as an example. Note that, when the control information and the like are not required to perform encoding using the block code, the number of bits constituting the coding (encoded) block is the same as the number of bits constituting the block code (however, the control information and the like described below may be included). When the control information and the like (e.g. CRC (cyclic redundancy check), a transmission parameter) are required to perform encoding using the block code, the number of bits constituting the coding (encoded) block can be a sum of the number of bits constituting the block code and the number of bits of the control information and the like.

FIG. 97 shows a change in the number of symbols and slots required for one coding (encoded) block when the block code is used. FIG. 97 shows a change in the number of symbols and slots required for one coding (encoded) block when the block code is used in a case where the two streams s1 and s2 are transmitted and the transmission device has a single encoder, as shown in the transmission device in FIG. 4 (note that, in this case, either the single carrier transmission or the multi-carrier transmission such as the OFDM may be used as a transmission system).

As shown in FIG. 97, let the number of bits constituting one coding (encoded) block in the block code be 6000 bits. In order to transmit the 6000 bits, 3000 symbols, 1500 symbols and 1000 symbols are necessary when the modulation scheme is QPSK, 16QAM and 64QAM, respectively.

Since two streams are to be simultaneously transmitted in the transmission device shown in FIG. 4, when the modulation scheme is QPSK, 1500 symbols are allocated to s1 and remaining 1500 symbols are allocated to s2 out of the above-mentioned 3000 symbols. Therefore, 1500 slots (referred to as slots) are necessary to transmit 1500 symbols by s1 and transmit 1500 symbols by s2.

Making the same considerations, 750 slots are necessary to transmit all the bits constituting one coding (encoded) block when the modulation scheme is 16QAM, and 500 slots are necessary to transmit all the bits constituting one block when the modulation scheme is 64QAM.

The present embodiment describes a scheme of initializing precoding matrices in a case where the transmission device in FIG. 4 is compatible with the multi-carrier scheme, such as the OFDM scheme, when the precoding scheme of regularly hopping between precoding matrices described in this description is used.

Figures 99A, 99B:
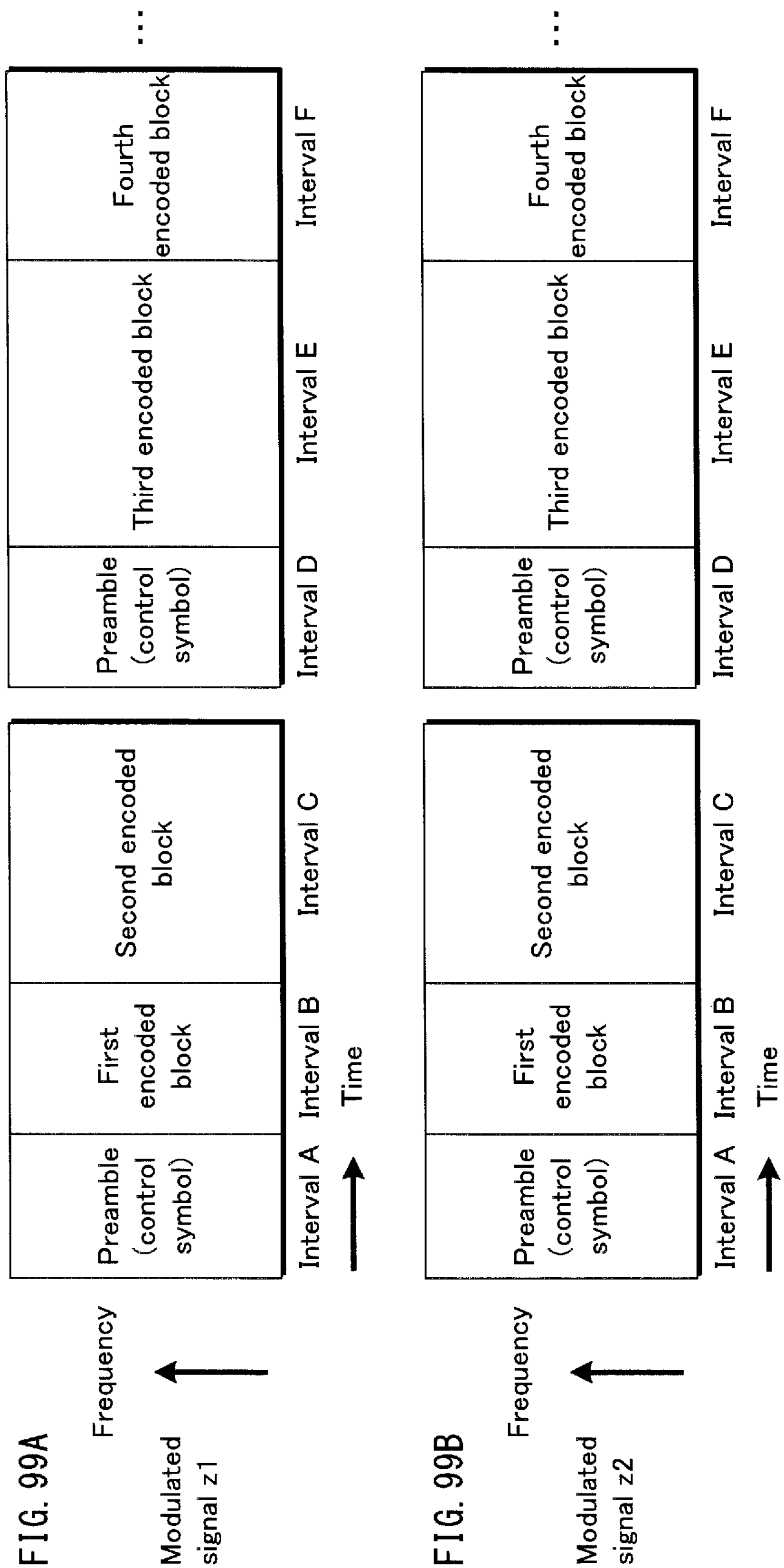
FIGS. 99A and 99B each show a structure of a frame structure.

Next, a case where the transmission device transmits modulated signals each having a frame structure shown in FIGS. 99A and 99B is considered. FIG. 99A shows a frame structure in the time and frequency domain for a modulated signal z1 (transmitted by the antenna 312A). FIG. 99B shows a frame structure in the time and frequency domain for a modulated signal z2 (transmitted by the antenna 312B). In this case, the modulated signal z1 and the modulated signal z2 are assumed to occupy the same frequency (bandwidth), and the modulated signal z1 and the modulated signal z2 are assumed to exist at the same time.

As shown in FIG. 99A, the transmission device transmits a preamble (control symbol) in an interval A. The preamble is a symbol for transmitting control information to the communication partner and is assumed to include information on the modulation scheme for transmitting the first coding (encoded) block and the second coding (encoded) block. The transmission device is to transmit the first coding (encoded) block in an interval B. The transmission device is to transmit the second coding (encoded) block in an interval C.

The transmission device transmits the preamble (control symbol) in an interval D. The preamble is a symbol for transmitting control information to the communication partner and is assumed to include information on the modulation scheme for transmitting the third coding (encoded) block, the fourth coding (encoded) block and so on. The transmission device is to transmit the third coding (encoded) block in an interval E. The transmission device is to transmit the fourth coding (encoded) block in an interval F.

As shown in FIG. 99B, the transmission device transmits a preamble (control symbol) in the interval A. The preamble is a symbol for transmitting control information to the communication partner and is assumed to include information on the modulation scheme for transmitting the first coding (encoded) block and the second coding (encoded) block. The transmission device is to transmit the first coding (encoded) block in the interval B. The transmission device is to transmit the second coding (encoded) block in the interval C.

The transmission device transmits the preamble (control symbol) in the interval D. The preamble is a symbol for transmitting control information to the communication partner and is assumed to include information on the modulation scheme for transmitting the third coding (encoded) block, the fourth coding (encoded) block and so on. The transmission device is to transmit the third coding (encoded) block in the interval E. The transmission device is to transmit the fourth coding (encoded) block in the interval F.

Figure 100:
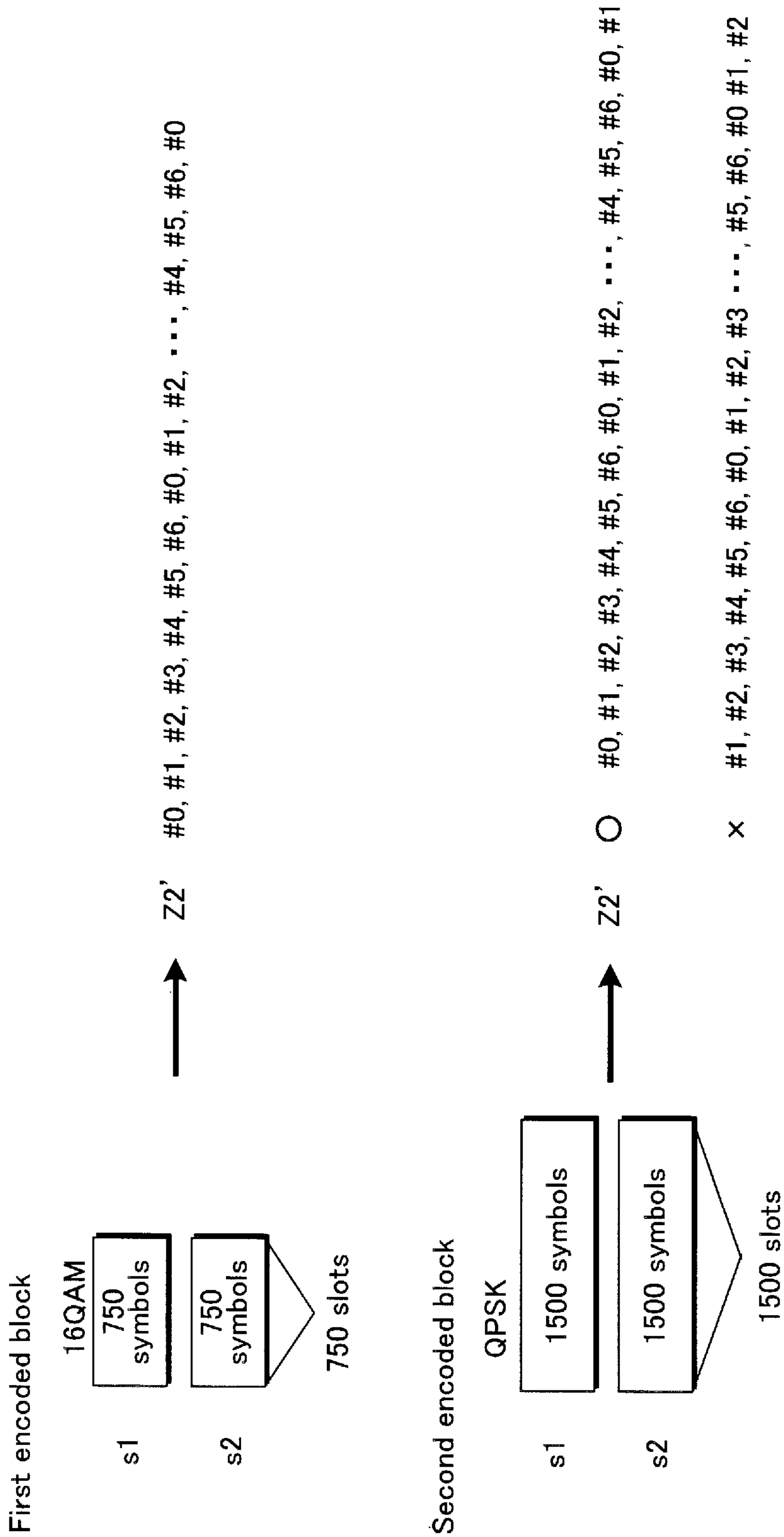
FIG. 100 shows the number of slots.

FIG. 100 shows the number of slots used when the coding (encoded) blocks are transmitted as shown in FIG. 97, and, in particular, when 16QAM is used as the modulation scheme in the first coding (encoded) block. In order to transmit first coding (encoded) block, 750 slots are necessary.

Similarly, FIG. 100 shows the number of slots used when QPSK is used as the modulation scheme in the second coding (encoded) block. In order to transmit first coding (encoded) block, 1500 slots are necessary.

Figure 101:
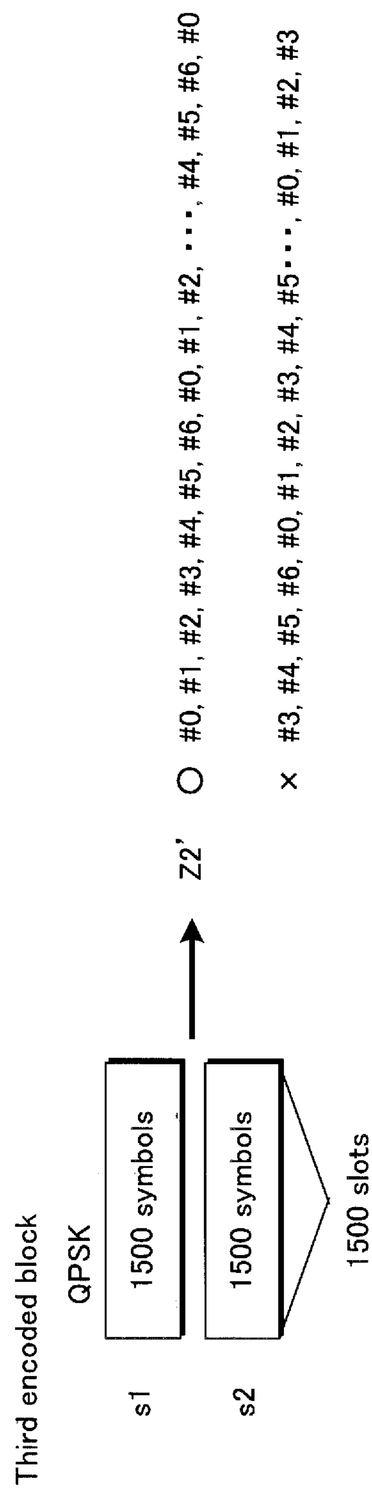
FIG. 101 shows the number of shots.

FIG. 101 shows the number of slots used when the coding (encoded) block is transmitted as shown in FIG. 97, and, in particular, when QPSK is used as the modulation scheme in the third coding (encoded) block. In order to transmit third coding (encoded) block, 1500 slots are necessary.

As described in this description, a case where phase shift is not performed for the modulated signal z1, i.e. the modulated signal transmitted by the antenna 312A, and is performed for the modulated signal z2, i.e. the modulated signal transmitted by the antenna 312B, is considered. In this case, FIGS. 100 and 101 show the scheme of regularly hopping between precoding matrices.

First, assume that seven precoding matrices are prepared to regularly hop between the precoding matrices, and are referred to as #0, #1, #2, #3, #4, #5 and #6. The precoding matrices are to be regularly and cyclically used. That is to say, the precoding matrices are to be regularly and cyclically changed in the order #0, #1, #2, #3, #4, #5, #6, #0, #1, #2, #3, #4, #5, #6, #0, #1, #2, #3, #4, #5, #6, . . . .

First, as shown in FIG. 100, 750 slots exist in the first coding (encoded) block. Therefore, starting from #0, the precoding matrices are arranged in the order #0, #1, #2, #3, #4, #5, #6, #0, #1, #2, . . . , #4, #5, #6, #0, and end using #0 for the $750^{th}$ slot.

Next, the precoding matrices are to be applied to each slot in the second coding (encoded) block. Since this description is on the assumption that the precoding matrices are applied to the multicast communication and broadcast, one possibility is that a reception terminal does not need the first coding (encoded) block and extracts only the second coding (encoded) block. In such a case, even when precoding matrix #0 is used to transmit the last slot in the first coding (encoded) block, the precoding matrix #1 is used first to transmit the second coding (encoded) block. In this case, the following two schemes are considered:

(a) The above-mentioned terminal monitors how the first coding (encoded) block is transmitted, i.e. the terminal monitors a pattern of the precoding matrix used to transmit the last slot in the first coding (encoded) block, and estimates the precoding matrix to be used to transmit the first slot in the second coding (encoded) block; and (b) The transmission device transmits information on the precoding matrix used to transmit the first slot in the second coding (encoded) block without performing (a).

In the case of (a), since the terminal has to monitor transmission of the first coding (encoded) block, power consumption increases. In the case of (b), transmission efficiency of data is reduced.

Therefore, there is room for improvement in allocation of precoding matrices as described above. In order to address the above-mentioned problems, a scheme of fixing the precoding matrix used to transmit the first slot in each coding (encoded) block is proposed. Therefore, as shown in FIG. 100, the precoding matrix used to transmit the first slot in the second coding (encoded) block is set to #0 as with the precoding matrix used to transmit the first slot in the first coding (encoded) block.

Similarly, as shown in FIG. 101, the precoding matrix used to transmit the first slot in the third coding (encoded) block is set not to #3 but to #0 as with the precoding matrix used to transmit the first slot in the first coding (encoded) block and in the second coding (encoded) block.

With the above-mentioned scheme, an effect of suppressing the problems occurring in (a) and (b) is obtained.

Note that, in the present embodiment, the scheme of initializing the precoding matrices in each coding (encoded) block, i.e. the scheme in which the precoding matrix used to transmit the first slot in each coding (encoded) block is fixed to #0, is described. As a different scheme, however, the precoding matrices may be initialized in units of frames. For example, in the symbol for transmitting the preamble and information after transmission of the control symbol, the precoding matrix used in the first slot may be fixed to #0.

For example, in FIG. 99, a frame is interpreted as starting from the preamble, the first coding (encoded) block in the first frame is first coding (encoded) block, and the first coding (encoded) block in the second frame is the third coding (encoded) block. This exemplifies a case where "the precoding matrix used in the first slot may be fixed (to #0) in units of frames" as described above using FIGS. 100 and 101.

The following describes a case where the above-mentioned scheme is applied to a broadcasting system that uses the DVB-T2 standard. The frame structure of the broadcasting system that uses the DVB-T2 standard is as described in Embodiments A1 through A3. As described in Embodiments A1 through A3 using FIGS. 61 and 70, by the P1 symbol, P2 symbol and control symbol group, information on transmission scheme of each PLP (for example, a transmission scheme of transmitting a single modulated signal, a transmission scheme using space-time block coding and a transmission scheme of regularly hopping between precoding matrices) and a modulation scheme being used is transmitted to a terminal. In this case, if the terminal extracts only PLP that is necessary as information to perform demodulation (including separation of signals and signal detection) and error correction decoding, power consumption of the terminal is reduced. Therefore, as described using FIGS. 99 through 101, the scheme in which the precoding matrix used in the first slot in the PLP transmitted using, as the transmission scheme, the precoding scheme of regularly hopping between precoding matrices is fixed (to #0) is proposed.

For example, assume that the broadcast station transmits each symbol having the frame structure as shown in FIGS. 61 and 70. In this case, as an example, FIG. 102 shows a frame structure in frequency-time domain when the broadcast station transmits PLP $1 (to avoid confusion, #1 is replaced by $1) and PLP $K using the precoding scheme of regularly hopping between precoding matrices.

Note that, in the following description, as an example, assume that seven precoding matrices are prepared in the precoding scheme of regularly hopping between the precoding matrices, and are referred to as #0, #1, #2, #3, #4, #5 and #6. The precoding matrices are to be regularly and cyclically used. That is to say, the precoding matrices are to be regularly and cyclically changed in the order #0, #1, #2, #3, #4, #5, #6, #0, #1, #2, #3, #4, #5, #6, #0, #1, #2, #3, #4, #5, #6, . . . .

Figure 102:
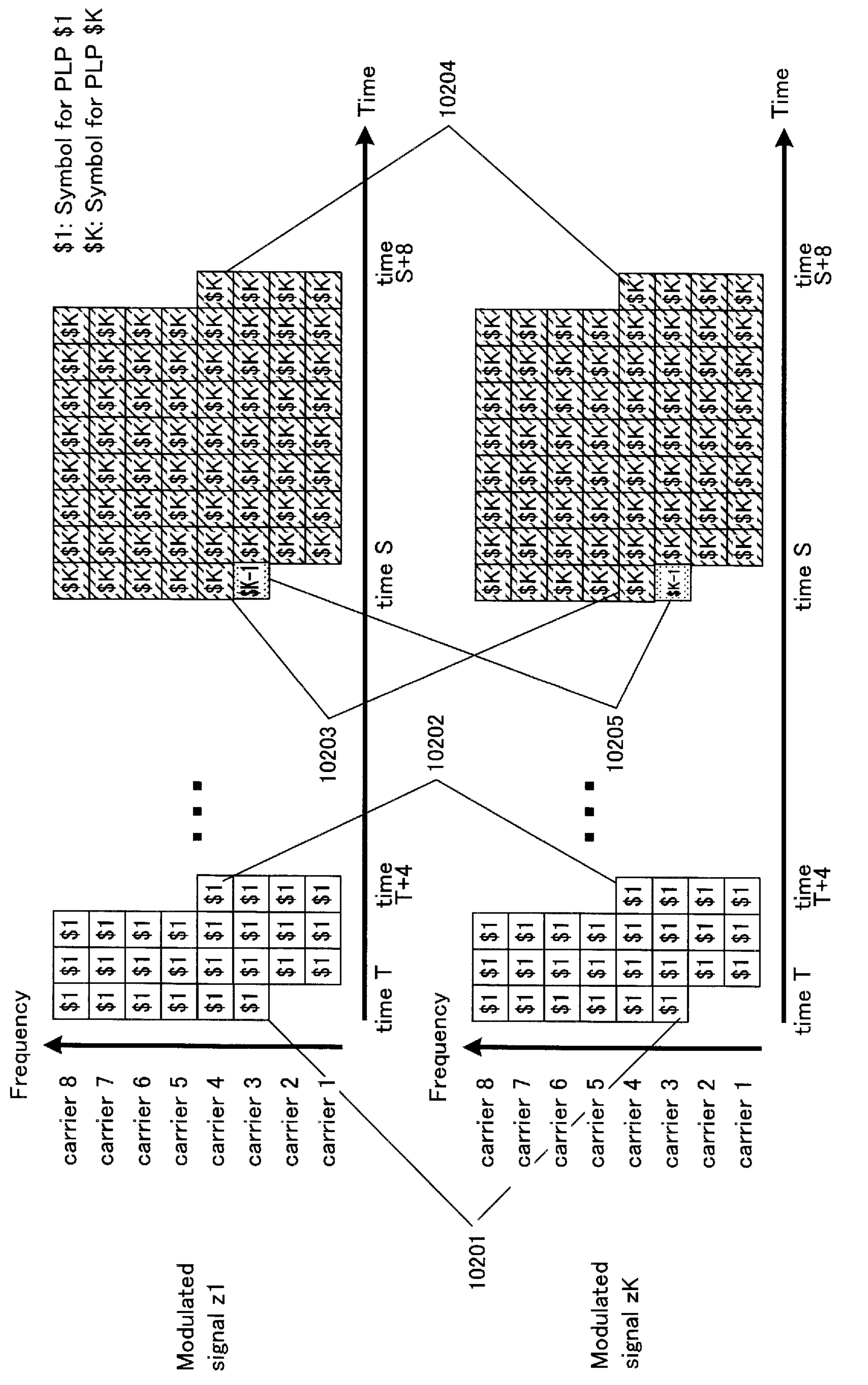
FIG. 102 shows a PLP in the time and frequency domain.

As shown in FIG. 102, the slot (symbol) in PLP $1 starts with a time T and a carrier 3 (10201 in FIG. 102) and ends with a time T+4 and a carrier 4 (10202 in FIG. 102) (see FIG. 102).

This is to say, in PLP $1, the first slot is the time T and the carrier 3, the second slot is the time T and the carrier 4, the third slot is the time T and a carrier 5, . . . , the seventh slot is a time T+1 and a carrier 1, the eighth slot is the time T+1 and a carrier 2, the ninth slot is the time T+1 and the carrier 3, . . . , the fourteenth slot is the time T+1 and a carrier 8, the fifteenth slot is a time T+2 and a carrier 0, . . . .

The slot (symbol) in PLP $K starts with a time S and a carrier 4 (10203 in FIG. 102) and ends with a time S+8 and the carrier 4 (10204 in FIG. 102) (see FIG. 102).

This is to say, in PLP $K, the first slot is the time S and the carrier 4, the second slot is the time S and a carrier 5, the third slot is the time S and a carrier 6, . . . , the fifth slot is the time S and a carrier 8, the ninth slot is a time S+1 and a carrier 1, the tenth slot is the time S+1 and a carrier 2 . . . , the sixteenth slot is the time S+1 and the carrier 8, the seventeenth slot is a time S+2 and a carrier 0, . . . .

Note that information on slot that includes information on the first slot (symbol) and the last slot (symbol) in each PLP and is used by each PLP is transmitted by the control symbol including the P1 symbol, the P2 symbol and the control symbol group.

In this case, as described using FIGS. 99 through 101, the first slot in PLP $1, which is the time T and the carrier 3 (10201 in FIG. 102), is precoded using the precoding matrix #0. Similarly, the first slot in PLP $K, which is the time S and the carrier 4 (10203 in FIG. 102), is precoded using the precoding matrix #0 regardless of the number of the precoding matrix used in the last slot in PLP $K−1, which is the time S and the carrier 3 (10205 in FIG. 102).

The first slot in another PLP transmitted using the precoding scheme of regularly hopping between the precoding matrices is also precoded using the precoding matrix #0.

With the above-mentioned scheme, an effect of suppressing the above problems occurring in (a) and (b) is obtained.

Naturally, the reception device extracts necessary PLP from the information on slot that is included in the control symbol including the P1 symbol, the P2 symbol and the control symbol group and is used by each PLP to perform demodulation (including separation of signals and signal detection) and error correction decoding. The reception device learns a rule of the precoding scheme of regularly hopping between the precoding matrices in advance (when there are a plurality of rules, the transmission device transmits information on the rule to be used, and the reception device learns the rule being used by obtaining the transmitted information). By synchronizing a timing of rules of hopping the precoding matrices based on the number of the first slot in each PLP, the reception device can perform demodulation of information symbols (including separation of signals and signal detection).

Figure 103:
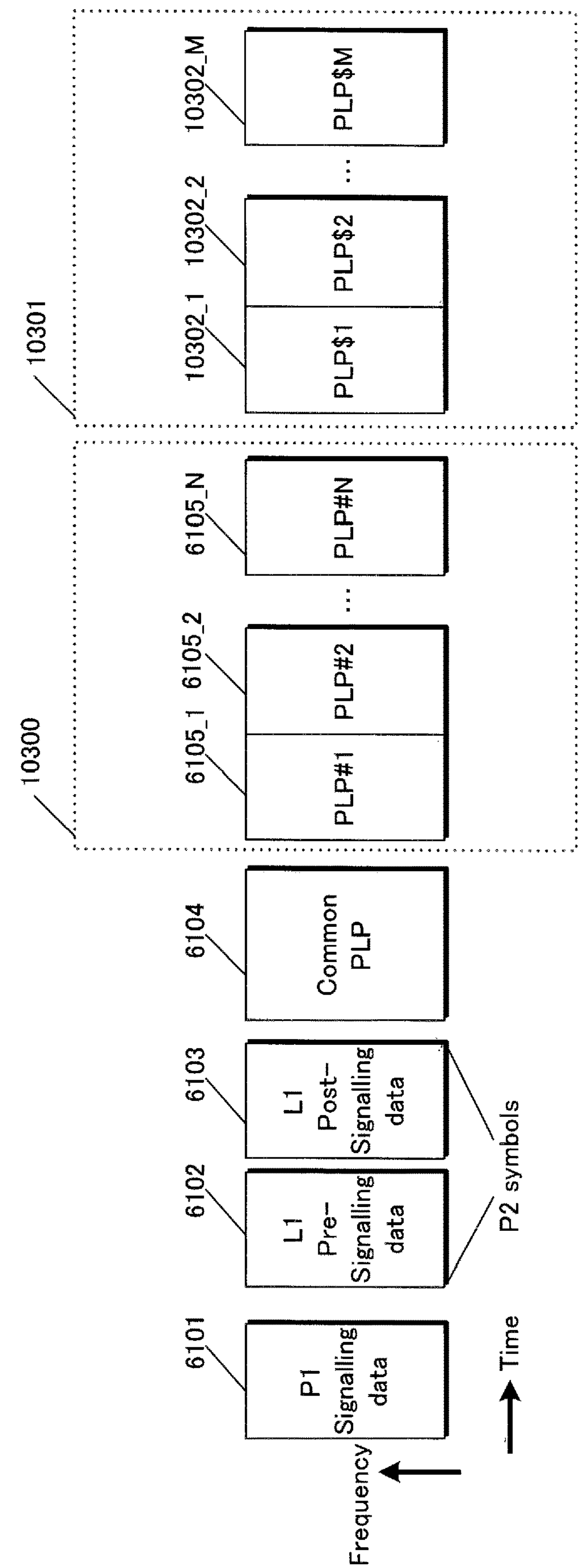
FIG. 103 shows a structure of the PLP.

Next, a case where the broadcast station (base station) transmits a modulated signal having a frame structure shown in FIG. 103 is considered (the frame composed of symbol groups shown in FIG. 103 is referred to as a main frame). In FIG. 103, elements that operate in a similar way to FIG. 61 bear the same reference signs. The characteristic feature is that the main frame is separated into a subframe for transmitting a single modulated signal and a subframe for transmitting a plurality of modulated signals so that gain control of received signals can easily be performed. Note that the expression "transmitting a single modulated signal" also indicates that a plurality of modulated signals that are the same as the single modulated signal transmitted from a single antenna are generated, and the generated signals are transmitted from respective antennas.

In FIG. 103, PLP #1 (6105_1) through PLP #N (6105_N) constitute a subframe 10300 for transmitting a single modulated signal. The subframe 10300 is composed only of PLPs, and does not include PLP for transmitting a plurality of modulated signals. Also, PLP $1 (10302_1) through PLP $M (10302_M) constitute a subframe 10301 for transmitting a plurality of modulated signals. The subframe 10301 is composed only of PLPs, and does not include PLP for transmitting a single modulated signal.

In this case, as described above, when the above-mentioned precoding scheme of regularly hopping between precoding matrices is used in the subframe 10301, the first slot in PLP (PLP $1 (10302_1) through PLP $M (10302_M)) is assumed to be precoded using the precoding matrix #0 (referred to as initialization of the precoding matrices). The above-mentioned initialization of precoding matrices, however, is irrelevant to a PLP in which another transmission scheme, for example, one of the transmission scheme using a fixed precoding matrix, the transmission scheme using a spatial multiplexing MIMO system and the transmission scheme using the space-time block coding as described in Embodiments A1 through A3 is used in PLP $1 (10302_1) through PLP $M (10302_M).

Figure 104:
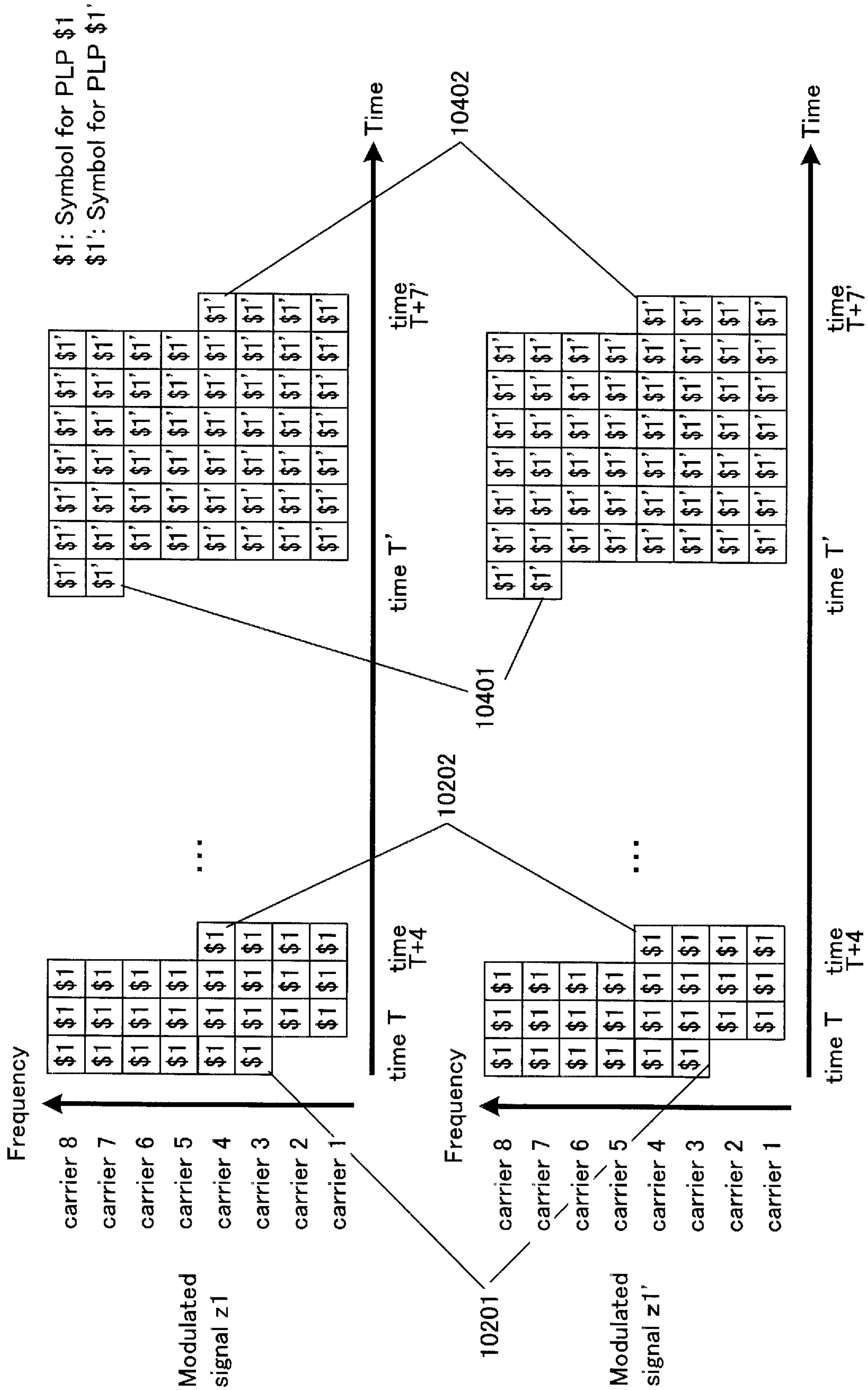
FIG. 104 shows a PLP in the time and frequency domain.

As shown in FIG. 104, PLP $1 is assumed to be the first PLP in the subframe for transmitting a plurality of modulated signals in the $X^{th}$ main frame. Also, PLP $1' is assumed to be the first PLP in the subframe for transmitting a plurality of modulated signals in the $Y^{th}$ main frame. Both PLP $1 and PLP $1' are assumed to use the precoding scheme of regularly hopping between precoding matrices. Note that, in FIG. 104, elements that are similar to the elements shown in FIG. 102 bear the same reference signs.

In this case, the first slot (10201 in FIG. 104 (time T and carrier 3)) in PLP $1, which is the first PLP in the subframe for transmitting a plurality of modulated signals in the $X^{th}$ main frame, is assumed to be precoded using the precoding matrix #0.

Similarly, the first slot (10401 in FIG. 104 (time T' and carrier 7)) in PLP $1', which is the first PLP in the subframe for transmitting a plurality of modulated signals in the $Y^{th}$ main frame, is assumed to be precoded using the precoding matrix #0.

As described above, in each main frame, the first slot in the first PLP in the subframe for transmitting a plurality of modulated signals is characterized by being precoded using the precoding matrix #0.

This is also important to suppress the above-mentioned problems occurring in (a) and (b).

Note that, in the present embodiment, as shown in FIG. 97, a case where the two streams s1 and s2 are transmitted and the transmission device has a single encoder as shown in the transmission device in FIG. 4 is taken as an example. The initialization of precoding matrices described in the present embodiment, however, is also applicable to a case where the two streams s1 and s2 are transmitted and the transmission device has two single encoders as shown in the transmission device in FIG. 3, as shown in FIG. 98.

Supplementary Explanation 2

In each of the above-mentioned embodiments, the precoding matrices that the weighting combination unit uses for precoding are represented by complex numbers. The precoding matrices may also be represented by real numbers (referred to as a precoding scheme represented by real numbers).

For example, let two mapped baseband signals (in the used modulation scheme) be s1($i$) and s2($i$) (where i represents time or frequency), and let two precoded baseband signals obtained by the precoding be z1($i$) and z2($i$). Then, let the in-phase component and the quadrature component of the mapped baseband signal s1($i$) (in the used modulation scheme) be $I_{s1}$(i) and $Q_{s1}$(i) respectively, the in-phase component and the quadrature component of the mapped baseband signal s2($i$) (in the used modulation scheme) be $I_{s2}$(i) and $Q_{s2}$(i) respectively, the in-phase component and the quadrature component of the precoded baseband signal z1($i$) be $I_{z1}$(i) and $Q_{z1}$(i) respectively, and in-phase component and the quadrature component of the precoded baseband signal z2($i$) be $I_{z2}$(i) and $Q_{z2}$(i) respectively. When the precoding matrix composed of real numbers (the precoding matrix represented by real numbers) $H_r$ is used, the following relationship holds.

Math 597

$$\begin{pmatrix} I_{z1}(i) \\ Q_{z1}(i) \\ I_{z2}(i) \\ Q_{z2}(i) \end{pmatrix} = H_r \begin{pmatrix} I_{s1}(i) \\ Q_{s1}(i) \\ I_{s2}(i) \\ Q_{s2}(i) \end{pmatrix}$$

The precoding matrix composed of real numbers $H_r$, however, is represented as follows.

Math 598

$$H_r = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix}$$

Here, $a_{11}$, $a_{12}$, $a_{13}$, $a_{14}$, $a_{21}$, $a_{22}$, $a_{23}$, $a_{24}$, $a_{31}$, $a_{32}$, $a_{33}$, $a_{34}$, $a_{41}$, $a_{42}$, $a_{43}$ and $a_{44}$ are real numbers. However, {$a_{11}$=0, $a_{12}$=0, $a_{13}$=0 and $a_{14}$=0} should not hold, {$a_{21}$=0, $a_{22}$=0, $a_{23}$=0 and $a_{24}$=0} should not hold, {$a_{31}$=0, $a_{32}$=0, $a_{33}$=0 and $a_{34}$=0} should not hold and {$a_{41}$=0, $a_{42}$=0, $a_{43}$=0 and $a_{44}$=0} should not hold. Also, {$a_{11}$=0, $a_{21}$=0, $a_{31}$=0 and $a_{41}$=0} should not hold, {$a_{12}$=0, $a_{22}$=0, $a_{32}$=0 and $a_{42}$=0} should not hold, {$a_{13}$=0, $a_{23}$=0, $a_{33}$=0 and $a_{43}$=0} should not hold and {$a_{14}$=0, $a_{24}$=0, $a_{34}$=0 and $a_{44}$=0} should not hold.

The "scheme of hopping between different precoding matrices" as an application of the precoding scheme of the present invention, such as the symbol arranging scheme described in Embodiments A1 through A5 and Embodiments 1 and 7, may also naturally be implemented as the precoding scheme of regularly hopping between precoding matrices using the precoding matrices represented by a plurality of different real numbers described as the "precoding scheme represented by real numbers". The usefulness of hopping between precoding matrices in the present invention is the same as that in a case where the precoding matrices are represented by a plurality of different complex numbers. Note that the "plurality of different precoding matrices" are as described above.

The above describes that "scheme of regularly hopping between different precoding matrices" as an application of the precoding scheme of the present invention, such as the symbol arranging scheme described in Embodiments A1 through A5 and Embodiments 1 and 7, may also naturally be implemented as the precoding scheme of regularly hopping between precoding matrices using the precoding matrices represented by a plurality of different real numbers described as the "precoding scheme represented by real numbers". As the "precoding scheme of regularly hopping between precoding matrices using the precoding matrices represented by a plurality of different real numbers", a scheme of preparing N different precoding matrices (represented by real numbers), and hopping between precoding matrices using the N different precoding matrices (represented by real numbers) with an H-slot period (cycle) (H being a natural number larger than N) may be used (as an example, there is a scheme described in Embodiment C2).

With the symbol arranging scheme described in Embodiment 1, the present invention may be similarly implemented using the precoding scheme of regularly hopping between precoding matrices described in Embodiments C1 through C5. Similarly, the present invention may be similarly implemented using the precoding scheme of regularly hopping between precoding matrices described in Embodiments C1 through C5 as the precoding scheme of regularly hopping between precoding matrices described in Embodiments A1 through A5.

Embodiment F1

The precoding scheme of regularly hopping between precoding matrices described in Embodiments 1 through 26 and Embodiments C1 through C5 is applicable to any baseband signals s1 and s2 mapped in the I-Q plane. Therefore, in Embodiments 1 through 26 and Embodiments C1 through C5, the baseband signals s1 and s2 have not been described in detail. On the other hand, when the precoding scheme of regularly hopping between precoding matrices is applied to the baseband signals s1 and s2 generated from the error correction coded data, excellent reception quality can be achieved by controlling average power of the baseband signals s1 and s2. In the present embodiment, the following describes a scheme of setting the average power of s1 and s2 when the precoding scheme of regularly hopping between precoding matrices is applied to the baseband signals s1 and s2 generated from the error correction coded data.

As an example, the modulation schemes for s1 and s2 are described as QPSK and 16QAM, respectively.

Since the modulation scheme for s1 is QPSK, s1 transmits two bits per symbol. Let the two bits to be transmitted be referred to as b0 and b1. Since the modulation scheme for s2 is 16QAM, s2 transmits four bits per symbol. Let the four bits to be transmitted be referred to as b2, b3, b4 and b5. The transmission device transmits one slot composed of one symbol for s1 and one symbol for s2, i.e. six bits b0, b1, b2, b3, b4 and b5 per slot.

For example, in FIG. 94 as an example of signal point layout in the I-Q plane for 16QAM, (b2, b3, b4, b5)=(0, 0, 0, 0) is mapped onto (I, Q)=(3×g, 3×g), (b2, b3, b4, b5)=(0, 0, 0, 1) is mapped onto (I, Q)=(3×g, 1×g), (b2, b3, b4, b5)=(0, 0, 1, 0) is mapped onto (I, Q)=(1×g, 3×g), (b2, b3, b4, b5)=(0, 0, 1, 1) is mapped onto (I, Q)=(1×g, 1×g), (b2, b3, b4, b5)=(0, 1, 0, 0) is mapped onto (I, Q)=(3×g, −3×g), (b2, b3, b4, b5)=(1, 1, 1, 0) is mapped onto (I, Q)=(−1×g, −3×g), and (b2, b3, b4, b5)=(1, 1, 1, 1) is mapped onto (I, Q)=(−1×g, −1×g).

Also, in FIG. 95 as an example of signal point layout in the I-Q plane for QPSK, (b0, b1)=(0, 0) is mapped onto (I, Q)=(1×h, 1×h), (b0, b1)=(0, 1) is mapped onto (I, Q)=(1×h, −1×h), (b0, b1)=(1, 0) is mapped onto (I, Q)=(−1×h, 1×h), and (b0, b1)=(1, 1) is mapped onto (I, Q)=(−1×h, −1×h).

Figure 105:
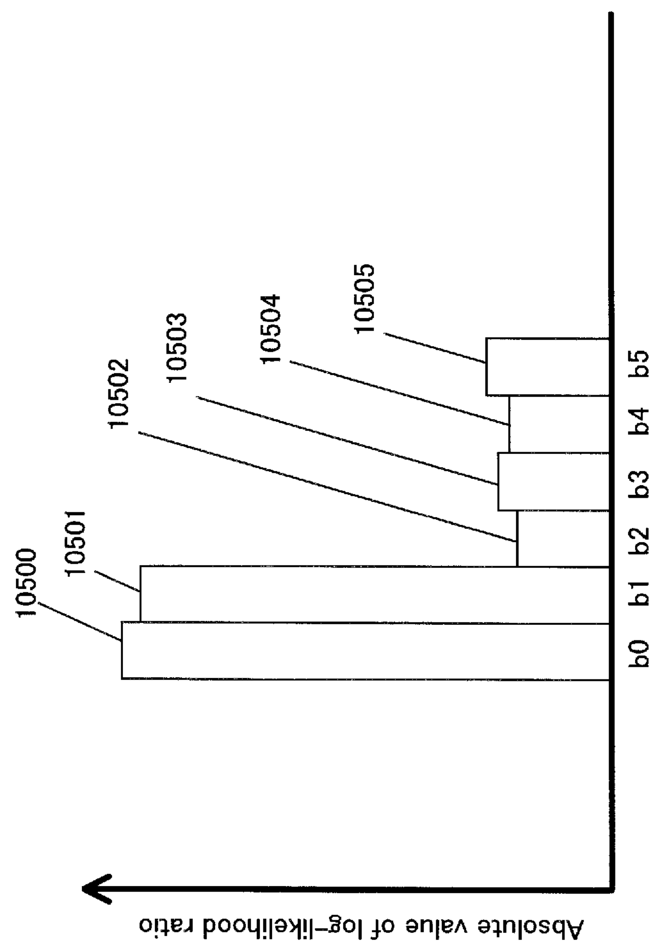
FIG. 105 schematically shows absolute values of a log-likelihood ratio obtained by the reception device.

Here, assume that the average power (average value) of s1 is equal to the average power (average value) of s2, i.e. h is represented by Equation 273 and g is represented by Equation 272. FIG. 105 shows absolute values of the log-likelihood ratio for b0 through b5 described above when the reception device obtains the log-likelihood ratio.

In FIG. 105, 10500 is the absolute value of the log-likelihood ratio for b0, 10501 is the absolute value of the log-likelihood ratio for b1, 10502 is the absolute value of the log-likelihood ratio for b2, 10503 is the absolute value of the log-likelihood ratio for b3, 10504 is the absolute value of the log-likelihood ratio for b4, and 10505 is the absolute value of the log-likelihood ratio for b5. In this case, when the absolute values of the log-likelihood ratio for b0 and b1 transmitted in QPSK are compared with the absolute values of the log-likelihood ratio for b2 through b5 transmitted in 16QAM, the absolute values of the log-likelihood ratio for b0 and b1 are higher than the absolute values of the log-likelihood ratio for b2 through b5, i.e., reliability of b0 and b1 in the reception device is higher than the reliability of b2 through b5 in the reception device. This is because of the following reason. When h is represented by Equation 273 in FIG. 95, a minimum Euclidian distance between signal points in the I-Q plane for QPSK is as follows.

Math 599

$$\sqrt{2}z \quad \text{Equation 476}$$

On the other hand, when g is represented by Equation 272 in FIG. 94,

Math 600

$$\frac{2}{\sqrt{10}}z \quad \text{Equation 477}$$

represents a minimum Euclidian distance between signal points in the I-Q plane for 16QAM.

If the reception device performs error correction decoding (e.g. belief propagation decoding such as a sum-product decoding in a case where the communication system uses LDPC coding) under this situation, due to a difference in reliability that "the absolute values of the log-likelihood ratio for b0 and b1 are higher than the absolute values of the log-likelihood ratio for b2 through b5", a problem that the data reception quality degrades in the reception device by being affected by the absolute values of the log-likelihood ratio for b2 through b5 arises.

Figure 106:
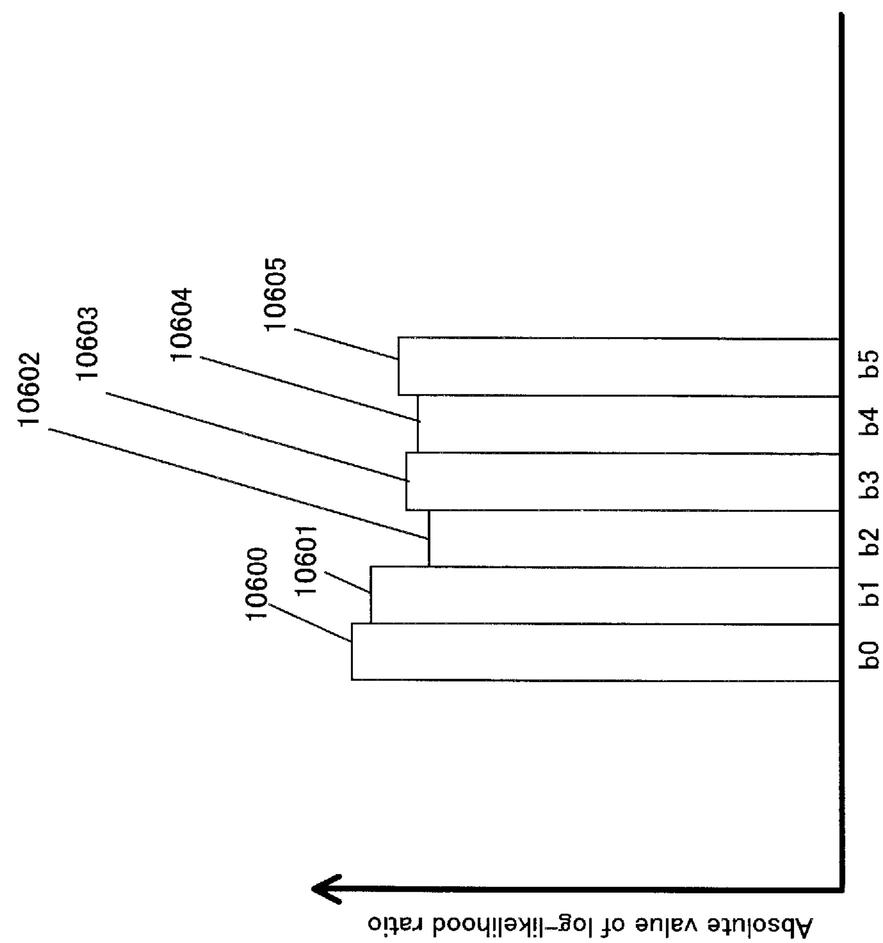
FIG. 106 schematically shows absolute values of a log-likelihood ratio obtained by the reception device.

In order to overcome the problem, the difference between the absolute values of the log-likelihood ratio for b0 and b1 and the absolute values of the log-likelihood ratio for b2 through b5 should be reduced compared with FIG. 105, as shown in FIG. 106.

Figure 107:
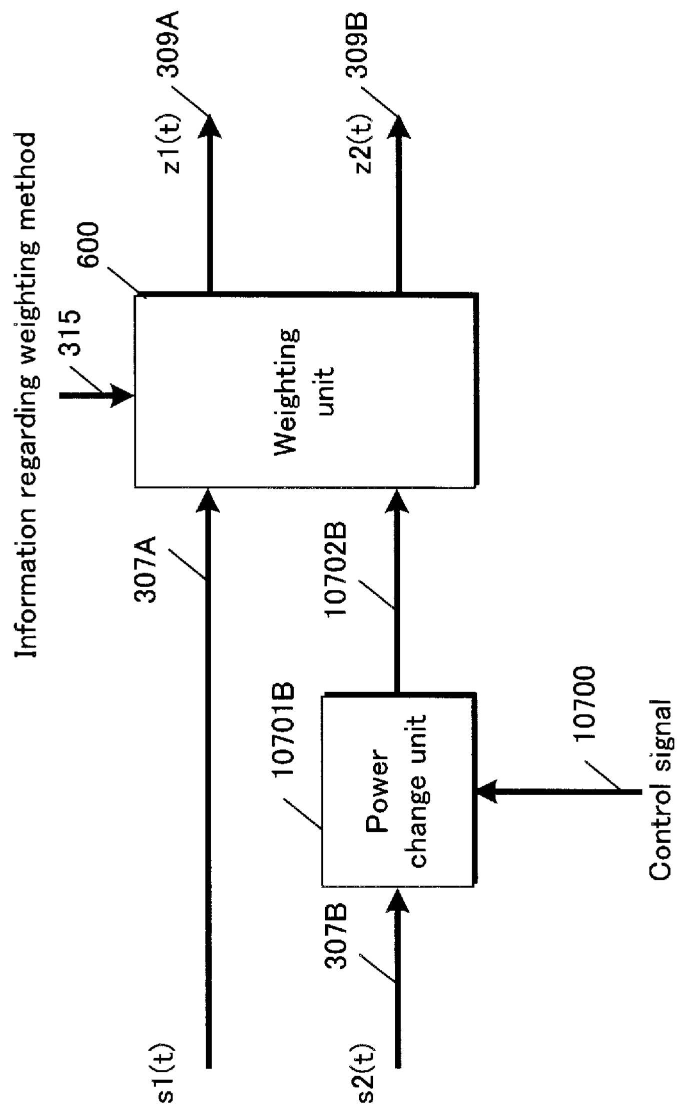
FIG. 107 is an example of a structure of a signal processing unit pertaining to a weighting combination unit.
Figure 108:
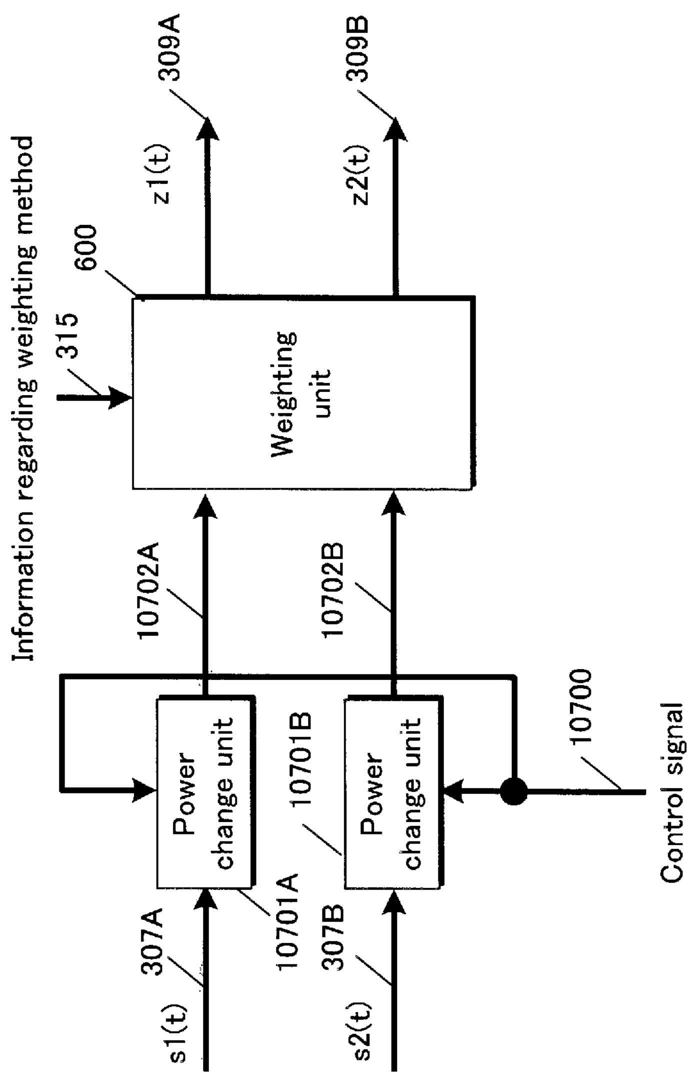
FIG. 108 is an example of a structure of the signal processing unit pertaining to the weighting combination unit.

It is considered that the average power of s1 is made to be different from the average power of s2. FIGS. 107 and 108 each show an example of the structure of the signal processing unit relating to a power change unit (although being referred to as the power change unit here, the power change unit may be referred to as an amplitude change unit or a weighting unit) and the weighting combination unit. Note that, in FIG. 107, elements that operate in a similar way to FIGS. 3 and 6 bear the same reference signs. Also, in FIG. 108, elements that operate in a similar way to FIGS. 3, 6 and 107 bear the same reference signs.

Example 1

First, an example of the operation is described using FIG. 107. Let s1(*t*) be the (mapped) baseband signal for the modulation scheme QPSK. The mapping scheme is as shown in FIG. 95, and h is as represented by Equation 273. Also, let s2(*t*) be the (mapped) baseband signal for the modulation scheme 16QAM. The mapping scheme is as shown in FIG. 94, and g is as represented by Equation 272. Note that t is time. In the present embodiment, description is made taking the time domain as an example.

The power change unit (10701B) receives a (mapped) baseband signal 307B for the modulation scheme 16QAM and a control signal (10700) as input. Letting a value for power change set based on the control signal (10700) be u, the power change unit outputs a signal (10702B) obtained by multiplying the (mapped) baseband signal 307B for the modulation scheme 16QAM by u. Let u be a real number, and u>1.0. Letting the precoding matrix in the precoding scheme of regularly hopping between precoding matrices be F[t] (represented as the function of t, as the precoding matrices are hopped by the time domain t), the following equation is satisfied.

Math 601

$$\begin{pmatrix} z1(t) \\ z2(t) \end{pmatrix} = F[t]\begin{pmatrix} e^{j0} & 0 \\ 0 & ue^{j0} \end{pmatrix}\begin{pmatrix} s1(t) \\ s2(t) \end{pmatrix} = F[t]\begin{pmatrix} 1 & 0 \\ 0 & u \end{pmatrix}\begin{pmatrix} s1(t) \\ s2(t) \end{pmatrix} \quad \text{Equation 478}$$

Therefore, a ratio of the average power for QPSK to the average power for 16QAM is set to $1:u^2$. With this structure, the reception device is in a reception condition in which the absolute value of the log-likelihood ratio shown in FIG. 106 is obtained. Therefore, data reception quality is improved in the reception device.

The following describes a case where u in the ratio of the average power for QPSK to the average power for 16QAM $1:u^2$ is set as shown in the following equation.

Math 602

$$u=\sqrt{5} \quad \text{Equation 479}$$

In this case, the minimum Euclidian distance between signal points in the I-Q plane for QPSK and the minimum Euclidian distance between signal points in the I-Q plane for 16QAM can be the same. Therefore, excellent reception quality can be achieved.

The condition that the minimum Euclidian distances between signal points in the I-Q plane for two different modulation schemes are equalized, however, is a mere example of the scheme of setting the ratio of the average power for QPSK to the average power for 16QAM. For example, according to other conditions such as a code length and a code ratio of an error correction code used for error correction coding, excellent reception quality may be achieved when the value u for power change is set to a value (higher value or lower value) different from the value at which the minimum Euclidian distances between signal points in the I-Q plane for two different modulation schemes are equalized.

In order to increase the minimum distance between candidate signal points obtained at the time of reception, a scheme of setting the value u as shown in the following equation is considered, for example.

Math 603

$$u=\sqrt{2} \qquad \text{Equation 480}$$

The value, however, is set appropriately according to conditions required as a system. In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (10700). The following describes setting of the value u for power change based on the control signal (10700) in order to improve data reception quality in the reception device in detail.

Example 1-1

The following describes a scheme of setting the average power (average values) of s1 and s2 according to a block length (the number of bits constituting one coding (encoded) block, and is also referred to as the code length) for the error correction coding used to generate s1 and s2 when the transmission device supports a plurality of block lengths for the error correction coding.

Examples of the error correction coding include block coding such as turbo coding or duo-binary turbo coding using tail-biting, LDPC coding, or the like. In many communication systems and broadcasting systems, a plurality of block lengths are supported. Encoded data for which error correction coding whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1($t$) and s2($t$).

The control signal (10700) is a signal indicating the selected block length for the error correction coding described above. The power change unit (10701B) sets the value u for power change according to the control signal (10700).

The example 1-1 is characterized in that the power change unit (10701B) sets the value u for power change according to the selected block length indicated by the control signal (10700).

Here, a value for power change set according to a block length X is referred to as $u_{LX}$.

For example, when 1000 is selected as the block length, the power change unit (10701B) sets a value for power change to $u_{L1000}$. When 1500 is selected as the block length, the power change unit (10701B) sets a value for power change to $u_{L1500}$. When 3000 is selected as the block length, the power change unit (10701B) sets a value for power change to $u_{L3000}$. In this case, for example, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$). Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 1-2

The following describes a scheme of setting the average power (average values) of s1 and s2 according to a coding rate for the error correction coding used to generate s1 and s2 when the transmission device supports a plurality of coding rates for the error correction coding.

Examples of the error correction coding include block coding such as turbo coding or duo-binary turbo coding using tail-biting, LDPC coding, or the like. In many communication systems and broadcasting systems, a plurality of coding rates are supported. Encoded data for which error correction coding whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1($t$) and s2($t$).

The control signal (10700) is a signal indicating the selected coding rate for the error correction coding described above. The power change unit (10701B) sets the value u for power change according to the control signal (10700).

The example 1-2 is characterized in that the power change unit (10701B) sets the value u for power change according to the selected coding rate indicated by the control signal (10700).

Here, a value for power change set according to a coding rate rx is referred to as $u_{rX}$.

For example, when r1 is selected as the coding rate, the power change unit (10701B) sets a value for power change to $u_{r1}$. When r2 is selected as the coding rate, the power change unit (10701B) sets a value for power change to $u_{r2}$. When r3 is selected as the coding rate, the power change unit (10701B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$).

Note that, as examples of r1, r2 and r3 described above, coding rates ½, ⅔ and ¾ are considered when the error correction code is the LDPC code.

Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 1-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Figure 109:
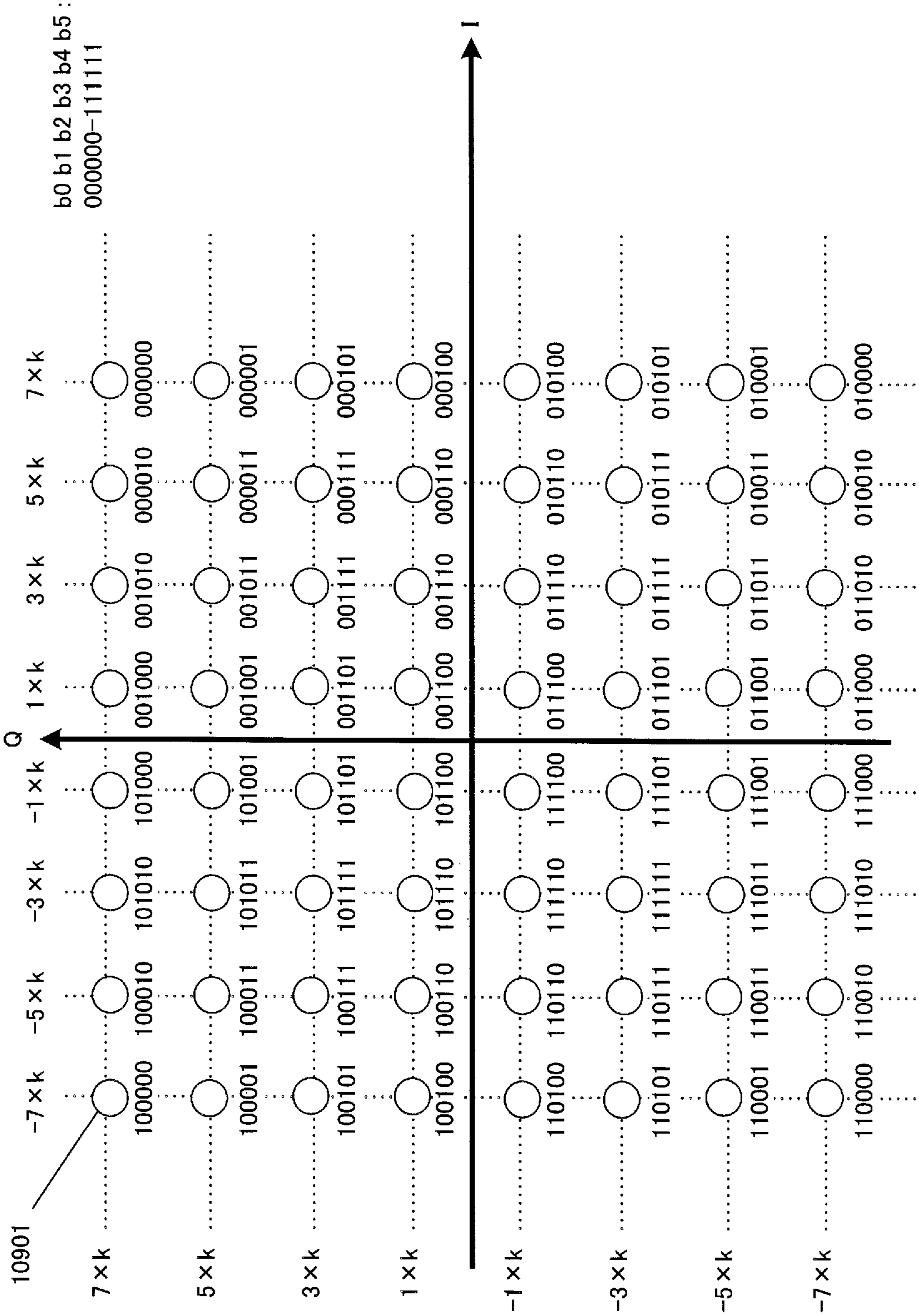
FIG. 109 is an example of signal point layout in the I-Q plane for 64QAM.

Here, as an example, a case where the modulation scheme for s1 is fixed to QPSK and the modulation scheme for s2 is changed from 16QAM to 64QAM by the control signal (or can be set to either 16QAM or 64QAM) is considered. Note that, in a case where the modulation scheme for s2(*t*) is 64QAM, the mapping scheme for s2(*t*) is as shown in FIG. 109, and k is represented by the following equation.

Math 604

$$k = \frac{z}{\sqrt{42}} \quad \text{Equation 481}$$

By performing mapping in this way, the average power (average value) obtained when h is represented by Equation 273 in FIG. 95 in QPSK becomes equal to the average power (average value) obtained when g is represented by Equation 272 in FIG. 94 in 16QAM. In the mapping in 64QAM, the values I and Q are determined from an input of six bits. In this regard, the mapping 64QAM may be performed similarly to the mapping in QPSK and 16QAM.

That is to say, in FIG. 109 as an example of signal point layout in the I-Q plane for 64QAM, (b0, b1, b2, b3, b4, b5)=(0, 0, 0, 0, 0, 0) is mapped onto (I, Q)=(7×k, 7×k), (b0, b1, b2, b3, b4, b5)=(0, 0, 0, 0, 0, 1) is mapped onto (I, Q)=(7×k, 5×k), (b0, b1, b2, b3, b4, b5)=(0, 0, 0, 0, 1, 0) is mapped onto (I, Q)=(5×k, 7×k), (b0, b1, b2, b3, b4, b5)=(0, 0, 0, 0, 1, 1) is mapped onto (I, Q)=(5×k, 5×k), (b0, b1, b2, b3, b4, b5)=(0, 0, 0, 1, 0, 0) is mapped onto (I, Q)=(7×k, 1×k), (b0, b1, b2, b3, b4, b5)=(1, 1, 1, 1, 1, 0) is mapped onto (I, Q)=(−3×k, −1×k), and (b0, b1, b2, b3, b4, b5)=(1, 1, 1, 1, 1, 1) is mapped onto (I, Q)=(−3×k, −3×k).

In FIG. 107, the power change unit 10701B sets such that $u=u_{16}$ when the modulation scheme for s2 is 16QAM, and sets such that $u=u_{64}$ when the modulation scheme for s2 is 64QAM. In this case, due to the relationship between minimum Euclidian distances, by setting such that $u_{16}<u_{64}$, excellent data reception quality is obtained in the reception device when the modulation scheme for s2 is either 16QAM or 64QAM.

Note that, in the above description, the "modulation scheme for s1 is fixed to QPSK". It is also considered that the modulation scheme for s2 is fixed to QPSK. In this case, power change is assumed to be not performed for the fixed modulation scheme (here, QPSK), and to be performed for a plurality of modulation schemes that can be set (here, 16QAM and 64QAM). That is to say, in this case, the transmission device does not have the structure shown in FIG. 107, but has a structure in which the power change unit 10701B is eliminated from the structure in FIG. 107 and a power change unit is provided to a s1(*t*)-side. When the fixed modulation scheme (here, QPSK) is set to s2, the following equation is satisfied.

Math 605

$$\begin{pmatrix} z1(t) \\ z2(t) \end{pmatrix} = F[t]\begin{pmatrix} ue^{j0} & 0 \\ 0 & e^{j0} \end{pmatrix}\begin{pmatrix} s1(t) \\ s2(t) \end{pmatrix} = F[t]\begin{pmatrix} u & 0 \\ 0 & 1 \end{pmatrix}\begin{pmatrix} s1(t) \\ s2(t) \end{pmatrix} \quad \text{Equation 482}$$

When the modulation scheme for s2 is fixed to QPSK and the modulation scheme for s1 is changed from 16QAM to 64QAM (is set to either 16QAM or 64QAM), the relationship $u_{16}<u_{64}$ should be satisfied (note that a multiplied value for power change in 16QAM is $u_{16}$, a multiplied value for power change in 64QAM is $u_{64}$, and power change is not performed in QPSK).

Also, when a set of the modulation scheme for s1 and the modulation scheme for s2 can be set to any one of a set of QPSK and 16QAM, a set of 16QAM and QPSK, a set of QPSK and 64QAM and a set of 64QAM and QPSK, the relationship $u_{16}<u_{64}$ should be satisfied.

The following describes a case where the above-mentioned description is generalized.

Let the modulation scheme for s1 be fixed to a modulation scheme C in which the number of signal points in the I-Q plane is c. Let the modulation scheme for s2 be set to either a modulation scheme A in which the number of signal points in the I-Q plane is a or a modulation scheme B in which the number of signal points in the I-Q plane is b (a>b>c) (however, let the average power (average value) for s2 in the modulation scheme A be equal to the average power (average value) for s2 in the modulation scheme B). In this case, a value for power change set when the modulation scheme A is set to the modulation scheme for s2 is $u_a$. Also, a value for power change set when the modulation scheme B is set to the modulation scheme for s2 is $u_b$. In this case, when the relationship $u_b<u_a$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_b<u_a$ should be satisfied. Also, when α set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_b<u_a$ should be satisfied.

Example 2

The following describes an example of the operation different from that described in Example 1, using FIG. 107. Let s1(*t*) be the (mapped) baseband signal for the modulation scheme 64QAM. The mapping scheme is as shown in FIG. 109, and k is as represented by Equation 481. Also, let s2(*t*) be the (mapped) baseband signal for the modulation scheme 16QAM. The mapping scheme is as shown in FIG. 94, and g is as represented by Equation 272. Note that t is time. In the present embodiment, description is made taking the time domain as an example.

The power change unit (10701B) receives a (mapped) baseband signal 307B for the modulation scheme 16QAM and a control signal (10700) as input. Letting a value for power change set based on the control signal (10700) be u, the power change unit outputs a signal (10702B) obtained by multiplying the (mapped) baseband signal 307B for the modulation scheme 16QAM by u. Let u be a real number, and u<1.0. Letting the precoding matrix in the precoding scheme of regularly hopping between precoding matrices be F[t], the following equation is satisfied.

Math 606

$$\begin{pmatrix} z1(t) \\ z2(t) \end{pmatrix} = F[t]\begin{pmatrix} e^{j0} & 0 \\ 0 & ue^{j0} \end{pmatrix}\begin{pmatrix} s1(t) \\ s2(t) \end{pmatrix} = F[t]\begin{pmatrix} 1 & 0 \\ 0 & u \end{pmatrix}\begin{pmatrix} s1(t) \\ s2(t) \end{pmatrix} \quad \text{Equation 483}$$

Therefore, a ratio of the average power for 64QAM to the average power for 16QAM is set to $1:u^2$. With this structure, the reception device is in a reception condition as shown in FIG. 106. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (10700). The following describes setting of the value u for power change based on the control signal (10700) in order to improve data reception quality in the reception device in detail.

Example 2-1

The following describes a scheme of setting the average power (average values) of s1 and s2 according to a block length (the number of bits constituting one coding (encoded) block, and is also referred to as the code length) for the error correction coding used to generate s1 and s2 when the transmission device supports a plurality of block lengths for the error correction coding.

Examples of the error correction coding include block coding such as turbo coding or duo-binary turbo coding using tail-biting, LDPC coding, or the like. In many communication systems and broadcasting systems, a plurality of block lengths are supported. Encoded data for which error correction coding whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(*t*) and s2(*t*).

The control signal (10700) is a signal indicating the selected block length for the error correction coding described above. The power change unit (10701B) sets the value u for power change according to the control signal (10700).

The present invention is characterized in that the power change unit (10701B) sets the value u for power change according to the selected block length indicated by the control signal (10700). Here, a value for power change set according to the block length X is referred to as $u_{LX}$.

For example, when 1000 is selected as the block length, the power change unit (10701B) sets a value for power change to $u_{L1000}$. When 1500 is selected as the block length, the power change unit (10701B) sets a value for power change to $u_{L1500}$. When 3000 is selected as the block length, the power change unit (10701B) sets a value for power change to $u_{L3000}$. In this case, for example, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$). Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 2-2

The following describes a scheme of setting the average power (average values) of s1 and s2 according to a coding rate for the error correction coding used to generate s1 and s2 when the transmission device supports a plurality of coding rates for the error correction coding.

Examples of the error correction coding include block coding such as turbo coding or duo-binary turbo coding using tail-biting, LDPC coding, or the like. In many communication systems and broadcasting systems, a plurality of coding rates are supported. Encoded data for which error correction coding whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1(*t*) and s2(*t*).

The control signal (10700) is a signal indicating the selected coding rate for the error correction coding described above. The power change unit (10701B) sets the value u for power change according to the control signal (10700).

The present invention is characterized in that the power change unit (10701B) sets the value u for power change according to the selected coding rate indicated by the control signal (10700). Here, a value for power change set according to the coding rate rx is referred to as $u_{rX}$.

For example, when r1 is selected as the coding rate, the power change unit (10701B) sets a value for power change to $u_{r1}$. When r2 is selected as the coding rate, the power change unit (10701B) sets a value for power change to $u_{r2}$. When r3 is selected as the coding rate, the power change unit (10701B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$).

Note that, as examples of r1, r2 and r3 described above, coding rates ½, ⅔ and ¾ are considered when the error correction code is the LDPC code. Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 2-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 64QAM and the modulation scheme for s2 is changed from 16QAM to QPSK by the control signal (or can be set to either 16QAM or QPSK) is considered.

In a case where the modulation scheme for s1 is 64QAM, the mapping scheme for s1(*t*) is as shown in FIG. 109, and k is represented by Equation 481 in FIG. 109. In a case where the modulation scheme for s2 is 16QAM, the mapping scheme for s2(*t*) is as shown in FIG. 94, and g is represented by Equation 272 in FIG. 94. Also, in a case where the modulation scheme for s2(*t*) is QPSK, the mapping scheme for s2(*t*) is as shown in FIG. 95, and h is represented by Equation 273 in FIG. 95.

By performing mapping in this way, the average power in 16QAM becomes equal to the average power in QPSK.

In FIG. 107, the power change unit 10701B sets such that $u=u_{16}$ when the modulation scheme for s2 is 16QAM, and sets such that $u=u_4$ when the modulation scheme for s2 is QPSK. In this case, due to the relationship between minimum Euclidian distances, by setting such that $u_4<u_{16}$, excellent data reception quality is obtained in the reception device when the modulation scheme for s2 is either 16QAM or QPSK.

Note that, in the above description, the modulation scheme for s1 is fixed to 64QAM. When the modulation scheme for s2 is fixed to 64QAM and the modulation scheme for s1 is changed from 16QAM to QPSK (is set to either 16QAM or QPSK), the relationship $u_4<u_{16}$ should be satisfied (the same considerations should be made as the example 1-3) (note that a multiplied value for power change in 16QAM is $u_{16}$, a multiplied value for power change in QPSK is $u_4$, and power change is not performed in 64QAM). Also, when a set of the modulation scheme for s1 and the modulation scheme for s2 can be set to any one of a set of 64QAM and 16QAM, a set of 16QAM and 64QAM, a set of 64QAM and QPSK and a set of QPSK and 64QAM, the relationship $u_4<u_{16}$ should be satisfied.

The following describes a case where the above-mentioned description is generalized.

Let the modulation scheme for s1 be fixed to a modulation scheme C in which the number of signal points in the I-Q plane is c. Let the modulation scheme for s2 be set to either a modulation scheme A in which the number of signal points in the I-Q plane is a or a modulation scheme B in which the number of signal points in the I-Q plane is b (c>b>a) (however, let the average power (average value) for s2 in the modulation scheme A be equal to the average power (average value) for s2 in the modulation scheme B).

In this case, a value for power change set when the modulation scheme A is set as the modulation scheme for s2 is $u_a$. Also, a value for power change set when the modulation scheme B is set to the modulation scheme for s2 is $u_b$. In this case, when the relationship $u_a<u_b$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_a<u_b$ should be satisfied. Also, when a set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_a<u_b$ should be satisfied.

Example 3

The following describes an example of the operation different from that described in Example 1, using FIG. 107. Let s1(*t*) be the (mapped) baseband signal for the modulation scheme 16QAM. The mapping scheme is as shown in FIG. 94, and g is as represented by Equation 272. Let s2(*t*) be the (mapped) baseband signal for the modulation scheme 64QAM. The mapping scheme is as shown in FIG. 109, and k is as represented by Equation 481. Note that t is time. In the present embodiment, description is made taking the time domain as an example.

The power change unit (10701B) receives a (mapped) baseband signal 307B for the modulation scheme 64QAM and a control signal (10700) as input. Letting a value for power change set based on the control signal (10700) be u, the power change unit outputs a signal (10702B) obtained by multiplying the (mapped) baseband signal 307B for the modulation scheme 64QAM by u. Let u be a real number, and u>1.0. Letting the precoding matrix in the precoding scheme of regularly hopping between precoding matrices be F[t], the following equation is satisfied.

Math 607

$$\begin{pmatrix} z1(t) \\ z2(t) \end{pmatrix} = F[t]\begin{pmatrix} e^{j0} & 0 \\ 0 & ue^{j0} \end{pmatrix}\begin{pmatrix} s1(t) \\ s2(t) \end{pmatrix} = F[t]\begin{pmatrix} 1 & 0 \\ 0 & u \end{pmatrix}\begin{pmatrix} s1(t) \\ s2(t) \end{pmatrix} \quad \text{Equation 484}$$

Therefore, a ratio of the average power for 16QAM to the average power for 64QAM is set to $1:u^2$. With this structure, the reception device is in a reception condition as shown in FIG. 106. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (10700). The following describes setting of the value u for power change based on the control signal (10700) in order to improve data reception quality in the reception device in detail.

Example 3-1

The following describes a scheme of setting the average power (average values) of s1 and s2 according to a block length (the number of bits constituting one coding (encoded) block, and is also referred to as the code length) for the error correction coding used to generate s1 and s2 when the transmission device supports a plurality of block lengths for the error correction coding.

Examples of the error correction coding include block coding such as turbo coding or duo-binary turbo coding using tail-biting, LDPC coding, or the like. In many communication systems and broadcasting systems, a plurality of block lengths are supported. Encoded data for which error correction coding whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(*t*) and s2(*t*).

The control signal (10700) is a signal indicating the selected block length for the error correction coding described above. The power change unit (10701B) sets the value u for power change according to the control signal (10700).

The present invention is characterized in that the power change unit (10701B) sets the value u for power change according to the selected block length indicated by the control signal (10700). Here, a value for power change set according to the block length X is referred to as $u_{LX}$.

For example, when 1000 is selected as the block length, the power change unit (10701B) sets a value for power change to $u_{L1000}$. When 1500 is selected as the block length, the power change unit (10701B) sets a value for power change to $u_{L1500}$. When 3000 is selected as the block length, the power change unit (10701B) sets a value for power change to $u_{L3000}$. In this case, for example, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$). Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 3-2

The following describes a scheme of setting the average power (average values) of s1 and s2 according to a coding rate for the error correction coding used to generate s1 and s2 when the transmission device supports a plurality of coding rates for the error correction coding.

Examples of the error correction coding include block coding such as turbo coding or duo-binary turbo coding using tail-biting, LDPC coding, or the like. In many communication systems and broadcasting systems, a plurality of coding rates are supported. Encoded data for which error correction coding whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1(*t*) and s2(*t*).

The control signal (10700) is a signal indicating the selected coding rate for the error correction coding described above. The power change unit (10701B) sets the value u for power change according to the control signal (10700).

The present invention is characterized in that the power change unit (10701B) sets the value u for power change according to the selected coding rate indicated by the control signal (10700). Here, a value for power change set according to the coding rate rx is referred to as $u_{rx}$.

For example, when r1 is selected as the coding rate, the power change unit (10701B) sets a value for power change to $u_{r1}$. When r2 is selected as the coding rate, the power change unit (10701B) sets a value for power change to $u_{r2}$. When r3 is selected as the coding rate, the power change unit (10701B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$).

Note that, as examples of r1, r2 and r3 described above, coding rates ½, ⅔ and ¾ are considered when the error correction code is the LDPC code. Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 3-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 16QAM and the modulation scheme for s2 is changed from 64QAM to QPSK by the control signal (or can be set to either 64QAM or QPSK) is considered.

In a case where the modulation scheme for s1 is 16QAM, the mapping scheme for s2(*t*) is as shown in FIG. 94, and g is represented by Equation 272 in FIG. 94. In a case where the modulation scheme for s2 is 64QAM, the mapping scheme for s1(*t*) is as shown in FIG. 109, and k is represented by Equation 481 in FIG. 109. Also, in a case where the modulation scheme for s2(*t*) is QPSK, the mapping scheme for s2(*t*) is as shown in FIG. 95, and h is represented by Equation 273 in FIG. 95.

By performing mapping in this way, the average power in 16QAM becomes equal to the average power in QPSK.

In FIG. 107, the power change unit 10701B sets such that $u=u_{64}$ when the modulation scheme for s2 is 64QAM, and sets such that $u=u_4$ when the modulation scheme for s2 is QPSK. In this case, due to the relationship between minimum Euclidian distances, by setting such that $u_4<u_{64}$, excellent data reception quality is obtained in the reception device when the modulation scheme for s2 is either 16QAM or 64QAM.

Note that, in the above description, the modulation scheme for s1 is fixed to 16QAM. When the modulation scheme for s2 is fixed to 16QAM and the modulation scheme for s1 is changed from 64QAM to QPSK (is set to either 64QAM or QPSK), the relationship $u_4<u_{64}$ should be satisfied (the same considerations should be made as the example 1-3) (note that a multiplied value for power change in 64QAM is $u_{64}$, a multiplied value for power change in QPSK is $u_4$, and power change is not performed in 16QAM). Also, when a set of the modulation scheme for s1 and the modulation scheme for s2 can be set to any one of a set of 16QAM and 64QAM, a set of 64QAM and 16QAM, a set of 16QAM and QPSK and a set of QPSK and 16QAM, the relationship $u_4<u_{64}$ should be satisfied.

The following describes a case where the above-mentioned description is generalized.

Let the modulation scheme for s1 be fixed to a modulation scheme C in which the number of signal points in the I-Q plane is c. Let the modulation scheme for s2 be set to either a modulation scheme A in which the number of signal points in the I-Q plane is a or a modulation scheme B in which the number of signal points in the I-Q plane is b (c>b>a) (however, let the average power (average value) for s2 in the modulation scheme A be equal to the average power (average value) for s2 in the modulation scheme B).

In this case, a value for power change set when the modulation scheme A is set as the modulation scheme for s2 is $u_a$. Also, a value for power change set when the modulation scheme B is set to the modulation scheme for s2 is $u_b$. In this case, when the relationship $u_a<u_b$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_a<u_b$ should be satisfied. Also, when a set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_a<u_b$ should be satisfied.

Example 4

The case where power change is performed for one of the modulation schemes for s1 and s2 has been described above. The following describes a case where power change is performed for both of the modulation schemes for s1 and s2.

An example of the operation is described using FIG. 108. Let s1(*t*) be the (mapped) baseband signal for the modulation scheme QPSK. The mapping scheme is as shown in FIG. 95, and h is as represented by Equation 273. Also, let s2(*t*) be the (mapped) baseband signal for the modulation scheme 16QAM. The mapping scheme is as shown in FIG. 94, and g is as represented by Equation 272. Note that t is time. In the present embodiment, description is made taking the time domain as an example.

The power change unit (10701A) receives a (mapped) baseband signal 307A for the modulation scheme QPSK and the control signal (10700) as input. Letting a value for power change set based on the control signal (10700) be v, the power change unit outputs a signal (10702A) obtained by multiplying the (mapped) baseband signal 307A for the modulation scheme QPSK by v.

The power change unit (10701B) receives the (mapped) baseband signal 307B for the modulation scheme 16QAM and the control signal (10700) as input. Letting a value for power change set based on the control signal (10700) be u, the power change unit outputs the signal (10702B) obtained by multiplying the (mapped) baseband signal 307B for the modulation scheme 16QAM by u. Then, let u=v×w (w>1.0).

Letting the precoding matrix in the precoding scheme of regularly hopping between precoding matrices be F[t], the following Equation 485 is satisfied.

Math 608

$$\begin{aligned}\begin{pmatrix} z1(t) \\ z2(t) \end{pmatrix} &= F[t]\begin{pmatrix} ve^{j0} & 0 \\ 0 & ue^{j0} \end{pmatrix}\begin{pmatrix} s1(t) \\ s2(t) \end{pmatrix} \\ &= F[t]\begin{pmatrix} v & 0 \\ 0 & u \end{pmatrix}\begin{pmatrix} s1(t) \\ s2(t) \end{pmatrix} \\ &= F[t]\begin{pmatrix} v & 0 \\ 0 & v\times w \end{pmatrix}\begin{pmatrix} s1(t) \\ s2(t) \end{pmatrix}\end{aligned} \quad \text{Equation 485}$$

Therefore, a ratio of the average power for QPSK to the average power for 16QAM is set to $v^2:u^2=v^2:v^2\times w^2=1:w^2$. With this structure, the reception device is in a reception condition as shown in FIG. 106. Therefore, data reception quality is improved in the reception device.

Note that, in view of Equations 479 and 480, effective examples of the ratio of the average power for QPSK to the average power for 16QAM are considered to be $v^2:u^2=v^2:v^2 \times w^2=1:w^2=1:5$ or $v^2:u^2=v^2:v^2 \times w^2=1:w^2=1:2$. The ratio, however, is set appropriately according to conditions required as a system.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the values v and u for power change are set based on the control signal (10700). The following describes setting of the values v and u for power change based on the control signal (10700) in order to improve data reception quality in the reception device in detail.

Example 4-1

The following describes a scheme of setting the average power (average values) of s1 and s2 according to a block length (the number of bits constituting one coding (encoded) block, and is also referred to as the code length) for the error correction coding used to generate s1 and s2 when the transmission device supports a plurality of block lengths for the error correction coding.

Examples of the error correction coding include block coding such as turbo coding or duo-binary turbo coding using tail-biting, LDPC coding, or the like. In many communication systems and broadcasting systems, a plurality of block lengths are supported. Encoded data for which error correction coding whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(*t*) and s2(*t*).

The control signal (10700) is a signal indicating the selected block length for the error correction coding described above. The power change unit (10701A) sets the value v for power change according to the control signal (10700). Similarly, the power change unit (10701B) sets the value u for power change according to the control signal (10700).

The present invention is characterized in that the power change units (10701A and 10701B) respectively set the values v and u for power change according to the selected block length indicated by the control signal (10700). Here, values for power change set according to the block length X are referred to as $v_{LX}$ and $u_{LX}$.

For example, when 1000 is selected as the block length, the power change unit (10701A) sets a value for power change to $v_{L1000}$. When 1500 is selected as the block length, the power change unit (10701A) sets a value for power change to $v_{L1500}$. When 3000 is selected as the block length, the power change unit (10701A) sets a value for power change to $v_{L3000}$.

On the other hand, when 1000 is selected as the block length, the power change unit (10701B) sets the value for power change to $u_{L1000}$. When 1500 is selected as the block length, the power change unit (10701B) sets the value for power change to $u_{L1500}$. When 3000 is selected as the block length, the power change unit (10701B) sets the value for power change to $u_{L3000}$.

In this case, for example, by setting $v_{L1000}$, $v_{L1500}$ and $v_{L3000}$ so as to be different from one another, a high error correction capability can be achieved for each code length. Similarly, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied, and $v_{L1000}=v_{L1500}$ may be satisfied. What is important is that two or more values exist in a set of $v_{L1000}$, $v_{L1500}$ and $v_{L3000}$, and that two or more values exist in a set of $u_{L1000}$, $u_{L1500}$ and $u_{L3000}$). Note that, as described above, $v_{LX}$ and $u_{LX}$ are set so as to satisfy the ratio of the average power $1:w^2$.

Although the case of three code lengths is taken as an example in the above description, the present invention is not limited to this. One important point is that two or more values $u_{LX}$ for power change exist when there are two or more code lengths that can be set, and the transmission device selects any of the values for power change from among the two or more values $u_{LX}$ for power change when the code length is set, and performs power change. Another important point is that two or more values $v_{LX}$ for power change exist when there are two or more code lengths that can be set, and the transmission device selects any of the values for power change from among the two or more values $v_{LX}$ for power change when the code length is set, and performs power change.

Example 4-2

The following describes a scheme of setting the average power (average values) of s1 and s2 according to a coding rate for the error correction coding used to generate s1 and s2 when the transmission device supports a plurality of coding rates for the error correction coding.

Examples of the error correction coding include block coding such as turbo coding or duo-binary turbo coding using tail-biting, LDPC coding, or the like. In many communication systems and broadcasting systems, a plurality of coding rates are supported. Encoded data for which error correction coding whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1(*t*) and s2(*t*).

The control signal (10700) is a signal indicating the selected coding rate for the error correction coding described above. The power change unit (10701A) sets the value v for power change according to the control signal (10700). Also, the power change unit (10701B) sets the value u for power change according to the control signal (10700).

The present invention is characterized in that the power change units (10701A and 10701B) respectively set the values v and u for power change according to the selected coding rate indicated by the control signal (10700). Here, values for power change set according to the coding rate rx are referred to as $v_{rx}$ and $u_{rx}$.

For example, when r1 is selected as the coding rate, the power change unit (10701A) sets a value for power change to $v_{r1}$. When r2 is selected as the coding rate, the power change unit (10701A) sets a value for power change to $v_{r2}$. When r3 is selected as the coding rate, the power change unit (10701A) sets a value for power change to $v_{r3}$.

Also, when r1 is selected as the coding rate, the power change unit (10701B) sets a value for power change to $u_{r1}$. When r2 is selected as the coding rate, the power change unit (10701B) sets a value for power change to $u_{r2}$. When r3 is selected as the coding rate, the power change unit (10701B) sets a value for power change to $u_{r3}$.

In this case, for example, by setting $v_{r1}$, $v_{r2}$ and $v_{r3}$ so as to be different from one another, a high error correction capability can be achieved for each code length. Similarly, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $v_{r1}=v_{r2}$ may be satisfied, and $u_{r1}=u_{r2}$ may be satisfied. What is important is that two or more values exist in a set of $v_{r1}$, $v_{r2}$ and $v_{r3}$, and that two or more values exist in a set of $u_{r1}$, $u_{r2}$ and $u_{r3}$). Note that, as described above, $v_{rX}$ and $u_{rX}$ are set so as to satisfy the ratio of the average power $1:w^2$.

As examples of r1, r2 and r3 described above, coding rates ½, ⅔ and ¾ are considered when the error correction code is the LDPC code.

Although the case of three coding rates is taken as an example in the above description, the present invention is not limited to this. One important point is that two or more values $u_{rx}$ for power change exist when there are two or more coding rates that can be set, and the transmission device selects any of the values for power change from among the two or more values $u_{rx}$ for power change when the coding rate is set, and performs power change. Another important point is that two or more values $v_{rx}$ for power change exist when there are two or more coding rates that can be set, and the transmission device selects any of the values for power change from among the two or more values $v_{rx}$ for power change when the coding rate is set, and performs power change.

Example 4-3

In order for the reception device to achieve excellent data reception quality, it is important to implement the following.

The following describes, with respect to the case where the transmission device supports a plurality of modulation schemes, how to set the average powers (average values) of s1 and s2 according to the modulation schemes that are to be used for generating s1 and s2.

For example, the following describes the case in which the modulation scheme for s1 is fixed to QPSK, and the modulation scheme for s2 is changed from 16QAM to 64QAM (or either 16QAM or 64QAM is applicable). When modulation scheme for s1 is QPSK, the mapping scheme for s1(*t*) is as shown in FIG. 95. In FIG. 95, h is represented by Equation 273. When the modulation scheme for s2 is 16QAM, the mapping scheme for s2(*t*) is as shown in FIG. 94. In FIG. 94, g is represented by Equation 272. When the modulation scheme for s2(*t*) is 64QAM, the mapping scheme for s2(*t*) is as shown in FIG. 109. In FIG. 109, k is represented by Equation 481.

In FIG. 108, when the modulation scheme for s1 is QPSK and the modulation scheme for s2 is 16QAM, assume that $v=\alpha$ and $u=\alpha\times w_{16}$. In this case, the ratio between the average power of QPSK and the average power of 16QAM is $v^2:u^2=\alpha^2:\alpha^2\times w_{16}^2=1:w_{16}^2$.

In FIG. 108, when the modulation scheme for s1 is QPSK and the modulation scheme for s2 is 64QAM, assume that $v=\beta$ and $u=\beta\times w_{64}$. In this case, the ratio between the average power of QPSK and the average power of 64QAM is $v:u=\beta^2:\beta^2\times w_{64}^2=1:w_{64}^2$. In this case, according to the minimum Euclidean distance relationship, the reception device achieves high data reception quality when 1.0<w16<w64, regardless of whether the modulation scheme for s2 is 16QAM or 64QAM.

Note that although "the modulation scheme for s1 is fixed to QPSK" in the description above, it is possible that "the modulation scheme for s2 is fixed to QPSK". If this is the case, assume that the power change is not performed with respect to the fixed modulation scheme (QPSK in this example), but is performed with respect to the selectable modulation schemes (16QAM and 64QAM in this example). Consequently, when the fixed modulation scheme (QPSK in this example) is set to s2, the following Equation 486 is fulfilled.

Math 609

$$\begin{pmatrix} z1(t) \\ z2(t) \end{pmatrix} = F[t]\begin{pmatrix} ue^{j0} & 0 \\ 0 & ve^{j0} \end{pmatrix}\begin{pmatrix} s1(t) \\ s2(t) \end{pmatrix} = F[t]\begin{pmatrix} u & 0 \\ 0 & v \end{pmatrix}\begin{pmatrix} s1(t) \\ s2(t) \end{pmatrix} = F[t]\begin{pmatrix} v\times w & 0 \\ 0 & v \end{pmatrix}\begin{pmatrix} s1(t) \\ s2(t) \end{pmatrix} \quad \text{Equation 486}$$

Given that, even when "the modulation scheme for s2 is fixed to QPSK and the modulation scheme for s1 is changed from 16QAM to 64QAM (set to either 16QAM or 64QAM) ", $1.0<w_{16}<w_{64}$ should be fulfilled. (Note that the value used for the multiplication for the power change in the case of 16QAM is $u=\alpha\times w_{16}$, the value used for the multiplication for the power change in the case of 64QAM is $u=\beta\times w_{64}$, the value used for the power change in the case of QPSK is $v=\alpha$ when the selectable modulation scheme is 16QAM and $v=\beta$ when the selectable modulation scheme is 64QAM.) Also, when the set of (the modulation scheme for s1, the modulation scheme for s2) is selectable from the sets of (QPSK, 16QAM), (16QAM, QPSK), (QPSK, 64QAM) and (64QAM, QPSK), $1.0<w_{16}<w_{64}$ should be fulfilled.

The following generalizes the description above.

For generalization, assume that the modulation scheme for s1 is fixed to a modulation scheme C with which the number of signal points in the I-Q plane is c. Also assume that the modulation scheme for s2 is selectable from a modulation scheme A with which the number of signal points in the I-Q plane is a and a modulation scheme B with which the number of signal points in the I-Q plane is b (a>b>c). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B, is $1:w_b^2$. If this is the case, the reception device achieves a high data reception quality when $w_b<w_a$ is fulfilled.

Note that although "the modulation scheme for s1 is fixed to C" in the description above, even when "the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_b<w_a$. (If this is the case, as with the description above, when the average power of the modulation scheme C is 1, the average power of the modulation scheme A is $w_a^g$, and the average power of the modulation scheme B is $w_b^2$.) Also, when the set of (the modulation scheme for s1, the modulation scheme for s2) is selectable from the sets of (the modulation scheme C, the modulation scheme A), (the modulation scheme A, the modulation scheme C), (the modulation scheme C, the modulation scheme B) and (the modulation scheme B, the modulation scheme C), the average powers should fulfill $w_b<w_a$.

Example 5

The following explains another operation example that is different form Example 4, with reference to FIG. 108. Note that s1(*t*) denotes a baseband signal (mapped signal) of the modulation scheme 64QAM, and the mapping scheme is as shown in FIG. 109, and k is as represented by Equation 481. s2(*t*) denotes a baseband signal (mapped signal) of the modulation scheme 16QAM, and the mapping scheme is as shown in FIG. 94, and g is as represented by Equation 272. The sign t denotes time. In the present embodiment, hopping in the time domain is explained as an example.

The inputs to the power change unit (10701A) are the baseband signal 307A (mapped signal) of the modulation scheme 64QAM and the control signal (10700). When the value that has been set for the power change is v, the power change unit outputs a signal (10702A) generated by multiplying the baseband signal 307A (mapped signal) of the modulation scheme 64QAM by v, according to the control signal (10700).

The inputs to the power change unit (10701B) are the baseband signal 307B (mapped signal) of the modulation scheme 16QAM and the control signal (10700). When the value that has been set for the power change is u, the power change unit outputs a signal (10702B) generated by multiplying the baseband signal 307B (mapped signal) of the modulation scheme 16QAM by u, according to the control signal (10700). Then, $u \times v \times w$ ($w<1.0$) is fulfilled.

When the precoding matrices for the precoding scheme that regularly hops between precoding matrices are represented by F[t], the Equation 86 above is fulfilled.

In this case, the ratio between the average power of 64QAM and the average power of 16QAM is set to fulfill $v^2:u^2=v^2:v^2 \times w^2=1:w^2$. Consequently, the reception state will be that shown in FIG. 106, which shows that the data reception quality of the reception device is improved.

Conventionally, transmission power control is generally performed based on the feedback information received from the communication party. This Embodiment of the present invention is characterized by that the transmission power is controlled regardless of the feedback information from the communication party. The following explains this point in detail.

In the above, it is described that the values v and u for the power change are determined based on the control signal (10700). In the following, the determination, based on the control signal (10700), of the values v and u for the power change is described in detail, particularly with respect to the setting for further improving the data reception quality in the reception device.

Example 5-1

The following explains how to determine the average power (average value) for s1 and s2 according to the block length of the error correction coding applied to the data used for generating s1 and s2, assuming that the transmission device supports error correction coding for a plurality of block lengths (the number of bits constituting one block after coding, which is also referred to as a code length).

Examples of the error correction coding include block coding such as turbo coding or duo-binary turbo coding using tail-biting, LDPC coding, or the like. Many communications systems and broadcast systems support a plurality of block lengths. The data after the error correction coding with the block length selected from a plurality of block lengths supported thereby is distributed via two routes. The pieces of data distributed via two routes are respectively modulated by the modulation scheme for s1 and the modulation scheme for s2, and the baseband signals (mapped signals) s1(*t*) and s2(*t*) are generated.

The control signal (10700) is a signal indicating the block length of the selected error correction coding. The power change unit (10701A) sets the value v for the power change according to the control signal (10700). Similarly, the power change unit (10701B) sets the value u for the power change according to the control signal (10700).

The present invention is characterized by that the power change units (10701A, 10701B) set the values v and u for the power change according to the block length indicated by the control signal (10700). Here, the values for the power change according to a block length X are denoted as $v_{LX}$ and $u_{LX}$.

For example, when 1000 is selected as the block length, the power change unit (10701A) sets the value $v_{L1000}$ for the power change, and when 1500 is selected as the block length, the power change unit (10701A) sets the value $v_{L1500}$ for the power change, and when 3000 is selected as the block length, the power change unit (10701A) sets the value $v_{L3000}$ for the power change.

On the other hand, when 1000 is selected as the block length, the power change unit (10701B) sets the value $u_{L1000}$ for the power change, and when 1500 is selected as the block length, the power change unit (10701B) sets the value $u_{L1500}$ for the power change, and when 3000 is selected as the block length, the power change unit (10701B) sets the value $u_{L3000}$ for the power change.

In some cases, setting the values $v_{L1000}$, $v_{L1500}$ and $v_{L3000}$ to be different from each other may achieve a high error correction capability with respect to each coding length. Similarly, in some cases, setting the values $u_{L1000}$, $u_{L1500}$ and $u_{L3000}$ to be different from each other may achieve a high error correction capability with respect to each coding length. However, there is a possibility that changing the value for the power change is not effective, depending on the code length that has been set. In such cases, it is unnecessary to change the values for the power change even when the code length is changed. (For example, $u_{L1000}=u_{L1500}$ or $v_{L1000}=v_{L1500}$ may be fulfilled. The important point is that two or more values exist in the set of ($v_{L1000}$, $v_{L1500}$, $v_{L3000}$), and two or more values exist in the set of ($u_{L1000}$, $u_{L1500}$, $u_{L3000}$)). Note that the values $v_{LX}$ and $u_{LX}$ are set to fulfill the average power ratio $1:w^2$, as described above.

Although description is given to an example case where there are three code lengths, this is not essential. One important point is that there are two or more selectable values $u_{LX}$ for the power change when two or more code lengths are selectable, and when a code length is selected, the transmission device selects one from the values $u_{LX}$ for the power change and performs the power change. It is also important that there are two or more selectable values $v_{LX}$ for the power change when two or more code lengths are selectable, and when a code length is selected, the transmission device selects one from the values $v_{LX}$ for the power change and performs the power change.

Example 5-2

The following describes, with respect to the case where the transmission device supports error correction coding with a plurality of coding rates, how to set the average power (average value) of s1 and s2 according to the coding rate of the error correction coding that is to be used for generating s1 and s2.

Examples of the error correction coding include block coding such as turbo coding or duo-binary turbo coding using tail-biting, LDPC coding, or the like. Many communications systems and broadcast systems support a plurality of coding rates. The data after the error correction coding with the coding rate selected from a plurality of coding rates supported thereby is distributed via two routes. The pieces of data distributed via two routes are respectively modulated by the modulation scheme for s1 and the modulation scheme for s2, and the baseband signals (mapped signals) s1(*t*) and s2(*t*) are generated.

The control signal (10700) is a signal indicating the coding rate of the selected error correction coding. The power change unit (10701A) sets the value v for the power change according to the control signal (10700). Similarly, the power change unit (10701B) sets the value u for the power change according to the control signal (10700).

The present invention is characterized by that the power change units (10701A, 10701B) set the values v and u for the power change according to the coding rate indicated by the control signal (10700). Here, the values for the power change according to a coding rate rx are denoted as $v_{rx}$ and $u_{rx}$.

For example, when r1 is selected as the coding rate, the power change unit (10701A) sets the value $v_{r1}$ for the power change, and when r2 is selected as the coding rate, the power change unit (10701A) sets the value $v_{r2}$ for the power change, and when r3 is selected as the coding rate, the power change unit (10701A) sets the value $v_{r3}$ for the power change.

Similarly, when r1 is selected as the coding rate, the power change unit (10701B) sets the value $u_{r1}$ for the power change, and when r2 is selected as the coding rate, the power change unit (10701B) sets the value $u_{r2}$ for the power change, and when r3 is selected as the coding rate, the power change unit (10701B) sets the value $u_{r3}$ for the power change.

In some cases, setting the values $v_{r1}$, $v_{r2}$ and $v_{r3}$ to be different from each other may achieve a high error correction capability with respect to each coding rate. Similarly, in some cases, setting the values $u_{r1}$, $u_{r2}$ and $u_{r3}$ to be different from each other may achieve a high error correction capability with respect to each coding rate. However, there is a possibility that changing the value for the power change is not effective, depending on the coding rate that has been set. In such cases, it is unnecessary to change the values for the power change even when the coding rate is changed. (For example, $v_{r1}=v_{r2}$ or $u_{r1}=u_{r2}$ may be fulfilled. The important point is that two or more values exist in the set of ($v_{r1}$, $v_{r2}$, $v_{r3}$), and two or more values exist in the set of ($u_{r1}$, $u_{r2}$, $u_{r3}$)). Note that the values $v_{rx}$ and $u_{rx}$ are set to fulfill the average power ratio $1:w^2$, as described above.

For example, the coding rates r1, r2 and r3 may be ½, ⅔ and ¾ when the error correction coding is LDPC coding.

Although description is given to an example case where there are three coding rates, this is not essential. One important point is that there are two or more selectable values $u_{rx}$ for the power change when two or more coding rates are selectable, and when a coding rate is selected, the transmission device selects one from the values $u_{rx}$ for the power change and performs the power change. It is also important that there are two or more selectable values $v_{rx}$ for the power change when two or more code lengths are selectable, and when a code length is selected, the transmission device selects one from the values $v_{rx}$ for the power change and performs the power change.

Example 5-3

To achieve a higher data reception quality in the reception device, the following points are important.

The following describes, with respect to the case where the transmission device supports a plurality of modulation schemes, how to set the average power (average value) of s1 and s2 according to the modulation scheme that is to be used for generating s1 and s2.

For example, the following describes the case in which the modulation scheme for s1 is fixed to 64QAM, and the modulation scheme for s2 is changed from 16QAM to 64QAM (or either 16QAM or 64QAM is applicable). When modulation scheme for s1 is 64QAM, the mapping scheme for s1(*t*) is as shown in FIG. 109. In FIG. 109, k is represented by Equation 481. When the modulation scheme for s2 is 16QAM, the mapping scheme for s2(*t*) is as shown in FIG. 94. In FIG. 94, g is represented by Equation 272. When the modulation scheme for s2(*t*) is QPSK, the mapping scheme for s2(*t*) is as shown in FIG. 95. In FIG. 95, h is represented by Equation 273.

In FIG. 108, when the modulation scheme for s1 is 64QAM and the modulation scheme for s2 is 16QAM, assume that $v=\alpha$ and $u=\alpha\times w_{16}$. In this case, the ratio between the average power of 64QAM and the average power of 16QAM is $v^2:u^2=\alpha^2:\alpha^2\times w_{16}^2=1:w_{16}^2$.

In FIG. 108, when the modulation scheme for s1 is 64QAM and the modulation scheme for s2 is QPSK, assume that $v=\beta$ and $u=\beta\times w_4$. In this case, the ratio between the average power of 64QAM and the average power of QPSK is $v^2:u^2=\beta^2:\beta^2\times w_4^2=1:w_4^2$. In this case, according to the minimum Euclidean distance relationship, the reception device achieves a high data reception quality when $w_4<w_{16}<1.0$, regardless of whether the modulation scheme for s2 is 16QAM or QPSK.

Note that although "the modulation scheme for s1 is fixed to 64QAM" in the description above, it is possible that "the modulation scheme for s2 is fixed to 64QAM and the modulation scheme for s1 is changed from 16QAM to QPSK (set to either 16QAM or QPSK)", $w_4<w_{16}<1.0$ should be fulfilled. (The same as described in Example 4-3.) (Note that the value used for the multiplication for the power change in the case of 16QAM is $u=\alpha\times w_{16}$, the value used for the multiplication for the power change in the case of QPSK is $u=\beta\times w_4$, the value used for the power change in the case of 64QAM is $v=\alpha$ when the selectable modulation scheme is 16QAM and v=β when the selectable modulation scheme is QPSK.) Also, when the set of (the modulation scheme for s1, the modulation scheme for s2) is selectable from the sets of (64QAM, 16QAM), (16QAM, 64QAM), (64QAM, QPSK) and (QPSK, 64QAM), $w_4<w_{16}<1.0$ should be fulfilled.

The following generalizes the description above.

For generalization, assume that the modulation scheme for s1 is fixed, and the modulation scheme therefor is a modulation scheme C with which the number of signal points on the I-Q plane is c. Also assume that the modulation scheme for s2 is selectable from the modulation scheme A with which the number of signal points on the I-Q plane is a and a modulation scheme B with which the number of signal points on the I-Q plane is b (c>b>a). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B is $1:w_b^2$. If this is the case, the reception device achieves a high data reception quality when $w_a<w_b$ is fulfilled.

Note that although "the modulation scheme for s1 is fixed to C" in the description above, even when "the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_a<w_b$. (If this is the case, as with the description above, when the average power of the modulation scheme is C, the average power of the modulation scheme A is $w_a^2$, and the average power of the modulation scheme B is $w_b^2$.) Also, when the set of (the modulation scheme for s1, the modulation scheme for s2) is selectable from the sets of (the modulation scheme C, the modulation scheme A), (the modulation scheme A, the modulation scheme C), (the modulation scheme C, the modulation scheme B) and (the modulation scheme B, the modulation scheme C), the average powers should fulfill $w_a<w_b$.

Example 6

The following explains another operation example that is different form Example 4, with reference to FIG. 108. s1(*t*) denotes a baseband signal (mapped signal) of the modulation scheme 16QAM, and the mapping scheme is as shown in FIG. 94, and g is as represented by Equation 272. s2(*t*) denotes a baseband signal (mapped signal) of the modulation scheme 64QAM, and the mapping scheme is as shown in FIG. 109, and k is as represented by Equation 481. The sign t denotes time. In the present Embodiment, the time domain is taken as an example.

The inputs to the power change unit (10701A) are the baseband signal 307A (mapped signal) of the modulation scheme 16QAM and the control signal 10700. When the value that has been set for the power change is v, the power change unit outputs a signal (10702A) generated by multiplying the baseband signal 307A (mapped signal) of the modulation scheme 16QAM by v, according to the control signal (10700).

The inputs to the power change unit (10701B) are the baseband signal 307B (mapped signal) of the modulation scheme 64QAM and the control signal (10700). When the value that has been set for the power change is u, the power change unit outputs a signal (10702B) generated by multiplying the baseband signal 307B (mapped signal) of the modulation scheme 64QAM by u, according to the control signal (10700). Then, u=v×w (w<1.0) is fulfilled.

When the precoding matrices for the precoding scheme that regularly hops between precoding matrices are represented by F[t], the Equation 86 above is fulfilled.

In this case, the ratio between the average power of 64QAM and the average power of 16QAM is set to fulfill $v^2:u^2=v^2:v^2\times w^2=1:w^2$. Consequently, the reception state will be that shown in FIG. 106, which shows that the data reception quality of the reception device is improved.

Conventionally, transmission power control is generally performed based on the feedback information received from the communication party. This Embodiment of the present invention is characterized by that the transmission power is controlled regardless of the feedback information from the communication party. The following explains this point in detail.

In the above, it is described that the values v and u for the power change are determined based on the control signal (10700). In the following, the determination, based on the control signal (10700), of the values v and u for the power change is described in detail, particularly with respect to the setting for further improving the data reception quality in the reception device.

Example 6-1

The following explains how to determine the average power (average value) for s1 and s2 according to the block length of the error correction coding applied to the data used for generating s1 and s2, assuming that the transmission device supports error correction coding for a plurality of block lengths (the number of bits constituting one block after coding, which is also referred to as a code length).

Examples of the error correction coding include block coding such as turbo coding or duo-binary turbo coding using tail-biting, LDPC coding, or the like. Many communications systems and broadcast systems support a plurality of block lengths. The data after the error correction coding with the block length selected from a plurality of block lengths supported thereby is distributed via two routes. The pieces of data distributed via two routes are respectively modulated by the modulation scheme for s1 and the modulation scheme for s2, and the baseband signals (mapped signals) s1(*t*) and s2(*t*) are generated.

The control signal (10700) is a signal indicating the block length of the selected error correction coding. The power change unit (10701A) sets the value v for the power change according to the control signal (10700). Similarly, the power change unit (10701B) sets the value u for the power change according to the control signal (10700).

The present invention is characterized by that the power change units (10701A, 10701B) set the values v and u for the power change according to the block length indicated by the control signal (10700). Here, the values for the power change according to a block length X are denoted as $v_{LX}$ and $u_{LX}$.

For example, when 1000 is selected as the block length, the power change unit (10701A) sets the value $v_{L1000}$ for the power change, and when 1500 is selected as the block length, the power change unit (10701A) sets the value $v_{L1500}$ for the power change, and when 3000 is selected as the block length, the power change unit (10701A) sets the value $v_{L3000}$ for the power change.

On the other hand, when 1000 is selected as the block length, the power change unit (10701B) sets the value $u_{L1000}$ for the power change, and when 1500 is selected as the block length, the power change unit (10701B) sets the value $u_{L1500}$ for the power change, and when 3000 is selected as the block length, the power change unit (10701B) sets the value $u_{L3000}$ for the power change.

In some cases, setting the values $v_{1000}$, $v_{L1500}$ and $v_{L3000}$ to be different from each other may achieve a high error correction capability with respect to each coding length. Similarly, in some cases, setting the values $u_{L1000}$, $u_{L1500}$ and $u_{L3000}$ to be different from each other may achieve a high error correction capability with respect to each coding length. However, there is a possibility that changing the value for the power change is not effective, depending on the code length that has been set. In such cases, it is unnecessary to change the values for the power change even when the code length is changed. (For example, $u_{L1000}=u_{L1500}$ or $v_{L1000}=v_{L1500}$ may be fulfilled. The important point is that two or more values exist in the set of ($v_{L1000}$, $v_{L1500}$, $v_{L3000}$), and two or more values exist in the set of ($u_{L1000}$, $u_{L1500}$, $u_{L3000}$)). Note that the values $v_{LX}$ and $u_{LX}$ are set to fulfill the average power ratio $1:w^2$, as described above.

Although description is given to an example case where there are three code lengths, this is not essential. One important point is that there are two or more selectable values $u_{LX}$ for the power change when two or more code lengths are selectable, and when a code length is selected, the transmission device selects one from the values $u_{LX}$ for the power change and performs the power change. It is also important that there are two or more selectable values $v_{LX}$ for the power change when two or more code lengths are selectable, and when a code length is selected, the transmission device selects one from the values $v_{LX}$ for the power change and performs the power change.

Example 6-2

The following describes, with respect to the case where the transmission device supports error correction coding with a plurality of coding rates, how to set the average power of s1 and s2 according to the coding rate of the error correction coding that is to be used for generating s1 and s2.

Examples of the error correction coding include block coding such as turbo coding or duo-binary turbo coding using tail-biting, LDPC coding, or the like. Many communications systems and broadcast systems support a plurality of coding rates. The data after the error correction coding with the coding rate selected from a plurality of coding rates supported thereby is distributed via two routes. The pieces of data distributed via two routes are respectively modulated by the modulation scheme for s1 and the modulation scheme for s2, and the baseband signals (mapped signals) s1($t$) and s2($t$) are generated.

The control signal (10700) is a signal indicating the coding rate of the selected error correction coding. The power change unit (10701A) sets the value v for the power change according to the control signal (10700). Similarly, the power change unit (10701B) sets the value u for the power change according to the control signal (10700).

The present invention is characterized by that the power change units (10701A, 10701B) set the values v and u for the power change according to the coding rate indicated by the control signal (10700). Here, the values for the power change according to a coding rate rx are denoted as $v_{rx}$ and $u_{rx}$.

For example, when r1 is selected as the coding rate, the power change unit (10701A) sets the value $v_{r1}$ for the power change, and when r2 is selected as the coding rate, the power change unit (10701A) sets the value $v_{r2}$ for the power change, and when r3 is selected as the coding rate, the power change unit (10701A) sets the value $v_{r3}$ for the power change.

Similarly, when r1 is selected as the coding rate, the power change unit (10701B) sets the value $u_{r1}$ for the power change, and when r2 is selected as the coding rate, the power change unit (10701B) sets the value $u_{r2}$ for the power change, and when r3 is selected as the coding rate, the power change unit (10701B) sets the value $u_{r3}$ for the power change.

In some cases, setting the values $v_{r1}$, $v_{r2}$ and $v_{r3}$ to be different from each other may achieve a high error correction capability with respect to each coding rate. Similarly, in some cases, setting the values $u_{r1}$, $u_{r2}$ and $u_{r3}$ to be different from each other may achieve a high error correction capability with respect to each coding rate. However, there is a possibility that changing the value for the power change is not effective, depending on the coding rate that has been set. In such cases, it is unnecessary to change the values for the power change even when the coding rate is changed. (For example, $v_{r1}=v_{r2}$ or $u_{r1}=u_{r2}$ may be fulfilled. The important point is that two or more values exist in the set of ($v_{r1}$, $v_{r2}$, $v_{r3}$), and two or more values exist in the set of ($u_{r1}$, $u_{r2}$, $u_{r3}$)). Note that the values $v_{rx}$ and $u_{rx}$ are set to fulfill the average power ratio $1:w^2$, as described above.

For example, the coding rates r1, r2 and r3 may be ½, ⅔ and ¾ when the error correction coding is LDPC coding.

Although description is given to an example case where there are three coding rates, this is not essential. One important point is that there are two or more selectable values $u_{rx}$ for the power change when two or more coding rates are selectable, and when a coding rate is selected, the transmission device selects one from the values $u_{rx}$ for the power change and performs the power change. It is also important that there are two or more selectable values $v_{rx}$ for the power change when two or more code lengths are selectable, and when a code length is selected, the transmission device selects one from the values $v_{rx}$ for the power change and performs the power change.

Example 6-3

To achieve a higher data reception quality in the reception device, the following points are important.

The following describes, with respect to the case where the transmission device supports a plurality of modulation schemes, how to set the average power (average value) of s1 and s2 according to the modulation scheme that is to be used for generating s1 and s2.

For example, the following describes the case in which the modulation scheme for s1 is fixed to 16QAM, and the modulation scheme for s2 is changed from 64QAM to QPSK (or either 16QAM or QPSK is applicable). When modulation scheme for s1 is 16QAM, the mapping scheme for s1($t$) is as shown in FIG. 94. In FIG. 94, g is represented by Equation 272. When the modulation scheme for s2 is 64QAM, the mapping scheme for s2($t$) is as shown in FIG. 109. In FIG. 109, k is represented by Equation 481. When the modulation scheme for s2(*t*) is QPSK, the mapping scheme for s2(*t*) is as shown in FIG. 95. In FIG. 95, h is represented by Equation 273.

In FIG. 108, when the modulation scheme for s1 is 16QAM and the modulation scheme for s2 is 64QAM, assume that v=α and u=α×$w_{64}$. In this case, the ratio between the average power of 64QAM and the average power of 16QAM is $v^2:u^2=\alpha^2:\alpha^2\times w_{64}^2=1:w_{64}^2$.

In FIG. 108, when the modulation scheme for s1 is 16QAM and the modulation scheme for s2 is QPSK, assume that v=β and u=β×$w_4$. In this case, the ratio between the average power of 64QAM and the average power of QPSK is $v^2:u^2=\beta^2:\beta^2\times w_4^2=1:w_4^2$. In this case, according to the minimum Euclidean distance relationship, the reception device achieves a high data reception quality when $w_4<w_{64}$, regardless of whether the modulation scheme for s2 is 64QAM or QPSK.

Note that although "the modulation scheme for s1 is fixed to 16QAM" in the description above, it is possible that "the modulation scheme for s2 is fixed to 16QAM and the modulation scheme for s1 is changed from 64QAM to QPSK (set to either 16QAM or QPSK)", $w_4<w_{64}$ should be fulfilled. (The same as described in Example 4-3.) (Note that the value used for the multiplication for the power change in the case of 16QAM is u=α×$w_m$, the value used for the multiplication for the power change in the case of QPSK is u=β×$w_4$, the value used for the power change in the case of 64QAM is v=α when the selectable modulation scheme is 16QAM and v=β when the selectable modulation scheme is QPSK.) Also, when the set of (the modulation scheme for s1, the modulation scheme for s2) is selectable from the sets of (16QAM, 64QAM), (64QAM, 16QAM), (16QAM, QPSK) and (QPSK, 16QAM), $w_4<w_{64}$ should be fulfilled.

The following generalizes the description above.

For generalization, assume that the modulation scheme for s1 is fixed, and the modulation scheme therefor is a modulation scheme C with which the number of signal points on the I-Q plane is c. Also assume that the modulation scheme for s2 is selectable from the modulation scheme A with which the number of signal points on the I-Q plane is a and a modulation scheme B with which the number of signal points on the I-Q plane is b (c>b>a). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B is $1:w_b^2$. If this is the case, the reception device achieves a high data reception quality when $w_a<w_b$ is fulfilled.

Note that although "the modulation scheme for s1 is fixed to C" in the description above, even when "the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_a<w_b$. (If this is the case, as with the description above, when the average power of the modulation scheme is C, the average power of the modulation scheme A is $w_a^g$, and the average power of the modulation scheme B is $w_b^2$.) Also, when the set of (the modulation scheme for s1 and the modulation scheme for s2) is selectable from the sets of (the modulation scheme C and the modulation scheme A), (the modulation scheme A and the modulation scheme C), (the modulation scheme C and the modulation scheme B) and (the modulation scheme B and the modulation scheme C), the average powers should fulfill $w_a<w_b$.

Electrical Power

In the present description including "Embodiment 8", "Embodiment 9", "Embodiment 10", "Embodiment 18", "Embodiment 19", "Embodiment C1" and "Embodiment C2", the power consumption by the transmission device can be reduced by setting α=1 in the equation of precoding matrix used for the precoding scheme that regularly hops between precoding matrices. This is because the average power of z1 and the average power of z2 are the same even when "the average power (average value) of s1 and the average power (average value) of s2 are set to be different when the modulation scheme for s1 and the modulation scheme for s2 are different", and setting α=1 does not result in increasing the PAPR (Peak-to-Average Power Ratio) of the transmission power amplifier provided in the transmission device. For example, the precoding matrices used with the precoding scheme that regularly hops between precoding matrices may be set according to Equation #3, Equation #14, Equation #15 and Equation #16 in Embodiment C1 or Equation #20, Equation #24, Equation #25 and Equation #26 in Embodiment C2. Also, α=1 is to be fulfilled when, for example, the precoding matrices used with the precoding scheme that regularly hops between precoding matrices are generalized as shown in to Equation 268 and Equation 269 in Embodiment 18, or in Equation #1, Equation #2, Equation #9, Equation #10, Equation #12 and Equation #13 in Embodiment C1, or in Equation #18, Equation #19, Equation #21, Equation #22 and Equation #23 in Embodiment C2. The same applies to the other embodiments. (Note that the number of the slots in the period (cycle) is not limited to an odd number.)

However, even when α≠1, there are some precoding matrices that can be used with the precoding scheme that regularly hops between precoding matrices and have limited influence to PAPR. For example, when the precoding matrices represented by Equation 279 and Equation 280 in Embodiment 19 are used, the precoding scheme that regularly hops precoding matrices, the precoding matrices have limited influence to PAPR even when α≠1. (Note that the precoding scheme relating to Embodiment 19 that regularly hops between precoding matrices is described in Embodiment 10 as well. Also, in Embodiment 13 and Embodiment 20, the precoding matrices have only limited influence to PAPR even when α≠1.)

Reception Device

In the case of Example 1, Example 2 and Example 3, the following relationship is derived from FIG. 5.

Math 610

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} = \begin{pmatrix} h_{11}(t) & h_{12}(t) \\ h_{21}(t) & h_{22}(t) \end{pmatrix} F[t] \begin{pmatrix} e^{j0} & 0 \\ 0 & ue^{j0} \end{pmatrix} \begin{pmatrix} s1(t) \\ s2(t) \end{pmatrix} = \begin{pmatrix} h_{11}(t) & h_{12}(t) \\ h_{21}(t) & h_{22}(t) \end{pmatrix} F[t] \begin{pmatrix} 1 & 0 \\ 0 & u \end{pmatrix} \begin{pmatrix} s1(t) \\ s2(t) \end{pmatrix} \quad \text{Equation 487}$$

Also, as explained in Example 1, Example 2, and Example 3, the relationship may be as follows:

Math 611

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} = \begin{pmatrix} h_{11}(t) & h_{12}(t) \\ h_{21}(t) & h_{22}(t) \end{pmatrix} F[t] \begin{pmatrix} ue^{j0} & 0 \\ 0 & e^{j0} \end{pmatrix} \begin{pmatrix} s1(t) \\ s2(t) \end{pmatrix} = \begin{pmatrix} h_{11}(t) & h_{12}(t) \\ h_{21}(t) & h_{22}(t) \end{pmatrix} F[t] \begin{pmatrix} u & 0 \\ 0 & 1 \end{pmatrix} \begin{pmatrix} s1(t) \\ s2(t) \end{pmatrix} \quad \text{Equation 488}$$

The reception device performs demodulation (detection) (i.e. estimates the bits transmitted by the transmission device) by using the relationships described above (in the same manner as described in Embodiment 1, Embodiments A1 to A5, and so on).

In the case of Example 4, Example 5 and Example 6, the following relationship is derived from FIG. 5.

Math 612

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} = \begin{pmatrix} h_{11}(t) & h_{12}(t) \\ h_{21}(t) & h_{22}(t) \end{pmatrix} F[t] \begin{pmatrix} ve^{j0} & 0 \\ 0 & ue^{j0} \end{pmatrix} \begin{pmatrix} s1(t) \\ s2(t) \end{pmatrix} = \begin{pmatrix} h_{11}(t) & h_{12}(t) \\ h_{21}(t) & h_{22}(t) \end{pmatrix} F[t] \begin{pmatrix} v & 0 \\ 0 & u \end{pmatrix} \begin{pmatrix} s1(t) \\ s2(t) \end{pmatrix} = \begin{pmatrix} h_{11}(t) & h_{12}(t) \\ h_{21}(t) & h_{22}(t) \end{pmatrix} F[t] \begin{pmatrix} v & 0 \\ 0 & v \times w \end{pmatrix} \begin{pmatrix} s1(t) \\ s2(t) \end{pmatrix} \quad \text{Equation 489}$$

Also, as explained in Example 4, Example 5, and Example 6, the relationship may be as follows:

Math 613

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} = \begin{pmatrix} h_{11}(t) & h_{12}(t) \\ h_{21}(t) & h_{22}(t) \end{pmatrix} F[t] \begin{pmatrix} ue^{j0} & 0 \\ 0 & ve^{j0} \end{pmatrix} \begin{pmatrix} s1(t) \\ s2(t) \end{pmatrix} = \begin{pmatrix} h_{11}(t) & h_{12}(t) \\ h_{21}(t) & h_{22}(t) \end{pmatrix} F[t] \begin{pmatrix} u & 0 \\ 0 & v \end{pmatrix} \begin{pmatrix} s1(t) \\ s2(t) \end{pmatrix} = \begin{pmatrix} h_{11}(t) & h_{12}(t) \\ h_{21}(t) & h_{22}(t) \end{pmatrix} F[t] \begin{pmatrix} v \times w & 0 \\ 0 & v \end{pmatrix} \begin{pmatrix} s1(t) \\ s2(t) \end{pmatrix} \quad \text{Equation 490}$$

The reception device performs demodulation (detection) (i.e. estimates the bits transmitted by the transmission device) by using the relationships described above (in the same manner as described in Embodiment 1, Embodiments A1 to A5, and so on).

Relationship between Power change and Mapping

As described in Example 1, Example 2, and Example 3, and as particularly shown in Equation 487, the mapping unit 306B in FIG. 4 may output u×s2($t$), and the power change unit may be omitted in such cases. If this is the case, it can be said that the precoding scheme for regularly hopping between precoding matrices is applied to the signal s1($t$) after the mapping and the signal u×s2($t$) after the mapping.

As described in Example 1, Example 2, and Example 3, and as particularly shown in Equation 488, the mapping unit 306A in FIG. 3 and FIG. 4 may output u×s1($t$), and the power change unit may be omitted in such cases. If this is the case, it can be said that the precoding scheme for regularly hopping between precoding matrices is applied to the signal u×s1($t$) after the mapping and the signal s2($t$) after the mapping.

In Example 4, Example 5, and Example 6, as particularly shown in Equation 489, the mapping unit 306A in FIG. 3 and FIG. 4 may output v×s1($t$), and the mapping unit 306B may output u×s2($t$), and the power change unit may be omitted in such cases. If this is the case, it can be said that the precoding scheme for regularly hopping between precoding matrices is applied to the signal v×s1($t$) after the mapping and the signal u×s2($t$) after the mapping.

In Example 4, Example 5, and Example 6, as particularly shown in Equation 490, the mapping unit 306A in FIG. 3 and FIG. 4 may output u×s1($t$), and the mapping unit 306B may output v×s2($t$), and the power change unit may be omitted in such cases. If this is the case, it can be said that the precoding scheme for regularly hopping between precoding matrices is applied to the signal u×s1($t$) after the mapping and the signal v×s2($t$) after the mapping.

That is, F[t] in the present embodiment denotes precoding matrices used by the precoding scheme that regularly hops between precoding matrices, and examples of F[t] are in conformity with one of Equation #3, Equation #14, Equation #15 and Equation #16 in Embodiment C1 and Equation #20, Equation #24, Equation #25 and Equation #26 in Embodiment C2. Alternatively, examples of F[t] are in conformity with one of Equation 268 and Equation 269 in Embodiment 18, Equation #1, Equation #2, Equation #9, Equation #10, Equation #12 and Equation #13 in Embodiment C1, and Equation #18, Equation #19, Equation #21, Equation #22 and Equation #23 in Embodiment C2. (Note that the number of the slots in the period (cycle) is not limited to an odd number.)

Alternatively, F[t] may be a precoding scheme that uses precoding matrices represented by Equation 279 and Equation 280 in Embodiment 19 and regularly hops between the precoding matrices. (Note that the precoding scheme relating to Embodiment 19 that regularly hops between precoding matrices is described in Embodiment 10, Embodiment 13, and Embodiment 20 as well. Also, F[t] may be a precoding scheme that regularly hops between precoding matrices described in Embodiment 10, Embodiment 13, and Embodiment 20.)

Note that F[t] denotes a precoding matrices used at time t when the precoding scheme that regularly hops between precoding matrices is adopted. The reception device performs demodulation (detection) by using the relationships between r1($t$), r2($t$) and s1($t$), s2($t$) described above (in the same manner as described in Embodiment 1, Embodiments A1 to A5, and so on). However, distortion components, such as noise components, frequency offset, channel estimation error, and the likes are not considered in the equations described above. Hence, demodulation (detection) is performed with them. Regarding the values u and v that the transmission device uses for performing the power change, the transmission device transmits information about these values, or transmits information of the transmission mode (such as the transmission scheme, the modulation scheme and the error correction scheme) to be used. The reception device detects the values used by the transmission device by acquiring the information, obtains the relationships described above, and performs the demodulation (detection).

In the present embodiment, the hopping between the precoding matrices is performed in the time domain. However, when a multi-carrier transmission scheme such as an OFDM scheme is used, the present invention is applicable to the case where the hopping between the precoding matrices is performed in the frequency domain, as described in other embodiments. If this is the case, t used in the present embodiment is to be replaced with f (frequency ((sub) carrier)).

Accordingly, in the case of performing the hopping between the precoding matrices in the time domain, z1(*t*) and z2(*t*) at the same time point is transmitted from different antennas by using the same frequency. On the other hand, in the case of performing the hopping between the precoding matrices in the frequency domain, z1(*f*) and z2(*f*) at the same frequency is transmitted from different antennas at the same time point.

Also, even in the case of performing the hopping between the precoding matrices in the time and frequency domains, the present invention is applicable as described in other embodiments. The precoding scheme pertaining to the present embodiment, which regularly hops between precoding matrices, is not limited the precoding scheme which regularly hops between precoding matrices as described in the present Description. Even when the precoding matrices are fixed (according to a scheme in which the precoding matrices are not represented by F(t) (i.e. not a function of t (or f)), adopting the average power of s1(*t*) and the average power of s2(*t*) as described in the present embodiment advantageously improves the data reception quality in the reception device.

Embodiment G1

The present embodiment describes the case where, when the modulation schemes used for generating s1 and s2 are different, the setting scheme for making the average powers of s1 and s2 different from each other is adopted in combination with the precoding scheme that regularly hops between precoding matrices that use the unitary matrix which is based on Embodiment 9 and is described in Embodiment 18. In the scheme of regularly hopping between precoding matrices over a period (cycle) with N slots as described in Embodiment 8, the precoding matrices prepared for the N slots with reference to Equations (82)-(85) are represented as follows.

Math 614

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\delta)} \end{pmatrix} \tag{268}$$

In this case, i=0, 1, 2, . . . , N−2, N−1. (α>0.) Since a unitary matrix is used in the present embodiment, the precoding matrices in Equation 268 may be represented as follows.

Math 615

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix} \tag{269}$$

In this case, i=0, 1, 2, . . . , N−2, N−1. (α>0.) From Condition #5 (Math 106) and Condition #6 (Math 107) in Embodiment 3, the following condition is important for achieving high data reception quality.

Math 616

$$e^{j(\theta_{11}(x)-\theta_{21}(x))}\neq e^{j(\theta_{11}(y)-\theta_{21}(y))} \qquad \text{Condition \#53}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Math 617

$$e^{j(\theta_{11}(x)-\theta_{21}(x)-\pi)}\neq e^{j(\theta_{11}(y)-\theta_{21}(y)-\pi)} \qquad \text{Condition \#54}$$

for ∀x, ∀y (x≠y; x,y=0, 1, 2, . . . , N−2, N−1)

(x is 0, 1, 2, . . . , N−2, N−1; y is 0, 1, 2, . . . , N−2, N−1; and x≠y.)

Precoding matrices F[0]-F[N−1] are generated based on Equation 269 (the precoding matrices F[0]-F[N−1] may be in any order for the N slots in the period (cycle). Symbol number Ni may be precoded using F[0], symbol number Ni+1 may be precoded using F[1], . . . , and symbol number N×i+h may be precoded using F[h], for example (h=0, 1, 2, . . . , N−2, N−1). (In this case, as described in previous embodiments, precoding matrices need not be hopped between regularly.)

When N=5, precoding matrices prepared for the N slots, based on Equation 269 are represented as follows, for example.

Math 618

$$F[i=0]=\frac{1}{\sqrt{\alpha^2+1}}\begin{pmatrix} e^{j0} & \alpha\times e^{j0} \\ \alpha\times e^{j0} & e^{j\pi} \end{pmatrix} \tag{274}$$

Math 619

$$F[i=1]=\frac{1}{\sqrt{\alpha^2+1}}\begin{pmatrix} e^{j0} & \alpha\times e^{j0} \\ \alpha\times e^{j\frac{2}{5}\pi} & \alpha\times e^{j(\frac{2}{5}\pi+\pi)} \end{pmatrix} \tag{275}$$

Math 620

$$F[i=2]=\frac{1}{\sqrt{\alpha^2+1}}\begin{pmatrix} e^{j0} & \alpha\times e^{j0} \\ \alpha\times e^{j\frac{4}{5}\pi} & \alpha\times e^{j(\frac{4}{5}\pi+\pi)} \end{pmatrix} \tag{276}$$

Math 621

$$F[i=3]=\frac{1}{\sqrt{\alpha^2+1}}\begin{pmatrix} e^{j0} & \alpha\times e^{j0} \\ \alpha\times e^{j\frac{6}{5}\pi} & \alpha\times e^{j(\frac{6}{5}\pi+\pi)} \end{pmatrix} \tag{277}$$

Math 622

$$F[i=4]=\frac{1}{\sqrt{\alpha^2+1}}\begin{pmatrix} e^{j0} & \alpha\times e^{j0} \\ \alpha\times e^{j\frac{8}{5}\pi} & \alpha\times e^{j(\frac{8}{5}\pi+\pi)} \end{pmatrix} \tag{278}$$

As described above, in order to reduce the calculation scale of the precoding by the transmission device, $\theta_{11}(i)=0$ radians and 2=0 radians should be fulfilled in Equation 269. Note that λ in Equation 269 may be varied according to i, or be fixed. That is, in Equation 269, λ in F[i=x] and λ in F[i=y] (x≠y) may be the same or different.

Regarding the value to be set to a, although using the value described above is effective, this is not essential. For example, α may be determined according to the value of i in the matrices F[i], as described in Embodiment 17. (That is, α in F[i] is not necessarily a fixed value when i is changed).

In the present embodiment, the scheme of structuring N different precoding matrices for a precoding hopping scheme with an N-slot time period (cycle) has been described. In this case, as the N different precoding matrices, F[0], F[1], F[2], . . . , F[N−2], F[N−1] are prepared. When a single carrier transmission scheme is adopted, symbols are arranged in the order F[0], F[1], F[2], F[N−2], F[N−1] in the time domain (Alternatively, it can be arranged in the frequency domain when a multicarrier transmission scheme is adopted). The present invention is not, however, limited in this way, and the N different precoding matrices F[0], F[1], F[2], . . . , F[N−2], F[N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with a N-slot time period (cycle) has been described, but the same advantageous effects may be obtained by randomly using N different precoding matrices. In other words, the N different precoding matrices do not necessarily need to be used in a regular period (cycle).

Furthermore, in the precoding matrix hopping scheme over an H-slot period (cycle) (H being a natural number larger than the number of slots N in the period (cycle) of the above scheme of regularly hopping between precoding matrices), when the N different precoding matrices of the present embodiment are included, the probability of high reception quality increases. In this case, Condition #55 and Condition #56 can be replaced by the following conditions. (The number of slots in the period (cycle) is considered to be N.)

Math 623

$$e^{j(\theta_{11}(x)-\theta_{21}(x))} \neq e^{j(\theta_{11}(y)-\theta_{21}(y))} \quad \text{Condition \#55'}$$

for ∃x, ∃y (x≠y; x,y=0, 1, 2, . . . , N−2, N−1; and x≠y.)
(x is 0, 1, 2, . . . , N−2, N−1; y is 0, 1, 2, . . . , N−2, N−1; and x≠y.)

Math 624

$$e^{j(\theta_{11}(x)-\theta_{21}(x)-\pi)} \neq e^{j(\theta_{11}(y)-\theta_{21}(y)-\pi)} \quad \text{Condition \#56'}$$

for ∃x, ∃y (x≠y; x,y=0, 1, 2, . . . , N−2, N−1)
(x is 0, 1, 2, . . . , N−2, N−1; y is 0, 1, 2, . . . , N−2, N−1; and x≠y.)

In the present embodiment, the case where λ=0 radians is explained as an example of precoding matrices when λ is a fixed value. Considering the mapping of the modulation scheme, λ may be fixed to be λ=π/2 radians, λ=π radians, or λ=(3π)/2 radians. (It is assumed, for example, that λ=π radians in the precoding matrices for the precoding scheme that regularly hops between precoding matrices). This setting reduces the circuit scale as with the case where λ=0 radians.

The following describes the setting scheme for the average powers of s1 and s2 to be set to the precoding scheme that regularly hops between precoding matrices as described in Embodiment 18 for example when the modulation schemes used for generating s1 and s2 are different (For details, see Embodiment F1).

"The setting scheme for the average powers of s1 and s2 when the modulation schemes for s1 and s2 are different" is applicable to all the precoding schemes described in the present Description, which regularly hops between precoding matrices. The important points are:

—As an error correction coding (encoded) block coding such as turbo coding or duo-binary turbo coding using tail-biting, LDPC coding, or the like is used, and a plurality of block lengths (the number of bits that constitute one block)(code length) are supported, and when the transmission device selects one of the plurality of block lengths and performs error correction coding with the selected block length, the transmission device changes the setting scheme for the average powers (average values) of s1 and s2 according to the selected block length when the modulation scheme for s1 and the modulation scheme for s2 are different. —With an error correction coding, a plurality of coding rates are supported, and when the transmission device selects one of the plurality of coding rates and performs error correction coding with the selected coding rate, the transmission device changes the setting scheme for the average powers (average values) of s1 and s2 according to the selected coding rate when the modulation scheme for s1 and the modulation scheme for s2 are different.

When the modulation scheme for s1 and the modulation scheme for s2 are different, a plurality of selectable modulation schemes for s2 are supported, and the schemes for setting the average powers (average values) for s1 and s2 are switched according to the modulation scheme that the transmission device uses for generating s2.

When the modulation scheme for s1 and the modulation scheme for s2 are different, a plurality of selectable modulation schemes for s1 are supported, and the schemes for setting the average powers (average values) for s1 and s2 are switched according to the modulation scheme that the transmission device uses for generating s1.

"The setting scheme for the average powers of s1 and s2 when the modulation scheme for s1 and the modulation scheme for s2 are different" described in the present embodiment is not necessarily the precoding scheme regularly hopping between precoding matrices as explained in the present Description. Any precoding schemes that regularly hop between precoding matrices are applicable.

In the present embodiment, the hopping between the precoding matrices is performed in the time domain. However, when a multi-carrier transmission scheme such as an OFDM scheme is used, the present invention is applicable to the case where the hopping between the precoding matrices is performed in the frequency domain, as described in other embodiments. If this is the case, t used in the present embodiment is to be replaced with f (frequency ((sub) carrier)). Also, even in the case of performing the hopping between the precoding matrices in the time and frequency domains, the present invention is applicable.

Embodiment G2

The present embodiment describes the case where, when the modulation schemes used for generating s1 and s2 are different, the setting scheme for making the average powers of s1 and s2 different from each other is adopted in combination with the precoding scheme that regularly hops between precoding matrices that use the unitary matrix which is based on Embodiment 10 and is described in Embodiment 19.

In the scheme of regularly hopping between precoding matrices over a period (cycle) with 2N slots, the precoding matrices prepared for the 2N slots are represented as follows.

Math 625 for $i = 0, 1, 2, \ldots, N-2, N-1$: Equation 279

$$F[i] = \frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix}$$

Let α be a fixed value (not depending on i), where α>0.

Math 626 for $i = N, N+1, N+2, \ldots, 2N-2, 2N-1$: Equation 280

$$F[i] = \frac{1}{\sqrt{\alpha^2+1}}\begin{pmatrix} \alpha\times e^{j\theta_{11}(i)} & e^{j(\theta_{11}(i)+\lambda)} \\ e^{j\theta_{21}(i)} & \alpha\times e^{j(\theta_{21}(i)+\lambda+\pi)} \end{pmatrix}$$

Let α be a fixed value (not depending on i), where α>0.
(Let the α in Equation 279 and the α in Equation 280 be the same value.)
(α<0 may be fulfilled.)

From Condition #5 (Math 106) and Condition #6 (Math 107) in Embodiment 3, the following condition is important for achieving high data reception quality.

Math 627

$$e^{j(\theta_{11}(x)-\theta_{21}(x))}\neq e^{j(\theta_{11}(y)-\theta_{21}(y))}$$ Condition #57 for ∀x, ∀y (x≠y; x,y=0, 1, 2, . . . , N−2, N−1)
(x is 0, 1, 2, . . . , N−2, N−1;
y is 0, 1, 2, . . . , N−2, N−1; and x≠y.)

Math 628

$$e^{j(\theta_{11}(x)-\theta_{21}(x)-\pi)}\neq e^{j(\theta_{11}(y)-\theta_{21}(y)-\pi)}$$ Condition #58 for ∀x, ∀y (x≠y; x,y=0, 1, 2, . . . , N−2, N−1)
(x is 0, 1, 2, . . . , N−2, N−1;
y is 0, 1, 2, . . . , N−2, N−1; and x≠y.)

Addition of the following condition is considered.

Math 629

$$\theta_{11}(x)=\theta_{11}(x+N)$$

for ∀x (x=0, 1, 2, . . . , N−2, N−1)
and $$\theta_{21}(y)=\theta_{21}(y+N)$$ Condition #59 for ∀y (y=0, 1, 2, . . . , N−2, N−1)

Precoding matrices F[0]-F[2N−1] are generated based on Equation 279 and Equation 280 (the precoding matrices F[0]-F[2N−1] may be in any order for the 2N slots in the period (cycle). Symbol number 2Ni may be precoded using F[0], symbol number 2Ni+1 may be precoded using F[1], . . . , and symbol number 2N×+h may be precoded using F[h], for example (h=0, 1, 2, . . . , 2N−2, 2N−1). (In this case, as described in previous embodiments, precoding matrices need not be hopped between regularly.)

When N=15, precoding matrices prepared for the 2N slots, based on Equation 279 and Equation 280 are represented as follows, for example.

Math 630

$$F[i=0] = \frac{1}{\sqrt{\alpha^2+1}}\begin{pmatrix} e^{j0} & \alpha\times e^{j0} \\ \alpha\times e^{j0} & \alpha\times e^{j\pi} \end{pmatrix} \quad (281)$$

Math 631

$$F[i=1] = \frac{1}{\sqrt{\alpha^2+1}}\begin{pmatrix} e^{j0} & \alpha\times e^{j0} \\ \alpha\times e^{j\frac{2}{15}\pi} & \alpha\times e^{j(\frac{2}{15}\pi+\pi)} \end{pmatrix} \quad (282)$$

Math 632

$$F[i=2] = \frac{1}{\sqrt{\alpha^2+1}}\begin{pmatrix} e^{j0} & \alpha\times e^{j0} \\ \alpha\times e^{j\frac{4}{15}\pi} & \alpha\times e^{j(\frac{4}{15}\pi+\pi)} \end{pmatrix} \quad (283)$$

Math 633

$$F[i=3] = \frac{1}{\sqrt{\alpha^2+1}}\begin{pmatrix} e^{j0} & \alpha\times e^{j0} \\ \alpha\times e^{j\frac{6}{15}\pi} & \alpha\times e^{j(\frac{6}{15}\pi+\pi)} \end{pmatrix} \quad (284)$$

Math 634

$$F[i=4] = \frac{1}{\sqrt{\alpha^2+1}}\begin{pmatrix} e^{j0} & \alpha\times e^{j0} \\ \alpha\times e^{j\frac{8}{15}\pi} & \alpha\times e^{j(\frac{8}{15}\pi+\pi)} \end{pmatrix} \quad (285)$$

Math 635

$$F[i=5] = \frac{1}{\sqrt{\alpha^2+1}}\begin{pmatrix} e^{j0} & \alpha\times e^{j0} \\ \alpha\times e^{j\frac{10}{15}\pi} & \alpha\times e^{j(\frac{10}{15}\pi+\pi)} \end{pmatrix} \quad (286)$$

Math 636

$$F[i=6] = \frac{1}{\sqrt{\alpha^2+1}}\begin{pmatrix} e^{j0} & \alpha\times e^{j0} \\ \alpha\times e^{j\frac{12}{15}\pi} & \alpha\times e^{j(\frac{12}{15}\pi+\pi)} \end{pmatrix} \quad (287)$$

Math 637

$$F[i=7] = \frac{1}{\sqrt{\alpha^2+1}}\begin{pmatrix} e^{j0} & \alpha\times e^{j0} \\ \alpha\times e^{j\frac{14}{15}\pi} & \alpha\times e^{j(\frac{14}{15}\pi+\pi)} \end{pmatrix} \quad (288)$$

Math 638

$$F[i=8] = \frac{1}{\sqrt{\alpha^2+1}}\begin{pmatrix} e^{j0} & \alpha\times e^{j0} \\ \alpha\times e^{j\frac{16}{15}\pi} & \alpha\times e^{j(\frac{16}{15}\pi+\pi)} \end{pmatrix} \quad (289)$$

Math 639

$$F[i=9] = \frac{1}{\sqrt{\alpha^2+1}}\begin{pmatrix} e^{j0} & \alpha\times e^{j0} \\ \alpha\times e^{j\frac{18}{15}\pi} & \alpha\times e^{j(\frac{18}{15}\pi+\pi)} \end{pmatrix} \quad (290)$$

Math 640

$$F[i=10] = \frac{1}{\sqrt{\alpha^2+1}}\begin{pmatrix} e^{j0} & \alpha\times e^{j0} \\ \alpha\times e^{j\frac{20}{15}\pi} & \alpha\times e^{j(\frac{20}{15}\pi+\pi)} \end{pmatrix} \quad (291)$$

Math 641

$$F[i=11] = \frac{1}{\sqrt{\alpha^2+1}}\begin{pmatrix} e^{j0} & \alpha\times e^{j0} \\ \alpha\times e^{j\frac{22}{15}\pi} & \alpha\times e^{j(\frac{22}{15}\pi+\pi)} \end{pmatrix} \quad (292)$$

Math 642

$$F[i=12] = \frac{1}{\sqrt{\alpha^2+1}}\begin{pmatrix} e^{j0} & \alpha\times e^{j0} \\ \alpha\times e^{j\frac{24}{15}\pi} & \alpha\times e^{j(\frac{24}{15}\pi+\pi)} \end{pmatrix} \quad (293)$$

-continued

Math 643

$$F[i=13]=\frac{1}{\sqrt{\alpha^2+1}}\begin{pmatrix} e^{j0} & \alpha\times e^{j0} \\ \alpha\times e^{j\frac{26}{15}\pi} & \alpha\times e^{j\left(\frac{26}{15}\pi+\pi\right)} \end{pmatrix} \quad (294)$$

Math 644

$$F[i=14]=\frac{1}{\sqrt{\alpha^2+1}}\begin{pmatrix} e^{j0} & \alpha\times e^{j0} \\ \alpha\times e^{j\frac{28}{15}\pi} & \alpha\times e^{j\left(\frac{28}{15}\pi+\pi\right)} \end{pmatrix} \quad (295)$$

Math 645

$$F[i=15]=\frac{1}{\sqrt{\alpha^2+1}}\begin{pmatrix} \alpha\times e^{j0} & e^{j\pi} \\ e^{j0} & \alpha\times e^{j0} \end{pmatrix} \quad (296)$$

Math 646

$$F[i=16]=\frac{1}{\sqrt{\alpha^2+1}}\begin{pmatrix} \alpha\times e^{j\frac{2}{15}\pi} & e^{j\left(\frac{2}{15}\pi+\pi\right)} \\ e^{j0} & \alpha\times e^{j0} \end{pmatrix} \quad (297)$$

Math 647

$$F[i=17]=\frac{1}{\sqrt{\alpha^2+1}}\begin{pmatrix} \alpha\times e^{j\frac{4}{15}\pi} & e^{j\left(\frac{4}{15}\pi+\pi\right)} \\ e^{j0} & \alpha\times e^{j0} \end{pmatrix} \quad (298)$$

Math 648

$$F[i=18]=\frac{1}{\sqrt{\alpha^2+1}}\begin{pmatrix} \alpha\times e^{j\frac{6}{15}\pi} & e^{j\left(\frac{6}{15}\pi+\pi\right)} \\ e^{j0} & \alpha\times e^{j0} \end{pmatrix} \quad (299)$$

Math 649

$$F[i=19]=\frac{1}{\sqrt{\alpha^2+1}}\begin{pmatrix} \alpha\times e^{j\frac{8}{15}\pi} & e^{j\left(\frac{8}{15}\pi+\pi\right)} \\ e^{j0} & \alpha\times e^{j0} \end{pmatrix} \quad (300)$$

Math 650

$$F[i=20]=\frac{1}{\sqrt{\alpha^2+1}}\begin{pmatrix} \alpha\times e^{j\frac{10}{15}\pi} & e^{j\left(\frac{10}{15}\pi+\pi\right)} \\ e^{j0} & \alpha\times e^{j0} \end{pmatrix} \quad (301)$$

Math 651

$$F[i=21]=\frac{1}{\sqrt{\alpha^2+1}}\begin{pmatrix} \alpha\times e^{j\frac{12}{15}\pi} & e^{j\left(\frac{12}{15}\pi+\pi\right)} \\ e^{j0} & \alpha\times e^{j0} \end{pmatrix} \quad (302)$$

Math 652

$$F[i=22]=\frac{1}{\sqrt{\alpha^2+1}}\begin{pmatrix} \alpha\times e^{j\frac{14}{15}\pi} & e^{j\left(\frac{14}{15}\pi+\pi\right)} \\ e^{j0} & \alpha\times e^{j0} \end{pmatrix} \quad (303)$$

Math 653

$$F[i=23]=\frac{1}{\sqrt{\alpha^2+1}}\begin{pmatrix} \alpha\times e^{j\frac{16}{15}\pi} & e^{j\left(\frac{16}{15}\pi+\pi\right)} \\ e^{j0} & \alpha\times e^{j0} \end{pmatrix} \quad (304)$$

Math 654

$$F[i=24]=\frac{1}{\sqrt{\alpha^2+1}}\begin{pmatrix} \alpha\times e^{j\frac{18}{15}\pi} & e^{j\left(\frac{18}{15}\pi+\pi\right)} \\ e^{j0} & \alpha\times e^{j0} \end{pmatrix} \quad (305)$$

Math 655

$$F[i=25]=\frac{1}{\sqrt{\alpha^2+1}}\begin{pmatrix} \alpha\times e^{j\frac{20}{15}\pi} & e^{j\left(\frac{20}{15}\pi+\pi\right)} \\ e^{j0} & \alpha\times e^{j0} \end{pmatrix} \quad (306)$$

-continued

Math 656

$$F[i=26]=\frac{1}{\sqrt{\alpha^2+1}}\begin{pmatrix} \alpha\times e^{j\frac{22}{15}\pi} & e^{j\left(\frac{22}{15}\pi+\pi\right)} \\ e^{j0} & \alpha\times e^{j0} \end{pmatrix} \quad (307)$$

Math 657

$$F[i=27]=\frac{1}{\sqrt{\alpha^2+1}}\begin{pmatrix} \alpha\times e^{j\frac{24}{15}\pi} & e^{j\left(\frac{24}{15}\pi+\pi\right)} \\ e^{j0} & \alpha\times e^{j0} \end{pmatrix} \quad (308)$$

Math 658

$$F[i=28]=\frac{1}{\sqrt{\alpha^2+1}}\begin{pmatrix} \alpha\times e^{j\frac{26}{15}\pi} & e^{j\left(\frac{26}{15}\pi+\pi\right)} \\ e^{j0} & \alpha\times e^{j0} \end{pmatrix} \quad (309)$$

Math 659

$$F[i=29]=\frac{1}{\sqrt{\alpha^2+1}}\begin{pmatrix} \alpha\times e^{j\frac{28}{15}\pi} & e^{j\left(\frac{28}{15}\pi+\pi\right)} \\ e^{j0} & \alpha\times e^{j0} \end{pmatrix} \quad (310)$$

As described above, in order to reduce the calculation scale of the precoding by the transmission device, $\theta_{11}(i)=0$ radians and $\lambda=0$ radians should be fulfilled in Equation 279, and $\theta_{21}(i)=0$ radians and $\lambda=0$ should be fulfilled in Equation 280.

Note that $\lambda$ in Equation 279 and Equation 280 may be varied according to i, or be fixed. That is, in Equation 279 and Equation 280, $\lambda$ in F[i=x] and $\lambda$ in F[i=y] ($x\neq y$) may be the same or different. Alternatively, $\lambda$ may be a fixed value in Equation 279 and in Equation 280, and the fixed value $\lambda$ in Equation 279 and the fixed value $\lambda$ in Equation 280 may be different. (Alternatively, it may be the fixed value $\lambda$ in Equation 279 and the fixed value $\lambda$ in Equation 280).

Regarding the value to be set to a, although using the value described above is effective, this is not essential. For example, a may be determined according to the value of i in the matrices F[i], as described in Embodiment 17. (That is, a in F[i] is not necessarily a fixed value when i is changed).

In the present embodiment, the scheme of structuring 2N different precoding matrices for a precoding hopping scheme with a 2N-slot time period (cycle) has been described. In this case, as the 2N different precoding matrices, F[0], F[1], F[2], . . . , F[N−2], F[N−1] are prepared. When a single carrier transmission scheme is adopted, symbols are arranged in the order F[0], F[1], F[2], . . . , F[2N−2], F[2N−1] in the time domain (Alternatively, it can be arranged in the frequency domain when a multicarrier transmission scheme is adopted). The present invention is not, however, limited in this way, and the 2N different precoding matrices F[0], F[1], F[2], . . . , F[2N−2], F[2N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping scheme over an H-slot period (cycle) (H being a natural number larger than the number of slots 2N in the period (cycle) of the above scheme of regularly hopping between precoding matrices), when the 2N different precoding matrices of the present embodiment are included, the probability of high reception quality increases.

In the present embodiment, the case where λ=0 radians is explained as an example of precoding matrices when λ is a fixed value. Considering the mapping of the modulation scheme, λ may be fixed to be λ=π/2 radians, λ=π radians, or λ=(3π)/2 radians. (It is assumed, for example, that λ=π radians in the precoding matrices for the precoding scheme that regularly hops between precoding matrices). This setting reduces the circuit scale as with the case where λ=0 radians.

The following describes the setting scheme for the average powers of s1 and s2 to be set to the precoding scheme that regularly hops between precoding matrices as described in Embodiment 19 for example when the modulation schemes used for generating s1 and s2 are different (For details, see Embodiment F1).

"The setting scheme for the average powers of s1 and s2 when the modulation schemes for s1 and s2 are different" is applicable to all the precoding schemes described in the present Description, which regularly hops between precoding matrices. The important points are:

As an error correction coding (encoded) block coding such as turbo coding or duo-binary turbo coding using tail-biting, LDPC coding, or the like is used, and a plurality of block lengths (the number of bits that constitute one block)(code length) are supported, and when the transmission device selects one of the plurality of block lengths and performs error correction coding with the selected block length, the transmission device changes the setting scheme for the average powers (average values) of s1 and s2 according to the block length when the modulation scheme for s1 and the modulation scheme for s2 are different. —With an error correction coding, a plurality of coding rates are supported, and when the transmission device selects one of the plurality of coding rates and performs error correction coding with the selected coding rate, the transmission device changes the setting scheme for the average powers (average values) of s1 and s2 according to the selected coding rate when the modulation scheme for s1 and the modulation scheme for s2 are different.

When the modulation scheme for s1 and the modulation scheme for s2 are different, a plurality of selectable modulation schemes for s2 are supported, and the schemes for setting the average powers (average values) for s1 and s2 are switched according to the modulation scheme that the transmission device uses for generating s2.

When the modulation scheme for s1 and the modulation scheme for s2 are different, a plurality of selectable modulation schemes for s1 are supported, and the schemes for setting the average powers (average values) for s1 and s2 are switched according to the modulation scheme that the transmission device uses for generating s2.

"The setting scheme for the average powers of s1 and s2 when the modulation scheme for s1 and the modulation scheme for s2 are different" described in the present embodiment is not necessarily the precoding scheme regularly hopping between precoding matrices as explained in the present Description. Any precoding schemes that regularly hop between precoding matrices are applicable.

In the present embodiment, the hopping between the precoding matrices is performed in the time domain. However, when a multi-carrier transmission scheme such as an OFDM scheme is used, the present invention is applicable to the case where the hopping between the precoding matrices is performed in the frequency domain, as described in other embodiments. If this is the case, t used in the present embodiment is to be replaced with f (frequency ((sub) carrier)). Also, even in the case of performing the hopping between the precoding matrices in the time and frequency domains, the present invention is applicable.

Embodiment G3

The present embodiment describes the case where, when the modulation schemes used for generating s1 and s2 are different, the setting scheme for making the average powers of s1 and s2 different from each other is applied to Embodiment C1. Embodiment C1 is a generalization of Example 1 and Example 2 of Embodiment 2.

In the scheme of regularly hopping between precoding matrices over a period (cycle) with N slots, the precoding matrices prepared for the N slots are represented as follows.

Math 660

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \quad (\#1)$$

In this case, i=0, 1, 2, . . . , N−2, N−1. (α>0.) A unitary matrix is used in the present embodiment, and the precoding matrices in Equation #1 are represented as follows.

Math 661

$$F[i] = \frac{1}{\sqrt{\alpha^2+1}}\begin{pmatrix} e^{j\theta_{11}(i)} & e^{j(\theta_{11}(i)+\lambda)} \\ \alpha \times e^{j\theta_{21}(i)} & e^{j(\theta_{21}(i)+\lambda+\pi)} \end{pmatrix} \quad (\#2)$$

In this case, i=0, 1, 2, . . . , N−2, N−1. (α>0.) For the simplification of mapping performed in the transmission device and the reception device, λ may be 0 radians, π/2 radians or (3π)/2 radians, and be fixed to one of these three values. In particular, α=1 is fulfilled in Embodiment 2, and Equation #2 is represented as follows.

Math 662

$$F[i] = \frac{1}{\sqrt{2}}\begin{pmatrix} e^{j\theta_{11}(i)} & e^{j(\theta_{11}(i)+\lambda)} \\ e^{j\theta_{21}(i)} & e^{j(\theta_{21}(i)+\lambda+\pi)} \end{pmatrix} \quad (\#3)$$

In order to distribute the poor reception points evenly with regards to phase in the complex plane, as described in Embodiment 2, Condition #101 and Condition #102 are provided to Equation #1 and Equation #2.

Math 663

$$\frac{e^{j(\theta_{11}(x+1)-\theta_{21}(x+1))}}{e^{j(\theta_{11}(x)-\theta_{21}(x))}} = e^{j\left(\frac{\pi}{N}\right)} \quad \text{Condition \#101}$$

$$\text{for } \forall x (x = 0, 1, 2, \ldots, N-2)$$

-continued

Math 664

$$\frac{e^{j(\theta_{11}(x+1)-\theta_{21}(x+1))}}{e^{j(\theta_{11}(x)-\theta_{21}(x))}}=e^{j\left(-\frac{\pi}{N}\right)} \quad \text{Condition \#102}$$

$$\text{for } \forall x (x=0,1,2,\ldots,N-2)$$

In particular, when $\theta_{11}(i)$ is a fixed value not depending on i, Condition #103 or Condition #104 can be provided.

Math 665

$$\frac{e^{j\theta_{21}(x+1)}}{e^{j\theta_{21}(x)}}=e^{j\left(\frac{\pi}{N}\right)} \text{ for } \forall x (x=0,1,2,\ldots,N-2) \quad \text{Condition \#103}$$

Math 666

$$\frac{e^{j\theta_{21}(x+1)}}{e^{j\theta_{21}(x)}}=e^{j\left(-\frac{\pi}{N}\right)} \quad \text{Condition \#104}$$

$$\text{for } \forall x (x=0,1,2,\ldots,N-2)$$

Similarly, when $\theta_{21}(i)$ is a fixed value not depending on i, Condition #105 or Condition #106 can be provided.

Math 667

$$\frac{e^{j\theta_{11}(x+1)}}{e^{j\theta_{11}(x)}}=e^{j\left(\frac{\pi}{N}\right)} \text{ for } \forall x (x=0,1,2,\ldots,N-2) \quad \text{Condition \#105}$$

Math 668

$$\frac{e^{j\theta_{11}(x+1)}}{e^{j\theta_{11}(x)}}=e^{j\left(-\frac{\pi}{N}\right)} \quad \text{Condition \#106}$$

$$\text{for } \forall x (x=0,1,2,\ldots,N-2)$$

Next, with respect to the scheme of regularly hopping between precoding matrices over a period (cycle) with N slots, the following shows example precoding matrices using the unitary matrix described above. The precoding matrices prepared for the N slots based on Equation #2 are represented as follows. (In Equation #2, λ is set to zero radians and $\theta_{11}(i)$ is set to zero radians.)

Math 669

$$F[i]=\frac{1}{\sqrt{\alpha^2+1}}\begin{pmatrix} e^{j0} & \alpha\times e^{j0} \\ \alpha\times e^{j\theta_{21}(i)} & e^{j(\theta_{21}(i)+\pi)} \end{pmatrix} \quad (\#10)$$

In this case, i=0, 1, 2, . . . , N−2, N−1 (α>0), and Condition #103 or Condition #104 is fulfilled. Also, $\theta_{21}(i=0)$ may be set to any value, such as 0 radians.

As an alternative, in the scheme of regularly hopping between precoding matrices over a period (cycle) with N slots, the precoding matrices prepared for the N slots are represented as follows. (In Equation #2, λ is set to zero radians and $\theta_{11}(i)$ is set to zero radians.)

Math 670

$$F[i]=\frac{1}{\sqrt{\alpha^2+1}}\begin{pmatrix} e^{j0} & \alpha\times e^{j\pi} \\ \alpha\times e^{j\theta_{21}(i)} & e^{j\theta_{21}(i)} \end{pmatrix} \quad (\#9)$$

In this case, i=0, 1, 2, . . . , N−2, N−1 (α>0), and Condition #103 or Condition #104 is fulfilled. Also, $\theta_{21}(i=0)$ may be set to any value, such as 0 radians.

As an alternative, the precoding matrices prepared for the N slots are represented as follows. (In Equation #2, λ is set to zero radians and $\theta_{21}(i)$ is set to zero radians.)

Math 671

$$F[i]=\frac{1}{\sqrt{\alpha^2+1}}\begin{pmatrix} e^{j\theta_{11}(i)} & \alpha\times e^{j(\theta_{11}(i))} \\ \alpha\times e^{j0} & e^{j\pi} \end{pmatrix} \quad (\#12)$$

In this case, i=0, 1, 2, . . . , N−2, N−1 (α>0), and Condition #105 or Condition #106 is fulfilled. Also, $\theta_{11}(i=0)$ may be set to any value, such as 0 radians.

As an alternative, the precoding matrices prepared for the N slots are represented as follows. (In Equation #2, λ is set to π radians and $\theta_{21}(i)$ is set to zero radians.)

Math 672

$$F[i]=\frac{1}{\sqrt{\alpha^2+1}}\begin{pmatrix} e^{j\theta_{11}(i)} & \alpha\times e^{j(\theta_{11}(i)+\pi)} \\ \alpha\times e^{j0} & e^{j0} \end{pmatrix} \quad (\#13)$$

In this case, i=0, 1, 2, . . . , N−2, N−1 (α>0), and Condition #105 or Condition #106 is fulfilled. Also, $\theta_{11}(i=0)$ may be set to any value, such as 0 radians.

In the example case according to Embodiment 2, as an alternative, the precoding matrices prepared for the N slots are represented as follows. (In Equation #3, λ is set to zero radians and $\theta_{11}(i)$ is set to zero radians.)

Math 673

$$F[i]=\frac{1}{\sqrt{2}}\begin{pmatrix} e^{j0} & e^{j0} \\ e^{j\theta_{21}(i)} & e^{j(\theta_{21}(i)+\pi)} \end{pmatrix} \quad (\#14)$$

In this case, i=0, 1, 2, . . . , N−2, N−1, and Condition #103 or Condition #104 is fulfilled. Also, $\theta_{21}(i=0)$ may be set to any value, such as 0 radians.

As an alternative, in the scheme of regularly hopping between precoding matrices over a period (cycle) with N slots, the precoding matrices prepared for the N slots are represented as follows. (In Equation #3, λ is set to π radians and $\theta_{11}(i)$ is set to zero radians.)

Math 674

$$F[i]=\frac{1}{\sqrt{2}}\begin{pmatrix} e^{j0} & e^{j\pi} \\ e^{j\theta_{21}(i)} & e^{j\theta_{21}(i)} \end{pmatrix} \quad (\#15)$$

In this case, i=0, 1, 2, . . . , N−2, N−1, and Condition #103 or Condition #104 is fulfilled. Also, $\theta_{21}(i=0)$ may be set to any value, such as 0 radians.

As an alternative, the precoding matrices prepared for the N slots are represented as follows. (In Equation #3, $\lambda$ is set to zero radians and $\theta_{21}(i)$ is set to zero radians.)

Math 675

$$F[i] = \frac{1}{\sqrt{2}}\begin{pmatrix} e^{j\theta_{11}(i)} & e^{j(\theta_{11}(i))} \\ e^{j0} & e^{j\pi} \end{pmatrix} \quad (\#16)$$

In this case, i=0, 1, 2, . . . , N−2, N−1, and Condition #105 or Condition #106 is fulfilled. Also, $\theta_{11}$(i=0) may be set to any value, such as 0 radians.

As an alternative, the precoding matrices prepared for the N slots are represented as follows. (In Equation #3, $\lambda$ is set to $\pi$ radians and $\theta_{21}(i)$ is set to zero radians.)

Math 676

$$F[i] = \frac{1}{\sqrt{\alpha^2+1}}\begin{pmatrix} e^{j\theta_{11}(i)} & \alpha \times e^{j(\theta_{11}(i)+\pi)} \\ \alpha \times e^{j0} & e^{j0} \end{pmatrix} \quad (\#17)$$

In this case, i=0, 1, 2, . . . , N−2, N−1, and Condition #105 or Condition #106 is fulfilled. Also, $\theta_{11}$(i=0) may be set to any value, such as 0 radians.

When compared with the precoding scheme described in Embodiment 9 of regularly hopping between precoding matrices, the precoding scheme of the present embodiment has a possibility of achieving high data reception quality even when the period (cycle) is approximately a half of the period (cycle) in Embodiment 9, and needs a fewer precoding matrices to be prepared. Thus, the present embodiment achieves an advantageous effect of reducing the circuit scale in the transmission device and the reception device. To enhance the advantageous effect described above, the transmission device or the reception device may be configured to have one encoder and have a function to distribute coded data, as shown in FIG. 4.

As a preferable example of a in the example above, the scheme described in Embodiment 18 may be adopted. However, the present invention is not limited in this way.

In the present embodiment, the scheme of structuring N different precoding matrices for a precoding hopping scheme with an N-slot time period (cycle) has been described. In this case, as the N different precoding matrices, F[0], F[1], F[2], . . . , F[N−2], F[N−1] are prepared. In the present embodiment, an example of a single carrier transmission scheme has been described, and therefore the case of arranging symbols in the order F[0], F[1], F[2], . . . , F[N−2], F[N−1] in the time domain (or the frequency domain) has been described. The present invention is not, however, limited in this way, and the N different precoding matrices F[0], F[1], F[2], . . . , F[N−2], F[N−1] generated in the present embodiment may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with a N-slot time period (cycle) has been described, but the same advantageous effects may be obtained by randomly using N different precoding matrices. In other words, the N different precoding matrices do not necessarily need to be used in a regular period (cycle).

Furthermore, in the precoding matrix hopping scheme over an H-slot period (cycle) (H being a natural number larger than the number of slots N in the period (cycle) of the above scheme of regularly hopping between precoding matrices), when the N different precoding matrices of the present embodiment are included, the probability of high reception quality increases.

The following describes the setting scheme for the average powers of s1 and s2 to be set to the precoding scheme that regularly hops between precoding matrices as described in Embodiment C1 for example when the modulation schemes used for generating s1 and s2 are different (For details, see Embodiment F1).

"The setting scheme for the average powers of s1 and s2 when the modulation schemes for s1 and s2 are different" is applicable to all the precoding schemes described in the present Description, which regularly hops between precoding matrices. The important points are:

As an error correction coding (encoded) block coding such as turbo coding or duo-binary turbo coding using tail-biting, LDPC coding, or the like is used, and a plurality of block lengths (the number of bits that constitute one block)(code length) are supported, and when the transmission device selects one of the plurality of block lengths and performs error correction coding with the selected block length, the transmission device changes the setting scheme for the average powers (average values) of s1 and s2 according to the block length when the modulation scheme for s1 and the modulation scheme for s2 are different. —With an error correction coding, a plurality of coding rates are supported, and when the transmission device selects one of the plurality of coding rates and performs error correction coding with the selected coding rate, the transmission device changes the setting scheme for the average powers (average values) of s1 and s2 according to the selected coding rate when the modulation scheme for s1 and the modulation scheme for s2 are different.

When the modulation scheme for s1 and the modulation scheme for s2 are different, a plurality of selectable modulation schemes for s2 are supported, and the schemes for setting the average powers (average values) for s1 and s2 are switched according to the modulation scheme that the transmission device uses for generating s2.

When the modulation scheme for s1 and the modulation scheme for s2 are different, a plurality of selectable modulation schemes for s1 are supported, and the schemes for setting the average powers (average values) for s1 and s1 are switched according to the modulation scheme that the transmission device uses for generating s2.

"The setting scheme for the average powers of s1 and s2 when the modulation scheme for s1 and the modulation scheme for s2 are different" described in the present embodiment is not necessarily the precoding scheme regularly hopping between precoding matrices as explained in the present Description. Any precoding schemes that regularly hop between precoding matrices are applicable.

In the present embodiment, the hopping between the precoding matrices is performed in the time domain. However, when a multi-carrier transmission scheme such as an OFDM scheme is used, the present invention is applicable to the case where the hopping between the precoding matrices is performed in the frequency domain, as described in other embodiments. If this is the case, t used in the present embodiment is to be replaced with f (frequency ((sub) carrier)). Also, even in the case of performing the hopping between the precoding matrices in the time and frequency domains, the present invention is applicable.

Embodiment G4

The present embodiment describes the case where, when the modulation schemes used for generating s1 and s2 are different, the setting scheme for making the average powers of s1 and s2 different from each other is applied to Embodiment C2. Embodiment C2 is a precoding scheme of regularly hopping precoding matrices that is the combination of Embodiment C1 and Embodiment 9 and is different from Embodiment C1. That is, the present invention is a scheme of realizing Embodiment C1 applying the case where the number of slots in the period (cycle) in Embodiment 9 is an odd number.

In the scheme of regularly hopping between precoding matrices over a period (cycle) with N slots, the precoding matrices prepared for the N slots are represented as follows.

Math 677

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\delta)} \end{pmatrix} \quad (\#18)$$

In this case, i=0, 1, 2, . . . , N−2, N−1. (α>0.) A unitary matrix is used in the present embodiment, and the precoding matrices in Equation #1 are represented as follows.

Math 678

$$F[i]=\frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix} \quad (\#19)$$

In this case, i=0, 1, 2, . . . , N−2, N−1. (α>0.) For the simplification of mapping performed in the transmission device and the reception device, λ may be 0 radians, π/2 radians or (3π)/2 radians, and be fixed to one of these three values. In particular, α=1 is fulfilled, and Equation #19 is represented as follows.

Math 679

$$F[i]=\frac{1}{\sqrt{2}}\begin{pmatrix} e^{j\theta_{11}(i)} & e^{j(\theta_{11}(i)+\lambda)} \\ e^{j\theta_{21}(i)} & e^{j(\theta_{21}(i)+\lambda+\pi)} \end{pmatrix} \quad (\#20)$$

The precoding matrices used in the precoding scheme of the present embodiment, which regularly hops between precoding matrices, are as described above. The characteristic feature thereof is that N, which represents the number of slots in the period (cycle) of the precoding scheme of the present embodiment regularly hopping between precoding matrices, is an odd number (N=2n+1). The number of different precoding matrices prepared for achieving the N=2n+1 slots is n+1. Among n+1 different precoding matrices, n precoding matrices are used twice in one period (cycle), and one precoding matrix is used once. N=2n+1 is thus achieved. The following describes in detail the precoding matrices used in this case.

The n+1 different precoding matrices required for achieving the precoding scheme with the period (cycle) of N=2n+1 slots, which regularly hops between precoding matrices, can be represented as F[0], F[1], F[i], . . . , F[n−1], F[n](i=0, 1, 2, . . . , n−2, n−1, n). If this is the case, n+1 different precoding matrices, F[0], F[1], F[i], . . . , F[n−1], F[n], based on Equation #19 are represented as follows.

Math 680

$$F[i]=\frac{1}{\sqrt{\alpha^2+1}}\begin{pmatrix} e^{j\theta_{11}} & \alpha\times e^{j(\theta_{11}+\lambda)} \\ \alpha\times e^{j\left(\theta_{11}+\frac{2i\pi}{2n+1}\right)} & e^{j\left(\theta_{11}+\frac{2i\pi}{2n+1}+\lambda+\pi\right)} \end{pmatrix} \quad (\#21)$$

Note that i=0, 1, 2, . . . , n−2, n−1, n. Among n+1 different precoding matrices in Equation #21, namely F[0], F[1], F[i], . . . , F[n−1] and F[n], F[0] is used once, and F[1]-F[n] are each used twice (F[1] is used twice, F[2] is used twice, . . . , F[n−1] is used twice, and F[n] is used twice). The precoding scheme thus regularly hops between precoding matrices with the period (cycle) of N=2n+1 slots. As a result, as with the precoding scheme in Embodiment 9 which regularly hops between precoding matrices when the number of slots in the period (cycle) is an odd number, the reception device achieves high data reception quality. If this is the case, the precoding scheme described above has a possibility of achieving high data reception quality even when the period (cycle) is approximately a half of the period (cycle) in Embodiment 9, and needs a fewer precoding matrices to be prepared. Thus, the present embodiment achieves an advantageous effect of reducing the circuit scale in the transmission device and the reception device. To enhance the advantageous effect described above, the transmission device or the reception device may be configured to have one encoder and have a function to distribute coded data, as shown in FIG. 4.

In particular, when λ=0 radians and $\theta_{11}$=0 radians, the equation above can be represented as follows.

Math 681

$$F[i]=\frac{1}{\sqrt{\alpha^2+1}}\begin{pmatrix} e^{j0} & \alpha\times e^{j0} \\ \alpha\times e^{j\left(\frac{2i\pi}{2n+1}\right)} & e^{j\left(\frac{2i\pi}{2n+1}+\pi\right)} \end{pmatrix} \quad (\#22)$$

Note that i=0, 1, 2, . . . , n−2, n−1, n. Among n+1 different precoding matrices in Equation #22, namely F[0], F[1], F[i], . . . , F[n−1] and F[n], F[0] is used once, and F[1]-F[n] are each used twice (F[1] is used twice, F[2] is used twice, . . . , F[n−1] is used twice, and F[n] is used twice). The precoding scheme thus regularly hops between precoding matrices with the period (cycle) of N=2n+1 slots. As a result, as with the precoding scheme in Embodiment 9 which regularly hops between precoding matrices when the number of slots in the period (cycle) is an odd number, the reception device achieves high data reception quality. If this is the case, the precoding scheme described above has a possibility of achieving high data reception quality even when the period (cycle) is approximately a half of the period (cycle) in Embodiment 9, and needs a fewer precoding matrices to be prepared. Thus, the present embodiment achieves an advantageous effect of reducing the circuit scale in the transmission device and the reception device. When λ=0 radians and $\theta_{11}$=0 radians, the equation above can be represented as follows.

Math 682

$$F[i] = \frac{1}{\sqrt{\alpha^2+1}}\begin{pmatrix} e^{j0} & \alpha \times e^{j\pi} \\ \alpha \times e^{j\left(\frac{2i\pi}{2n+1}\right)} & e^{j\left(\frac{2i\pi}{2n+1}\right)} \end{pmatrix} \quad (\#23)$$

Note that i=0, 1, 2, . . . , n−2, n−1, n. Among n+1 different precoding matrices in Equation #23, namely F[0], F[1], F[i], . . . , F[n−1] and F[n], F[0] is used once, and F[1]-F[n] are each used twice (F[1] is used twice, F[2] is used twice, . . . , F[n−1] is used twice, and F[n] is used twice). The precoding scheme thus regularly hops between precoding matrices with the period (cycle) of N=2n+1 slots. As a result, as with the precoding scheme in Embodiment 9 which regularly hops between precoding matrices when the number of slots in the period (cycle) is an odd number, the reception device achieves high data reception quality. If this is the case, the precoding scheme described above has a possibility of achieving high data reception quality even when the period (cycle) is approximately a half of the period (cycle) in Embodiment 9, and needs a fewer precoding matrices to be prepared. Thus, the present embodiment achieves an advantageous effect of reducing the circuit scale in the transmission device and the reception device.

When α=1, Equation #21 can be represented as follows, as with the relationship between Equation #19 and Equation #20, Math 683

$$F[i] = \frac{1}{\sqrt{2}}\begin{pmatrix} e^{j\theta_{11}} & e^{j(\theta_{11}+\lambda)} \\ e^{j\left(\theta_{11}+\frac{2i\pi}{2n+1}\right)} & e^{j\left(\theta_{11}+\frac{2i\pi}{2n+1}+\lambda+\pi\right)} \end{pmatrix} \quad (\#24)$$

Note that i=0, 1, 2, . . . , n−2, n−1, n. Among n+1 different precoding matrices in Equation #24, namely F[0], F[1], F[i], . . . , F[n−1] and F[n], F[0] is used once, and F[1]-F[n] are each used twice (F[1] is used twice, F[2] is used twice, . . . , F[n-1] is used twice, and F[n] is used twice). The precoding scheme thus regularly hops between precoding matrices with the period (cycle) of N=2n+1 slots. As a result, as with the precoding scheme in Embodiment 9 which regularly hops between precoding matrices when the number of slots in the period (cycle) is an odd number, the reception device achieves high data reception quality. If this is the case, the precoding scheme described above has a possibility of achieving high data reception quality even when the period (cycle) is approximately a half of the period (cycle) in Embodiment 9, and needs a fewer precoding matrices to be prepared. Thus, the present embodiment achieves an advantageous effect of reducing the circuit scale in the transmission device and the reception device.

Similarly, when α=1, Equation #22 can be represented as follows.

Math 684

$$F[i] = \frac{1}{\sqrt{2}}\begin{pmatrix} e^{j0} & e^{j0} \\ e^{j\left(\frac{2i\pi}{2n+1}\right)} & e^{j\left(\frac{2i\pi}{2n+1}+\pi\right)} \end{pmatrix} \quad (\#25)$$

Note that i=0, 1, 2, . . . , n−2, n−1, n. Among n+1 different precoding matrices in Equation #25, namely F[0], F[1], F[i], F[n−1] and F[n], F[0] is used once, and F[1]-F[n] are each used twice (F[1] is used twice, F[2] is used twice, . . . , F[n−1] is used twice, and F[n] is used twice). The precoding scheme thus regularly hops between precoding matrices with the period (cycle) of N=2n+1 slots. As a result, as with the precoding scheme in Embodiment 9 which regularly hops between precoding matrices when the number of slots in the period (cycle) is an odd number, the reception device achieves high data reception quality. If this is the case, the precoding scheme described above has a possibility of achieving high data reception quality even when the period (cycle) is approximately a half of the period (cycle) in Embodiment 9, and needs a fewer precoding matrices to be prepared. Thus, the present embodiment achieves an advantageous effect of reducing the circuit scale in the transmission device and the reception device.

Similarly, when α=1, Equation #23 can be represented as follows.

Math 685

$$F[i] = \frac{1}{\sqrt{2}}\begin{pmatrix} e^{j0} & e^{j\pi} \\ e^{j\left(\frac{2i\pi}{2n+1}\right)} & e^{j\left(\frac{2i\pi}{2n+1}\right)} \end{pmatrix} \quad (\#26)$$

Note that i=0, 1, 2, . . . , n−2, n−1, n. Among n+1 different precoding matrices in Equation #26, namely F[0], F[1], F[i], . . . , F[n−1] and F[n], F[0] is used once, and F[1]-F[n] are each used twice (F[1] is used twice, F[2] is used twice, . . . , F[n−1] is used twice, and F[n] is used twice). The precoding scheme thus regularly hops between precoding matrices with the period (cycle) of N=2n+1 slots. As a result, as with the precoding scheme in Embodiment 9 which regularly hops between precoding matrices when the number of slots in the period (cycle) is an odd number, the reception device achieves high data reception quality. If this is the case, the precoding scheme described above has a possibility of achieving high data reception quality even when the period (cycle) is approximately a half of the period (cycle) in Embodiment 9, and needs a fewer precoding matrices to be prepared. Thus, the present embodiment achieves an advantageous effect of reducing the circuit scale in the transmission device and the reception device.

As a preferable example of α in the example above, the scheme described in Embodiment 18 may be adopted. However, the present invention is not limited in this way.

In this embodiment, when a single carrier transmission scheme is adopted, the precoding matrices W[0], W[1], . . . , W[2n−1] and W[2n] (note that W[0], W[1], . . . , W[2n−1] and W[2n] are constituted of F[0], F[1], F[2], . . . , F[n−1] and F[n]) for the precoding hopping scheme with the period (cycle) of N=2n+1 slots (i.e., precoding scheme regularly hopping between precoding matrices with the period (cycle) of N=2n+1 slots) are arranged in the order W[0], W[1], . . . , W[2n−1] and W[2n] in the time domain (or the frequency domain). The present invention is not, however, limited in this way, and the precoding matrices W[0], W[1], . . . , W[2n−1] and W[2n] may be adapted to a multi-carrier transmission scheme such as an OFDM transmission scheme or the like. As in Embodiment 1, as a scheme of adaption in this case, precoding weights may be changed by arranging symbols in the frequency domain and in the frequency-time domain. Note that a precoding hopping scheme with a N-slot time period (cycle) (N=2n+1) has been described, but the same advantageous effects may be obtained by randomly using precoding matrices W[0], W[1], . . . , W[2n−1], W[2n]. In other words, the precoding matrices W[0], W[1], . . . , W[2n−1], W[2n] do not necessarily need to be used in a regular period (cycle).

Furthermore, in the precoding matrix hopping scheme over an H-slot period (cycle) (H being a natural number larger than the number of slots N=2n+1 in the period (cycle) of the above scheme of regularly hopping between precoding matrices), when the n+1 different precoding matrices of the present embodiment are included, the probability of high reception quality increases.

The following describes the setting scheme for the average powers of s1 and s2 to be set to the precoding scheme that regularly hops between precoding matrices as described in Embodiment C2 for example when the modulation schemes used for generating s1 and s2 are different (For details, see Embodiment F1).

"The setting scheme for the average powers of s1 and s2 when the modulation schemes for s1 and s2 are different" is applicable to all the precoding schemes described in the present Description, which regularly hops between precoding matrices. The important points are:

As an error correction coding (encoded) block coding such as turbo coding or duo-binary turbo coding using tail-biting, LDPC coding, or the like is used, and a plurality of block lengths (the number of bits that constitute one block)(code length) are supported, and when the transmission device selects one of the plurality of block lengths and performs error correction coding with the selected block length, the transmission device changes the setting scheme for the average powers (average values) of s1 and s2 according to the block length when the modulation scheme for s1 and the modulation scheme for s2 are different. —With an error correction coding, a plurality of coding rates are supported, and when the transmission device selects one of the plurality of coding rates and performs error correction coding with the selected coding rate, the transmission device changes the setting scheme for the average powers (average values) of s1 and s2 according to the selected coding rate when the modulation scheme for s1 and the modulation scheme for s2 are different.

When the modulation scheme for s1 and the modulation scheme for s2 are different, a plurality of selectable modulation schemes for s2 are supported, and the schemes for setting the average powers (average values) for s1 and s2 are switched according to the modulation scheme that the transmission device uses for generating s2.

When the modulation scheme for s1 and the modulation scheme for s2 are different, a plurality of selectable modulation schemes for s1 are supported, and the schemes for setting the average powers (average values) for s1 and s1 are switched according to the modulation scheme that the transmission device uses for generating s2.

"The setting scheme for the average powers of s1 and s2 when the modulation scheme for s1 and the modulation scheme for s2 are different" described in the present embodiment is not necessarily the precoding scheme regularly hopping between precoding matrices as explained in the present Description. Any precoding schemes that regularly hop between precoding matrices are applicable.

In the present embodiment, the hopping between the precoding matrices is performed in the time domain. However, when a multi-carrier transmission scheme such as an OFDM scheme is used, the present invention is applicable to the case where the hopping between the precoding matrices is performed in the frequency domain, as described in other embodiments. If this is the case, t used in the present embodiment is to be replaced with f (frequency ((sub) carrier)). Also, even in the case of performing the hopping between the precoding matrices in the time and frequency domains, the present invention is applicable.

Embodiment H1

The present embodiment describes a scheme that is used when the modulation signal subject to the QPSK mapping and the modulation signal subject to the 16QAM mapping are transmitted, for example, and is used for setting the average power of the modulation signal subject to the QPSK mapping and the average power of the modulation signal subject to the 16QAM mapping such that the average powers will be different from each other. This scheme is different from Embodiment F1.

As explained in Embodiment F1, when the modulation scheme for the modulation signal of s1 is QPSK and the modulation scheme for the modulation signal of s2 is 16QAM (or the modulation scheme for the modulation signal s1 is 16QAM and the modulation scheme for the modulation signal s2 is QPSK), if the average power of the modulation signal subject to the QPSK mapping and the average power of the modulation signal subject to the 16QAM mapping are set to be different from each other, the PAPR (Peak-to-Average Power Ratio) of the transmission power amplifier provided in the transmission device may increase, depending on the precoding scheme used by the transmission device, which regularly hops between precoding matrices. The increase of the PAPR may lead to the increase in power consumption by the transmission device.

More specifically, in the present description, which includes "embodiment 8", "embodiment 9", "embodiment 18", "embodiment 19", "embodiment C1", and "embodiment C2", when $\alpha \neq 1$ in the equation of the precoding matrix to be used in the precoding scheme for regularly hopping between precoding matrices, the following influences are brought about. That is, the average power of the modulated signal z1 and the modulated signal z2 are caused to differ from each other, which influences the PAPR of the transmission power amplifier included in the transmission device. As a result, the problem arises of the power consumption of the transmission device being increased (however, as already mentioned in the above, certain precoding matrices in the scheme for regularly hopping between precoding matrices influence the PAPR to only a minimal extent even when $\alpha \neq 1$).

Thus, in the present embodiment, description is provided on a precoding scheme for regularly hopping between precoding matrices, where, when $\alpha \neq 1$ in the equation of the precoding matrix to be used in the precoding scheme, the influence to the PAPR is suppressed to a minimal extent. As already mentioned in the above, description has been made on the precoding scheme for regularly hopping between precoding matrices in the present description, more specifically, in "embodiment 8", "embodiment 9", "embodiment 18", "embodiment 19", "embodiment C1", and "embodiment C2".

In the present embodiment, description is provided taking as an example a case where the modulation scheme applied to the streams s1 and s2 is either QPSK or 16QAM.

Firstly, explanation is provided of the mapping scheme for QPSK modulation and the mapping scheme for 16QAM modulation. Note that, in the present embodiment, the symbols s1 and s2 refer to signals which are either in accordance with the mapping for QPSK modulation or the mapping for 16QAM modulation.

First of all, description is provided concerning mapping for 16QAM with reference to the accompanying FIG. 94. FIG. 94 illustrates an example of a signal point layout in the in-phase component I-quadrature component Q plane for 16QAM. Concerning the signal point 9400 in FIG. 94, when the bits transferred (input bits) are b0-b3, that is, when the bits transferred are indicated by (b0, b1, b2, b3)=(1, 0, 0, 0) (this value being illustrated in FIG. 94), the coordinates in the in-phase component I-quadrature component Q plane corresponding thereto is denoted as (I, Q)=(−3×g, 3×g). The values of coordinates I and Q in this set of coordinates indicates the mapped signals. Note that, when the bits transferred (b0, b1, b2, b3) take other values than in the above, the set of values I and Q is determined according to the values of the bits transferred (b0, b1, b2, b3) and according to FIG. 94. Further, similar as in the above, the values of coordinates I and Q in this set indicates the mapped signals (s1 and s2).

Subsequently, description is provided concerning mapping for QPSK modulation with reference to the accompanying FIG. 95. FIG. 95 illustrates an example of a signal point layout in the in-phase component I-quadrature component Q plane for QPSK. Concerning the signal point 9500 in FIG. 95, when the bits transferred (input bits) are b0 and b1, that is, when the bits transferred are indicated by (b0, b1)=(1, 0) (this value being illustrated in FIG. 95), the coordinates in the in-phase component I-quadrature component Q plane corresponding thereto is denoted as (I, Q)=(−1×h, 1×h). Further, the values of coordinates I and Q in this set of coordinates indicates the mapped signals. Note that, when the bits transferred (b0, b1) take other values than in the above, the set of coordinates (I, Q) is determined according to the values of the bits transferred (b0, b1) and according to FIG. 95. Further, similar as in the above, the values of coordinates I and Q in this set indicates the mapped signals (s1 and s2).

Further, when the modulation scheme applied to s1 and s2 is either QPSK or 16QAM, and when equalizing the average power of the modulated signal z1 and the modulated signal z2, h represents equation (273), and g represents equation (272).

FIGS. 110 and 111 illustrate an example of the scheme of changing the modulation scheme, the power change value, and the precoding matrix in the time domain (or in the frequency domain, or in the time domain and the frequency domain) when using a precoding-related signal processing unit illustrated in FIG. 108.

In FIG. 110, a chart is provided indicating the modulation scheme, the power change value, and the precoding scheme to be set at each of times t=0 through t=11. Note that, concerning the modulated signals z1(*t*) and z2(*t*), the modulated signals z1(*t*) and z2(*t*) at the same time point are to be simultaneously transmitted from different transmit antennas at the same frequency. (Although the chart in FIG. 110 is based on the time domain, when using a multi-carrier transmission scheme as the OFDM scheme, switching between schemes may be performed according to the frequency (subcarrier) domain, rather than according to the time domain. In such a case, replacement should be made of t=0 with f=f0, t=1 with f=f1, . . . , as is shown in FIG. 110. (Note that here, f denotes frequencies (subcarriers), and thus, f0, f1, . . . , indicate different frequencies (subcarriers) to be used.) Further, note that concerning the modulated signals z1(*f*) and z2(*f*) in such a case, the modulated signals z1(*f*) and z2(*f*) having the same frequency are to be simultaneously transmitted from different transmit antennas.

As illustrated in FIG. 110, when the modulation scheme applied is QPSK, the power change unit (although referred to as the power change unit herein, may also be referred to as an amplification change unit or a weighting unit) multiplies a (a being a real number) with respect to a signal modulated in accordance with QPSK. Similarly, when the modulation scheme applied is 16QAM, the power change unit (although referred to as the power change unit herein, may also be referred to as the amplification change unit or the weighting unit) multiplies b (b being a real number) with respect to a signal modulated in accordance with 16QAM.

In the example illustrated in FIG. 110, three precoding matrices, namely F[0], F[1], and F[2] are prepared as precoding matrices used in the precoding scheme for regularly hopping between precoding matrices. Additionally, the period (cycle) for hopping in the scheme of regularly hopping between precoding matrices is 3 (thus, each of t0-t2, t3-t5, . . . composes one period (cycle)).

Further, in FIG. 110, the modulation scheme applied to s1(*t*) is QPSK in period (cycle) t0-t2, 16QAM in period (cycle) t3-t5 and so on, whereas the modulation scheme applied to s2(*t*) is 16QAM in period (cycle) t0-t2, QPSK in period (cycle) t3-t5 and so on. Thus, the set of (modulation scheme of s1(*t*), modulation scheme of s2(*t*)) is either (QPSK, 16QAM) or (16QAM, QPSK).

Here, it is important that:

when performing precoding according to matrix F[0], both (QPSK, 16QAM) and (16QAM, QPSK) can be the set of (modulation scheme of s1(*t*), modulation scheme of s2(*t*)), when performing precoding according to matrix F[1], both (QPSK, 16QAM) and (16QAM, QPSK) can be the set of (modulation scheme of s1(*t*), modulation scheme of s2(*t*)), and similarly, when performing precoding according to matrix F[2], both (QPSK, 16QAM) and (16QAM, QPSK) can be the set of (modulation scheme of s1(*t*), modulation scheme of s2(*t*)).

In addition, when the modulation scheme applied to s1(*t*) is QPSK, the power change unit (10701A) multiples s1(*t*) with a and thereby outputs a×s1(*t*). On the other hand, when the modulation scheme applied to s2(*t*) is 16QAM, the power change unit (10701A) multiples s1(*t*) with b and thereby outputs b×s1(*t*).

Further, when the modulation scheme applied to s2(*t*) is QPSK, the power change unit (10701B) multiples s2(*t*) with a and thereby outputs a×s2(*t*). On the other hand, when the modulation scheme applied to s2(*t*) is 16QAM, the power change unit (10701B) multiples s2(*t*) with b and thereby outputs b×s2(*t*).

Note that, regarding the scheme for differently setting the average power of signals in accordance with mapping for QPSK modulation and the average power of signals in accordance with mapping for 16QAM modulation, description has already been made in embodiment F1.

Thus, when taking the set of (modulation scheme of s1(*t*), modulation scheme of s2(*t*)) into consideration, the period (cycle) for the hopping between precoding matrices and the switching between modulation schemes is 6=3×2 (where 3: the number of precoding matrices prepared as precoding matrices used in the precoding scheme for regularly hopping between precoding matrices, and 2: both (QPSK, 16QAM) and (16QAM, QPSK) can be the set of (modulation scheme of s1(*t*), modulation scheme of s2(*t*)) for each of the precoding matrices).

As description has been made in the above, by making an arrangement such that both (QPSK, 16QAM) and (16QAM, QPSK) exist as the set of (modulation scheme of s1(t), modulation scheme of s2(t)), and such that both (QPSK, 16QAM) and (16QAM, QPSK) exist as the set of (modulation scheme of s1(t), modulation scheme of s2(t)) with respect to each of the precoding matrices prepared as precoding matrices used in the precoding scheme for regularly hopping between precoding matrices, the following advantageous effects are to be yielded. That is, even when differently setting the average power of signals in accordance with mapping for QPSK modulation and the average power of signals in accordance with mapping for 16QAM modulation, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

Note that, although description has been provided in the above, taking as an example a case where the set of (modulation scheme of s1(t), modulation scheme of s2(t)) is (QPSK, 16QAM) and (16QAM, QPSK), the possible sets of (modulation scheme of s1(t), modulation scheme of s2(t)) are not limited to this. More specifically, the set of (modulation scheme of s1(t), modulation scheme of s2(t)) may be one of: (QPSK, 64QAM), (64QAM, QPSK); (16QAM, 64QAM), (64QAM, 16QAM); (128QAM, 64QAM), (64QAM, 128QAM); (256QAM, 64QAM), (64QAM, 256QAM), and the like. That is, the present invention is to be similarly implemented provided that two different modulation schemes are prepared, and a different one of the modulation schemes is applied to each of s1(t) and s2(t).

In FIG. 111, a chart is provided indicating the modulation scheme, the power change value, and the precoding matrix to be set at each of times t=0 through t=11. Note that, concerning the modulated signals z1(t) and z2(t), the modulated signals z1(t) and z2(t) at the same time point are to be simultaneously transmitted from different transmit antennas at the same frequency. (Although the chart in FIG. 111 is based on the time domain, when using a multi-carrier transmission scheme as the OFDM scheme, switching between schemes may be performed according to the frequency (subcarrier) domain, rather than according to the time domain. In such a case, replacement should be made of t=0 with f=f0, t=1 with f=f1, . . . , as is shown in FIG. 111. (Note that here, f denotes frequencies (subcarriers), and thus, f0, f1, . . . , indicate different frequencies (subcarriers) to be used.) Further, note that concerning the modulated signals z1(f) and z2(f) in such a case, the modulated signals z1(f) and z2(f) having the same frequency are to be simultaneously transmitted from different transmit antennas. Note that the example illustrated in FIG. 111 is an example that differs from the example illustrated in FIG. 110, but satisfies the requirements explained with reference to FIG. 110.

As illustrated in FIG. 111, when the modulation scheme applied is QPSK, the power change unit (although referred to as the power change unit herein, may also be referred to as the amplification change unit, or the weighting unit) multiplies a (a being a real number) with respect to a signal modulated in accordance with QPSK. Similarly, when the modulation scheme applied is 16QAM, the power change unit (although referred to as the power change unit herein, may also be referred to as the amplification change unit or the weighting unit) multiplies b (b being a real number) with respect to a signal modulated in accordance with 16QAM.

In the example illustrated in FIG. 111, three precoding matrices, namely F[0], F[1], and F[2] are prepared as precoding matrices used in the precoding scheme for regularly hopping between precoding matrices. Additionally, the period (cycle) for hopping in the scheme of regularly hopping between precoding matrices is 3 (thus, each of t0-t2, t3-t5, . . . composes one period (cycle)).

Further, QPSK and 16QAM are alternately set as the modulation scheme applied to s1(t) in the time domain, and the same applies to the modulation scheme set to s2(t). Thus, the set of (modulation scheme of s1(t), modulation scheme of s2(t)) is either (QPSK, 16QAM) or (16QAM, QPSK).

Here, it is important that:

when performing precoding according to matrix F[0], both (QPSK, 16QAM) and (16QAM, QPSK) can be the set of (modulation scheme of s1(t), modulation scheme of s2(t)), when performing precoding according to matrix F[1], both (QPSK, 16QAM) and (16QAM, QPSK) can be the set of (modulation scheme of s1(t), modulation scheme of s2(t)), and similarly, when performing precoding according to matrix F[2], both (QPSK, 16QAM) and (16QAM, QPSK) can be the set of (modulation scheme of s1(t), modulation scheme of s2(t)).

In addition, when the modulation scheme applied to s1(t) is QPSK, the power change unit (10701A) multiples s1(t) with a and thereby outputs a×s1(t). On the other hand, when the modulation scheme applied to s2(t) is 16QAM, the power change unit (10701A) multiples s1(t) with b and thereby outputs b×s1(t).

Further, when the modulation scheme applied to s2(t) is QPSK, the power change unit (10701B) multiples s2(t) with a and thereby outputs a×s2(t). On the other hand, when the modulation scheme applied to s2(t) is 16QAM, the power change unit (10701B) multiples s2(t) with b and thereby outputs b×s2(t).

Thus, when taking the set of (modulation scheme of s1(t), modulation scheme of s2(t)) into consideration, the period (cycle) for the hopping between precoding matrices and the switching between modulation schemes is 6=3×2 (where 3: the number of precoding matrices prepared as precoding matrices used in the precoding scheme for regularly hopping between precoding matrices, and 2: both (QPSK, 16QAM) and (16QAM, QPSK) can be the set of (modulation scheme of s1(t), modulation scheme of s2(t)) for each of the precoding matrices).

As description has been made in the above, by making an arrangement such that both (QPSK, 16QAM) and (16QAM, QPSK) exist as the set of (modulation scheme of s1(t), modulation scheme of s2(t)), and such that both (QPSK, 16QAM) and (16QAM, QPSK) exist as the set of (modulation scheme of s1(t), modulation scheme of s2(t)) for each of the precoding matrices prepared as precoding matrices used in the precoding scheme for regularly hopping between precoding matrices, the following advantageous effects are to be yielded. That is, even when differently setting the average power of signals in accordance with mapping for QPSK modulation and the average power of signals in accordance with mapping for 16QAM modulation, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

Note that, although description has been provided in the above, taking as an example a case where the set of (modulation scheme of s1(t), modulation scheme of s2(t)) is (QPSK, 16QAM) and (16QAM, QPSK), the possible sets of (modulation scheme of s1(t), modulation scheme of s2(t)) are not limited to this. More specifically, the set of (modulation scheme of s1(t), modulation scheme of s2(t)) may be one of: (QPSK, 64QAM), (64QAM, QPSK); (16QAM, 64QAM), (64QAM, 16QAM); (128QAM, 64QAM), (64QAM, 128QAM); (256QAM, 64QAM), (64QAM, 256QAM), and the like. That is, the present invention is to be similarly implemented provided that two different modulation schemes are prepared, and a different one of the modulation schemes is applied to each of s1(t) and s2(t).

Additionally, the relation between the modulation scheme, the power change value, and the precoding matrix set at each of times (or for each of frequencies) is not limited to those described in the above with reference to FIGS. 110 and 111.

To summarize the explanation provided in the above, the following points are essential.

Arrangements are to be made such that the set of (modulation scheme of s1(t), modulation scheme of s2(t)) can be either (modulation scheme A, modulation scheme B) or (modulation scheme B, modulation scheme A), and such that the average power of signals in accordance with mapping for QPSK modulation and the average power of signals in accordance with mapping for 16QAM modulation are differently set.

Further, when the modulation scheme applied to s1(t) is modulation scheme A, the power change unit (10701A) multiples s1(t) with a and thereby outputs a×s1(t). On the other hand, when the modulation scheme applied to s2(t) is modulation scheme B, the power change unit (10701A) multiples s1(t) with b and thereby outputs b×s1(t). Similarly, when the modulation scheme applied to s2(t) is modulation scheme A, the power change unit (10701B) multiples s2(t) with a and thereby outputs a×s2(t). On the other hand, when the modulation scheme applied to s2(t) is modulation scheme B, the power change unit (10701A) multiples s2(t) with b and thereby outputs b×s2(t).

Further, an arrangement is to be made such that precoding matrices F[0], F[1], . . . , F[n−2], and F[n−1] (or F[k], where k satisfies 0≤k≤n−1) exist as precoding matrices prepared for use in the precoding scheme for regularly hopping between precoding matrices. Further, an arrangement is to be made such that both (modulation scheme A, modulation scheme B) and (modulation scheme B, modulation scheme A) exist as the set of (modulation scheme of s1(t), modulation scheme of s2(t)) for F[k]. (Here, the arrangement may be made such that both (modulation scheme A, modulation scheme B) and (modulation scheme B, modulation scheme A) exist as the set of (modulation scheme of s1(t), modulation scheme of s2(t)) for F[k] for all values of k, or such that a value k exists where both (modulation scheme A, modulation scheme B) and (modulation scheme B, modulation scheme A) exist as the set of (modulation scheme of s1(t), modulation scheme of s2(t) for F[k].)

As description has been made in the above, by making an arrangement such that both (modulation scheme A, modulation scheme B) and (modulation scheme B, modulation scheme A) exist as the set of (modulation scheme of s1(t), modulation scheme of s2(t)), and such that both (modulation scheme A, modulation scheme B) and (modulation scheme B, modulation scheme A) exist as the set of (modulation scheme of s1(t), modulation scheme of s2(t)) for each of the precoding matrices prepared as precoding matrices used in the precoding scheme for regularly hopping between precoding matrices, the following advantageous effects are yielded. That is, even when differently setting the average power of signals in accordance with mapping for modulation scheme A and the average power of signals in accordance with mapping for modulation scheme B, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

In connection with the above, explanation is provided of a scheme for generating baseband signals s1(t) and s2(t) in the following. As illustrated in FIGS. 3 and 4, the baseband signal s1(t) is generated by the mapping unit 306a and the baseband signal s2(t) is generated by the mapping unit 306b. As such, in the examples provided in the above with reference to FIGS. 110 and 111, the mapping units 306a and 306b switch between mapping according to QPSK and mapping according to 16QAM by referring to the charts illustrated in FIGS. 110 and 110.

Here, note that, although separate mapping units for generating each of the baseband signal s1(t) and the baseband signal s2(t) are provided in the illustrations in FIGS. 3 and 4, the present invention is not limited to this. For instance, the mapping unit (11202) may receive input of digital data (11201), generate s1(t) and s2(t) according to FIGS. 110 and 111, and respectively output s1(t) as the mapped signal 307A and s2(t) as the mapped signal 307B.

Figure 112:
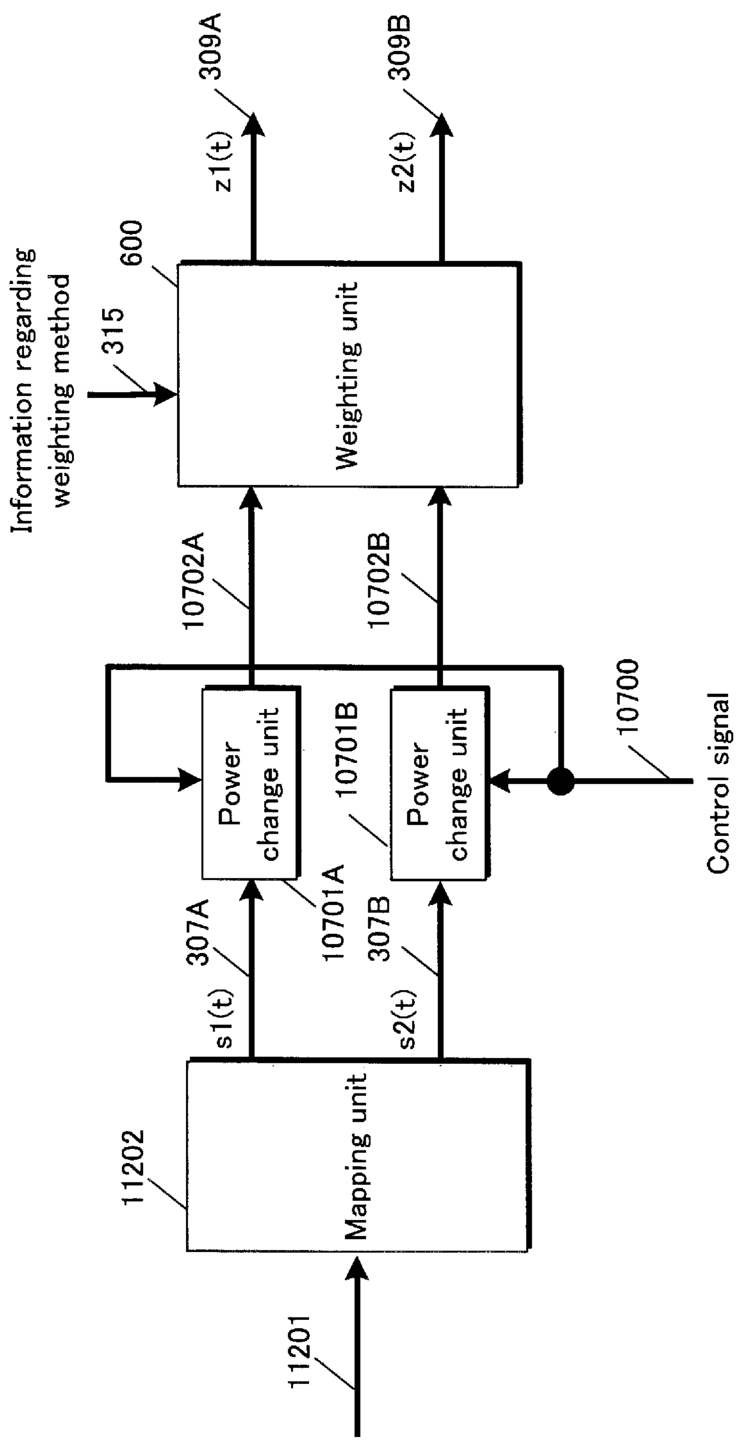
FIG. 112 is an example of a structure of the signal processing unit pertaining to the weighting combination unit.
Figure 113:
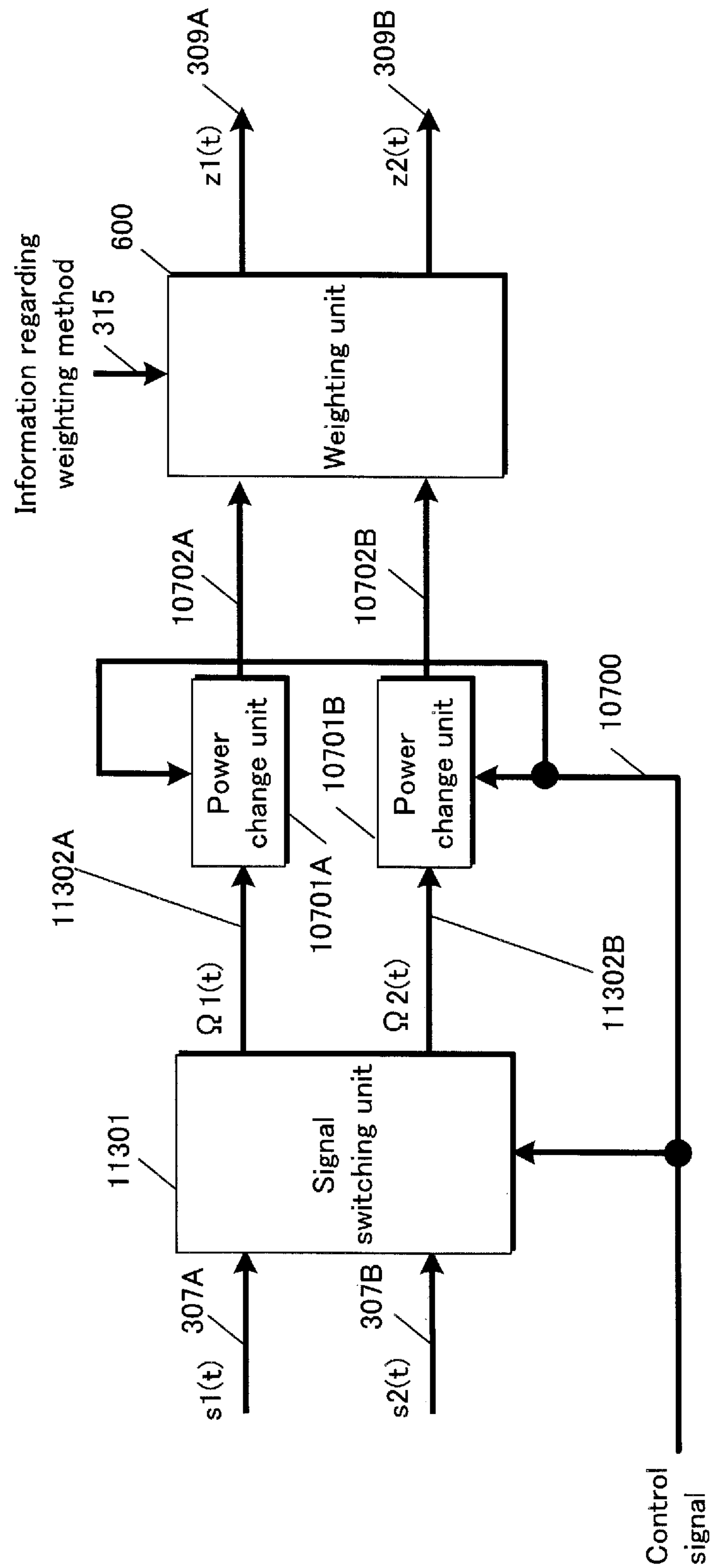
FIG. 113 is an example of a structure of the signal processing unit pertaining to the weighting combination unit.

FIG. 113 illustrates one structural example of the periphery of the weighting combination unit (precoding unit), which differs from the structures illustrated in FIGS. 108 and 112. In FIG. 113, elements that operate in a similar way to FIGS. 3 and 107 bear the same reference signs. In FIG. 114, a chart is provided indicating the modulation scheme, the power change value, and the precoding matrix to be set at each of times t=0 through t=11 with respect to the structural example illustrated in FIG. 113. Note that, concerning the modulated signals z1(t) and z2(t), the modulated signals z1(t) and z2(t) at the same time point are to be simultaneously transmitted from different transmit antennas at the same frequency. (Although the chart in FIG. 114 is based on the time domain, when using a multi-carrier transmission scheme as the OFDM scheme, switching between schemes may be performed according to the frequency (subcarrier) domain, rather than according to the time domain. In such a case, replacement should be made of t=0 with f=f0, t=1 with f=f1, . . . , as is shown in FIG. 114. (Note that here, f denotes frequencies (subcarriers), and thus, f0, f1, . . . , indicate different frequencies (subcarriers) to be used.) Further, note that concerning the modulated signals z1(f) and z2(f) in such a case, the modulated signals z1(f) and z2(f) having the same frequency are to be simultaneously transmitted from different transmit antennas.

As illustrated in FIG. 114, when the modulation scheme applied is QPSK, the power change unit (although referred to as the power change unit herein, may also be referred to as the amplification change unit, or the weighting unit) multiplies a (a being a real number) with respect to a signal modulated in accordance with QPSK. Similarly, when the modulation scheme applied is 16QAM, the power change unit (although referred to as the power change unit herein, may also be referred to as the amplification change unit or the weighting unit) multiplies b (b being a real number) with respect to a signal modulated in accordance with 16QAM.

In the example illustrated in FIG. 114, three precoding matrices, namely F[0], F[1], and F[2] are prepared as precoding matrices used in the precoding scheme for regularly hopping between precoding matrices. Additionally, the period (cycle) for hopping in the scheme of regularly hopping between precoding matrices is 3 (thus, each of t0-t2, t3-t5, . . . composes one period (cycle)).

Further, the modulation scheme applied to s1(*t*) is fixed to QPSK, and the modulation scheme to be applied to s2(*t*) is fixed to 16QAM. Additionally, the signal switching unit (11301) illustrated in FIG. 113 receives the mapped signals 307A and 307B and the control signal (10700) as input thereto. The signal switching unit (11301) performs switching with respect to the mapped signals 307A and 307B according to the control signal (10700) (there are also cases where the switching is not performed), and outputs switched signals (11302A: Ω1(t), and 11302B: Ω2(t).

Here, it is important that:

when performing precoding according to matrix F[0], both (QPSK, 16QAM) and (16QAM, QPSK) can be the set of (modulation scheme of Ω1(t), modulation scheme of Ω2(t), when performing precoding according to matrix F[1], both (QPSK, 16QAM) and (16QAM, QPSK) can be the set of (modulation scheme of Ω1(t), modulation scheme of Ω2(t), and similarly, when performing precoding according to matrix F[2], both (QPSK, 16QAM) and (16QAM, QPSK) can be the set of (modulation scheme of Ω1(t), modulation scheme of Ω2(t).

Further, when the modulation scheme applied to Ω1(t) is QPSK, the power change unit (10701A) multiples Ω1(t) with a and thereby outputs a×Ω1(t). On the other hand, when the modulation scheme applied to Ω1(t) is 16QAM, the power change unit (10701A) multiples Ω1(t) with b and thereby outputs b×Ω1(t).

Further, when the modulation scheme applied to Ω2(t) is QPSK, the power change unit (10701B) multiples Ω2(t) with a and thereby outputs a×Ω2(t). On the other hand, when the modulation scheme applied to Ω2(t) is 16QAM, the power change unit (10701B) multiples Ω2(t) with b and thereby outputs b×Ω2(t).

Note that, regarding the scheme for differently setting the average power of signals in accordance with mapping for QPSK modulation and the average power of signals in accordance with mapping for 16QAM modulation, description has already been made in embodiment F1.

Thus, when taking the set of (modulation scheme of Ω1(t), modulation scheme of Ω2(t)) into consideration, the period (cycle) for the hopping between precoding matrices and the switching between modulation schemes is 6=3×2 (where 3: the number of precoding matrices prepared as precoding matrices used in the precoding scheme for regularly hopping between precoding matrices, and 2: both (QPSK, 16QAM) and (16QAM, QPSK) can be the set of (modulation scheme of Ω1(t), modulation scheme of Ω2(t) for each of the precoding matrices).

As description has been made in the above, by making an arrangement such that both (QPSK, 16QAM) and (16QAM, QPSK) exist as the set of (modulation scheme of Ω1(t), modulation scheme of Ω2(t), and such that both (QPSK, 16QAM) and (16QAM, QPSK) exist as the set of (modulation scheme of Ω1(t), modulation scheme of Ω2(t) for each of the precoding matrices prepared as precoding matrices used in the precoding scheme for regularly hopping between precoding matrices, the following advantageous effects are to be yielded. That is, even when differently setting the average power of signals in accordance with mapping for QPSK modulation and the average power of signals in accordance with mapping for 16QAM modulation, the influence with respect to the PAPR of the transmission power amplifier included in the transmission device is suppressed to a minimal extent, and thus the influence with respect to the power consumption of the transmission device is suppressed to a minimal extent, while the reception quality of data of received by the reception device in the LOS environment is improved.

Note that, although description has been provided in the above, taking as an example a case where the set of (modulation scheme of Ω1(t), modulation scheme of Ω2(t) is (QPSK, 16QAM) and (16QAM, QPSK), the possible sets of (modulation scheme of Ω1(t), modulation scheme of Ω2(t) are not limited to this. More specifically, the set of (modulation scheme of Ω1(t), modulation scheme of Ω2(t) may be one of: (QPSK, 64QAM), (64QAM, QPSK); (16QAM, 64QAM), (64QAM, 16QAM); (128QAM, 64QAM), (64QAM, 128QAM); (256QAM, 64QAM), (64QAM, 256QAM), and the like. That is, the present invention is to be similarly implemented provided that two different modulation schemes are prepared, and a different one of the modulation schemes is applied to each of Ω1(t) and Ω2(t).

In FIG. 115, a chart is provided indicating the modulation scheme, the power change value, and the precoding matrix to be set at each of times t=0 through t=11 with respect to the structural example illustrated in FIG. 113. Note that the chart in FIG. 115 differs from the chart in FIG. 114. Further, concerning the modulated signals z1(*t*) and z2(*t*), the modulated signals z1(*t*) and z2(*t*) at the same time point are to be simultaneously transmitted from different transmit antennas at the same frequency. (Although the chart in FIG. 115 is based on the time domain, when using a multi-carrier transmission scheme as the OFDM scheme, switching between schemes may be performed according to the frequency (subcarrier) domain, rather than according to the time domain. In such a case, replacement should be made of t=0 with f=f0, t=1 with f=f1, . . . , as is shown in FIG. 115. (Note that here, f denotes frequencies (subcarriers), and thus, f0, f1, . . . , indicate different frequencies (subcarriers) to be used.) Further, note that concerning the modulated signals z1(*f*) and z2(*f*) in such a case, the modulated signals z1(*f*) and z2(*f*) having the same frequency are to be simultaneously transmitted from different transmit antennas.

As illustrated in FIG. 115, when the modulation scheme applied is QPSK, the power change unit (although referred to as the power change unit herein, may also be referred to as the amplification change unit, or the weighting unit) multiplies a (a being a real number) with respect to a signal modulated in accordance with QPSK. Similarly, when the modulation scheme applied is 16QAM, the power change unit (although referred to as the power change unit herein, may also be referred to as the amplification change unit or the weighting unit) multiplies b (b being a real number) with respect to a signal modulated in accordance with 16QAM.

In the example illustrated in FIG. 115, three precoding matrices, namely F[0], F[1], and F[2] are prepared as precoding matrices used in the precoding scheme for regularly hopping between precoding matrices. Additionally, the period (cycle) for hopping in the scheme of regularly hopping between precoding matrices is 3 (thus, each of t0-t2, t3-t5, . . . composes one period (cycle)).

Further, the modulation scheme applied to s1(*t*) is fixed to QPSK, and the modulation scheme to be applied to s2(*t*) is fixed to 16QAM. Additionally, the signal switching unit (11301) illustrated in FIG. 113 receives as the mapped signals 307A and 307A and a control signal (10700) as input thereto. The signal switching unit (11301) performs switching with respect to the mapped signals 307A and 307B according to the control signal (10700) (there are also cases where the switching is not performed), and outputs switched signals (11302A: Ω1(t), and 11302B: Ω2(t).

Here, it is important that:

when performing precoding according to matrix F[0], both (QPSK, 16QAM) and (16QAM, QPSK) can be the set of (modulation scheme of Ω1(t), modulation scheme of Ω2(t), when performing precoding according to matrix F[1], both (QPSK, 16QAM) and (16QAM, QPSK) can be the set of (modulation scheme of Ω1(t), modulation scheme of Ω2(t), and similarly, when performing precoding according to matrix F[2], both (QPSK, 16QAM) and (16QAM, QPSK) can be the set of (modulation scheme of Ω1(t), modulation scheme of Ω2(t).

Further, when the modulation scheme applied to Ω1(t) is QPSK, the power change unit (10701A) multiples Ω1(t) with a and thereby outputs a×Ω1(t). On the other hand, when the modulation scheme applied to Ω1(t) is 16QAM, the power change unit (10701A) multiples Ω1(t) with b and thereby outputs b×Ω1(t).

Further, when the modulation scheme applied to Ω2(t) is QPSK, the power change unit (10701B) multiples Ω2(t) with a and thereby outputs a×Ω2(t). On the other hand, when the modulation scheme applied to Ω2(t) is 16QAM, the power change unit (10701B) multiples Ω2(t) with b and thereby outputs b×Ω2(t).

Note that, regarding the scheme for differently setting the average power of signals in accordance with mapping for QPSK modulation and the average power of signals in accordance with mapping for 16QAM modulation, description has already been made in embodiment F1.

Thus, when taking the set of (modulation scheme of Ω1(t), modulation scheme of Ω2(t) into consideration, the period (cycle) for the hopping between precoding matrices and the switching between modulation schemes is 6=3×2 (where 3: the number of precoding matrices prepared as precoding matrices used in the precoding scheme for regularly hopping between precoding matrices, and 2: both (QPSK, 16QAM) and (16QAM, QPSK) can be the set of (modulation scheme of Ω1(t), modulation scheme of Ω2(t) for each of the precoding matrices).

As description has been made in the above, by making an arrangement such that both (QPSK, 16QAM) and (16QAM, QPSK) exist as the set of (modulation scheme of Ω1(t), modulation scheme of Ω2(t), and such that both (QPSK, 16QAM) and (16QAM, QPSK) exist as the set of (modulation scheme of Ω1(t), modulation scheme of Ω2(t) for each of the precoding matrices prepared as precoding matrices used in the precoding scheme for regularly hopping between precoding matrices, the following advantageous effects are to be yielded. That is, even when differently setting the average power of signals in accordance with mapping for QPSK modulation and the average power of signals in accordance with mapping for 16QAM modulation, the influence with respect to the PAPR of the transmission power amplifier included in the transmission device is suppressed to a minimal extent, and thus the influence with respect to the power consumption of the transmission device is suppressed to a minimal extent, while the reception quality of data of received by the reception device in the LOS environment is improved.

Note that, although description has been provided in the above, taking as an example a case where the set of (modulation scheme of Ω1(t), modulation scheme of Ω2(t) is (QPSK, 16QAM) and (16QAM, QPSK), the possible sets of (modulation scheme of Ω1(t), modulation scheme of Ω2(t) are not limited to this. More specifically, the set of (modulation scheme of Ω1(t), modulation scheme of Ω2(t) may be one of: (QPSK, 64QAM), (64QAM, QPSK); (16QAM, 64QAM), (64QAM, 16QAM); (128QAM, 64QAM), (64QAM, 128QAM); (256QAM, 64QAM), (64QAM, 256QAM), and the like. That is, the present invention is to be similarly implemented provided that two different modulation schemes are prepared, and a different one of the modulation schemes is applied to each of Ω1(t) and Ω2(t).

Additionally, the relation between the modulation scheme, the power change value, and the precoding matrix set at each of times (or for each of frequencies) is not limited to those described in the above with reference to FIGS. 114 and 115.

To summarize the explanation provided in the above, the following points are essential.

Arrangements are to be made such that the set of (modulation scheme of Ω1(t), modulation scheme of Ω2(t) can be either (modulation scheme A, modulation scheme B) or (modulation scheme B, modulation scheme A), and such that the average power of signals in accordance with mapping for QPSK modulation and the average power of signals in accordance with mapping for 16QAM modulation are differently set.

Further, when the modulation scheme applied to Ω1(t) is modulation scheme A, the power change unit (10701A) multiples Ω1(t) with a and thereby outputs a×Ω1(t). On the other hand, when the modulation scheme applied to Ω1(t) is modulation scheme B, the power change unit (10701A) multiples Ω1(t) with b and thereby outputs b×Ω1(t). Further, when the modulation scheme applied to Ω2(t) is modulation scheme A, the power change unit (10701B) multiples Ω2(t) with a and thereby outputs a×Ω2(t). On the other hand, when the modulation scheme applied to Ω2(t) is modulation scheme B, the power change unit (10701B) multiples Ω2(t) with b and thereby outputs b×Ω2(t).

Further, an arrangement is to be made such that precoding matrices F[0], F[1], . . . , F[n−2], and F[n−1] (or F[k], where k satisfies 0≤k≤n−1) exist as precoding matrices prepared for use in the precoding scheme for regularly hopping between precoding matrices. Further, an arrangement is to be made such that both (modulation scheme A, modulation scheme B) and (modulation scheme B, modulation scheme A) exist as the set of (modulation scheme of Ω1(t), modulation scheme of Ω2(t) for F[k]. (Here, the arrangement may be made such that both (modulation scheme A, modulation scheme B) and (modulation scheme B, modulation scheme A) exist as the set of (modulation scheme of Ω1(t), modulation scheme of Ω2(t) for F[k] for all values of k, or such that a value k exists where both (modulation scheme A, modulation scheme B) and (modulation scheme B, modulation scheme A) exist as the set of (modulation scheme of Ω1(t), modulation scheme of Ω2(t) for F[k].)

As description has been made in the above, by making an arrangement such that both (modulation scheme A, modulation scheme B) and (modulation scheme B, modulation scheme A) exist as the set of (modulation scheme of Ω1(t), modulation scheme of Ω2(t), and such that both (modulation scheme A, modulation scheme B) and (modulation scheme B, modulation scheme A) exist as the set of (modulation scheme of Ω1(t), modulation scheme of Ω2(t) for each of the precoding matrices prepared as precoding matrices used in the precoding scheme for regularly hopping between precoding matrices, the following advantageous effects are to be yielded. That is, even when differently setting the average power of signals in accordance with mapping for modulation scheme A and the average power of signals in accordance with mapping for modulation scheme B, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

Subsequently, explanation is provided of the operations of the reception unit. Explanation of the reception device has already been provided in embodiment 1, embodiments A1-A5 and the like, and the structure of the reception unit is illustrated in FIGS. 7, 8, 9, 56, 73, 74, and 75, for instance.

According to the relation illustrated in FIG. 5, when the transmission device transmits modulation signals as introduced in FIGS. 110, 111, 114, and 115, one relation among the two relations denoted by the two equations below is satisfied. Note that in the two equations below, r1(*t*) and r2(*t*) indicate reception signals, whereas $h_{11}(t)$, $h_{12}(t)$, $h_{21}(t)$, and $h_{22}(t)$ indicate channel fluctuation values.

Math 686

$$\begin{aligned}\begin{pmatrix} r1(t) \\ r2(t) \end{pmatrix} &= \begin{pmatrix} h_{11}(t) & h_{12}(t) \\ h_{21}(t) & h_{22}(t) \end{pmatrix}\begin{pmatrix} z1(t) \\ z2(t) \end{pmatrix} \\ &= \begin{pmatrix} h_{11}(t) & h_{12}(t) \\ h_{21}(t) & h_{22}(t) \end{pmatrix} F[t] \begin{pmatrix} ve^{j0} & 0 \\ 0 & ue^{j0} \end{pmatrix}\begin{pmatrix} s1(t) \\ s2(t) \end{pmatrix} \\ &= \begin{pmatrix} h_{11}(t) & h_{12}(t) \\ h_{21}(t) & h_{22}(t) \end{pmatrix} F[t] \begin{pmatrix} v & 0 \\ 0 & u \end{pmatrix}\begin{pmatrix} s1(t) \\ s2(t) \end{pmatrix} \\ &= \begin{pmatrix} h_{11}(t) & h_{12}(t) \\ h_{21}(t) & h_{22}(t) \end{pmatrix} F[t] \begin{pmatrix} a & 0 \\ 0 & b \end{pmatrix}\begin{pmatrix} s1(t) \\ s2(t) \end{pmatrix}\end{aligned} \quad \text{(H1)}$$

Math 687

$$\begin{aligned}\begin{pmatrix} r1(t) \\ r2(t) \end{pmatrix} &= \begin{pmatrix} h_{11}(t) & h_{12}(t) \\ h_{21}(t) & h_{22}(t) \end{pmatrix}\begin{pmatrix} z1(t) \\ z2(t) \end{pmatrix} \\ &= \begin{pmatrix} h_{11}(t) & h_{12}(t) \\ h_{21}(t) & h_{22}(t) \end{pmatrix} F[t] \begin{pmatrix} ve^{j0} & 0 \\ 0 & ue^{j0} \end{pmatrix}\begin{pmatrix} s1(t) \\ s2(t) \end{pmatrix} \\ &= \begin{pmatrix} h_{11}(t) & h_{12}(t) \\ h_{21}(t) & h_{22}(t) \end{pmatrix} F[t] \begin{pmatrix} v & 0 \\ 0 & u \end{pmatrix}\begin{pmatrix} s1(t) \\ s2(t) \end{pmatrix} \\ &= \begin{pmatrix} h_{11}(t) & h_{12}(t) \\ h_{21}(t) & h_{22}(t) \end{pmatrix} F[t] \begin{pmatrix} b & 0 \\ 0 & a \end{pmatrix}\begin{pmatrix} s1(t) \\ s2(t) \end{pmatrix}\end{aligned} \quad \text{(H2)}$$

Here, it should be noted that F[t] is a precoding matrix utilizing a parameter time t when applied for the precoding scheme for regularly hopping between precoding matrices. The reception device performs demodulation (detection) of signals by utilizing the relation defined in the two equations above (that is, demodulation is to be performed in the same manner as explanation has been provided in embodiment 1 and embodiments A1 though A5). However, the two equations above do not take into consideration such distortion components as noise components, frequency offsets, and channel estimation errors, and thus, the demodulation (detection) is performed with such distortion components included in the signals. As for the values u and v used by the transmission device in performing power change, the transmission device may transmit information concerning such information or otherwise, the transmission device may transmit information concerning the transmission mode applied (such as transmission scheme, modulation scheme, and error correction scheme). By obtaining such information, the reception device is capable of acknowledging the values u and v used by the transmission device. As such, the reception device derives the two equations above, and performs demodulation (detection).

Although description is provided in the present invention taking as an example a case where hopping between precoding matrices is performed in the time domain, the present invention may be similarly embodied when using a multicarrier transmission scheme such as OFDM or the like and when hopping between precoding matrices in the frequency domain, as description has been made in other embodiments. In such a case, the parameter t used in the present embodiment is to be replaced with a parameter f (frequency ((sub) carrier)). Further, the present invention may be similarly embodied in a case where hopping between precoding matrices is performed in the time-frequency domain. In addition, in the present embodiment, the precoding scheme for regularly hopping between precoding matrices is not limited to the precoding scheme for regularly hopping between precoding matrices, explanation of which has been provided in the other sections of the present description. Further in addition, the same effect of minimalizing the influence with respect to the PAPR is to be obtained when applying the present embodiment with respect to a precoding scheme where a fixed precoding matrix is used.

Embodiment H2

In the present embodiment, description is provided on the precoding scheme for regularly hopping between precoding matrices, the application of which realizes an advantageous effect of reducing circuit size when the broadcast (or communications) system supports both of a case where the modulation scheme applied to s1 is QPSK and the modulation scheme applied to s2 is 16QAM, and a case where the modulation scheme applied to s1 is 16QAM and the modulation scheme applied to s2 is 16QAM.

Firstly, explanation is made of the precoding scheme for regularly hopping between precoding matrices in a case where 16QAM is applied as the modulation scheme to both s1 and s2.

As an example, the precoding schemes for regularly hopping between precoding matrices which have been described in embodiments 9, 10, 18, 19 and the like of the present description are applied as an example of the precoding scheme for regularly hopping between precoding matrices in a case where 16QAM is applied as the modulation scheme to both s1 and s2. (However, the precoding schemes for regularly hopping between precoding matrices are not necessarily limited to those described in embodiments 9, 10, 18, and 19.) Here, taking for example the precoding schemes for regularly hopping between precoding matrices as described in embodiments 8 and 18, a precoding matrix (F[i]) with an N-slot time period (cycle) is expressed by the following equation.

Math 688

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \quad \text{(H3)}$$

In this case, i=0, 1, 2, . . . , N−2, N−1. Here, note that $\theta_{11}(i)$, $\theta_{21}(i)$, α, λ, and δ are similar as in the description provided in embodiments 8 and 18. (Further, the conditions described in embodiments 8 and 18 which are to be satisfied by $\theta_{11}(i)$, $\theta_{21}(i)$, α, λ, and δ provide a good example.) Further, a unitary matrix is used as the precoding matrix with an N-slot time period (cycle). Accordingly, the following equation expresses the precoding matrix (F[i]) with an N-slot time period (cycle).

Math 689

$$F[i] = \frac{1}{\sqrt{\alpha^2+1}}\begin{pmatrix} e^{j\theta_{11}(i)} & \alpha\times e^{j(\theta_{11}(i)+\lambda)} \\ \alpha\times e^{j\theta_{21}(i)} & e^{j(\theta_{21}(i)+\lambda+\pi)} \end{pmatrix} \quad \text{(H4)}$$

In the following, description is provided on an example where the equation (H4) is used as the precoding scheme for regularly hopping between precoding matrices in a case where 16QAM is applied as the modulation scheme to both s1 and s2. Note that, although description is provided in the following taking the equation (H4) as an example, a more specific example is a precoding scheme for regularly hopping between precoding matrices where one of the equations (#1), (#2), (#9), (#10), (#12), (#13), and (#17), all of which are described in embodiment C1, is applied. Alternatively, the precoding scheme for regularly hopping between precoding matrices may be the precoding scheme defined by the two equations (279) and (280) in embodiment 19.

Figure 116:
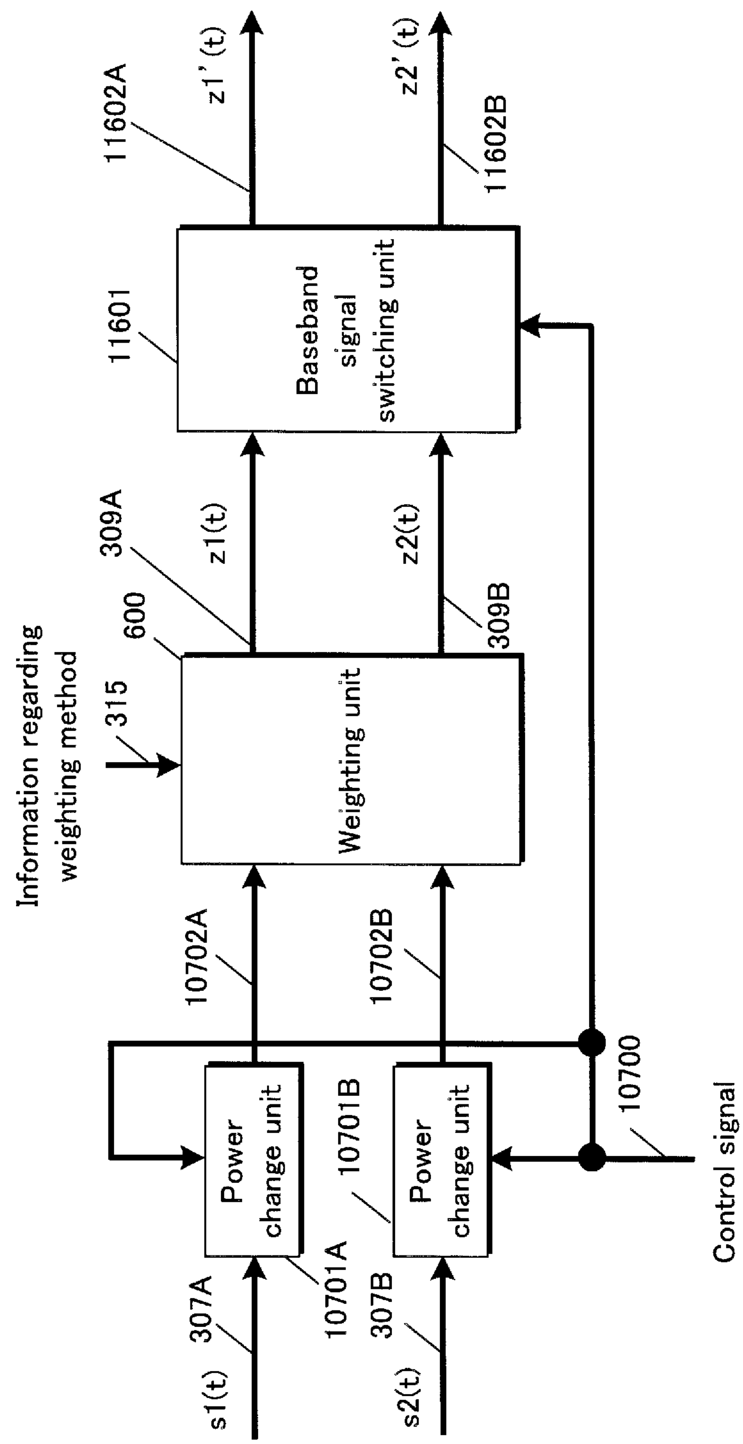
FIG. 116 is an example of a structure of the signal processing unit pertaining to the weighting combination unit.

Firstly, FIG. 116 illustrates a structural example of the periphery of the weighting combination unit (precoding unit) which supports both of a case where the modulation scheme applied to s1 is QPSK and the modulation scheme applied to s2 is 16QAM, and a case where the modulation scheme applied to s1 is 16QAM and the modulation scheme applied to s2 is 16QAM. In FIG. 116, elements that operate in a similar way to FIGS. 3, 6, and 107 bear the same reference signs and explanation thereof is to be omitted in the following.

In FIG. 116, the baseband signal switching unit 11601 receives the precoded signal 309A(z1(*t*)), the precoded signal 309B(z2(*t*)), and the control signal 10700 as input. When the control signal 10700 indicates "do not perform switching of signals", the precoded signal 309A(z1(*t*)) is output as the signal 11602A(z1'(t)), and the precoded signal 309B(z2(*t*)) is output as the signal 11602B(z2'(t)).

In contrast, when the control signal 10700 indicates "perform switching of signals", the baseband signal switching unit 11601 performs the following:

when time=2k (k being an integer), outputs the precoded signal 309A(z1(2k)) as the signal 11602A(z1'(2k)), and outputs the precoded signal 309B(z2(2k)) as the signal 11602B(z2'(2k)), when time=2k+1 (k being an integer), outputs the precoded signal 309B(z2(2k+1)) as the signal 11602A(z1'(2k+1)), and outputs the precoded signal 309A(z1(2k+1)) as the signal 11602B(z2'(2k+1)), and further, when time=2k (k being an integer), outputs the precoded signal 309B(z2(2k)) as the signal 11602A(z1'(2k)), and outputs the precoded signal 309A(z1(2k)) as the signal 11602B(z2'(2k)), and when time=2k+1 (k being an integer), outputs the precoded signal 309A(z1(2k+1)) as the signal 11602A(z1'(2k+1)), and outputs the precoded signal 309B(z2(2k+1)) as the signal 11602B(z2'(2k+1)).

(Although the above description provides an example of the switching between signals, the switching between signals to be performed in accordance with the present embodiment is not limited to this. It is to be noted that importance lies in that switching between signals is performed when the control signal indicates "perform switching of signals".)

Here, it should be noted that the present embodiment is a modification of embodiment H1, and further, that the switching of signals as described in the above is performed with respect to only precoded symbols. That is, the switching of signals is not performed with respect to other inserted symbols such as pilot symbols and symbols for transmitting un-precoded information (e.g. control information symbols), for example. Further, although the description is provided in the above of a case where the precoding scheme for regularly hopping between precoding matrices is applied in the time domain, the present invention is not limited to this.

The present embodiment may be similarly applied also in cases where the precoding scheme for regularly hopping between precoding matrices is applied in the frequency domain and in the time-frequency domain. Similarly, the switching of signals may be performed in the frequency domain or the time-frequency domain, even though description is provided in the above where switching of signals is performed in the time domain.

Subsequently, explanation is provided concerning the operation of each of the units in FIG. 116 in a case where 16QAM is applied as the modulation scheme for both s1 and s2. Since s1(*t*) and s2(*t*) are baseband signals (mapped signals) mapped with the modulation scheme 16QAM, the mapping scheme applied thereto is as illustrated in FIG. 94, and g represents equation (272).

The power change unit (10701A) receives the baseband signal (mapped signal) 307A mapped according to the modulation scheme 16QAM, and the control signal (10700) as input. Further, the power change unit (10701A) multiplies the baseband signal (mapped signal) 307A mapped according to the modulation scheme 16QAM by a factor v, and outputs the signal obtained as a result of the multiplication (the power-changed signal: 10702A). The factor v is a value for performing power change and is set according to the control signal (10700).

The power change unit (10701B) receives the baseband signal (mapped signal) 307B mapped according to the modulation scheme 16QAM, and the control signal (10700) as input. Further, the power change unit (10701B) multiplies the baseband signal (mapped signal) 307B mapped according to the modulation scheme 16QAM by a factor u, and outputs the signal obtained as a result of the multiplication (the power-changed signal: 10702B). The factor u is a value for performing power change and is set according to the control signal (10700).

Here, the factors v and u satisfy: v=u=Ω, $v^2:u^2=1:1$. By making such an arrangement, data is received at an excellent reception quality by the reception device.

The weighting combination unit 600 receives the power-changed signal 10702A (the signal obtained by multiplying the baseband signal (mapped signal) 307A mapped with the modulation scheme 16QAM by the factor v), the power-changed signal 10702B (the signal obtained by multiplying the baseband signal (mapped signal) 307B mapped with the modulation scheme 16QAM by the factor u) and the information 315 regarding the weighting scheme as input. Further, the weighting combination unit 600 performs precoding according to the precoding scheme for regularly hopping between precoding matrices based on the information 315 regarding the weighting scheme, and outputs the precoded signal 309A(z1($t$)) and the precoded signal 309B(z2($t$)). Here, when F[t] represents a precoding matrix according to the precoding scheme for regularly hopping between precoding matrices, the following equation holds.

Math 690

$$\begin{pmatrix} z1(t) \\ z2(t) \end{pmatrix} = F[t]\begin{pmatrix} ve^{j0} & 0 \\ 0 & ue^{j0} \end{pmatrix}\begin{pmatrix} s1(t) \\ s2(t) \end{pmatrix} = F[t]\begin{pmatrix} v & 0 \\ 0 & u \end{pmatrix}\begin{pmatrix} s1(t) \\ s2(t) \end{pmatrix} = F[t]\begin{pmatrix} \Omega & 0 \\ 0 & \Omega \end{pmatrix}\begin{pmatrix} s1(t) \\ s2(t) \end{pmatrix} \tag{H5}$$

Figure 117:
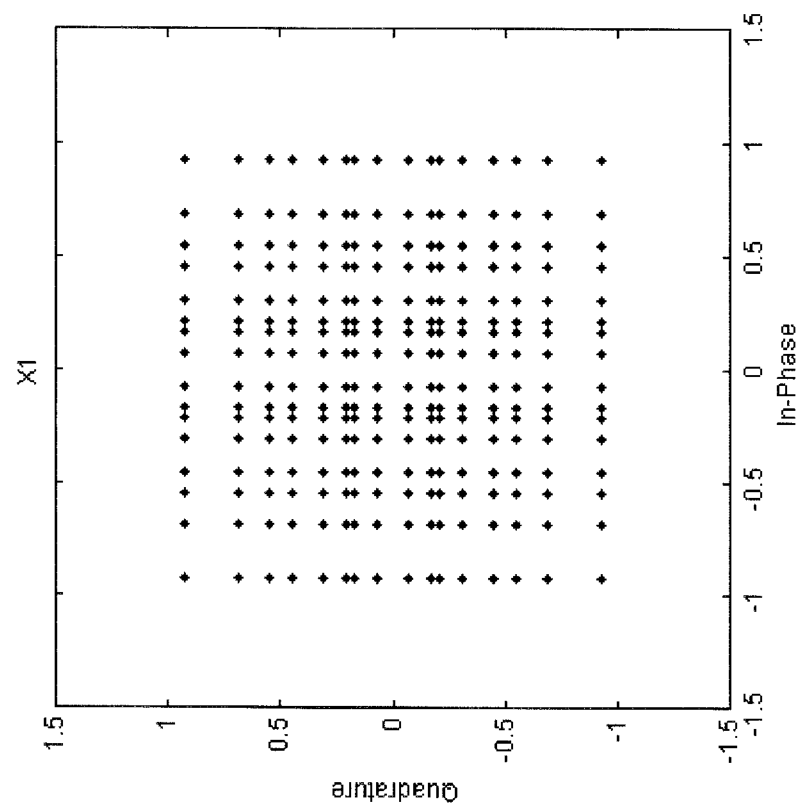
FIG. 117 is an example of signal point layout.

When the precoding matrix F[t], which is a precoding matrix according to the precoding scheme for regularly hopping between precoding matrices, is represented by equation (H4) and when 16QAM is applied as the modulation scheme of both s1 and s2, equation (270) is suitable as the value of a, as is described in embodiment 18. When a is represented by equation (270), z1($t$) and z2($t$) each are baseband signals corresponding to one of the 256 signal points in the I-Q plane, as illustrated in FIG. 117. Note that FIG. 117 illustrates an example of the layout of the 256 signal points, and the layout may be a phase-rotated layout of the 256 signal components.

Here, since the modulation scheme applied to s1 is 16QAM and the modulation scheme applied to s2 is also 16QAM, the weighted and combined signals z1($t$) and z2($t$) are each transmitted as 4 bits according to 16QAM. Therefore a total of 8 bits are transferred as is indicated by the 256 signals points illustrated in FIG. 117. In such a case, since the minimum Euclidian distance between the signal points is comparatively large, the reception quality of data received by the reception unit is improved.

The baseband signal switching unit 11601 receives the precoded signal 309A(z1($t$)), the precoded signal 309B(z2($t$)), and the control signal 10700 as input. Since 16QAM is applied as the modulation scheme of both s1 and s2, the control signal 10700 indicates "do not perform switching of signals". Thus, the precoded signal 309A(z1($t$)) is output as the signal 11602A(z1'(t)) and the precoded signal 309B(z2($t$)) is output as the signal 11602B(z2'(t)).

Subsequently, explanation is provided concerning the operation of each of the units in FIG. 12 in a case where QPSK is applied as the modulation scheme for s1 and 16QAM is applied as the modulation scheme for s2.

Here, s1($t$) is a baseband signal (mapped signal) mapped with the modulation scheme QPSK, and the mapping scheme applied thereto is as illustrated in FIG. 95. Additionally, h represents equation (273). Further, s2($t$) is a baseband signal (mapped signal) mapped with the modulation scheme 16QAM, and the mapping scheme applied thereto is as illustrated in FIG. 94. Additionally, g represents equation (272).

The power change unit (10701A) receives the baseband signal (mapped signal) 307A mapped according to the modulation scheme QPSK, and the control signal (10700) as input. Further, the power change unit (10701A) multiplies the baseband signal (mapped signal) 307A mapped according to the modulation scheme QPSK by a factor v, and outputs the signal obtained as a result of the multiplication (the power-changed signal: 10702A). The factor v is a value for performing power change and is set according to the control signal (10700).

The power change unit (10701B) receives the baseband signal (mapped signal) 307B mapped according to the modulation scheme 16QAM, and the control signal (10700) as input. Further, the power change unit (10701B) multiplies the baseband signal (mapped signal) 307B mapped according to the modulation scheme 16QAM by a factor u, and outputs the signal obtained as a result of the multiplication (the power-changed signal: 10702B). The factor u is a value for performing power change and is set according to the control signal (10700).

In embodiment H1, description is provided that one exemplary example is where "the ratio between the average power of QPSK and the average power of 16QAM is set so as to satisfy the equation $v^2$:$u^2$=1:5". By making such an arrangement, data is received at an excellent reception quality by the reception device. In the following, explanation is provided of the precoding scheme for regularly hopping between precoding matrices when such an arrangement is made.

The weighting combination unit 600 receives the power-changed signal 10702A (the signal obtained by multiplying the baseband signal (mapped signal) 307A mapped with the modulation scheme QPSK by the factor v), the power-changed signal 10702B (the signal obtained by multiplying the baseband signal (mapped signal) 307B mapped with the modulation scheme 16QAM by the factor u) and the information 315 regarding the weighting scheme as input. Further, the weighting combination unit 600 performs precoding according to the precoding scheme for regularly hopping between precoding matrices based on the information 315 regarding the weighting scheme, and outputs the precoded signal 309A(z1($t$)) and the precoded signal 309B(z2($t$)). Here, when F[t] represents a precoding matrix according to the precoding scheme for regularly hopping between precoding matrices, the following equation holds.

Math 691

$$\begin{pmatrix} z1(t) \\ z2(t) \end{pmatrix} = F[t]\begin{pmatrix} ve^{j0} & 0 \\ 0 & ue^{j0} \end{pmatrix}\begin{pmatrix} s1(t) \\ s2(t) \end{pmatrix} = F[t]\begin{pmatrix} v & 0 \\ 0 & u \end{pmatrix}\begin{pmatrix} s1(t) \\ s2(t) \end{pmatrix} = F[t]\begin{pmatrix} v & 0 \\ 0 & \sqrt{5}v \end{pmatrix}\begin{pmatrix} s1(t) \\ s2(t) \end{pmatrix} \tag{H6}$$

When the precoding matrix F[t], which is a precoding matrix according to the precoding scheme for regularly hopping between precoding matrices, is represented by equation (H4) and when 16QAM is applied as the modulation scheme of both s1 and s2, equation (270) is suitable as the value of a, as is described in embodiment 18. The reason for this is explained in the following.

Figure 118:
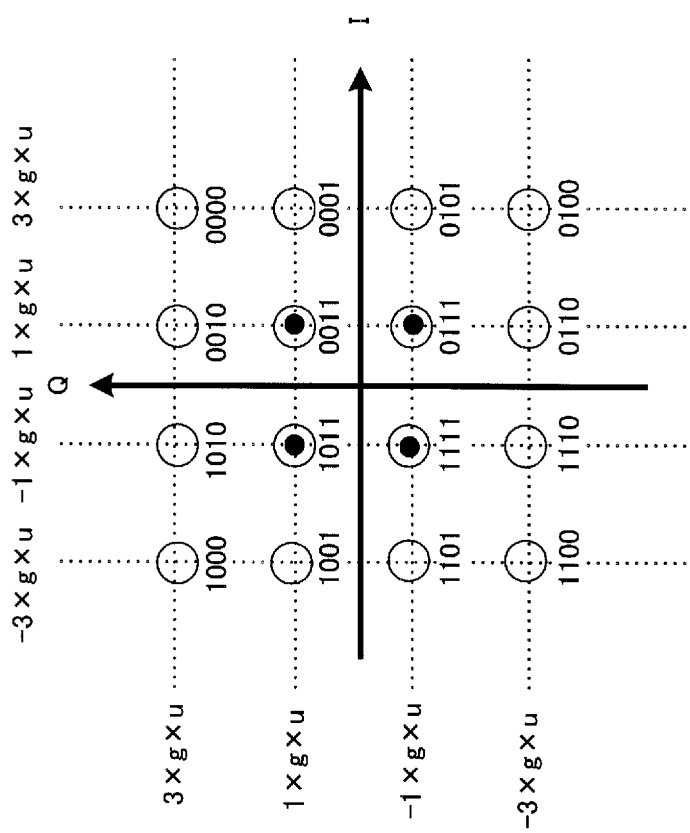
FIG. 118 shows a relationship of positions of signal points.

FIG. 118 illustrates the relationship between the 16 signal points of 16QAM and the 4 signal points of QPSK on the I-Q plane when the transmission state is as described in the above. In FIG. 118, each ○ indicates a signal point of 16QAM, whereas each • indicates a signal point of QPSK. As can be seen in FIG. 118, four signal points among the 16 signal points of the 16QAM coincide with the 4 signal points of the QPSK. Under such circumstances, when the precoding matrix F[t], which is a precoding matrix according to the precoding scheme for regularly hopping between precoding matrices, is represented by equation (H4) and when equation (270) is the value of a, each of z1(*t*) and z2(*t*) is a baseband signal corresponding to 64 signal points extracted from the 256 signal points illustrated in FIG. 117 of a case where the modulation scheme applied to s1 is 16QAM and the modulation scheme applied to s2 is 16QAM. Note that FIG. 117 illustrates an example of the layout of the 256 signal points, and the layout may be a phase-rotated layout of the 256 signal components.

Since QPSK is the modulation scheme applied to s1 and 16QAM is the modulation scheme applied to s2, the weighted and combined signals z1(*t*) and z2(*t*) are respectively transmitted as 2 bits according to QPSK, and 4 bits according to 16QAM. Therefore a total of 6 bits are transferred as is indicated by the 64 signals points. Since the minimum Euclidian distance between the 64 signal points as described in the above is comparatively large, the reception quality of the data received by the reception device is improved.

The baseband signal switching unit 11601 receives the precoded signal 309A(z1(*t*)), the precoded signal 309B(z2(*t*)), and the control signal 10700 as input. Since QPSK is the modulation scheme for s1 and 16QAM is the modulation scheme for s2 and thus, the control signal 10700 indicates "perform switching of signals", the baseband signal switching unit 11601 performs, for instance, the following:

when time=2k (k being an integer),
outputs the precoded signal 309A(z1(2k)) as the signal 11602A(z1'(2k)), and
outputs the precoded signal 309B(z2(2k)) as the signal 11602B(z2'(2k)),
when time=2k+1 (k being an integer),
outputs the precoded signal 309B(z2(2k+1)) as the signal 11602A(z1'(2k+1)), and
outputs the precoded signal 309A(z1(2k+1)) as the signal 11602B(z2'(2k+1)), and
further,
when time=2k (k being an integer),
outputs the precoded signal 309B(z2(2k)) as the signal 11602A(z1'(2k)), and
outputs the precoded signal 309A(z1(2k)) as the signal 11602B(z2'(2k)), and
when time=2k+1 (k being an integer),
outputs the precoded signal 309A(z1(2k+1)) as the signal 11602A(z1'(2k+1)), and
outputs the precoded signal 309B(z2(2k+1)) as the signal 11602B(z2'(2k+1)).

Note that, in the above, description is made that switching of signals is performed when QPSK is the modulation scheme applied to s1 and 16QAM is the modulation scheme applied to s2. By making such an arrangement, the reduction of PAPR is realized and further, the electric consumption by the transmission unit is suppressed, as description has been provided in embodiment F1. However, when the electric consumption by the transmission device need not be taken into account, an arrangement may be made such that switching of signals is not performed similar to the case where 16QAM is applied as the modulation scheme for both s1 and s2. Additionally, description has been provided in the above on a case where QPSK is the modulation scheme applied to s1 and 16QAM is the modulation scheme applied to s2, and further, the condition $v^2:u^2=1:5$ is satisfied, since such a case is considered to be exemplary. However, there exists a case where excellent reception quality is realized when (i) the precoding scheme for regularly hopping between precoding matrices when QPSK is the modulation scheme applied to s1 and 16QAM is the modulation scheme applied to s2 and (ii) the precoding scheme for regularly hopping between precoding matrices when 16QAM is the modulation scheme applied to s1 and 16QAM is the modulation scheme applied to s2 are considered as being identical under the condition $v^2<u^2$. Thus, the condition to be satisfied by values v and u is not limited to $v^2:u^2=1:5$.

By considering (i) the precoding scheme for regularly hopping between precoding matrices when QPSK is the modulation scheme applied to s1 and 16QAM is the modulation scheme applied to s2 and (ii) the precoding scheme for regularly hopping between precoding matrices when 16QAM is the modulation scheme applied to s1 and 16QAM is the modulation scheme applied to s2 to be identical as explained in the above, the reduction of circuit size is realized. Further, in such a case, the reception device performs demodulation according to equations (H5) and (H6), and to the scheme of switching between signals, and since signal points coincide as explained in the above, the sharing of a single arithmetic unit computing reception candidate signal points is possible, and thus, the circuit size of the reception device can be realized to a further extent.

Note that, although description has been provided in the present invention taking the equation (H4) as an example of the precoding scheme for regularly hopping between precoding matrices, the precoding scheme for regularly hopping between precoding matrices is not limited to this.

The essential aspects of the present invention are as described in the following:

When both the case where QPSK is the modulation scheme applied to s1 and 16QAM is the modulation scheme applied to s2 and the case where 16QAM is the modulation scheme applied for both s1 and s2 are supported, the same precoding scheme for regularly hopping between precoding matrices is applied in both cases.

The condition $v^2=u^2$ holds when 16QAM is the modulation scheme applied for both s1 and s2, and the condition $v^2<u^2$ holds when QPSK is the modulation scheme applied to s1 and 16QAM is the modulation scheme applied to s2.

Further, exemplary examples where excellent reception quality of the reception device is realized are described in the following.

Example 1 (the two following conditions are to be satisfied):

the condition $v^2=u^2$ holds when 16QAM is the modulation scheme applied for both s1 and s2, and the condition $v^2:u^2=1:5$ holds when QPSK is the modulation scheme applied to s1 and 16QAM is the modulation scheme applied to s2, and the same precoding scheme for regularly hopping between precoding matrices is applied in both of cases where 16QAM is the modulation scheme applied for both s1 and s2 and QPSK is the modulation scheme applied to s1 and 16QAM is the modulation scheme applied to s2.

Example 2 (the two following conditions are to be satisfied):

the condition $v^2=u^2$ holds when 16QAM is the modulation scheme applied for both s1 and s2, and the condition $v^2<u^2$ holds when QPSK is the modulation scheme applied to s1 and 16QAM is the modulation scheme applied to s2, and when both the case where QPSK is the modulation scheme applied to s1 and 16QAM is the modulation scheme applied to s2 and the case where 16QAM is the modulation scheme applied for both s1 and s2 are supported, the same precoding scheme represented by equation (H4) for regularly hopping between precoding matrices is applied in both cases. Note that, although description has been provided in the above taking an example where the precoding scheme for regularly hopping between precoding matrices is represented by the equation (H4), the precoding scheme may be a precoding scheme for regularly hopping between precoding matrices applying one of the equations (#1), (#2), (#9), (#10), (#12), (#13), and (#17), all of which are described in embodiment C1. Alternatively, the precoding scheme for regularly hopping between precoding matrices may be the precoding scheme defined by the two equations (279) and (280) described in embodiment 19. (detailed description is provided in embodiments 9, 10, 18, 19, and etc.)

Example 3 (the two following conditions are to be satisfied):

the condition $v^2=u^2$ holds when 16QAM is the modulation scheme applied for both s1 and s2, and the condition $v^2<u^2$ holds when QPSK is the modulation scheme applied to s1 and 16QAM is the modulation scheme applied to s2, and when both the case where QPSK is the modulation scheme applied to s1 and 16QAM is the modulation scheme applied to s2 and the case where 16QAM is the modulation scheme applied for both s1 and s2 are supported, the same precoding scheme represented by equation (H4) for regularly hopping between precoding matrices is applied in both cases and the equation (270) is the value of a. Note that, although description has been provided in the above taking an example where the precoding scheme for regularly hopping between precoding matrices is represented by the equation (H4), the precoding scheme may be a precoding scheme for regularly hopping between precoding matrices applying one of the equations (#1), (#2), (#9), (#10), (#12), (#13), and (#17), all of which are described in embodiment C1. Alternatively, the precoding scheme for regularly hopping between precoding matrices may be the precoding scheme defined by the two equations (279) and (280) described in embodiment 19 (detailed description is provided in embodiments 9, 10, 18, 19, and etc.). In either case, it is preferable that the equation (270) be the value of α.

Example 4 (the two following conditions are to be satisfied):

the condition $v^2=u^2$ holds when 16QAM is the modulation scheme applied for both s1 and s2, and the condition $v^2:u^2=1:5$ holds when QPSK is the modulation scheme applied to s1 and 16QAM is the modulation scheme applied to s2, and when both the case where QPSK is the modulation scheme applied to s1 and 16QAM is the modulation scheme applied to s2 and the case where 16QAM is the modulation scheme applied for both s1 and s2 are supported, the same precoding scheme represented by equation (H4) for regularly hopping between precoding matrices is applied in both cases and the equation (270) is the value of a. Note that, although description has been provided in the above taking an example where the precoding scheme for regularly hopping between precoding matrices is represented by the equation (H4), the precoding scheme may be a precoding scheme for regularly hopping between precoding matrices applying one of the equations (#1), (#2), (#9), (#10), (#12), (#13), and (#17), all of which are described in embodiment C1. Alternatively, the precoding scheme for regularly hopping between precoding matrices may be the precoding scheme defined by the two equations (279) and (280) described in embodiment 19 (detailed description is provided in embodiments 9, 10, 18, 19, and etc.). In either case, it is preferable that the equation (270) be the value of α.

Note that, although the present Embodiment has been described with an example where the modulation schemes are QPSK and 16QAM, the present Embodiment is not limited to this example. The scope of the present Embodiment may be expanded as described below. Consider a modulation scheme A and a modulation scheme B. Let α be the number of a signal point on the I-Q plane of the modulation scheme A, and let b be the number of signal points on the I-Q plane of the modulation scheme B, where a<b. Then, the essential points of the present invention are described as follows.

The following two conditions are to be satisfied.

If the case where the modulation scheme of s1 is the modulation scheme A and the modulation scheme of s2 is the modulation scheme B, and the case where the modulation scheme of s1 is the modulation scheme B and the modulation scheme of s2 is the modulation scheme B are both supported, the same precoding scheme is used in common in both the cases for regularly hopping between precoding matrices.

When the modulation scheme of s1 is the modulation scheme B and the modulation scheme of s2 is the modulation scheme B, the condition $v^2=u^2$ is satisfied, and when the modulation scheme of s1 is the modulation scheme A and the modulation scheme of s2 is the modulation scheme B, the condition $v^2<u^2$ is satisfied.

Here, the baseband signal switching as described with reference to FIG. 116 may be optionally executed. However, when the modulation scheme of s1 is the modulation scheme A and the modulation scheme of s2 is the modulation scheme B, it is preferable to perform the above-described baseband signal switching with the influence of the PAPR taken into account.

Alternatively, the following two conditions are to be satisfied.

If the case where the modulation scheme of s1 is the modulation scheme A and the modulation scheme of s2 is the modulation scheme B, and the case where the modulation scheme of s1 is the modulation scheme B and the modulation scheme of s2 is the modulation scheme B are both supported, the same precoding scheme is used in common in both the cases for regularly hopping between precoding matrices, and the precoding scheme is represented by Equation H4. Note that, although in the present Embodiment the description is given of the case where the precoding scheme for regularly hopping between precoding matrices is represented by Equation H4, the precoding scheme for regularly hopping between precoding matrices using any of Equations #1, #2, #9, #10, #12, #13, and #17 may also be employed. The precoding scheme for regularly hopping between precoding matrices defined by both Equations 279 and 280, as described in the Embodiment 19, may also be employed (the details are shown in the Embodiments 9, 10, 18, and 19).

When the modulation scheme of s1 is the modulation scheme B and the modulation scheme of s2 is the modulation scheme B, the condition $\theta=u^2$ is satisfied, and when the modulation scheme of s1 is the modulation scheme A and the modulation scheme of s2 is the modulation scheme B, the condition $v^2<u^2$ is satisfied.

Here, the baseband signal switching as described with reference to FIG. 116 may be optionally executed. However, when the modulation scheme of s1 is the modulation scheme A and the modulation scheme of s2 is the modulation scheme B, it is preferable to perform the above-described baseband signal switching with the influence of the PAPR taken into account.

As an exemplary set of the modulation scheme A and the modulation scheme B, (modulation scheme A, modulation scheme B) is one of (QPSK, 16QAM), (16QAM, 64QAM), (64QAM, 128QAM), and (64QAM, 256QAM).

In the present Embodiment, the description is given of the case where the precoding matrices are switched in the time domain as an example. However, similarly to the description of other Embodiments, the case where a multi-carrier transmission scheme such as OFDM is used, and the case where the precoding matrices are switched in the time domain may be similarly implemented. In such cases, t, which is used in the present Embodiment, is replaced with f (frequency ((sub) carrier)). Furthermore, the case where the precoding matrices are switched in the time-frequency domain may be similarly implemented. Note that, in the present Embodiment, the precoding scheme for regularly hopping between precoding matrices is not limited to the precoding scheme that regularly hops between precoding matrices as described in the present specification.

Furthermore, in any one of the two patterns of setting the modulation scheme according to the present Embodiment, the reception device performs demodulation and detection using the reception scheme described in the Embodiment F1.

Embodiment H3

In the present Embodiment, a different scheme than that in the Embodiment H2 is described, as a precoding scheme for regularly hopping between precoding matrices that is capable of reducing the circuit size when the broadcasting (or communication) system supports both the case where the modulation scheme of s1 is QPSK and the modulation scheme of s2 is 16QAM, and the case where the modulation scheme of s1 is 16QAM and the modulation scheme of s2 is 16QAM.

Firstly, a description is given of the precoding scheme for regularly hopping between precoding matrices when the modulation scheme of s1 is 16QAM and the modulation scheme of s2 is 16QAM.

As the precoding scheme for regularly hopping between precoding matrices when the modulation scheme of s1 is 16QAM and the modulation scheme of s2 is 16QAM, the precoding scheme that regularly hops between precoding matrices as described in the Embodiments 8 and 18 is applied. Accordingly, in the precoding scheme for regularly hopping between precoding matrices, the precoding matrices F[i] over a period (cycle) of N slots are represented as follows.

Math 692

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \tag{H7}$$

Here, i=0, 1, 2, . . . , N−2, N−1. Note that $\theta_{11}(i)$, $\theta_{21}$, α, λ, δ are the same as those described in the Embodiments 8 and 18 (as one preferable example, the requirements of $\theta_{11}(i)$, $\theta_{21}$, α, λ, δ described in the Embodiments 8 and 18 are satisfied). Also, a unitary matrix is used as the precoding matrix for the period (cycle) of N slots. Accordingly, the precoding matrices F[i] for the period (cycle) of N slots are represented by the following Equation (i=0, 1, 2, . . . , N−2, N−1).

Math 693

$$F[i] = \frac{1}{\sqrt{\alpha^2+1}}\begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \tag{H8}$$

FIGS. 108 and 112 show a structure of the weighting (precoding) unit and its surroundings if the case where the modulation scheme of s1 is QPSK and the modulation scheme of s2 is 16QAM, and the case where the modulation scheme of s1 is 16QAM and the modulation scheme of s2 is 16QAM are both supported in the present Embodiment (note that operations of FIGS. 108 and 112 have been described in other Embodiments).

A description is given of s1($t$) and s2($t$) when the modulation scheme of s1 is 16QAM and the modulation scheme of s2 is 16QAM.

Since s1($t$) and s2($t$) are baseband signals (mapped signals) of the modulation scheme 16QAM, the mapping scheme is shown in FIG. 94, and g is represented by Equation 272.

Next, operations by components shown in FIGS. 108 and 112 are described.

The power change unit (10701A) receives, as inputs, the baseband signal (mapped signal) 307A mapped according to the modulation scheme 16QAM and the control signal (10700), and outputs the signal (signal resulting from the power change: 10702A) obtained by multiplying the baseband signal (mapped signal) 307A mapped according to the modulation scheme 16QAM by v, where v denotes a value for performing power change and is set according to the control signal (10700).

The power change unit (10701B) receives, as inputs, the baseband signal (mapped signal) 307B mapped according to the modulation scheme 16QAM and the control signal (10700), and outputs the signal (power changed signal: 10702B) obtained by multiplying the baseband signal (mapped signal) 307B mapped according to the modulation scheme 16QAM by u, where u denotes a value for performing power change and is set according to the control signal (10700).

In this case, v=u=Ω, and $v^2$:$u^2$=1:1. As a result, data reception quality of data received by the reception device is improved.

The weighting unit 600 receives the signal 10702A resulting from the power change (signal obtained by multiplying the baseband signal (mapped signal) 307A mapped according to the modulation scheme 16QAM by v) and the signal 10702B resulting from the power change (signal obtained by multiplying the baseband signal (mapped signal) 307B mapped according to the modulation scheme 16QAM by u), and the information 315 regarding the weighting scheme, and based on the information 315 regarding the weighting scheme, performs precoding based on the precoding scheme that regularly hops between precoding matrices and outputs the signal 309A (z1($t$)) and the signal 309B(z2($t$)) resulting from the precoding. Here, letting F[t] be precoding matrices in the precoding scheme for regularly hopping between precoding matrices, the following Equation holds.

Math 694

$$\begin{aligned}\begin{pmatrix} z1(t) \\ z2(t) \end{pmatrix} &= F[t]\begin{pmatrix} ve^{j0} & 0 \\ 0 & ue^{j0} \end{pmatrix}\begin{pmatrix} s1(t) \\ s2(t) \end{pmatrix} \\ &= F[t]\begin{pmatrix} v & 0 \\ 0 & u \end{pmatrix}\begin{pmatrix} s1(t) \\ s2(t) \end{pmatrix} \\ &= F[t]\begin{pmatrix} \Omega & 0 \\ 0 & \Omega \end{pmatrix}\begin{pmatrix} s1(t) \\ s2(t) \end{pmatrix}\end{aligned} \tag{H9}$$

If the modulation scheme of s1 is 16QAM and the modulation scheme of s2 is 16QAM, and the precoding matrices F[t] are represented by Equation H8 when the precoding scheme for regularly hopping between precoding matrices is applied, as shown in the Embodiment 18, Equation 270 is a suitable value as α. As shown in FIG. 117, when α is represented by Equation 270, each of z1(*t*) and z2(*t*) is a baseband signal corresponding to one of the 256 signal points on the I-Q plane. Note that FIG. 117 only shows one example, and another arrangement of 256 signal points can be conceived in which the phase is rotated around the origin.

Since the modulation scheme of s1 is 16QAM and the modulation scheme of s2 is 16QAM, and since a total of 8 bits (16QAM: 4 bits and 16QAM: 4 bits) of each of z1(*t*) and z2(*t*) resulting from the weighing are transmitted, there are 256 signal points as shown in FIG. 117. Since the minimum Euclidian distance between the signal points is large, the reception quality of data received by the reception device is improved.

Next, a description is given of s1(*t*) and s2(*t*) in a case where the modulation scheme of s1 is QPSK and the modulation scheme of s2 is 16QAM.

Note that s1(*t*) is a baseband signal (mapped signal) according to the modulation scheme QPSK, the mapping scheme is shown in FIG. 95, and h is represented by Equation 273. Since s2(*t*) is the baseband signal (mapped signal) according to the modulation scheme 16QAM, the mapping scheme is shown in FIG. 94, and g is represented by Equation 272.

Next, operations by components shown in FIGS. 108 and 112 are described.

The power change unit (10701A) receives, as inputs, the baseband signal (mapped signal) 307A mapped according to the modulation scheme QPSK and the control signal (10700), and outputs the signal (signal resulting the power change: 10702A) obtained by multiplying the baseband signal (mapped signal) 307A mapped according to the modulation scheme QPSK by v, where v denotes a value for performing power change and is set according to the control signal (10700).

The power change unit (10701B) receives, as inputs, the baseband signal (mapped signal) 307B mapped according to the modulation scheme 16QAM and the control signal (10700), and outputs the signal (the signal resulting the power change: 10702B) obtained by multiplying the baseband signal (mapped signal) 307B mapped according to the modulation scheme 16QAM by u, where u denotes a value for performing power change and set according to the control signal (10700).

Here, as has been described in the Embodiment H1, it is one preferable example that a "ratio between an average QPSK power and an average 16QAM power is $v^2:u^2=1:5$ (as a result, the reception quality of data received by the reception device is improved). The following describes a precoding scheme for regularly hopping between precoding matrices here.

As the precoding scheme for regularly hopping between precoding matrices such that the modulation scheme of s1 is QPSK and the modulation scheme of s2 is 16QAM, the following N precoding matrices are added, in addition to the N precoding matrices of Equation H8 used when the modulation scheme of s1 is 16QAM and the modulation scheme of s2 is 16QAM. Thus, the scheme for regularly hopping between precoding matrices over a period (cycle) with 2N slots is formulated.

Math 695

$$F[i] = \frac{1}{\sqrt{\alpha^2+1}}\begin{pmatrix} \alpha\times e^{j\theta_{11}(i)} & e^{j(\theta_{11}(i)+\lambda)} \\ e^{j\theta_{21}(i)} & \alpha\times e^{j(\theta_{21}(i)+\lambda+\pi)} \end{pmatrix} \tag{H10}$$

In this case, i=N, N+1, N+2, . . . , 2N−2, 2N−1 (as one preferable example, the requirements of $\theta_{11}(i)$, $\theta_{21}$, α, λ, and δ described in Embodiments 10 and 19 are satisfied).

As has been already mentioned, the precoding matrices for the precoding scheme for regularly hopping between precoding matrices over a period (cycle) with 2N slots when the modulation scheme of s1 is QPSK and the modulation scheme of s2 is 16QAM are represented by Equations H8 and 10. Equation H8 represents the precoding matrices for the precoding scheme that regularly hops between precoding matrices over a period (cycle) with N slots when the modulation scheme of s1 is 16QAM and the modulation scheme of s2 is 16QAM. Accordingly, the precoding matrices for the precoding scheme that regularly hops between precoding matrices over a period (cycle) with N slots when the modulation scheme of s1 is 16QAM and the modulation scheme of s2 is 16QAM can be used in the precoding scheme that regularly hops between precoding matrices when the modulation scheme of s1 is QPSK and the modulation scheme of s2 is 16QAM.

The weighting unit 600 receives the signal 10702A resulting the power change (signal obtained by multiplying the baseband signal (mapped signal) 307A mapped according to the modulation scheme QPSK by v) and the signal 10702A resulting the power change (signal obtained by multiplying the baseband signal (mapped signal) 307A mapped according to the modulation scheme by u), and the information 315 regarding the weighting scheme, and according to the information 315 regarding the weighting scheme, performs precoding based on the precoding scheme for regularly hopping between precoding matrices, and outputs the signal 309A (z1(*t*)) resulting from the precoding and the signal 309B (z2(*t*)) resulting from the precoding. Here, letting F[t] be precoding matrices in the precoding scheme for regularly hopping between precoding matrices, the following Equation holds.

Math 696

$$\begin{aligned} \begin{pmatrix} z1(t) \\ z2(t) \end{pmatrix} &= F[t]\begin{pmatrix} ve^{j0} & 0 \\ 0 & ue^{j0} \end{pmatrix}\begin{pmatrix} s1(t) \\ s2(t) \end{pmatrix} \\ &= F[t]\begin{pmatrix} v & 0 \\ 0 & u \end{pmatrix}\begin{pmatrix} s1(t) \\ s2(t) \end{pmatrix} \\ &= F[t]\begin{pmatrix} v & 0 \\ 0 & \sqrt{5}v \end{pmatrix}\begin{pmatrix} s1(t) \\ s2(t) \end{pmatrix} \end{aligned} \tag{H11}$$

In the case where the precoding matrices F[t] are represented by Equations H8 and 10 if the precoding scheme for regularly hopping between precoding matrices is applied when the modulation scheme of s1 is QPSK and the modulation scheme of s2 is 16QAM, as described in Embodiment 18, Equation 270 is a suitable value as a, similarly to the case where the modulation scheme of s1 is 16QAM and the modulation scheme of s2 is 16QAM. The reason is described below.

FIG. 118 shows an arrangement relation of 16 signal points of 16QAM and 4 signal points of QPSK on the I-Q plane when the transmission state is as described in the above. In FIG. 118, each ○ indicates a signal point of 16QAM, and each ● indicates a signal point of QPSK. As can be seen from FIG. 118, 4 signal points among the 16 signal points of 16QAM coincide with the 4 signal points of QPSK. Under such circumstances, when the precoding matrices F[t] of the precoding scheme applied for regularly hopping between precoding matrices are represented by Equations H8 and 10, and when Equation 270 is α, each of z1(*t*) and z2(*t*) is a baseband signal corresponding to 64 signal points extracted from the 256 signal points illustrated in FIG. 117 of a case where the modulation scheme of s1 is 16QAM and the modulation scheme of s2 is 16QAM. Note that FIG. 117 only shows one example, and another arrangement of 256 signal points can be conceived in which the phase is rotated around the origin.

Since the modulation scheme of s1 is QPSK and the modulation scheme of s2 is 16QAM, and a total of 6 bits (QPSK:2 bits and 16QAM:4 bits) of each of z1(*t*) and z2(*t*) resulting from the weighing are transmitted, there are 64 signal points as above. Since the minimum Euclidian distance between these 64 signal points is large, the reception quality of data received by the reception device is improved.

Note that the description is given above of the case where $v^2:u^2=1:5$ when the modulation scheme of s1 is QPSK and the modulation scheme of s2 is 16QAM only as an example because this case is preferable. However, even if, under the condition $v^2<u^2$, Equations H8 and 10 are used as the precoding scheme for regularly hopping between precoding matrices when the modulation scheme of s1 is QPSK and the modulation scheme of s2 is 16QAM, and Equation H8 is used as the precoding scheme for regularly hopping between precoding matrices when the modulation scheme of s1 is 16QAM and the modulation scheme of s2 is 16QAM, the reception quality might be improved in both cases. Accordingly, the present Embodiment is not limited to the case where $v^2:u^2=1:5$.

As has been mentioned in the Embodiment F1, in the case where the above precoding scheme for regularly hopping between precoding matrices is used when the modulation scheme of s1 is QPSK and the modulation scheme of s2 is 16QAM, $v^2<u^2$. Here, an average power (value) of z1(*t*) and an average power (value) of z2(*t*) equal to each other, and the PAPR is reduced, whereby power consumption of the data transmission device is also reduced.

Furthermore, by sharing a part of the matrices in common in the precoding scheme for regularly hopping between precoding matrices when the modulation scheme of s1 is QPSK and the modulation scheme of s2 is 16QAM, and in the precoding scheme for regularly hopping between precoding matrices when the modulation scheme of s1 is 16QAM and the modulation scheme of s2 is 16QAM, the circuit size of the transmission device is reduced. Moreover, in such a case, the reception device performs demodulation based on Equations H8 and/or H10, while sharing the signal points as mentioned above. Accordingly, the sharing of a calculation unit seeking reception candidate signal points is possible, which provides an advantageous effect that the circuit size of the reception device is reduced.

Note that, although description has been given in the present Embodiment taking Equations H8 and/or H10 as an example of the precoding scheme for regularly hopping between precoding matrices, the precoding scheme for regularly hopping between precoding matrices is not limited to the example.

The essential points of the present invention are described as follows.

If the case where the modulation scheme of s1 is QPSK and the modulation scheme of s2 is 16QAM, and the case where the modulation scheme of s1 is 16QAM and the modulation scheme of s2 is 16QAM are both supported, a part of the matrices is shared in common in the precoding scheme for regularly hopping between precoding matrices when the modulation scheme of s1 is QPSK and the modulation scheme of s2 is 16QAM, and in the precoding scheme for regularly hopping between precoding matrices when the modulation scheme of s1 is 16QAM and the modulation scheme of s2 is 16QAM.

When the modulation scheme of s1 is 16QAM and the modulation scheme of s2 is 16QAM, the condition $v^2=u^2$ is satisfied, and when the modulation scheme of s1 is QPSK and the modulation scheme of s2 is 16QAM, the condition $v^2<u^2$ is satisfied.

Further, exemplary examples where excellent reception quality of the reception device is realized are described in the following.

Example 1 (the following two conditions are to be satisfied):

When the modulation scheme of s1 is 16QAM and the modulation scheme of s2 is 16QAM, the condition $v^2=u^2$ is satisfied, and when the modulation scheme of s1 is QPSK and the modulation scheme of s2 is 16QAM, the condition $v^2:u^2=1:5$ is satisfied.

If the case where the modulation scheme of s1 is QPSK and the modulation scheme of s2 is 16QAM, and the case where the modulation scheme of s1 is 16QAM and the modulation scheme of s2 is 16QAM are both supported, a part of the matrices is shared in common in the precoding scheme for regularly hopping between precoding matrices when the modulation scheme of s1 is QPSK and the modulation scheme of s2 is 16QAM, and in the precoding scheme for regularly hopping between precoding matrices when the modulation scheme of s1 is 16QAM and the modulation scheme of s2 is 16QAM.

Example 2 (the following two conditions are to be satisfied):

When the modulation scheme of s1 is 16QAM and the modulation scheme of s2 is 16QAM, the condition $v^2=u^2$ is satisfied, and when the modulation scheme of s1 is QPSK and the modulation scheme of s2 is 16QAM, the condition $v^2<u^2$ is satisfied.

As the precoding scheme for regularly hopping between precoding matrices when the modulation scheme of s1 is QPSK and the modulation scheme of s2 is 16QAM, Equations H8 and 10 are used, and as the precoding scheme for regularly hopping between precoding matrices when the modulation scheme of s1 is 16QAM and the modulation scheme of s2 is 16QAM, Equation H8 is used.

Example 3 (the following two conditions are to be satisfied):

When the modulation scheme of s1 is 16QAM and the modulation scheme of s2 is 16QAM, the condition $v^2=u^2$ is satisfied, and when the modulation scheme of s1 is QPSK and the modulation scheme of s2 is 16QAM, the condition $v^2:u^2=1:5$ is satisfied.

As the precoding scheme for regularly hopping between precoding matrices when the modulation scheme of s1 is QPSK and the modulation scheme of s2 is 16QAM, Equations H8 and 10 are used, and as the precoding scheme for regularly hopping between precoding matrices when the modulation scheme of s1 is 16QAM and the modulation scheme of s2 is 16QAM, Equation H8 is used.

Example 4 (the following two conditions are to be satisfied):

When the modulation scheme of s1 is 16QAM and the modulation scheme of s2 is 16QAM, the condition $v^2=u^2$ is satisfied, and when the modulation scheme of s1 is QPSK and the modulation scheme of s2 is 16QAM, the condition $v^2<u^2$ is satisfied.

As the precoding scheme for regularly hopping between precoding matrices when the modulation scheme of s1 is QPSK and the modulation scheme of s2 is 16QAM, Equations H8 and 10 are used, and as the precoding scheme for regularly hopping between precoding matrices when the modulation scheme of s1 is 16QAM and the modulation scheme of s2 is 16QAM, Equation H8 is used. Furthermore, a in Equations H8 and 10 is represented by Equation 270. Example 5 (the following two conditions are to be satisfied):

When the modulation scheme of s1 is 16QAM and the modulation scheme of s2 is 16QAM, the condition $v^2=u^2$ is satisfied, and when the modulation scheme of s1 is QPSK and the modulation scheme of s2 is 16QAM, the condition $v^2:u^2=1:5$ is satisfied.

As the precoding scheme for regularly hopping between precoding matrices when the modulation scheme of s1 is QPSK and the modulation scheme of s2 is 16QAM, Equations H8 and 10 are used, and as the precoding scheme for regularly hopping between precoding matrices when the modulation scheme of s1 is 16QAM and the modulation scheme of s2 is 16QAM, Equation H8 is used. Furthermore, a in Equations H8 and 10 is represented by Equation 270.

Note that, although in the present Embodiment the description is given with examples of QPSK and 16QAM as the modulation scheme, the present invention is not limited to the examples. The scope of the present Embodiment may be expanded as described below. Consider the modulation scheme A and the modulation scheme B. Let α be the number of signal points on the I-Q plane of the modulation scheme A, and let b be the number of signal points on the I-Q plane of the modulation scheme B, where a<b. Then, the essential points of the present invention are described as follows.

The following two conditions are to be satisfied.

If the case where the modulation scheme of s1 is the modulation scheme A and the modulation scheme of s2 is the modulation scheme B, and the case where the modulation scheme of s1 is the modulation scheme B and the modulation scheme of s2 is the modulation scheme B are both supported, a part of the precoding matrices is used in common in the precoding scheme for regularly hopping between precoding matrices when the modulation scheme of s1 is the modulation scheme A and the modulation scheme of s2 is the modulation scheme B, and in the precoding scheme for regularly hopping between precoding matrices when the modulation scheme of s1 is the modulation scheme B and the modulation scheme of s2 is the modulation scheme B.

When the modulation scheme of s1 is the modulation scheme B and the modulation scheme of s2 is the modulation scheme B, the condition $v^2=u^2$ is satisfied, and when the modulation scheme of s1 is the modulation scheme A and the modulation scheme of s2 is the modulation scheme B, the condition $v^2<u^2$ is satisfied.

Alternatively, the following two conditions are to be satisfied.

As the precoding scheme for regularly hopping between precoding matrices when the modulation scheme of s1 is the modulation scheme A and the modulation scheme of s2 is the modulation scheme B, Equations H8 and 10 are used, and as the precoding scheme for regularly hopping between precoding matrices when the modulation scheme of s1 is the modulation scheme B and the modulation scheme of s2 is the modulation scheme B, Equation H8 is used.

When the modulation scheme of s1 is the modulation scheme B and the modulation scheme of s2 is the modulation scheme B, the condition $v^2=u^2$ is satisfied, and when the modulation scheme of s1 is the modulation scheme A and the modulation scheme of s2 is the modulation scheme B, the condition $v^2<u^2$ is satisfied.

As an exemplary set of the modulation scheme A and the modulation scheme B, (modulation scheme A, modulation scheme B) is one of (QPSK, 16QAM), (16QAM, 64QAM), (64QAM, 128QAM), and (64QAM, 256QAM).

Meanwhile, if, in the precoding scheme for regularly hopping between precoding matrices, the following conditions are satisfied without sharing the precoding matrices, the reception quality of data received by the reception device can become even higher while priority is not placed on reducing the circuit size in the transmission and reception devices.

As the precoding scheme for regularly hopping between precoding matrices when the modulation scheme of s1 is the modulation scheme A and the modulation scheme of s2 is the modulation scheme B, Equations H8 and 10 are used, and as the precoding scheme for regularly hopping between precoding matrices when the modulation scheme of s1 is the modulation scheme B and the modulation scheme of s2 is the modulation scheme B, Equation H8 is used. Note that, however, the value of a of the precoding matrix in Equations H8 and 10 in the precoding scheme for regularly hopping between precoding matrices when the modulation scheme of s1 is the modulation scheme A and the modulation scheme of s2 is the modulation scheme B is different from the value of α of the precoding matrix in Equation H8 in the precoding scheme for regularly hopping between precoding matrices when the modulation scheme of s1 is the modulation scheme B and the modulation scheme of s2 is the modulation scheme B.

The number of slots in the period (cycle) is N in the precoding scheme for regularly hopping between precoding matrices when the modulation scheme of s1 is the modulation scheme B and the modulation scheme of s2 is the modulation scheme B. On the other hand, the number of slots in the period (cycle) is 2N in the precoding scheme for regularly hopping between precoding matrices when the modulation scheme of s1 is the modulation scheme A and the modulation scheme of s2 is the modulation scheme B.

When the modulation scheme of s1 is the modulation scheme B and the modulation scheme of s2 is the modulation scheme B, the condition $v^2=u^2$ is satisfied, and when the modulation scheme of s1 is the modulation scheme A and the modulation scheme of s2 is the modulation scheme B, the condition $v^2<u^2$ is satisfied.

As an exemplary set of the modulation scheme A and the modulation scheme B, (modulation scheme A, modulation scheme B) is one of (QPSK, 16QAM), (16QAM, 64QAM), (64QAM, 128QAM), and (64QAM, 256QAM).

In the present Embodiment, the description is given of the case where the precoding matrices are hopped in the time domain as an example. However, as description has been given in other Embodiments, the case where α multi-carrier transmission scheme such as OFDM is used, and the case where the precoding matrices are hopped in the time domain may be similarly implemented. In such cases, t, which is used in the present Embodiment, is replaced with f (frequency ((sub) carrier)). Furthermore, the case where the precoding matrices are hopped in the time-frequency domain may be similarly implemented. Note that, in the present Embodiment, the precoding scheme for regularly hopping between precoding matrices is not limited to the precoding scheme for regularly hopping between precoding matrices as described in the present specification.

Furthermore, in any one of the two patterns of setting the modulation scheme according to the present Embodiment, the reception device performs demodulation and detection using the reception scheme described in the Embodiment F1.

(Regarding Cyclic Q Delay)

A description is given of application of Cyclic Q Delay described in the present specification. Non-Patent Literature 10 provides an overview of Cyclic Q Delay. The following describes specific examples of generating s1 and s2 when Cyclic Q Delay is used.

Figure 119:
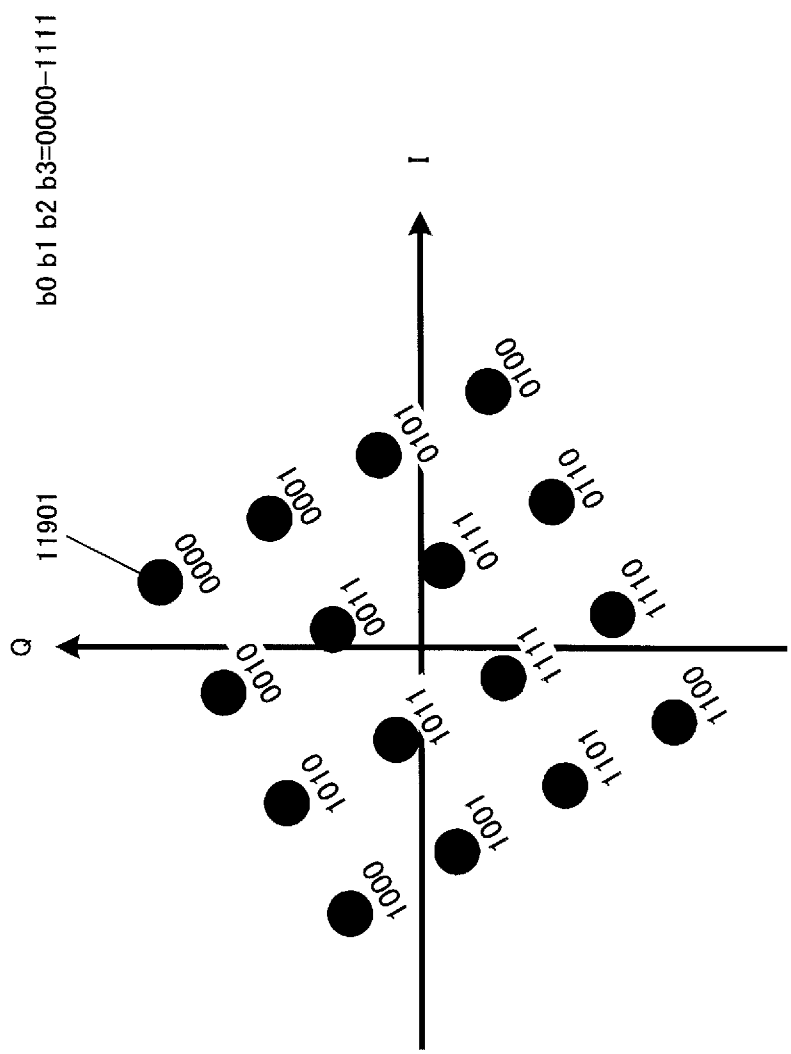
FIG. 119 is an example of signal point layout.

FIG. 119 shows one example of signal point arrangement on the in-phase components I-quadrature components Q plane. Let input bits be b0, b1, b2, b3. Then, b0 b1 b2 b3 is one of values from 0000 to 1111. For instance, when b0 b1 b2 b3 is represented as 0000, a signal point of 11901 illustrated in FIG. 119 is selected, the value of the in-phase component based on 11901 is set as the in-phase component of the baseband signal, and the value of the quadrature component based on 11901 is set as the quadrature component of the baseband signal. Similarly, when b0 b1 b2 b3 is another value, the in-phase component and the quadrature component of a baseband signal are generated in the same manner.

Figure 120:
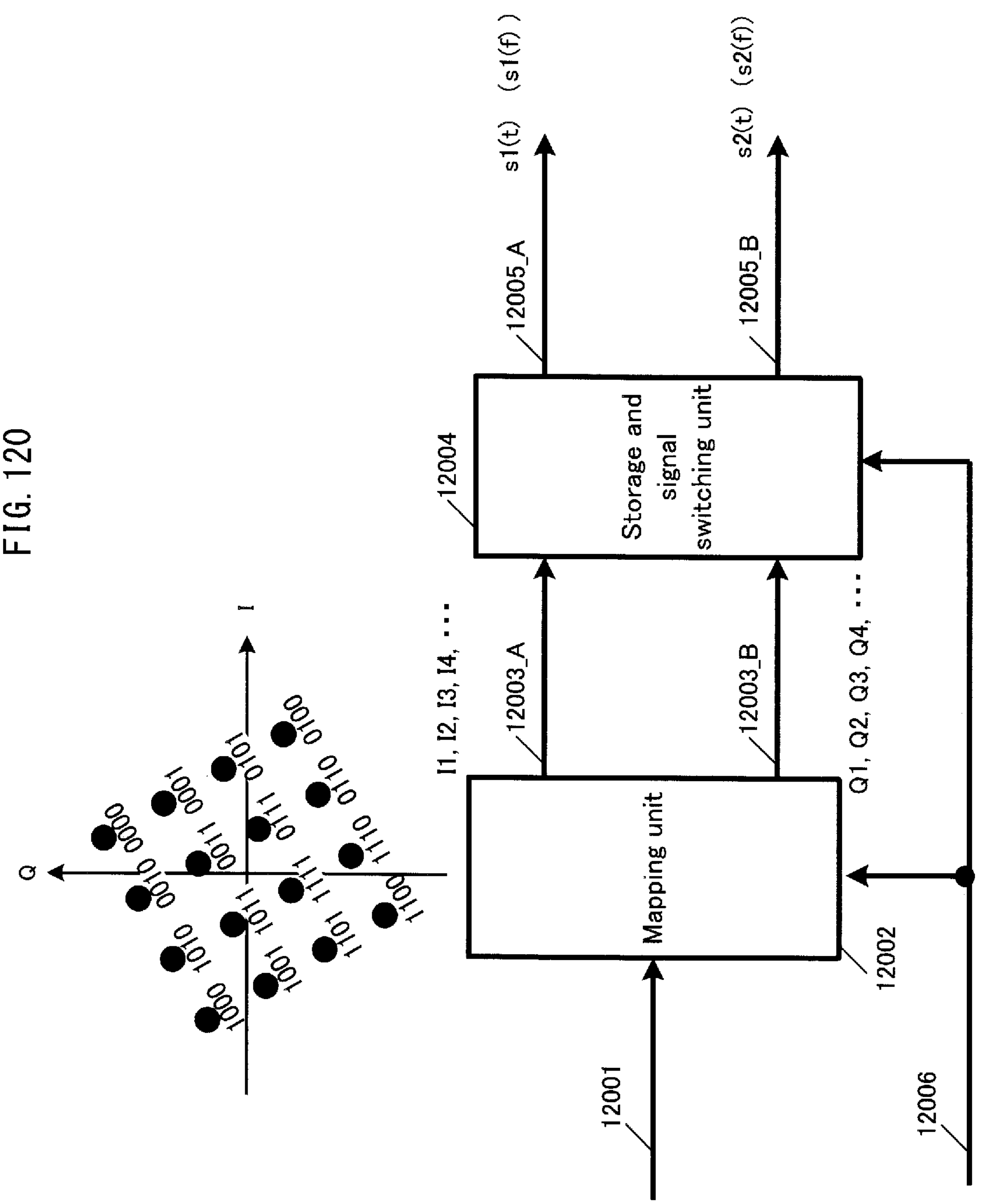

FIG. 120 shows an example of the structure of the signal generating unit for generating the modulated signal s1(*t*) (t: time) (or s1(*f*), f: frequency) and the modulated signal s2(*t*) (t: time) (or s2(*f*), f: frequency) from (binary) data when Cyclic Q Delay is applied.

A mapping unit 12002 receives data 12001 and a control signal 12006 as inputs, and if the modulation scheme based on the control signal 12006, such as 16QAM, is selected, performs mapping in accordance with the procedures in FIG. 119, and outputs the in-phase component 12003_A and the quadrature component 12203_B of the mapped baseband signal. Note that the modulation scheme is not limited to 16QAM, and the present invention is similarly embodied using other modulation schemes.

In this case, data at time 1 corresponding to b0, b1, b2, b3 in FIG. 119 is represented as b01, b1l, b21, b31. Based on the data b01, b1l, b21, b31 at the time 1, the mapping unit 12002 outputs the in-phase component I1 and the quadrature component Q1 of the baseband signal at the time 1. The mapping unit 12002 also outputs the in-phase component I2, the quadrature component Q2, . . . of the baseband signal at time 2.

A storing and signal switching unit 12004 receives, as inputs, the in-phase component 12003_A and the quadrature component 12203_B of the baseband signal, and the control signal 12006. Then, according to the control signal 12006, the storing and signal switching unit 12004 stores the in-phase component 12003_A and the quadrature component 12003_B of the baseband signal and switches signals, and then outputs the modulated signal s1(*t*) (12005_A) and the modulated signal s2(*t*) (12005_B). Note that the scheme for generating the modulated signals s1(*t*) and s2(*t*) is described below in the details.

As has been described in the specification, the precoding scheme for regularly hopping between precoding matrices is applied with respect to the modulated signals s1(*t*) and s2(*t*). In this case, as mentioned in the specification, signal processing such as phase change, power change, and signal switching may be performed in any stage. The modulated signals r1(*t*) and r2(*t*), which are obtained by applying the precoding scheme for regularly hopping between precoding matrices with respect to the modulated signals s1(*t*) and s2(*t*), are transmitted at the same (shared/common) time over the same frequency.

Meanwhile, although the above description is given using the time domain t, when a multi-carrier transmission scheme such as OFDM is used, s1(*t*) and s2(*t*) may be considered as s1(*f*) and s2(*f*) (f: (sub) carrier). The modulated signals r1(*f*) and r2(*f*), which are obtained by applying the precoding scheme for regularly hopping between precoding matrices with respect to the modulated signals s1(*t*) and s2(*t*), are transmitted at the same (shared/common) time (note that r1(*f*) and r2(*f*) are of course signals of the same frequency). Furthermore, as shown in the present specification, s1(*t*) and s2(*t*) may be considered as s1(*t, f*) and s2(*t, f*).

Figure 121:
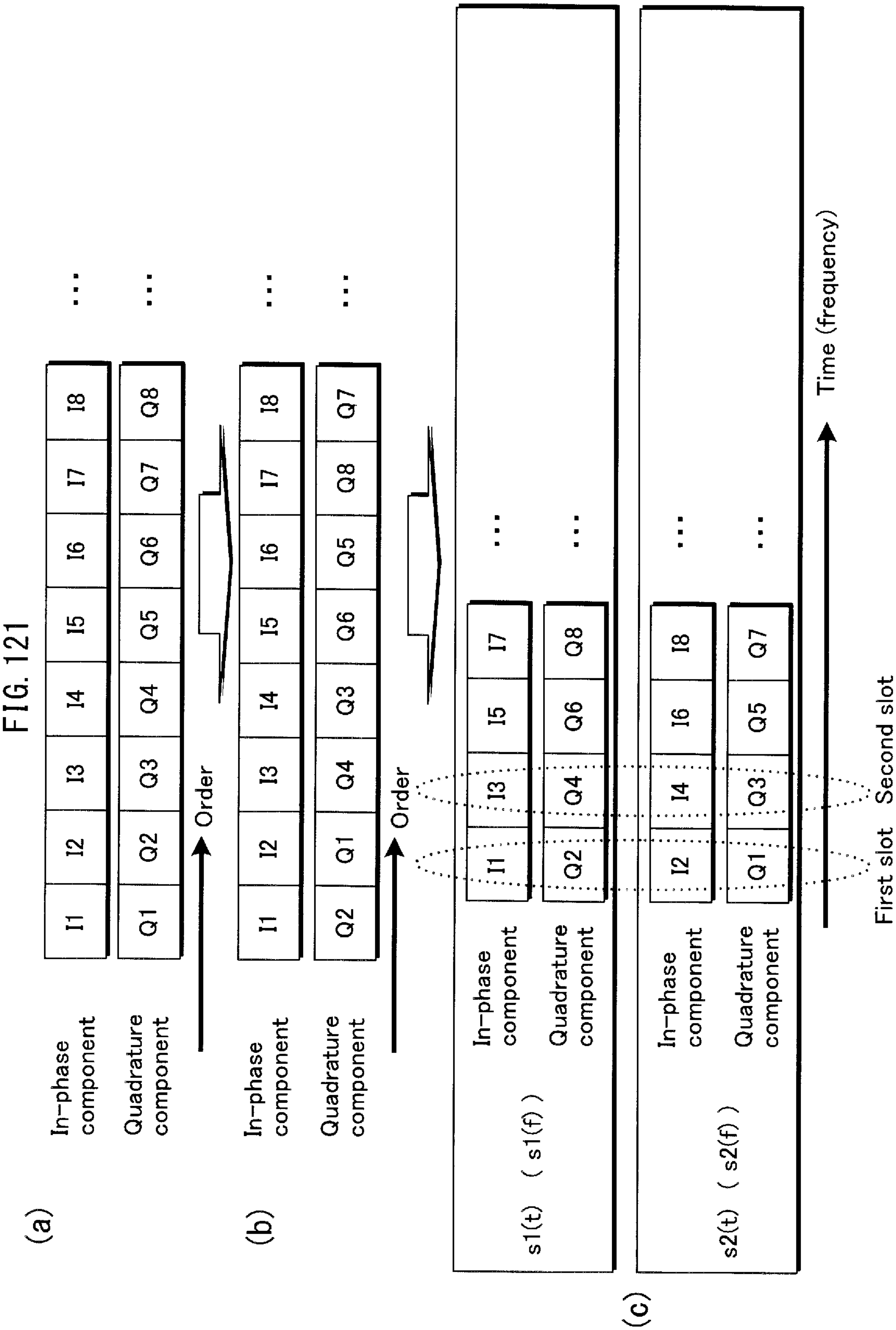

Next, a description is given of the scheme for generating the modulated signals s1(*t*) and s2(*t*). FIG. 121 is a first example of the generation scheme of s1(*t*) and s2(*t*) when Cyclic Q Delay is used.

In FIG. 121, the portion (a) shows the in-phase components and the quadrature components of the baseband signals obtained by the mapping unit 12002 of FIG. 120. As shown in FIG. 121(*a*) and as description has been given of the mapping unit 12002 of FIG. 120, the mapping unit 12002 outputs the in-phase components and the quadrature components of the baseband signals in order starting from the in-phase component I1 and the quadrature component Q1 of the baseband signal at the time 1, the in-phase component I2 and the quadrature component Q2 of the baseband signal at the time 2, the in-phase component I3 and the quadrature component Q3 of the baseband signal at the time 3, . . . .

In FIG. 121, the portion (b) shows exemplary sets of the in-phase and quadrature components of the baseband signals when the storing and signal switching unit 12004 of FIG. 120 performs signal switching. In FIG. 121(*b*), a set of the time 1 and the time 2, a set of the time 3 and the time 4, and a set of the time 5 and the time 6 are formed. In other words, a plurality of sets of time 2i+1 and time 2i+2 (i is an integer greater than or equal to zero) is formed. Within each set, e.g. at the time 1 and at the time 2, the quadrature components of the baseband signals are switched.

Regarding the in-phase components of the baseband signals, signal switching is not performed, and accordingly, the in-phase component of the baseband signal at the time 1 is I1, the in-phase component of the baseband signal at the time 2 is I2, the in-phase component of the baseband signal at the time 3 is I3, On the other hand, regarding the quadrature components of the baseband signals, signal switching is performed in each set, and accordingly, the quadrature component of the baseband signal at the time 1 is Q2, the quadrature component of the baseband signal at the time 2 is Q1, the quadrature component of the baseband signal at the time 3 is Q4, the quadrature component of the baseband signal at the time 4 is Q3, . . . .

In FIG. 121, the portion (c) shows one example of the structure of the modulated signals s1(*t*) and s2(*t*) before precoding when the precoding scheme for regularly hopping between precoding matrices is applied. For instance, as shown in FIG. 121(*c*), the baseband signals generated as in FIG. 121(*b*) are alternately allocated to s1(*t*) and s2(*t*). Accordingly, the first slot of s1(*t*) is (I1, Q2), and the first slot of s2(*t*) is (I2, Q1). The second slot of s1(*t*) is (I3, Q4), the second slot of s2(*t*) is (I4, Q3), . . . .

Although the example of the time domain is illustrated in FIG. 121, the present embodiment may be similarly implemented in the frequency domain (as has been described above). In this case, s1(*f*) and s2(*f*) are described.

Precoding is performed according to the precoding scheme of regularly hopping precoding schemes with respect to s1(*t*) of an Nth slot and s2(*t*) of an Nth slot, and the signals r1(*t*) and r2(*t*) resulting from the precoding of the Nth slot are obtained. The above point has been described in the present specification.

Figure 122:
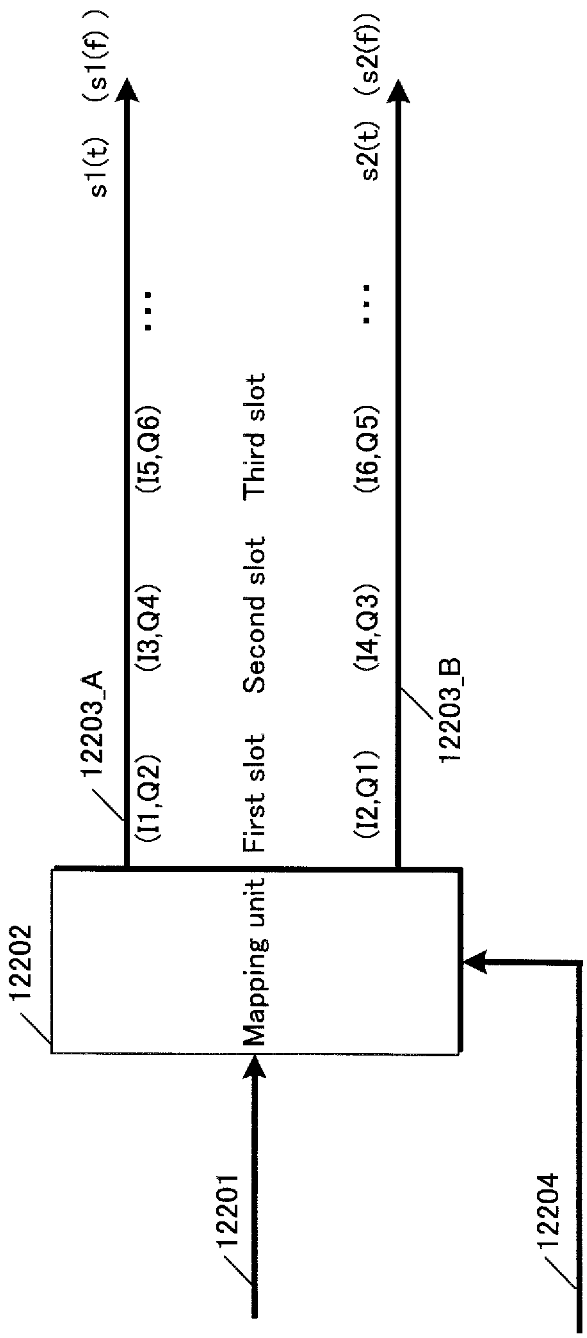

FIG. 122 shows the structuring scheme for obtaining s1(*t*) and s2(*t*) of an Nth slot illustrated in FIG. 121, the scheme different from that of FIG. 120. The mapping unit 12202 receives the data 12201 and a control signal 12204 as inputs, and performs mapping according to the modulation scheme based on the control signal 12204, e.g. mapping that takes the switching of FIG. 121 into consideration, to generate a mapped signal (the in-phase component and the quadrature component of a baseband signal). Based on the mapped signal, the mapping unit 12202 also generates the modulated signal s1(*t*) (12203_A) and the modulated signal s2(*t*) (12203_B), and outputs the generated modulated signal s1(*t*) (12203_A) and the generated modulated signal s2(*t*) (12203_B). Note that the modulated signal s1(*t*) (12203_A) is identical to the modulated signal 12005_A of FIG. 120, and the modulated signal s2(*t*) (12203_B) is identical to the modulated signal 12005_B of FIG. 120 and is shown in FIG. 121(*c*). Accordingly, the first slot of the modulated signal s1(*t*) (12203_A) is (I1, Q2), the first slot of the modulated signal s2(*t*) (12203_B) is (12, Q1), the second slot of the modulated signal s1(*t*) (12203_A) is (I3, Q4), the second slot of the modulated signal s2(*t*) (12203_B) is (I4, Q3), . . . .

In addition, a description is given of the scheme for generating the first slot (I1, Q2) of the modulated signal s1(*t*) (12203_A), and the first slot (I2, Q1) of the modulated signal s2(*t*) (12203_B).

In FIG. 122, data is represented as 12201. Here, let the data at the time 1 be b01, b11, b21, b31, and let the data at the time 2 be b02, b12, b22, b32. The mapping unit 12202 of FIG. 122 generates the above-described I1, Q1, I2, Q2 from b01, b11, b21, b31 and b02, b12, b22, b32. Then, from I1, Q1, I2, Q2, the mapping unit 12202 of FIG. 122 is able to generate the modulated signals s1(*t*) and s2(*t*).

Figure 123:
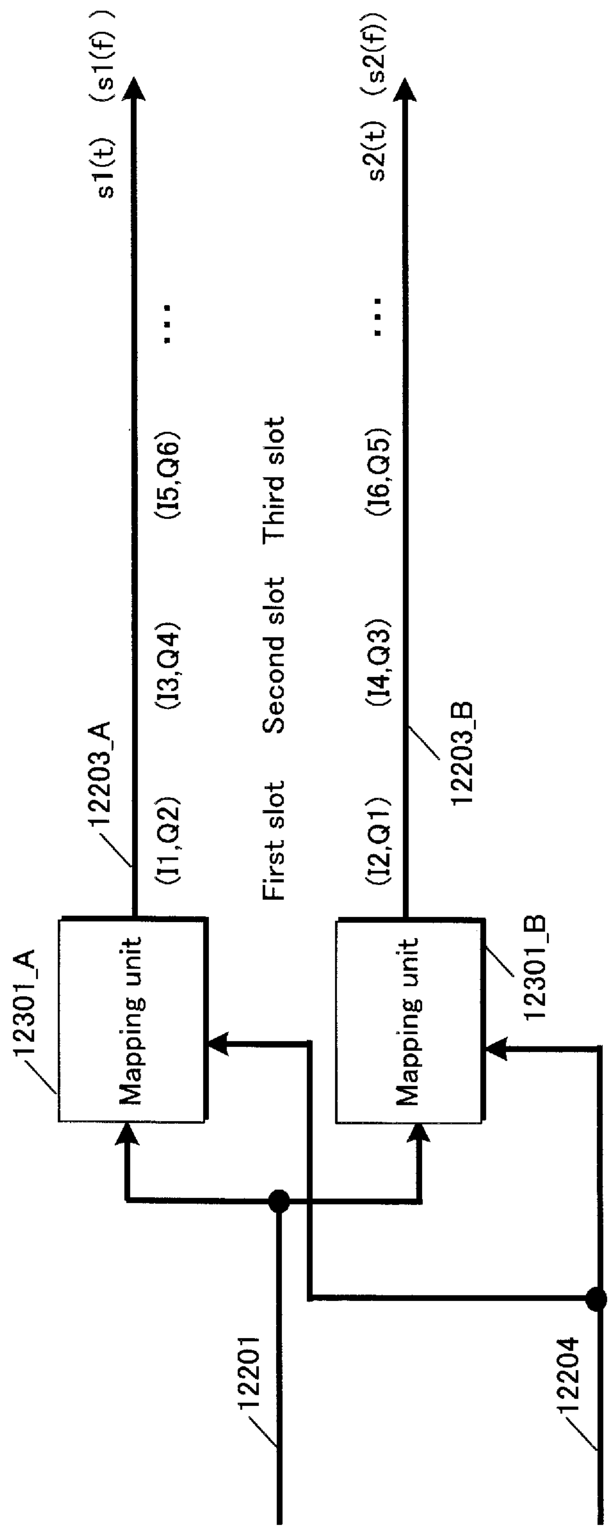

FIG. 123 shows the structuring scheme for obtaining s1(*t*) and s2(*t*) of an Nth slot illustrated in FIG. 121, the scheme different from those of FIGS. 120 and 122. A mapping unit 12301_A receives the data 12201 and the control signal 12204 as inputs, and performs mapping according to the modulation scheme based on the control signal 12204, e.g. mapping that takes the switching of FIG. 121 into consideration, to generate a mapped signal (the in-phase component and the quadrature component of a baseband signal). Based on the mapped signal, the mapping unit 12301_A also generates the modulated signal s1(*t*) (12203_A), and outputs the generated modulated signal s1(*t*) (12203_A). A mapping unit 12301_B receives the data 12201 and the control signal 12204 as inputs, and performs mapping according to the modulation scheme based on the control signal 12204, e.g. mapping that takes the switching of FIG. 121 into consideration, to generate a mapped signal (the in-phase component and the quadrature component of a baseband signal). Based on the mapped signal, the mapping unit 12301_B also generates the modulated signal s2(*t*) (12203_B), and outputs the generated modulated signal s2(*t*) (12203_B).

Note that the data 12201 as the input to the mapping unit 12301_A and the data 12201_B as the input to the mapping unit 12301 is identical to each other. Furthermore, the modulated signal s1(*t*) (12203_A) is identical to the modulated signal 12005_A of FIG. 120, and the modulated signal s2(*t*) (12203_B) is identical to the modulated signal 12005_B of FIG. 120 and is shown in FIG. 121(*c*).

Accordingly, the first slot of the modulated signal s1(*t*) (12203_A) is (I1, Q2), the first slot of the modulated signal s2(*t*) (12203_B) is (I2, Q1), the second slot of the modulated signal s1(*t*) (12203_A) is (I3, Q4), the second slot of the modulated signal s2(*t*) (12203_B) is (I4, Q3), . . . .

In addition, a description is given of the scheme for generating the first slot (I1, Q2) of the modulated signal s1(*t*) (12203_A) in the mapping unit 12301_A of FIG. 123. In FIG. 123, data is represented as 12201. Let the data at the time 1 be b01, b11, b21, b31, and let the data at the time 2 be b02, b12, b22, b32. The mapping unit 12301_A of FIG. 123 generates the above-described I1, Q2 from b01, b11, b21, b31 and b02, b12, b22, b32. Then, from I1, Q2, the mapping unit 12301_A of FIG. 123 is able to generate the modulated signal s1(*t*).

A description is given of the scheme for generating the first slot (I2, Q1) of the modulated signal s2(*t*) (12203_B) in the mapping unit 12301_B of FIG. 123. In FIG. 123, data is represented as 12201. Let the data at the time 1 be b01, b11, b21, b31, and let the data at the time 2 be b02, b12, b22, b32. The mapping unit 12301_B of FIG. 123 generates the above-described 12, Q1 from b01, b11, b21, b31 and b02, b22, b22, b31. Then, from 12, Q1, the mapping unit 12301_B of FIG. 123 is able to generate s2(*t*).

Figure 124:
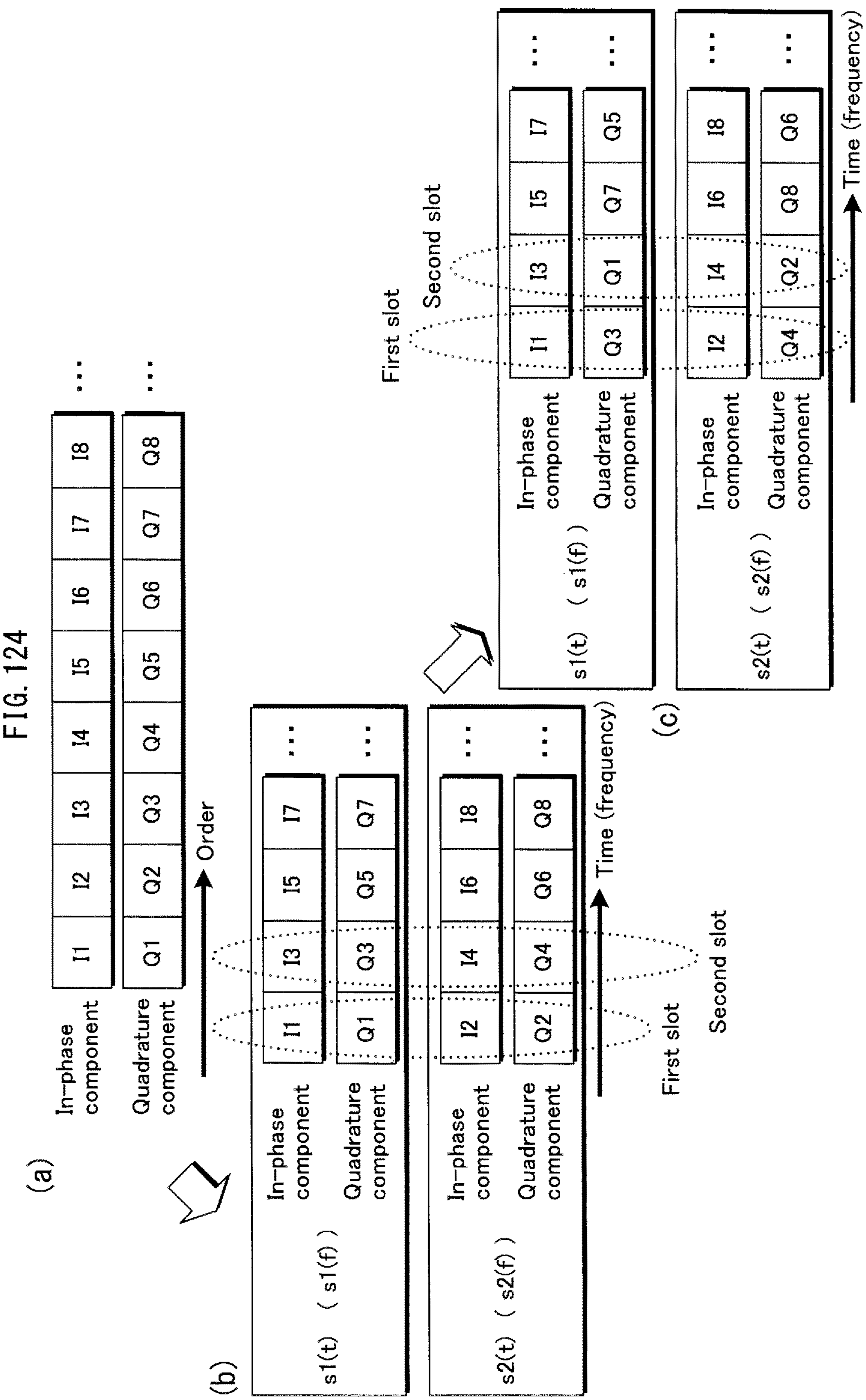

Next, referring to FIG. 124, a second example of the scheme for generating s1(*t*) and s2(*t*) using Cyclic Q Delay is shown, the scheme different from that of FIG. 121. Meanwhile, the same reference numerals are used in FIG. 124 to refer to the same elements (e.g. the in-phase component and the quadrature component of a baseband signal) as FIG. 121.

In FIG. 124, the portion (a) shows the in-phase components and the quadrature components of the baseband signals obtained by the mapping unit 12002 of FIG. 120. FIG. 124(*a*) is the same as FIG. 121(*a*) and explanation thereof is omitted here.

In FIG. 124, the portion (b) shows the structure of the in-phase components and the quadrature components of the baseband signals s1(*t*) and s2(*t*) before signal switching. In FIG. 124(*b*), the baseband signal at the time 2i+1 is assigned to s1(*t*), and the baseband signal at the time 2i+2 is assigned to s2(*t*) (where i is an integer greater than or equal to zero).

In FIG. 124, the portion (c) shows exemplary sets of the in-phase and quadrature components of the baseband signals when the storing and signal switching unit 12004 of FIG. 120 performs signal switching. FIG. 124(*c*) is characterized (differs from FIG. 121) in that signal switching is performed within s1(*t*) and within s2(*t*).

Specifically, in FIG. 124(*c*), in comparison with FIG. 124(*b*), Q1 and Q3 are switched in s1(*t*), and Q5 and Q7 are also switched in s1(*t*). Subsequently, the similar switching is performed. Furthermore, in FIG. 124(*c*), in comparison with FIG. 124(*b*), Q2 and Q4 are switched in s2(*t*), and Q6 and Q8 are also switched in s2(*t*). Subsequently, the similar switching is performed.

As a result, the in-phase component of the baseband signal s1(*t*) in the first slot is I1, the quadrature component of the baseband signal s1(*t*) in the first slot is Q3. The in-phase component of the baseband signal s2(*t*) in the first slot is 12, and the quadrature component of the baseband signal s2(*t*) in the first slot is Q4. Also, the in-phase component of the baseband signal s1(*t*) in the second slot is 13, the quadrature component of the baseband signal s1(*t*) in the second slot is Q1. The in-phase component of the baseband signal s2(*t*) in the second slot is 14, and the quadrature component of the baseband signal s2(*t*) in the second slot is Q2. Regarding the third slot and the fourth slot, an illustration is given in FIG. 124(*c*). This applies to the subsequent slots as well.

Precoding is performed according to the precoding scheme for regularly hopping precoding schemes with respect to s1(*t*) of an Nth slot and s2(*t*) of an Nth slot, and the signals r1(*t*) and r2(*t*) resulting from the precoding of the Nth slot are obtained. The above point has been described in the present specification.

Figure 125:
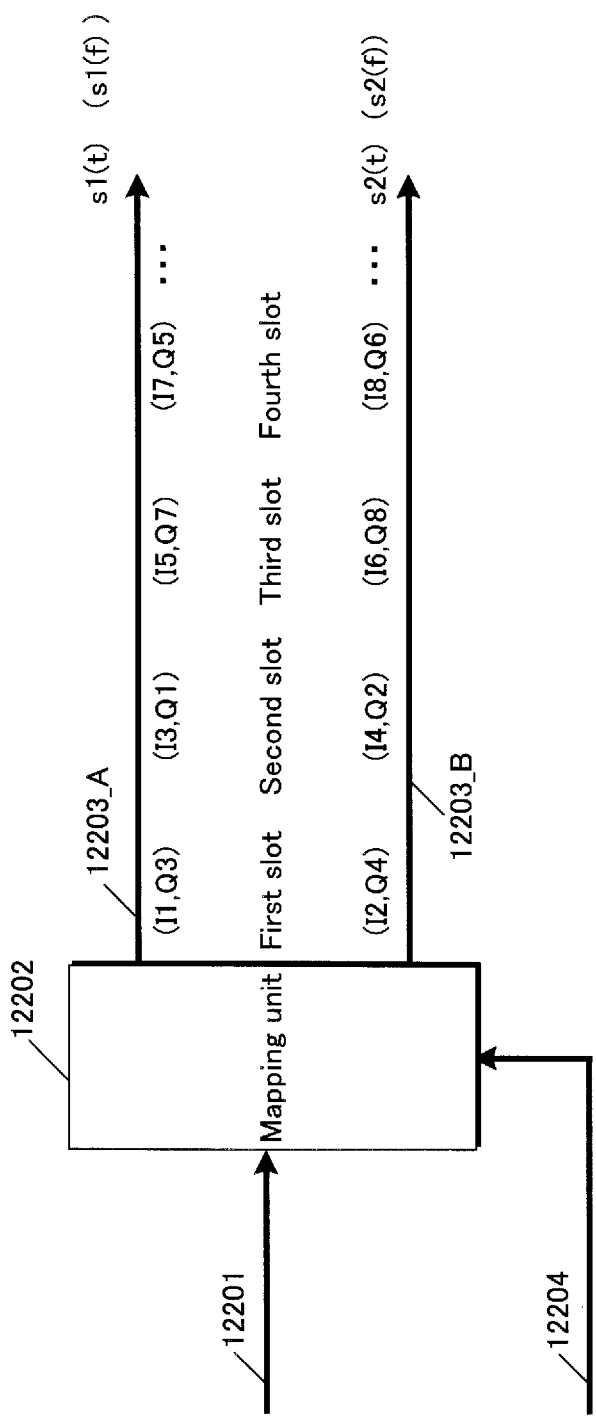

FIG. 125 shows the structuring scheme for obtaining s1(*t*) and s2(*t*) of an Nth slot illustrated in FIG. 124, the scheme different from that of FIG. 120. The mapping unit 12202 receives the data 12201 and the control signal 12204 as inputs, and performs mapping according to the modulation scheme based on the control signal 12204, e.g. mapping that takes the switching of FIG. 124 into consideration, to generate a mapped signal (the in-phase component and the quadrature component of a baseband signal). Based on the mapped signal, the mapping unit 12202 also generates the modulated signal s1(*t*) (12203_A) and the modulated signal s2(*t*) (12203_B), and outputs the generated modulated signal s1(*t*) (12203_A) and the generated modulated signal s2(*t*) (12203_B). Note that the modulated signal s1(*t*) (12203_A) is identical to the modulated signal 12005_A of FIG. 120, and the modulated signal s2(*t*) (12203_B) is identical to the modulated signal 12005_B of FIG. 120 and is shown in FIG. 124(*c*). Accordingly, the first slot of the modulated signal s1(*t*) (12203_A) is (I1, Q3), the first slot of the modulated signal s2(*t*) (12203_B) is (I2, Q4), the second slot of the modulated signal s1(*t*) (12203_A) is (I3, Q1), the second slot of the modulated signal s2(*t*) (12203_B) is (I4, Q2), . . . .

In addition, a description is given of the scheme for generating the first slot (I1, Q3) of the modulated signal s1(*t*) (12203_A), the first slot (I2, Q4) of the modulated signal s2(*t*) (12203_B), the second slot (I3, Q1) of the modulated signal s1(*t*) (12203_A), and the first slot (I4, Q2) of the modulated signal s2(*t*) (12203_B) in the mapping unit 12202 of FIG. 125.

In FIG. 125, data is represented as 12201. Let the data at the time 1 be b01, b11, b21, b31, let the data at the time 2 be b02, b12, b22, b32, let the data at the time 3 be b03, b13, b23, b33, and let the data at the time 4 be b04, b14, b24, b34. The mapping unit 12202 of FIG. 125 generates the above-described I1, Q1, I2, Q2, I3, Q3, 14, Q4 from b01, b11, b21, b31, and b02, b12, b22, b32, and b03, b13, b23, b33, and b04, b14, b24, b34. Then, from I1, Q1, I2, Q2, I3, Q3, 14, Q4, the mapping unit 12202 of FIG. 125 is able to generate the modulated signals s1(*t*) and s2(*t*).

Figure 126:
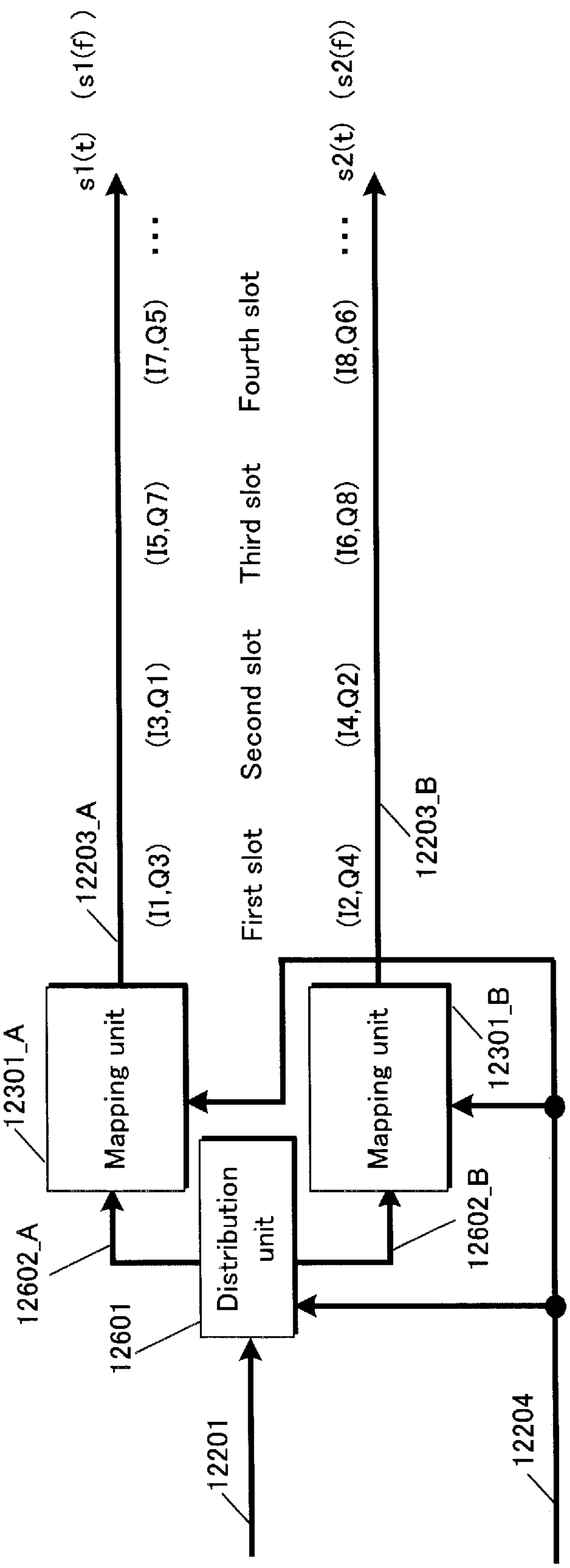

FIG. 126 shows the structuring scheme for obtaining s1(*t*) and s2(*t*) of an Nth slot illustrated in FIG. 124, the scheme different from those of FIGS. 120 and 125. The division unit 12601 receives the data 12201 and the control signal 12204 as inputs, and according to the control signal 12204, divides the data, and outputs first data 12602_A and second data 12602_B. The mapping unit 12301_A receives the first data 12602_A and the control signal 12204 as inputs, and performs mapping according to the modulation scheme based on the control signal 12204, e.g. mapping that takes the switching of FIG. 124 into consideration, to generate a mapped signal (the in-phase component and the quadrature component of a baseband signal). Based on the mapped signal, the mapping unit 12301_A also generates the modulated signal s1(*t*) (12203_A), and outputs the generated modulated signal s1(*t*) (12203_A). The mapping unit 12301_B receives the second data 12602_B and the control signal 12204 as inputs, and performs mapping according to the modulation scheme based on the control signal 12204, e.g. mapping that takes the switching of FIG. 124 into consideration, to generate a mapped signal (the in-phase component and the quadrature component of a baseband signal). Based on the mapped signal, the mapping unit 12301_B also generates the modulated signal s2(*t*) (12203_B), and outputs the generated modulated signal s2(*t*) (12203_B).

Accordingly, the first slot of the modulated signal s1(*t*) (12203_A) is (I1, Q3), the first slot of the modulated signal s2(*t*) (12203_B) is (I2, Q4), the second slot of the modulated signal s1(*t*) (12203_A) is (I3, Q1), the second slot of the modulated signal s2(*t*) (12203_B) is (I4, Q2), . . . .

In addition, a description is given of the scheme for generating the first slot (I1, Q3) and the second slot (I3, Q1) of the modulated signal s1(*t*) (12203_A) in the mapping unit 12301_A of FIG. 126. In FIG. 126, data is represented as 12201. Let the data at the time 1 be b01, b11, b21, b31, let the data at the time 2 be b02, b12, b22, b32, let the data at the time 3 be b03, b13, b23, b33, and let the data at the time 4 be b04, b14, b24, b34. The division unit 12601 outputs the data b01, b11, b21, b31 at the time 1, and the data b03, b13, b23, b33 at the time 3, as the first data 12602_A. The division unit 12601 also outputs the data b02, b12, b22, b32 at the time 2, and the data b04, b14, b24, b34 at the time 4, as the second data 802_B. The mapping unit 12301_A of FIG. 126 generates the first slot (IL Q3) and the second slot (I3, Q1) from b01, b11, b21, b31, and b03, b13, b23, b33. The similar operations are performed for the third and subsequent slots.

A description is given of the scheme for generating the first slot (I2, Q4) of the modulated signal s2(*t*) (12203_B) and the second slot (I4, Q2) in the mapping unit 12301_B of FIG. 126. The mapping unit 12301_B of FIG. 126 generates the first slot (I2, Q4) and the second slot (I4, Q2) from both of the data b02, b12, b22, b32 at the time 2, and the data b04, b14, b24, b34 at the time 4. The similar operations are performed for the third and subsequent slots.

As above, the two Cyclic Q Delay schemes have been described. When signal switching is performed within slots as shown in FIG. 121, the number of the candidate signal points is reduced in the demodulation unit (detector) of the reception device. Consequently, an advantageous effect of reducing the calculation scale (circuit size) is obtained. On the other hand, as shown in FIG. 124, when signal switching is performed within the signal s1(*t*) and within the signal s2(*t*), the number of the candidate signal points is increased in the demodulation unit (detector) of the reception device. However, this type of scheme might yield an advantageous effect of obtaining time diversity gain (or frequency diversity gain, if switching is performed in the frequency domain), leading to the possibility of further improving the data reception quality.

Although the description is given above taking the example where the modulation scheme is 16QAM, the present invention may be similarly embodied even if the modulation scheme is for example one of QPSK, 8QAM, 32QAM, 64QAM, 128QAM, and 256QAM.

Furthermore, the scheme of Cyclic Q Delay is not limited to the above two types. For example, although switching is performed with respect to the quadrature components of the baseband signals in the above two examples, the in-phase components may be switched instead. Moreover, although switching is performed at two points of time (e.g. the quadrature components of the baseband signals are switched at the time 1 and the time 2), the in-phase components or (or possibly, and) the quadrature components of the baseband signals may be switched at a plurality of points of time.

When Cyclic Q Delay is performed while the in-phase component and the quadrature component of a baseband signal is generated as shown in FIG. 121(*a*), the following three possibilities hold. One is that "a symbol exists in which the in-phase component of the baseband signal after Cyclic Q Delay at time i is represented as Ii, and the quadrature component of the baseband signal after Cyclic Q Delay at time i is represented as Qj (i≠j)". Another one is that "a symbol exists in which the in-phase component of the baseband signal after Cyclic Q Delay at time i is represented as Ij, and the quadrature component of the baseband signal after Cyclic Q Delay at time i is represented as Qi (i≠j)". The other one is that "the in-phase component of the baseband signal after Cyclic Q Delay at time i is represented as Ij, and the quadrature component of the baseband signal after Cyclic Q Delay at time i is represented as Qk (i≠j, i≠k, j≠k).

Furthermore, the precoding scheme for regularly hopping between precoding matrices is applied with respect to the modulated signal s1(*t*) (or s1(*f*), or s1(*t, f*)) and the modulated signal s2(*t*) (or s2(*f*), or s2(*t, f*)) which are obtained by performing the aforementioned Cyclic Q Delay (Note that, as mentioned in the specification, signal processing, such as phase change, power change, and signal switching, may be performed in any stage). In this case, as the precoding scheme for regularly hopping between precoding matrices to be applied with respect to the modulated signals obtained by performing Cyclic Q Delay, any of the precoding schemes for regularly hopping between precoding matrices described in the present specification is applicable.

INDUSTRIAL APPLICABILITY

The present invention is widely applicable to wireless systems that transmit different modulated signals from a plurality of antennas, such as an OFDM-MIMO system. Furthermore, in a wired communication system with a plurality of transmission locations (such as a Power Line Communication (PLC) system, optical communication system, or Digital Subscriber Line (DSL) system), the present invention may be adapted to MIMO, in which case a plurality of transmission locations are used to transmit a plurality of modulated signals as described by the present invention. A modulated signal may also be transmitted from a plurality of transmission locations.

REFERENCE SIGNS LIST

302A, 302B encoder
304A, 304B interleaver
306A,306B mapping unit
314 weighting information generating unit
308A,308B weighting unit
310A,310B wireless unit
312A,312B antenna
402 encoder
404 distribution unit
504#1,504#2 transmit antenna
505#1,505#2 transmit antenna
600 weighting unit
703_X wireless unit
701_X antenna
705_1 channel fluctuation estimating unit
705_2 channel fluctuation estimating unit
707_1 channel fluctuation estimating unit
707_2 channel fluctuation estimating unit
709 control information decoding unit
711 signal processing unit
803 INNER MIMO detector
805A, 805B log-likelihood calculating unit
807A, 807B deinterleaver
809A, 809B log-likelihood ratio calculating unit
811A, 811B soft-in/soft-out decoder
813A, 813B interleaver
815 storage unit
819 weighting coefficient generating unit
901 soft-in/soft-out decoder
903 distribution unit
1301A, 1301B OFDM related processor
1402A, 1402A serial/parallel converter
1404A, 1404B reordering unit
1406A, 1406B inverse Fast Fourier transformer
1408A, 1408B wireless unit
2200 precoding weight generating unit
2300 reordering unit
4002 encoder group

The invention claimed is:

1. A communication apparatus comprising:

control information generation circuitry which, in operation, generates control information for specifying one of a plurality of precoding methods to be used to generate first transmission symbols and second transmission symbols, wherein the plurality of precoding methods includes a first precoding method where a fixed precoding matrix is used, a second precoding method where a precoding matrix with a phase shift is used, an amount of the phase shift being switched periodically and a third precoding method for spatial multiplexing;

a precoder which, in operation, generates the first transmission symbols and the second transmission symbols by applying a precoding matrix to first modulated symbols and second modulated symbols based on the control information, wherein the phase shift is applied to one of the first modulated symbols and the second modulated symbols; and a transmitter which, in operation, transmits the generated first transmission symbols and second transmission symbols from two or more antennas and transmits the generated control information.

2. The communication apparatus according to claim 1, wherein the amount of the phase shift is switched symbol by symbol.

3. The communication apparatus according to claim 1, wherein the transmitter, in operation, transmits the generated first transmission symbols and second transmission symbols in a same time period over a same frequency band.

4. The communication apparatus according to claim 1, wherein when the control information indicates that the precoding matrix with the phase shift should not be used to generate the first and second transmission symbols, the precoder generates the first transmission symbols and the second transmission symbols by applying the precoding matrix to the first modulated symbols and the second modulated symbols without applying the phase shift.

5. A communication method comprising:

generating control information for specifying one of a plurality of precoding methods to be used to generate first transmission symbols and second transmission symbols, wherein the plurality of precoding methods includes a first precoding method where a fixed precoding matrix is used, a second precoding method where a precoding matrix with a phase shift is used, an amount of the phase shift being switched periodically and a third precoding method for spatial multiplexing;

generating the first transmission symbols and the second transmission symbols by applying a precoding matrix to first modulated symbols and second modulated symbols based on the control information, wherein the phase shift is applied to one of the first modulated symbols and the second modulated symbols; and transmitting the generated first transmission symbols and second transmission symbols from two or more antennas and transmits the generated control information.

6. The communication method according to claim 5, wherein the amount of the phase shift is switched symbol by symbol.

7. The communication method according to claim 5, wherein the transmitting comprising transmitting the generated first transmission symbols and second transmission symbols in a same time period over a same frequency band.

8. The communication method according to claim 5, wherein when the control information indicates that the precoding matrix with the phase shift should not be used to generate the first and second transmission symbols, the first transmission symbols and the second transmission symbols are generated by applying the precoding matrix to the first modulated symbols and the second modulated symbols without applying the phase shift.

* * * * *